US009916080B2

(12) United States Patent
Alonso Ruiz et al.

(10) Patent No.: US 9,916,080 B2
(45) Date of Patent: Mar. 13, 2018

(54) DEVICES AND METHODS FOR NAVIGATING BETWEEN USER INTERFACES

(71) Applicant: Apple Inc., Cupertino, CA (US)

(72) Inventors: Marcos Alonso Ruiz, San Francisco, CA (US); Jonathan R. Dascola, San Francisco, CA (US); Christopher P. Foss, San Francisco, CA (US); Chanaka G. Karunamuni, San Jose, CA (US); Imran A. Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/136,782

(22) Filed: Apr. 22, 2016

(65) Prior Publication Data

US 2016/0357368 A1 Dec. 8, 2016

Related U.S. Application Data

(63) Continuation of application No. 14/866,511, filed on Sep. 25, 2015.

(Continued)

(51) Int. Cl.

*G06F 3/0488* (2013.01)
*G06F 3/0483* (2013.01)

(Continued)

(52) U.S. Cl.

CPC .......... *G06F 3/0488* (2013.01); *G06F 3/0414* (2013.01); *G06F 3/0482* (2013.01);

(Continued)

(58) Field of Classification Search

CPC ............. G06F 3/04883; G06F 3/04842; G06F 3/0488; G06F 3/017; G06F 3/0481; G06F 3/0482

See application file for complete search history.

(56) References Cited

U.S. PATENT DOCUMENTS

| | | | |
|---|---|---|---|
| 4,864,520 | A | 9/1989 | Setoguchi et al. |
| 5,184,120 | A | 2/1993 | Schultz |

(Continued)

FOREIGN PATENT DOCUMENTS

| | | | |
|---|---|---|---|
| CN | 1808362 | A | 7/2006 |
| CN | 101222704 | A | 7/2008 |

(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

(Continued)

*Primary Examiner* — Tuyetlien T Tran
(74) *Attorney, Agent, or Firm* — Morgan, Lewis & Bockius LLP

(57) ABSTRACT

A method includes: displaying a first view of a first application; detecting a first portion of a first input; if the first portion of the first input meets application-switching criteria, concurrently displaying portions of the first application view and a second application view; while concurrently displaying the portions of the application views, detecting a second portion of the first input; if the second portion of the first input meets first-view display criteria (liftoff of contact detected in a first region), ceasing to display the portion of the second application view and displaying the first application view; and if the second portion of the first input meets multi-view display criteria (liftoff of contact detected in a second region), maintaining concurrent display of a portion of the first application view and a portion of the second application view on the display after detecting the liftoff of the contact.

30 Claims, 146 Drawing Sheets

Related U.S. Application Data

(60) Provisional application No. 62/215,696, filed on Sep. 8, 2015, provisional application No. 62/213,606, filed on Sep. 2, 2015, provisional application No. 62/172,226, filed on Jun. 7, 2015.

(51) Int. Cl.

| | |
|---|---|
| ***G06F 3/0485*** | (2013.01) |
| ***G06F 3/0486*** | (2013.01) |
| ***G06F 9/44*** | (2018.01) |
| ***G06F 3/041*** | (2006.01) |
| ***G06F 3/0481*** | (2013.01) |
| ***G06F 3/0482*** | (2013.01) |
| ***G06F 3/0484*** | (2013.01) |

(52) U.S. Cl.
CPC .......... *G06F 3/0483* (2013.01); *G06F 3/0485* (2013.01); *G06F 3/0486* (2013.01); *G06F 3/04815* (2013.01); *G06F 3/04842* (2013.01); *G06F 3/04883* (2013.01); *G06F 9/4443* (2013.01)

(56) References Cited

U.S. PATENT DOCUMENTS

| | | | |
|---|---|---|---|
| 5,374,787 | A | 12/1994 | Miller et al. |
| 5,428,730 | A | 6/1995 | Baker et al. |
| 5,463,722 | A | 10/1995 | Venolia |
| 5,510,813 | A | 4/1996 | Makinwa et al. |
| 5,555,354 | A | 9/1996 | Strasnick et al. |
| 5,559,301 | A | 9/1996 | Bryan, Jr. et al. |
| 5,710,896 | A | 1/1998 | Seidl |
| 5,717,438 | A | 2/1998 | Kim et al. |
| 5,793,360 | A | 8/1998 | Fleck et al. |
| 5,793,377 | A | 8/1998 | Moore |
| 5,801,692 | A | 9/1998 | Muzio et al. |
| 5,805,144 | A | 9/1998 | Scholder et al. |
| 5,805,167 | A | 9/1998 | Van Cruyningen |
| 5,809,267 | A | 9/1998 | Moran et al. |
| 5,819,293 | A | 10/1998 | Comer et al. |
| 5,825,352 | A | 10/1998 | Bisset et al. |
| 5,844,560 | A | 12/1998 | Crutcher et al. |
| 5,872,922 | A | 2/1999 | Hogan et al. |
| 5,946,647 | A | 8/1999 | Miller et al. |
| 6,002,397 | A | 12/1999 | Jaaskelainen, Jr. |
| 6,031,989 | A | 2/2000 | Cordell |
| 6,088,019 | A | 7/2000 | Rosenberg |
| 6,088,027 | A | 7/2000 | Konar et al. |
| 6,111,575 | A | 8/2000 | Martinez et al. |
| 6,208,329 | B1 | 3/2001 | Ballare |
| 6,208,340 | B1 | 3/2001 | Amin et al. |
| 6,219,034 | B1 | 4/2001 | Elbing et al. |
| 6,243,080 | B1 | 6/2001 | Moine |
| 6,252,594 | B1 | 6/2001 | Xia et al. |
| 6,396,523 | B1 | 5/2002 | Segal et al. |
| 6,429,846 | B2 | 8/2002 | Rosenberg et al. |
| 6,448,977 | B1 | 9/2002 | Braun et al. |
| 6,459,442 | B1 | 10/2002 | Edwards et al. |
| 6,489,978 | B1 | 12/2002 | Gong et al. |
| 6,512,530 | B1 | 1/2003 | Rzepkowski et al. |
| 6,563,487 | B2 | 5/2003 | Martin et al. |
| 6,567,102 | B2 | 5/2003 | Kung |
| 6,583,798 | B1 | 6/2003 | Hoek et al. |
| 6,590,568 | B1 | 7/2003 | Astala et al. |
| 6,661,438 | B1 | 12/2003 | Shiraishi et al. |
| 6,735,307 | B1 | 5/2004 | Volckers |
| 6,750,890 | B1 | 6/2004 | Sugimoto |
| 6,822,635 | B2 | 11/2004 | Shahoian et al. |
| 6,906,697 | B2 | 6/2005 | Rosenberg |
| 6,919,927 | B1 | 7/2005 | Hyodo |
| 7,138,983 | B2 | 11/2006 | Wakai et al. |
| 7,312,791 | B2 | 12/2007 | Hoshino et al. |
| 7,411,575 | B2 | 8/2008 | Hill et al. |
| 7,479,949 | B2 | 1/2009 | Jobs et al. |
| 7,533,352 | B2 | 5/2009 | Chew et al. |
| 7,552,397 | B2 | 6/2009 | Holecek et al. |
| 7,577,530 | B2 | 8/2009 | Vignalou-Marche |
| 7,614,008 | B2 | 11/2009 | Ording |
| 7,619,616 | B2 | 11/2009 | Rimas Ribikauskas et al. |
| 7,656,413 | B2 | 2/2010 | Khan et al. |
| 7,683,889 | B2 | 3/2010 | Rimas Ribikauskas et al. |
| 7,743,348 | B2 | 6/2010 | Robbins et al. |
| 7,760,187 | B2 | 7/2010 | Kennedy |
| 7,797,642 | B1 | 9/2010 | Karam et al. |
| 7,801,950 | B2 | 9/2010 | Eisenstadt et al. |
| 7,812,826 | B2 | 10/2010 | Ording et al. |
| 7,890,862 | B2 | 2/2011 | Kompe et al. |
| 7,903,090 | B2 | 3/2011 | Soss et al. |
| 7,952,566 | B2 | 5/2011 | Poupyrev et al. |
| 7,956,847 | B2 | 6/2011 | Christie |
| 7,973,778 | B2 | 7/2011 | Chen |
| 8,040,142 | B1 | 10/2011 | Bokma et al. |
| 8,059,104 | B2 | 11/2011 | Shahoian et al. |
| 8,106,856 | B2 | 1/2012 | Matas et al. |
| 8,125,440 | B2 | 2/2012 | Guyot-Sionnest et al. |
| 8,125,492 | B1 | 2/2012 | Wainwright et al. |
| RE43,448 | E | 6/2012 | Kimoto et al. |
| 8,209,628 | B1 | 6/2012 | Davidson |
| 8,271,900 | B2 | 9/2012 | Walizaka et al. |
| 8,363,020 | B2 | 1/2013 | Li et al. |
| 8,390,583 | B2 | 3/2013 | Forutanpour et al. |
| 8,423,089 | B2 | 4/2013 | Son et al. |
| 8,446,376 | B2 | 5/2013 | Levy et al. |
| 8,456,431 | B2 | 6/2013 | Victor |
| 8,466,889 | B2 | 6/2013 | Tong et al. |
| 8,482,535 | B2 | 7/2013 | Pryor |
| 8,508,494 | B2 | 8/2013 | Moore |
| 8,542,205 | B1 | 9/2013 | Keller |
| 8,553,092 | B2 | 10/2013 | Tezuka et al. |
| 8,581,870 | B2 | 11/2013 | Bokma et al. |
| 8,587,542 | B2 | 11/2013 | Moore |
| 8,593,415 | B2 | 11/2013 | Han et al. |
| 8,593,420 | B1 | 11/2013 | Buuck |
| 8,625,882 | B2 | 1/2014 | Backlund et al. |
| 8,638,311 | B2 | 1/2014 | Kan et al. |
| 8,665,227 | B2 | 3/2014 | Gunawan |
| 8,669,945 | B2 | 3/2014 | Coddington |
| 8,698,765 | B1 | 4/2014 | Keller |
| 8,717,305 | B2 | 5/2014 | Williamson et al. |
| 8,743,069 | B2 | 6/2014 | Morton et al. |
| 8,769,431 | B1 | 7/2014 | Prasad |
| 8,773,389 | B1 | 7/2014 | Freed |
| 8,788,964 | B2 | 7/2014 | Shin et al. |
| 8,793,577 | B2 | 7/2014 | Schellingerhout et al. |
| 8,799,816 | B2 | 8/2014 | Wells et al. |
| 8,816,989 | B2 | 8/2014 | Nicholson et al. |
| 8,854,316 | B2 | 10/2014 | Shenfield |
| 8,872,729 | B2 | 10/2014 | Lyons et al. |
| 8,872,773 | B2 | 10/2014 | Mak et al. |
| 8,875,044 | B2 | 10/2014 | Ozawa et al. |
| 8,881,062 | B2 | 11/2014 | Kim et al. |
| 8,914,732 | B2 | 12/2014 | Jun et al. |
| 8,952,987 | B2 | 2/2015 | Momeyer et al. |
| 8,959,430 | B1 | 2/2015 | Spivak et al. |
| 8,976,128 | B2 | 3/2015 | Moore |
| 9,026,932 | B1 | 5/2015 | Dixon |
| 9,030,419 | B1 | 5/2015 | Freed |
| 9,030,436 | B2 | 5/2015 | Ikeda |
| 9,046,999 | B1 | 6/2015 | Teller et al. |
| 9,063,563 | B1 | 6/2015 | Gray et al. |
| 9,069,460 | B2 | 6/2015 | Moore |
| 9,086,755 | B2 | 7/2015 | Cho et al. |
| 9,092,058 | B2 | 7/2015 | Kasahara et al. |
| 9,098,188 | B2 | 8/2015 | Kim |
| 9,116,571 | B2 | 8/2015 | Zeliff et al. |
| 9,122,364 | B2 | 9/2015 | Kuwabara et al. |
| 9,146,914 | B1 | 9/2015 | Dhaundiyal |
| 9,148,618 | B2 | 9/2015 | Matas et al. |
| 9,164,779 | B2 | 10/2015 | Brakensiek et al. |
| 9,170,607 | B2 | 10/2015 | Bose et al. |
| 9,170,649 | B2 | 10/2015 | Ronkainen |
| 9,218,105 | B2 | 12/2015 | Mansson et al. |
| 9,244,562 | B1 | 1/2016 | Rosenberg et al. |

(56) References Cited

U.S. PATENT DOCUMENTS

| | | | |
|---|---|---|---|
| 9,244,576 | B1 | 1/2016 | Vadagave et al. |
| 9,244,601 | B2 | 1/2016 | Kim et al. |
| 9,246,487 | B2 | 1/2016 | Casparian et al. |
| 9,262,002 | B2 | 2/2016 | Momeyer et al. |
| 9,304,668 | B2 | 4/2016 | Rezende et al. |
| 9,307,112 | B2 | 4/2016 | Molgaard et al. |
| 9,349,552 | B2 | 5/2016 | Huska et al. |
| 9,361,018 | B2 | 6/2016 | Defazio et al. |
| 9,389,718 | B1 | 7/2016 | Letourneur |
| 9,389,722 | B2 | 7/2016 | Matsuki et al. |
| 9,400,581 | B2 | 7/2016 | Bokma et al. |
| 9,405,367 | B2 | 8/2016 | Jung et al. |
| 9,417,754 | B2 | 8/2016 | Smith |
| 9,423,938 | B1 | 8/2016 | Morris |
| 9,436,344 | B2 | 9/2016 | Kuwabara et al. |
| 9,448,694 | B2 | 9/2016 | Sharma et al. |
| 9,451,230 | B1 | 9/2016 | Henderson et al. |
| 9,471,145 | B2 | 10/2016 | Langlois et al. |
| 9,477,393 | B2 | 10/2016 | Zambetti et al. |
| 9,542,013 | B2 | 1/2017 | Dearman et al. |
| 9,547,525 | B1 | 1/2017 | Trainor et al. |
| 9,569,093 | B2 | 2/2017 | Lipman et al. |
| 9,600,114 | B2 | 3/2017 | Milam et al. |
| 9,600,116 | B2 | 3/2017 | Tao et al. |
| 9,671,943 | B2 | 6/2017 | Van der Velden |
| 9,733,716 | B2 | 8/2017 | Shaffer |
| 9,760,241 | B1 | 9/2017 | Lewbel |
| 2001/0024195 | A1 | 9/2001 | Hayakawa et al. |
| 2001/0045965 | A1 | 11/2001 | Orbanes et al. |
| 2002/0008691 | A1 | 1/2002 | Hanajima et al. |
| 2002/0015064 | A1 | 2/2002 | Robotham et al. |
| 2002/0109678 | A1 | 8/2002 | Marmolin et al. |
| 2002/0140680 | A1 | 10/2002 | Lu |
| 2002/0140740 | A1 | 10/2002 | Chen |
| 2002/0180763 | A1 | 12/2002 | Kung |
| 2002/0186257 | A1 | 12/2002 | Cadiz et al. |
| 2003/0001869 | A1 | 1/2003 | Nissen |
| 2003/0086496 | A1 | 5/2003 | Zhang et al. |
| 2003/0112269 | A1 | 6/2003 | Lentz et al. |
| 2003/0117440 | A1 | 6/2003 | Hellyar et al. |
| 2003/0122779 | A1 | 7/2003 | Martin et al. |
| 2003/0151589 | A1 | 8/2003 | Bensen et al. |
| 2003/0184574 | A1 | 10/2003 | Phillips et al. |
| 2003/0189552 | A1 | 10/2003 | Chuang et al. |
| 2003/0189647 | A1 | 10/2003 | Kang |
| 2003/0206169 | A1 | 11/2003 | Springer et al. |
| 2003/0222915 | A1 | 12/2003 | Marion et al. |
| 2004/0021643 | A1 | 2/2004 | Hoshino et al. |
| 2004/0056849 | A1 | 3/2004 | Lohbihler et al. |
| 2004/0108995 | A1 | 6/2004 | Hoshino et al. |
| 2004/0138849 | A1 | 7/2004 | Schmidt et al. |
| 2004/0150631 | A1 | 8/2004 | Fleck et al. |
| 2004/0150644 | A1 | 8/2004 | Kincaid et al. |
| 2004/0174399 | A1 | 9/2004 | Wu et al. |
| 2004/0219969 | A1 | 11/2004 | Casey et al. |
| 2004/0267877 | A1 | 12/2004 | Shiparo et al. |
| 2005/0012723 | A1 | 1/2005 | Pallakoff |
| 2005/0039141 | A1 | 2/2005 | Burke et al. |
| 2005/0110769 | A1 | 5/2005 | DaCosta et al. |
| 2005/0114785 | A1 | 5/2005 | Finnigan et al. |
| 2005/0125742 | A1 | 6/2005 | Grotjohn et al. |
| 2005/0132297 | A1 | 6/2005 | Milic-Frayling et al. |
| 2005/0134578 | A1 | 6/2005 | Chambers et al. |
| 2005/0183017 | A1 | 8/2005 | Cain |
| 2005/0190280 | A1 | 9/2005 | Haas et al. |
| 2005/0204295 | A1 | 9/2005 | Voorhees et al. |
| 2005/0223338 | A1 | 10/2005 | Partanen |
| 2005/0229112 | A1 | 10/2005 | Clay et al. |
| 2005/0289476 | A1 | 12/2005 | Tokkonen |
| 2006/0022955 | A1 | 2/2006 | Kennedy |
| 2006/0022956 | A1 | 2/2006 | Lengeling et al. |
| 2006/0026536 | A1 | 2/2006 | Hotelling et al. |
| 2006/0036971 | A1 | 2/2006 | Mendel et al. |
| 2006/0059436 | A1 | 3/2006 | Nurmi |
| 2006/0067677 | A1 | 3/2006 | Tokiwa et al. |
| 2006/0101347 | A1 | 5/2006 | Runov et al. |
| 2006/0109252 | A1 | 5/2006 | Kolmykov-Zotov et al. |
| 2006/0109256 | A1 | 5/2006 | Grant et al. |
| 2006/0119586 | A1 | 6/2006 | Grant et al. |
| 2006/0132455 | A1 | 6/2006 | Rimas-Ribikauskas et al. |
| 2006/0132456 | A1 | 6/2006 | Anson |
| 2006/0132457 | A1 | 6/2006 | Rimas-Ribikauskas et al. |
| 2006/0136834 | A1 | 6/2006 | Cao et al. |
| 2006/0136845 | A1 | 6/2006 | Rimas-Ribikauskas et al. |
| 2006/0161861 | A1 | 7/2006 | Holecek et al. |
| 2006/0161870 | A1 | 7/2006 | Hotelling et al. |
| 2006/0195438 | A1 | 8/2006 | Galuten |
| 2006/0197753 | A1 | 9/2006 | Hotelling |
| 2006/0212812 | A1 | 9/2006 | Simmons et al. |
| 2006/0213754 | A1 | 9/2006 | Jarrett et al. |
| 2006/0224989 | A1 | 10/2006 | Pettiross et al. |
| 2006/0233248 | A1 | 10/2006 | Rynderman et al. |
| 2006/0274042 | A1 | 12/2006 | Krah et al. |
| 2006/0277469 | A1 | 12/2006 | Chaudhri et al. |
| 2006/0282778 | A1 | 12/2006 | Barsness et al. |
| 2006/0284858 | A1 | 12/2006 | Rekimoto |
| 2006/0290681 | A1 | 12/2006 | Ho et al. |
| 2007/0024595 | A1 | 2/2007 | Baker et al. |
| 2007/0024646 | A1 | 2/2007 | Saarinen et al. |
| 2007/0080953 | A1 | 4/2007 | Lii |
| 2007/0113681 | A1 | 5/2007 | Nishimura et al. |
| 2007/0120835 | A1 | 5/2007 | Sato |
| 2007/0124699 | A1 | 5/2007 | Michaels |
| 2007/0152959 | A1 | 7/2007 | Peters |
| 2007/0157173 | A1 | 7/2007 | Klein et al. |
| 2007/0168369 | A1 | 7/2007 | Bruns |
| 2007/0168890 | A1 | 7/2007 | Zhao et al. |
| 2007/0176904 | A1 | 8/2007 | Russo |
| 2007/0186178 | A1 | 8/2007 | Schiller |
| 2007/0222768 | A1 | 9/2007 | Geurts et al. |
| 2007/0229455 | A1 | 10/2007 | Martin et al. |
| 2007/0229464 | A1 | 10/2007 | Hotelling et al. |
| 2007/0236450 | A1 | 10/2007 | Colgate et al. |
| 2007/0236477 | A1 | 10/2007 | Ryu et al. |
| 2007/0245241 | A1 | 10/2007 | Bertram et al. |
| 2007/0257821 | A1 | 11/2007 | Son et al. |
| 2007/0270182 | A1 | 11/2007 | Gulliksson et al. |
| 2007/0294295 | A1 | 12/2007 | Finkelstein et al. |
| 2007/0299923 | A1 | 12/2007 | Skelly et al. |
| 2008/0001924 | A1 | 1/2008 | dos los Reyes et al. |
| 2008/0024459 | A1 | 1/2008 | Poupyrev et al. |
| 2008/0034306 | A1 | 2/2008 | Ording |
| 2008/0034331 | A1 | 2/2008 | Josephsoon et al. |
| 2008/0036743 | A1 | 2/2008 | Westerman et al. |
| 2008/0051989 | A1 | 2/2008 | Welsh |
| 2008/0052945 | A1 | 3/2008 | Matas et al. |
| 2008/0066010 | A1 | 3/2008 | Brodersen et al. |
| 2008/0094367 | A1 | 4/2008 | Van De Ven et al. |
| 2008/0094398 | A1 | 4/2008 | Ng et al. |
| 2008/0106523 | A1 | 5/2008 | Conrad |
| 2008/0136790 | A1 | 6/2008 | Hio |
| 2008/0155415 | A1 | 6/2008 | Yoon et al. |
| 2008/0163119 | A1 | 7/2008 | Kim et al. |
| 2008/0168395 | A1 | 7/2008 | Ording et al. |
| 2008/0168403 | A1 | 7/2008 | Westerman et al. |
| 2008/0168404 | A1 | 7/2008 | Ording |
| 2008/0202824 | A1 | 8/2008 | Philipp et al. |
| 2008/0204427 | A1 | 8/2008 | Heesemans et al. |
| 2008/0219493 | A1 | 9/2008 | Tadmor |
| 2008/0222569 | A1 | 9/2008 | Champion et al. |
| 2008/0244448 | A1 | 10/2008 | Goering et al. |
| 2008/0259046 | A1 | 10/2008 | Carsanaro |
| 2008/0263452 | A1 | 10/2008 | Tomkins |
| 2008/0284866 | A1 | 11/2008 | Mizutani |
| 2008/0294984 | A1 | 11/2008 | Ramsay et al. |
| 2008/0297475 | A1 | 12/2008 | Woolf et al. |
| 2008/0303799 | A1 | 12/2008 | Schwesig et al. |
| 2008/0307335 | A1 | 12/2008 | Chaudhri et al. |
| 2008/0307359 | A1 | 12/2008 | Louch et al. |
| 2008/0320419 | A1 | 12/2008 | Matas et al. |
| 2009/0007017 | A1 | 1/2009 | Anzures et al. |
| 2009/0037846 | A1 | 2/2009 | Spalink et al. |
| 2009/0046110 | A1 | 2/2009 | Sadler et al. |
| 2009/0058828 | A1 | 3/2009 | Jiang et al. |

(56) References Cited

U.S. PATENT DOCUMENTS

2009/0066668 A1 3/2009 Kim et al.
2009/0073118 A1 3/2009 Yamaji et al.
2009/0083665 A1 3/2009 Anttila et al.
2009/0085878 A1 4/2009 Heubel et al.
2009/0085881 A1 4/2009 Keam
2009/0085886 A1 4/2009 Huang et al.
2009/0089293 A1 4/2009 Garritano et al.
2009/0100343 A1 4/2009 Lee et al.
2009/0102804 A1 4/2009 Wong et al.
2009/0102805 A1 4/2009 Meijer et al.
2009/0140985 A1 6/2009 Liu
2009/0158198 A1 6/2009 Hayter et al.
2009/0160793 A1 6/2009 Rekimoto
2009/0160814 A1 6/2009 Li et al.
2009/0167507 A1 7/2009 Maenpaa
2009/0167508 A1 7/2009 Fadell et al.
2009/0167704 A1 7/2009 Terlizzi et al.
2009/0169061 A1 7/2009 Anderson et al.
2009/0225037 A1 9/2009 Williamson et al.
2009/0237374 A1 9/2009 Li et al.
2009/0247112 A1 10/2009 Lundy et al.
2009/0247230 A1 10/2009 Lundy et al.
2009/0256947 A1 10/2009 Ciurea et al.
2009/0267906 A1 10/2009 Schroderus
2009/0280860 A1 11/2009 Dahlke
2009/0282360 A1 11/2009 Park et al.
2009/0288032 A1 11/2009 Chang et al.
2009/0293007 A1* 11/2009 Duarte .................. G06F 3/0481 715/767
2009/0293009 A1 11/2009 Meserth et al.
2009/0303187 A1 12/2009 Pallakoff
2009/0307633 A1 12/2009 Haughay, Jr. et al.
2009/0322893 A1 12/2009 Stallings et al.
2010/0007926 A1 1/2010 Imaizumi et al.
2010/0011304 A1 1/2010 Van Os
2010/0013613 A1 1/2010 Weston
2010/0013777 A1 1/2010 Baudisch et al.
2010/0017710 A1 1/2010 Kim et al.
2010/0026640 A1 2/2010 Kim et al.
2010/0026647 A1 2/2010 Abe et al.
2010/0039446 A1 2/2010 Hillis et al.
2010/0044121 A1 2/2010 Simon et al.
2010/0057235 A1 3/2010 Wang et al.
2010/0058231 A1 3/2010 Duarte et al.
2010/0070908 A1 3/2010 Mori et al.
2010/0073329 A1 3/2010 Raman et al.
2010/0083116 A1 4/2010 Akifusa et al.
2010/0085302 A1 4/2010 Fairweather et al.
2010/0085314 A1 4/2010 Kwok
2010/0085317 A1 4/2010 Park et al.
2010/0088596 A1 4/2010 Griffin et al.
2010/0088639 A1 4/2010 Yach et al.
2010/0111434 A1 5/2010 Madden
2010/0127983 A1 5/2010 Irani et al.
2010/0128002 A1 5/2010 Stacy et al.
2010/0138776 A1 6/2010 Korhonen
2010/0148999 A1 6/2010 Casparian et al.
2010/0149096 A1 6/2010 Migos et al.
2010/0156813 A1 6/2010 Duarte et al.
2010/0156818 A1 6/2010 Burrough et al.
2010/0156823 A1 6/2010 Paleczny et al.
2010/0156825 A1 6/2010 Sohn et al.
2010/0171713 A1 7/2010 Kwok et al.
2010/0175023 A1 7/2010 Gatlin et al.
2010/0180225 A1 7/2010 Chiba et al.
2010/0199227 A1 8/2010 Xiao et al.
2010/0211872 A1 8/2010 Rolston et al.
2010/0225604 A1 9/2010 Homma et al.
2010/0231534 A1 9/2010 Chaudhri et al.
2010/0235726 A1 9/2010 Ording et al.
2010/0235746 A1 9/2010 Anzures
2010/0251168 A1 9/2010 Fujita et al.
2010/0271312 A1 10/2010 Alameh et al.
2010/0271500 A1 10/2010 Park et al.
2010/0277419 A1 11/2010 Ganey et al.
2010/0277496 A1 11/2010 Kawanishi et al.
2010/0281385 A1 11/2010 Meaney et al.
2010/0289807 A1 11/2010 Yu et al.
2010/0302177 A1 12/2010 Kim et al.
2010/0302179 A1 12/2010 Ahn et al.
2010/0306702 A1 12/2010 Warner
2010/0308983 A1 12/2010 Conte et al.
2010/0309147 A1 12/2010 Fleizach et al.
2010/0313124 A1 12/2010 Privault et al.
2010/0313156 A1 12/2010 Louch et al.
2010/0313158 A1 12/2010 Lee et al.
2010/0313166 A1 12/2010 Nakayama et al.
2010/0315417 A1 12/2010 Cho et al.
2010/0315438 A1 12/2010 Horodezky et al.
2010/0321301 A1 12/2010 Casparian et al.
2010/0325578 A1 12/2010 Mital et al.
2011/0010626 A1 1/2011 Fino et al.
2011/0018695 A1 1/2011 Bells et al.
2011/0035145 A1 2/2011 Yamasaki
2011/0050588 A1 3/2011 Li et al.
2011/0050591 A1 3/2011 Kim et al.
2011/0050594 A1* 3/2011 Kim .................. G06F 3/04847 345/173
2011/0050629 A1 3/2011 Homma et al.
2011/0050630 A1 3/2011 Ikeda
2011/0050653 A1 3/2011 Miyazawa et al.
2011/0054837 A1 3/2011 Ikeda
2011/0055135 A1 3/2011 Dawson et al.
2011/0055741 A1 3/2011 Jeon et al.
2011/0057886 A1 3/2011 Ng et al.
2011/0057903 A1 3/2011 Yamano et al.
2011/0061029 A1 3/2011 Yeh et al.
2011/0063248 A1 3/2011 Yoon
2011/0069012 A1 3/2011 Martensson
2011/0069016 A1 3/2011 Victor
2011/0074697 A1 3/2011 Rapp et al.
2011/0080350 A1 4/2011 Almalki et al.
2011/0084910 A1 4/2011 Almalki et al.
2011/0087982 A1 4/2011 McCann et al.
2011/0087983 A1 4/2011 Shim
2011/0093815 A1 4/2011 Gobeil
2011/0093817 A1 4/2011 Song et al.
2011/0107272 A1 5/2011 Aquilar
2011/0116716 A1 5/2011 Kwon et al.
2011/0126139 A1 5/2011 Jeong et al.
2011/0138295 A1 6/2011 Momchilov et al.
2011/0141031 A1 6/2011 McCullough et al.
2011/0141052 A1 6/2011 Bernstein et al.
2011/0144777 A1 6/2011 Firkins et al.
2011/0145752 A1 6/2011 Fagans
2011/0145753 A1 6/2011 Prakash
2011/0145764 A1 6/2011 Higuchi et al.
2011/0149138 A1 6/2011 Watkins
2011/0163971 A1 7/2011 Wagner et al.
2011/0164042 A1 7/2011 Chaudhri
2011/0169765 A1 7/2011 Aono
2011/0175830 A1 7/2011 Miyazawa et al.
2011/0179368 A1 7/2011 King et al.
2011/0179381 A1 7/2011 King
2011/0181538 A1 7/2011 Aono
2011/0185299 A1 7/2011 Hinckley et al.
2011/0185300 A1 7/2011 Hinckley et al.
2011/0185316 A1 7/2011 Reid et al.
2011/0193809 A1 8/2011 Walley et al.
2011/0193881 A1 8/2011 Rydenhag
2011/0197160 A1 8/2011 Kim et al.
2011/0201387 A1 8/2011 Paek et al.
2011/0202834 A1 8/2011 Mandryk et al.
2011/0202853 A1 8/2011 Mujkic
2011/0202879 A1 8/2011 Stovicek et al.
2011/0205163 A1 8/2011 Hinckley et al.
2011/0209088 A1 8/2011 Hinckley et al.
2011/0209093 A1 8/2011 Hinckley et al.
2011/0209097 A1 8/2011 Hinckley et al.
2011/0209099 A1 8/2011 Hinckley et al.
2011/0209104 A1 8/2011 Hinckley et al.
2011/0210931 A1 9/2011 Shai
2011/0215914 A1 9/2011 Edwards
2011/0221684 A1 9/2011 Rydenhag

(56) References Cited

U.S. PATENT DOCUMENTS

| | | | |
|---|---|---|---|
| 2011/0221776 | A1 | 9/2011 | Shimotani et al. |
| 2011/0231789 | A1 | 9/2011 | Bukurak et al. |
| 2011/0238690 | A1 | 9/2011 | Arrasvouri et al. |
| 2011/0239110 | A1 | 9/2011 | Garrett et al. |
| 2011/0242029 | A1 | 10/2011 | Kasahara et al. |
| 2011/0246877 | A1 | 10/2011 | Kwak et al. |
| 2011/0248916 | A1 | 10/2011 | Griffin et al. |
| 2011/0248948 | A1 | 10/2011 | Griffin et al. |
| 2011/0252357 | A1* | 10/2011 | Chaudhri ............ G06F 3/04883 715/780 |
| 2011/0252362 | A1 | 10/2011 | Cho et al. |
| 2011/0258537 | A1 | 10/2011 | Rives et al. |
| 2011/0263298 | A1 | 10/2011 | Park |
| 2011/0267530 | A1 | 11/2011 | Chun |
| 2011/0279381 | A1 | 11/2011 | Tong et al. |
| 2011/0279395 | A1 | 11/2011 | Kuwabara et al. |
| 2011/0279852 | A1 | 11/2011 | Oda et al. |
| 2011/0285656 | A1 | 11/2011 | Yaksick et al. |
| 2011/0285659 | A1 | 11/2011 | Kuwabara et al. |
| 2011/0291945 | A1 | 12/2011 | Ewing, Jr. et al. |
| 2011/0291951 | A1 | 12/2011 | Tong |
| 2011/0296351 | A1 | 12/2011 | Ewing, Jr. et al. |
| 2011/0304559 | A1 | 12/2011 | Pasquero |
| 2011/0304577 | A1 | 12/2011 | Brown et al. |
| 2011/0310049 | A1 | 12/2011 | Homma et al. |
| 2012/0005622 | A1 | 1/2012 | Park et al. |
| 2012/0011437 | A1 | 1/2012 | James et al. |
| 2012/0013541 | A1 | 1/2012 | Boka et al. |
| 2012/0013542 | A1 | 1/2012 | Shenfield |
| 2012/0019448 | A1 | 1/2012 | Pitkanen et al. |
| 2012/0026110 | A1 | 2/2012 | Yamano |
| 2012/0036441 | A1 | 2/2012 | Basir et al. |
| 2012/0036556 | A1 | 2/2012 | LeBeau et al. |
| 2012/0038580 | A1 | 2/2012 | Sasaki |
| 2012/0044153 | A1 | 2/2012 | Arrasvouri et al. |
| 2012/0056837 | A1 | 3/2012 | Park et al. |
| 2012/0056848 | A1 | 3/2012 | Yamano et al. |
| 2012/0062564 | A1 | 3/2012 | Miyashita et al. |
| 2012/0062604 | A1 | 3/2012 | Lobo |
| 2012/0062732 | A1 | 3/2012 | Marman et al. |
| 2012/0066630 | A1 | 3/2012 | Kim et al. |
| 2012/0066648 | A1 | 3/2012 | Rolleston et al. |
| 2012/0081375 | A1 | 4/2012 | Robert et al. |
| 2012/0084689 | A1 | 4/2012 | Ledet et al. |
| 2012/0084713 | A1 | 4/2012 | Desai et al. |
| 2012/0089932 | A1 | 4/2012 | Kano et al. |
| 2012/0089942 | A1 | 4/2012 | Gammon |
| 2012/0089951 | A1 | 4/2012 | Cassidy |
| 2012/0096393 | A1 | 4/2012 | Shim et al. |
| 2012/0098780 | A1 | 4/2012 | Fujisawa et al. |
| 2012/0102437 | A1 | 4/2012 | Worley et al. |
| 2012/0105358 | A1 | 5/2012 | Momeyer et al. |
| 2012/0105367 | A1 | 5/2012 | Son et al. |
| 2012/0106852 | A1 | 5/2012 | Khawand et al. |
| 2012/0113007 | A1 | 5/2012 | Koch et al. |
| 2012/0113023 | A1 | 5/2012 | Koch et al. |
| 2012/0126962 | A1 | 5/2012 | Ujii et al. |
| 2012/0131495 | A1 | 5/2012 | Goossens et al. |
| 2012/0139864 | A1 | 6/2012 | Sleeman et al. |
| 2012/0146945 | A1 | 6/2012 | Miyazawa et al. |
| 2012/0147052 | A1 | 6/2012 | Homma et al. |
| 2012/0154328 | A1 | 6/2012 | Kono |
| 2012/0159380 | A1 | 6/2012 | Kocienda et al. |
| 2012/0169646 | A1 | 7/2012 | Berkes et al. |
| 2012/0169716 | A1 | 7/2012 | Mihara |
| 2012/0176403 | A1 | 7/2012 | Cha et al. |
| 2012/0179967 | A1 | 7/2012 | Hayes |
| 2012/0182226 | A1 | 7/2012 | Tuli |
| 2012/0183271 | A1 | 7/2012 | Forutanpour et al. |
| 2012/0206393 | A1 | 8/2012 | Hillis et al. |
| 2012/0216114 | A1 | 8/2012 | Privault et al. |
| 2012/0218203 | A1 | 8/2012 | Kanki |
| 2012/0235912 | A1 | 9/2012 | Laubach |
| 2012/0240044 | A1 | 9/2012 | Johnson et al. |
| 2012/0249575 | A1 | 10/2012 | Krolczyk et al. |
| 2012/0249853 | A1 | 10/2012 | Krolczyk et al. |
| 2012/0256846 | A1 | 10/2012 | Mak |
| 2012/0256847 | A1 | 10/2012 | Mak et al. |
| 2012/0256857 | A1 | 10/2012 | Mak |
| 2012/0257071 | A1 | 10/2012 | Prentice |
| 2012/0260220 | A1 | 10/2012 | Griffin |
| 2012/0274591 | A1 | 11/2012 | Rimas-Ribikauskas et al. |
| 2012/0274662 | A1 | 11/2012 | Kim et al. |
| 2012/0284673 | A1 | 11/2012 | Lamb et al. |
| 2012/0293449 | A1 | 11/2012 | Dietz |
| 2012/0293551 | A1 | 11/2012 | Momeyer et al. |
| 2012/0304108 | A1 | 11/2012 | Jarrett et al. |
| 2012/0304132 | A1 | 11/2012 | Sareen et al. |
| 2012/0304133 | A1 | 11/2012 | Nan et al. |
| 2012/0306748 | A1 | 12/2012 | Fleizach et al. |
| 2012/0306764 | A1 | 12/2012 | Kamibeppu |
| 2012/0306765 | A1 | 12/2012 | Moore |
| 2012/0306766 | A1 | 12/2012 | Moore |
| 2012/0306772 | A1 | 12/2012 | Tan et al. |
| 2012/0306778 | A1 | 12/2012 | Wheeldreyer et al. |
| 2012/0311429 | A1 | 12/2012 | Decker et al. |
| 2012/0311437 | A1 | 12/2012 | Weeldreyer et al. |
| 2012/0311498 | A1 | 12/2012 | Kluttz et al. |
| 2013/0002561 | A1 | 1/2013 | Wakasa |
| 2013/0016042 | A1 | 1/2013 | Makinen et al. |
| 2013/0016122 | A1 | 1/2013 | Bhatt et al. |
| 2013/0019158 | A1 | 1/2013 | Watanabe |
| 2013/0019174 | A1 | 1/2013 | Gil et al. |
| 2013/0031514 | A1 | 1/2013 | Gabbert |
| 2013/0036386 | A1 | 2/2013 | Park et al. |
| 2013/0044062 | A1 | 2/2013 | Bose et al. |
| 2013/0047100 | A1 | 2/2013 | Kroeger et al. |
| 2013/0050131 | A1 | 2/2013 | Lee et al. |
| 2013/0050143 | A1 | 2/2013 | Kim et al. |
| 2013/0061172 | A1 | 3/2013 | Huang et al. |
| 2013/0063389 | A1 | 3/2013 | Moore |
| 2013/0067383 | A1 | 3/2013 | Kataoka et al. |
| 2013/0067513 | A1 | 3/2013 | Takami |
| 2013/0067527 | A1 | 3/2013 | Ashbook et al. |
| 2013/0077804 | A1 | 3/2013 | Glebe et al. |
| 2013/0082824 | A1 | 4/2013 | Colley |
| 2013/0086056 | A1 | 4/2013 | Dyor et al. |
| 2013/0093691 | A1 | 4/2013 | Moosavi |
| 2013/0097520 | A1 | 4/2013 | Lewin et al. |
| 2013/0097521 | A1 | 4/2013 | Lewin et al. |
| 2013/0097534 | A1 | 4/2013 | Lewin et al. |
| 2013/0097539 | A1 | 4/2013 | Mansson et al. |
| 2013/0097556 | A1 | 4/2013 | Louch |
| 2013/0097562 | A1 | 4/2013 | Kermoian et al. |
| 2013/0111398 | A1 | 5/2013 | Lu et al. |
| 2013/0113720 | A1 | 5/2013 | Van Eerd et al. |
| 2013/0120295 | A1 | 5/2013 | Kim et al. |
| 2013/0120306 | A1 | 5/2013 | Furukawa |
| 2013/0135243 | A1 | 5/2013 | Hirsch et al. |
| 2013/0135499 | A1 | 5/2013 | Song |
| 2013/0141364 | A1 | 6/2013 | Lynn et al. |
| 2013/0141396 | A1 | 6/2013 | Lynn et al. |
| 2013/0145313 | A1 | 6/2013 | Roh et al. |
| 2013/0154948 | A1 | 6/2013 | Schediwy et al. |
| 2013/0154959 | A1 | 6/2013 | Lindsay et al. |
| 2013/0155018 | A1 | 6/2013 | Dagdeviren |
| 2013/0159893 | A1 | 6/2013 | Lewis et al. |
| 2013/0162667 | A1 | 6/2013 | Eskolin et al. |
| 2013/0169549 | A1 | 7/2013 | Seymour et al. |
| 2013/0174049 | A1 | 7/2013 | Townsend et al. |
| 2013/0174089 | A1 | 7/2013 | Ki |
| 2013/0174094 | A1 | 7/2013 | Heo et al. |
| 2013/0174179 | A1* | 7/2013 | Park ..................... G06F 9/4843 718/107 |
| 2013/0179840 | A1 | 7/2013 | Fisher et al. |
| 2013/0191791 | A1 | 7/2013 | Rydenhag et al. |
| 2013/0194217 | A1 | 8/2013 | Lee et al. |
| 2013/0198690 | A1 | 8/2013 | Barsoum et al. |
| 2013/0212541 | A1 | 8/2013 | Dolenc et al. |
| 2013/0215079 | A1 | 8/2013 | Johnson et al. |
| 2013/0222274 | A1 | 8/2013 | Mori et al. |
| 2013/0222671 | A1 | 8/2013 | Tseng et al. |
| 2013/0227419 | A1 | 8/2013 | Lee et al. |
| 2013/0227450 | A1 | 8/2013 | Na et al. |

(56) References Cited

U.S. PATENT DOCUMENTS

2013/0232402 A1 9/2013 Lu et al.
2013/0234929 A1 9/2013 Libin
2013/0239057 A1 9/2013 Ubillos et al.
2013/0249814 A1 9/2013 Zeng
2013/0257793 A1 10/2013 Zeliff et al.
2013/0257817 A1 10/2013 Yliaho
2013/0265246 A1 10/2013 Tae
2013/0268875 A1 10/2013 Han et al.
2013/0278520 A1 10/2013 Weng et al.
2013/0305184 A1 11/2013 Kim et al.
2013/0307792 A1 11/2013 Andres
2013/0321457 A1 12/2013 Bauermeister et al.
2013/0325342 A1 12/2013 Pylappan et al.
2013/0326420 A1 12/2013 Liu et al.
2013/0326421 A1 12/2013 Jo
2013/0328770 A1 12/2013 Parham
2013/0332892 A1 12/2013 Matsuki
2013/0339909 A1 12/2013 Ha
2014/0002355 A1 1/2014 Lee et al.
2014/0002374 A1 1/2014 Hunt et al.
2014/0002386 A1 1/2014 Rosenberg et al.
2014/0026098 A1 1/2014 Gilman
2014/0028571 A1 1/2014 St. Clair
2014/0028601 A1 1/2014 Moore
2014/0049491 A1 2/2014 Nagar et al.
2014/0055367 A1 2/2014 Dearman et al.
2014/0055377 A1 2/2014 Kim
2014/0059460 A1 2/2014 Ho
2014/0059485 A1 2/2014 Lehrian et al.
2014/0063316 A1 3/2014 Lee et al.
2014/0072281 A1 3/2014 Cho et al.
2014/0078318 A1 3/2014 Alameh
2014/0078343 A1 3/2014 Dai et al.
2014/0082536 A1 3/2014 Costa et al.
2014/0092025 A1 4/2014 Pala et al.
2014/0092030 A1 4/2014 Van der Velden
2014/0108936 A1 4/2014 Khosropour et al.
2014/0109016 A1 4/2014 Ouyang et al.
2014/0111456 A1 4/2014 Kashiwa et al.
2014/0111670 A1 4/2014 Lord et al.
2014/0118268 A1 5/2014 Kuscher
2014/0139471 A1 5/2014 Matsuki
2014/0152581 A1 6/2014 Case et al.
2014/0157203 A1 6/2014 Jeon et al.
2014/0160063 A1 6/2014 Yairi et al.
2014/0160073 A1 6/2014 Matsuki
2014/0164966 A1 6/2014 Kim et al.
2014/0165006 A1 6/2014 Chaudhri et al.
2014/0168093 A1 6/2014 Lawrence
2014/0168153 A1 6/2014 Deichmann et al.
2014/0173517 A1 6/2014 Chaudhri
2014/0184526 A1 7/2014 Cho
2014/0201660 A1 7/2014 Clausen et al.
2014/0210758 A1 7/2014 Park et al.
2014/0210798 A1 7/2014 Wilson
2014/0229888 A1 8/2014 Ko et al.
2014/0245202 A1 8/2014 Yoon et al.
2014/0245367 A1 8/2014 Sasaki et al.
2014/0267114 A1 9/2014 Lisseman et al.
2014/0267135 A1 9/2014 Chhabra
2014/0267362 A1 9/2014 Kocienda et al.
2014/0282084 A1 9/2014 Murarka et al.
2014/0282214 A1* 9/2014 Shirzadi .............. G06F 3/04883 715/781
2014/0300569 A1 10/2014 Matsuki et al.
2014/0304651 A1 10/2014 Johansson et al.
2014/0306897 A1 10/2014 Cueto
2014/0306899 A1 10/2014 Hicks
2014/0310638 A1 10/2014 Lee et al.
2014/0313130 A1 10/2014 Yamano et al.
2014/0333551 A1 11/2014 Kim et al.
2014/0333561 A1 11/2014 Bull et al.
2014/0344765 A1 11/2014 Hicks et al.
2014/0354845 A1 12/2014 Molgaard et al.
2014/0354850 A1 12/2014 Kosaka et al.
2014/0359528 A1 12/2014 Murata
2014/0380247 A1 12/2014 Tecarro et al.
2015/0015763 A1 1/2015 Lee et al.
2015/0020036 A1 1/2015 Kim et al.
2015/0026584 A1 1/2015 Kobayakov et al.
2015/0026592 A1 1/2015 Mohammed et al.
2015/0029149 A1 1/2015 Andersson et al.
2015/0033184 A1 1/2015 Kim et al.
2015/0042588 A1 2/2015 Park
2015/0046876 A1 2/2015 Goldenberg
2015/0049033 A1 2/2015 Kim et al.
2015/0058723 A1 2/2015 Cieplinski et al.
2015/0067559 A1 2/2015 Missig et al.
2015/0062046 A1 3/2015 Cho et al.
2015/0062052 A1 3/2015 Bernstein et al.
2015/0062068 A1 3/2015 Shih et al.
2015/0067495 A1 3/2015 Bernstein et al.
2015/0067496 A1 3/2015 Missig et al.
2015/0067497 A1 3/2015 Cieplinski et al.
2015/0067513 A1 3/2015 Zambetti et al.
2015/0067519 A1 3/2015 Missig et al.
2015/0067534 A1 3/2015 Choi et al.
2015/0067560 A1 3/2015 Cieplinski et al.
2015/0067596 A1 3/2015 Brown et al.
2015/0067601 A1 3/2015 Bernstein et al.
2015/0067602 A1 3/2015 Bernstein et al.
2015/0067605 A1 3/2015 Zambetti et al.
2015/0071547 A1 3/2015 Keating et al.
2015/0116205 A1 4/2015 Westerman et al.
2015/0121225 A1 4/2015 Somasundaram et al.
2015/0067563 A1 5/2015 Bernstein et al.
2015/0128092 A1 5/2015 Lee et al.
2015/0135109 A1 5/2015 Zambetti et al.
2015/0138126 A1 5/2015 Westerman
2015/0138155 A1 5/2015 Bernstein et al.
2015/0139605 A1 5/2015 Wiklof
2015/0143273 A1 5/2015 Bernstein et al.
2015/0143284 A1 5/2015 Bennett et al.
2015/0149899 A1 5/2015 Bernstein et al.
2015/0149964 A1 5/2015 Bernstein et al.
2015/0149967 A1 5/2015 Bernstein et al.
2015/0153929 A1 6/2015 Bernstein et al.
2015/0160729 A1 6/2015 Nakagawa
2015/0185840 A1 7/2015 Golyshko et al.
2015/0193099 A1 7/2015 Murphy
2015/0193951 A1 7/2015 Lee et al.
2015/0205495 A1 7/2015 Koide et al.
2015/0234446 A1 8/2015 Nathan et al.
2015/0234493 A1 8/2015 Parivar et al.
2015/0253866 A1 9/2015 Amm et al.
2015/0268813 A1 9/2015 Bos
2015/0321607 A1 11/2015 Cho et al.
2015/0332107 A1 11/2015 Paniaras
2015/0378519 A1 12/2015 Brown et al.
2015/0378982 A1 12/2015 McKenzie et al.
2015/0381931 A1 12/2015 Uhma et al.
2016/0004393 A1 1/2016 Faaborg et al.
2016/0004427 A1 1/2016 Zambetti et al.
2016/0004428 A1 1/2016 Bernstein et al.
2016/0004429 A1 1/2016 Bernstein et al.
2016/0004430 A1 1/2016 Missig et al.
2016/0004431 A1 1/2016 Bernstein et al.
2016/0004432 A1 1/2016 Bernstein et al.
2016/0011771 A1 1/2016 Cieplinski
2016/0019718 A1 1/2016 Mukkamala et al.
2016/0021511 A1 1/2016 Jin et al.
2016/0041750 A1 2/2016 Cieplinski et al.
2016/0048326 A1 2/2016 Kim et al.
2016/0062466 A1 3/2016 Moussette et al.
2016/0062619 A1 3/2016 Reeve et al.
2016/0070401 A1 3/2016 Kim et al.
2016/0132139 A1 5/2016 Du et al.
2016/0188181 A1 6/2016 Smith
2016/0196028 A1 7/2016 Kenney et al.
2016/0210025 A1 7/2016 Bernstein et al.
2016/0224220 A1 8/2016 Ganguly
2016/0259412 A1 9/2016 Flint et al.
2016/0259413 A1 9/2016 Anzures et al.
2016/0259495 A1 9/2016 Butcher et al.

(56) References Cited

U.S. PATENT DOCUMENTS

| | | | |
|---|---|---|---|
| 2016/0259496 | A1 | 9/2016 | Butcher et al. |
| 2016/0259497 | A1 | 9/2016 | Foss et al. |
| 2016/0259498 | A1 | 9/2016 | Foss et al. |
| 2016/0259499 | A1 | 9/2016 | Kocienda et al. |
| 2016/0259516 | A1 | 9/2016 | Kudurshian et al. |
| 2016/0259517 | A1 | 9/2016 | Butcher et al. |
| 2016/0259518 | A1 | 9/2016 | King et al. |
| 2016/0259519 | A1 | 9/2016 | Foss et al. |
| 2016/0259527 | A1 | 9/2016 | Kocienda et al. |
| 2016/0259528 | A1 | 9/2016 | Foss et al. |
| 2016/0259536 | A1 | 9/2016 | Kudurshian et al. |
| 2016/0274686 | A1 | 9/2016 | Ruiz et al. |
| 2016/0274728 | A1 | 9/2016 | Luo et al. |
| 2016/0274761 | A1 | 9/2016 | Ruiz et al. |
| 2016/0283054 | A1 | 9/2016 | Suzuki |
| 2016/0320906 | A1 | 11/2016 | Bokma et al. |
| 2016/0334960 | A1 | 11/2016 | Brown et al. |
| 2016/0357305 | A1 | 12/2016 | Wells et al. |
| 2016/0357389 | A1 | 12/2016 | Dakin et al. |
| 2016/0357390 | A1 | 12/2016 | Federighi et al. |
| 2016/0357404 | A1 | 12/2016 | Alonso Ruiz et al. |
| 2016/0360116 | A1 | 12/2016 | Penha et al. |
| 2017/0075520 | A1 | 3/2017 | Bauer et al. |
| 2017/0075562 | A1 | 3/2017 | Bauer et al. |
| 2017/0075563 | A1 | 3/2017 | Bauer et al. |
| 2017/0109011 | A1 | 4/2017 | Jiang |

FOREIGN PATENT DOCUMENTS

| | | | |
|---|---|---|---|
| CN | 101320303 | A | 12/2008 |
| CN | 101593077 | A | 12/2009 |
| CN | 101809526 | A | 8/2010 |
| CN | 102004593 | A | 4/2011 |
| CN | 102112946 | A | 6/2011 |
| CN | 102160021 | A | 8/2011 |
| CN | 102385478 | A | 3/2012 |
| CN | 102438092 | A | 5/2012 |
| CN | 102662573 | A | 9/2012 |
| CN | 102841677 | A | 12/2012 |
| CN | 103097992 | A | 5/2013 |
| DE | 100 59 906 | A1 | 6/2002 |
| EP | 0 859 307 | A1 | 3/1998 |
| EP | 0 880 090 | A2 | 11/1998 |
| EP | 1 028 583 | A1 | 8/2000 |
| EP | 1 406 150 | A1 | 4/2004 |
| EP | 1 674 977 | A2 | 6/2006 |
| EP | 1 882 902 | A1 | 1/2008 |
| EP | 2 000 896 | A2 | 12/2008 |
| EP | 2 017 701 | A1 | 1/2009 |
| EP | 2 028 583 | A2 | 2/2009 |
| EP | 2 141 574 | A2 | 1/2010 |
| EP | 2 175 357 | A1 | 4/2010 |
| EP | 2 196 893 | A2 | 6/2010 |
| EP | 2 214 087 | A1 | 8/2010 |
| EP | 2 226 715 | A2 | 9/2010 |
| EP | 2 299 351 | A2 | 3/2011 |
| EP | 2 302 496 | A1 | 3/2011 |
| EP | 2 375 309 | A1 | 10/2011 |
| EP | 2 375 314 | A1 | 10/2011 |
| EP | 2 386 935 | A1 | 11/2011 |
| EP | 2 407 868 | A1 | 1/2012 |
| EP | 2 426 580 | A2 | 3/2012 |
| EP | 2 447 818 | A1 | 5/2012 |
| EP | 2 527 966 | A2 | 11/2012 |
| EP | 2 530 677 | A2 | 12/2012 |
| EP | 2 541 376 | A1 | 1/2013 |
| EP | 2 555 500 | A1 | 2/2013 |
| EP | 2 615 535 | A1 | 7/2013 |
| EP | 2 631 737 | A1 | 8/2013 |
| EP | 2 674 846 | A2 | 12/2013 |
| EP | 2 733 578 | A2 | 5/2014 |
| EP | 2 808 764 | A1 | 12/2014 |
| EP | 2 809 058 | A1 | 12/2014 |
| EP | 2 813 938 | A1 | 12/2014 |
| GB | 2 402 105 | A | 12/2004 |
| JP | H07-151512 | A | 6/1995 |
| JP | H08-227341 | A | 9/1996 |
| JP | H09-330175 | A | 12/1997 |
| JP | H11-203044 | A | 7/1999 |
| JP | 2001-202192 | A | 7/2001 |
| JP | 2002-149312 | A | 5/2002 |
| JP | 2003-157131 | A | 5/2003 |
| JP | 2003-186597 | A | 7/2003 |
| JP | 2004-054861 | A | 2/2004 |
| JP | 2004-062648 | A | 2/2004 |
| JP | 2004-070492 | A | 3/2004 |
| JP | 2004-086733 | A | 3/2004 |
| JP | 2005-031786 | A | 2/2005 |
| JP | 2005-092386 | A | 4/2005 |
| JP | 2005-135106 | A | 5/2005 |
| JP | 2005-157842 | A | 6/2005 |
| JP | 2005-196810 | A | 7/2005 |
| JP | 2006-185443 | A | 7/2006 |
| JP | 2007-116384 | A | 5/2007 |
| JP | 2007-264808 | A | 10/2007 |
| JP | 2008-009759 | A | 1/2008 |
| JP | 2008-015890 | A | 1/2008 |
| JP | 2008-033739 | A | 2/2008 |
| JP | 2008-146453 | A | 6/2008 |
| JP | 2008-537615 | | 9/2008 |
| JP | 2008 305174 | A | 12/2008 |
| JP | 2009-500761 | | 1/2009 |
| JP | 2009-211704 | A | 9/2009 |
| JP | 2009-217543 | A | 9/2009 |
| JP | 2010-009321 | A | 1/2010 |
| JP | 2010-503130 | A | 1/2010 |
| JP | 2010-055274 | A | 3/2010 |
| JP | 2010-146507 | A | 7/2010 |
| JP | 2010-152716 | A | 7/2010 |
| JP | 2010-176174 | A | 8/2010 |
| JP | 2010-176337 | A | 8/2010 |
| JP | 2010-181934 | A | 8/2010 |
| JP | 2010-541071 | A | 12/2010 |
| JP | 2011-501307 | A | 1/2011 |
| JP | 2011-048666 | A | 3/2011 |
| JP | 2011-048686 | A | 3/2011 |
| JP | 2011-048762 | A | 3/2011 |
| JP | 2011-048832 | A | 3/2011 |
| JP | 2011-053831 | A | 3/2011 |
| JP | 2011-053972 | A | 3/2011 |
| JP | 2011-053973 | A | 3/2011 |
| JP | 2011-053974 | A | 3/2011 |
| JP | 2011-059821 | A | 3/2011 |
| JP | 2011-070342 | A | 4/2011 |
| JP | 2011-100290 | A | 5/2011 |
| JP | 2011-107823 | A | 6/2011 |
| JP | 2011-123773 | A | 6/2011 |
| JP | 2011-141868 | A | 7/2011 |
| JP | 2011-192179 | A | 9/2011 |
| JP | 2011-192215 | A | 9/2011 |
| JP | 2011-242386 | A | 12/2011 |
| JP | 2011-253556 | A | 12/2011 |
| JP | 2011-257941 | A | 12/2011 |
| JP | 2011-530101 | A | 12/2011 |
| JP | 2012-027940 | A | 2/2012 |
| JP | 2012-043266 | A | 3/2012 |
| JP | 2012-043267 | A | 3/2012 |
| JP | 2012-053754 | | 3/2012 |
| JP | 2012-053926 | A | 3/2012 |
| JP | 2012-073873 | A | 4/2012 |
| JP | 2012-509605 | A | 4/2012 |
| JP | 2012-093820 | A | 5/2012 |
| JP | 2012-123564 | A | 6/2012 |
| JP | 2012-128825 | A | 7/2012 |
| JP | 2013-030050 | A | 2/2013 |
| JP | 2013-058149 | A | 3/2013 |
| JP | 2013-080521 | A | 5/2013 |
| JP | 2013-529339 | A | 7/2013 |
| JP | 2013-542488 | A | 11/2013 |
| JP | 2014-130567 | A | 7/2014 |
| JP | 2014-519109 | A | 8/2014 |
| JP | 2015-153420 | A | 8/2015 |
| KR | 2006-0071353 | A | 6/2006 |
| KR | 2008-0045143 | A | 4/2008 |

(56) References Cited

FOREIGN PATENT DOCUMENTS

| | | | | |
|---|---|---|---|---|
| KR | 2008-0054346 A | 6/2008 | | |
| KR | 2010 0133246 A | 12/2010 | | |
| KR | 2011 0086501 A | 7/2011 | | |
| KR | 2013 0099647 A | 9/2013 | | |
| KR | 2014 0079110 A | 6/2014 | | |
| KR | 20150021977 A | 3/2015 | | |
| WO | WO 2005/106637 A2 | 11/2005 | | |
| WO | WO 2006/013485 A2 | 2/2006 | | |
| WO | WO 2006/042309 A1 | 4/2006 | | |
| WO | WO 2007/121557 A1 | 11/2007 | | |
| WO | WO 2008/030976 A2 | 3/2008 | | |
| WO | WO 2008/064142 A2 | 5/2008 | | |
| WO | WO 2009/155981 A1 | 12/2009 | | |
| WO | WO 2009/158549 A2 | 12/2009 | | |
| WO | WO 2010/013876 A1 | 2/2010 | | |
| WO | WO 2010/090010 A1 | 8/2010 | | |
| WO | WO 2011/024389 A1 | 3/2011 | | |
| WO | WO 2011/024465 A1 | 3/2011 | | |
| WO | WO 2011/093045 A1 | 8/2011 | | |
| WO | WO 2011/105009 A1 | 9/2011 | | |
| WO | WO 2011/115187 A1 | 9/2011 | | |
| WO | WO 2011/121375 A1 | 10/2011 | | |
| WO | WO 2012/037664 | 3/2012 | | |
| WO | WO 2012/096804 A2 | 7/2012 | | |
| WO | WO 2012/114760 A1 | 8/2012 | | |
| WO | WO 2012/150540 A2 | 11/2012 | | |
| WO | WO 2013/173838 * | 5/2013 | ........... | G06F 3/0481 |
| WO | WO 2013/169299 A1 | 11/2013 | | |
| WO | WO 2013/169849 A2 | 11/2013 | | |
| WO | WO 2013/169851 A2 | 11/2013 | | |
| WO | WO 2013/169853 A1 | 11/2013 | | |
| WO | WO 2013/169854 A2 | 11/2013 | | |
| WO | WO 2013/169870 A1 | 11/2013 | | |
| WO | WO 2013/169875 A2 | 11/2013 | | |
| WO | WO 2013/169877 A2 | 11/2013 | | |
| WO | WO 2013/169882 A2 | 11/2013 | | |
| WO | WO 2014/105275 A1 | 7/2014 | | |
| WO | WO 2014/105276 A1 | 7/2014 | | |
| WO | WO 2014/105277 A1 | 7/2014 | | |
| WO | WO 2014/105278 A1 | 7/2014 | | |
| WO | WO 2014/105279 A1 | 7/2014 | | |
| WO | WO 2014/129655 A1 | 8/2014 | | |
| WO | WO 2014/149473 A1 | 9/2014 | | |
| WO | WO 2014/200733 A1 | 12/2014 | | |

OTHER PUBLICATIONS

Azundris, "A Fire in the Sky," http://web.archive.org/web/20140722062639/http://blog.azundrix.com/archives/168-A-fire-in-the-sky.html, Jul. 22, 2014, 8 pages.

B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.

Clark, "Global Moxie, Touch Means a Renaissance for Radial Menus," http://globalmoxie.com/blog/radial-menus-for-touch-ui~print.shtml, Jul. 17, 2012, 7 pages.

Cohen, Cinemagraphs are Animated Gifs for Adults, http://www.tubefilter.com/2011/07/10/cinemagraph, Jul. 10, 2011, 3 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

Cvil.ly—a design blog, Interesting Touch Interactions on Windows 8, http://cvil.ly/2011/06/04/interesting-touch-interactions-on-windows-8/, Jun. 4, 2011, 3 pages.

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.

Dinwiddie, et al., "Combined-User Interface for Computers, Television, Video Recorders, and Telephone, Etc", ip.com Journal, Aug. 1, 1990, 3 Pages.

Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.

Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.

Flixel, "Cinemagraph Pro for Mac", https://flixel.com/products/mac/cinemagraph-pro, 2014, 7 pages.

Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.

Flowplayer, "Slowmotion: Flowplayer," https://web.archive.org/web/20150226191526/http://flash.flowplayer.org/plugins/streaming/slowmotion.html, Feb. 26, 2015, 4 pages.

Forlines, et al., "Glimpse: a Novel Input Model for Multi-level Devices", Chi '05 Extended Abstracts on Human Factors in Computing Systems, Apr. 2, 2005, 4 pages.

IBM et al., "Pressure-Sensitive Icons", IBM Technical Disclosure Bulletin, vol. 33, No. 1B, Jun. 1, 1990, 3 pages.

ICIMS Recruiting Software, "Blackberry Playbook Review," http://www.tested.com/tech.tablets/5749-blackberry-playbook-review/, 2015, 11 pages.

Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.

Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.

McRitchie, "Internet Explorer Right-Click Menus," http://web.archive.org/web-201405020/http:/dmcritchie.mvps.org/ie/rightie6.htm, May 2, 2014, 10 pages.

Laurie, "The Power of the Right Click," http://vlaurie.com/right-click/customize-context-menu.html, 2002-2016, 3 pages.

Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.

Minsky, "Computational Haptics The *Sandpaper* System for Synthesizing Texture for a Force-Feedback Display," Massachusetts Institute of Technology, Jun. 1978, 217 pages.

Nikon, "Scene Recognition System and Advanced SRS," http://www.nikonusa.com/en.Learn-And-Explore/Article/ftlzi4rr/Scene-Recognition-System.html, Jul. 22, 2015, 2 pages.

O'Hara, et al., "Pressure-Sensitive Icons", ip.com Journal, IP.COM Inc., West Henrietta, NY, US, Jun. 1, 1990, 2 Pages.

Pallenberg, "Wow, the new iPad had gestures." https://plus.google.com/+SaschaPallenberg/posts/aaJtJogu8ac, Mar. 7, 2012, 2 pages.

PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.

Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.

"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.

Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.

Rekimoto, et al., "PreSense: Interaction Techniques for Finger Sensing Input Devices", Proceedings of the 16th Annual ACM Symposium on User Interface Software and Technology, Nov. 30, 2003, 10 pages.

(56) References Cited

OTHER PUBLICATIONS

Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Sony, "Intelligent Scene Recognition," https://www.sony- asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Blackberry Playbook bezel interaction," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Jul. 21, 2016, received in European Patent Application No. 13795391.5, which corresponds with U.S. Appl. No. 14/536,426, 9 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Notice of Allowance, dated Aug. 15, 2016, received in Australian Patent Application No. 2013259614, which corresponds with U.S. Appl. No. 14/536,141, 1 page.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Apr. 5, 2016, received in Korean Patent Application No. 10-2015-7018448, which corresponds with U.S. Appl. No. 14/536,141, 6 pages.
Office Action, dated Aug. 1, 2016, received in U.S. Appl. No. 14/536,203, 14 pages.
Office Action, dated Jul. 9, 2015, received in Australian Patent Application No. 2013259630, which corresponds with U.S. Appl. No. 14/536,203, 3 pages.

(56) References Cited

OTHER PUBLICATIONS

Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Office Action, dated Dec. 4, 2015, received in Korean Patent Application No. 2014-7034520, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Office Action, dated Jan. 7, 2016, received in European Patent Application No. 13724107.1, which corresponds with U.S. Appl. No. 14/536,291, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which correresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14,866,159, 5 pages.
Certificate of Registration, dated Jun. 16, 2016, received in German Patent No. 202016001483.9, which corresponds with U.S. Appl. No. 14,866,159, 3 pages.
Office Action, dated Mar. 9, 2016, received in Danish Patent Application No. 201500574, which corresponds with U.S. Appl. No. 14/866,159, 11 pages.
Innovation Patent Certificate, dated Aug. 4, 2016, received in Australian Patent Application No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14/863,432, 10 pages.
Patent, dated Aug. 8, 2016, received in Australian Patent Application 2016100653, corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Nov. 30, 2015, received in U.S. Appl. No. 14/845,217, 24 pages.

(56) References Cited

OTHER PUBLICATIONS

Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Office Action, dated Jan. 25, 2016, received in U.S. Appl. No. 14/864,580, 29 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Patent, dated Aug. 8, 2016, received in Australian Patent Application No. 2016100649, which corresponds with U.S. Appl. No. 14/866,987, 1 page.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Office Action, dated Apr. 7, 2016, received in Danish Patent Application No. 201500597, which corresponds with U.S. Appl. No. 14/871,227, 7 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Office Action, dated Mar. 18, 2016, received in Danish Patent Application No. 201500581, which corresponds with U.S. Appl. No. 14/867,990, 9 pages.
Certificate of Registration, dated Jun. 16, 2016, received in German Patent No. 202016001489.8, which corresponds with U.S. Appl. No. 14/867,990, 3 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.

(56) References Cited

OTHER PUBLICATIONS

International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
Kost, "LR3-Deselect All Images But One", Julieanne Kost's Blog, blogs.adobe.com/jkost/2011/12/Ir3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Office Action, dated Mar. 15, 2017, received in U.S. Appl. No. 14/535,671, 13 pages.
Notice of Allowance, dated Dec. 20, 2016, received in Australian Patent Application No. 2013368440, which corresponds with U.S. Appl. No. 14/536,426, 3 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.

(56) References Cited

OTHER PUBLICATIONS

Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Office Action, dated Jan. 3, 2017, received in Australian Patent Application No. 2016201451, which corresponds with U.S. Appl. No. 14/608,926, 3 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Dec. 8, 2016, received in U.S. Appl. No. 14/608,942, 9 pages.
Office Action, dated Mar. 29, 2017, received in Australian patent Application No. 2016201303, which corresponds with U.S. Appl. No. 14/608,942, 3 pages.
Office Action, dated Feb. 24, 2017, received in Korean Patent Application No. 2015-7018448, which corresponds with U.S. Appl. No. 14/608,942, 4 pages.
Notice of Allowance, dated Feb. 1, 2017, received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Mar. 3, 2017, received in Japanese Patent Application No. 2016-125839, which corresponds with U.S. Appl. No. 14/536,267, 6 pages.
Office Action, dated Jan. 5, 2017, received in Korean Patent Application No. 2016-7029533, which corresponds with U.S. Appl. No. 14/536,267, 2 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Office Action, dated Dec. 5, 2016, received in Danish Patent Application No. 201500575, which corresponds with U.S. Appl. No. 14/866,981, 3 pages.
Office Action, dated Mar. 14, 2017, received in Danish Patent Application No. 201500574, which corresponds with U.S. Appl. No. 14/866,159, 5 pages.
Notice of Allowance, dated Jan. 30, 2017, received in received in Danish Patent Application No. 201500588, which corresponds with U.S. Appl. No. 14/868,078, 2 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Notice of Allowance, dated Feb. 28, 2017, received in U.S. Appl. No. 14/869,899, 9 pages.
Office Action, dated Nov. 22, 2016, received in Danish Patent Application No. 201670594, which corresponds with U.S. Appl. No. 14/869,899, 9 pages.
Office Action, dated Apr. 13, 2017, received in U.S. Appl. No. 14/866,992, 34 pages.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Office Action, dated Mar. 31, 2017, received in U.S. Appl. No. 14/857,700, 14 pages.
Notice of Allowance, dated Dec. 28, 2016, received in U.S. Appl. No. 14/864,580, 8 pages.
Notice of Allowance, dated Nov. 23, 2016, received in U.S. Appl. No. 14/864,601, 12 pages.
Notice of Allowance, dated Apr. 20, 2017, received in U.S. Appl. No. 14/864,601, 13 pages.
Notice of Allowance, dated Jan. 31, 2017, received in U.S. Appl. No. 14/864,627, 7 pages.

(56) References Cited

OTHER PUBLICATIONS

Certificate of Examination, dated Dec. 8, 2016, received in Australian Patent Application No. 2016100292, which corresponds with U.S. Appl. No. 14/866,361, 1 page.
Patent, dated Sep. 19, 2016, received in German Patent Application No. 202016002908.9, which corresponds with U.S. Appl. No. 14/866,987, 3 pages.
Notice of Allowance, dated Jan. 31, 2017, received in Danish Patent Application No. 201670463, which corresponds with U.S. Appl. No. 14/866,987, 3 pages.
Notice of Allowance, dated Feb. 28, 2017, received in U.S. Appl. No. 14/871,236, 9 pages.
Office Action, dated Apr. 13, 2017, received in Australian Patent Application No. 2016101431, which corresponds with U.S. Appl. No. 14/871,227, 4 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action, dated Jan. 5, 2017, received in Danish Patent Application No. 201670592, which corresponds with U.S. Appl. No. 15/231,745, 3 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
YouTube, "Recentz—Recent Apps in a Tap", https://www.youtube.com/watch?v=qailSHRgsTo, May 15, 2015, 1 page.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated May 15, 2017, received in Australian Patent Application No. 2016216580, which corresponds with U.S. Appl. No. 14/536,426, 3 pages.
Office Action, dated Aug. 21, 2017, received in European Patent Application No. 15183980.0, which corresponds with U.S. Appl. No. 14/536,426, 3 pages.
Final Office Action, dated Aug. 25, 2017, received in U.S. Appl. No. 14/536,464, 30 pages.
Office Action, dated May 4, 2017, received in Chinese Patent Application No. 201380068414.1, which corresponds with U.S. Appl. No. 14/608,926, 5 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Patent, dated May 26, 2017, received in European Patent Application No. 13724102.2, which corresponds with U.S. Appl. No. 14/536,646, 1 page.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Notice of Allowance, dated May 12, 2017, received in U.S. Appl. No. 14/608,942, 10 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 17, 2017, received in U.S. Appl. No. 14/536,166, 19 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.

(56) References Cited

OTHER PUBLICATIONS

Notice of Allowance, dated Sep. 1, 2017, received in Korean Patent Application No. 2016-7029533, which corresponds with U.S. Appl. No. 14/536,267, 4 pages.
Office Action, dated Jul. 21, 2017, received in Australian Patent Application No. 2016216658, which corresponds with U.S. Appl. No. 14/536,291, 3 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Jul. 21, 2017, received in Australian Patent Application No. 2016247194, which corresponds with U.S. Appl. No. 14/536,648, 3 pages.
Notice of Allowance, dated Jul. 10, 2017, received in U.S. Appl. No. 14/609,042, 8 pages.
Office Action, dated Sep. 5, 2017, received in Danish Patent Application No. 201500593, which corresponds with U.S. Appl. No. 14/866,992, 6 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Office Action, dated Jun. 9, 2017, received in Japanese Patent Application No. 2016558214, which corresponds with U.S. Appl. No. 14/866,511, 6 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated May 5, 2017, received in Danish Patent Application No. 201500584, which corresponds with U.S. Appl. No. 14/864,580, 3 pages.
Office Action, dated May 5, 2017, received in Danish Patent Application No. 201500585, which corresponds with U.S. Appl. No. 14/864,627, 4 pages.
Office Action, dated Jun. 15, 2017, received in Danish Patent Application No. 201500579, which corresponds with U.S. Appl. No. 14/866,361, 2 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Sep. 1, 2017, received in U.S. Appl. No. 14/870,754, 22 pages.
Office Action, dated Sep. 1, 2017, received in U.S. Appl. No. 14/870,988, 14 pages.
Office Action, dated Mar. 24, 2017, received in Japanese Patent Application No. 2016-533201, which corresponds with U.S. Appl. No. 14/871,227, 6 pages.
Office Action, dated Aug. 4, 2017, received in Japanese Patent Application No. 2016-533201, which corresponds with U.S. Appl. No. 14/871,227, 6 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated May 4, 2017, received in Danish Patent Application No. 201500598, which corresponds with U.S. Appl. No. 14/867,892, 4 pages.
Final Office Action, dated Aug. 18, 2017, received in U.S. Appl. No. 14/869,873, 20 pages.
Office Action, dated May 3, 2017, received in Danish Patent Application No. 201500581, which corresponds with U.S. Appl. No. 14/867,990, 5 pages.
Final Office Action, dated Jun. 2, 2017, received in U.S. Appl. No. 15/081,771, 17 pages.
Office Action, dated Aug. 29, 2017, received in Korean Patent Application No. 2017-7014536, which corresponds with U.S. Appl. No. 15/081,771, 5 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.

(56) References Cited

OTHER PUBLICATIONS

Office Action, dated Aug. 4, 2017, received in Danish Patent Application No. 201770377, 9 pages.
Office Action, dated Aug. 30, 2017, received in U.S. Appl. No. 15/655,749, 22 pages.
Search Report, dated Apr. 13, 2017, received in Dutch Patent Application No. 2016452, which corresponds with U.S. Appl. No. 14/864,737, 22 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Search Report, dated Apr. 18, 2017, received in Dutch Patent Application No. 2016801, which corresponds with U.S. Appl. No. 14/863,432, 34 pages.
Extended European Search Report, dated Jun. 22, 2017, received in European Patent Application No. 16189421.7, which corresponds with U.S. Appl. No. 14/866,987, 7 pages.
Extended European Search Report, dated Sep. 11, 2017, received in European Patent Application No. 17163309.2, which corresponds with U.S. Appl. No. 14/866,987, 8 pages.
Extended European Search Report, dated Jun. 8, 2017, received in European Patent Application No. 16189425.8, which corresponds with U.S. Appl. No. 14/866,989, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
Anonymous, "Google Android 5.0 Release Date, Specs and Editors Hands On Review—CNET", http://www.cnet.com/products/google-an-android-5-0-lollipop/, Mar. 12, 2015, 10 pages.
Certificate of Grant, dated Apr. 29, 2017, received in Australian Patent Application No. 2013368440, which corresponds with U.S. Appl. No. 14/536,426, 3 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Sep. 25, 2017, received in U.S. Appl. No. 14/536,644, 29 pages.
Notice of Allowance, dated Sep. 20, 2017, received in U.S. Appl. No. 14/536,141, 10 pages.
Office Action, dated Sep. 13, 2017, received in European Patent Application No. 16177863.4, which corresponds with U.S. Appl. No. 14/536,267, 6 pages.
Notice of Allowance, dated Sep. 19, 2017, received in Chinese Patent Application No. 201380068399.0, which corresponds with U.S. Appl. No. 14/608,985, 3 pages.
Office Action, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Patent, dated Jul. 12, 2017, received in Dutch Patent Application No. 2016452, which corresponds with U.S. Appl. No. 14/864,737, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Korean Patent Application No. 2016229421, which corresponds with U.S. Appl. No. 14/868,078, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Notice of Allowance, dated Oct. 4, 2017, received in U.S. Appl. No. 14/866,511, 37 pages.
Final Office Action, dated Oct. 3, 2017, received in U.S. Appl. No. 14/866,992, 37 pages.
Final Office Action, dated Oct. 4, 2017, received in U.S. Appl. No. 14/856,517, 33 pages.
Office Action, dated Sep. 22, 2017, received in Japanese Patent Application No. 2017-029201, which corresponds with U.S. Appl. No. 14/857,636 8 pages.
Notice of Allowance, dated Sep. 29, 2017, received in Danish Patent Application No. 201670463, which corresponds with U.S. Appl. No. 14/866,987, 2 pages.
Notice of Allowance, dated Sep. 22, 2017, received in Japanese Patent Application No. 2016-233449, which corresponds with U.S. Appl. No. 14/866,987, 5 pages.
Office Action, dated Sep. 29, 2017, received in Australian Patent Application No. 2016231505, which corresponds with U.S. Appl. No. 14/871,462, 5 pages.
Final Office Action, dated Oct. 10, 2017, received in U.S. Appl. No. 14/869,855, 16 pages.
Notice of Allowance, dated Jul. 6, 2017, received in U.S. Appl. No. 15/231,745, 18 pages.
Extended European Search Report, dated Oct. 10, 2017, received in European Patent Application No. 17188507.2, which corresponds with U.S. Appl. No. 14/866,361, 9 pages.
Anonymous, "Nokia 808 PureView screenshots", retrieved from Internet; no URL , Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
IPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip", Jul. 4, 2014, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.

(56) References Cited

OTHER PUBLICATIONS

Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Oct. 18, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.
Office Action, dated Nov. 11, 2016, received in European Patent Application No. 13795392.3, which corresponds with U.S. Appl. No. 14/608,926, 6 pages.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Oct. 7, 2016, received in European Patent Application No. 13798464.7, which corresponds with U.S. Appl. No. 14/608,942, 7 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Oct. 20, 2016, received in U.S. Appl. No. 14/536,247, 10 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Nov. 4, 2016, received in Korean Patent Application No. 10-2015-7019984, which corresponds with U.S. Appl. No. 14/608,985, 8 pages.
Notice of Allowance, dated Oct. 24, 2016, received in U.S. Appl. No. 14/866,981, 7 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Jul. 5, 2016, received in Chinese Patent Application No. 201620186008.6, which corresponds with U.S. Appl. No. 14/866,159, 3 pages.
Office Action, dated Sep. 27, 2016, received in Danish Patent Application No. 201500574, which corresponds with U.S. Appl. No. 14/866,159, 4 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Australian Patent Application No. 201500588, which corresponds with U.S. Appl. No. 14/868,078, 4 pages.
Notice of Allowance, dated Nov. 14, 2016, received in U.S. Appl. No. 14/863,432, 7 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Sep. 16, 2016, received in U.S. Appl. No. 14/866,489, 24 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Innovation Patent, dated Sep. 22, 2016, received in Australian Patent Application No. 2016101418, which corresponds with U.S. Appl. No. 14/866,992, 1 page.
Notice of Allowance, dated Oct. 24, 2016, received in U.S. Appl. No. 14/857,645, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Office Action, dated Oct. 7, 2016, received in Danish Patent Application No. 201500585, which corresponds with U.S. Appl. No. 14/864,627, 3 pages.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.

(56) References Cited

OTHER PUBLICATIONS

Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Office Action, dated Sep. 26, 2016, received in Danish Patent Application No. 201500581, which corresponds with U.S. Appl. No. 14/867,990, 5 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Aug. 29, 2016, received in International Patent Application No. PCT/US2016/021400, which corresponds with U.S. Appl. No. 14/869,899, 48 pages.
Notice of Allowance, dated Oct. 9, 2017, received in Chinese Patent Application No. 2013800362059, which corresponds with U.S. Appl. No. 14/536,646, 3 pages.
Summons, dated Oct. 6, 2017, received in European Patent Application No. 13811032.5, which corresponds with U.S. Appl. No. 14/608,985, 6 pages.
Office Action, dated Oct. 11, 2017, received in U.S. Appl. No. 14/857,700, 13 pages.
Office Action, dated Oct. 16, 2017, received in U.S. Appl. No. 14/871,462, 26 pages.
Innovation Patent, dated Oct. 11, 2017, received in Australian Patent Application No. 2016231505, which corresponds with U.S. Appl. No. 14/871,462, 1 page.
Extended European Search Report, dated Oct. 17, 2017, received in European Patent Application No. 17184437.6, Which corresponds with U.S. Appl. No. 14/868,078, 8 pages.
VisioGuy, “Getting a Handle on Selecting and Subselecting Visio Shapes”, http://www.visguy.com/2009/10/13/getting-a-handle-on-selecting-and-subselecting-visio-shapes/, Oct. 13, 2009, 18 pages.
Office Action, dated Nov. 30, 2017, received in U.S. Appl. No. 14/535,671, 21 pages.
Notice of Allowance, dated Nov. 30, 2017, received in U.S. App. No. 14/536,367, 9 pages.
Office Action, dated Oct. 19, 2017, received in U.S. Appl. No. 14/608,926, 14 pages.
Office Action, dated Oct. 19, 2017, received in U.S. Appl. No. 14/536,646, 21 pages.
Office Action, dated Oct. 20, 2017, received in U.S. Appl. No. 14/608,965, 14 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Notice of Allowance, dated Dec. 1, 2017, received in U.S. Appl. No. 14/536,291, 19 pages.
Office Action, dated Oct. 19, 2017, received in U.S. Appl. No. 14/608,985, 13 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Dec. 15, 2017, received in U.S. Appl. No. 14/866,159, 35 pages.
Final Office Action, dated Nov. 15, 2017, received in U.S. Appl. No. 14/856,519, 31 pages.
Office Action, dated Nov. 30, 2017, received in U.S. Appl. No. 14/857,636, 19 pages.
Office Action, dated Dec. 1, 2017, received in U.S. Appl. No. 14/857,663, 15 pages.
Office Action, dated Nov. 29, 2017, received in U.S. Appl. No. 14/866,989, 31 pages.
Office Action, dated Nov. 14, 2017, received in U.S. Appl. No. 14/870,882, 25 pages.
Office Action, dated Nov. 22, 2017, received in U.S. Appl. No. 14/871,227, 24 pages.
Office Action, dated Oct. 26, 2017, received in U.S. Appl. No. 14/871,336 (7342), 22 pages.
Final Office Action, dated Nov. 29, 2017, received in U.S. Appl. No. 14/867,823, 47 pages.
Final Office Action, dated Dec. 14, 2017, received in U.S. Appl. No. 14/867,892, 53 pages.

(56) References Cited

OTHER PUBLICATIONS

Office Action, dated Jan. 11, 2018, received in U.S. Appl. No. 14/869,997, 17 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.

* cited by examiner

Figure 10C:
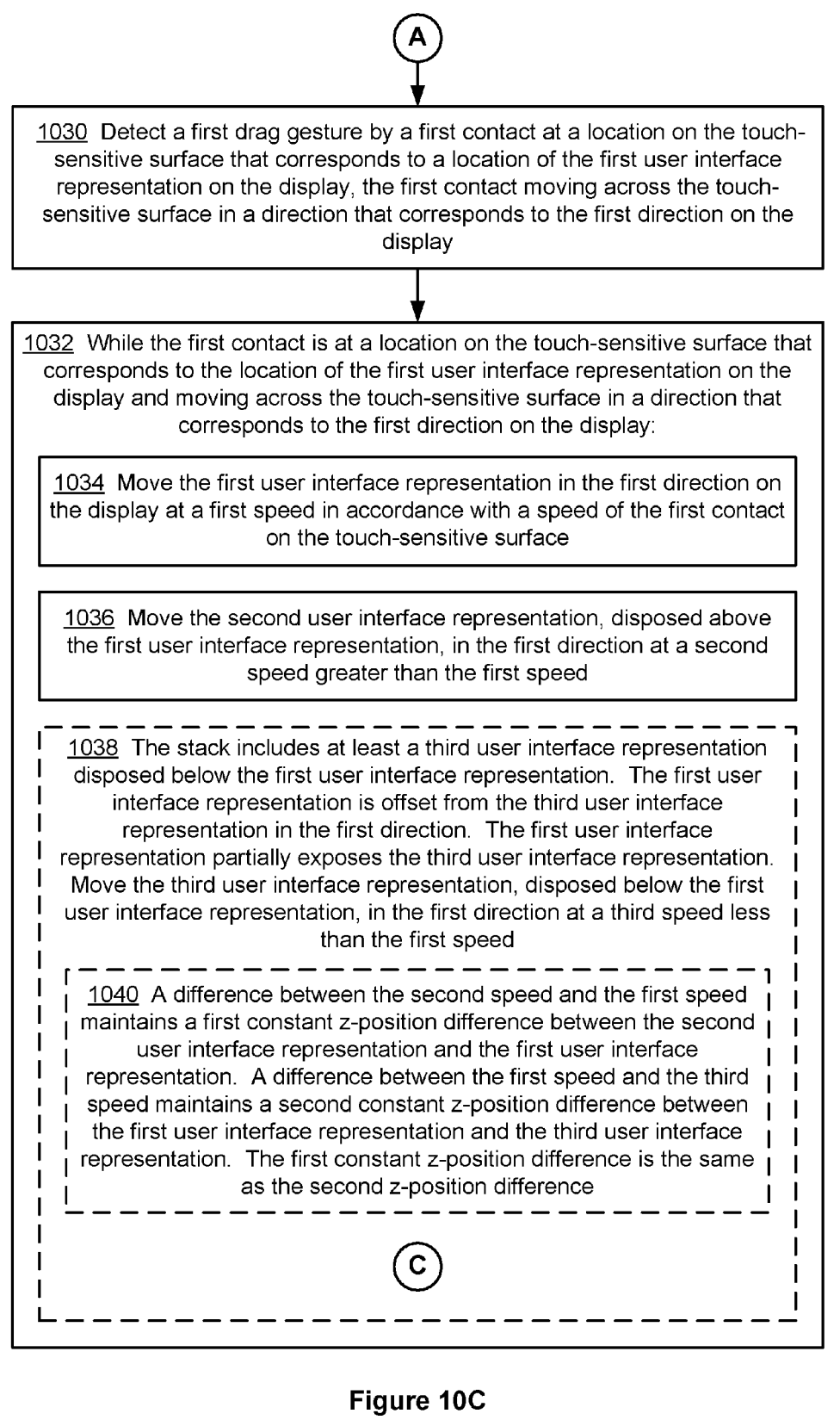

A

1030 Detect a first drag gesture by a first contact at a location on the touch-sensitive surface that corresponds to a location of the first user interface representation on the display, the first contact moving across the touch-sensitive surface in a direction that corresponds to the first direction on the display 1032 While the first contact is at a location on the touch-sensitive surface that corresponds to the location of the first user interface representation on the display and moving across the touch-sensitive surface in a direction that corresponds to the first direction on the display:

1034 Move the first user interface representation in the first direction on the display at a first speed in accordance with a speed of the first contact on the touch-sensitive surface 1036 Move the second user interface representation, disposed above the first user interface representation, in the first direction at a second speed greater than the first speed 1038 The stack includes at least a third user interface representation disposed below the first user interface representation. The first user interface representation is offset from the third user interface representation in the first direction. The first user interface representation partially exposes the third user interface representation. Move the third user interface representation, disposed below the first user interface representation, in the first direction at a third speed less than the first speed 1040 A difference between the second speed and the first speed maintains a first constant z-position difference between the second user interface representation and the first user interface representation. A difference between the first speed and the third speed maintains a second constant z-position difference between the first user interface representation and the third user interface representation. The first constant z-position difference is the same as the second z-position difference

Figure 10F:
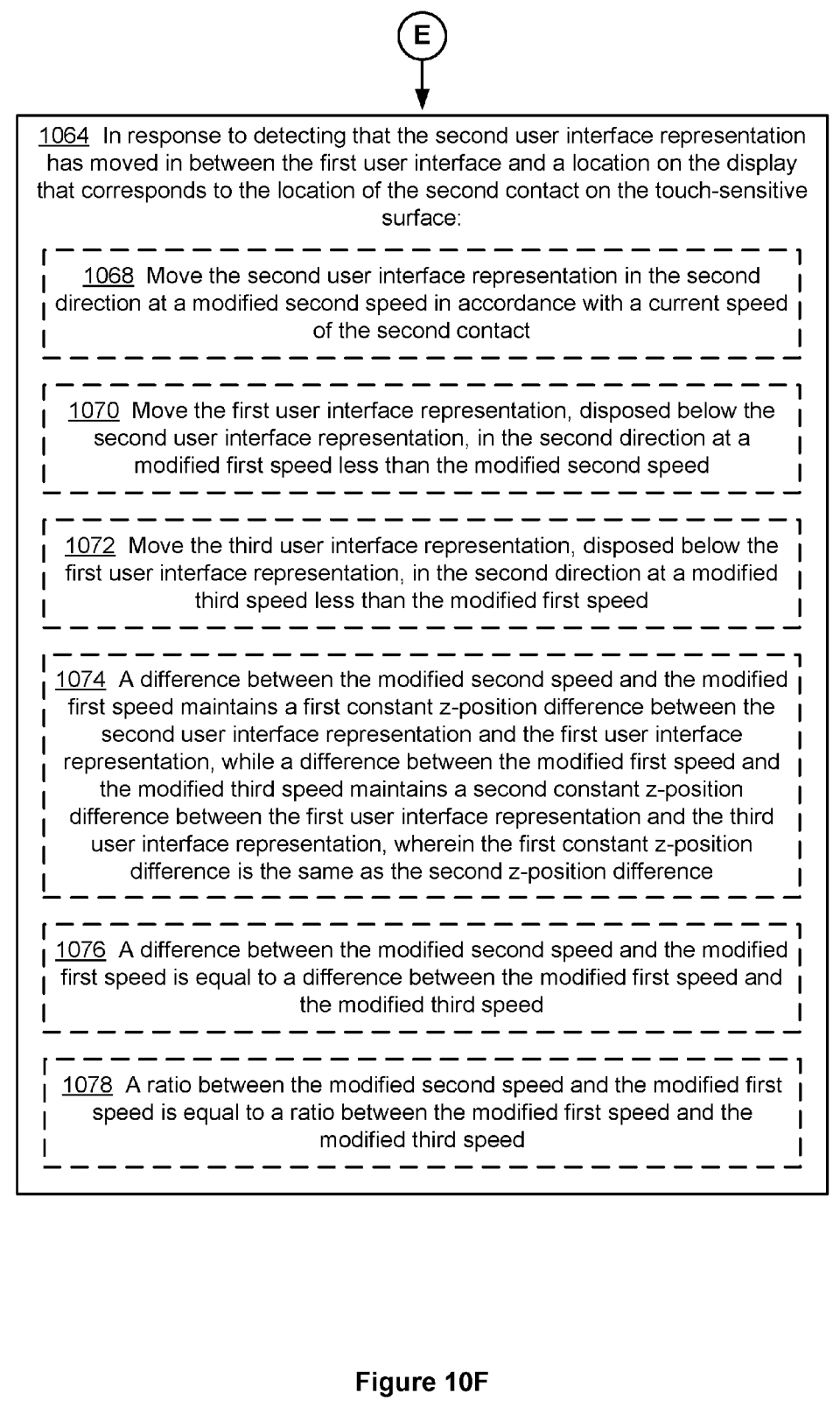

1064 In response to detecting that the second user interface representation has moved in between the first user interface and a location on the display that corresponds to the location of the second contact on the touch-sensitive surface:

1068 Move the second user interface representation in the second direction at a modified second speed in accordance with a current speed of the second contact 1070 Move the first user interface representation, disposed below the second user interface representation, in the second direction at a modified first speed less than the modified second speed 1072 Move the third user interface representation, disposed below the first user interface representation, in the second direction at a modified third speed less than the modified first speed 1074 A difference between the modified second speed and the modified first speed maintains a first constant z-position difference between the second user interface representation and the first user interface representation, while a difference between the modified first speed and the modified third speed maintains a second constant z-position difference between the first user interface representation and the third user interface representation, wherein the first constant z-position difference is the same as the second z-position difference 1076 A difference between the modified second speed and the modified first speed is equal to a difference between the modified first speed and the modified third speed 1078 A ratio between the modified second speed and the modified first speed is equal to a ratio between the modified first speed and the modified third speed

Figure 11A:
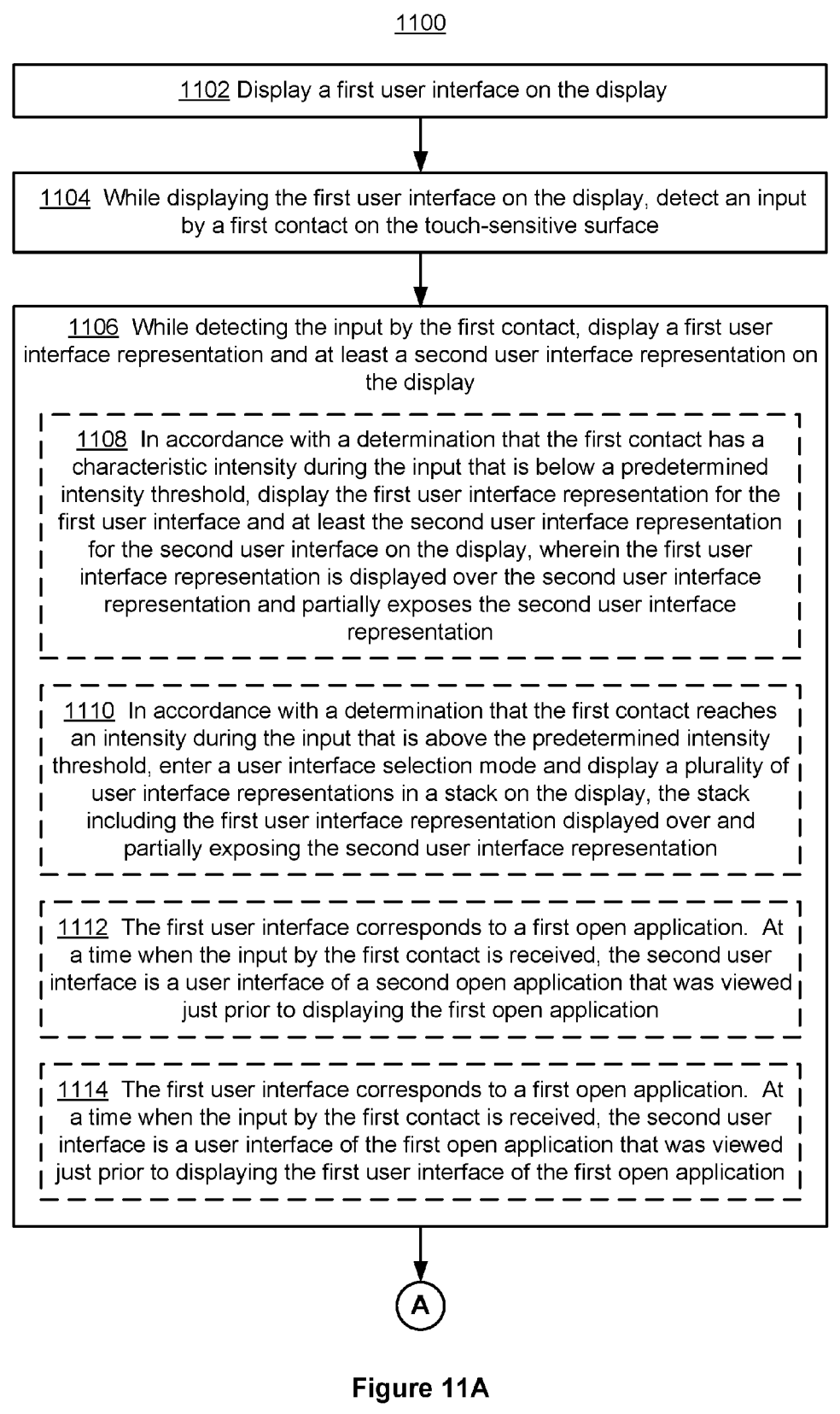

1102 Display a first user interface on the display

1104 While displaying the first user interface on the display, detect an input by a first contact on the touch-sensitive surface 1106 While detecting the input by the first contact, display a first user interface representation and at least a second user interface representation on the display 1108 In accordance with a determination that the first contact has a characteristic intensity during the input that is below a predetermined intensity threshold, display the first user interface representation for the first user interface and at least the second user interface representation for the second user interface on the display, wherein the first user interface representation is displayed over the second user interface representation and partially exposes the second user interface representation 1110 In accordance with a determination that the first contact reaches an intensity during the input that is above the predetermined intensity threshold, enter a user interface selection mode and display a plurality of user interface representations in a stack on the display, the stack including the first user interface representation displayed over and partially exposing the second user interface representation 1112 The first user interface corresponds to a first open application. At a time when the input by the first contact is received, the second user interface is a user interface of a second open application that was viewed just prior to displaying the first open application 1114 The first user interface corresponds to a first open application. At a time when the input by the first contact is received, the second user interface is a user interface of the first open application that was viewed just prior to displaying the first user interface of the first open application

Figure 11E:
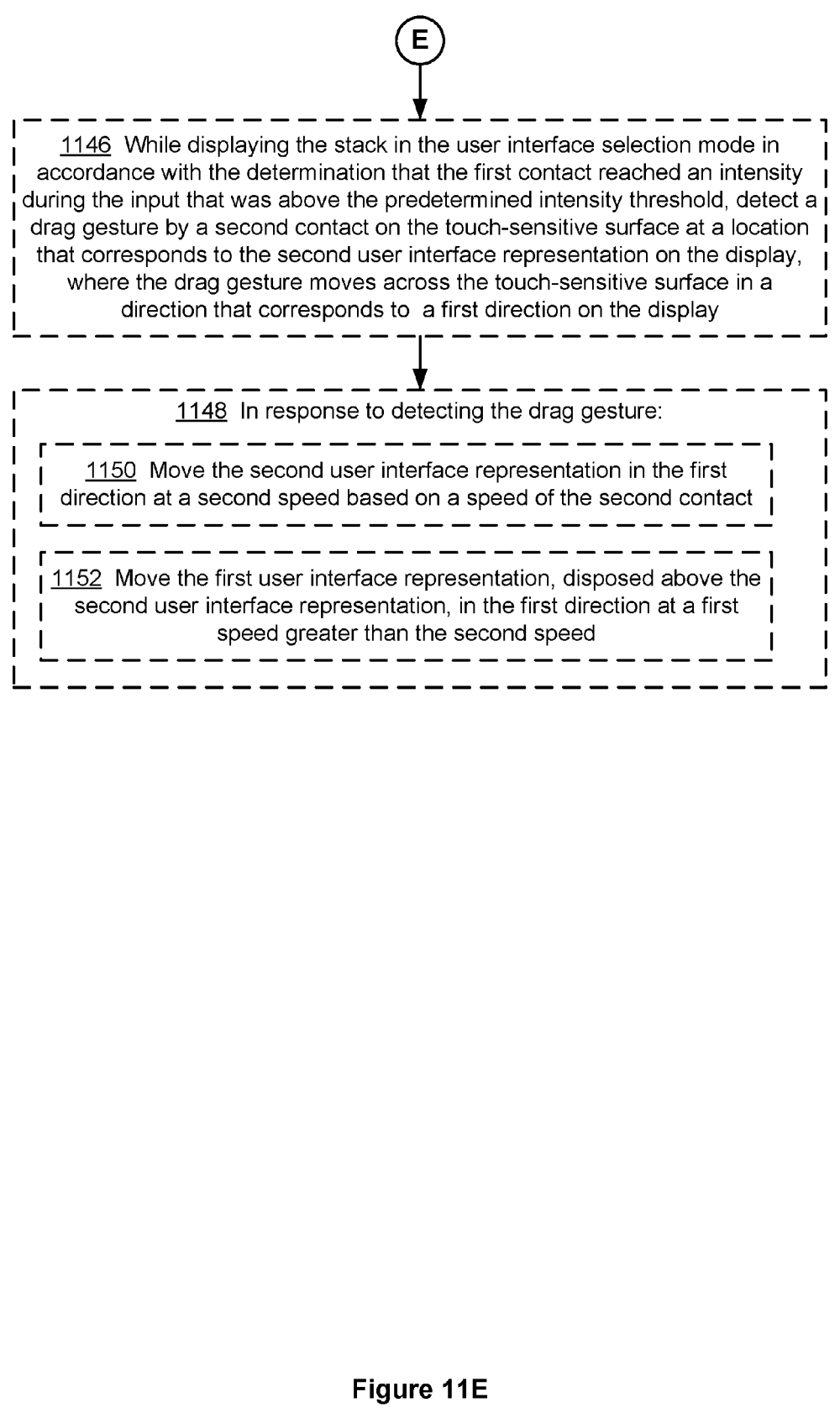

1146 While displaying the stack in the user interface selection mode in accordance with the determination that the first contact reached an intensity during the input that was above the predetermined intensity threshold, detect a drag gesture by a second contact on the touch-sensitive surface at a location that corresponds to the second user interface representation on the display, where the drag gesture moves across the touch-sensitive surface in a direction that corresponds to a first direction on the display 1148 In response to detecting the drag gesture:

1150 Move the second user interface representation in the first direction at a second speed based on a speed of the second contact 1152 Move the first user interface representation, disposed above the second user interface representation, in the first direction at a first speed greater than the second speed

Figure 12B:
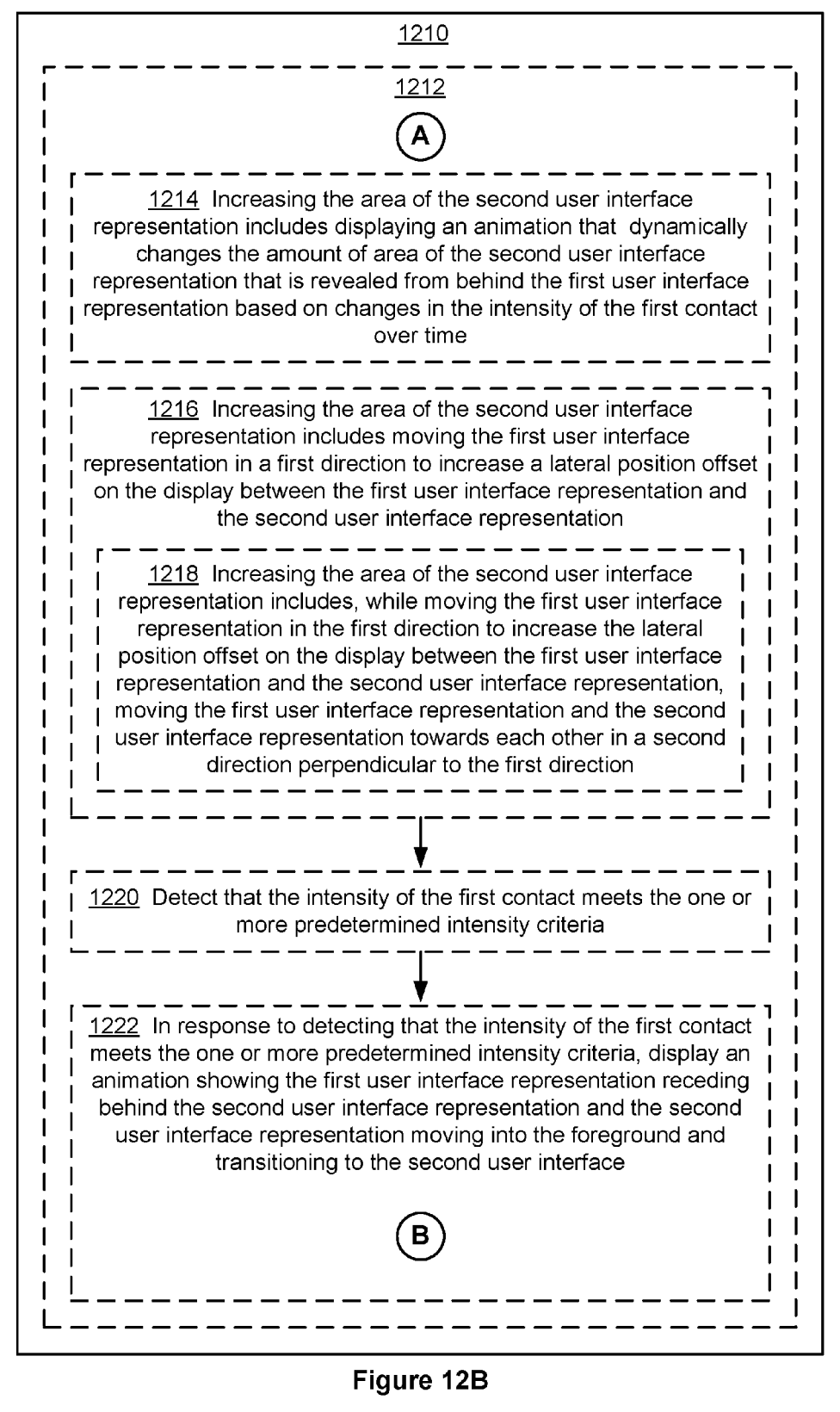

1214 Increasing the area of the second user interface representation includes displaying an animation that dynamically changes the amount of area of the second user interface representation that is revealed from behind the first user interface representation based on changes in the intensity of the first contact over time 1216 Increasing the area of the second user interface representation includes moving the first user interface representation in a first direction to increase a lateral position offset on the display between the first user interface representation and the second user interface representation 1218 Increasing the area of the second user interface representation includes, while moving the first user interface representation in the first direction to increase the lateral position offset on the display between the first user interface representation and the second user interface representation, moving the first user interface representation and the second user interface representation towards each other in a second direction perpendicular to the first direction 1220 Detect that the intensity of the first contact meets the one or more predetermined intensity criteria 1222 In response to detecting that the intensity of the first contact meets the one or more predetermined intensity criteria, display an animation showing the first user interface representation receding behind the second user interface representation and the second user interface representation moving into the foreground and transitioning to the second user interface (B)

Figure 24A:
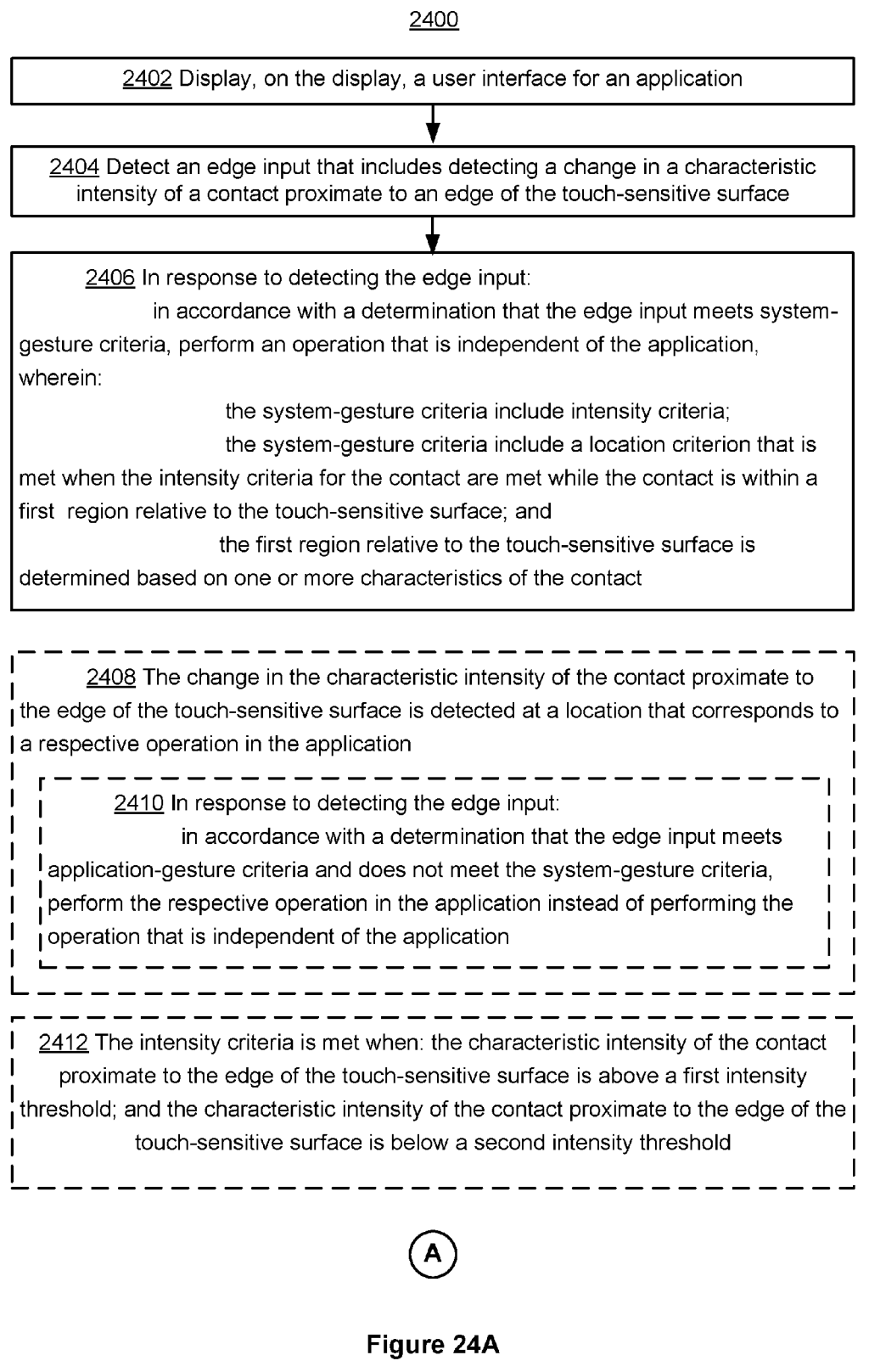

2402 Display, on the display, a user interface for an application

2404 Detect an edge input that includes detecting a change in a characteristic intensity of a contact proximate to an edge of the touch-sensitive surface 2406 In response to detecting the edge input:
in accordance with a determination that the edge input meets system-gesture criteria, perform an operation that is independent of the application, wherein:
the system-gesture criteria include intensity criteria;
the system-gesture criteria include a location criterion that is met when the intensity criteria for the contact are met while the contact is within a first region relative to the touch-sensitive surface; and
the first region relative to the touch-sensitive surface is determined based on one or more characteristics of the contact 2408 The change in the characteristic intensity of the contact proximate to the edge of the touch-sensitive surface is detected at a location that corresponds to a respective operation in the application 2410 In response to detecting the edge input:
in accordance with a determination that the edge input meets application-gesture criteria and does not meet the system-gesture criteria, perform the respective operation in the application instead of performing the operation that is independent of the application 2412 The intensity criteria is met when: the characteristic intensity of the contact proximate to the edge of the touch-sensitive surface is above a first intensity threshold; and the characteristic intensity of the contact proximate to the edge of the touch-sensitive surface is below a second intensity threshold

A 2414 the first region relative to the touch-sensitive surface has first boundaries when the contact proximate to the edge of the touch-sensitive surface has first spatial properties and second boundaries, different from the first boundaries when the contact proximate to the edge of the touch-sensitive surface has second spatial properties

Figure 24B:
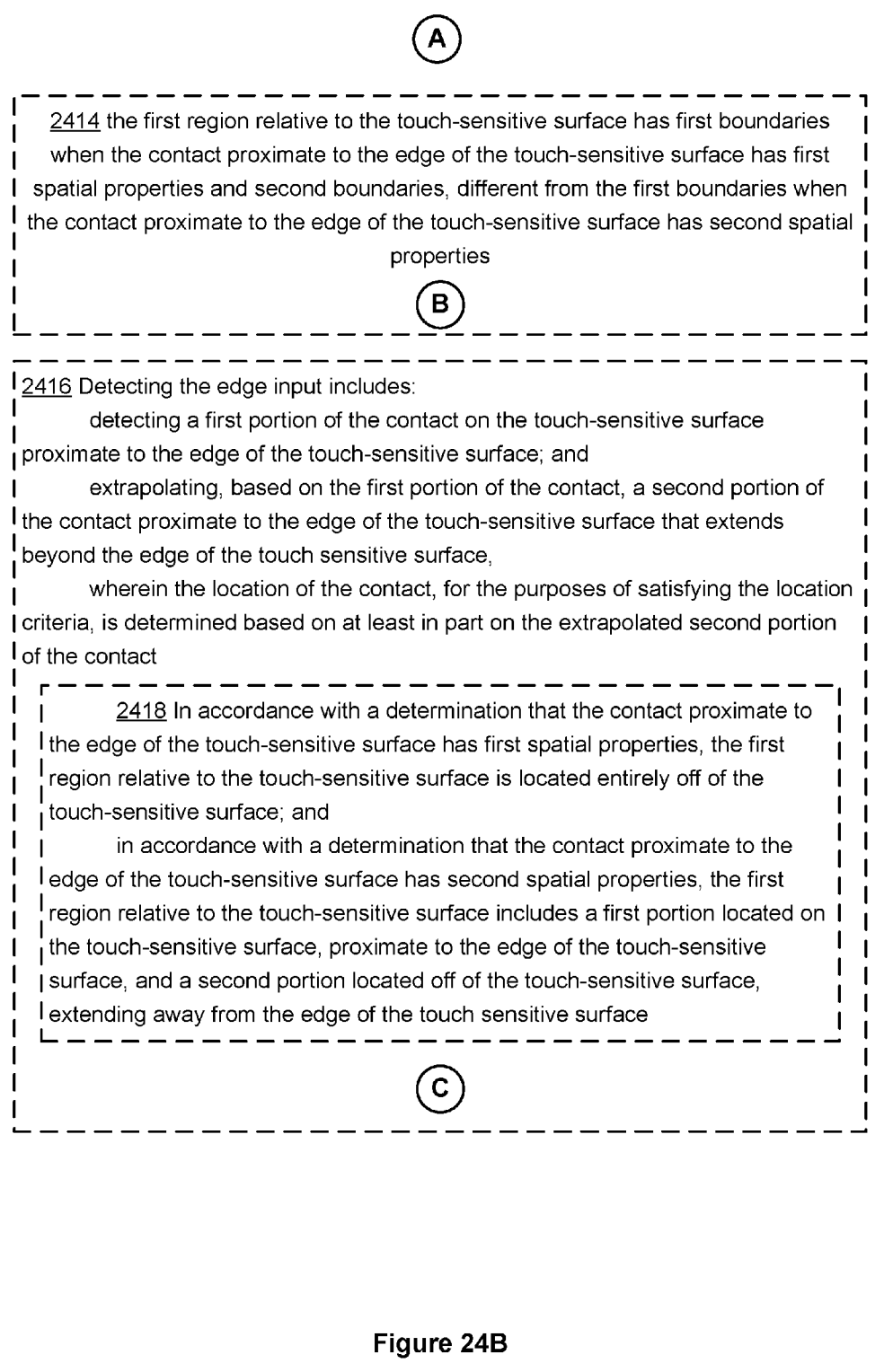

B

2416 Detecting the edge input includes:

detecting a first portion of the contact on the touch-sensitive surface proximate to the edge of the touch-sensitive surface; and extrapolating, based on the first portion of the contact, a second portion of the contact proximate to the edge of the touch-sensitive surface that extends beyond the edge of the touch sensitive surface, wherein the location of the contact, for the purposes of satisfying the location criteria, is determined based on at least in part on the extrapolated second portion of the contact 2418 In accordance with a determination that the contact proximate to the edge of the touch-sensitive surface has first spatial properties, the first region relative to the touch-sensitive surface is located entirely off of the touch-sensitive surface; and in accordance with a determination that the contact proximate to the edge of the touch-sensitive surface has second spatial properties, the first region relative to the touch-sensitive surface includes a first portion located on the touch-sensitive surface, proximate to the edge of the touch-sensitive surface, and a second portion located off of the touch-sensitive surface, extending away from the edge of the touch sensitive surface

Figure 24C:
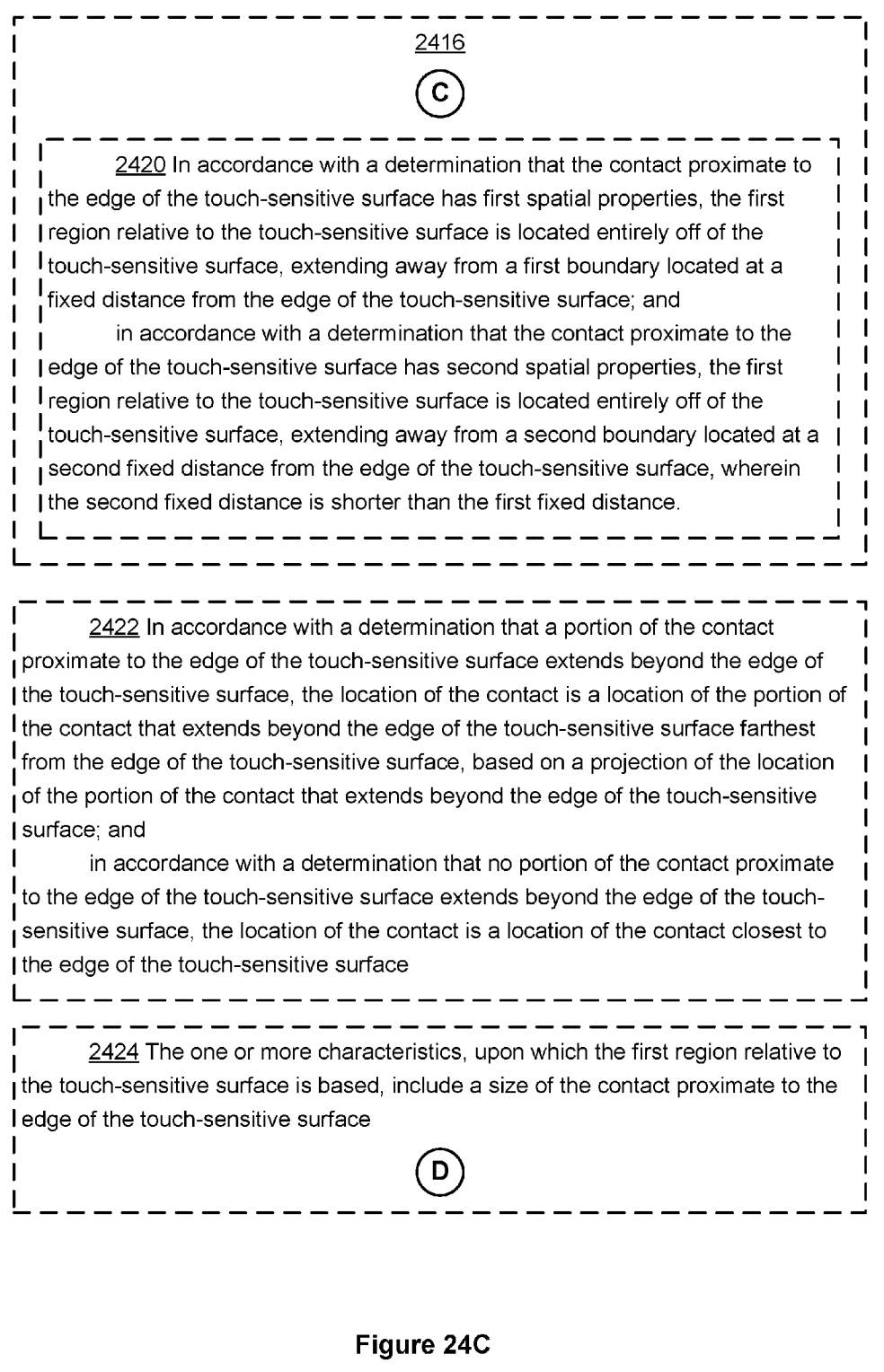

2420 In accordance with a determination that the contact proximate to the edge of the touch-sensitive surface has first spatial properties, the first region relative to the touch-sensitive surface is located entirely off of the touch-sensitive surface, extending away from a first boundary located at a fixed distance from the edge of the touch-sensitive surface; and in accordance with a determination that the contact proximate to the edge of the touch-sensitive surface has second spatial properties, the first region relative to the touch-sensitive surface is located entirely off of the touch-sensitive surface, extending away from a second boundary located at a second fixed distance from the edge of the touch-sensitive surface, wherein the second fixed distance is shorter than the first fixed distance.

2422 In accordance with a determination that a portion of the contact proximate to the edge of the touch-sensitive surface extends beyond the edge of the touch-sensitive surface, the location of the contact is a location of the portion of the contact that extends beyond the edge of the touch-sensitive surface farthest from the edge of the touch-sensitive surface, based on a projection of the location of the portion of the contact that extends beyond the edge of the touch-sensitive surface; and in accordance with a determination that no portion of the contact proximate to the edge of the touch-sensitive surface extends beyond the edge of the touch-sensitive surface, the location of the contact is a location of the contact closest to the edge of the touch-sensitive surface 2424 The one or more characteristics, upon which the first region relative to the touch-sensitive surface is based, include a size of the contact proximate to the edge of the touch-sensitive surface (D)

Figure 24D:
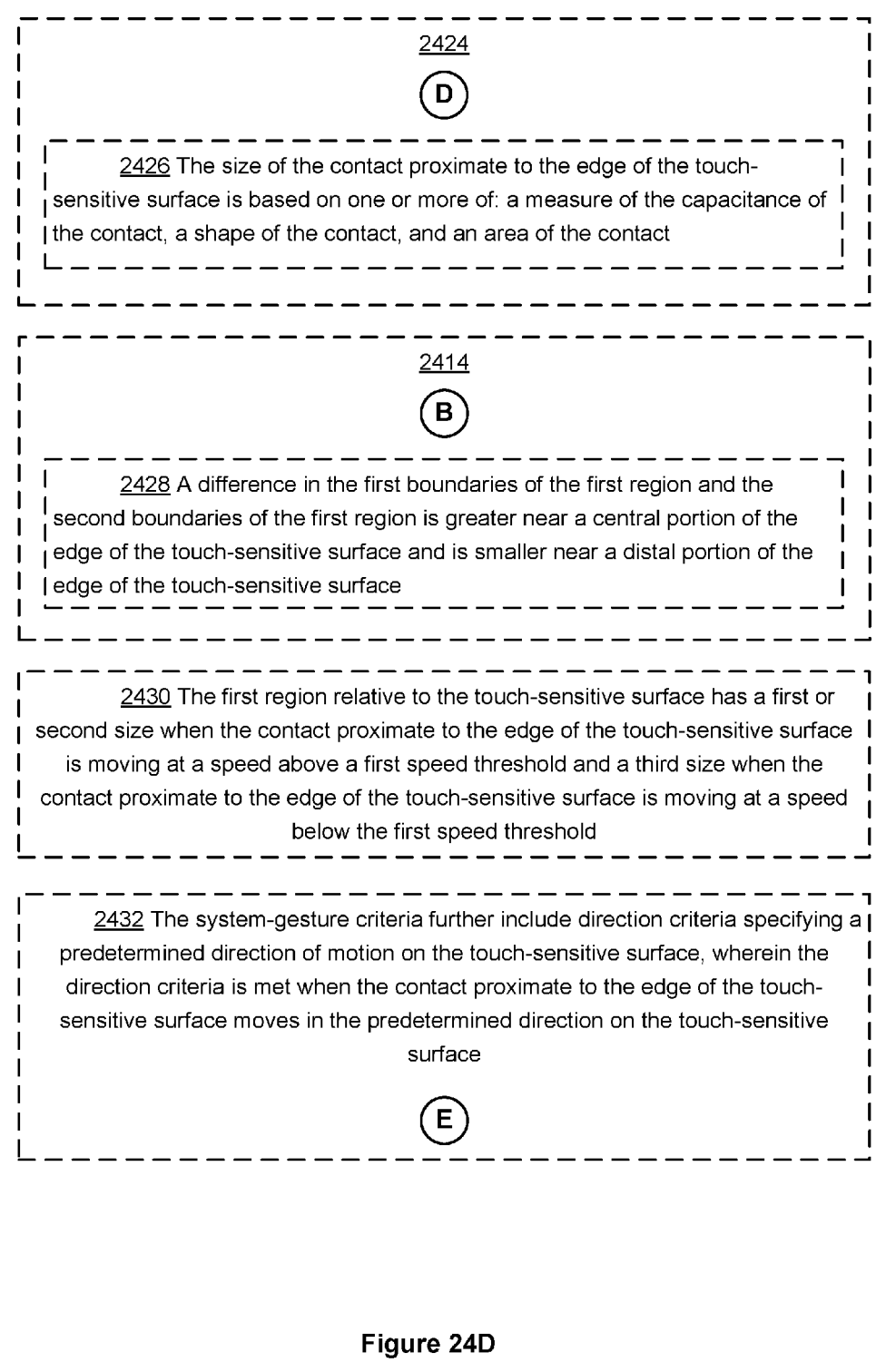

2426 The size of the contact proximate to the edge of the touch-sensitive surface is based on one or more of: a measure of the capacitance of the contact, a shape of the contact, and an area of the contact

2414

(B)

2428 A difference in the first boundaries of the first region and the second boundaries of the first region is greater near a central portion of the edge of the touch-sensitive surface and is smaller near a distal portion of the edge of the touch-sensitive surface 2430 The first region relative to the touch-sensitive surface has a first or second size when the contact proximate to the edge of the touch-sensitive surface is moving at a speed above a first speed threshold and a third size when the contact proximate to the edge of the touch-sensitive surface is moving at a speed below the first speed threshold 2432 The system-gesture criteria further include direction criteria specifying a predetermined direction of motion on the touch-sensitive surface, wherein the direction criteria is met when the contact proximate to the edge of the touch-sensitive surface moves in the predetermined direction on the touch-sensitive surface (E)

Figure 24E:
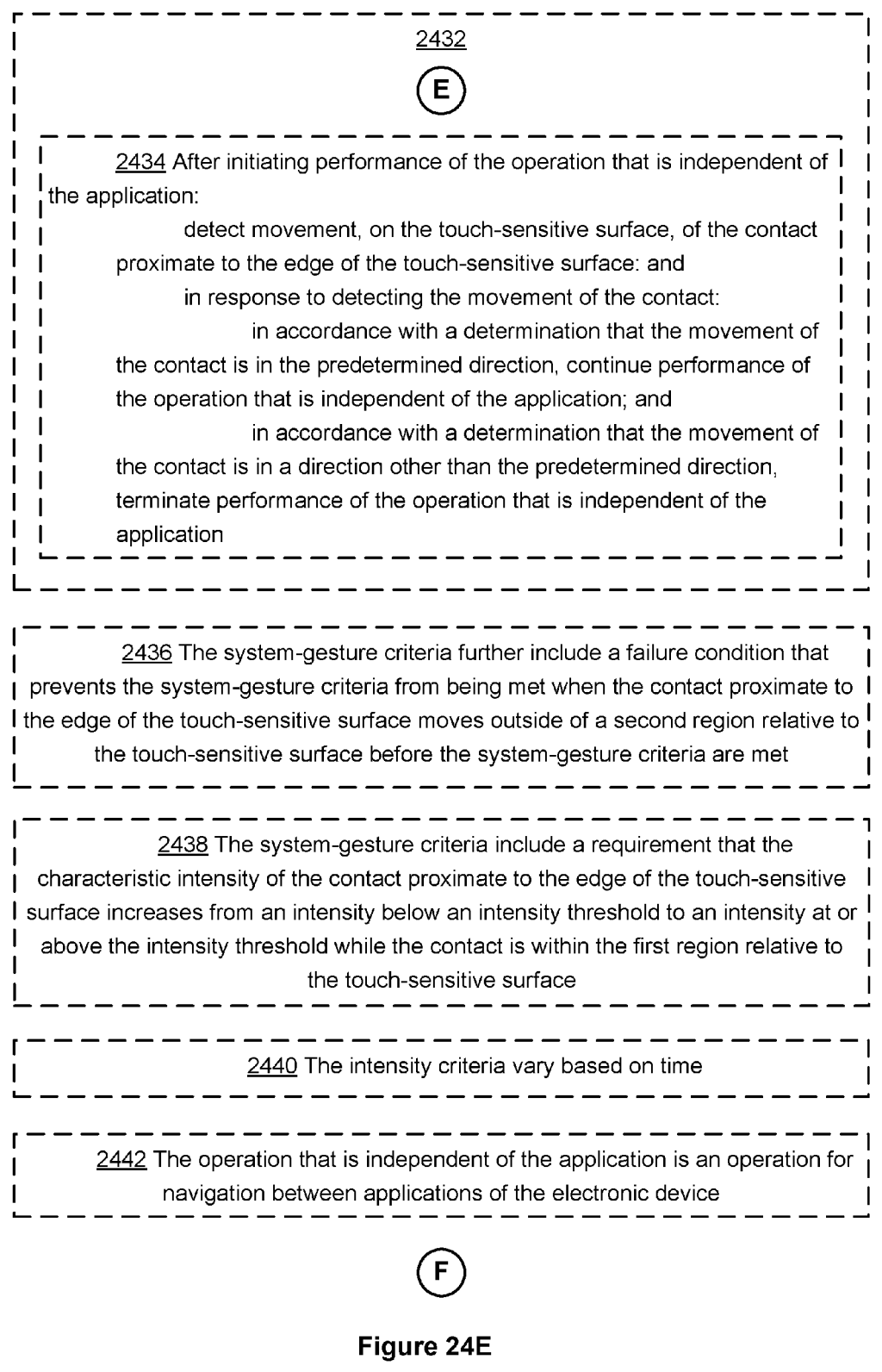

2434 After initiating performance of the operation that is independent of the application:

detect movement, on the touch-sensitive surface, of the contact proximate to the edge of the touch-sensitive surface: and in response to detecting the movement of the contact:

in accordance with a determination that the movement of the contact is in the predetermined direction, continue performance of the operation that is independent of the application; and in accordance with a determination that the movement of the contact is in a direction other than the predetermined direction, terminate performance of the operation that is independent of the application 2436 The system-gesture criteria further include a failure condition that prevents the system-gesture criteria from being met when the contact proximate to the edge of the touch-sensitive surface moves outside of a second region relative to the touch-sensitive surface before the system-gesture criteria are met 2438 The system-gesture criteria include a requirement that the characteristic intensity of the contact proximate to the edge of the touch-sensitive surface increases from an intensity below an intensity threshold to an intensity at or above the intensity threshold while the contact is within the first region relative to the touch-sensitive surface 2440 The intensity criteria vary based on time 2442 The operation that is independent of the application is an operation for navigation between applications of the electronic device (F)

Figure 24F:
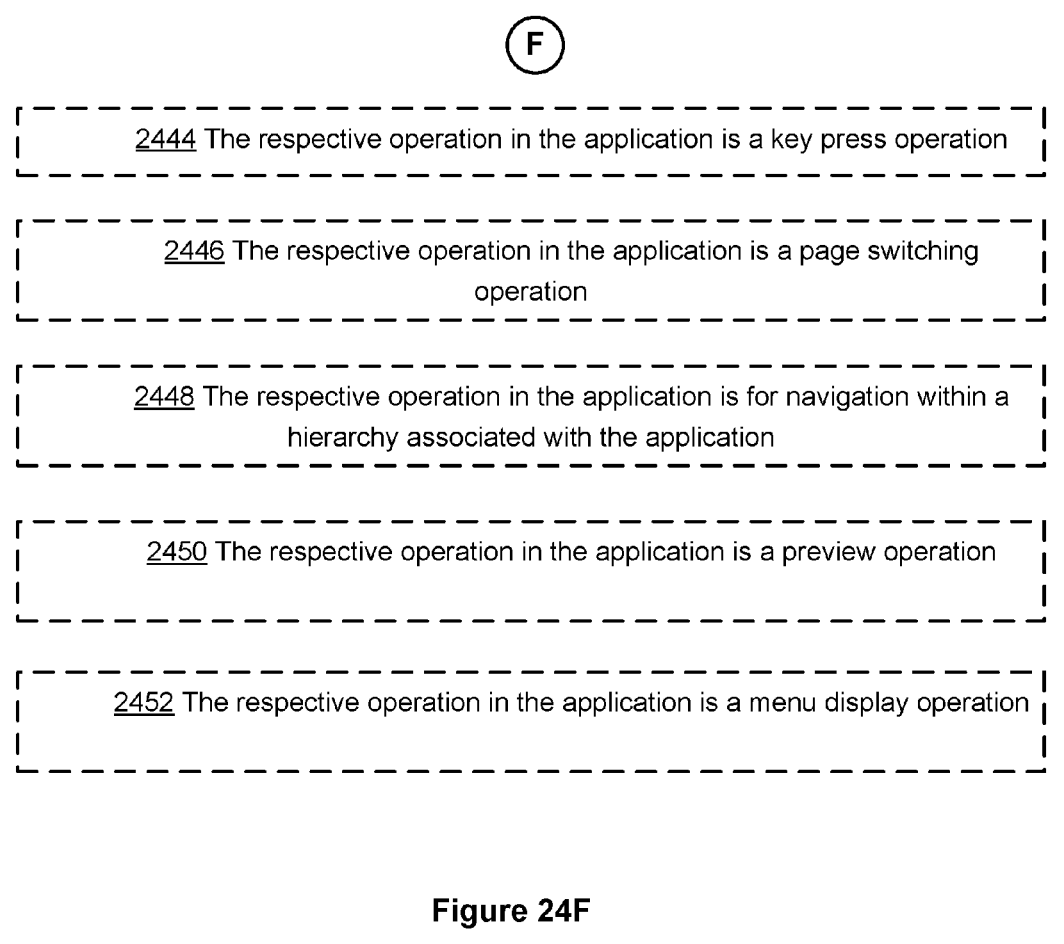

2444 The respective operation in the application is a key press operation

2446 The respective operation in the application is a page switching operation

2448 The respective operation in the application is for navigation within a hierarchy associated with the application 2450 The respective operation in the application is a preview operation 2452 The respective operation in the application is a menu display operation

Figure 25B:
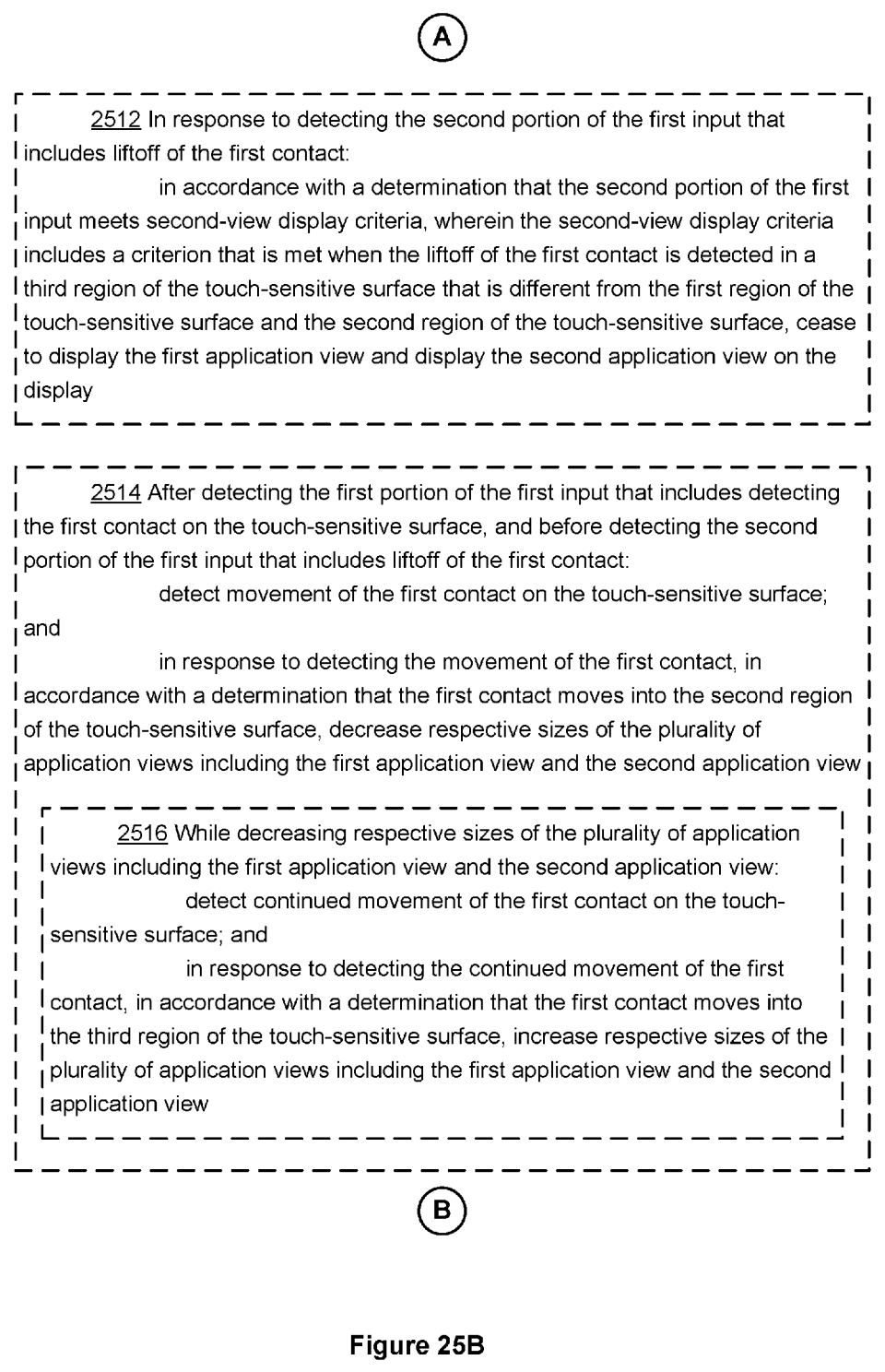

2512 In response to detecting the second portion of the first input that includes liftoff of the first contact:

in accordance with a determination that the second portion of the first input meets second-view display criteria, wherein the second-view display criteria includes a criterion that is met when the liftoff of the first contact is detected in a third region of the touch-sensitive surface that is different from the first region of the touch-sensitive surface and the second region of the touch-sensitive surface, cease to display the first application view and display the second application view on the display 2514 After detecting the first portion of the first input that includes detecting the first contact on the touch-sensitive surface, and before detecting the second portion of the first input that includes liftoff of the first contact:

detect movement of the first contact on the touch-sensitive surface; and in response to detecting the movement of the first contact, in accordance with a determination that the first contact moves into the second region of the touch-sensitive surface, decrease respective sizes of the plurality of application views including the first application view and the second application view 2516 While decreasing respective sizes of the plurality of application views including the first application view and the second application view:

detect continued movement of the first contact on the touch-sensitive surface; and in response to detecting the continued movement of the first contact, in accordance with a determination that the first contact moves into the third region of the touch-sensitive surface, increase respective sizes of the plurality of application views including the first application view and the second application view

Figure 25C:
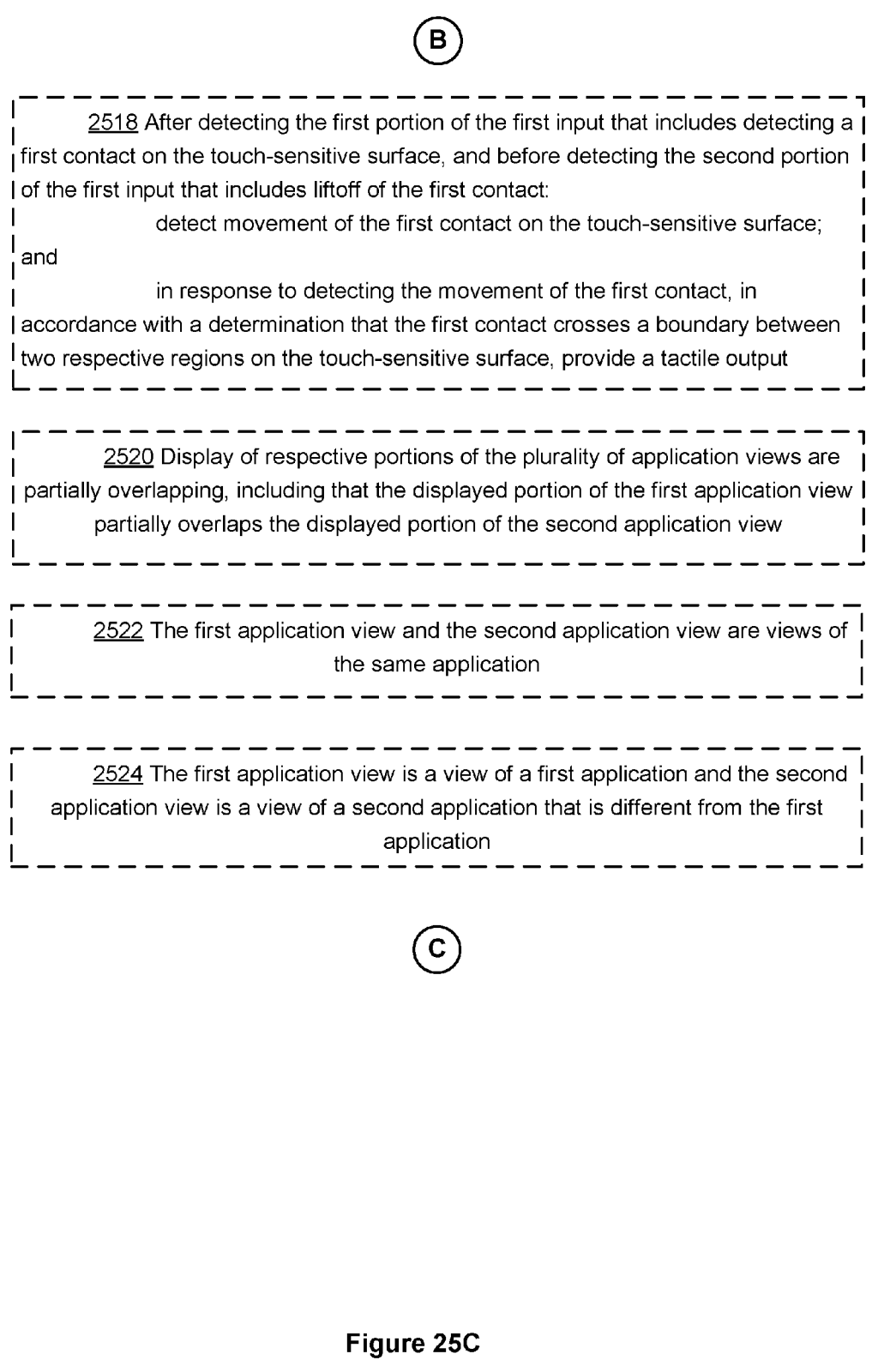

2518 After detecting the first portion of the first input that includes detecting a first contact on the touch-sensitive surface, and before detecting the second portion of the first input that includes liftoff of the first contact:

detect movement of the first contact on the touch-sensitive surface; and in response to detecting the movement of the first contact, in accordance with a determination that the first contact crosses a boundary between two respective regions on the touch-sensitive surface, provide a tactile output 2520 Display of respective portions of the plurality of application views are partially overlapping, including that the displayed portion of the first application view partially overlaps the displayed portion of the second application view 2522 The first application view and the second application view are views of the same application 2524 The first application view is a view of a first application and the second application view is a view of a second application that is different from the first application

Figure 25D:
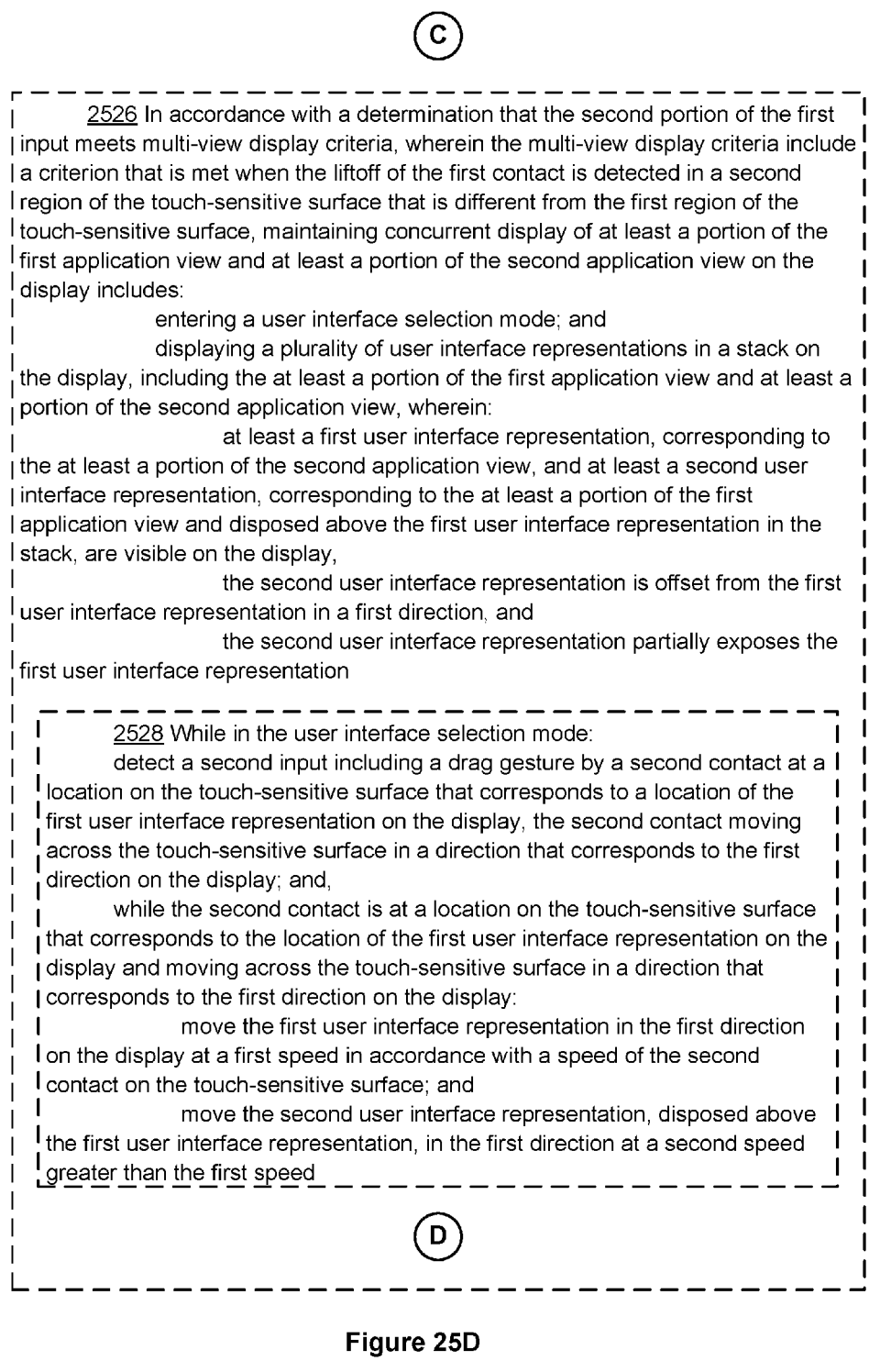

2526 In accordance with a determination that the second portion of the first input meets multi-view display criteria, wherein the multi-view display criteria include a criterion that is met when the liftoff of the first contact is detected in a second region of the touch-sensitive surface that is different from the first region of the touch-sensitive surface, maintaining concurrent display of at least a portion of the first application view and at least a portion of the second application view on the display includes:

entering a user interface selection mode; and displaying a plurality of user interface representations in a stack on the display, including the at least a portion of the first application view and at least a portion of the second application view, wherein:

at least a first user interface representation, corresponding to the at least a portion of the second application view, and at least a second user interface representation, corresponding to the at least a portion of the first application view and disposed above the first user interface representation in the stack, are visible on the display, the second user interface representation is offset from the first user interface representation in a first direction, and the second user interface representation partially exposes the first user interface representation 2528 While in the user interface selection mode:

detect a second input including a drag gesture by a second contact at a location on the touch-sensitive surface that corresponds to a location of the first user interface representation on the display, the second contact moving across the touch-sensitive surface in a direction that corresponds to the first direction on the display; and, while the second contact is at a location on the touch-sensitive surface that corresponds to the location of the first user interface representation on the display and moving across the touch-sensitive surface in a direction that corresponds to the first direction on the display:

move the first user interface representation in the first direction on the display at a first speed in accordance with a speed of the second contact on the touch-sensitive surface; and move the second user interface representation, disposed above the first user interface representation, in the first direction at a second speed greater than the first speed

Figure 25E:
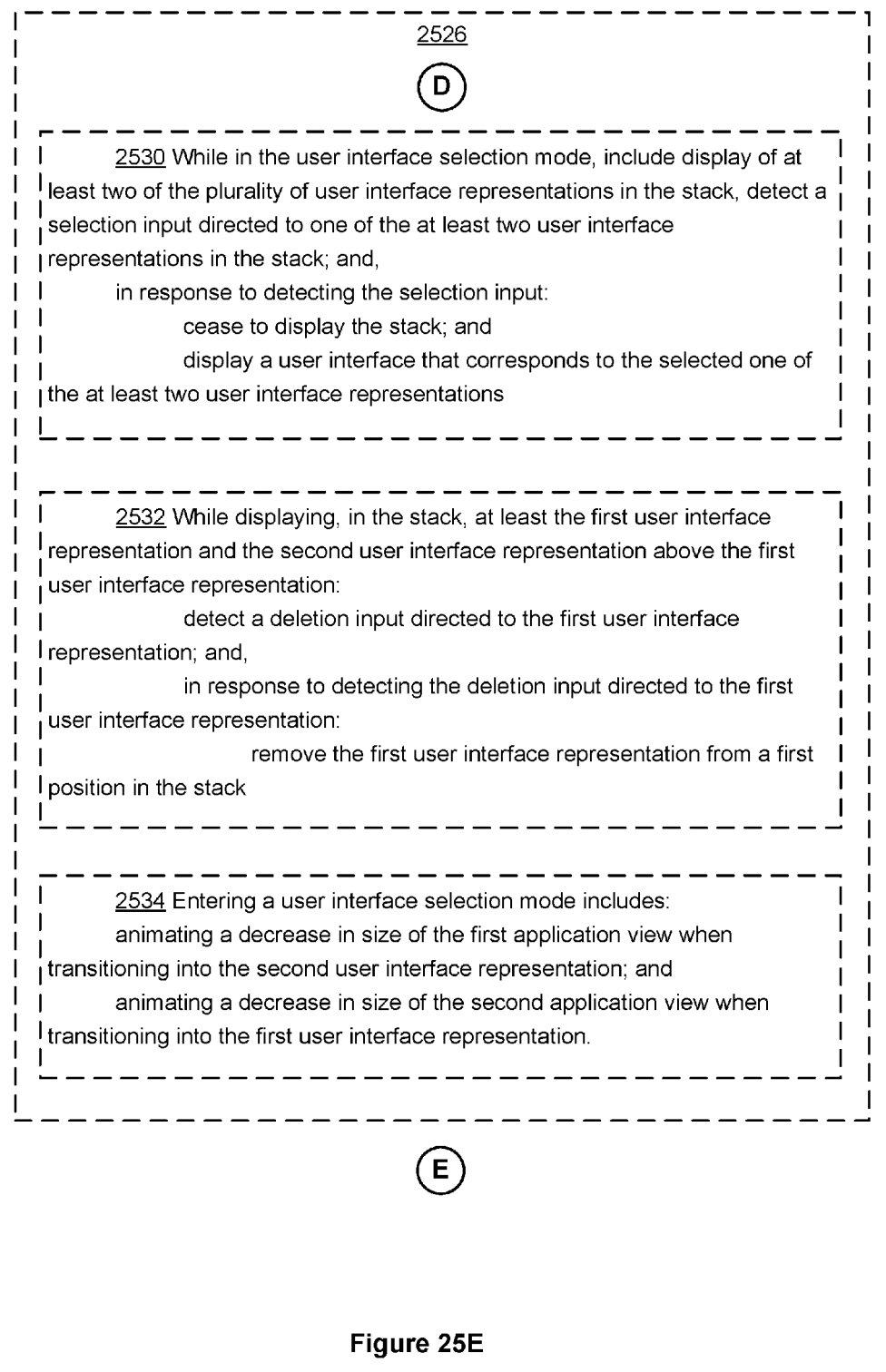

2530 While in the user interface selection mode, include display of at least two of the plurality of user interface representations in the stack, detect a selection input directed to one of the at least two user interface representations in the stack; and, in response to detecting the selection input:

cease to display the stack; and display a user interface that corresponds to the selected one of the at least two user interface representations 2532 While displaying, in the stack, at least the first user interface representation and the second user interface representation above the first user interface representation:

detect a deletion input directed to the first user interface representation; and, in response to detecting the deletion input directed to the first user interface representation:

remove the first user interface representation from a first position in the stack 2534 Entering a user interface selection mode includes:

animating a decrease in size of the first application view when transitioning into the second user interface representation; and animating a decrease in size of the second application view when transitioning into the first user interface representation.

Figure 25F:
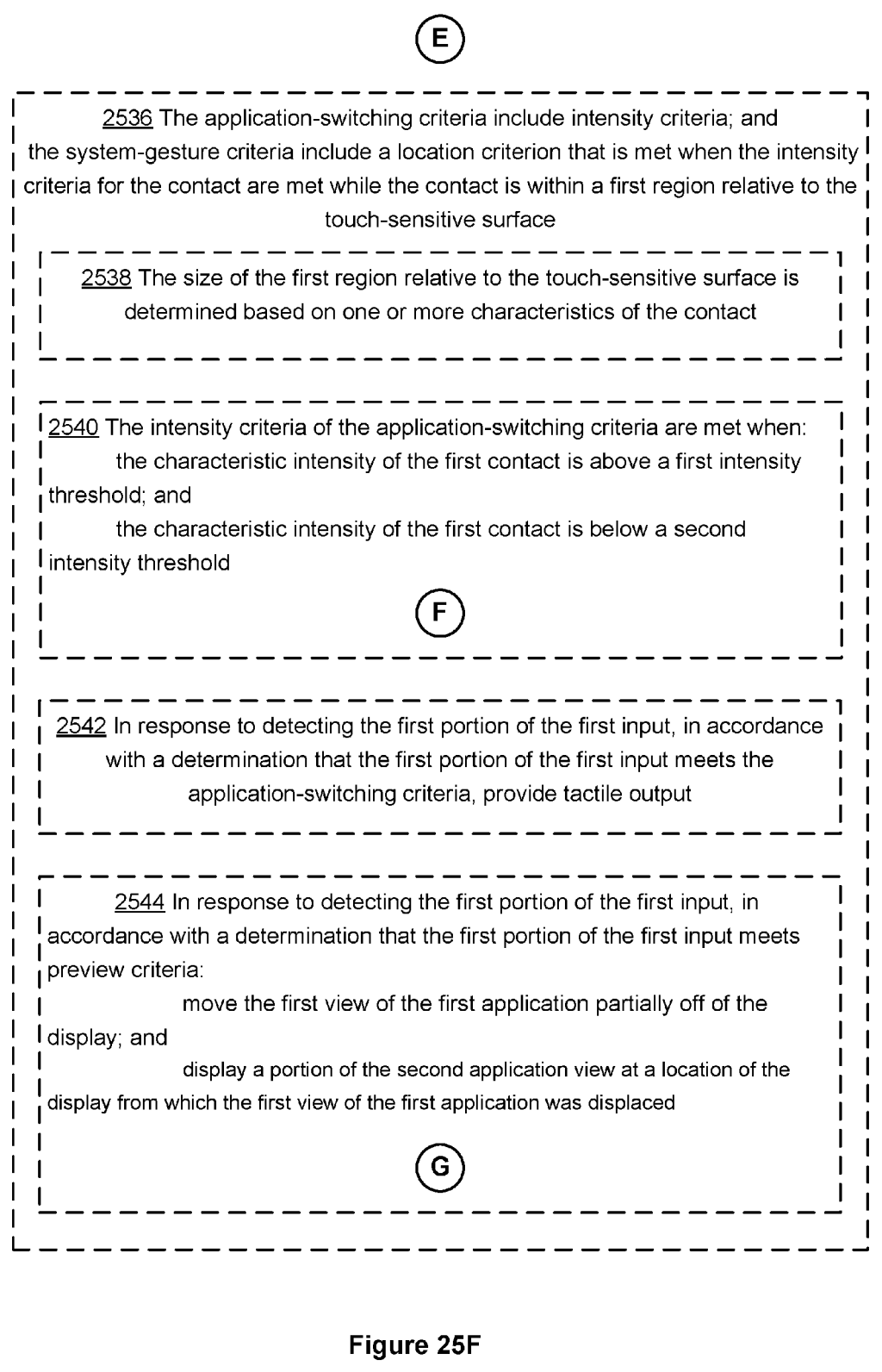

2536 The application-switching criteria include intensity criteria; and the system-gesture criteria include a location criterion that is met when the intensity criteria for the contact are met while the contact is within a first region relative to the touch-sensitive surface 2538 The size of the first region relative to the touch-sensitive surface is determined based on one or more characteristics of the contact 2540 The intensity criteria of the application-switching criteria are met when:
the characteristic intensity of the first contact is above a first intensity threshold; and
the characteristic intensity of the first contact is below a second intensity threshold

F

2542 In response to detecting the first portion of the first input, in accordance with a determination that the first portion of the first input meets the application-switching criteria, provide tactile output 2544 In response to detecting the first portion of the first input, in accordance with a determination that the first portion of the first input meets preview criteria:
move the first view of the first application partially off of the display; and
display a portion of the second application view at a location of the display from which the first view of the first application was displaced

Figure 25G:
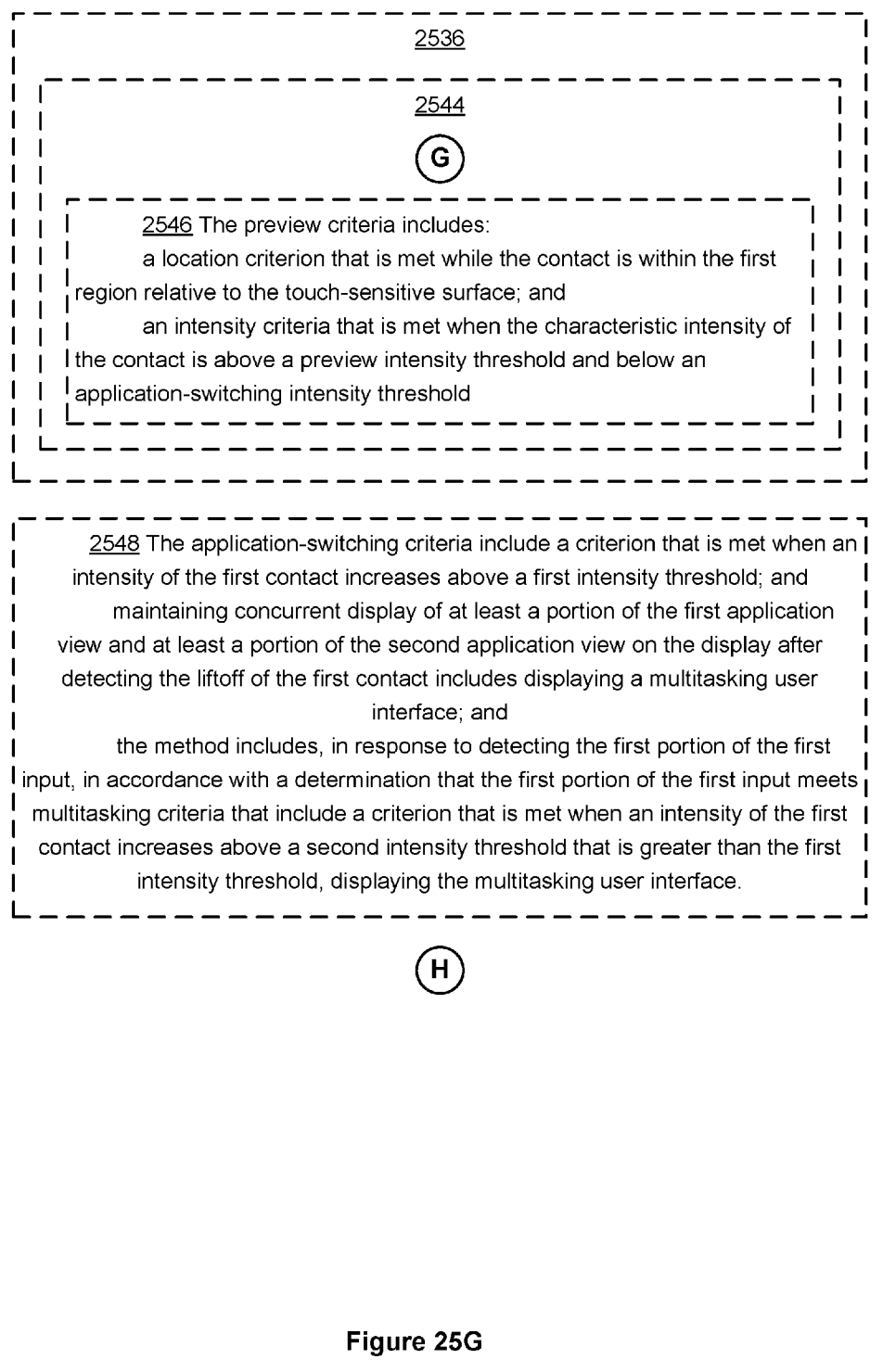

2546 The preview criteria includes:
a location criterion that is met while the contact is within the first region relative to the touch-sensitive surface; and
an intensity criteria that is met when the characteristic intensity of the contact is above a preview intensity threshold and below an application-switching intensity threshold 2548 The application-switching criteria include a criterion that is met when an intensity of the first contact increases above a first intensity threshold; and
maintaining concurrent display of at least a portion of the first application view and at least a portion of the second application view on the display after detecting the liftoff of the first contact includes displaying a multitasking user interface; and
the method includes, in response to detecting the first portion of the first input, in accordance with a determination that the first portion of the first input meets multitasking criteria that include a criterion that is met when an intensity of the first contact increases above a second intensity threshold that is greater than the first intensity threshold, displaying the multitasking user interface.

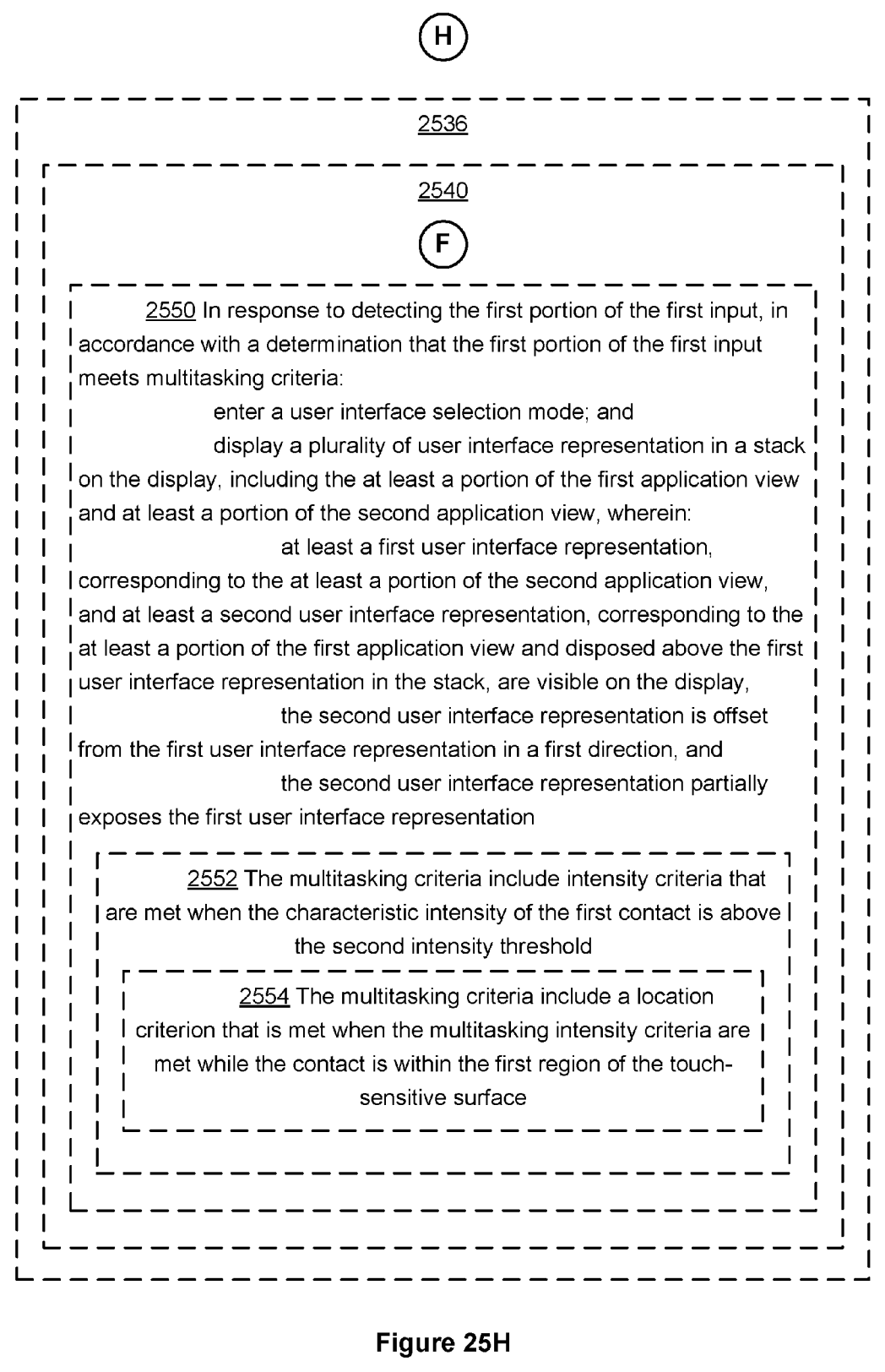

2550 In response to detecting the first portion of the first input, in accordance with a determination that the first portion of the first input meets multitasking criteria:

enter a user interface selection mode; and display a plurality of user interface representation in a stack on the display, including the at least a portion of the first application view and at least a portion of the second application view, wherein:

at least a first user interface representation, corresponding to the at least a portion of the second application view, and at least a second user interface representation, corresponding to the at least a portion of the first application view and disposed above the first user interface representation in the stack, are visible on the display, the second user interface representation is offset from the first user interface representation in a first direction, and the second user interface representation partially exposes the first user interface representation 2552 The multitasking criteria include intensity criteria that are met when the characteristic intensity of the first contact is above the second intensity threshold 2554 The multitasking criteria include a location criterion that is met when the multitasking intensity criteria are met while the contact is within the first region of the touch-sensitive surface

Figure 25H

DEVICES AND METHODS FOR NAVIGATING BETWEEN USER INTERFACES

RELATED APPLICATIONS

This application is a continuation of U.S. application Ser. No. 14/866,511, filed Sep. 25, 2015, which claims priority to U.S. Provisional Application Ser. No. 62/215,696, filed Sep. 8, 2015, entitled "Devices and Methods for Navigating Between User Interfaces"; U.S. Provisional Application Ser. No. 62/213,606, filed Sep. 2, 2015, entitled "Devices and Methods for Navigating Between User Interfaces"; and to U.S. Provisional Application Ser. No. 62/172,226, filed Jun. 7, 2015, entitled "Devices and Methods for Navigating Between User Interfaces," all of which are incorporated by reference herein in their entireties.

TECHNICAL FIELD

This relates generally to electronic devices with touch-sensitive surfaces, including but not limited to electronic devices with touch-sensitive surfaces that detect inputs for navigating between user interfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to navigate between related and unrelated user interfaces (e.g., between user interfaces for different applications and/or within a hierarchy of user interfaces within a single application).

Exemplary user interface hierarchies include groups of related user interfaces used for: organizing files and applications; storing and/or displaying digital images, editable documents (e.g., word processing, spreadsheet, and presentation documents), and/or non-editable documents (e.g., secured files and/or .pdf documents); recording and/or playing video and/or music; text-based communication (e.g., e-mail, texts, tweets, and social networking); voice and/or video communication (e.g., phone calls and video conferencing); and web browsing. A user will, in some circumstances, need to perform such user interface navigations within or between a file management program (e.g., Finder from Apple Inc. of Cupertino, Calif.), an image management application (e.g., Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these navigations and animating the transition between related user interfaces in a user interface hierarchy are cumbersome and inefficient. In addition, these methods take longer than necessary, thereby wasting energy. This latter consideration is particularly important in battery-operated devices.

Additionally, abrupt transitions between different user interfaces can be distracting and jarring for users, reducing the efficiency and enjoyment of the user when using the device.

SUMMARY

Accordingly, there is a need for electronic devices with faster, more efficient methods and interfaces for navigating between user interfaces. Such methods and interfaces optionally complement or replace conventional methods for navigating between user interfaces. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a touch-sensitive surface. The method includes: displaying a plurality of user interface representations in a stack on the display. At least a first user interface representation and a second user interface representation disposed above the first user interface representation in the stack, are visible on the display. The second user interface representation is offset from the first user interface representation in a first direction. The second user interface representation partially exposes the first user interface representation. The method further includes detecting a first drag gesture by a first contact at a location on the touch-sensitive surface that corresponds to a location of the first user interface representation on the display, the first contact moving across the touch-sensitive surface in a direction that corresponds to the first direction on the display. The method also includes, while the first contact is at a location on the touch-sensitive surface that corresponds to the location of the first user interface representation on the display and moving across the touch-sensitive surface in a direction that corresponds to the first direction on the display: moving the first user interface representation in the first direction on the display at a first speed in accordance with a speed of the first contact on the touch-sensitive surface, and moving the second user interface representation, disposed above the first user interface representation, in the first direction at a second speed greater than the first speed.

In accordance with some embodiments, a method is performed at an electronic device with a display, a touch-sensitive surface, and one or more sensors to detect intensity of contacts with the touch-sensitive surface. The method includes: displaying a first user interface on the display. The method further includes, while displaying the first user interface on the display, detecting an input by a first contact on the touch-sensitive surface. The method also includes, while detecting the input by the first contact, displaying a first user interface representation and at least a second user interface representation on the display. The method also includes while displaying the first user interface representation and at least the second user interface representation on the display, detecting termination of the input by the first contact. In response to detecting termination of the input by the first contact: in accordance with a determination that the first contact had a characteristic intensity during the input that was below a predetermined intensity threshold and the first contact moved during the input in a direction across the touch-sensitive surface that corresponds to a predefined direction on the display, displaying a second user interface that corresponds to the second user interface representation; and in accordance with a determination that the first contact had a characteristic intensity during the input that was below the predetermined intensity threshold and the first contact did not move during the input in a direction across the touch-sensitive surface that corresponds to the predefined direction on the display, redisplaying the first user interface.

In accordance with some embodiments, a method is performed at an electronic device with a display, a touch-sensitive surface, and one or more sensors to detect intensity of contacts with the touch-sensitive surface. The method includes: displaying a first user interface on the display. The method further includes, while displaying the first user interface on the display, detecting, on the touch-sensitive surface, an input by a first contact that includes a period of increasing intensity of the first contact. The method also includes, in response to detecting the input by the first contact that includes the period of increasing intensity of the first contact, displaying a first user interface representation for the first user interface and a second user interface representation for a second user interface on the display, where the first user interface representation is displayed over the second user interface representation and partially exposes the second user interface representation. The method also includes, while displaying the first user interface representation and the second user interface representation on the display, detecting that, during the period of increasing intensity of the first contact, the intensity of the first contact meets one or more predetermined intensity criteria. The method further includes, in response to detecting that the intensity of the first contact meets the one or more predetermined intensity criteria: ceasing to display the first user interface representation and the second user interface representation on the display, and displaying the second user interface on the display.

In accordance with some embodiments, a method is performed at an electronic device with a display, a touch-sensitive surface, and one or more sensors to detect intensity of contacts with the touch-sensitive surface. The method includes: displaying a plurality of user interface representations in a stack on the display. At least a first user interface representation, a second user interface representation, and a third user interface representation are visible on the display. The first user interface representation is laterally offset from the second user interface representation in a first direction and partially exposes the second user interface representation. The second user interface representation is laterally offset from the third user interface representation in the first direction and partially exposes the third user interface representation. The method further includes detecting an input by a first contact on the touch-sensitive surface at a location that corresponds to the second user interface representation on the display. The method also includes, in accordance with detecting an increase in intensity of the first contact on the touch-sensitive surface at the location that corresponds to the second user interface representation on the display, increasing an area of the second user interface representation that is exposed from behind the first user interface representation by increasing the lateral offset between the first user interface representation and the second user interface representation.

In accordance with some embodiments, a method is performed at an electronic device with a display and a touch-sensitive surface. The method includes: displaying a plurality of user interface representations in a stack on the display. At least a first user interface representation, a second user interface representation, and a third user interface representation are visible on the display. The second user interface representation is laterally offset from the first user interface representation in a first direction and partially exposes the first user interface representation. The third user interface representation is laterally offset from the second user interface representation in the first direction and partially exposes the second user interface representation. The method further includes detecting a drag gesture by a first contact that moves across the touch-sensitive surface, where movement of the drag gesture by the first contact corresponds to movement across one or more of the user interface representations in the stack. The method also includes, during the drag gesture, when the first contact moves over a location on the touch-sensitive surface that corresponds to the first user interface representation on the display, revealing more of the first user interface representation from behind the second user interface representation on the display.

In accordance with some embodiments, a method is performed at an electronic device with a display, a touch-sensitive surface, and one or more sensors to detect intensity of contacts with the touch-sensitive surface. The method includes: displaying a first user interface of a first application on the display, the first user interface including a backwards navigation control. The method further includes, while displaying the first user interface of the first application on the display, detecting a gesture by a first contact on the touch-sensitive surface at a location that corresponds to the backwards navigation control on the display. The method also includes, in response to detecting the gesture by the first contact on the touch-sensitive surface at a location that corresponds to the backwards navigation control: in accordance with a determination that the gesture by the first contact is a gesture with an intensity of the first contact that meets one or more predetermined intensity criteria, replacing display of the first user interface of the first application with display of a plurality of representations of user interfaces of the first application, including a representation of the first user interface and a representation of a second user interface; and, in accordance with a determination that the gesture by the first contact is a gesture with an intensity of the first contact that does not meet the one or more predetermined intensity criteria, replacing display of the first user interface of the first application with display of the second user interface of the first application.

In accordance with some embodiments, a method is performed at an electronic device with a display, a touch-sensitive surface, and one or more sensors to detect intensity of contacts with the touch-sensitive surface. The method includes: displaying, on the display, a user interface for an application; detecting an edge input that includes detecting a change in a characteristic intensity of a contact proximate to an edge of the touch-sensitive surface; and, in response to detecting the edge input: in accordance with a determination that the edge input meets system-gesture criteria, performing an operation that is independent of the application, wherein: the system-gesture criteria include intensity criteria; the system-gesture criteria include a location criterion that is met when the intensity criteria for the contact are met while the contact is within a first region relative to the touch-sensitive surface; and the first region relative to the touch-sensitive surface is determined based on one or more characteristics of the contact.

In accordance with some embodiments, a method is performed at an electronic device with a display, a touch-sensitive surface, and one or more sensors to detect intensity of contacts with the touch-sensitive surface. The method includes: displaying, on the display, a first view of a first application; while displaying the first view, detecting a first portion of a first input that includes detecting a first contact on the touch-sensitive surface; in response to detecting the first portion of the first input, in accordance with a determination that the first portion of the first input meets application-switching criteria, concurrently displaying, on the display, portions of a plurality of application views including the first application view and a second application view; while concurrently displaying the portions of the plurality of application views, detecting a second portion of the first input that includes liftoff of the first contact; and in response to detecting the second portion of the first input that includes liftoff of the first contact: in accordance with a determination that the second portion of the first input meets first-view display criteria, wherein the first-view display criteria include a criterion that is met when the liftoff of the first contact is detected in a first region of the touch-sensitive surface, ceasing to display the portion of the second application view and displaying the first application view on the display; and in accordance with a determination that the second portion of the first input meets multi-view display criteria, wherein the multi-view display criteria includes a criterion that is met when the liftoff of the first contact is detected in a second region of the touch-sensitive surface that is different from the first region of the touch-sensitive surface, maintaining concurrent display of at least a portion of the first application view and at least a portion of the second application view on the display after detecting the liftoff of the first contact.

In accordance with some embodiments, an electronic device includes a display unit configured to display a user interface, a touch-sensitive surface unit to receive contacts, and a processing unit coupled with the display unit and the touch-sensitive surface unit. The processing unit is configured to: enable display of a plurality of user interface representations in a stack on the display unit. At least a first user interface representation and a second user interface representation disposed above the first user interface representation in the stack, are visible on the display unit. The second user interface representation is offset from the first user interface representation in a first direction. The second user interface representation partially exposes the first user interface representation. The processing unit is further configured to detect a first drag gesture by a first contact at a location on the touch-sensitive surface unit that corresponds to a location of the first user interface representation on the display unit, the first contact moving across the touch-sensitive surface unit in a direction that corresponds to the first direction on the display unit. The processing unit is also configured to, while the first contact is at a location on the touch-sensitive surface unit that corresponds to the location of the first user interface representation on the display unit and moving across the touch-sensitive surface unit in a direction that corresponds to the first direction on the display unit: move the first user interface representation in the first direction on the display unit at a first speed in accordance with a speed of the first contact on the touch-sensitive surface unit; and move the second user interface representation, disposed above the first user interface representation, in the first direction at a second speed greater than the first speed.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display a first user interface on the display unit. The processing unit is further configured to, while displaying the first user interface on the display unit, detect an input by a first contact on the touch-sensitive surface unit. The processing unit is also configured to, while detecting the input by the first contact, enable display of a first user interface representation and at least a second user interface representation on the display unit. The processing unit is further configured to, while displaying the first user interface representation and at least the second user interface representation on the display unit, detect termination of the input by the first contact. The processing unit is also configured to, in response to detecting termination of the input by the first contact: in accordance with a determination that the first contact had a characteristic intensity during the input that was below a predetermined intensity threshold and the first contact moved during the input in a direction across the touch-sensitive surface that corresponds to a predefined direction on the display, enable display of a second user interface that corresponds to the second user interface representation; and, in accordance with a determination that the first contact had a characteristic intensity during the input that was below the predetermined intensity threshold and the first contact did not move during the input in a direction across the touch-sensitive surface that corresponds to the predefined direction on the display, enable redisplay of the first user interface.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of a first user interface on the display unit. The processing unit is further configured to, while displaying the first user interface on the display unit, detect, on the touch-sensitive surface unit, an input by a first contact that includes a period of increasing intensity of the first contact. The processing unit is also configured to, in response to detecting the input by the first contact that includes the period of increasing intensity of the first contact: enable display of a first user interface representation for the first user interface and a second user interface representation for a second user interface on the display unit, where the first user interface representation is displayed over the second user interface representation and partially exposes the second user interface representation. The processing unit is further configured to, while displaying the first user interface representation and the second user interface representation on the display unit, detect that, during the period of increasing intensity of the first contact, the intensity of the first contact meets one or more predetermined intensity criteria. The processing unit is also configures to, in response to detecting that the intensity of the first contact meets the one or more predetermined intensity criteria: cease to enable display of the first user interface representation and the second user interface representation on the display unit, and enable display of the second user interface on the display.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of a plurality of user interface representations in a stack on the display unit. At least a first user interface representation, a second user interface representation, and a third user interface representation are visible on the display unit. The first user interface representation is laterally offset from the second user interface representation in a first direction and partially exposes the second user interface representation. The second user interface representation is laterally offset from the third user interface representation in the first direction and partially exposes the third user interface representation. The processing unit is further configured to detect an input by a first contact on the touch-sensitive surface unit at a location that corresponds to the second user interface representation on the display unit. The processing unit is also configured to, in accordance with detecting an increase in intensity of the first contact on the touch-sensitive surface unit at the location that corresponds to the second user interface representation on the display unit, increasing an area of the second user interface representation that is exposed from behind the first user interface representation by increasing the lateral offset between the first user interface representation and the second user interface representation.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of a plurality of user interface representations in a stack on the display unit. At least a first user interface representation, a second user interface representation, and a third user interface representation are visible on the display unit. The second user interface representation is laterally offset from the first user interface representation in a first direction and partially exposes the first user interface representation. The third user interface representation is laterally offset from the second user interface representation in the first direction and partially exposes the second user interface representation. The processing unit is further configured to detect a drag gesture by a first contact that moves across the touch-sensitive surface unit, where movement of the drag gesture by the first contact corresponds to movement across one or more of the user interface representations in the stack. The processing unit is also configured to, during the drag gesture, when the first contact moves over a location on the touch-sensitive surface unit that corresponds to the first user interface representation on the display unit, reveal more of the first user interface representation from behind the second user interface representation on the display unit.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display a first user interface of a first application on the display unit, the first user interface including a backwards navigation control. The processing unit is further configured to, while displaying the first user interface of the first application on the display unit, detect a gesture by a first contact on the touch-sensitive surface unit at a location that corresponds to the backwards navigation control on the display unit. The processing unit is also configured to, in response to detecting the gesture by the first contact on the touch-sensitive surface unit at a location that corresponds to the backwards navigation control: in accordance with a determination that the gesture by the first contact is a gesture with an intensity of the first contact that meets one or more predetermined intensity criteria, replace display of the first user interface of the first application with display of a plurality of representations of user interfaces of the first application, including a representation of the first user interface and a representation of a second user interface; and, in accordance with a determination that the gesture by the first contact is a gesture with an intensity of the first contact that does not meet the one or more predetermined intensity criteria, replace display of the first user interface of the first application with display of the second user interface of the first application.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

In accordance with some embodiments, an electronic device includes a display unit configured to display content items, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to: enable display, on the display, of a user interface for an application; detect an edge input that includes detecting a change in a characteristic intensity of a contact proximate to an edge of the touch-sensitive surface; and, in response to detecting the edge input: in accordance with a determination that the edge input meets system-gesture criteria, perform an operation that is independent of the application, wherein: the system-gesture criteria include intensity criteria; the system-gesture criteria include a location criterion that is met when the intensity criteria for the contact are met while the contact is within a first region relative to the touch-sensitive surface; and the first region relative to the touch-sensitive surface is determined based on one or more characteristics of the contact.

In accordance with some embodiments, an electronic device includes a display unit configured to display content items, a touch-sensitive surface unit configured to receive user inputs, one or more sensor units configured to detect intensity of contacts with the touch-sensitive surface unit, and a processing unit coupled to the display unit, the touch-sensitive surface unit and the one or more sensor units. The processing unit is configured to: enable display, on the display, of a first view of a first application; while enabling display of the first view, detect a first portion of a first input that includes detecting a first contact on the touch-sensitive surface; in response to detecting the first portion of the first input, in accordance with a determination that the first portion of the first input meets application-switching criteria, enable concurrent display, on the display, of portions of a plurality of application views including the first application view and a second application view; while enabling concurrent display of the portions of the plurality of application views, detect a second portion of the first input that includes liftoff of the first contact; and in response to detecting the second portion of the first input that includes liftoff of the first contact: in accordance with a determination that the second portion of the first input meets first-view display criteria, wherein the first-view display criteria include a criterion that is met when the liftoff of the first contact is detected in a first region of the touch-sensitive surface, cease to enable display of the portion of the second application view and enable display of the first application view on the display; and in accordance with a determination that the second portion of the first input meets multi-view display criteria, wherein the multi-view display criteria includes a criterion that is met when the liftoff of the first contact is detected in a second region of the touch-sensitive surface that is different from the first region of the touch-sensitive surface, maintain concurrent display of at least a portion of the first application view and at least a portion of the second application view on the display after detecting the liftoff of the first contact.

Thus, electronic devices with displays, touch-sensitive surfaces and optionally one or more sensors to detect intensity of contacts with the touch-sensitive surface are provided with faster, more efficient methods and interfaces for navigating between user interfaces, thereby increasing the effectiveness, efficiency, and user satisfaction with such devices. Such methods and interfaces may complement or replace conventional methods for navigating between user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 10A-10H are flow diagrams illustrating a method of navigating between user interface representations in a user interface selection mode in accordance with some embodiments.

FIGS. 11A-11E are flow diagrams illustrating a method of navigating between a displayed user interface and previously displayed user interfaces in accordance with some embodiments.

FIGS. 12A-12E are flow diagrams illustrating a method of navigating between a displayed user interface and the user interface immediately preceding the displayed user interface in accordance with some embodiments.

FIGS. 24A-24F are flow diagrams illustrating a method of invoking a user interface selection mode and for navigating between user interfaces in an application in accordance with some embodiments.

FIGS. 25A-25H are flow diagrams illustrating a method of invoking a user interface selection mode and for navigating between user interfaces in an application in accordance with some embodiments.

DESCRIPTION OF EMBODIMENTS

Figure 1A:
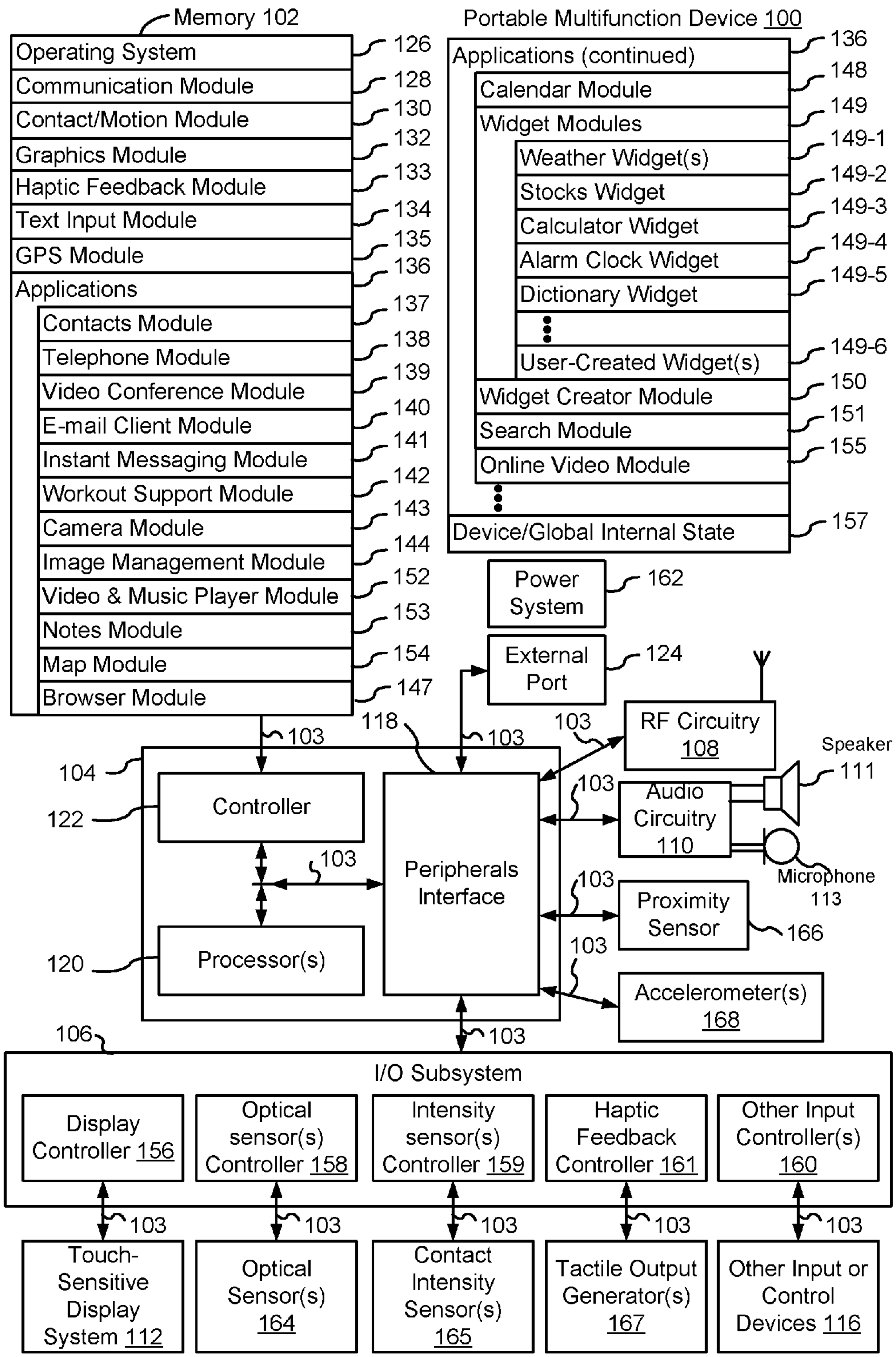
FIG. 1A is a block diagram illustrating a portable multifunction device with a touch-sensitive display in accordance with some embodiments.

Many electronic devices have graphical user interfaces for multiple different applications. A user commonly needs to access multiple different applications in succession. It is more efficient to maintain applications in an active state (e.g., open) when working in this fashion because it is time consuming and laborious to be opening and closing the same application multiple times a day. However, when multiple applications are open on an electronic device simultaneously, it can likewise be difficult to navigate through the open applications to identify and activate display of a desired application. Likewise, it is cumbersome to navigating through hierarchies with a large number of items (e.g., files, emails, previously displayed web pages, etc.) The present disclosure improves this processing by providing efficient and intuitive devices, methods, and user interfaces for navigating through representations of active applications and complex hierarchies. In some embodiments, the improvements are achieved by providing methods of navigating through a large number of items with fewer and smaller user inputs. In some embodiments, the improvements are achieved by incorporating heuristics based on sensing differences in the intensity of a contact, which does not require the user to make multiple user inputs, or even lift the contact away from a touch-sensitive surface to make a selection.

Below, FIGS. 1A-1B, 2, and 3 provide a description of exemplary devices. FIGS. 4A-4B, 5A-5HH, 6A-6V, 7A-7O, 8A-8R, 9A-9H, 22A-22BA, and 23A-23T illustrate exemplary user interfaces for navigating between user interfaces. FIGS. 10A-10H, 11A-11E, 12A-12E, 13A-13D, 14A-14C, 15, 24A-24F, and 25A-25H are flow diagrams of methods of navigating between user interface representations. The user interfaces in FIGS. 5A-5HH, 6A-6V, 7A-7O, 8A-8R, 9A-9H, 22A-22BA, and 23A-23T are used to illustrate the processes in FIGS. 10A-10H, 11A-11E, 12A-12E, 13A-13D, 14A-14C, 15, 24A-24F, and 25A-25H.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
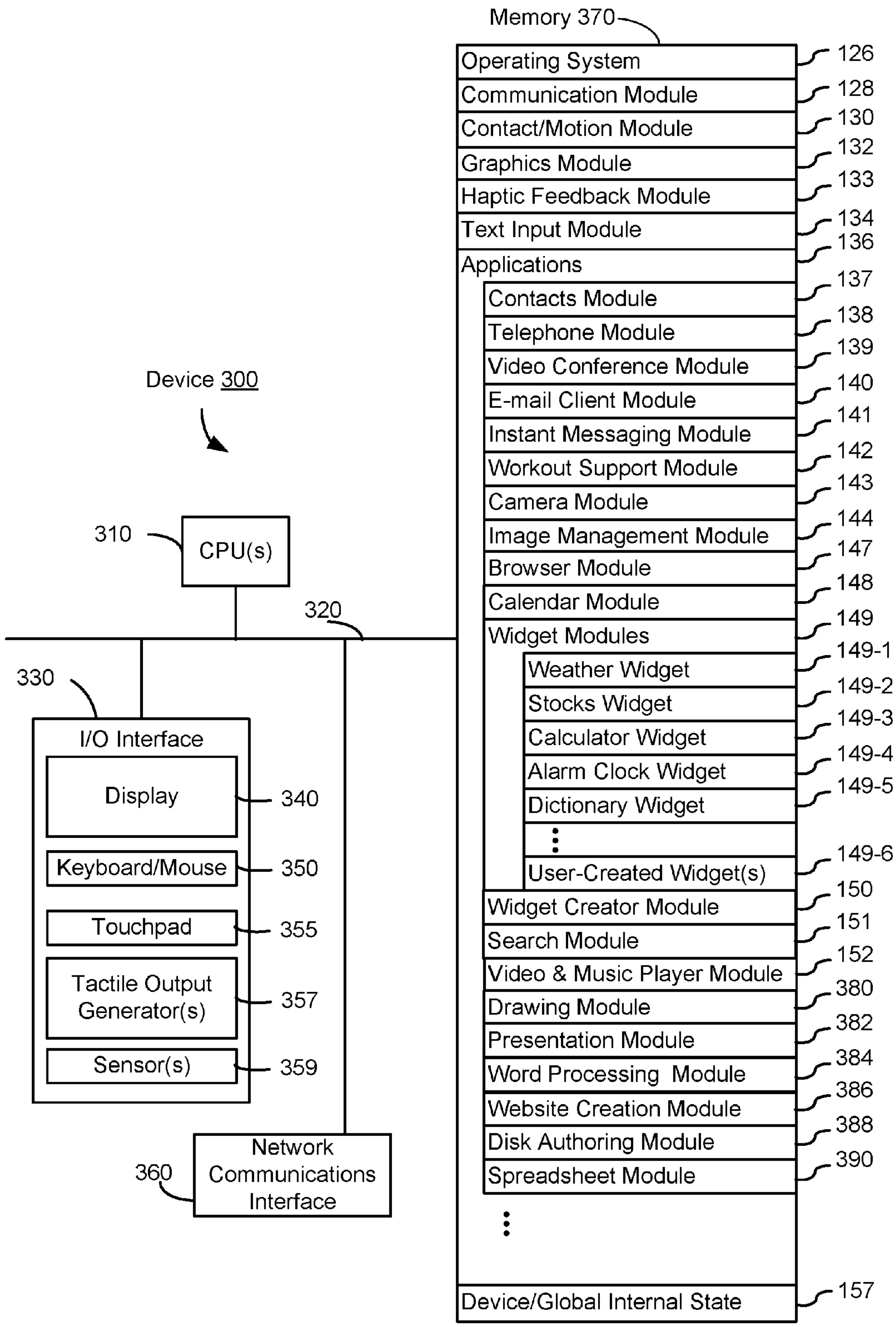
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
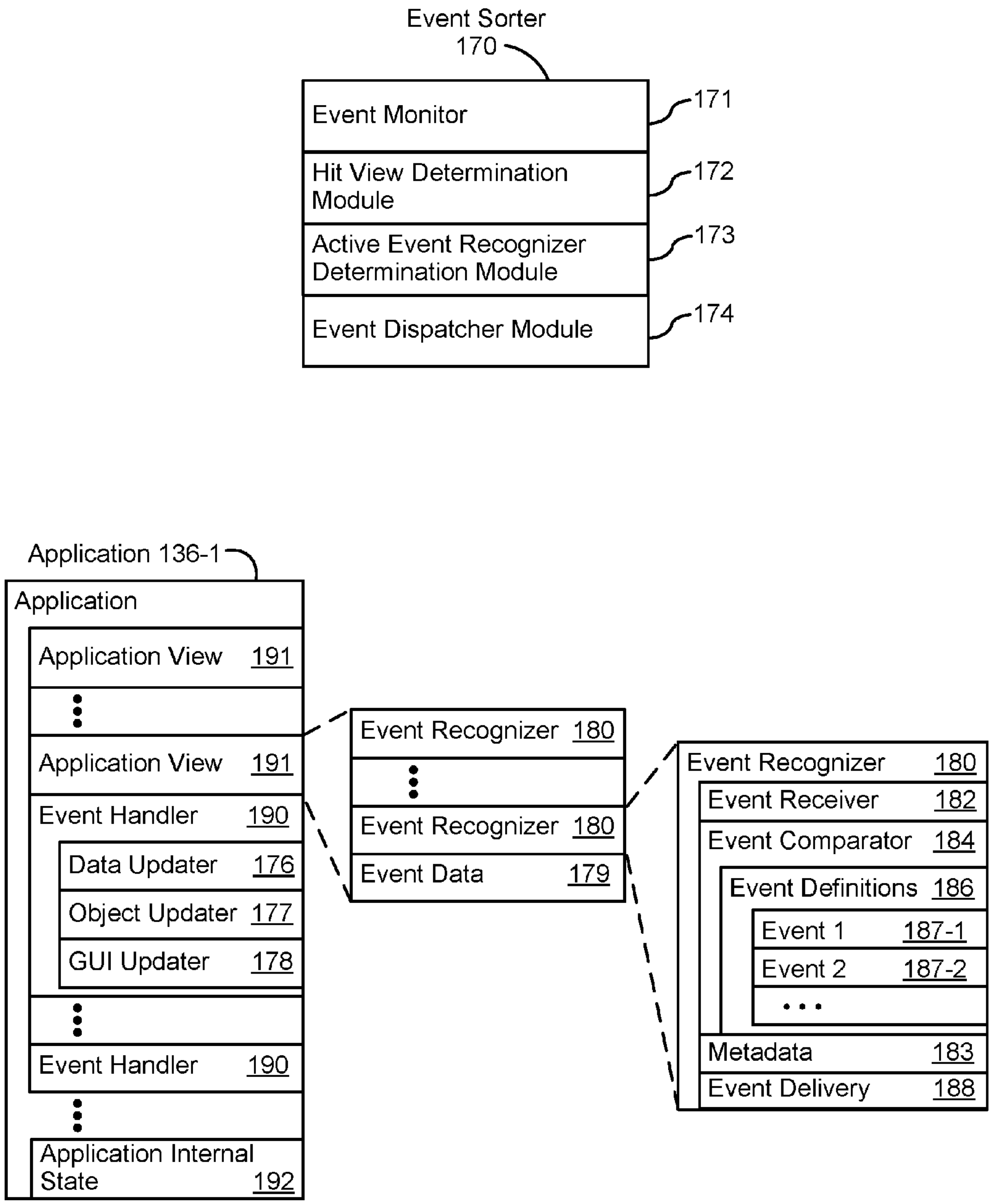
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIGS. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
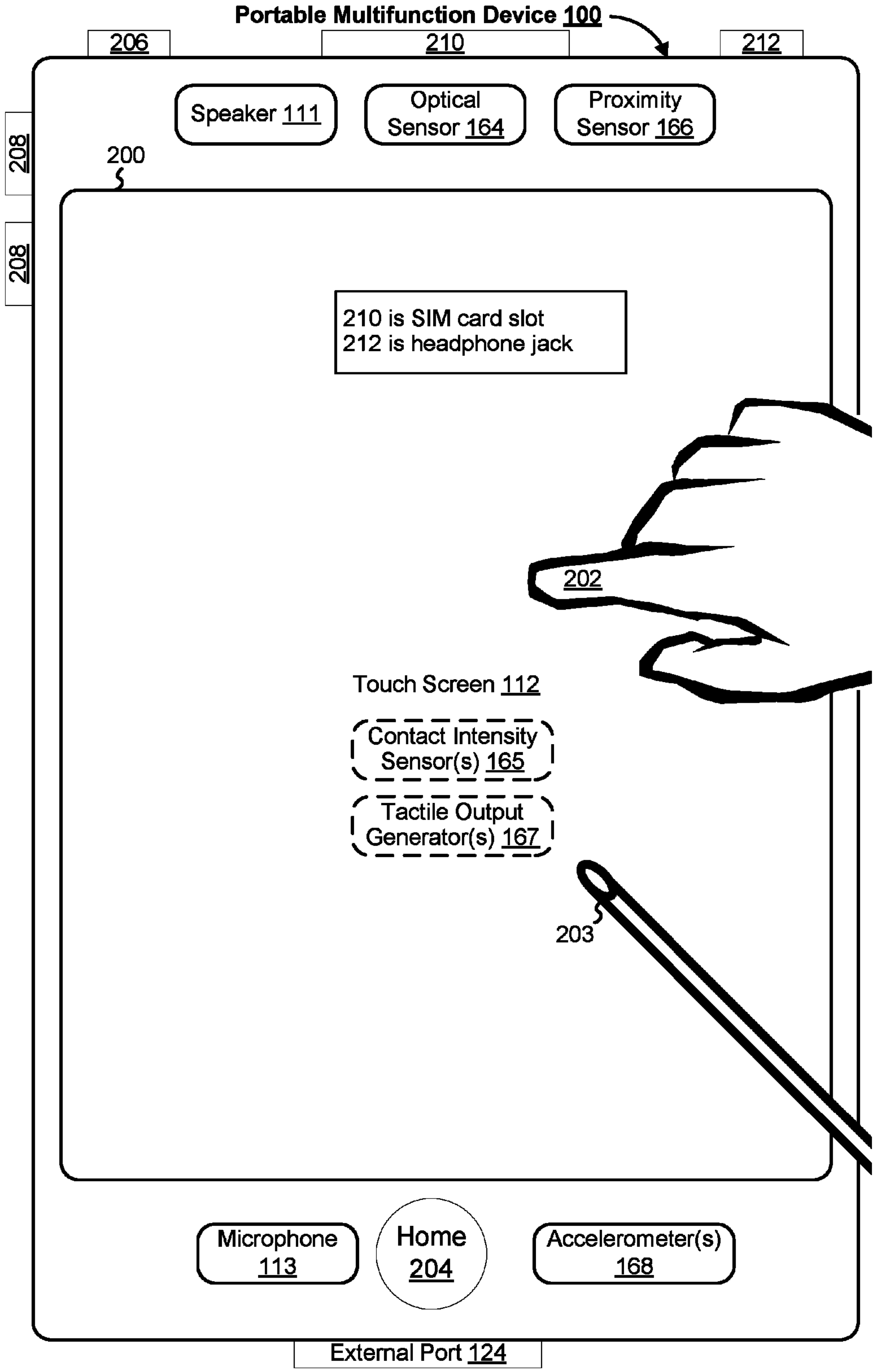
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
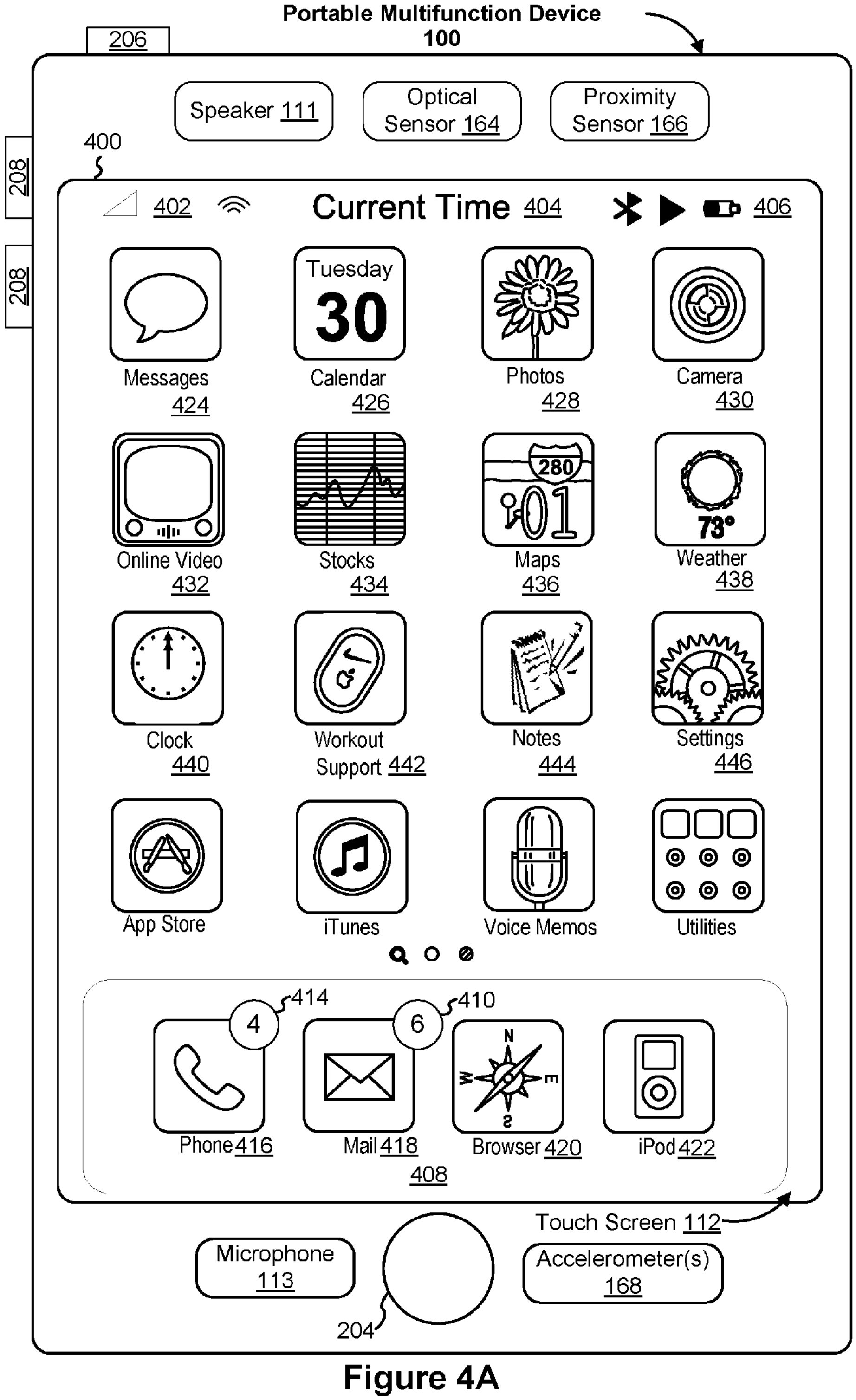
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Map;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
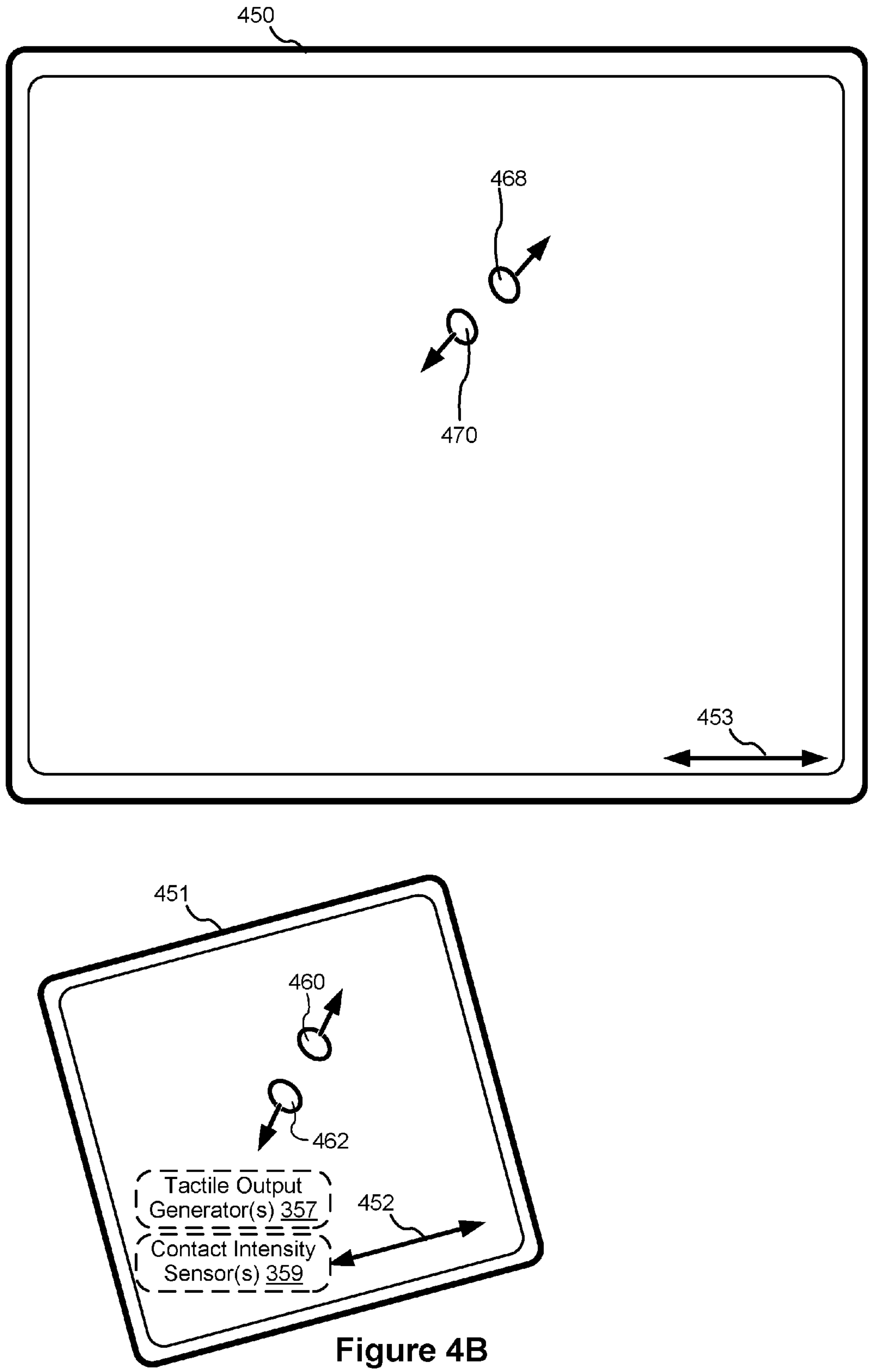
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein (e.g., FIGS. 5A-5HH, 6A-6V, 7A-7O, 8A-8R, 9A-9H, 22A-23BA) optionally include various intensity diagrams that show the current intensity of the contact on the touch-sensitive surface relative to one or more intensity thresholds (e.g., a contact detection intensity threshold $IT_0$, a hint intensity threshold $IT_H$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
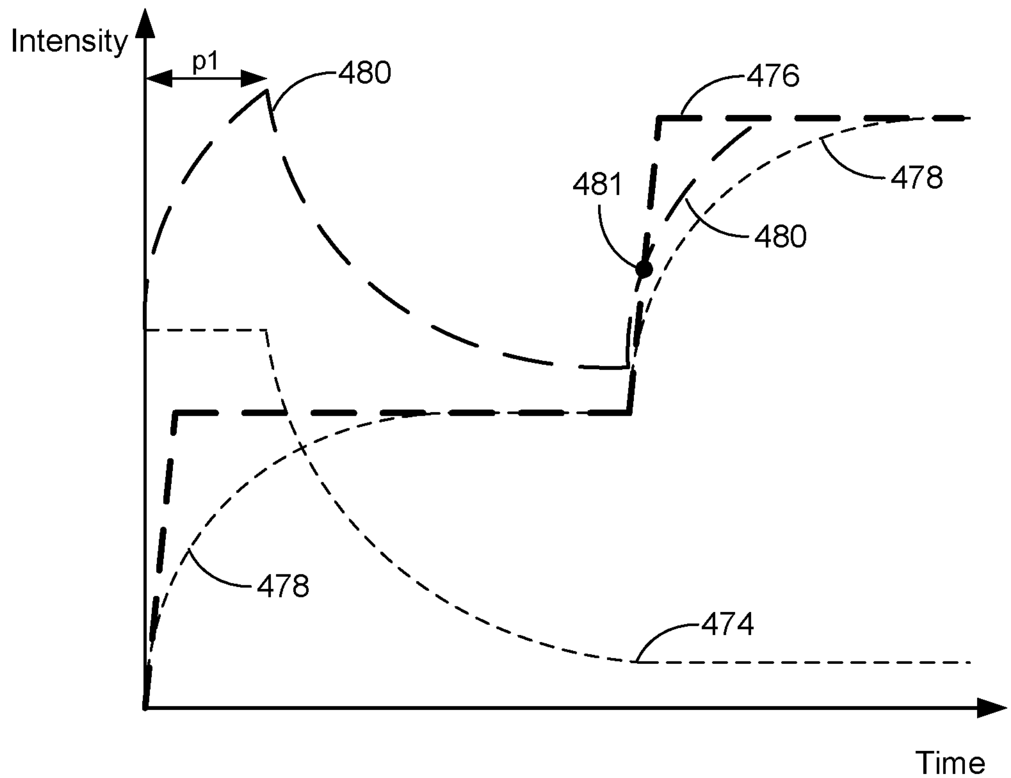
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
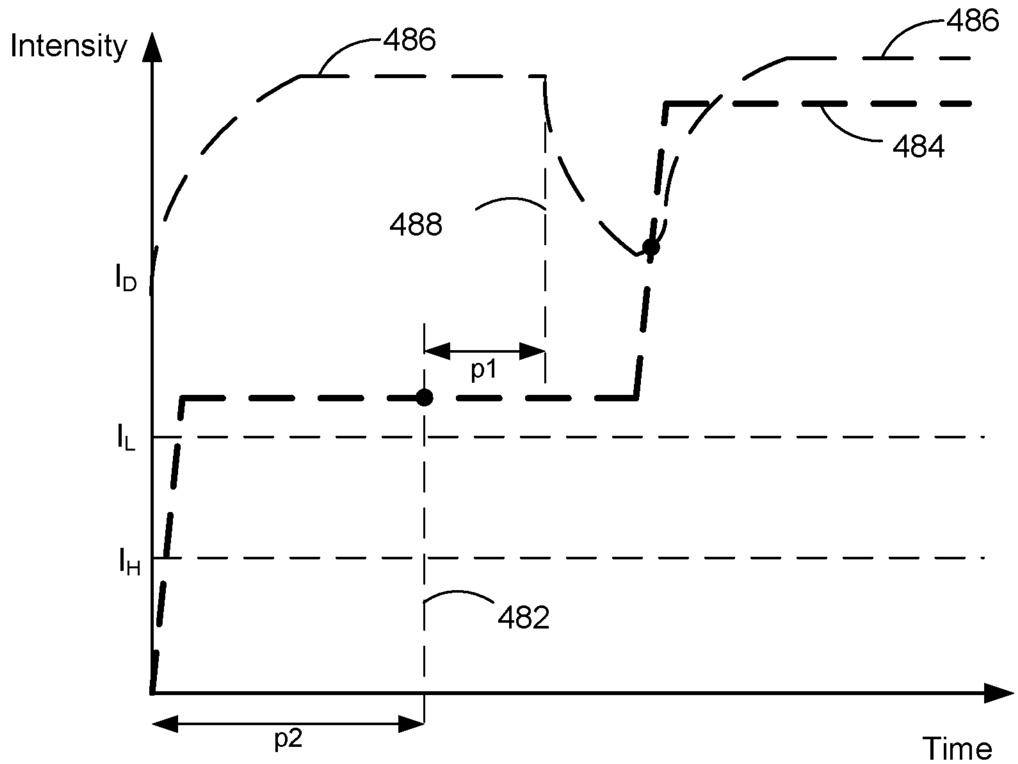

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
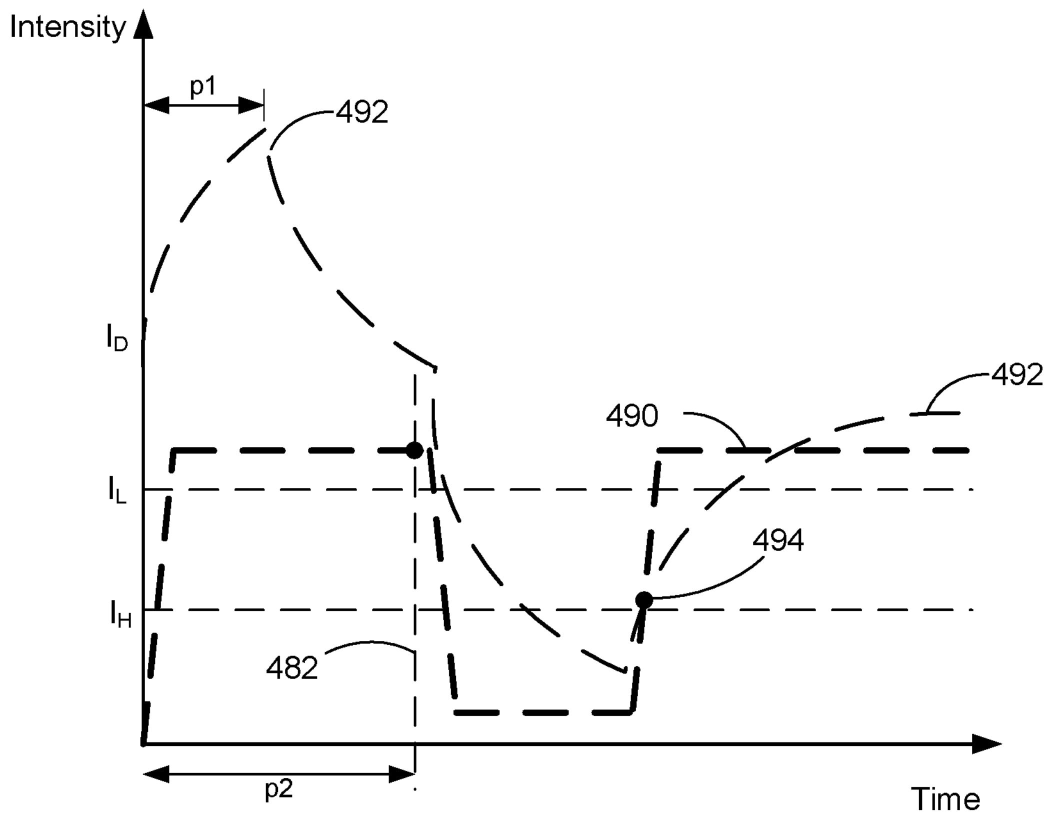

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

FIGS. 5A-5HH illustrate exemplary user interfaces for navigating between user interfaces in accordance with some embodiments. The user interfaces in these figures are used to illustrate the processes described below, including the processes in FIGS. 10A-10H, 11A-11E, 12A-12E, 13A-13D, 14A-14C, 15, 24A-24F, and 25A-25H. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5B:
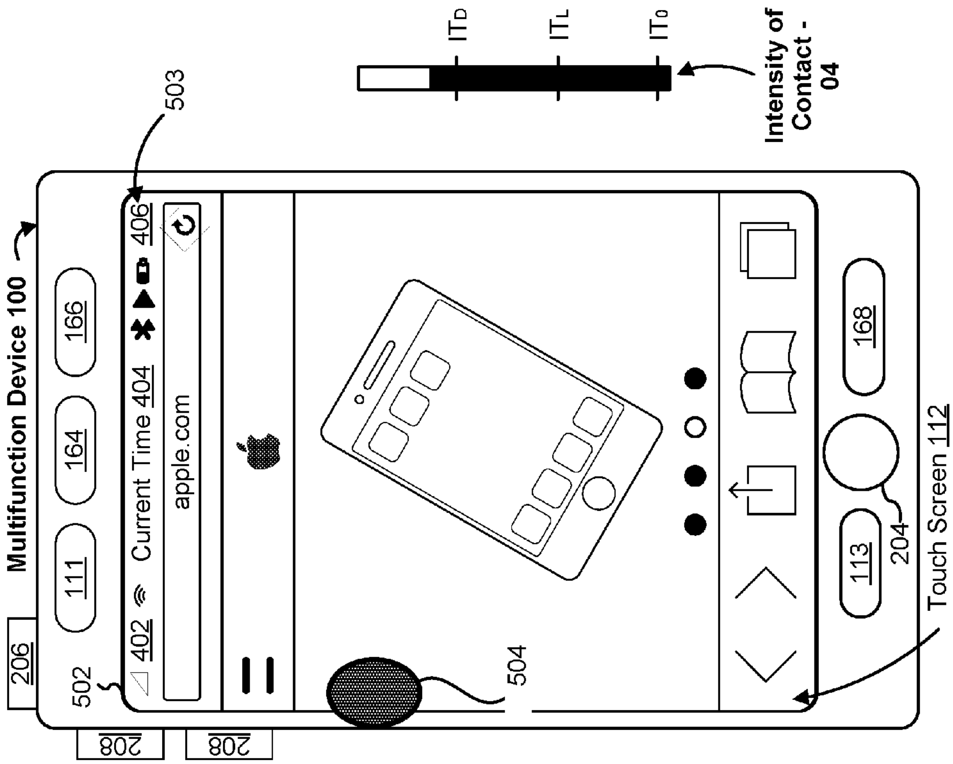
FIGS. 5A-5HH illustrate exemplary user interfaces for navigating between user interface representations in a user interface selection mode in accordance with some embodiments.
Figure 5A:
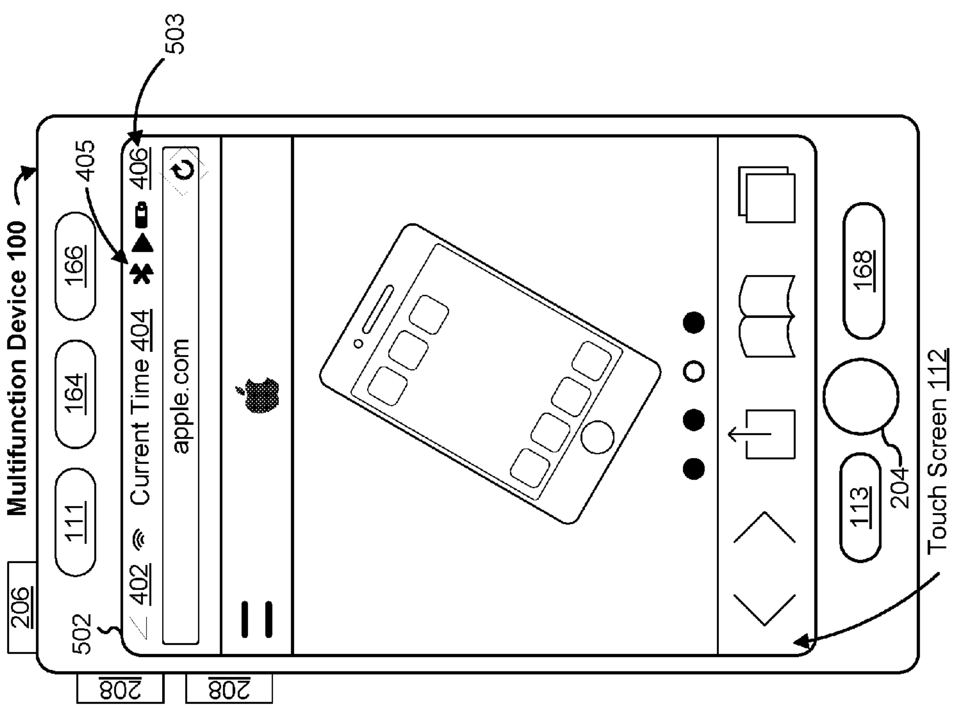
Figure 5C:
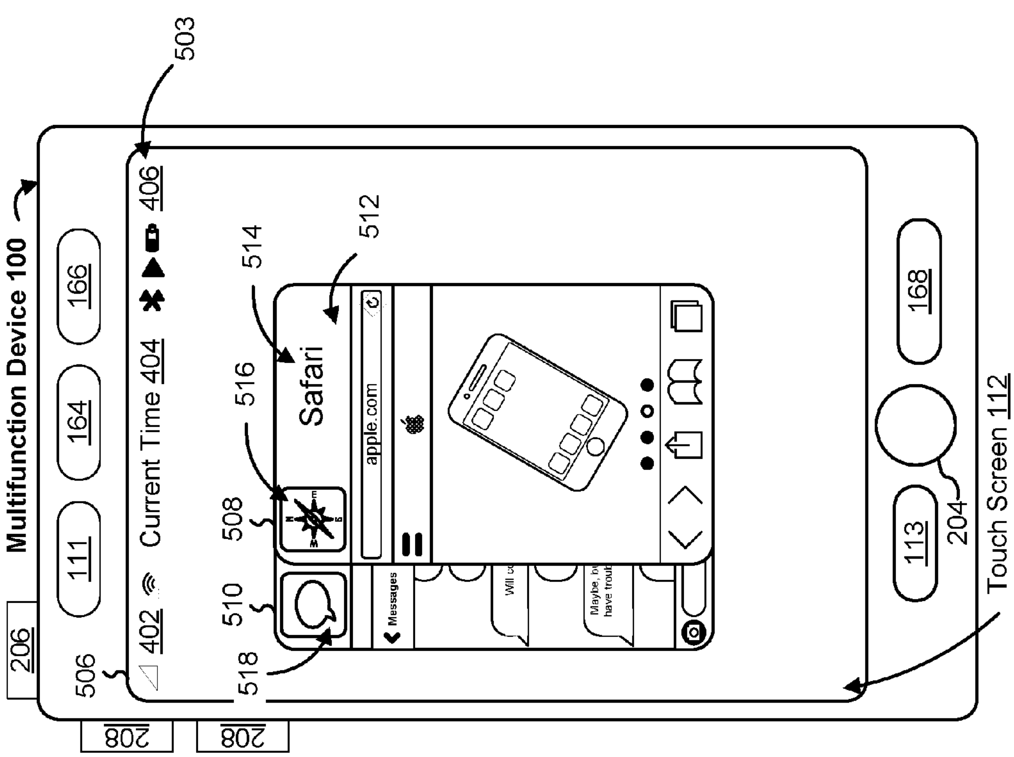
Figure 5D:
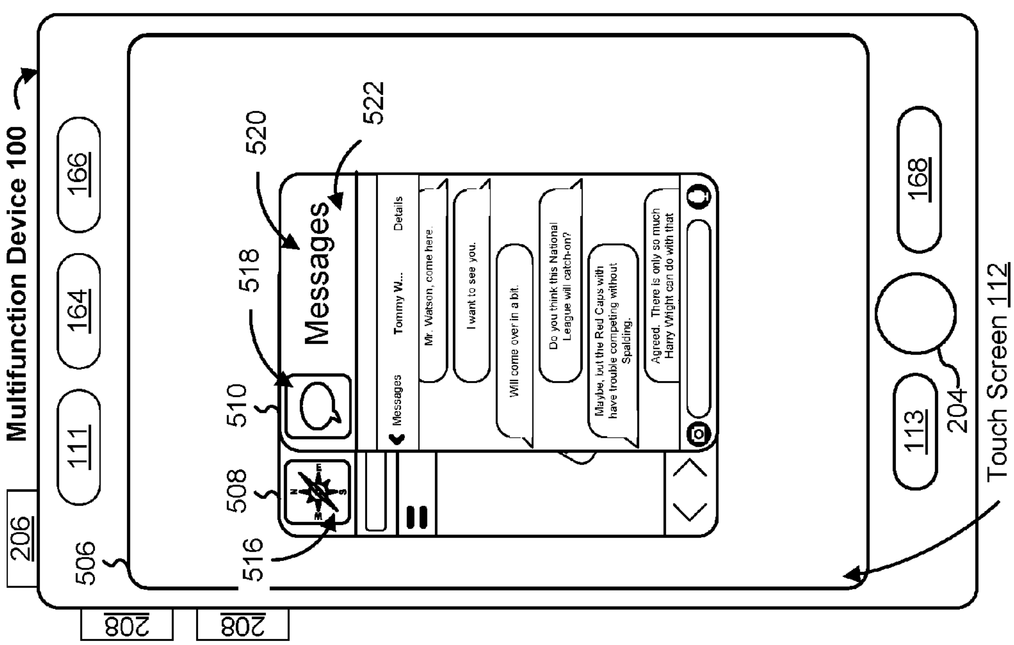
Figure 5F:
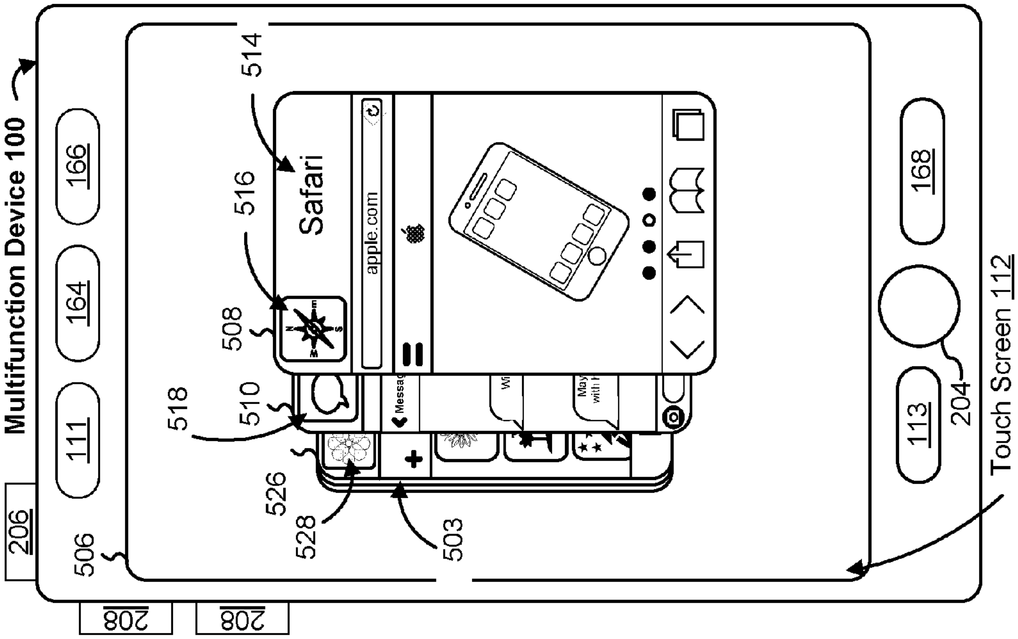
Figure 5E:
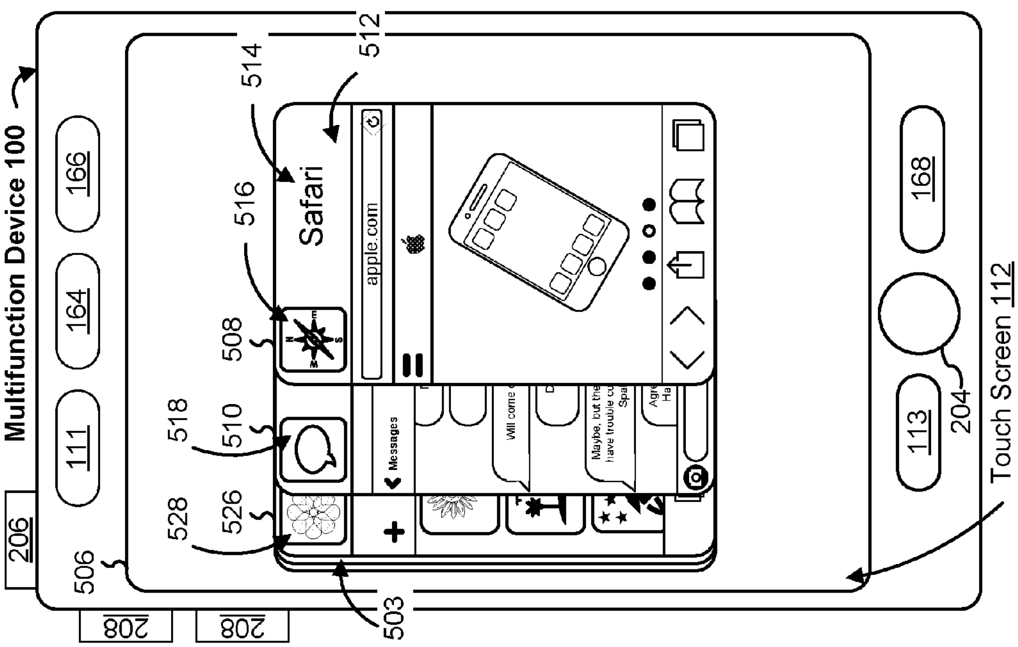
Figure 5H:
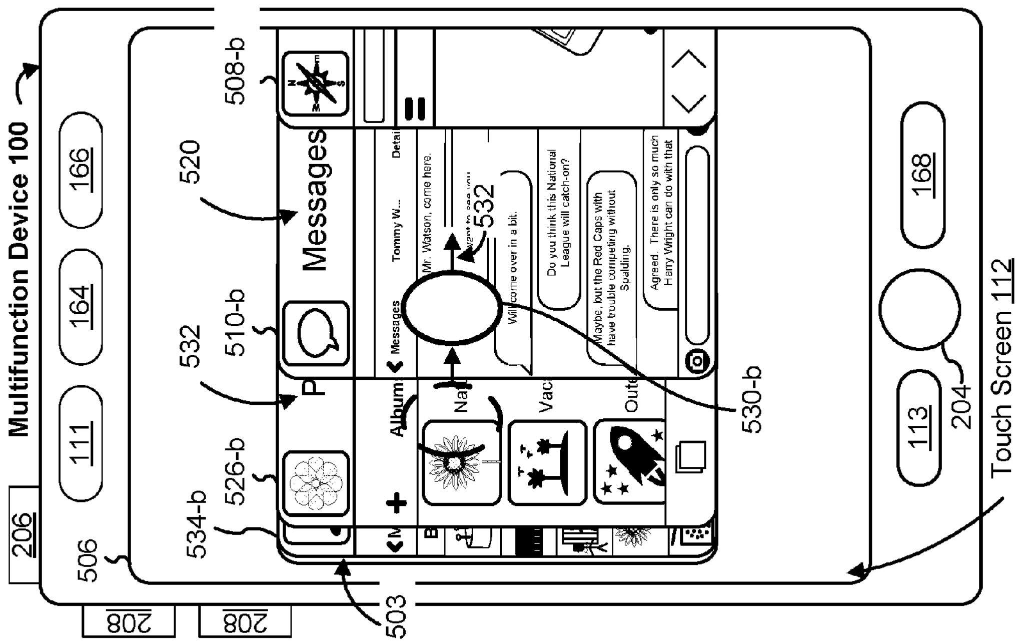
Figure 5G:
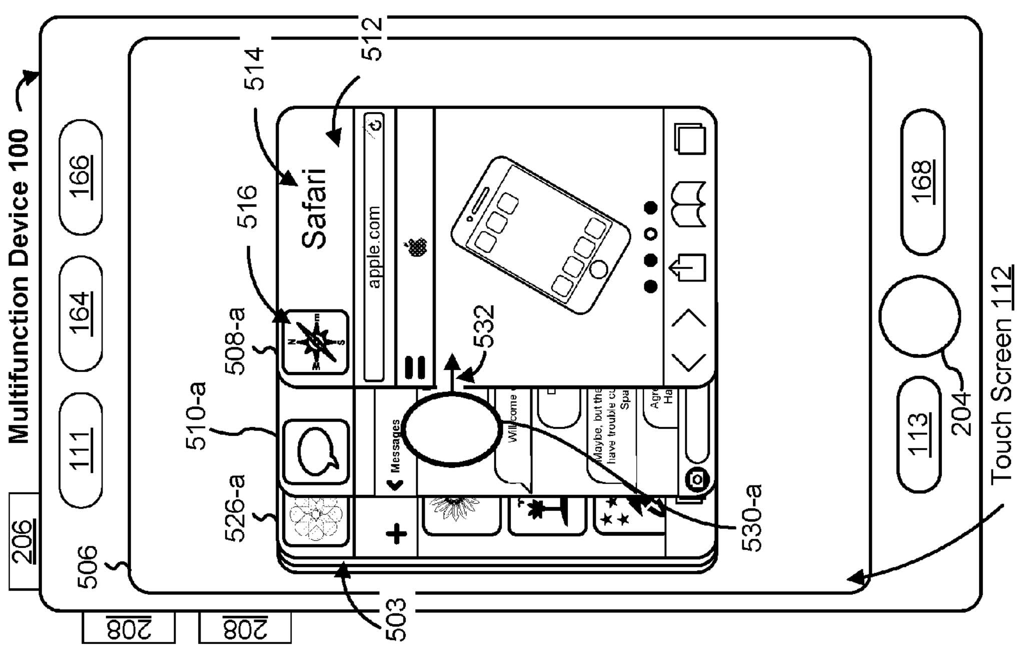
Figure 5I:
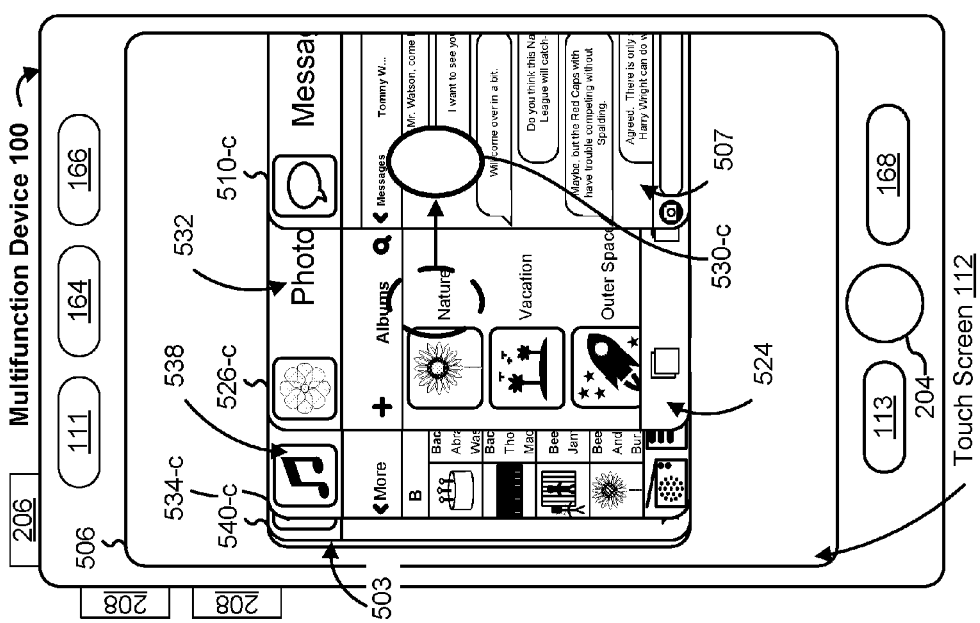
Figure 5J:
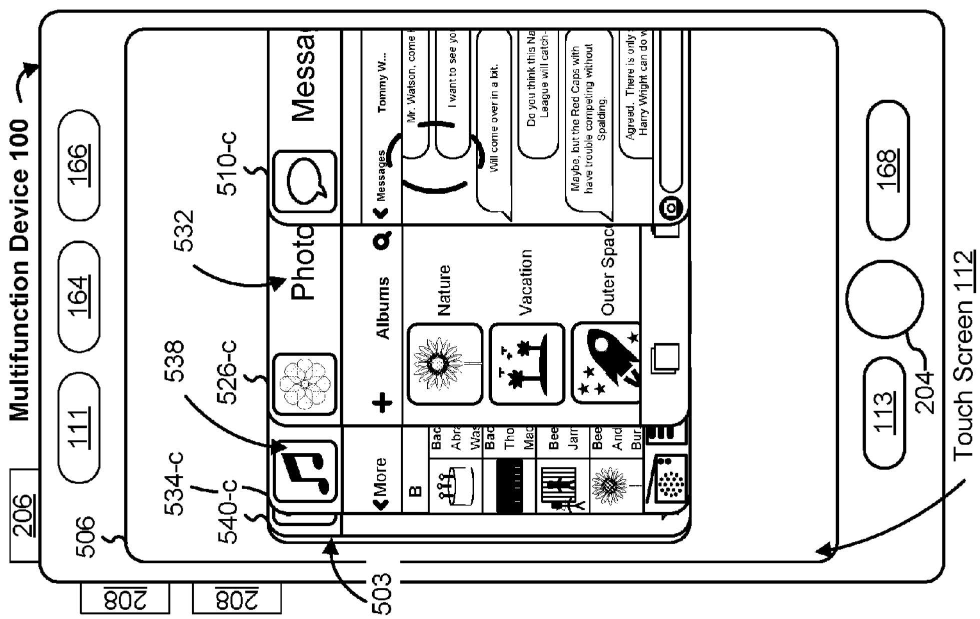
Figure 5L:
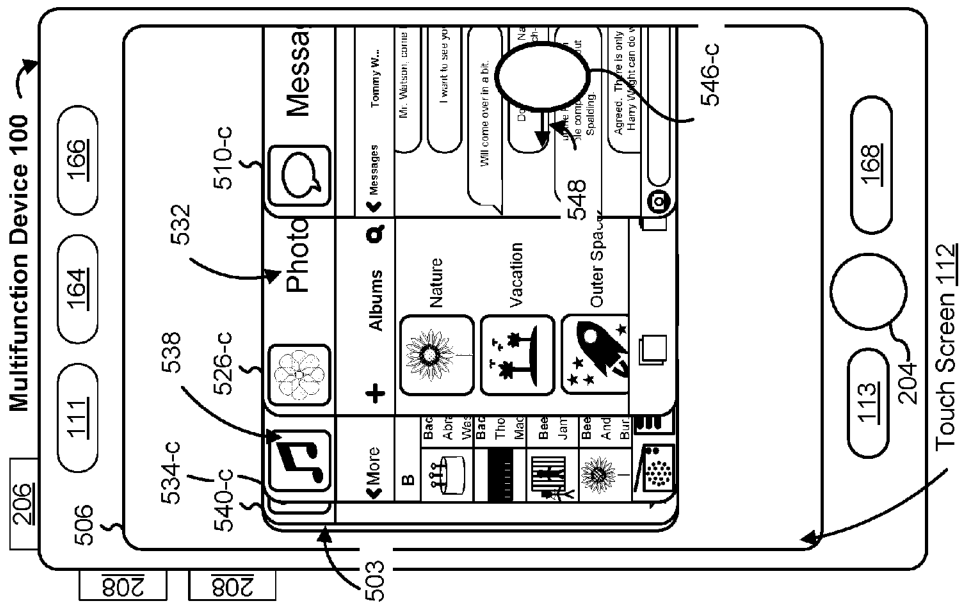
Figure 5K:
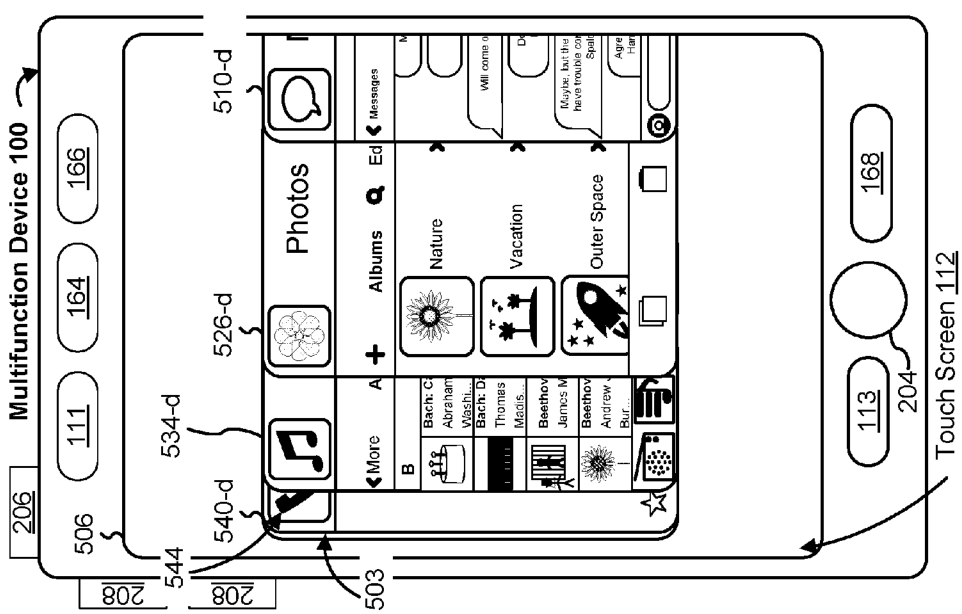
Figure 5N:
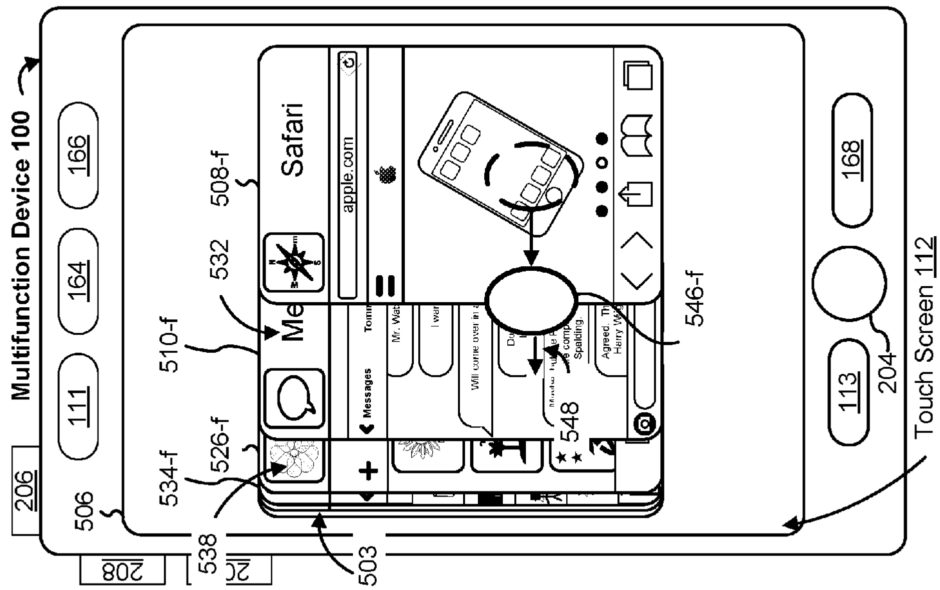
Figure 5M:
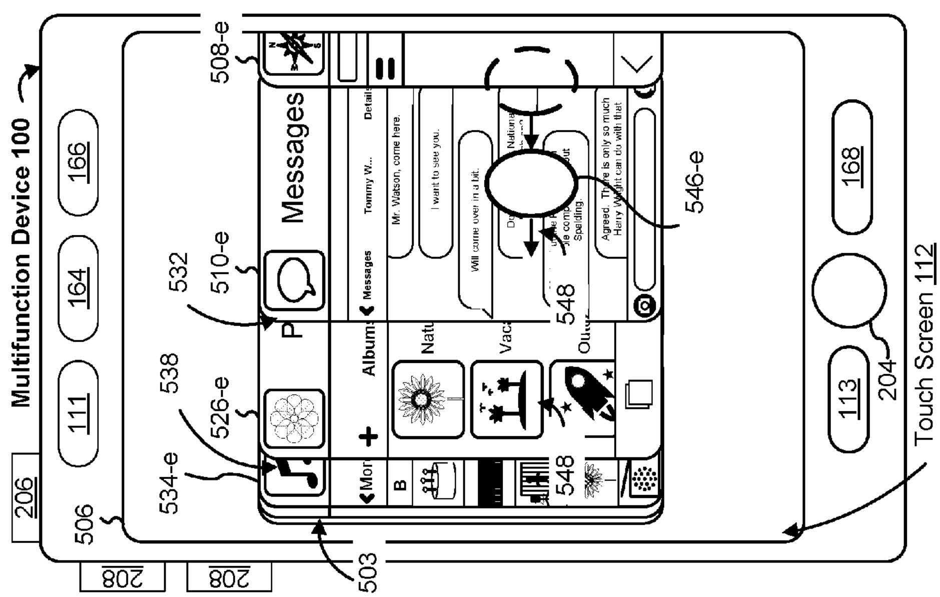
Figure 5O:
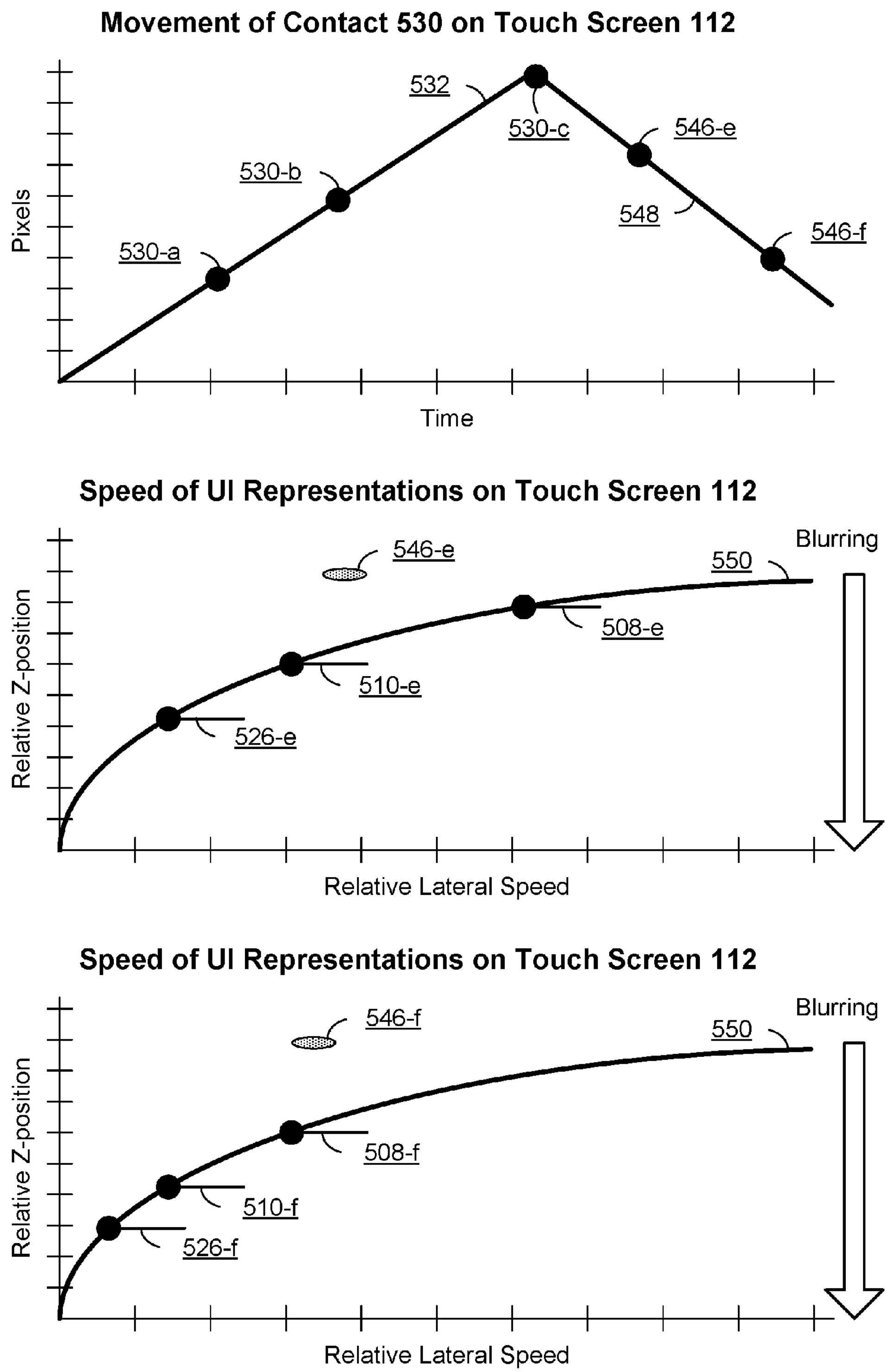
Figure 5Q:
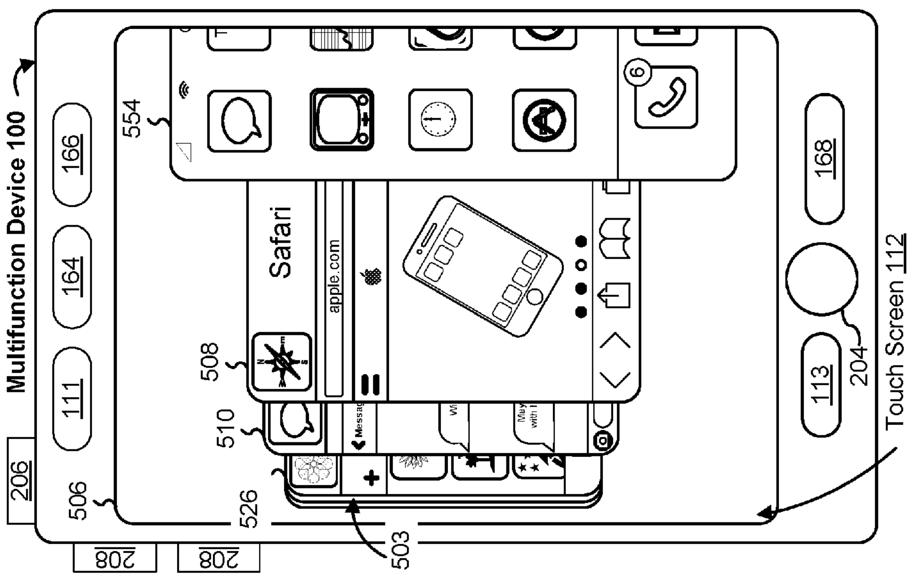
Figure 5P:
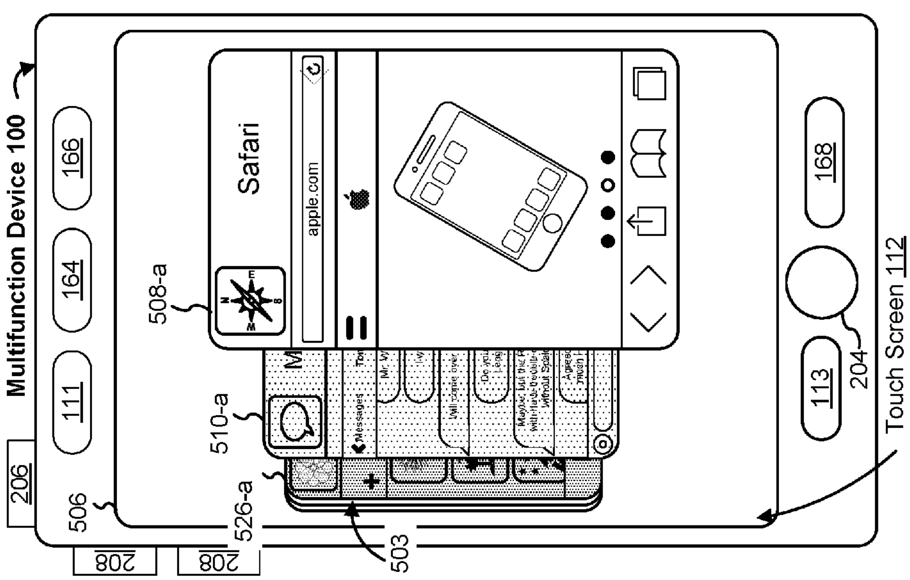
Figure 5S:
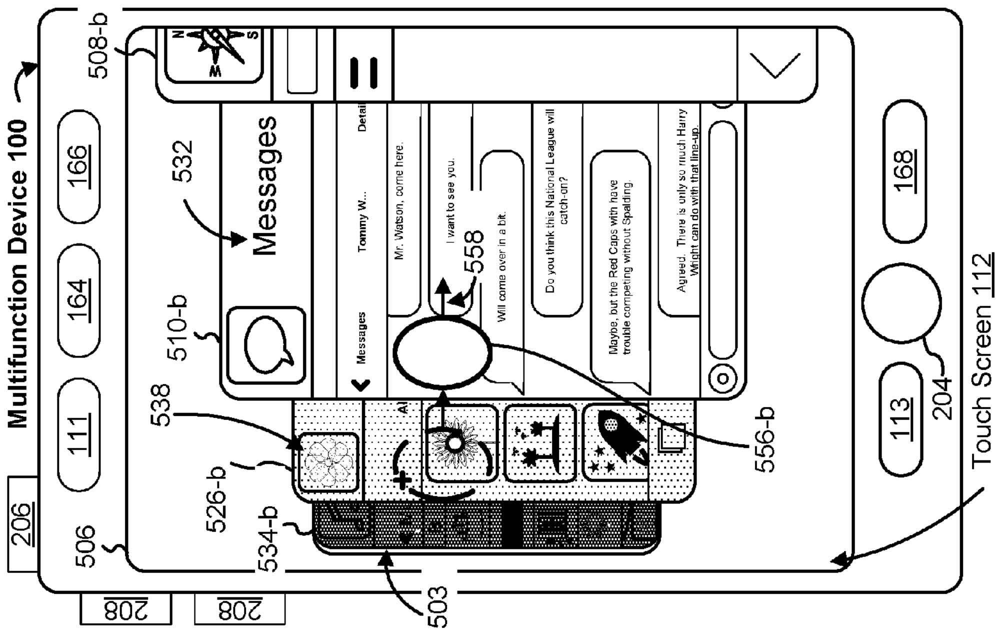
Figure 5R:
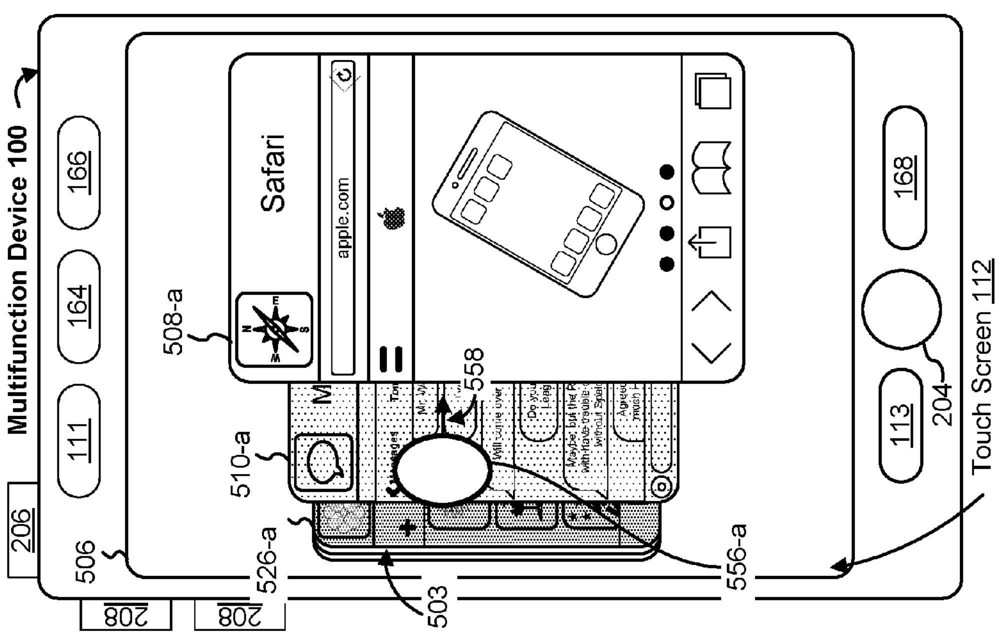
Figure 5U:
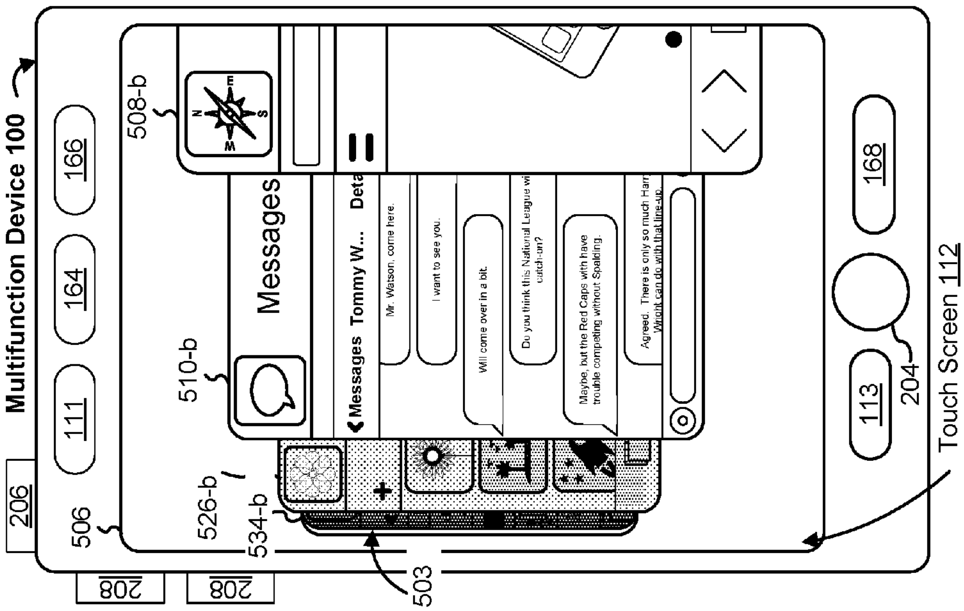
Figure 5T:
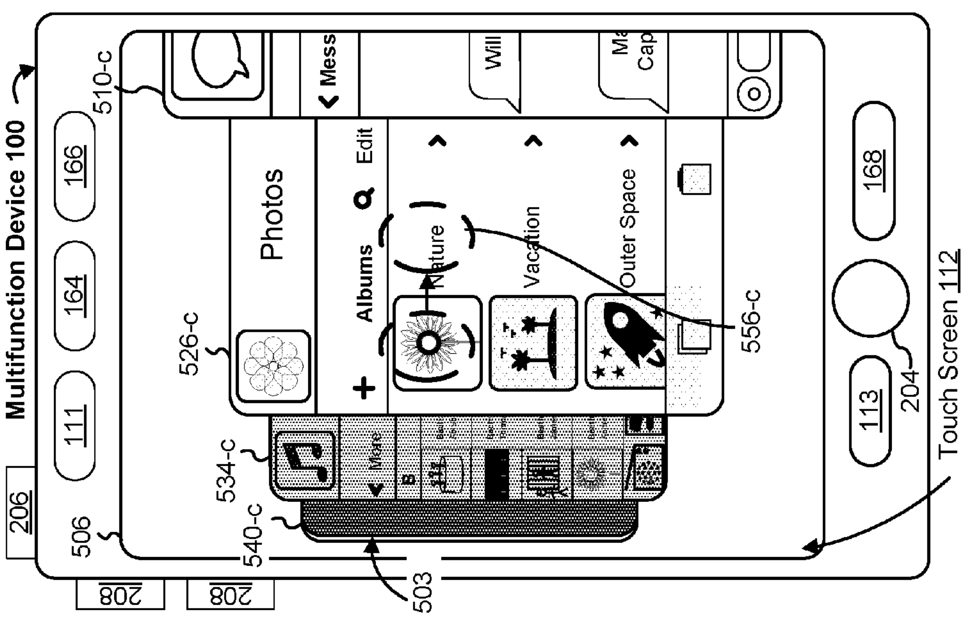

FIGS. 5A-5T illustrate exemplary embodiments of a user interface selection mode that allows a user to efficiently navigate between multiple user interfaces on an electronic device (e.g., multifunction device 100) in accordance with some embodiments. Exemplary user interfaces (e.g., user interface 506 displayed on touch screen 112) for the user interface selection mode include representations of multiple user interfaces (e.g., representations 508, 510, 526, 534, 540, and 552 of user interfaces 502, 507, 524, 536, 542, and 552, respectively for applications associated with the electronic device displayed as a virtual stack of cards (e.g., the "stack"). User inputs (e.g., contacts, swipe/drag gestures, flick gestures, etc.) detected on touch screen 112 (e.g., a touch-sensitive surface) are used to navigate between user interfaces that can be selected for display on the screen. FIG. 5A illustrates display of a graphical user interface 502 for a web browsing application on the electronic device. User interface 502 includes display of status bar 504 that provides information to the user (e.g., signal strength indicator(s) 402 for wireless communication(s), time 404, bluetooth indicator 405, and battery status indicator 406). As illustrated in FIGS. 5B-5C, the device enters a user interface selection mode upon detecting deep press 504 on the left side of the bezel of the device (e.g., an exemplary predetermined input) that includes an increase in intensity of a contact from an intensity below $IT_D$ to an intensity above $IT_D$.

In some embodiments, a system level gesture is used to activate a user interface selection mode. For example, as illustrated in FIGS. 5B and SC, a deep press on the left side of the bezel of the device activates the user interface selection mode. In an alternative embodiment, as illustrated in FIGS. 5EE and 5C, where the device is capable of distinguishing between user thumb contacts and user finger contacts, detection of deep thumb press 570 on touch-screen 112 (e.g., anywhere on an associated touch-sensitive surface) activates the user interface selection mode (e.g., device 100 replaces display of user interface 502 with display of user interface 506 in response to detecting a thumb press that includes an increase in intensity of a contact from an intensity below $IT_D$ to an intensity above $IT_D$). In contrast, as illustrated in FIGS. 5FF-5GG, in response to detecting deep finger press 572 within user interface 502 (e.g., at the same position that device 100 detected thumb deep press 570 in FIG. 5EE), the device previews web content associated with an object displayed at the location of deep finger press 572 (e.g., the device displays preview window 574 in FIG. 5GG). Thus, in some embodiments, the device distinguishes between both the type of gesture (e.g., deep thumb press vs. deep finger press) and the location of the gesture (e.g., deep finger press on the left side of the bezel vs. deep finger press within the user interface) when selecting between activating a user interface selection mode and performing an application-specific operation (e.g., previewing web content).

FIGS. 5C-5F illustrate exemplary user interfaces (e.g., graphical user interface 502) for the user interface selection mode that include representation 508 of web browsing user interface 502 that was displayed on touch screen 112 immediately preceding entry into the user interface selection mode and at least representation 510 of messaging user interface 506.

Optional title bars 512 and 522 provide information about the user interface being represented in the card. For example, title bar 512 includes the name "Safari" 514 and icon 516 associated with the web browsing application user interface 502 represented in card 508. Similarly, title bar 522 includes the name "Messages" 520 and icon 518 associated with messaging application user interface 506 represented in card 510. In some embodiments, the title area (e.g., title bar) is not part of the user interface representation card. In some embodiments, the title bar is not illustrated as detached from the user interface representation card. In some embodiments, title information (e.g., a title bar, application name, and/or icon corresponding to an application) is displayed as hovering above or below the user interface representation card. In some embodiments, the user interface selection mode does not include display of title information.

FIGS. 5C-5E illustrate exemplary user interfaces for the user interface selection mode that display the user interface representations without substantial depth (e.g., in a substantially two-dimensional representation), as if the user is looking down at a deck of cards being spread out on a table. As illustrated, multiple cards are viewed as if spread out in a straight line to the right from the top of a stack of cards on the left hand side of the display. However, in some embodiments, the cards are spread out to the left from the top of a stack of cards on the right hand side of the display, and/or spread out askew or along a non-linear path (e.g., along a curved or seemingly random path).

FIG. 5C illustrates an embodiment where the card for the user interface that was displayed immediately prior to entering the user interface selection mode is displayed as the top card in the user interface selection stack. For example, user interface 502 shows web browsing card 508 (e.g., representation 508 of web browsing user interface 502) displayed over messaging card 510 (e.g., representation 510 of messaging user interface 507).

FIG. 5D illustrates an embodiment where the card for the user interface that was displayed immediately prior to entering the user interface selection mode is displayed further back in the user interface selection stack. For example, user interface 502 shows web browsing card 508 (e.g., representation 508 of web browsing user interface 502) displayed under messaging card 510 (e.g., representation 510 of messaging user interface 507).

FIG. 5E illustrates an embodiment where the stack includes more than two cards. For example, user interface 502 shows web browsing card 508 displayed over messaging card 510, which in turn is displayed over photo card 526 (e.g., representation 526 of user interface 524 for an image management application). The cards at the top of the stack are spread out more relative to each other than are the cards further back in the stack, revealing more of the cards at the top of the stack than those further back. For example, web browsing card 508 is spread out farther to the right relative to messaging card 510 than is messaging card 510 relative to photo card 526. Thus, more of messaging card 510 is revealed on touch screen 112 than photo card 526; evidenced by display of the entirety of messaging icon 518 and only a portion of photo icon 528. Additional cards present in the stack are illustrated as one or more edges 503 displayed under card 528 (e.g., the bottom most card that is partially displayed).

FIG. 5F illustrates an exemplary user interface for the user interface selection mode that displays the user interface representation cards with substantial depth (e.g., in a three-dimensional representation), as if the user is looking down at cards that are sequentially levitating, along a virtual z-axis substantially orthogonal to the plane of the display, from a deck of cards sitting on a table. The cards become larger as they extend further away from the bottom of the stack, giving the appearance that they are travelling substantially towards the user. For example, web browsing card 508 is displayed as larger than messaging card 510 on touch screen 112 because it is further away from the bottom of the stack. As illustrated, multiple cards are viewed as if travelling along a straight or slightly curved path up (e.g., along the virtual z-axis) and to the right from a stack of cards on the left hand side of the display. However, in some embodiments, the cards travel up and to the left from a stack of cards on the right hand side of the display, and/or travel askew or along a non-linear path (e.g., along a curved or seemingly random path).

FIGS. 5G-5K illustrate movement of the user interface representation cards on the display in response to a user input (e.g., navigation between multiple user interface representations) in a substantially two-dimensional representation of the stack. As illustrated in FIG. 5G, device 100 displays a stack of user interface cards 508, 510, and 526 spread out to the right. Device 100 detects a drag gesture (e.g., a user input) including contact 530 and movement 532 originating from a location of touch screen 112 displaying messaging card 510 (e.g., the user touches and drags messaging card 510).

In response to detecting movement 532 of contact 530 from location 530-a in FIG. 5G to location 530-b in FIG. 5H, and continuing to location 530-c in FIG. 5I, the device further spreads out the user interface cards to the right (e.g., in the direct of the drag gesture). As illustrated in FIGS. 5G-5I, messaging card 510 moves laterally across the screen at the same speed as contact 530 (e.g., is directly manipulated by the contact) from location 510-a in FIG. 5G to location 510-b in FIG. 5H, and continuing to location 510-c in FIG. 5I, as if the contact was actually pressing down and moving the card on a table. This is illustrated by maintaining a fixed display of card 510 relative to the location of contact 530 on touch screen 112 (e.g., the touch-sensitive surface). For example, the word "Will" in the representation of messaging user interface 507 remains directly under the contact in FIGS. 5G-5I.

As illustrated in FIGS. 5G-5I, cards displayed above the card being directly manipulated by the contact move faster than the contact. For example, web browsing card 508 moves faster than contact 530, and thus faster than messaging card 510, traveling from location 508-a in FIG. 5G to location 508-b in FIG. 5H, and eventually off of the screen (e.g., to the right of the right edge of touch screen 112) in FIG. 5I. As a result of the difference in speeds between cards, more of messaging card 510 is revealed from under web browsing card 508 as contact 530 moves to the right. For example, as a result of contact 530 moving from location 530-a in FIG. 5G to location 530-b in FIG. 5H, more of the conversation in the representation of user interface 507 is revealed (this is also shown by the appearance of the name "Messages" 520 in title area 522 above card 510 in FIG. 5H after being covered by web browsing card 508 in FIG. 5G).

As illustrated in FIGS. 5G-5I, cards displayed below the card being directly manipulated by the contact move faster than the contact. For example, photo card 5026 moves slower than contact 530, and thus slower than messaging card 510. As a result of the difference in speeds between cards, more of photo card 526 is revealed from under messaging card 510 as contact 530 moves to the right. For example, as a result of contact 530 moving from location 530-a in FIG. 5G to location 530-b in FIG. 5H, more of the photographs the representation of user interface 524 are revealed (this is also shown by the gradual appearance of name "Photo" 532 in the title area above card 526 in FIGS. 5H and 5G).

FIG. 5H also illustrates revealing of previously hidden music card 534 (e.g., representation 534 or user interface 536 for a music management/playing application) from under photo card 526, as photo card moves from location 526-a in FIG. 5G (e.g., where it is displayed as sitting on top of all the hidden cards in the stack) to location 526-b in FIG. 5H. This movement gives the user the effect that photo card 526 is being slid off the top of the deck of cards, revealing part of the next card (e.g., music card 534).

FIG. 5J illustrates lift-off of contact 530 at location 530-c. As illustrated in FIGS. 5G-5J, movement of the representation cards across the display stops when movement 532 of contact 530 stops at FIG. 5I and lift-off of contact 530 is detected in FIG. 5J. This is illustrated in FIG. 5J by maintaining display of messaging card 510 at location 510-c, where it was displayed after stopping movement 532 of contact 530 at location 530-c in FIG. 5I.

The series of FIGS. 5G, 5H, 5J, and 5K, illustrates lift-off of contact 530 prior to stopping movement 532. As illustrated in FIG. 5K, representation cards 510, 526, and 534 continue to move across touch screen 112 (e.g., with diminishing momentum). This is illustrated by the change in location, for example, of messaging card 510 from location 510-c in FIG. 5J (when lift off of contact 530 is detected) to location 510-d in FIG. 5K. In some embodiments, continued momentum of a representation card moving across the display occurs in response to a flick gesture (e.g., inertial scrolling of UI representation cards, where the cards move with simulate inertia and slow down with simulate friction and have an initial velocity that is based on a velocity of the contact at a predefined time corresponding to liftoff of the contact from the touch-sensitive surface such as the velocity at liftoff of the contact or the velocity of the contact just before liftoff of the contact).

FIG. 5K also illustrates revealing telephony card 540 (e.g., representation 540 of user interface 542 for a telephony application) as previously hidden music card 534 moves from location 534-c in FIG. 5J to location 534-d in FIG. 5K. Thus, in some embodiments, the stack includes more than one hidden card that can be revealed by continuing to navigate the user interface selection mode.

Although movement of the cards in response to the drag gesture is illustrated along a straight line in FIGS. 5G-5K, in some embodiments, movement of the cards may be askew of a predefined axis or path in response to a similarly askew user input. In some embodiments, the path of the cards is fixed along a predefined path and vector components of a movement that are orthogonal to the predefined path (e.g., the downward component to movement of a contact from the upper left hand side to the lower right hand side of a touch-sensitive surface) is ignored when moving display of the cards across the screen. In some embodiments, a vector component of a movement that is orthogonal to a predefined movement path are reflected in the movement of one or more cards across the screen (e.g., the card being directly manipulated by the contact may be pulled up or down from the path of the stack, or the entire path of the stack—e.g., all the cards—may be altered).

In some embodiments, a vector component of a movement that is orthogonal to a predefined movement path is ignored when the movement creates an angle with the predefined movement path that is below a threshold angle and is accounted for when the movement creates an angle with the predefined movement path that is above the threshold angle. For example, the movement of one or more representation cards is stabilized when user input movements are askew of the predefined movement path by less than a threshold angle (e.g., 15°), to account for undesired drift in the user's movement. But, when the user makes an obvious upwards gesture (e.g., at an angle 80° askew of the predefined movement path), one or more representation cards are moved up or down on the display, in correspondence with the orthogonal vector component of the movement (e.g., so that the user can remove a card from the stack while continuing to navigate through the remaining cards).

FIGS. 5L-5N illustrate movement of the representation cards in the opposite direction in response to a user input including movement in the opposite direction. FIG. 5L illustrates display of user interface 506 for the user interface selection mode after lift-off of contact 530 in FIGS. 5I-5J (e.g., without inertial scrolling). The device detects a second drag gesture (e.g., user input) including contact 546 and movement 548 originating at a location on touch screen 112 displaying messaging card 510 (e.g., the user touches and drags messaging card 510 back towards the base of the stack).

In response to detecting movement 548 of contact 546 from location 546-c in FIG. 5L to location 546-d in FIG. 5M, and continuing to location 5N in FIG. 5N, the device pulls UI representation cards 534, 526, 510, and 508 back towards the base of the stack. Messaging card 510 moves laterally across the screen at the same speed as contact 546 (e.g., is directly manipulated by the contact) from location 510-c in FIG. 5L to location 510-e in FIG. 5H, and continuing to location 510-f in FIG. 51 because the card was displayed at a location corresponding to contact 546. This is illustrated by maintaining a fixed display of card 510 relative to the location of contact 546 on touch screen 112. For example, the word "Do" in the representation of messaging user interface 507 remains directly to the upper left of the contact in FIGS. 5L-5N.

As illustrated in FIGS. 5M-5N, web browsing card 508 moves faster than contact 546 because it is displayed above messaging card 510. Because messaging card 510 is traveling at the same speed as contact 546, web browsing card 508 is also traveling faster than messaging card 510. As a result, web browsing card 508 starts to catch-up to, and cover, messaging card 508. For example, web browsing card 508 only covers the edge of messaging card 510 in FIG. 5M. Web browsing card 508 starts to slide over messaging card 510 with continued movement 548 of contact 546 to the left on the display, covering half of messaging card 510 in FIG. 5N.

As illustrated in FIGS. 5M-5N, photo card 526 moves slower than contact 546 because it is displayed above messaging card 510. Because messaging card 510 is traveling at the same speed as contact 546, photo card 526 is also traveling slower than messaging card 510. As a result, messaging card 510 starts to catch-up to, and cover, photo card 546. For example, application name "Photo" 532 associated with photo card 526 is completely exposed in FIG. 5L. Message card 510 gradually slides further over photo card 526 with continued movement 548 of contact 546 to the left on the display, completely eclipsing application name "Photo" 532 when contact 546 reaches location 546-f in FIG. 5N.

FIG. 5O illustrates the speed of user interface representation cards relative to the lateral speed of contacts 530 and 546, as illustrated in FIGS. 5G-5I and 5L-5N on touch screen 112. As illustrated in the top panel, contact 530 moves left to right across touch screen 112 at a constant speed equal to the slope of movement 532 (e.g., graphically represented as a function of pixels over time). After lift-off of contact 530 at location 530-c, the device detects contact 546, moving back right to left across touch-sensitive screen 112 at a constant speed equal to the slope of movement 548 (e.g., graphically represented as a function of pixels over time. Because contacts 530 and 546 are detected at locations on touch screen 112 corresponding to display of messaging card 510, the speed of messaging card 510 is equal to the speed of the contact.

The middle panel of FIG. 5O illustrates the relative speeds of the UI representation cards along speed curve 550, when at location "e" during movement 548 of contact 546 (e.g., as illustrated in FIG. 5M). The relative lateral speed of messaging card 510 when at location 510-f is equal to the absolute value of the slope of movement 548, as graphically illustrated in the top panel of FIG. 5O. Because web browsing card 508 was at a relative Z-position that is above (e.g., along the virtual Z-axis substantially orthogonal to the plane of the display of the device) messaging card 510 in user interface 506 (e.g., an exemplary user interface for the user interface selection mode), speed curve 550 shows that web browsing card 508 is traveling relatively faster than messaging card 510. Similarly, because photo card 526 has a relative Z-position that is below messaging card 510 in user interface 506, speed curve 550 shows that the photo card 526 is travelling slower than messaging card 510.

The absolute lateral speeds of representation cards 526, 510, and 508 are relative to the actual speed of the user gesture (e.g., the lateral component of a user's contact moving across the touch-sensitive surface). As shown in the middle panel of FIG. 5O, user contact 546 is directly manipulating movement of messaging card 510 because the contact is at a location on touch screen 112 corresponding to display of messaging card 510, Thus, the speed of messaging card 510 is the speed of the user contact. The lateral speed of web browsing card 508 is equal to a factor of the speed of the user contact, e.g., equal to the speed of the user contact multiplied by a coefficient, where the coefficient is larger than 1 (e.g., because web browsing card 508 has a higher z-position relative to messaging card 510, which is being directly manipulated by user contact 546). The lateral speed of photo card 526 is also equal to a factor of the speed of the user contact, e.g., equal to the speed of the user contact multiplied by a coefficient, where the coefficient is smaller than 1 (e.g., because photo card 526 has a lower z-position relative to messaging card 510, which is being directly manipulated by user contact 546).

The middle panel of FIG. 5O also illustrates, as in some embodiments, the level of blurring applied to each card in the stack is relative to the absolute z-position of the card. Thus, as cards are spread out (e.g., to the right) from the stack, their absolute z-position increases and the blur applied decreases. In some embodiments, the device applies a dynamic change in blurring to a particular card as its absolute z-position is manipulated by a user input.

As illustrated in FIG. 5M-5N, when moving in the opposite direction of the original gesture (e.g., back towards the base of the stack), web browsing card 508 catches up to contact 546 because it is travelling faster, as illustrated in FIG. 5O. Web browsing card 508 moves between contact 546 and messaging card 510 when the leading edge (the left edge) of web browsing card 508 is displayed at location 508-f on touch screen, corresponding to the centroid of contact 546 at location 546-f. At this point, contact 546 begins to directly manipulate web browsing card 508, rather than messaging card 510.

As illustrated in FIGS. 5N and 5HH, device 100 detects continuation of movement 548 of contact 546 from location 546-f in FIG. 5N to location 546-g in FIG. 5HH. In response, web browsing card 508 continues to move laterally across the screen back towards the base of the stack (e.g., from location 508-f in FIG. 5N to location 5-g in FIG. 5HH) at the same speed as contact 546 (which is now directly manipulating web browsing card 508 rather than messaging card 510), as indicated by maintaining a fixed display of card 508 relative to the location of contact 546 on touch screen 112.

As illustrated in the lower panel of FIG. 5O, the speed of UI cards 526, 510, and 508 slow down when this handoff occurs. Web browsing card 508 moves at a speed corresponding to the speed of contact 546 when displayed at location 508-f (e.g., as in FIG. 5N), as did messaging card 510 when it was displayed at location 510-e (e.g., as in FIG. 5M, and as shown in the middle panel of FIG. 5O). Similarly, messaging card 508 travels at the same lower relative speed when displayed at location 510-f (e.g., as in FIG. 5N) as did photo card 526 when displayed at 526-e (e.g., as in FIG. 5M), because it is now the card below the card under contact 546. Finally, photo card 526 moves at a slower speed when displayed at location 526-f (e.g., as in FIG. 5N) than it did when displayed at location 526-e (e.g., as in FIG. 5M). Although the movements of the UI cards are illustrated at constant speeds, the speeds of the cards are relative to the speed of the user input. Thus, the electronic device moves the UI cards at variable speeds in response to detecting a user input gesture with variable speed.

Speed curve 5550 is an exemplary representation of the relationship between the speeds of the respective UI representation cards displayed in the stack. A first card (e.g., web browsing card 508) displayed above a second card (e.g., messaging card 510) in relative Z-position (e.g., along the virtual z-axis) will always travel faster than the second card. In some embodiments, speed curve 550 is representative of other variable manipulations in the display of the UI representation cards. For example, the level of blurring applied to a respective card in the stack (e.g., cards displayed further down in the stack are more blurry than cards displayed towards the top of the stack), the size of a respective card in the stack (e.g., in user interface selection mode user interfaces displaying the stack as a three-dimensional representation, cards displayed further down in the stack appear smaller than cards displayed towards the top of the stack), or the lateral position of a respective card in the stack (e.g., in user interface selection mode user interfaces displaying the stack as a substantially two-dimensional representation, cards displayed further down in the stack appear closer to the base of the stack than cards displayed towards the top of the stack).

In some embodiments, the spacing of points on speed curve 550 (e.g., corresponding to placement of UI representation cards relative to one another) have a constant difference in ordinate value (e.g., the change in the z-dimension, as represented by the vertical difference, between two points is the same). In some embodiments, as illustrated in FIG. 5O, where speed curve 550 follows a concave function, there is an increasing difference in the perpendicular distance between successive points (e.g., larger changes in the x direction). For example, the difference between the relative Z-positions of photo card 526 and messaging card 510 is the same as the difference between the relative Z-positions of messaging card 510 and web browsing card 508. However, the difference between the lateral speeds of messaging card 510 and web browsing card 508 is greater than the difference between the lateral speeds of photo card 526 and messaging card 510. This causes a visual effect on the display that the top card displayed on a stack will quickly move off the screen relative to the revealing of cards displayed further back in the stack.

FIGS. 5P-5T illustrate movement of user interface representation cards on the display in response to a user input (e.g., navigation between multiple user interface representations) in a substantially three-dimensional representation of the stack. As illustrated in FIG. 5P, device 100 displays a stack of user interface cards 508, 510, and 526 which appear to be spreading up from a stack of cards set behind the device. Web browsing card 508 is offset to the right, partially covers messaging card 510, and is displayed larger than messaging card 510 (e.g., to simulating that it is positioned above messaging card 510 in a virtual z-dimension substantially orthogonal to the plane of touch screen 112). Messaging card 510 and photo card 526 are displayed as increasingly blurred relative to web browsing card 508 (e.g., further simulating distance in the display). FIG. 5Q additionally illustrates display of home screen card 554 (e.g., representation 554 of a user interface 552 for a home screen on the device).

As illustrated in FIG. 5R, device 100 detects a flick gesture (e.g., a user input) including contact 556 and movement 558 originating from a location of touch screen 112 displaying messaging card 510 (e.g., the user touches and drags messaging card 510). In response to detecting movement 558 of contact 556 from location 556-a in FIG. 5G to location 556-b in FIG. 5H, and continuing to location 556-c in FIG. 5I, the device moves the cards away from the base of the stack and towards the screen along the virtual z-axis. For example, messaging card 510 gets larger and moves to the right as it moves from location 510-a in FIG. 5R to location 510-b in FIG. 5 S, and continues to get larger as it moves off the screen to the right at location 510-c in FIG. 5T.

FIG. 5T illustrates detection of the lift-off of contact 556 at location 556-c without stopping movement 558, consistent with a flick gesture. Messaging card 510, which was traveling with contact 556 (e.g., as the same speed; being directly manipulated by contact 556), continues to move on the display with simulated inertia, finally stopping at location 510-c on touch screen 112.

FIGS. 5R-5T also illustrate a change in the level of blurring applied to UI representation cards as they move away from the base of the stack. For example, photo card 526 is moderately blurry when first displayed at location 526-a as the bottom card visible in the stack. As photo card 526 moves from location 526-a in FIG. 5R to location 526-b in FIG. 5S (e.g., in response to movement 558 of contact 556 from location 556-a in FIG. 5R to location 556-b in FIG. 5S), and eventually to location 556-c in FIG. 5T, it gradually comes into focus (e.g., becomes less blurry). In some embodiments, the level of blur applied to a UI representation card follows a similar relationship to that of lateral speed relative to the card's Z-position, as illustrated in speed curve 550 in FIG. 5O.

Figure 5W:
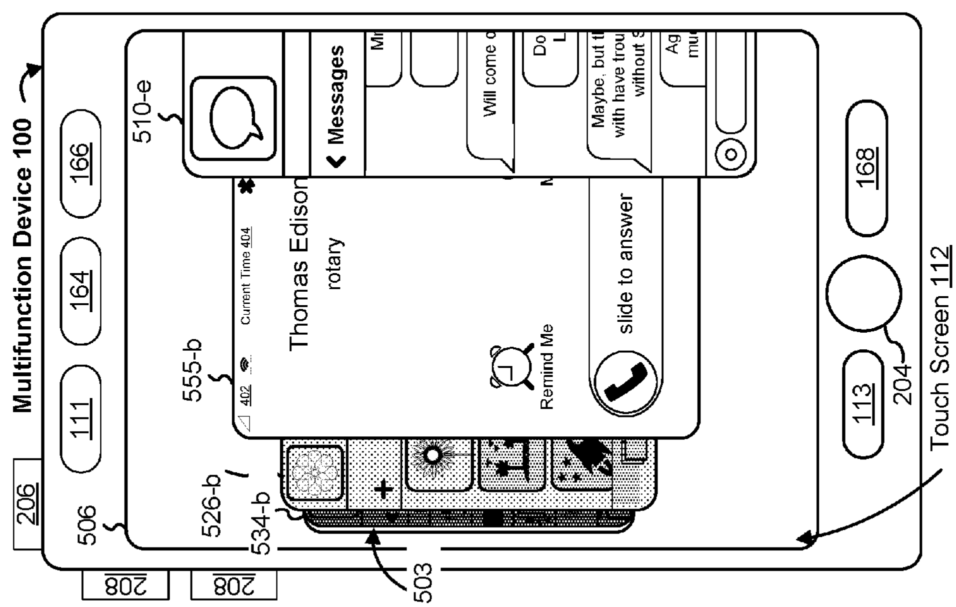
Figure 5V:
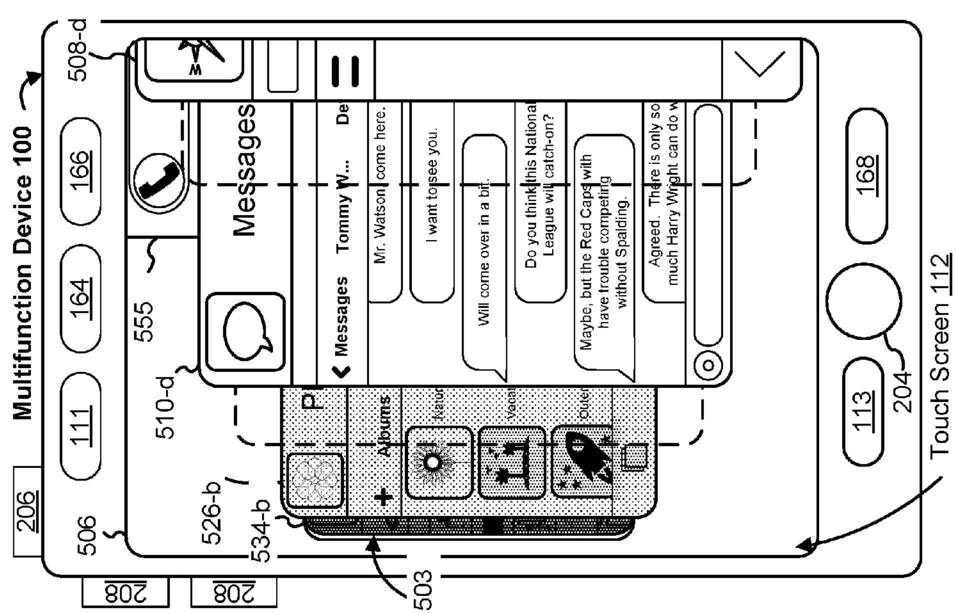

FIGS. 5U-5W illustrate insertion of a user interface representation card for a transient application activated while the device is in a user interface selection mode. FIG. 5U illustrates user interface 506 for a user interface selection mode displaying a stack of user interface cards 508, 510, 526, and 534, being navigated by a user. Device 100 then receives a phone call and in response, as illustrated in FIGS. 5V-5W, shuffles telephony card 554 (e.g., representation 554 of user interface 556 for a received call within a telephony application) into the stack at location 555-b, as illustrated in FIG. 5W. As illustrated in FIGS. 5V-5W, the device moves web browsing card 508 and messaging card 510 up in the stack to (e.g., from locations 508-b and 510-b, represented as dashed outlines in FIG. 5V off the display and to location 510-e in FIG. 5W, respectively) to make room for telephony card 556. Although FIGS. 5V-5W illustrate an animation where telephony card 555 is brought into the screen, in FIG. 5V, and inserted into the stack, in FIG. 5W, behind web browsing card 508 and messaging card 510, other animations and placement for the user interface representation of the transient application are contemplated (e.g., the new card becomes the top of the stack or cards further back in the stack are pushed further down to make room for the new card).

Figure 5Y:
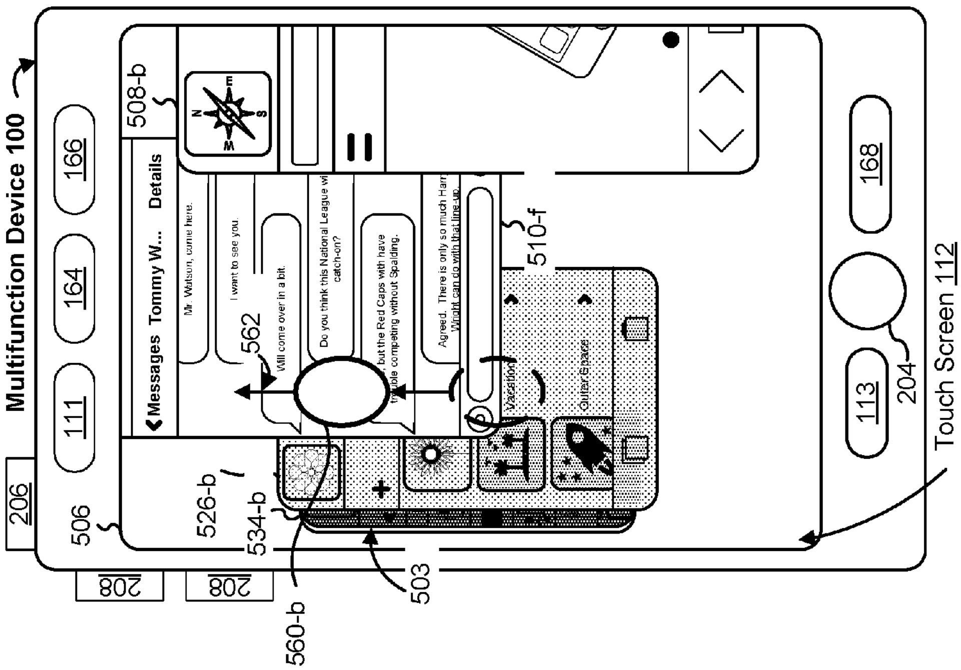
Figure 5X:
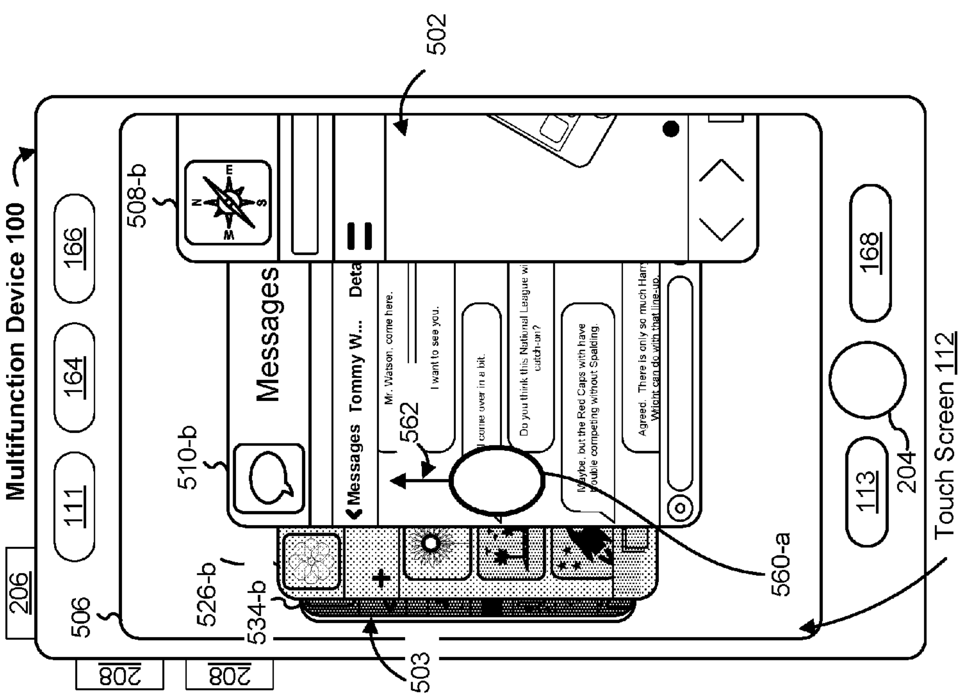

FIGS. 5X-5AA illustrate removal of a user interface representation card upon detection of a predefined user input. FIG. 5X illustrates user interface 506 for a user interface selection mode displaying a stack of user interface cards 508, 510, 526, and 534, being navigated by a user. Device 100 detects a swipe gesture including contact 560 and movement 562 substantially orthogonal to the predefined movement path of the cards in the stack (e.g., the swipe moves up touch screen 112, while cards in the stack move right and left across the screen when navigating), originating from a location of touch screen 112 displaying messaging card 510. In response to detecting movement 562 of contact 560 from location 560-a in FIG. 5X to location 560-b in FIG. 5Y, and continuing to location 560-c in FIG. 5Z, the device lifts messaging card 510 out of the stack and sends it off of the screen (e.g., via movement from location 510-b in FIG. 5X to location 510-f in FIG. 5Y, continuing to location 510-g in FIG. 5Z).

Figure 5Z:
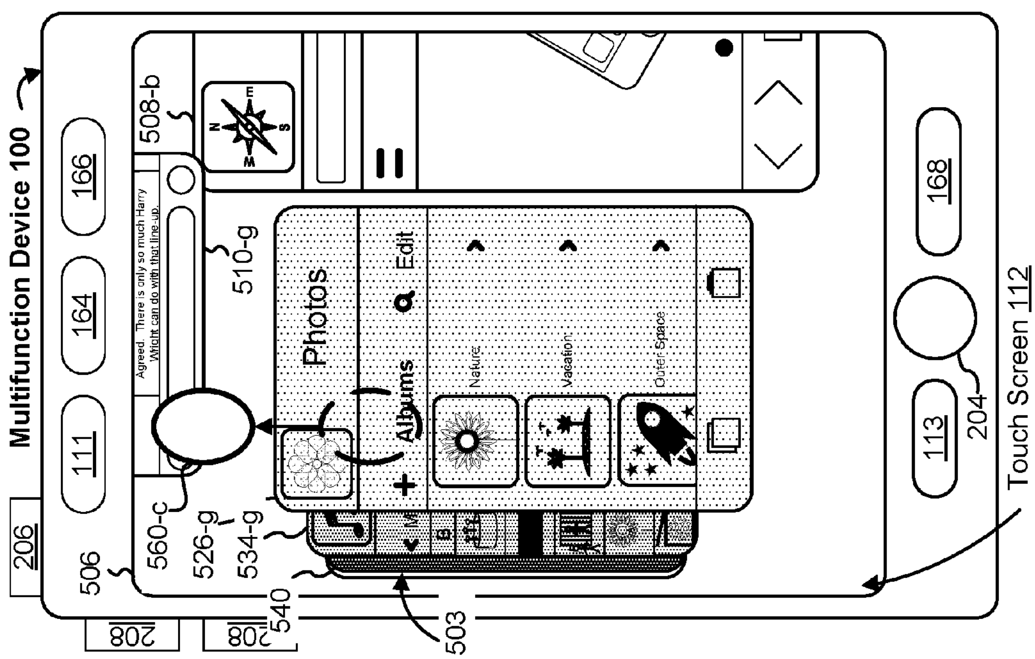
Figure 5A:
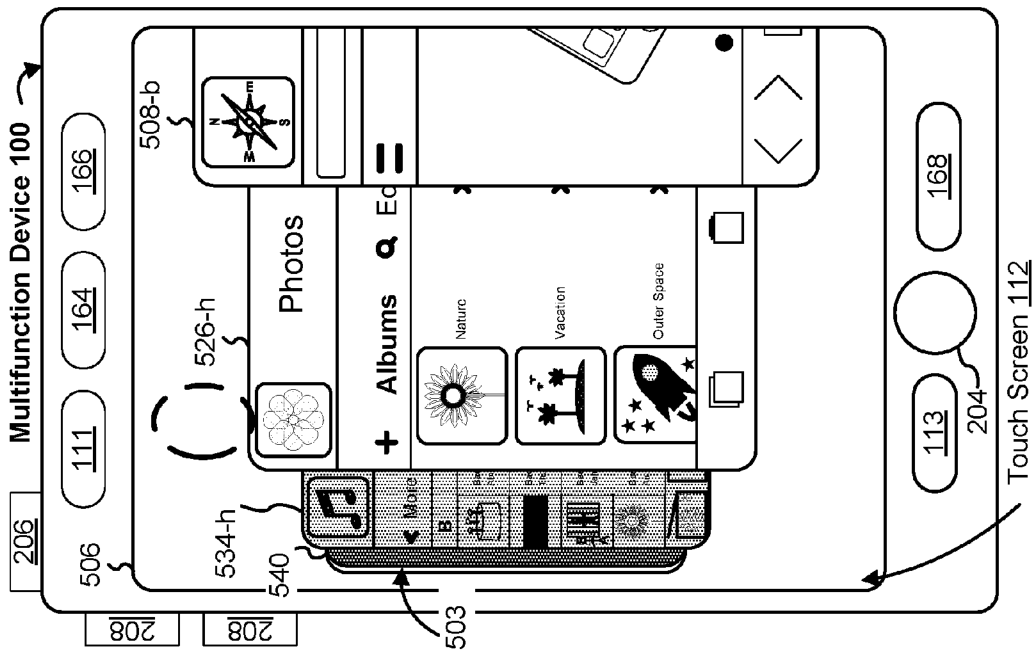
Figure 5B:
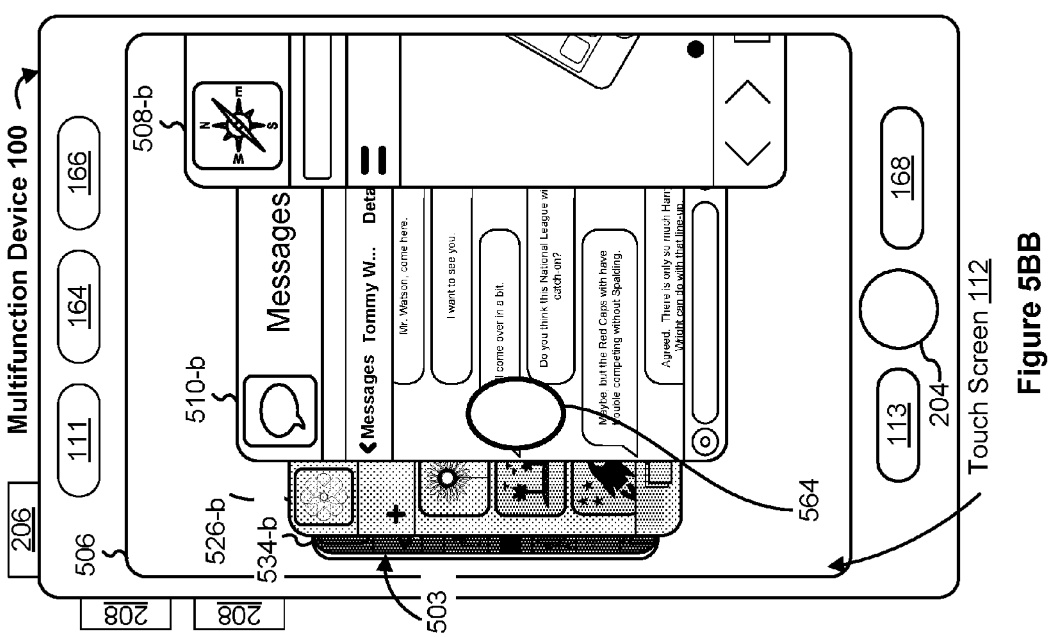
Figure 5C:
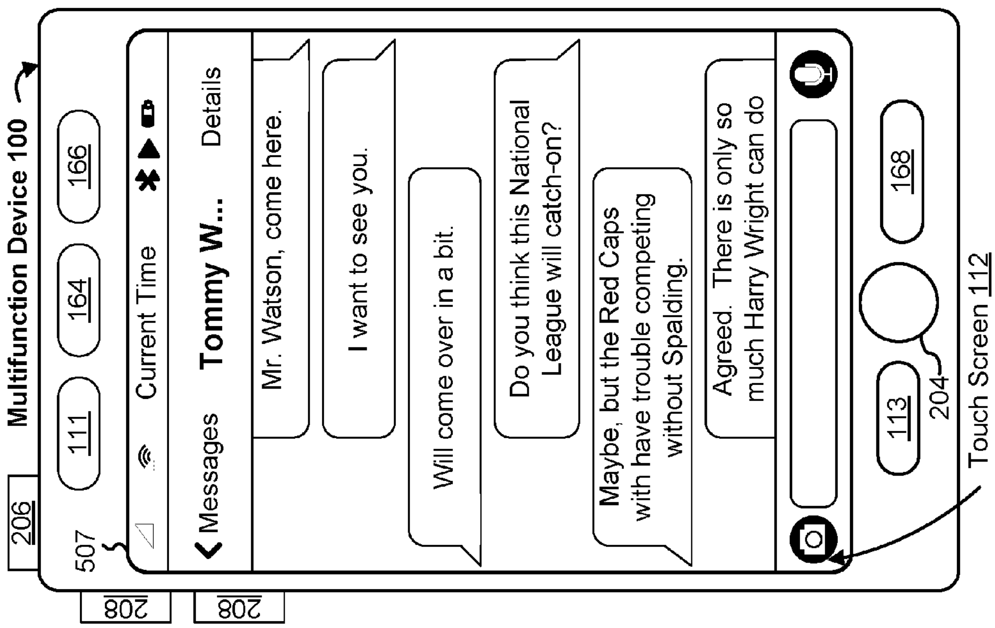
Figure 5D:
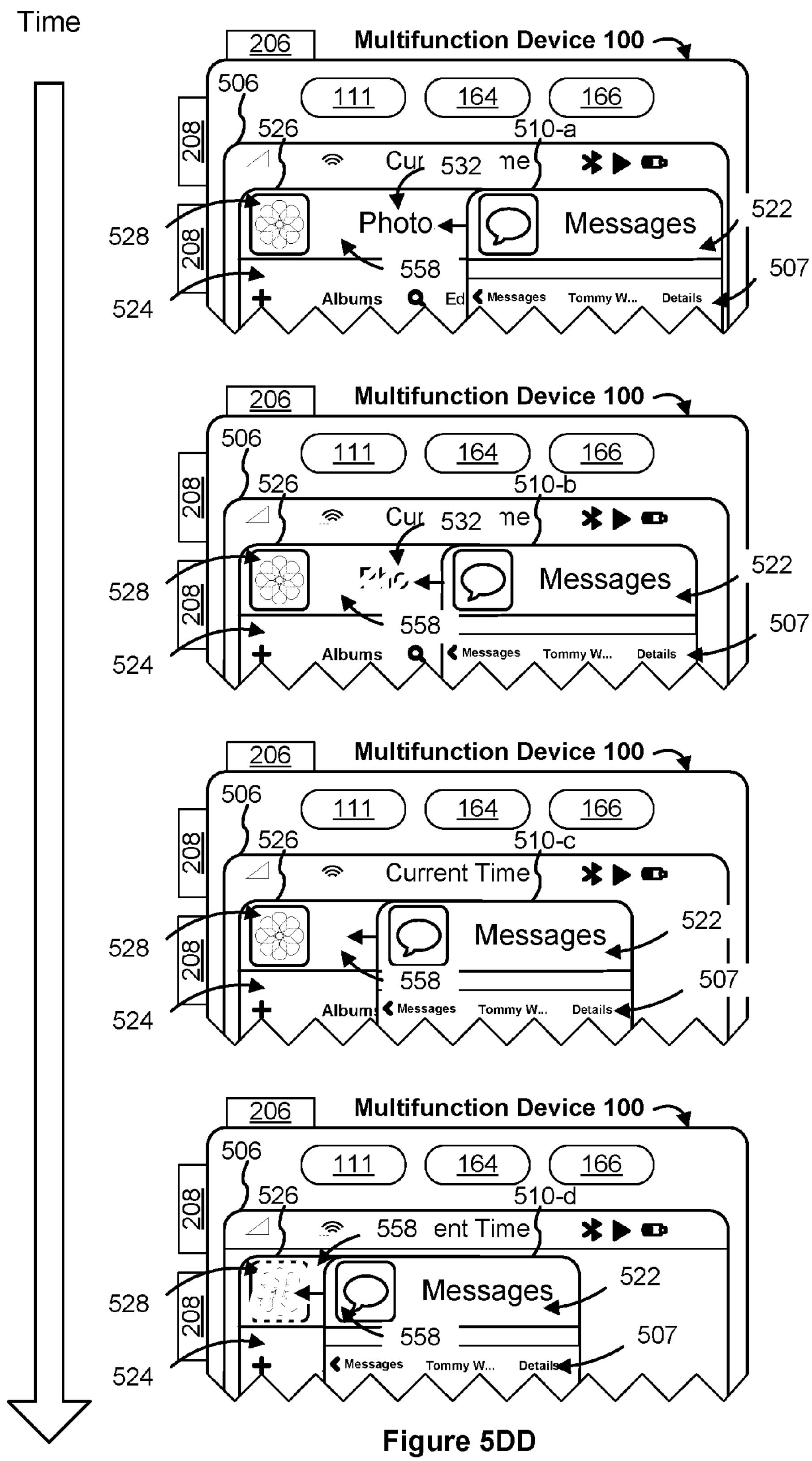
Figure 5E:
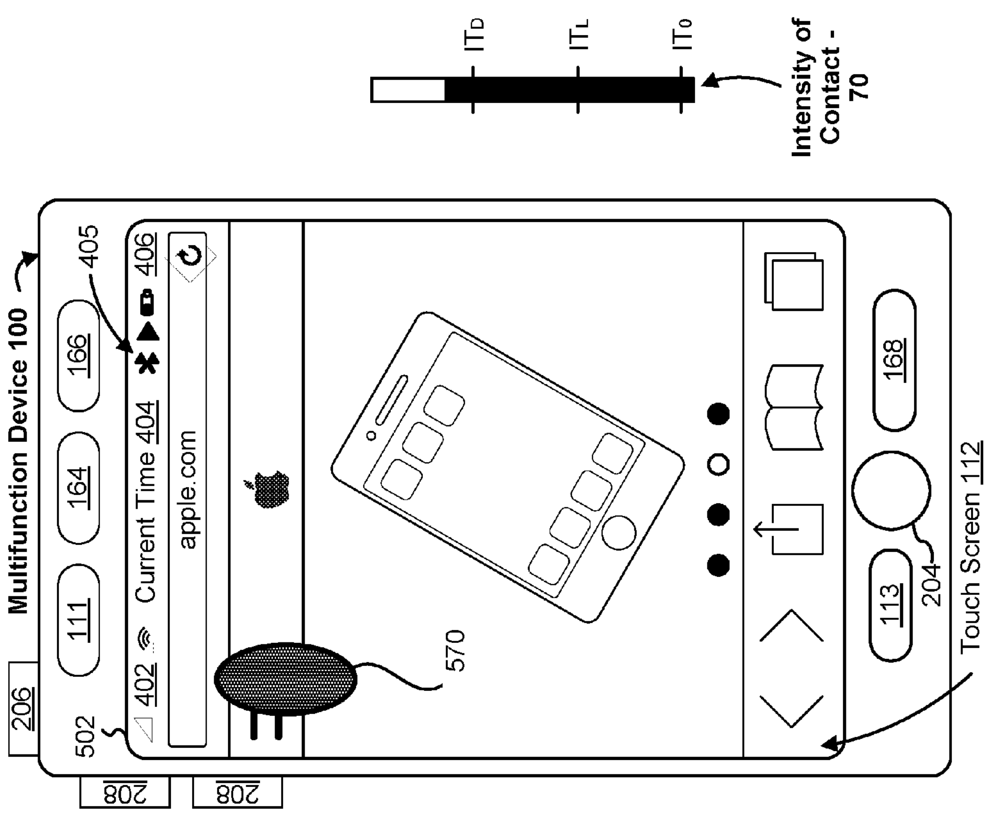
Figure 5F:
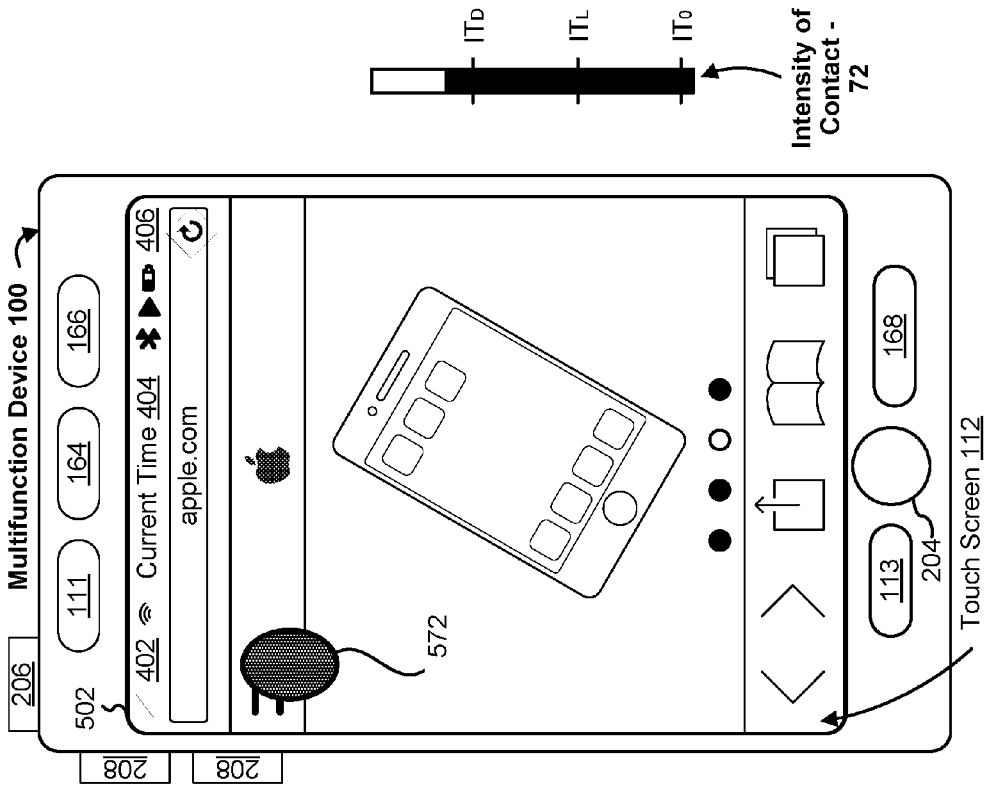
Figures 5G, 5H:
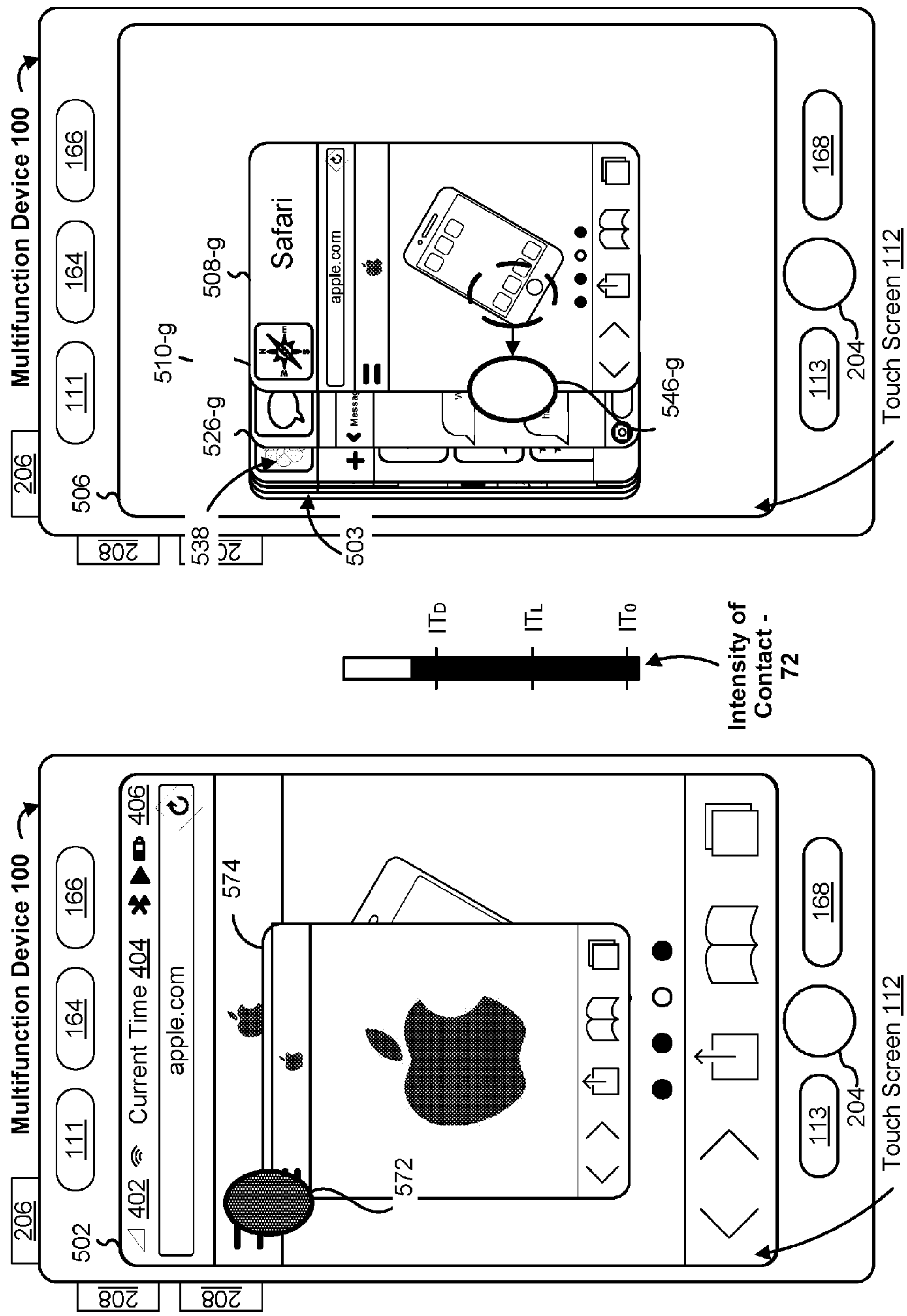

As illustrated in FIGS. 5Z-5AA, device 100 moves photo card 526 and music card 534 up in the stack after messaging card 510 is removed. Photo card 526 is moves from location 526-g in FIG. 5Z to location 526-h in FIG. 5AA, replacing the hole in the stack caused by removal of messaging card 510. Likewise, music card 534 moves from location 534-g in FIG. 5Z to location 534-h in FIG. 5AA, replacing the hole in the stack caused when photo card 526 moved up in the stack. The level of blurring applied to photo card 526 and music card 534 is also adjusted in accordance with their movement up in the stack. For example, photo card 526 is partially blurry when displayed at location 526-g in FIG. 5Z, but in focus when displayed at location 526-h in FIG. 5AA. In some embodiments, removal of the user interface representation card from the stack also closes an active application associated with the user interface.

FIGS. 5BB and 5CC illustrate leaving the user interface selection mode by selecting a user interface representation. FIG. 5BB illustrates user interface 506 for a user interface selection mode displaying a stack of user interface cards 508, 510, 526, and 534, being navigated by a user. Device 100 detects a tap gesture including contact 564 at a location on touch screen 112 displaying messaging card 510 (e.g., representation 510 of user interface 507 for a messaging application). In response to detecting the tap gesture, the device activates the messaging application associated with user interface 507 and changes the display on touch screen 112 from user interface 506 for the user interface selection mode to user interface 507 for the messaging application, as illustrated in FIG. 5CC.

FIG. 5DD illustrates visual effects applied to a title area associated with a first user interface representation card as the user interface representation card displayed above the first card moves into close proximity. FIG. 5DD illustrates messaging card 510 displayed over photo card 526 in user interface 506 of a user interface selection mode that includes a substantially two-dimensional representation of the stack. Photo card 526 is associated with title bar 558 including name "Photos" 532 and icon 526 for the image management application associated with user interface 524. Messaging card 510 is associated with title bar 522 displaying information related to the messaging application associated with user interface 507. Display of messaging card 510 gradually slides over photo card 526 over time (via movement from location 510-a in the top panel, through locations 510-b and 510-c in the middle panels, to location 510-d in the bottom panel of FIG. 5DD). As the edge of messaging title bar 522 approaches display of name "Photos" 532 on photo title bar 558 (when messaging card 510 is at location 508-b in the second panel), the device applies a transitional fading of name "Photos" 532. Panel three of FIG. 5DD illustrates that display of name "Photos" 532 is removed prior to messaging title bar 522 eclipsing its previous location on photo title bar 558.

Similarly, as the edge of messaging title bar 522 approaches display of icon 528 associated with the image management application on photo title bar 558 (when messaging card 510 is at location 508-d in the bottom panel of FIG. 5DD), the device applies a transitional fading of icon 528, such that display of icon 528 is removed from the display prior messaging title bar 522 eclipsing its previous location on photo title bar 558. In some embodiments, e.g., where the user interface selection mode includes a substantially three-dimensional representation of the stack, it the edge of the second user interface representation card (e.g., the card on top), rather than the associated title bar, that approaches, and triggers the animation removing, display of the title information associated with the first user interface representation card (e.g., the card on bottom). In certain embodiments, the animation applied to the information displayed in the title area (e.g., title bar) is a blurring or clipping, rather than the fading illustrated in FIG. 5DD. In some embodiments, the icons stack up, rather than disappear, when the next user representation card approaches.

Figure 6B:
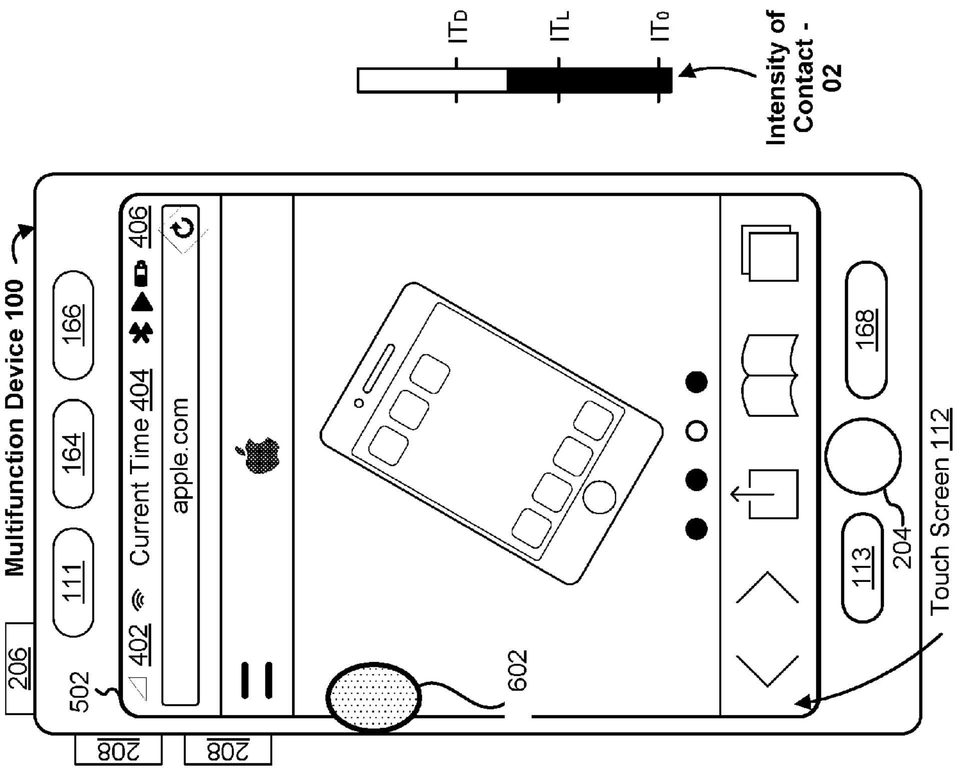
FIGS. 6A-6V illustrate exemplary user interfaces for navigating between a displayed user interface and previously displayed user interfaces in accordance with some embodiments.
Figure 6A:
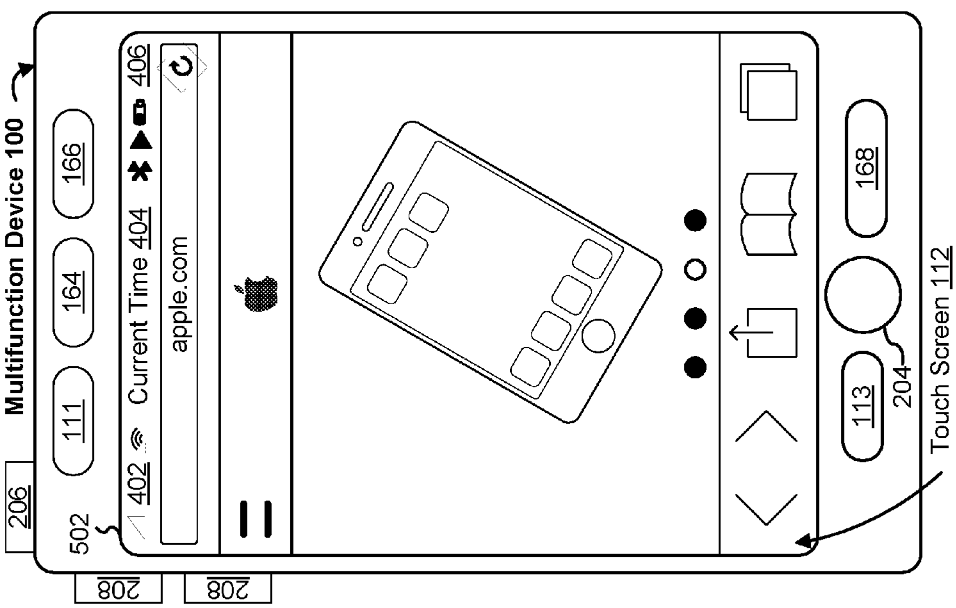
Figure 6D:
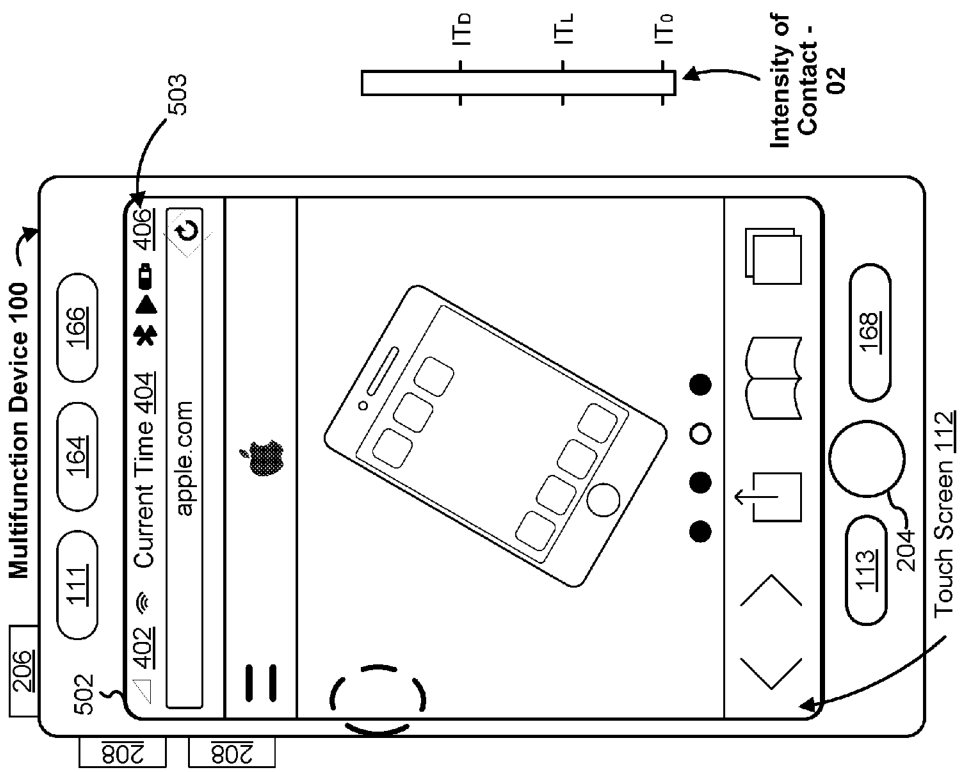
Figure 6C:
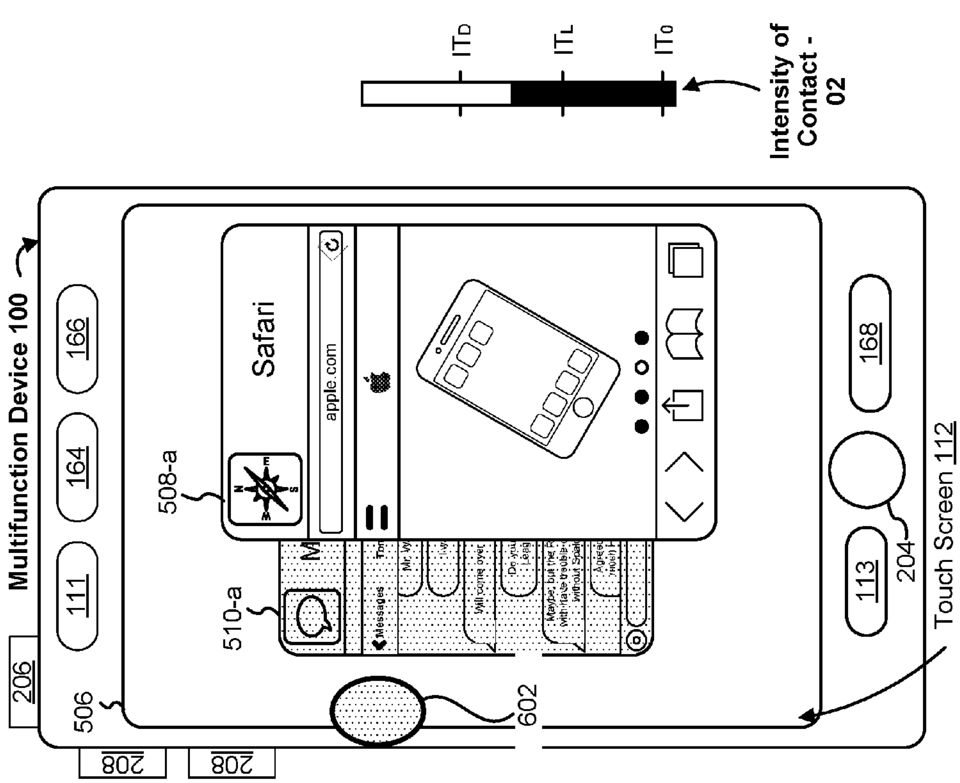
Figure 6F:
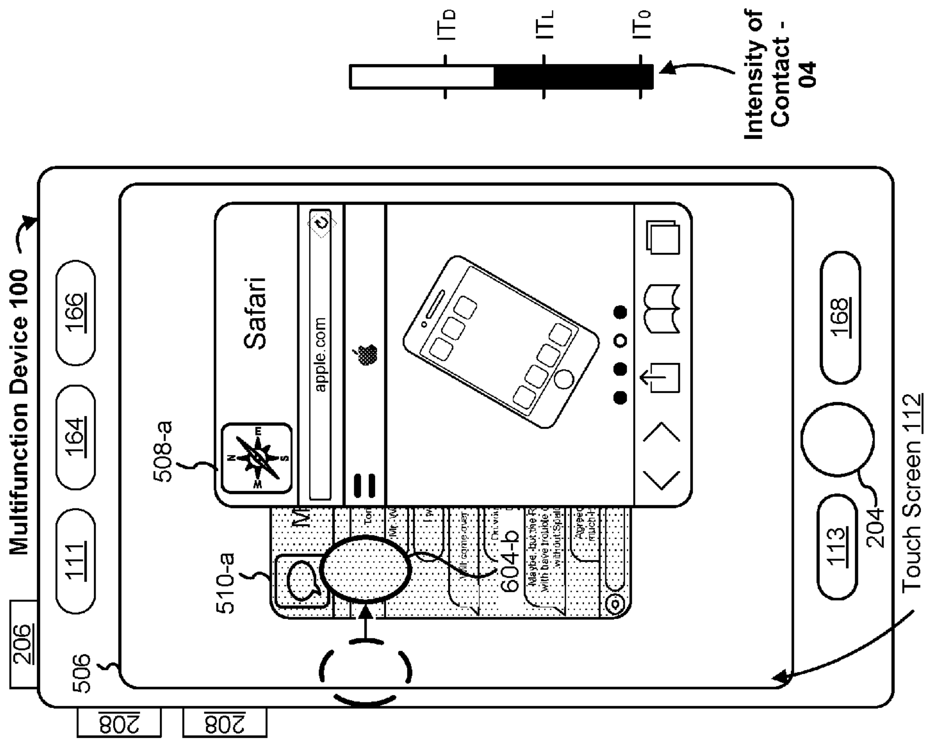
Figure 6E:
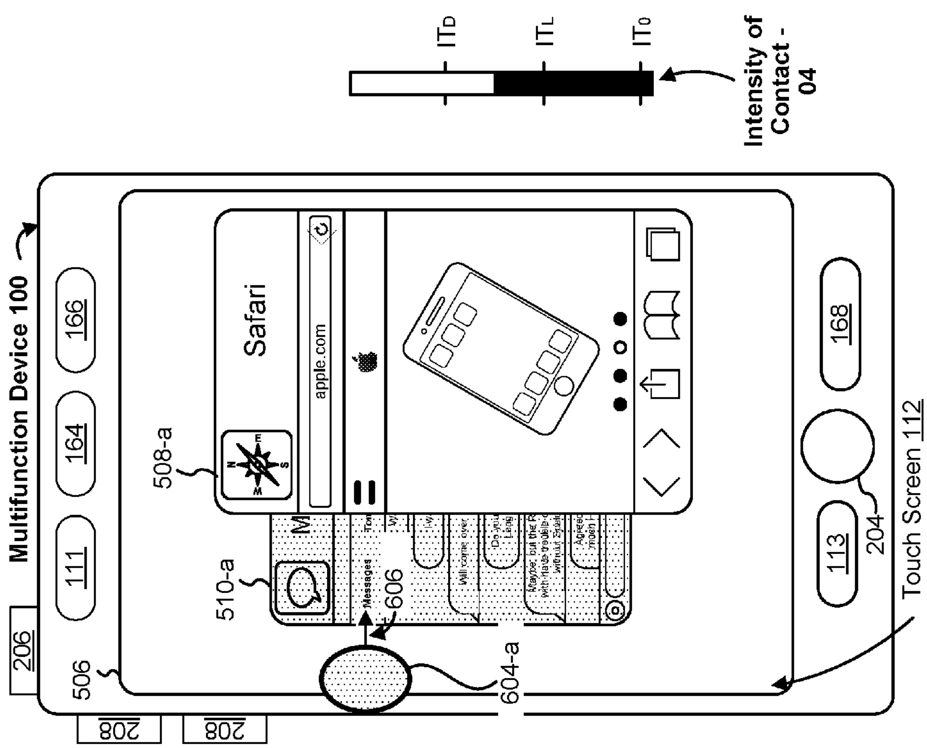
Figure 6G:
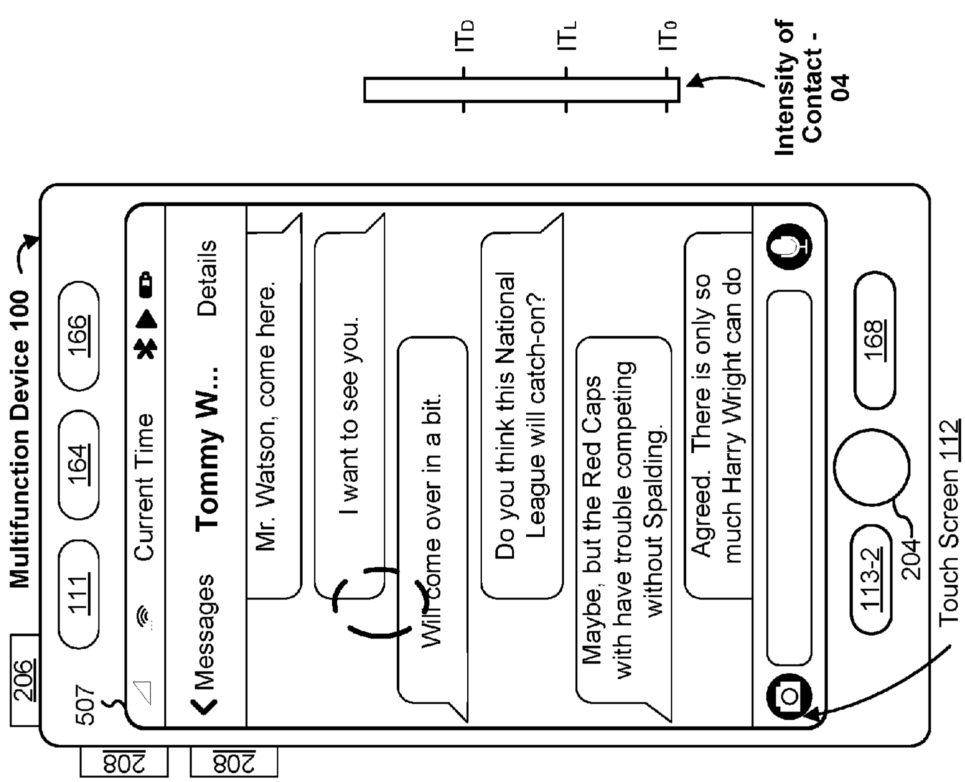
Figure 6H:
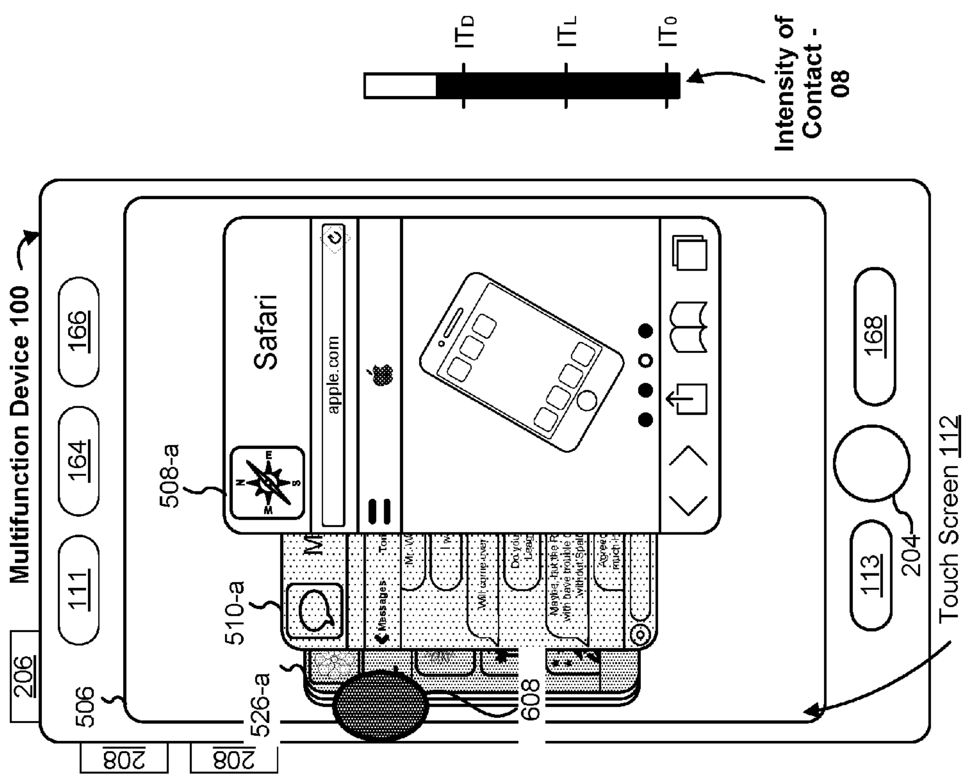
Figure 6J:
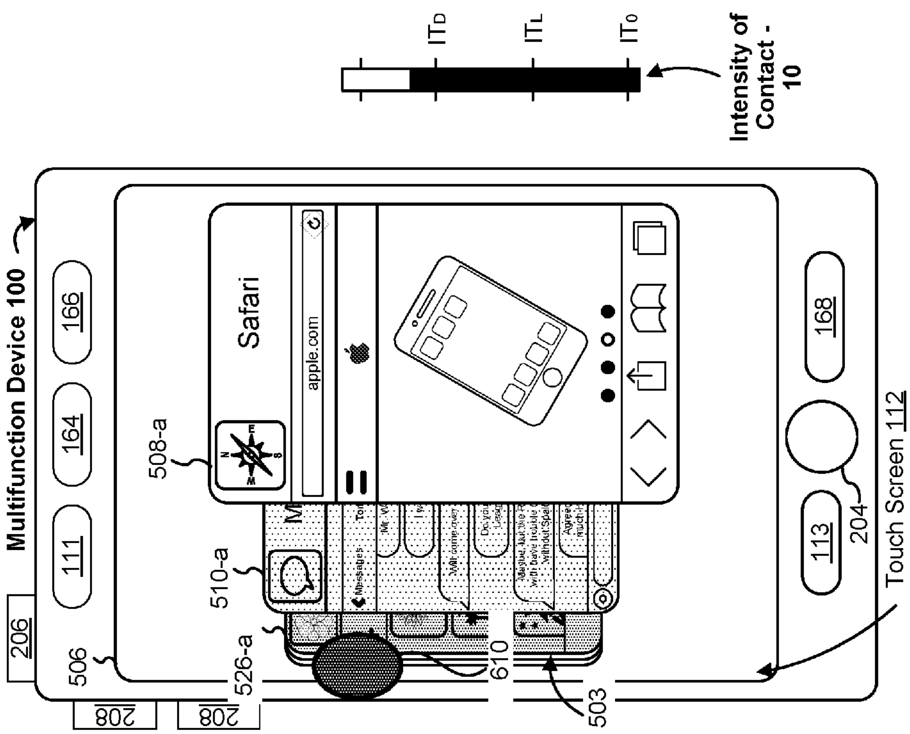
Figure 6I:
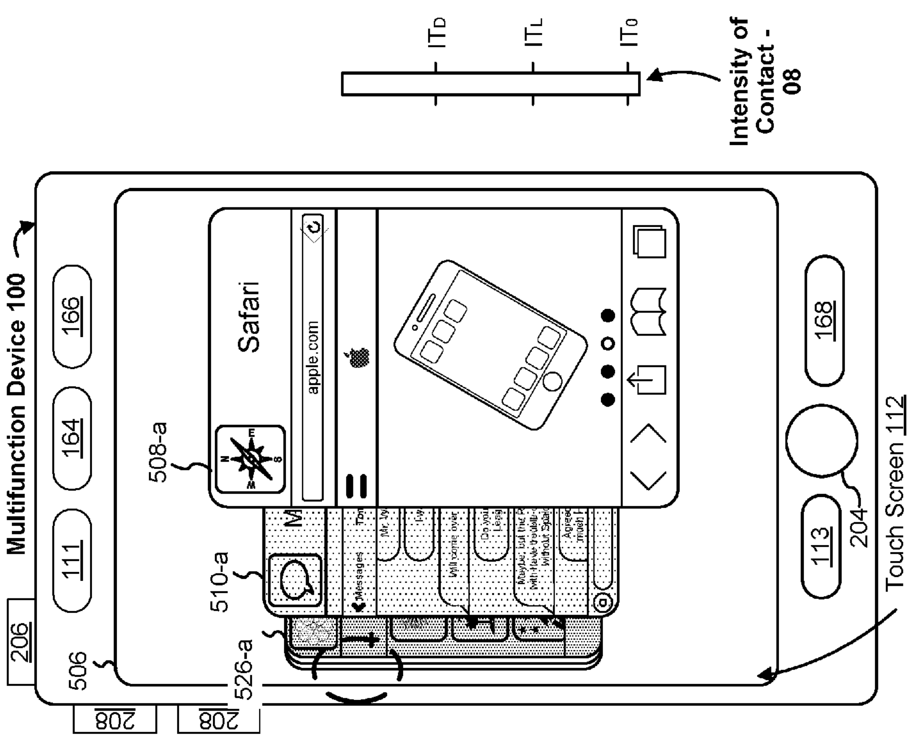
Figure 6K:
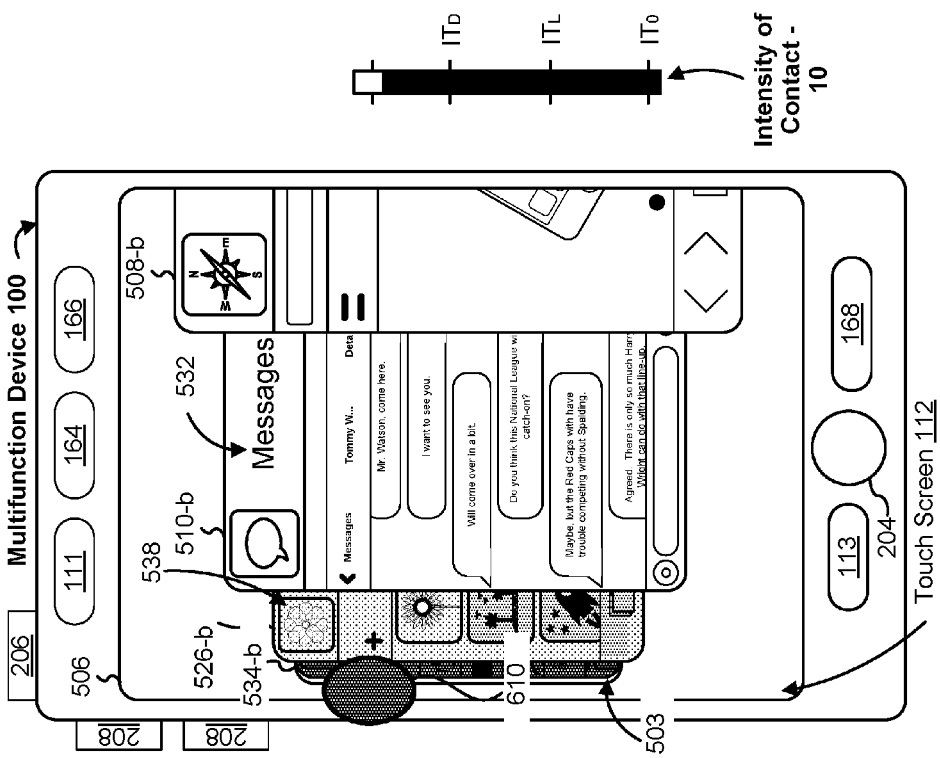
Figure 6L:
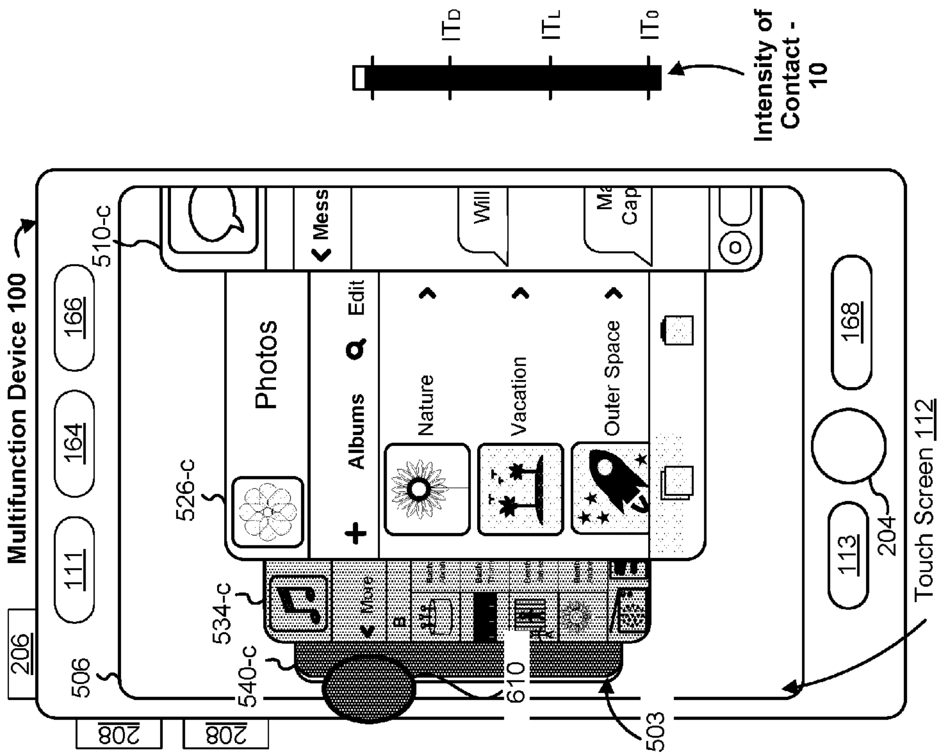
Figure 6N:
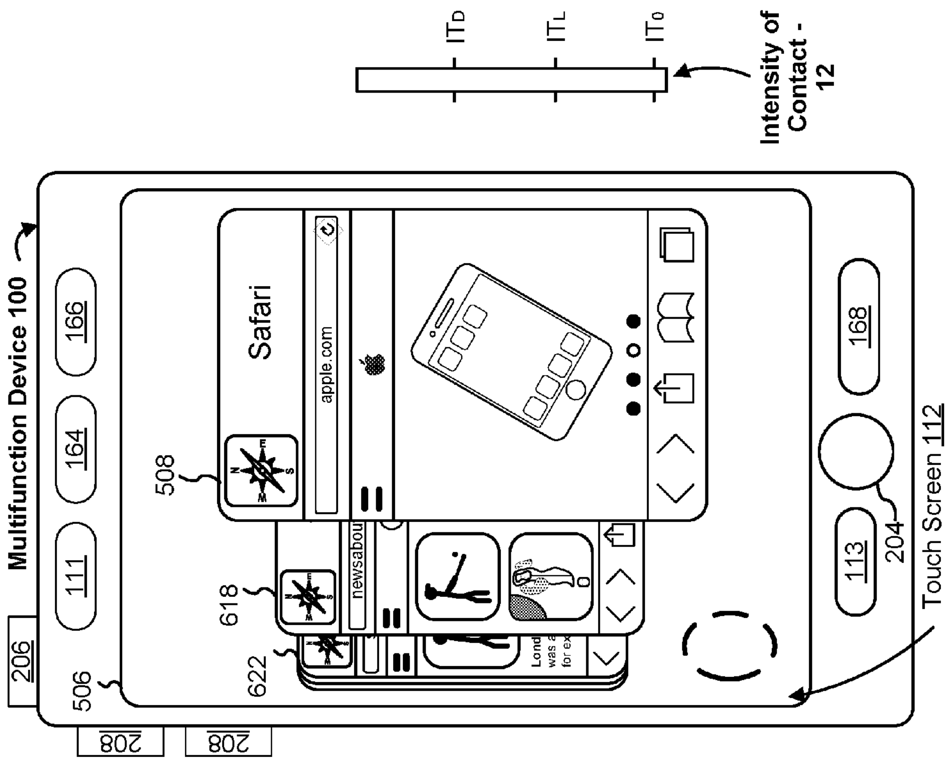
Figure 6M:
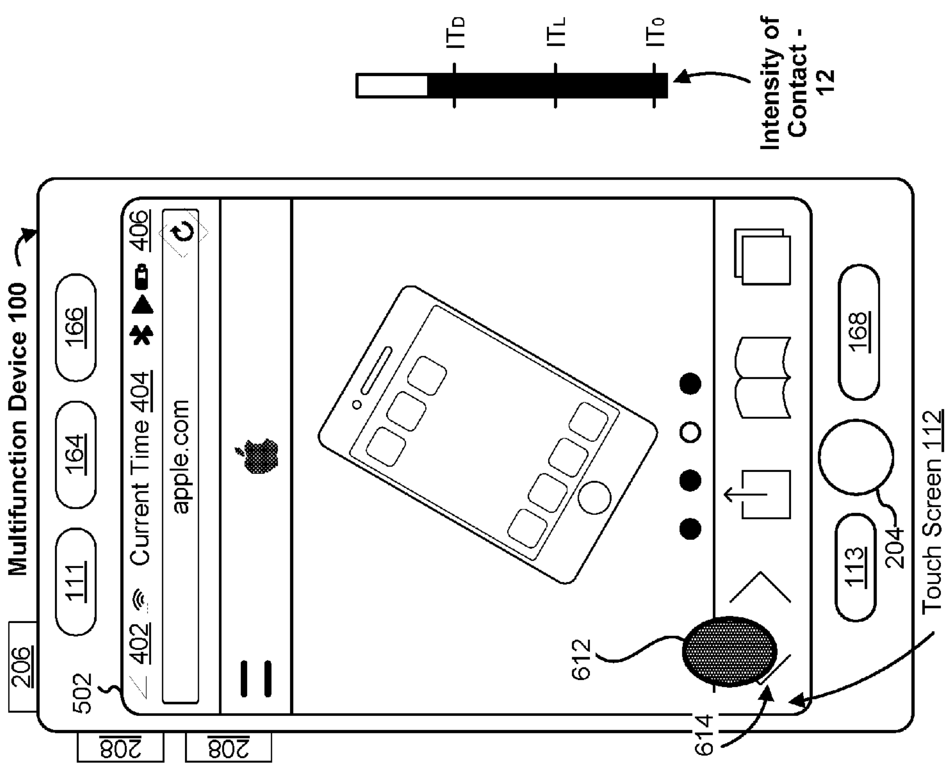
Figure 6O:
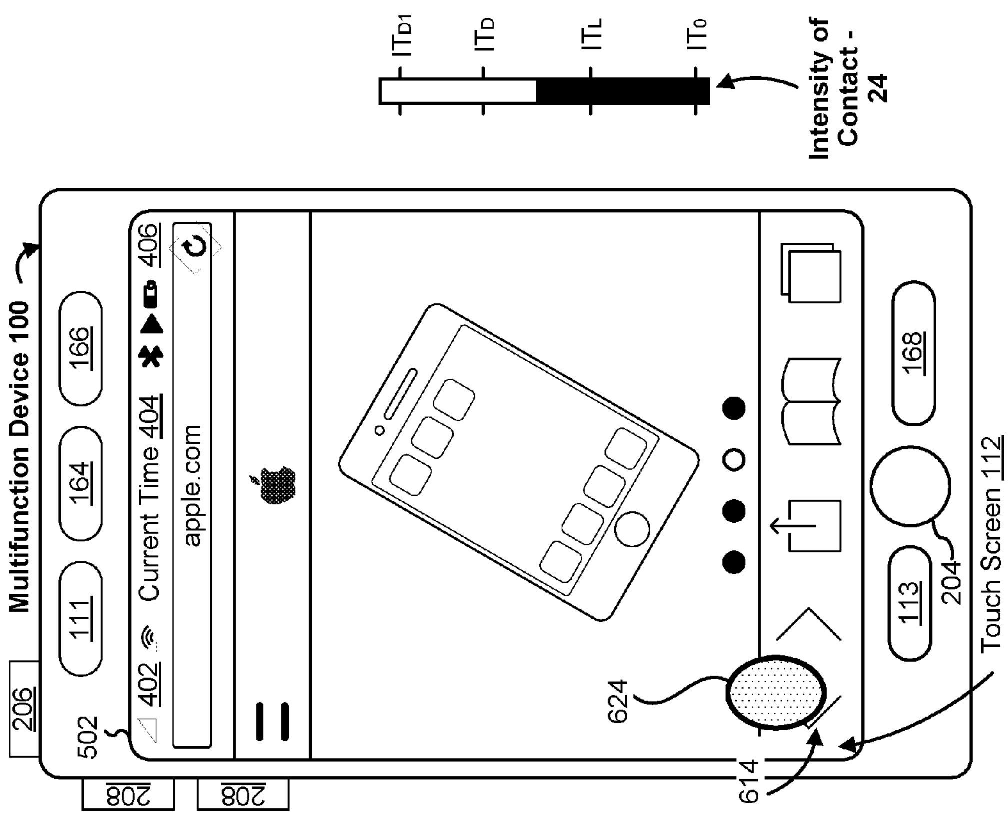
Figure 6P:
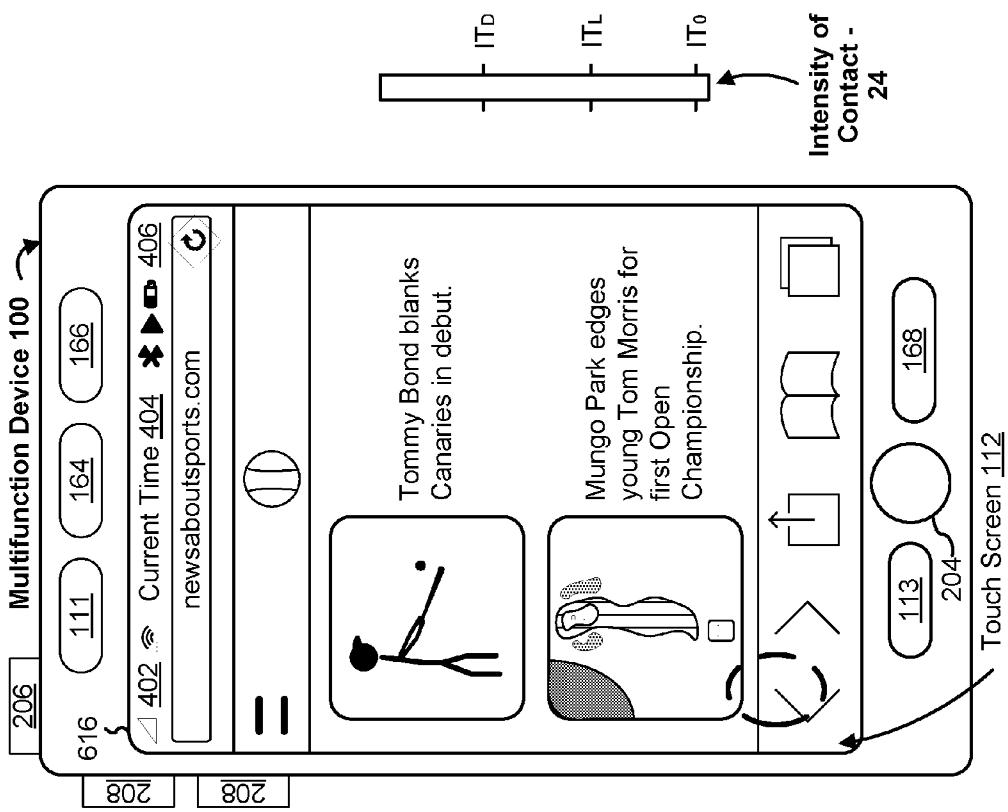
Figure 6R:
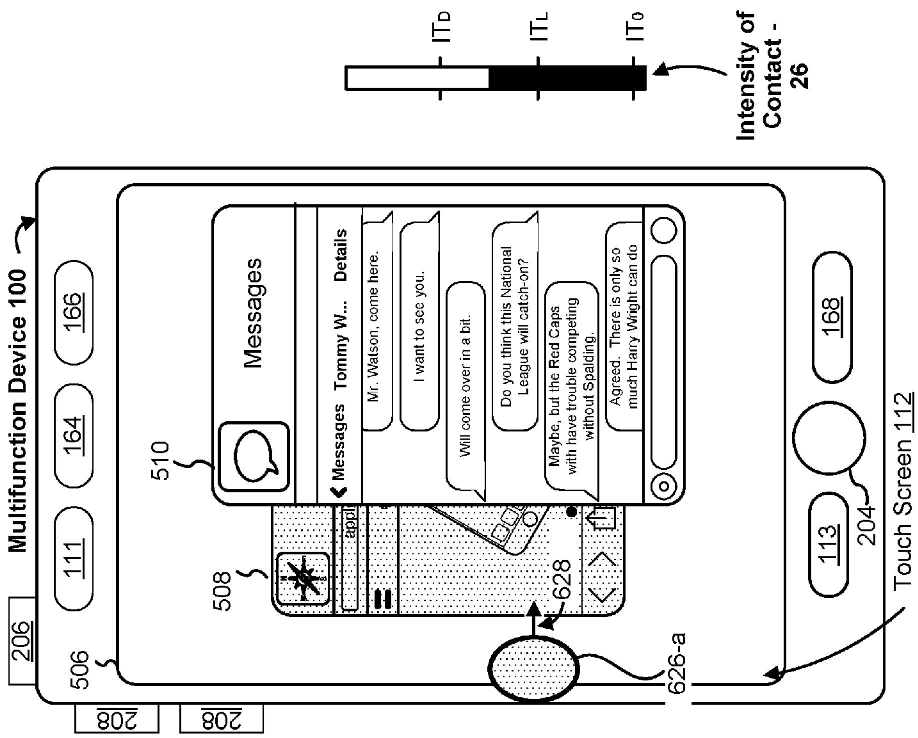
Figure 6Q:
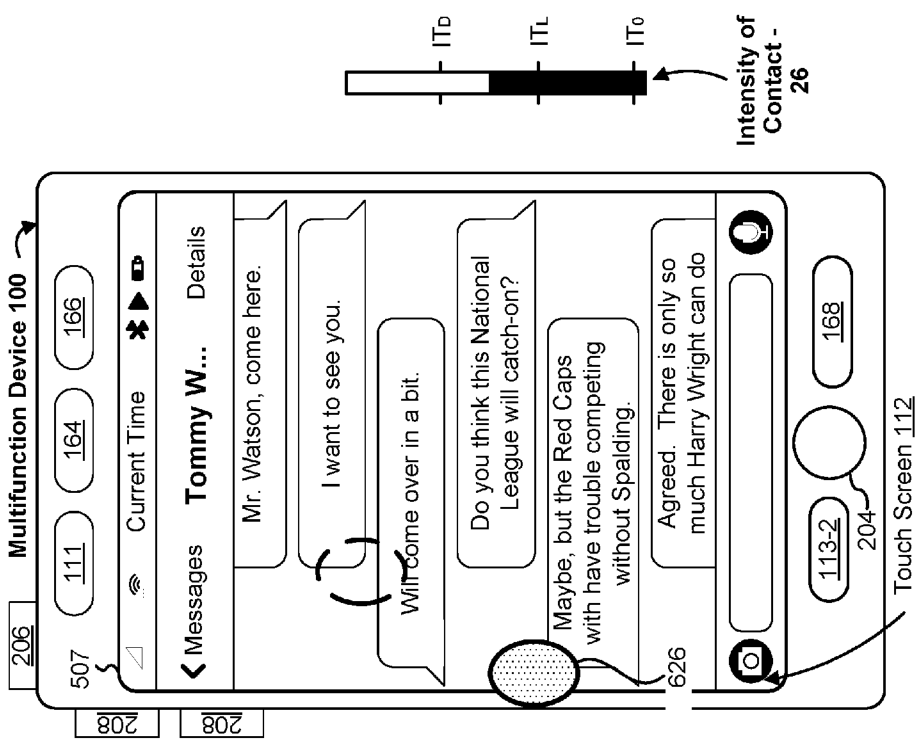
Figure 6S:
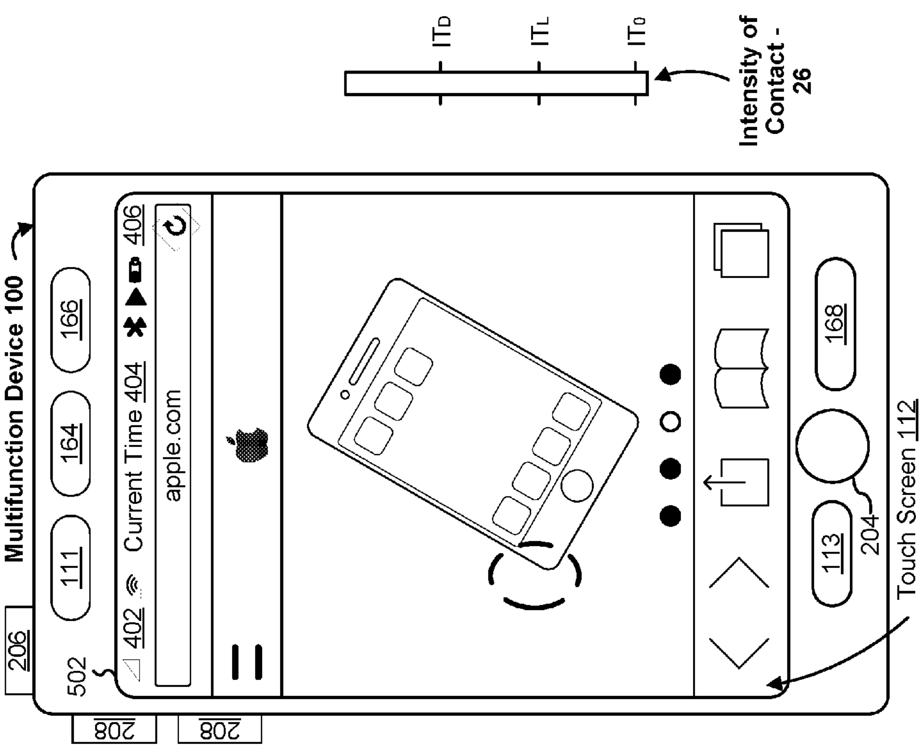
Figure 6T:
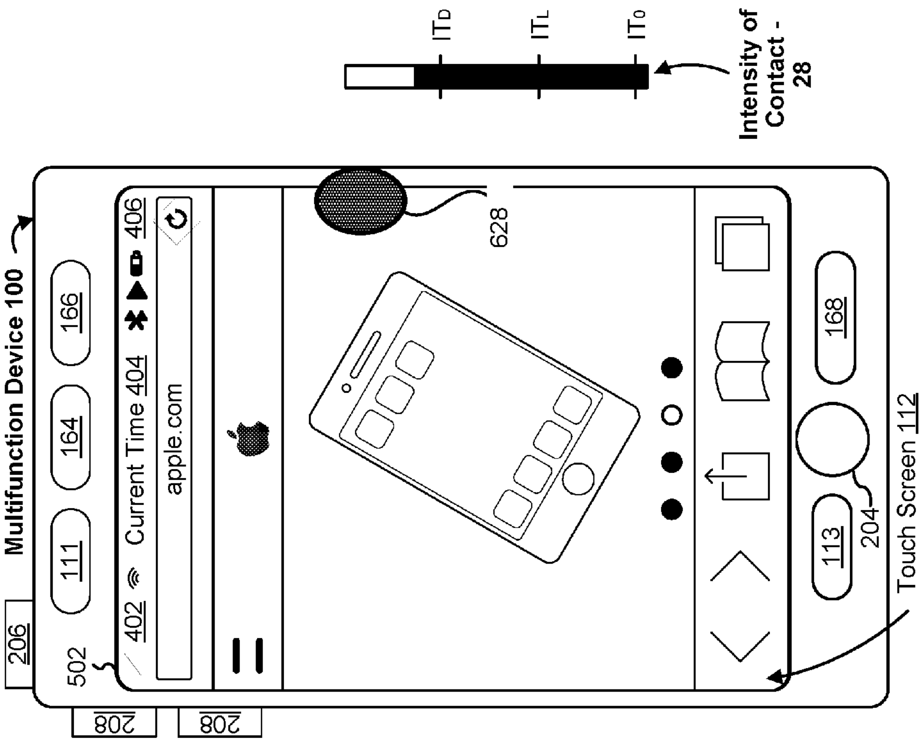
Figure 6V:
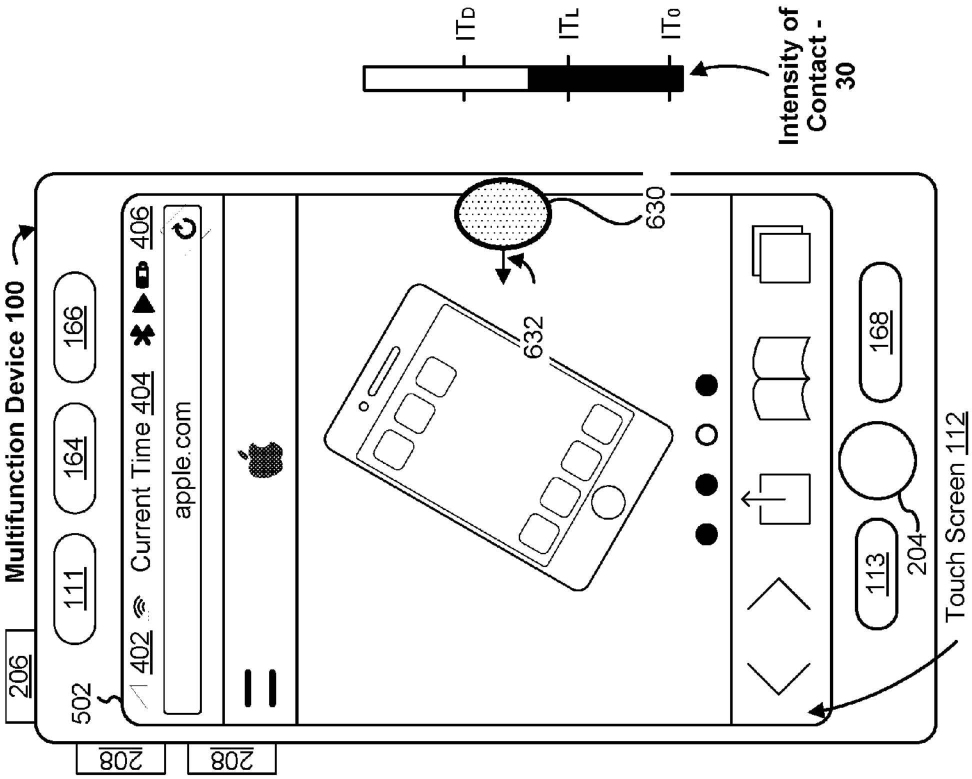

FIGS. 6A-6V illustrate exemplary user interfaces for navigating between user interfaces in accordance with some embodiments. The user interfaces in these figures are used to illustrate the processes described below, including the processes in FIGS. 10A-10H, 11A-11E, 12A-12E, 13A-13D, 14A-14C, 15, 24A-24F, and 25A-25H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 6A-6V illustrate exemplary embodiments of a user interface selection mode that allows a user to peek at representations of previously displayed user interfaces without leaving a current user interface, allow a user to quickly toggle between two respective user interfaces, and allow a user to easily enter into user interface selection modes with different types of hierarchal selections on an electronic device (e.g., multifunction device 100). Exemplary user interfaces (e.g., user interface 506 displayed on touch screen 112) for the user interface selection mode include representations of multiple user interfaces (e.g., representations 508, 510, 526, 534, 540, and 552 of user interfaces 502, 507, 524, 536, 542, and 552, respectively) for applications associated with the electronic device displayed as a virtual stack of cards (e.g., the "stack") or as a choice between the two most recently displayed user interfaces. User inputs (e.g., contacts, swipe/drag gestures, flick gestures, etc.) detected on touch screen 112 (e.g., a touch-sensitive surface) are used to navigate between user interfaces that can be selected for display on the screen (e.g., touch screen 112).

FIGS. 6A-6G illustrate an embodiment where a user operating an electronic device displaying a first user interface (e.g., any user interface for a respective application open on the device, such as a web browsing user interface) can navigate between (i) peeking at a previously displayed user interface and reverting back to the first user interface, (ii) changing to a previous application, (iii) entering a user interface selection mode (e.g., an application selection mode), and (iv) scrolling through user interfaces within a user interface selection mode with differential gestures starting from a common contact on a touch-sensitive surface (e.g., touch screen 112 on multifunction device 100).

FIGS. 6A-6D illustrate an embodiment where a user views (e.g., "peeks" at) a representation of a previously displayed user interface and then automatically reverts back to the user interface that was displayed on the device before peeking (e.g., reverts back to the application that was open on the device). FIG. 6A illustrates display of a graphical user interface 502 for a web browsing application on the electronic device.

As illustrated in FIGS. 6B-6C, the device enters a user interface preview mode upon detection of a user input including contact 602 adjacent to the left edge of touch screen 112 (e.g., on the bezel) with an intensity below a predetermined threshold (e.g., below deep press intensity threshold ($IT_D$); e.g., an exemplary predetermined input). While detecting the input including contact 602, the device replaces display of web browsing user interface 502 on touch screen 112, as illustrated in FIG. 6B, with display of user interface selection mode 506. User selection mode 506 includes user interface representation of the last two user interfaces displayed on touch screen 112, e.g., representation 508 of web browsing user interface 502 and representation 510 of messaging user interface 507. As illustrated in FIGS. 6B and 6C, the intensity of contact 602 is maintained below a deep press intensity threshold ($IT_D$) (e.g., an exemplary predetermined intensity threshold), and the contact is stationary at the original detection point.

Device 100 then detects termination of the user input including contact 602 in FIG. 6D. Because the intensity of contact 602 was maintained below a deep press intensity threshold ($IT_D$), and because the user input did not include movement of contact 602 (e.g., movement in a predefined direction on touch screen 112), device 100 reverts the display back to web browsing user interface 502 upon detection of termination (e.g., lift off) of contact 602 by replacing display of user interface 506 with display of user interface 502.

FIGS. 6A, 6E-6G illustrate an alternate embodiment where a user views (e.g., "peeks" at) a representation of a previously displayed user interface and selects display of the previously displayed user interface, rather than reverting back to the user interface that was displayed on the device before peeking. FIG. 6A illustrates display of a graphical user interface 502 for a web browsing application on the electronic device.

FIG. 6E illustrates that the device enters a user interface preview mode upon detection of a user input including contact 604 adjacent to the left edge of touch screen 112 (e.g., on the bezel) with an intensity below a predetermined threshold (e.g., below deep press intensity threshold ($IT_D$); e.g., an exemplary predetermined input). While detecting the input including contact 604, the device replaces display of web browsing user interface 502 on touch screen 112, with display of user interface selection mode 506. User selection mode 506 includes user interface representation of the last two user interfaces displayed on touch screen 112, e.g., representation 508 of web browsing user interface 502 and representation 510 of messaging user interface 507. As illustrated in FIGS. 5B and 5C, the intensity of contact 604 is maintained below a deep press intensity threshold ($IT_D$) (e.g., an exemplary predetermined intensity threshold). However, electronic device detects movement 606 of contact 604 in a predefined direction (e.g., laterally across touch screen 112) from location 604-a in FIG. 6E to location 604-b in FIG. 6F.

Device 100 then detects termination of the user input including contact 604 in FIG. 6D. Because the intensity of contact 604 was maintained below a deep press intensity threshold ($IT_D$), and because the user input included movement of contact 604 in a predefined direction on touch screen 112 (e.g., laterally across the display), device 100 replaces display user interface 506 with display of user interface 507 for a messaging application, rather than reverting back to web browsing user interface 502, as illustrated in FIG. 6D.

Thus, in some embodiments, when a user input invoking the user interface preview mode has a characteristic intensity (e.g., a maximum intensity for the duration of the input below a predetermined threshold) a user can distinguish between reverting back to display of the user interface displayed immediately preceding entry into the user interface preview mode (e.g., when the user is just peeking at a previously displayed user interface) and changing the display to the previously displayed user interface by moving the contact associated with the gesture in a predetermined direction or not (e.g., keeping the contact stationary).

FIGS. 6A, 6H-6I illustrate another alternate embodiment where a user views (e.g., "peeks" at) a representation of a previously displayed user interface and selects to stably enter a user interface selection mode, rather than reverting back to display of either of the previously displayed user interfaces represented during the user's peek. FIG. 6A illustrates display of a graphical user interface 502 for a web browsing application on the electronic device.

As previously illustrated in FIGS. 6C and 6E, the device enters a user interface preview mode upon detection of a user input including a contact adjacent to the left edge of touch screen 112 (e.g., on the bezel) with an intensity below a predetermined threshold (e.g., below deep press intensity threshold ($IT_D$); e.g., an exemplary predetermined input). FIG. 6H further illustrates that upon detection of an increase in the intensity of the invoking contact (e.g., contact 608 in FIG. 6H), the device enters a stable user interface selection mode. Upon entering the stable user interface selection mode, device 100 displays a stack of user interface representation cards on touch screen 112, including user interface representations 508, 510, and 526 displayed in relative Z-positions (e.g., as described for FIGS. 5A-5HH).

Device 100 then detects termination of the user input including contact 608 in FIG. 6I. Because the intensity of contact 608 exceeded a predetermined intensity threshold (e.g., deep press intensity threshold ($IT_D$)) for invoking a stable user interface mode, device 100 does not replace the display of user interface 506 on touch screen 112. In some embodiments, further navigation within the stable user interface selection mode is performed as described for FIGS. 5A-5HH.

Thus, in some embodiments, the user can further distinguish between peeking and selecting one of a limited number of user interfaces displayed in a user interface selection preview mode for display on touch screen 112 and entering a stable user interface selection mode with further navigational controls based on the intensity of the contact used to invoke the user interface selection preview mode.

FIGS. 6J-6L illustrate an embodiment in which the user directly manipulates display of a user interface selection mode by increasing the intensity of a user input. FIG. 6J illustrates entry into a stable user interface selection mode, including display of a stack of user interface representation cards (e.g., user interface representations 508, 510, and 526 displayed in relative Z-positions with each other, e.g., as described for FIG. 5A-5HH) in user interface 506 by detection of contact 610 adjacent to the left edge of touch screen 112 (e.g., on the bezel) with an intensity exceeding a predetermined intensity threshold (e.g., deep press intensity threshold ($IT_D$)).

FIGS. 6K-6L illustrate that when device 100 detects further increases in the intensity of contact 610, user interface representation cards displayed in the stack are spread-out (e.g., along a z-axis substantially orthogonal to the plane of the display) based on direct manipulation of the contact intensity by the user. In some embodiments, as illustrated in FIGS. 6K-6L, a small change in intensity (e.g., from an intensity detected just below the top tick mark in FIG. 6K to an intensity detected just above top tick mark in FIG. 6L) causes movement of messaging card 510 from location 510-b in FIG. 6K to location 510-c in FIG. 6L, revealing more of photo card 526 and music card 534 in FIG. 6L.

FIGS. 6M-6P illustrate an embodiment where device 100 distinguishes between user inputs made within an application user interface based on a characteristic intensity of the user input. FIG. 6M illustrates display of a graphical user interface 502 for a web browsing application on the electronic device. User interface 502 includes application-specific "back" button icon 614 for navigating to a previously displayed user interface (e.g., a previous web page displayed on touch screen 112) within the application. Device 100 detects a deep press including contact 612 having a characteristic intensity exceeding a predetermined intensity threshold (e.g., deep press intensity threshold ($IT_D$)) at a location on touch screen 112 corresponding to display of "back" button icon 614. In response to detecting the deep press, device 100 replaces display of web browsing user interface 502 on touch screen 112 with user interface 506 for a user interface selection mode that includes user interface representations 508, 618, and 622 of previously viewed web browsing interfaces 502, 616, and 620 (e.g., previously viewed web pages in a hierarchy of the browser history) in FIG. 6N.

Alternatively, device 100 detects a swipe gesture (e.g., movement 632 of contact 630) originating at the edge of touch screen 112 in FIG. 6V. In response, device 100 navigates backwards in an application-specific user interface hierarchy (e.g., navigates back to the last webpage viewed in the web browsing application) and replaces display of user interface 502 in FIG. 6V with user interface 616 in FIG. 6P. In some embodiments, device 100 applies a dynamic animation upon detection of the edge swipe, for example, animating slide of user interface 502 off the screen, gradually revealing previously displayed user interface 616, as if stacked below user interface 502. In some embodiments, the animation is directly manipulated by the progress of the user swipe gesture. Thus, FIGS. 6V and 6P illustrate using an edge swipe gesture (e.g., including movement 632 of contact 630) to navigate back in an application-specific user interface hierarchy.

FIG. 6O also illustrates display of a graphical user interface 502 for a web browsing application on the electronic device. User interface 502 includes application-specific "back" button icon 614 for navigating to a previously displayed user interface (e.g., a previous web page displayed on touch screen 112) within the application. Device 100 detects a tap gesture (rather than a deep press as illustrated in FIG. 6M) including contact 624 having a characteristic intensity below a predetermined intensity threshold (e.g., deep press intensity threshold ($IT_D$)). In response to detecting the tap gesture, device 100 replaces display of web browsing user interface 502 on touch screen 112 with web browsing user interface 616 for a previously viewed user interface in the associated web browsing application (e.g., the last web page visited in the web browsing application), as illustrated in FIG. 6P. Thus, in some embodiments, an electronic device distinguished between application-specific user interface inputs based on a characteristic intensity of the user input.

FIGS. 6Q-6S illustrate that after toggling between a first user interface and a second user interface through the user interface preview mode, as described for FIGS. 6A, 6E-6G, a user may quickly toggle back to the first user interface by repeating the user gesture while the device displays the user interface for the second application.

FIG. 6Q illustrates that after detecting lift off the user gesture that caused the device to change the user interface display to second user interface 507 for a messaging application, the device detects a second user input including contact 626 adjacent to the left edge of touch screen 112 (e.g., on the bezel) with an intensity below a predetermined threshold (e.g., below deep press intensity threshold ($IT_D$); e.g., an exemplary predetermined input). While detecting the input including contact 626, the device replaces display of messaging user interface 507 on touch screen 112, with display of user interface selection mode 506. As illustrated in FIG. 6R, user selection mode 506 includes user interface representation of the last two user interfaces displayed on touch screen 112, e.g., representation 508 of web browsing user interface 502 and representation 510 of messaging user interface 507. However, the relative order of representation 508 and 510 in user interface 506 is switched, as compared to display of the user interface 506 in FIGS. 6E-6F, because messaging user interface 507 is now the most recently displayed user interface on touch screen 112, and is thus representation 510 of user interface 507 is displayed over representation 508 of user interface 502 in FIG. 6R.

As illustrated in FIGS. 6Q and 6R, the intensity of contact 626 is maintained below a deep press intensity threshold ($IT_D$) (e.g., an exemplary predetermined intensity threshold). However, electronic device detects movement 628 of contact 626 in a predefined direction (e.g., laterally across touch screen 112) from location 626-a in FIG. 6R. Device 100 then detects termination of the user input including contact 626 in FIG. 6S. Because the intensity of contact 626 was maintained below a deep press intensity threshold ($IT_D$), and because the user input included movement of contact 626 in a predefined direction on touch screen 112 (e.g., laterally across the display), device 100 replaces display of user interface 506 with display of user interface 502 for a web browsing application, rather than reverting back to messaging user interface 507, as illustrated in FIG.

6Q. Thus, the user has toggled back to the first user interface displayed on touch screen 112 in FIG. 6A.

Figure 6U:
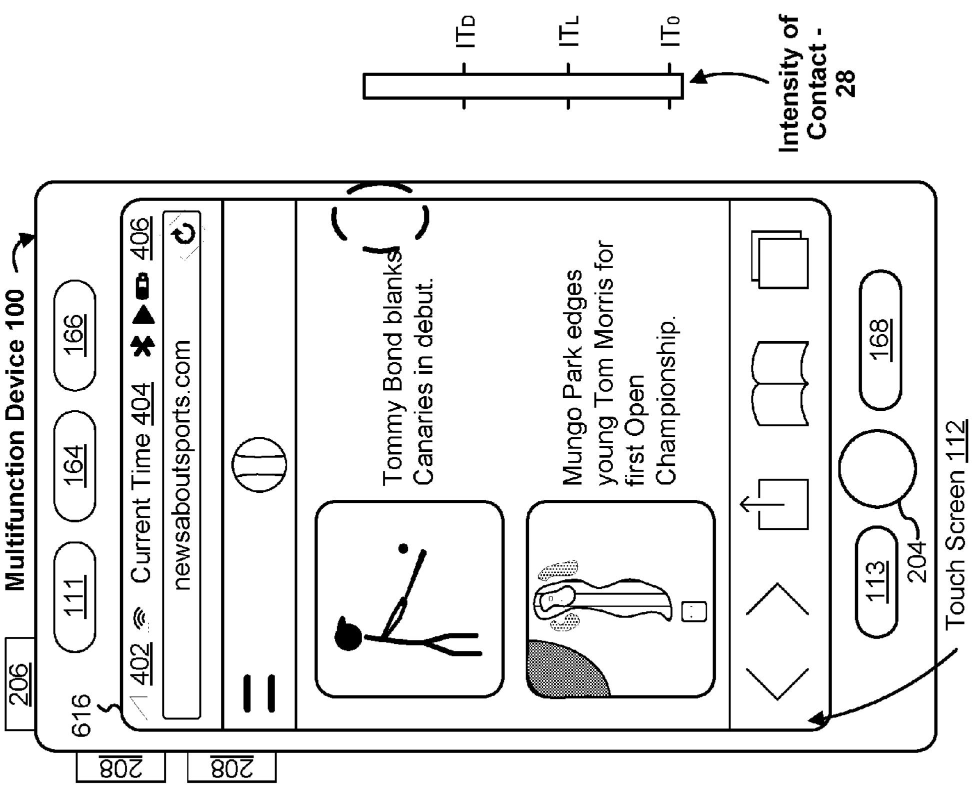

FIGS. 6T-6U illustrate an embodiment where device 100 distinguishes between user inputs made a first predefined location with user inputs made at a second predefined location on device 112. FIG. 6T illustrates display of a graphical user interface 502 for a web browsing application on the electronic device. Device 100 detects a deep press including contact 628 having a characteristic intensity exceeding a predetermined intensity threshold (e.g., deep press intensity threshold ($IT_D$)) adjacent to the right edge of touch screen 112 (e.g., on the bezel; a second predefined location). In response to detecting the deep press, device 100 replaces display of web browsing user interface 502 on touch screen 112 with web browsing user interface 616 for a previously displayed website on touch screen 112, as illustrated in FIG. 6U.

This is in contrast with the detection of a deep press input in FIG. 6H adjacent to the left edge of touch screen 112 (e.g., on the bezel; at a first predefined location), which caused device to enter a stable user interface selection mode. Thus, in some embodiments, different operations are performed depending on whether an invoking gesture is detected within a first predefined location or a second predefined location on the touch-sensitive surface.

Figure 7B:
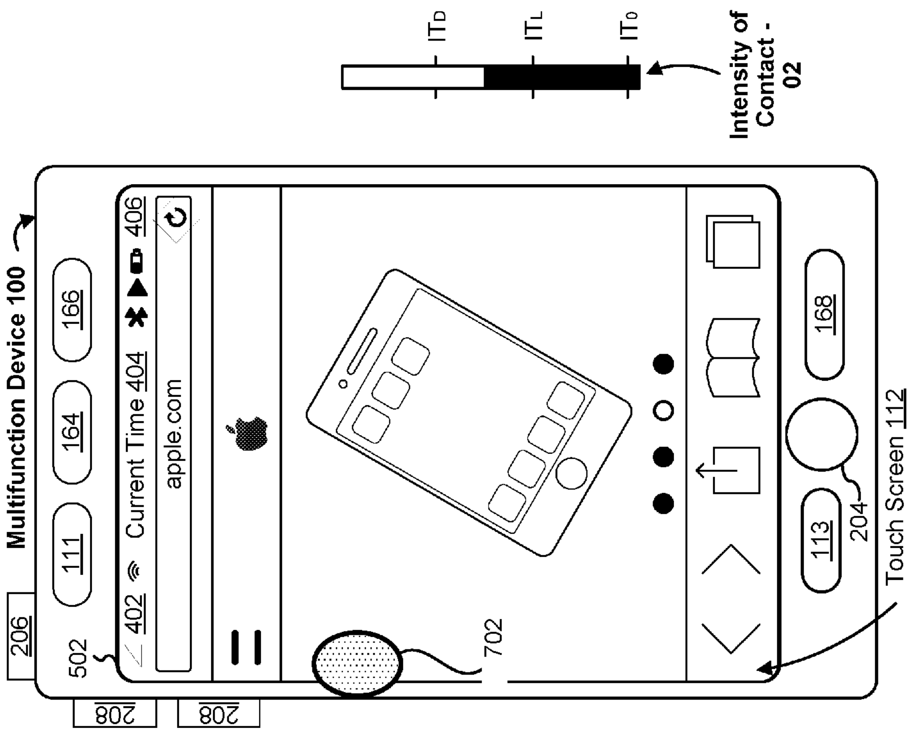
FIGS. 7A-7O illustrate exemplary user interfaces for navigating between a displayed user interface and the user interface immediately preceding the displayed user interface in accordance with some embodiments.
Figure 7A:
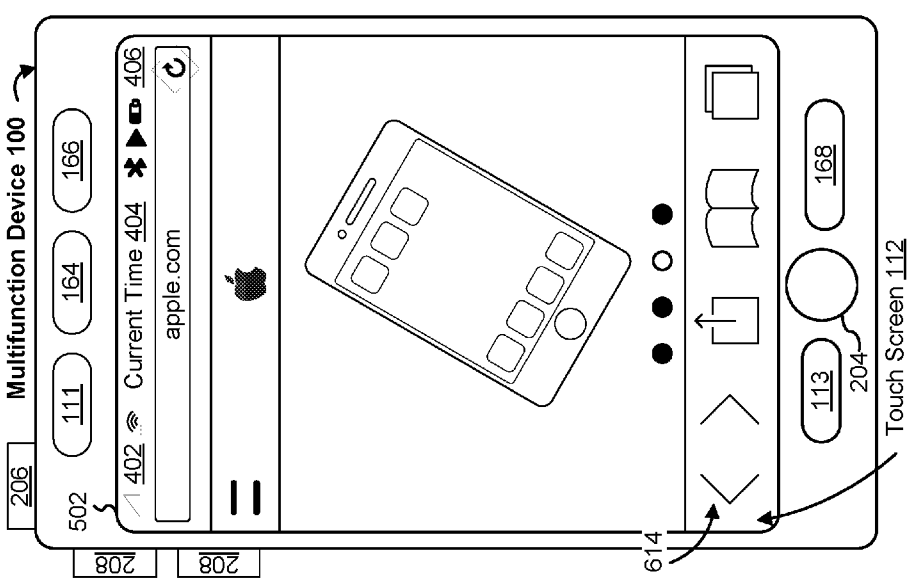
Figure 7D:
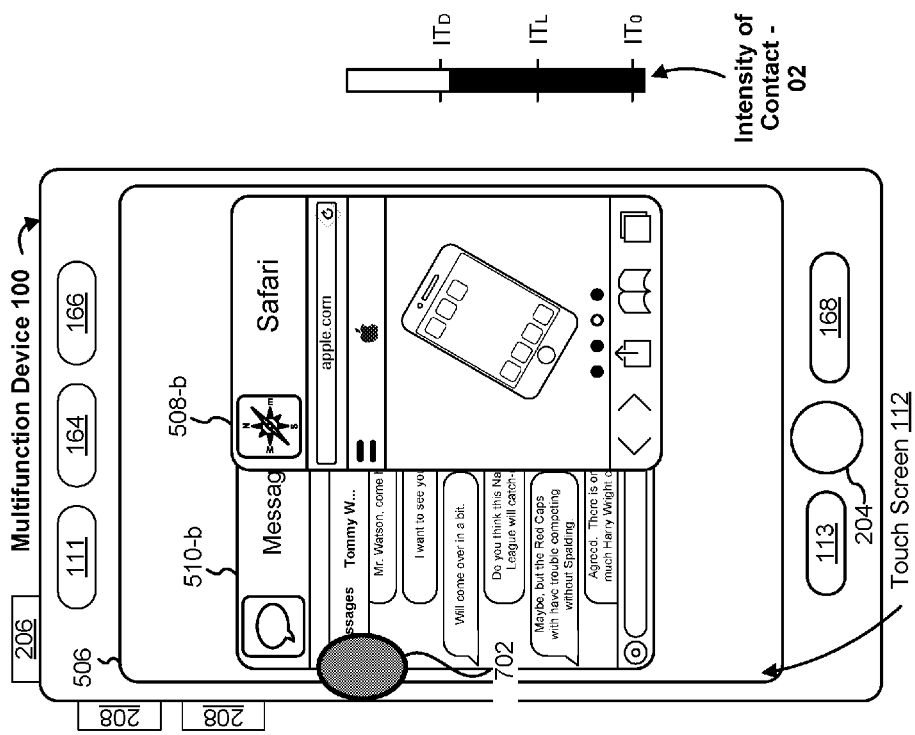
Figure 7C:
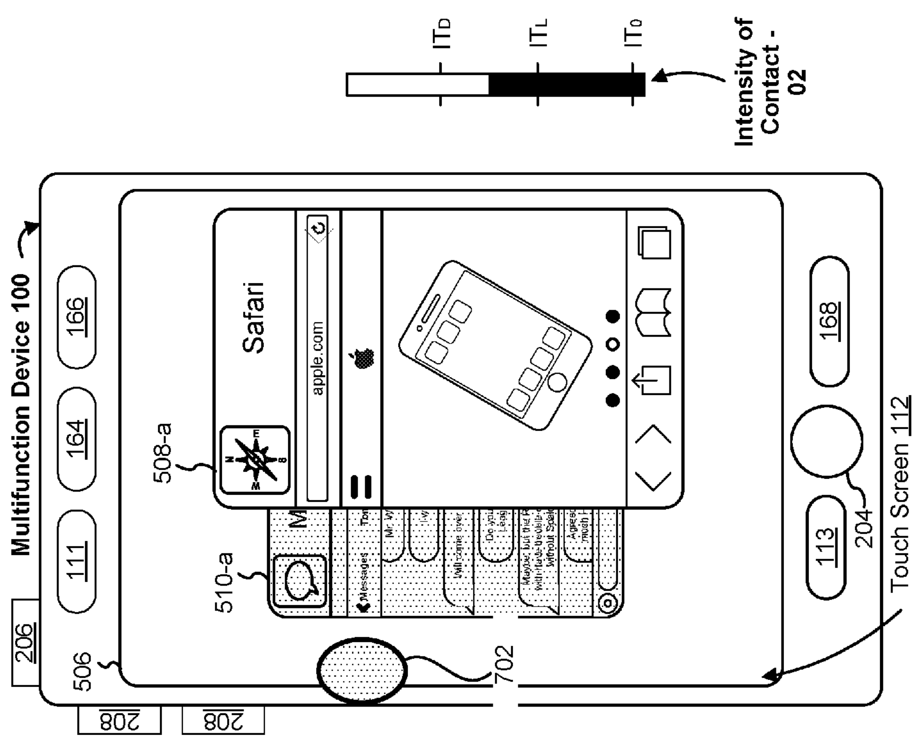
Figure 7E:
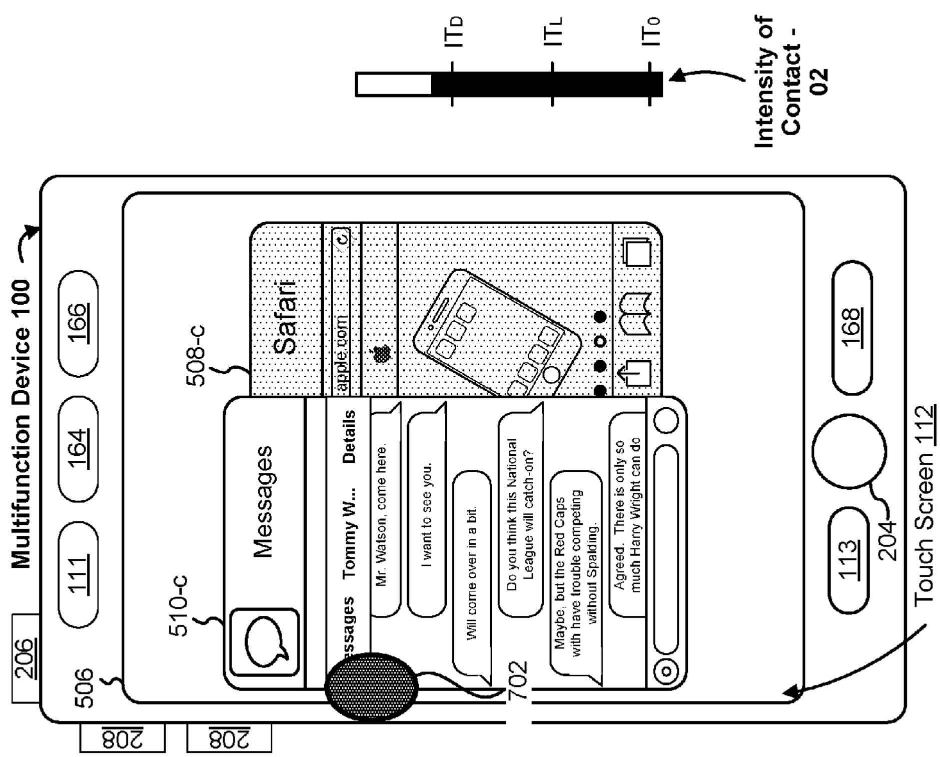
Figure 7F:
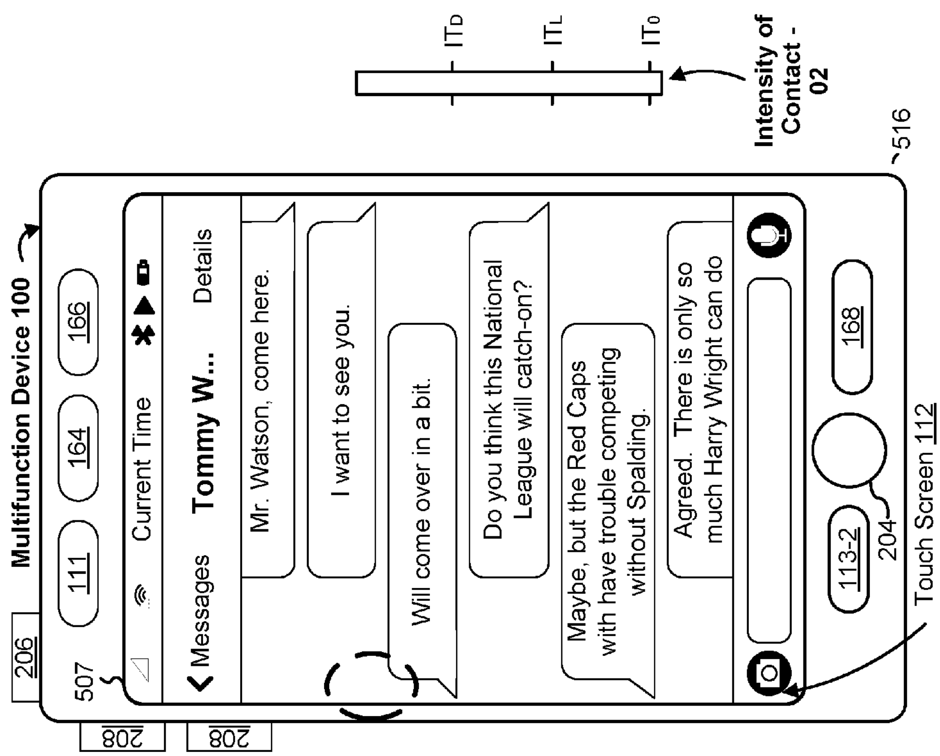
Figure 7G:
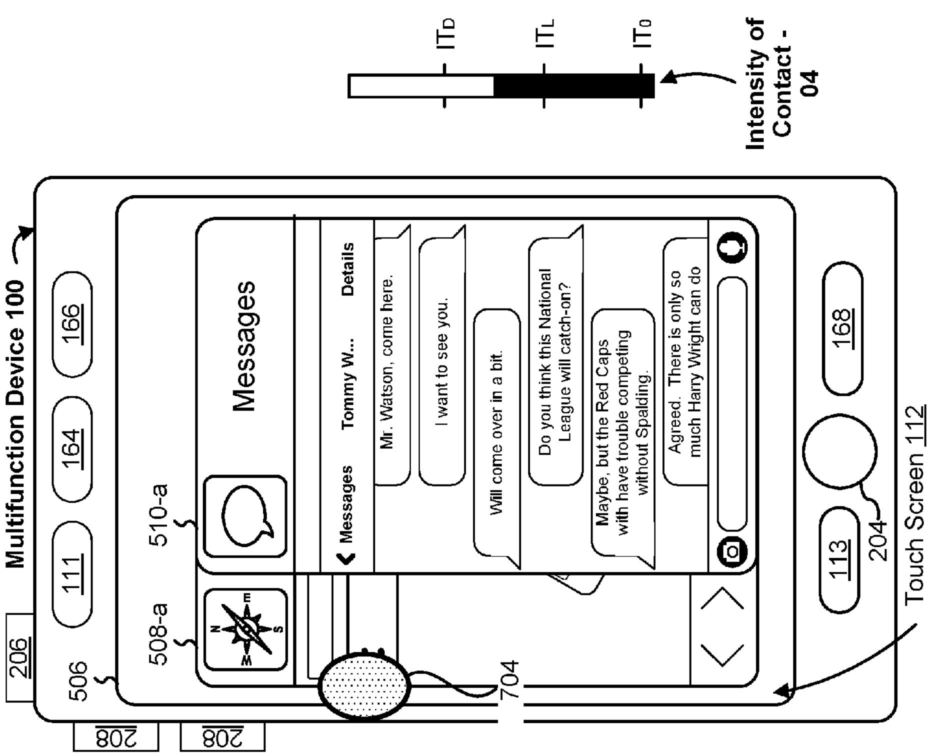
Figure 7H:
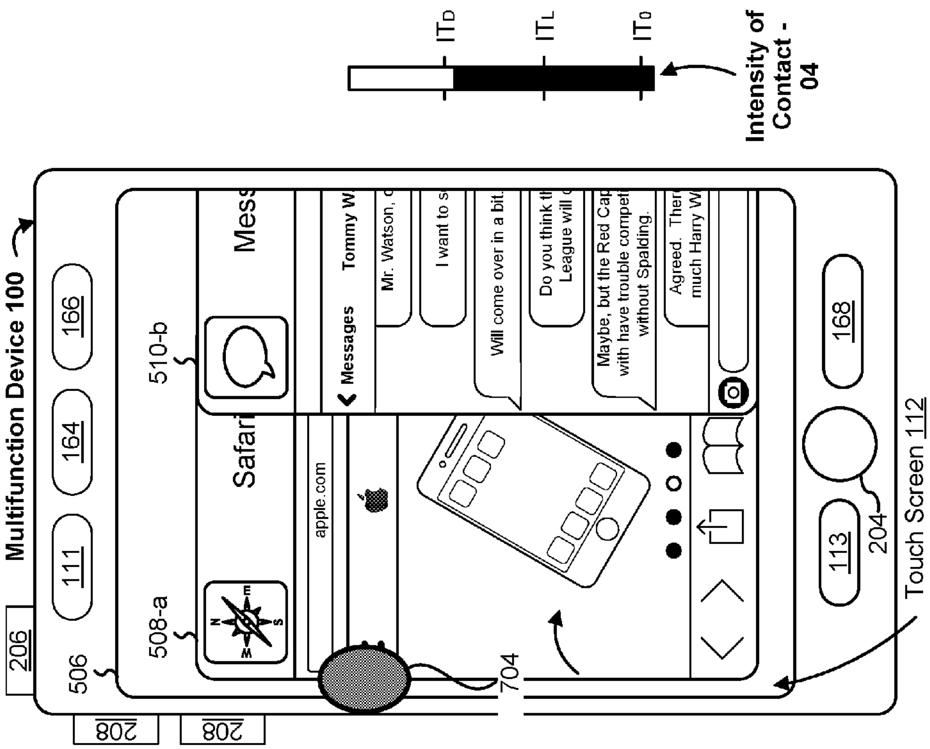
Figure 7J:
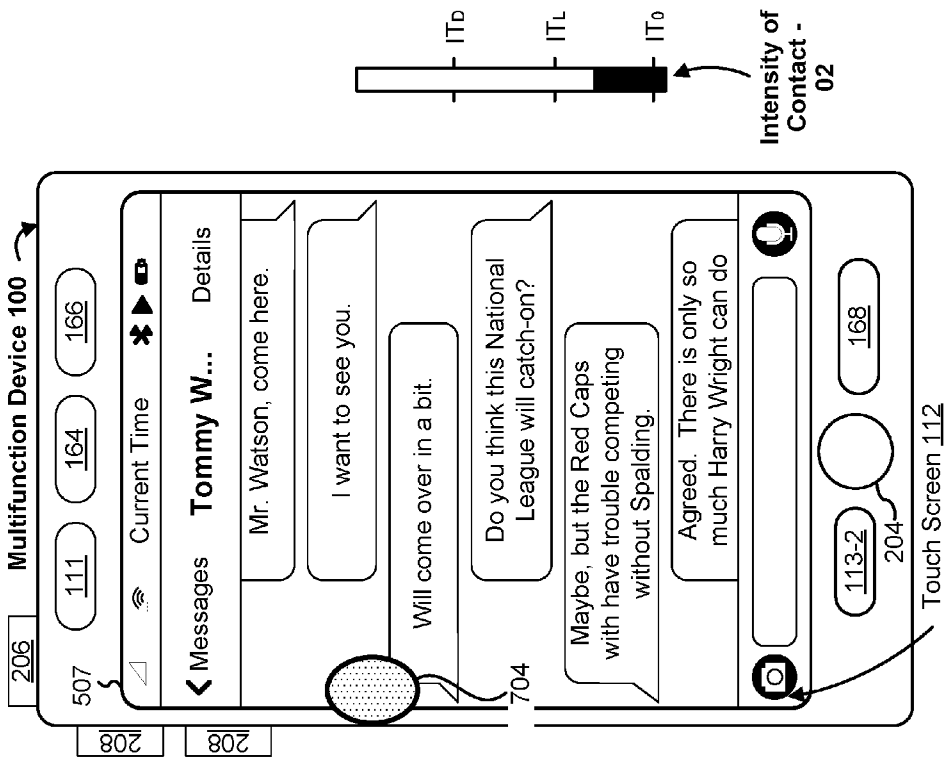
Figure 7I:
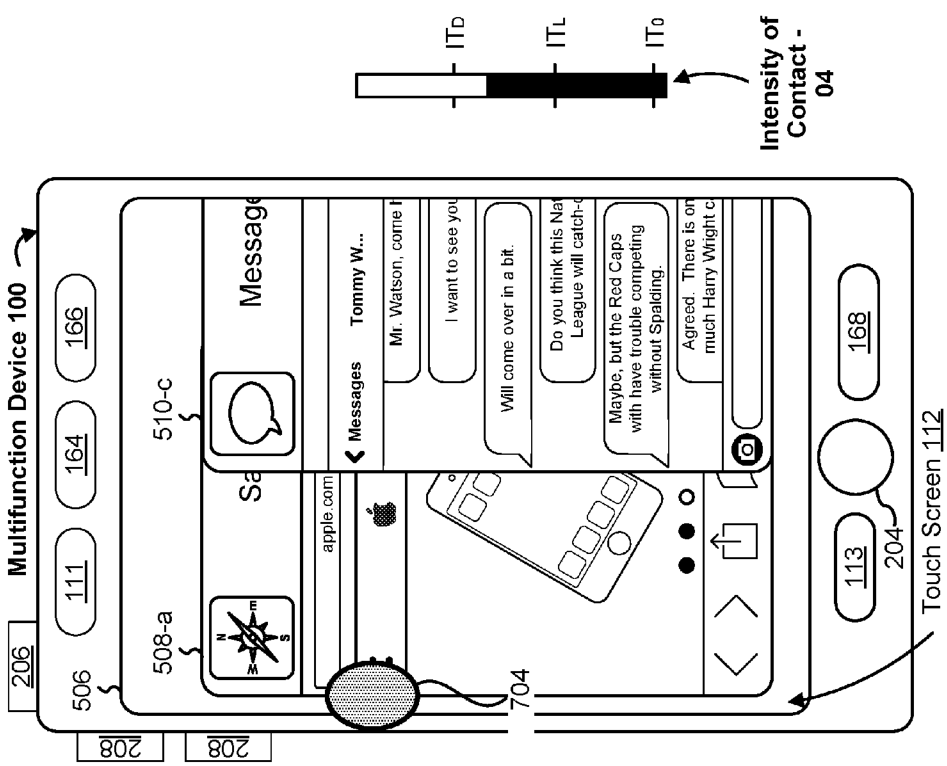
Figure 7L:
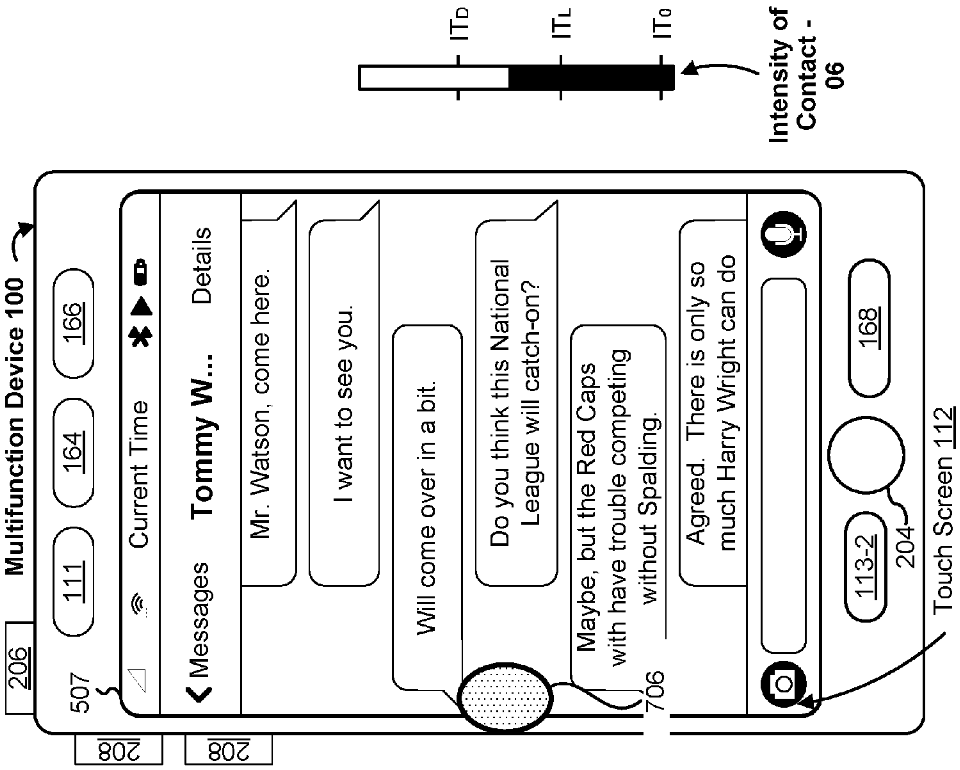
Figure 7K:
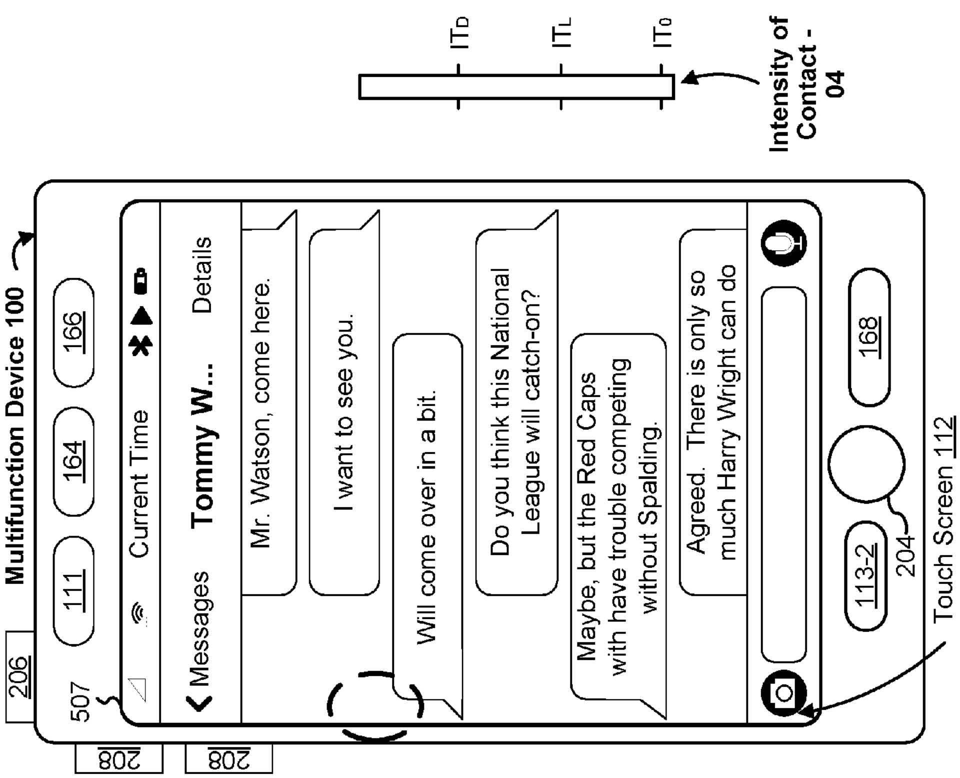
Figure 7N:
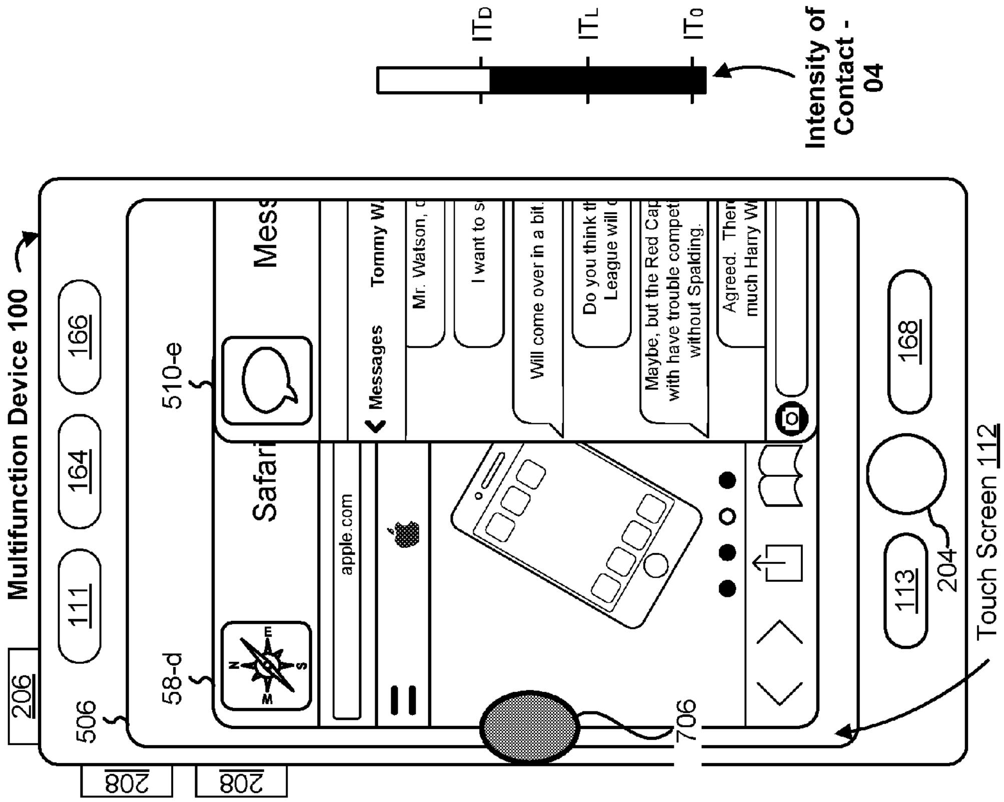
Figure 7M:
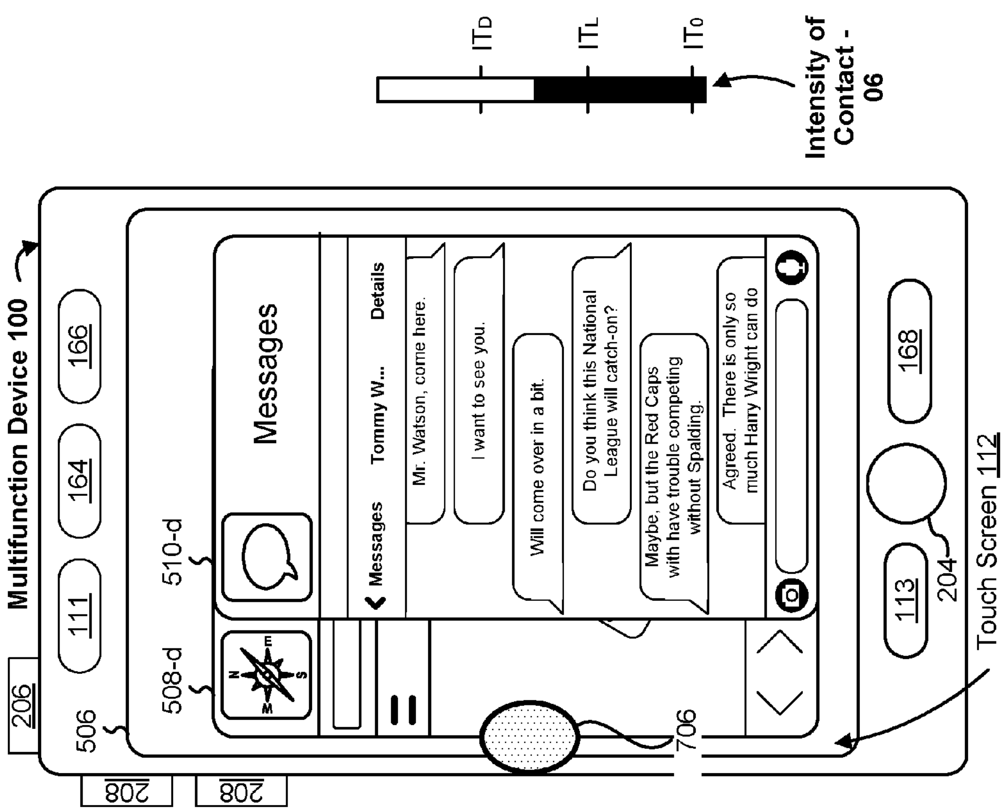
Figure 7O:
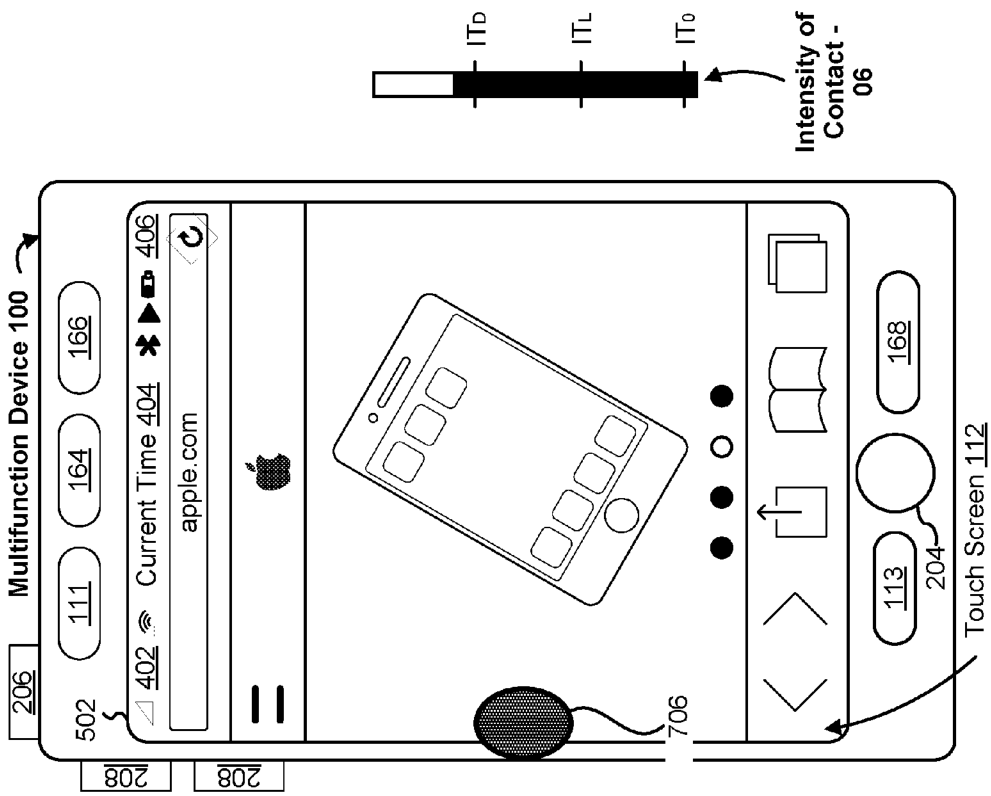

FIGS. 7A-7O illustrate exemplary user interfaces for navigating between user interfaces in accordance with some embodiments. The user interfaces in these figures are used to illustrate the processes described below, including the processes in FIGS. 10A-10H, 11A-11E, 12A-12E, 13A-13D, 14A-14C, 15, 24A-24F, and 25A-25H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 7A-7O illustrate exemplary embodiments for navigating between previously displayed user interfaces using a single touch gesture on a predefined area of a touch-sensitive surface (e.g., a touch-sensitive display or touch-sensitive track pad separate from the display) in accordance with some embodiments. In some embodiments, a user toggles between the two most recently viewed user interfaces using touch gestures of varying intensities at one or more predefined areas on a touch-sensitive surface.

FIGS. 7A-7F illustrate an embodiment where a user previews (e.g., "peeks" at) a representation of a previously displayed user interface using a touch gesture with a first characteristic intensity at a predefined area of a touch-sensitive surface, and then open the user interface (e.g., opens the application) by increasing the intensity of the touch gesture to a second characteristic intensity. FIG. 7A illustrates display of a graphical user interface 502 for a web browsing application on the electronic device.

FIG. 7B illustrates detection of a touch gesture, including contact 702, adjacent to the left edge of touch screen 112 (e.g., on the bezel; at a predefined position on the touch-sensitive surface), with a first characteristic intensity (e.g., exceeding a light press intensity threshold ($IT_L$), but below a deep press intensity threshold ($IT_D$)). In response to detecting the touch gesture, device 100 enters a user interface selection mode, replacing display of web browsing user interface 502 on touch screen 112 in FIG. 7B with display of user interface 506 for the user interface selection mode on touch screen 112 in FIG. 7C.

FIG. 7C illustrates display of user interface 506 for the user interface selection mode, including representation 508 of web browsing user interface 502 ("web browsing card 508") and representation 510 of messaging user interface 507 ("messaging card 510") of two user interfaces previously displayed on touch screen 112. In some embodiments, the two representations are for the last two user interfaces displayed on the device (e.g., the last two applications open on the display). In some embodiments, the two representations are for the last two user interfaces displayed for the particular application open on touch screen 112 at the time the user interface selection mode was initiated (e.g., the last two web pages displayed in a web browser application or the last two messages displayed in an email management application).

As illustrated in FIG. 7C, web browsing card 508 is displayed as if above messaging card 510 in Z-orientation (e.g., positioned along a virtual axis substantially orthogonal to the plane of the display), and laterally displaced to the right of messaging card 510, because it represents the last user interface displayed on touch screen 112 prior to activation of the user interface selection mode. Device 100 also applies a level of blurring to messaging card 510 (e.g., associated with its relative or absolute Z-position). In some embodiments, the representation of the last user interface displayed prior to activation of the user interface selection mode is displayed behind or equal with the second user interface representation in relative Z-orientation.

FIG. 7D illustrates detection of increased intensity of contact 702 (e.g., from an intensity just above a light press intensity threshold $IT_L$ in FIG. 7C to an intensity just below a deep press intensity threshold $IT_D$ in FIG. 7D). In response to detection of the increased intensity of contact 702, messaging card 510 increases in size and moves towards the plane of the touch screen 112 in the virtual z-dimension (e.g., from location 510-a in FIG. 7C to location 510-b in FIG. 7D). Messaging card 510 also begins to come into focus (e.g., the level of blurring is reduced) as it moves up in the virtual z-dimension. Concurrently, web browsing card 508 decreases in size and moves backwards in the virtual z-dimension (e.g., from location 508-a in FIG. 7C to location 508-b in FIG. 7D). In some embodiments, an animation is displayed to show movement of the first user interface representation and the second user interface representation in a manner that dynamically responds to small changes in the intensity of the contact.

FIG. 7E illustrates detection further increased intensity of contact 702 (e.g., exceeding deep press intensity threshold ($IT_D$)). In response to detection that the intensity of contact 702 exceeds a second characteristic intensity (e.g., exceeding deep press intensity threshold ($IT_D$)), messaging card 510 continues to move up in the virtual z-dimension and moves over web browsing card 508, which continues to move backwards in the virtual z-dimension and starts to become blurry.

In some embodiments, in response to detecting an intensity of contact 702 in excess of a second predetermined threshold (e.g., deep press intensity threshold ($IT_D$)), the device automatically opens the messaging application associated with user interface 507 (e.g., the card or associated application "pops"), and replaces display of the user interface selection mode with user interface 507, as illustrated in FIG. 7F.

FIGS. 7G-7K illustrate an alternative embodiment for "peeking" and "popping" previously displayed user interfaces (e.g., and associated applications), as described for FIGS. 7A-7F. In this embodiment, the user interface representations are displayed in a substantially two-dimensional view, rather than along a virtual z-axis.

FIG. 7G illustrates detection of a touch gesture, including contact 704, adjacent to the left edge of touch screen 112 (e.g., on the bezel; at a predefined position on the touch-sensitive surface), with a first characteristic intensity (e.g., exceeding a light press intensity threshold ($IT_L$), but below a deep press intensity threshold ($IT_D$)). In response to detecting the touch gesture, device 100 enters a user interface selection mode, displaying user interface 506 for the user interface selection mode on touch screen 112 in FIG. 7G.

FIG. 7G illustrates display of user interface 506 for the user interface selection mode, including representation 508 of web browsing user interface 502 ("web browsing card 508") and representation 510 of messaging user interface 507 ("messaging card 510") of two user interfaces previously displayed on touch screen 112. As illustrated in FIG. 7G, messaging card 510 is displayed as if right on top of web browsing card 508 in Z-orientation, and laterally displaced to the right of web browsing card 508, because it represents the last user interface displayed on touch screen 112 prior to activation of the user interface selection mode.

FIG. 7H illustrates detection of increased intensity of contact 704 (e.g., from an intensity just above a light press intensity threshold $IT_L$ in FIG. 7C to an intensity just below a deep press intensity threshold $IT_D$ in FIG. 7D). In response to detection of the increased intensity of contact web browsing card 508 is further revealed from under messaging card 508 by movement of messaging card 510 to the right of the screen, from location 510-a in FIG. 7G to location 510-b in FIG. 7H.

FIG. 7E illustrates detection of a decrease in intensity of contact 704. In response to detection that the intensity of contact 702 decreases, messaging card 510 begins to slide back over web browsing card 508.

FIG. 7J illustrates detection of a further decrease in intensity of contact 704 below a first characteristic intensity (e.g., below light press intensity threshold ($IT_L$)). In response to falling below the first characteristic intensity, device 5100 exits user interface selection mode and replaces display of user interface 506 with user interface 507 for the messaging application which was displayed immediately preceding entry into the user interface selection mode (e.g., because contact 704 failed to "pop" web browsing card 508 out from under messaging card 510, the device reverts into it last active state upon exiting the user interface selection mode). FIG. 7K further illustrates detection of lift off of contact 704, resulting in no change in the user interface displayed on touch screen 112.

In contrast, Figures illustrate an embodiment where, after the user toggled user interface from web browsing user interface 502 to messaging user interface 507 (e.g., as described in FIGS. 5A-5F) the user starts the "peek" and "pop" processes again with detection of contact 706 in the predetermined area on the touch sensitive surface (e.g., the left side of the bezel) in FIG. 7L. In response to detecting increasing intensity contact 706 from FIG. 7M to 7M, messaging card moves from location 510-d in FIG. 7M to position 510-e in FIG. 7N. Detection of a further increase in the intensity of contact 706 in excess of the second characteristic intensity (e.g., deep press intensity threshold ($IT_D$)) in FIG. 70 pops web browsing application back open (e.g., the device replaces display of the user interface 506 for user interface selection mode with user interface 502 for web browsing application). Thus, the user has toggled back to the originally displayed user interface.

Figure 8B:
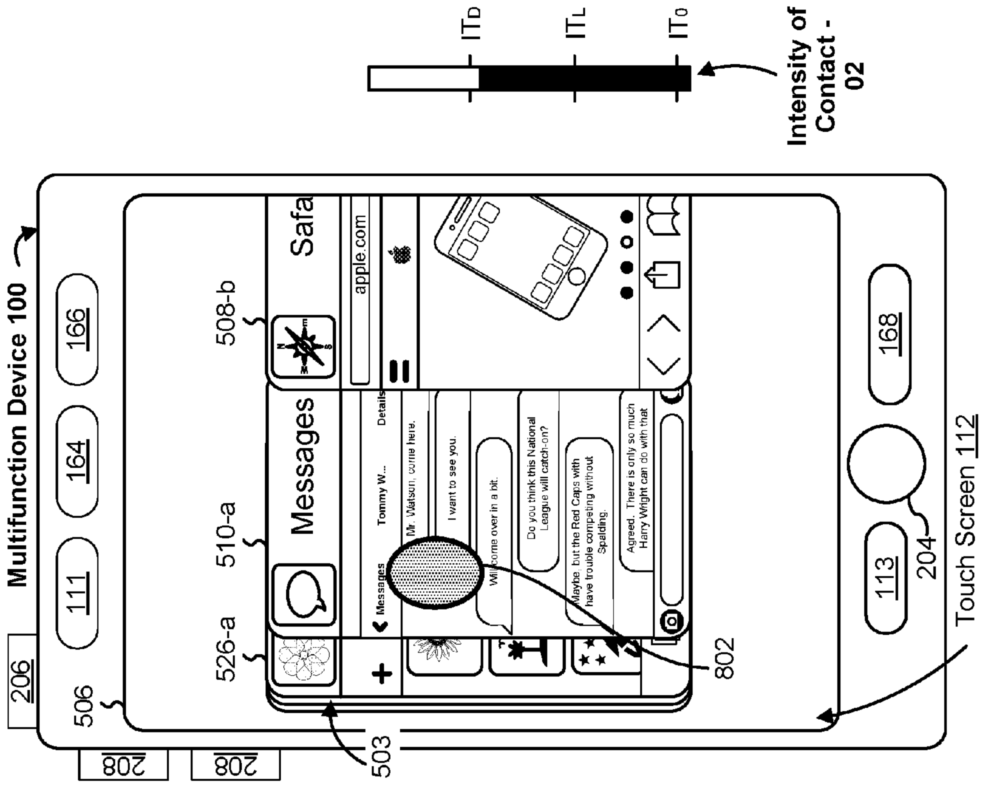
FIGS. 8A-8R illustrate exemplary user interfaces for navigating between user interface representations in a user interface selection mode in accordance with some embodiments.
Figure 8A:
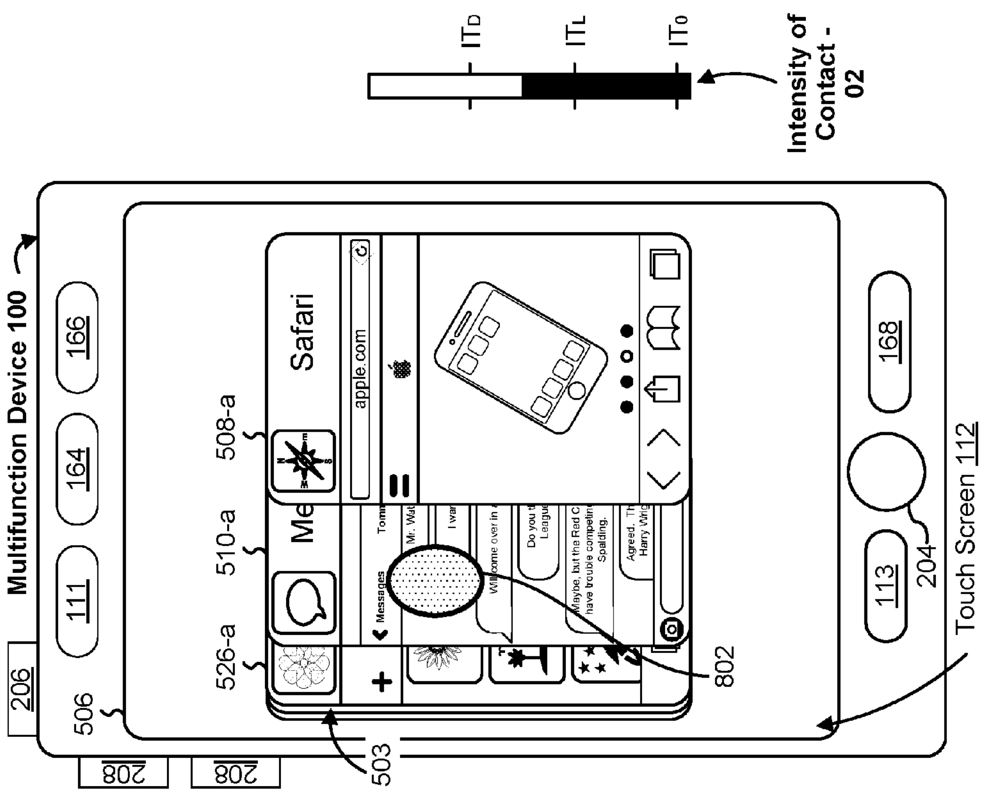
Figure 8C:
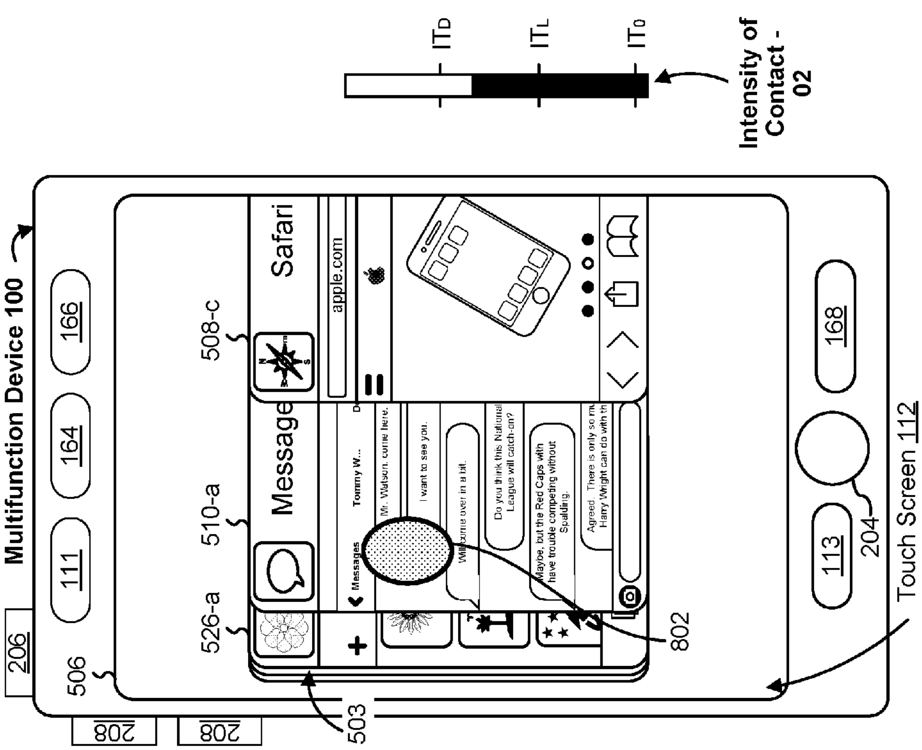
Figure 8D:
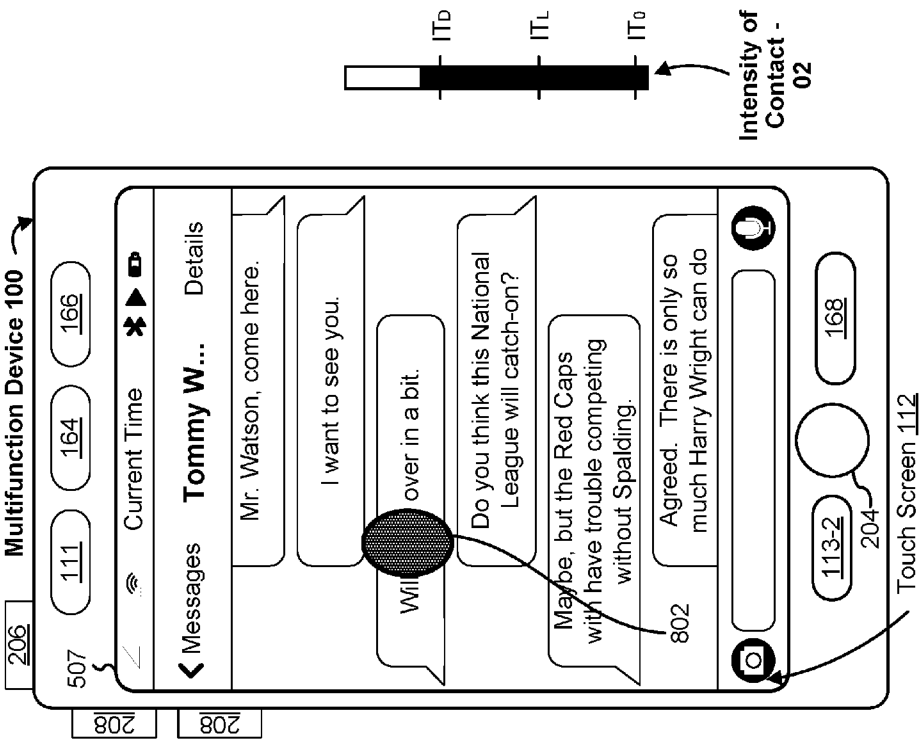
Figure 8E:
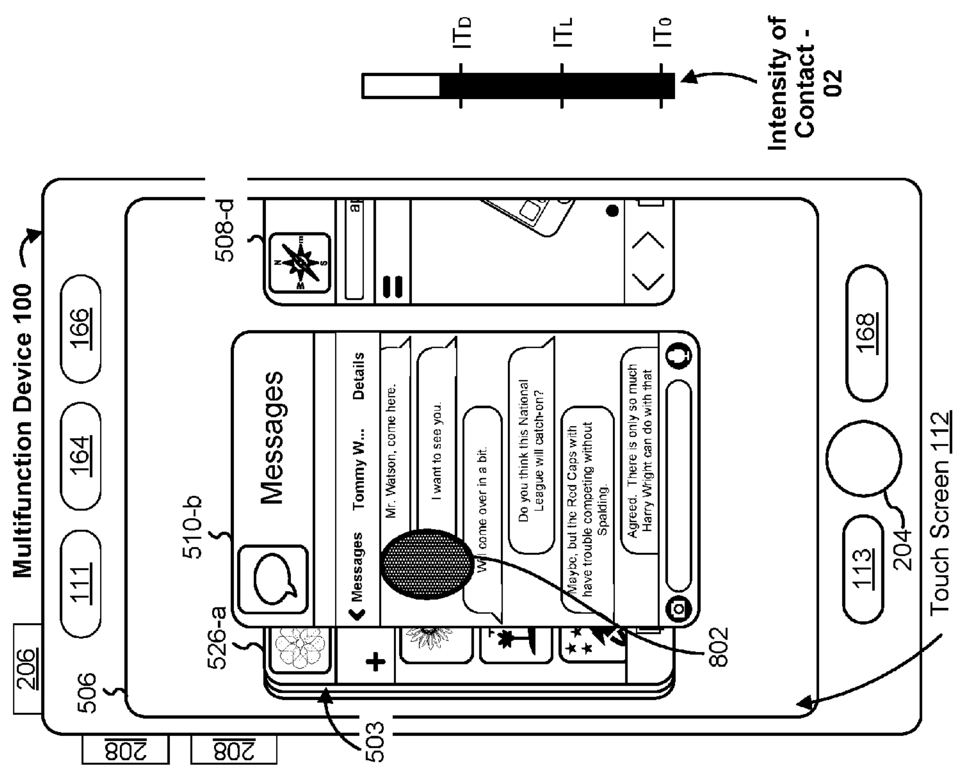
Figure 8F:
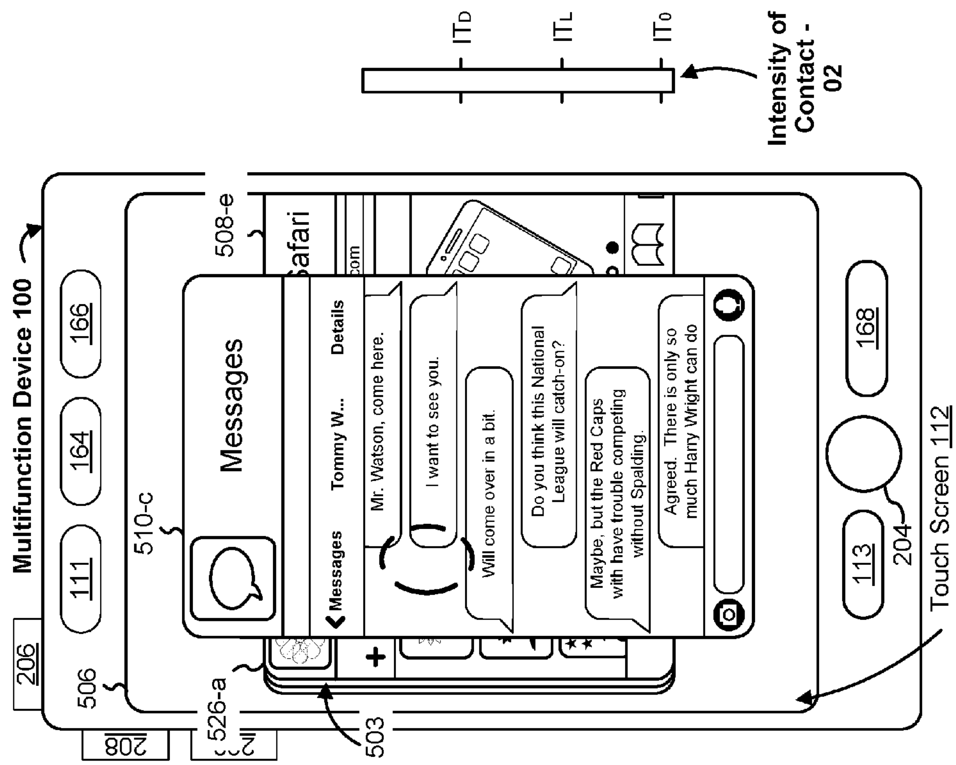
Figure 8H:
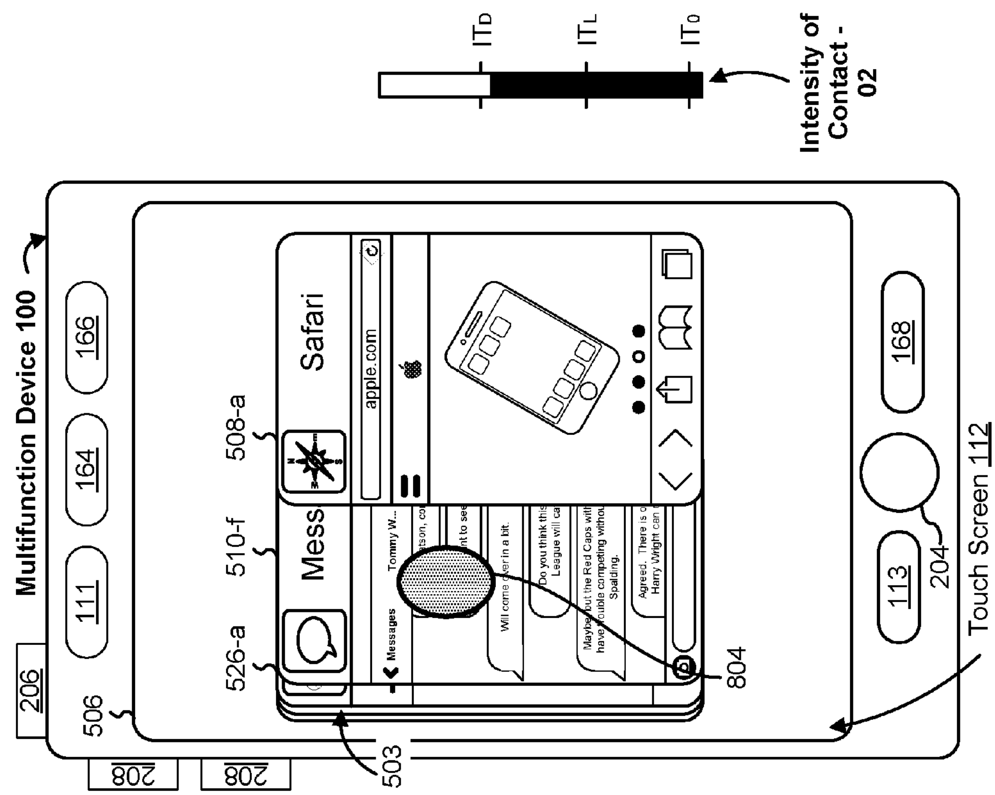
Figure 8G:
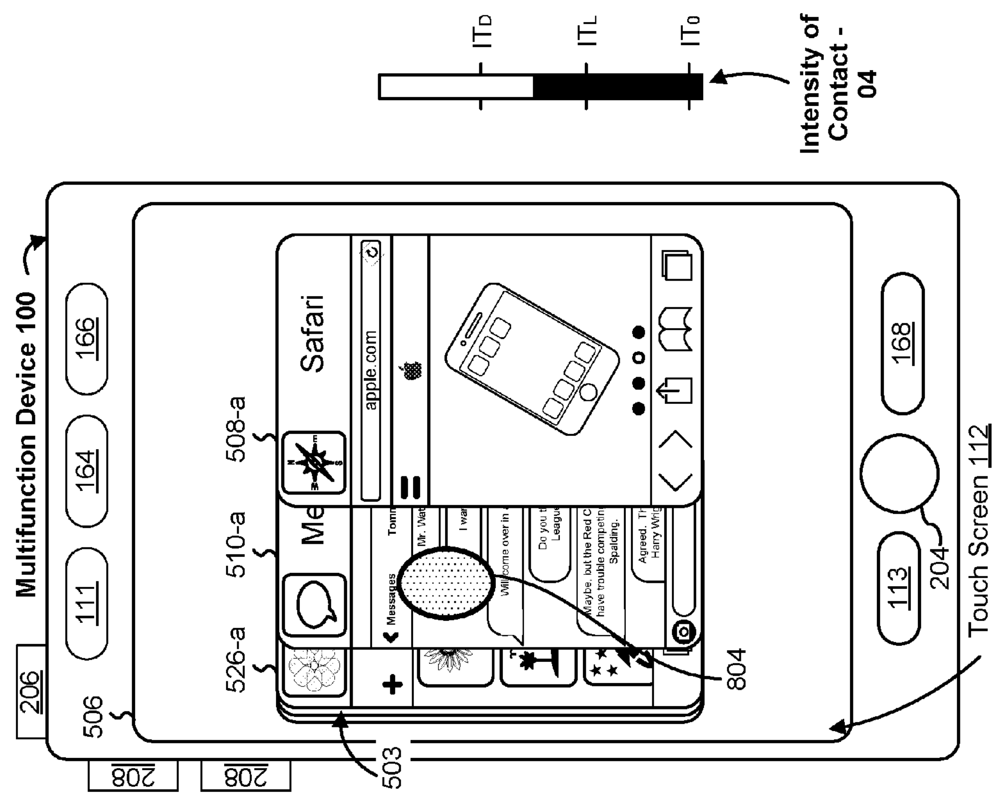
Figure 8J:
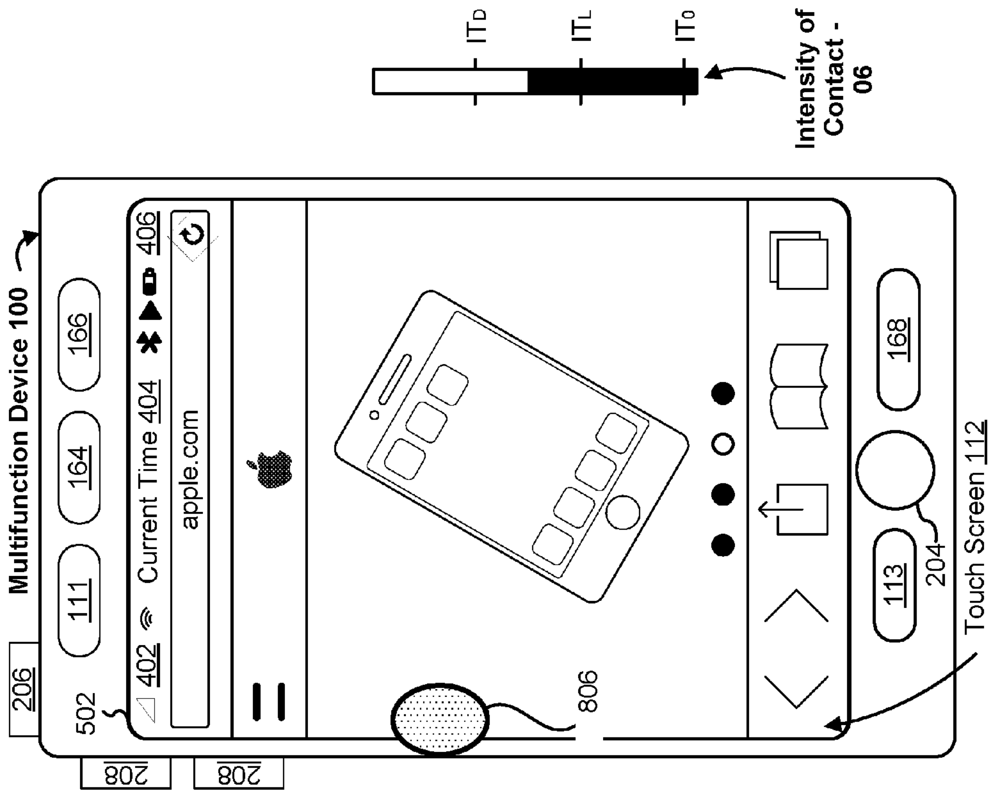
Figure 8I:
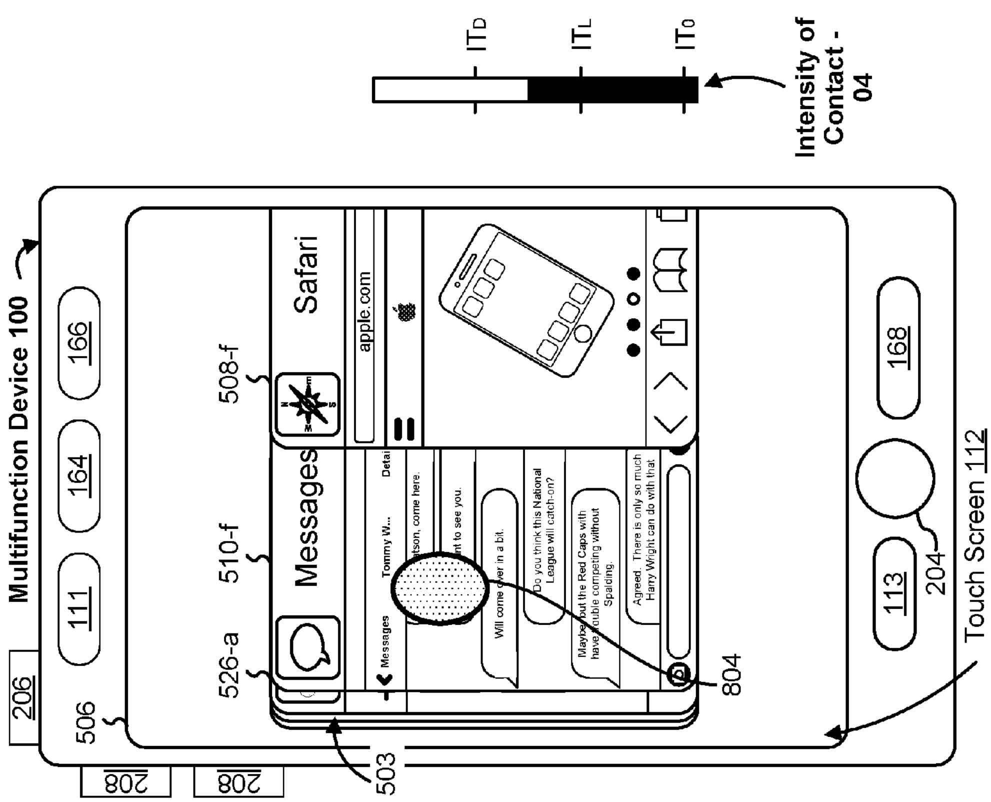
Figure 8L:
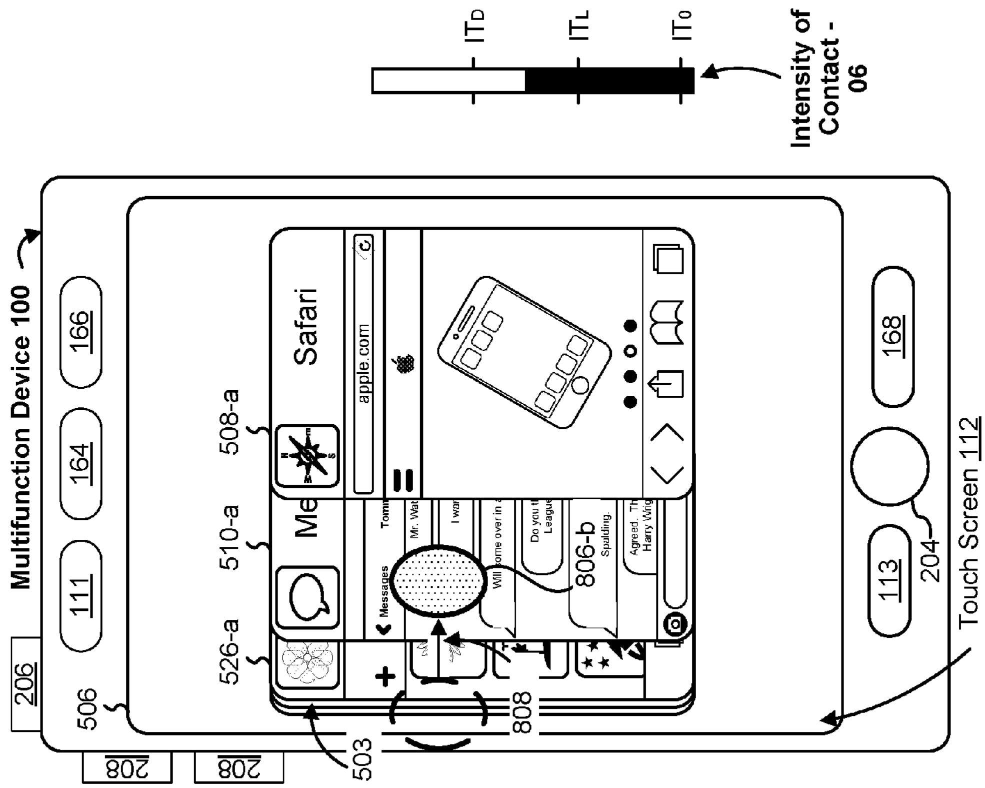
Figure 8K:
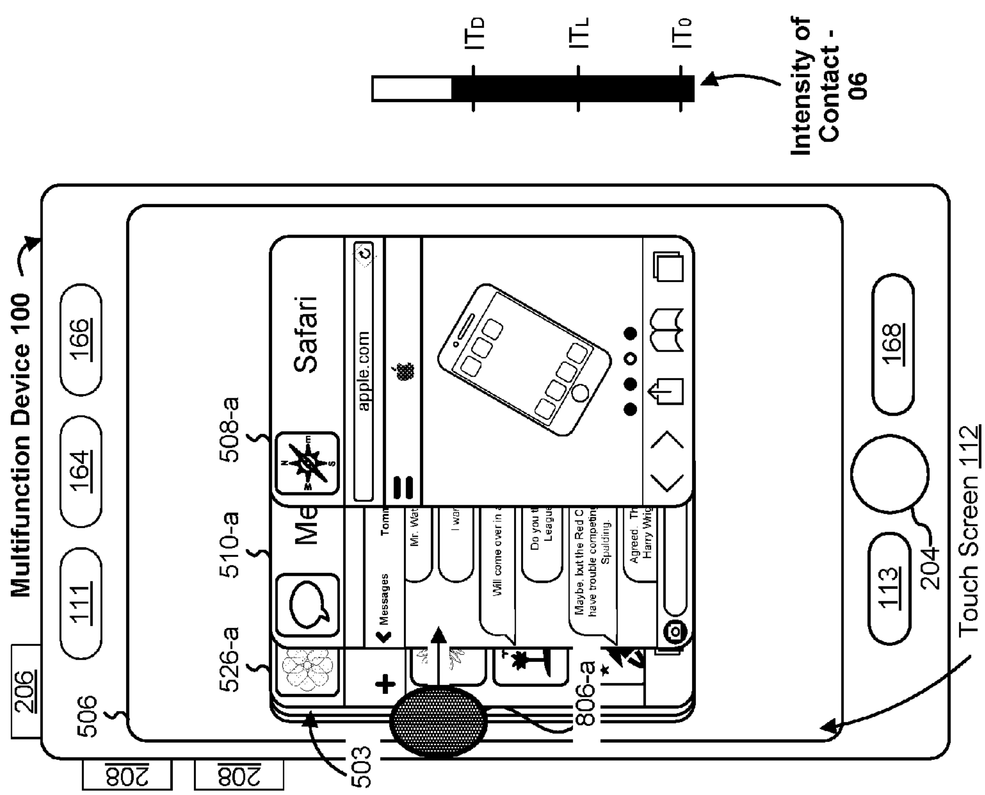
Figure 8N:
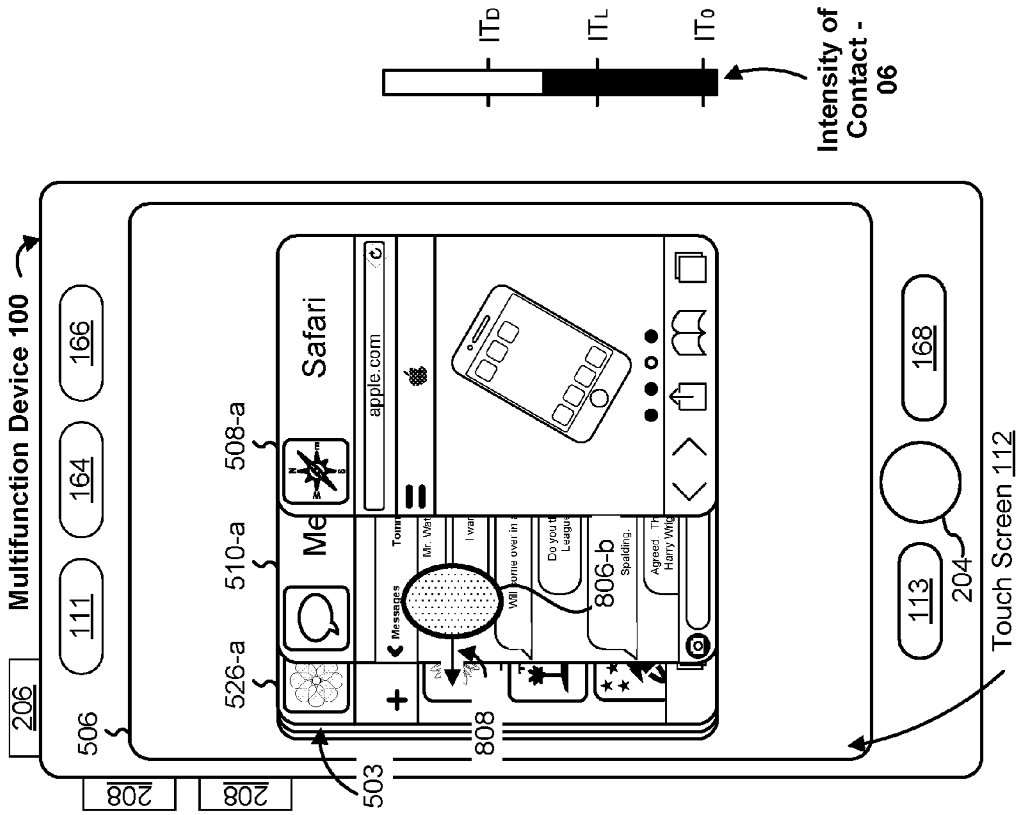
Figure 8M:
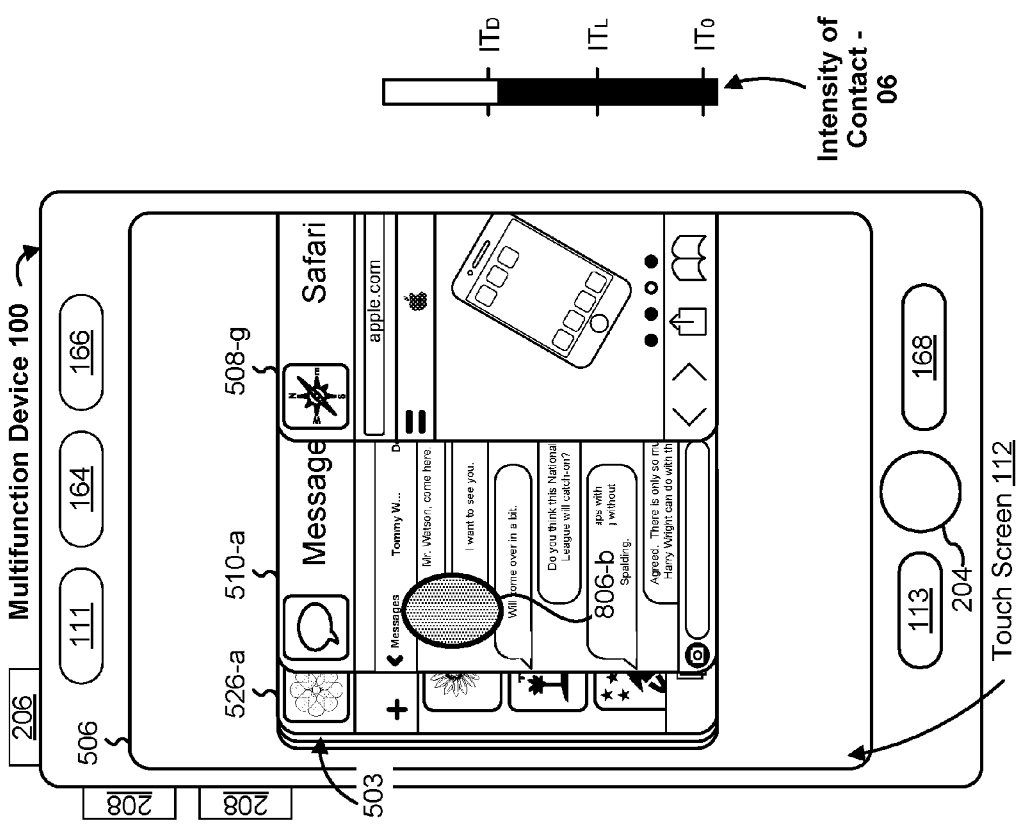
Figure 8P:
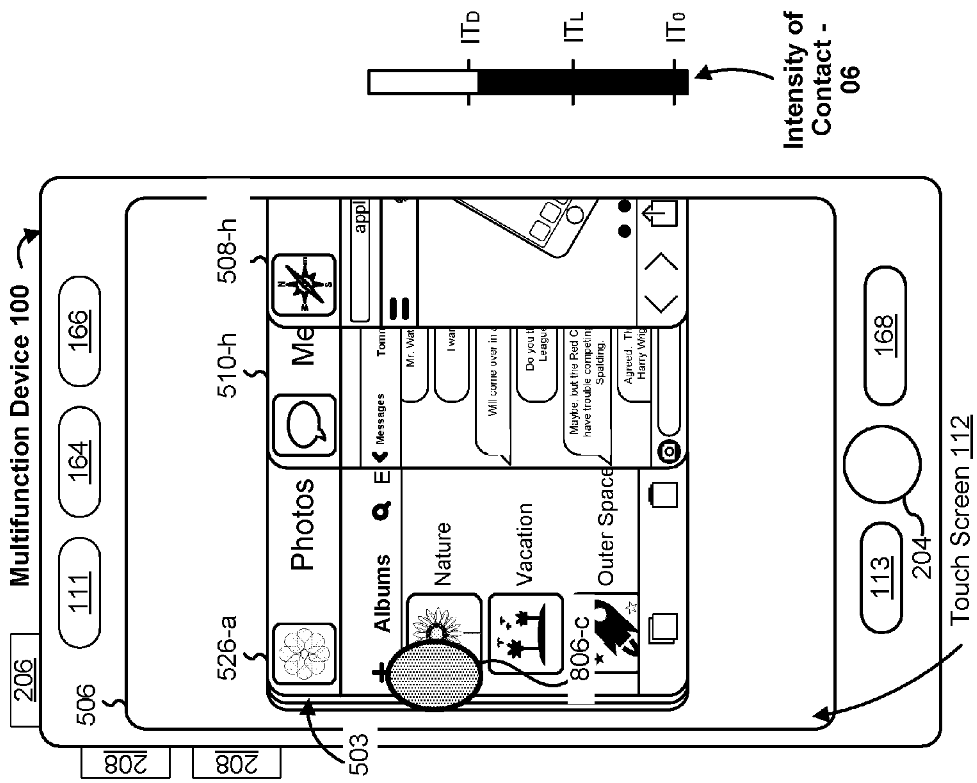
Figure 8O:
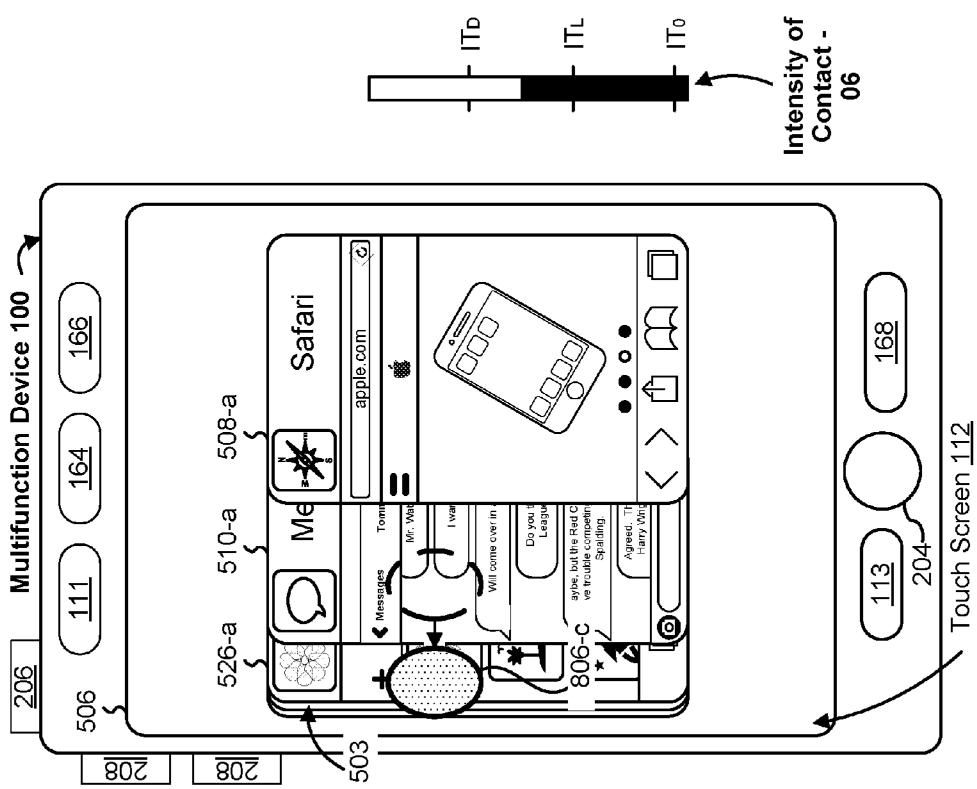
Figure 8R:
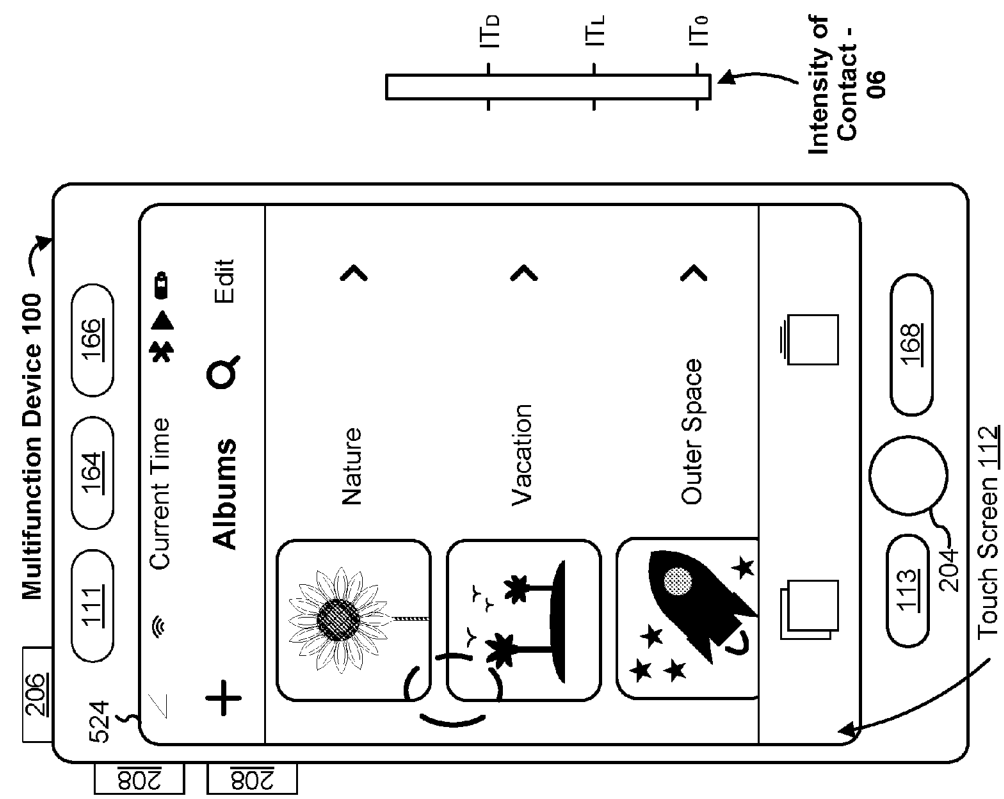

FIGS. 8A-8R illustrate exemplary user interfaces for navigating between user interfaces in accordance with some embodiments. The user interfaces in these figures are used to illustrate the processes described below, including the processes in FIGS. 10A-10H, 11A-11E, 12A-12E, 13A-13D, 14A-14C, 15, 24A-24F, and 25A-25H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 8A-8R illustrate exemplary embodiments for navigating between multiple user interfaces represented in a user interface selection mode, including the ability to "peek" at and "pop" applications (e.g., and associated user interfaces) from a display of multiple user interface representations with user inputs detected on a touch-sensitive surface (e.g., a touch-sensitive display or touch-sensitive track pad separate from the display) in accordance with some embodiments.

FIGS. 8A-8D illustrate an embodiment where a user "pops" (e.g., selects) a user interface for display on the device with a high intensity user input (e.g., a deep press). FIG. 8A illustrates display of user interface 506 for a user interface selection mode, including representation 508 of web browsing user interface 502 ("web browsing card 508"), representation 510 of messaging user interface 507 ("messaging card 510"), and representation 526 of photo management user interface 524 ("photo card 526") of user interfaces that were previously displayed on the device. The user interface representations are displayed in a stack of cards, extending to the right from the base of the stack. Each card is ordered in a z-layer (e.g., substantially orthogonal to the plane of touch screen 112, and is laterally offset to the right of the card below it, revealing a portion of each card.

Device 100 detects an increase in the intensity of contact 802 at a location corresponding to display of messaging card 510 from FIG. 5A to FIG. 5A. In response, the displayed area of messaging card 510 increases (e.g., the user is peeking at messaging card 510) by moving web browsing card 508 further to the right (e.g., from location 508-a in FIG. 8A to location 508-b in FIG. 8B).

As illustrated in FIG. 8C, display of the relative lateral positions of the cards is dynamically linked to the amount of pressure detected for the user contact. For example, in response to detecting a small decrease in the pressure of contact 802 from FIG. 8B to FIG. 8C, web browsing card 508 starts to move back over messaging card 510 (e.g., web browsing card 508 moves from position 508-b in FIG. 8B to position 508-c in FIG. 8C. In some embodiments, an animation is displayed to show movement of the user interface representations relative to one another in a manner that dynamically responds to small changes in the intensity of a contact.

Device 100 then detects a further increase in the pressure of contact 802, exceeding a characteristic intensity (e.g., a deep press intensity threshold ($IT_D$)). In response, messaging card 510 is "popped" out of the stack and the device opens the associated application (e.g., replaces display of user interface 506 for the user interface selection mode with display of user interface 507 for the messaging application).

FIGS. 8E-8F illustrate an embodiment where "popping" of the card (e.g., selection of an application and corresponding user interface) includes an animation. FIG. 8E illustrates that messaging card is selected (e.g., "popped") in response to detecting an increase in the pressure of contact 802, exceeding a characteristic intensity (e.g., a deep press intensity threshold ($IT_D$)). In response, device 100 displays an animation that transitions from display of user interface 506 for the user interface selection mode to display of user interface 507 for the messaging application. The animation includes sliding web browsing card 508 completely off of messaging card 510 (e.g., by moving we browsing card further to the right to position 508-d). The animation also includes lifting messaging card 510 out of the stack, and gradually increasing the size of messaging card 510, e.g., until display of user interface 507 fills the entirety of touch screen 112 (e.g., as illustrated by movement of messaging card from location 510-b in FIG. 8E to location 510-c in FIG. 8F to provide an effect that the card is moving towards the user in a virtual z-dimension.

FIGS. 8G-8H illustrate an alternate embodiment for "peeking" at a user interface representation card. FIG. 8G illustrates display of a stack of user interface cards, as described for FIG. 8A (e.g., where web browsing card 508 is displayed on top of, and offset to the right of messaging card 510, which is displayed on top of and offset to the right of photo card 526). FIG. 8G also illustrates contact 804 at a location of touch screen 112 corresponding to display of messaging card 510.

FIG. 8H illustrates that, in response to detecting an increase in the intensity of contact 804 when displayed over messaging card 510, more area of messaging card is revealed. However, rather than sliding web browsing card 508 off of messaging card 510 to the right, FIG. 8H illustrates that messaging card 510 is moved to the left (e.g., messaging card moves from location 510-a in FIG. 8G to location 510 in FIG. 8H), as if being taken out of the deck of cards. Thus, FIGS. 8G and 8H illustrate using the intensity of a contact (e.g., 804) to reveal more of a user interface representation card in a stack by sliding the card out the stack in a direction opposite the direction in which the stack spreads away from the base of the stack.

FIG. 8I illustrates another alternate embodiment for "peeking" at messaging card 510, where, in response to detecting an increase in the intensity of contact 804 displayed at a location corresponding to display of messaging card 510, web browsing card 508 moves off of messaging card 510 to the right, and messaging card 510 is pulled out of the deck to the left. Thus, FIGS. 8G and 8I illustrate using the intensity of a contact (e.g., 804) to reveal more of a respective user interface representation card in a stack by both sliding the card out the stack in a direction opposite the direction in which the stack spreads away from the base of the stack, and sliding at least the card displayed direction over the respective user interface representation card further in the direction in which the stack spreads away from the base of the stack.

FIGS. 8J-8R illustrate extended "peek" and "pop" navigation, where multiple cards are peeked at prior to popping open an application. FIG. 8J illustrates display of a graphical user interface 502 for a web browsing application on the electronic device. FIG. 8K illustrates that the device enters a user interface selection mode upon detection of a user input including contact 806 adjacent to the left edge of touch screen 112 (e.g., on the bezel) with a characteristic intensity (e.g., an intensity exceeding deep press intensity threshold ($IT_D$); e.g., an exemplary predetermined input). In response to activating user interface selection mode, device 100 replaces display of web browsing user interface 502 with user interface 506 for the user interface selection mode, as illustrated in FIG. 8K.

FIG. 8K illustrates display of a stack of user interface cards, as described for FIG. 8A (e.g., where web browsing card 508 is displayed on top of, and offset to the right of messaging card 510, which is displayed on top of and offset to the right of photo card 526). FIG. 8K also illustrates contact 806 at a position 806-a corresponding to the left edge of touch screen 112, and having an intensity exceeding deep press intensity threshold ($IT_D$).

As illustrated in FIG. 8L, device 100 detects a decrease in the intensity of user contact 806 below the deep press intensity threshold ($IT_D$). Device 100 also detects movement 808 of contact 806 from the left edge of the display (e.g., position 806-a in FIG. 8K) to a location corresponding to display of messaging card 510.

FIG. 8M illustrates detection of an increase in intensity of user contact 806 when displayed over messaging card 510, resulting in "peeking" of messaging card 510 via movement of web browsing card away from messaging card 510.

FIG. 8N illustrates detection of a decrease in the intensity of user contact 806. In response, web browsing card 508 moves back over messaging card 510. The device also detects continuation of movement 808 of contact 806 from location 806-b in FIG. 8N to location 806-c in FIG. 8O, corresponding to display of photo card 526.

FIG. 8P illustrates detection of an increase in the intensity of contact 506 when displayed over photo card 526, and in response, peeking of photo card 526 by moving display of web browsing card 508 and messaging card 510 to the right.

Figure 8Q:
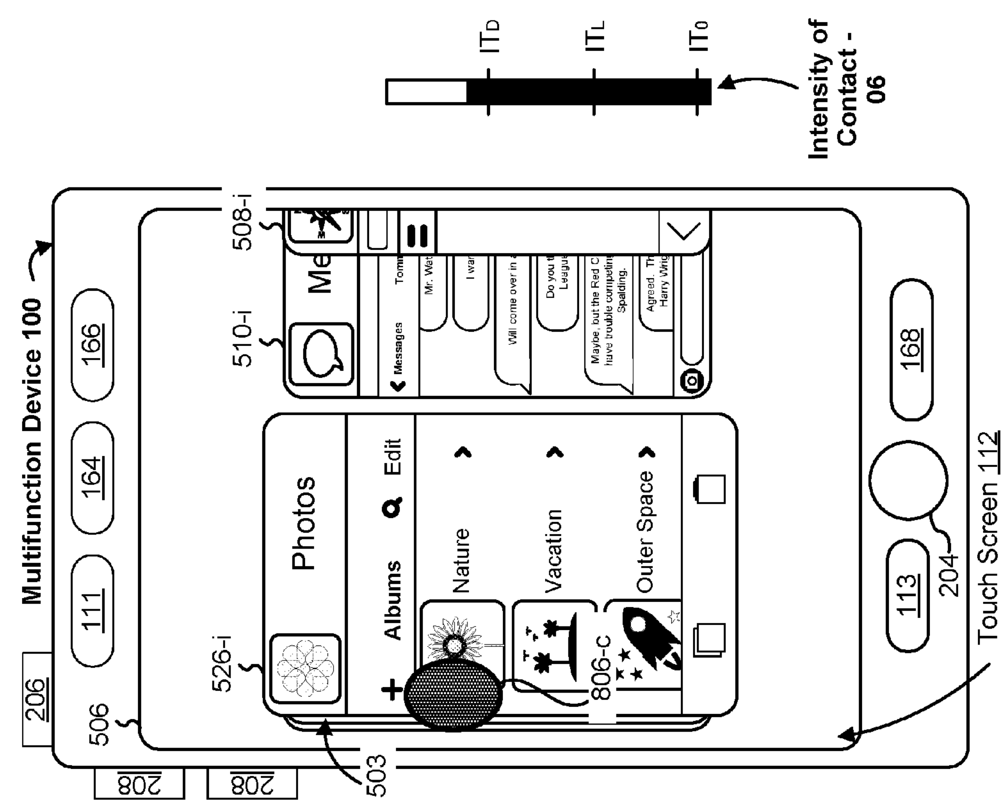

FIG. 8Q illustrates detection of a further increase in the intensity of contact 806 in excess of a predefined threshold intensity (e.g., deep press intensity threshold ($IT_D$)) when displayed over photo card 526. In response, the contact "pops" photo card 526, as illustrated by moving web browsing card 508 and messaging card 510 completely off of photo card 526. Photo card 526 then expands (e.g., via a dynamic animation, to fill the entirety of touch screen 112 with user interface 524, as electronic device enters the photo management application in FIG. 8R.

FIGS. 9A-9H illustrate exemplary user interfaces for navigating between user interfaces in accordance with some embodiments. The user interfaces in these figures are used to illustrate the processes described below, including the processes in FIGS. 10A-10H, 11A-11E, 12A-12E, 13A-13D, 14A-14C, 15, 24A-24F, and 25A-25H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 9B:
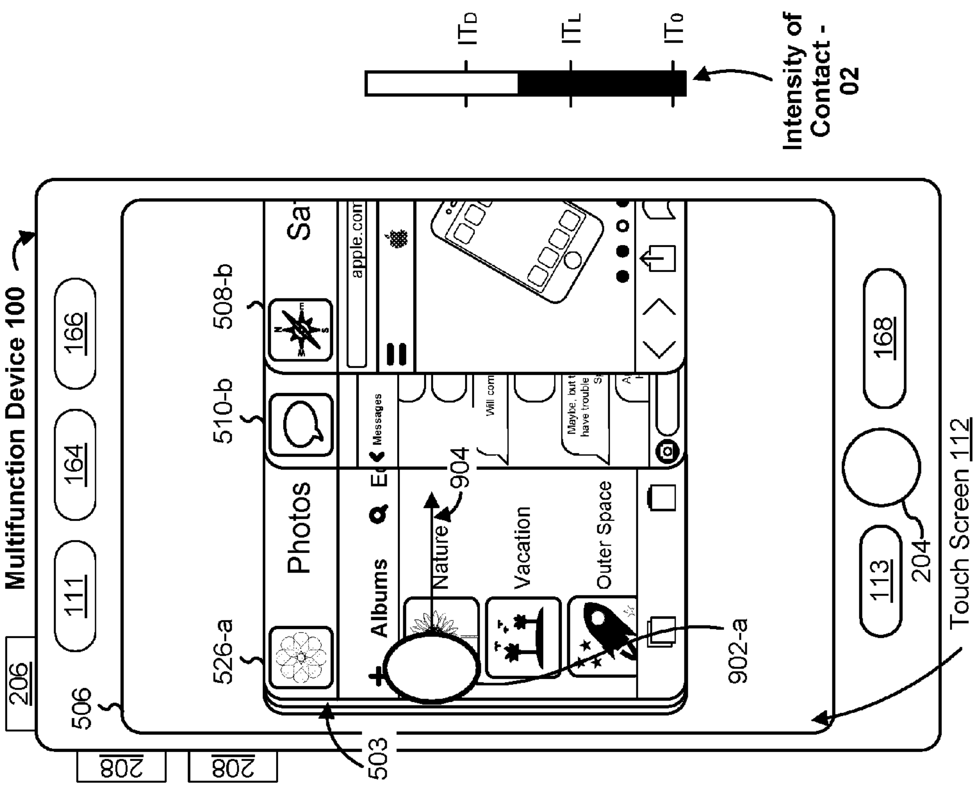
FIGS. 9A-9H illustrate exemplary user interfaces for navigating between user interface representations in a user interface selection mode in accordance with some embodiments.
Figure 9A:
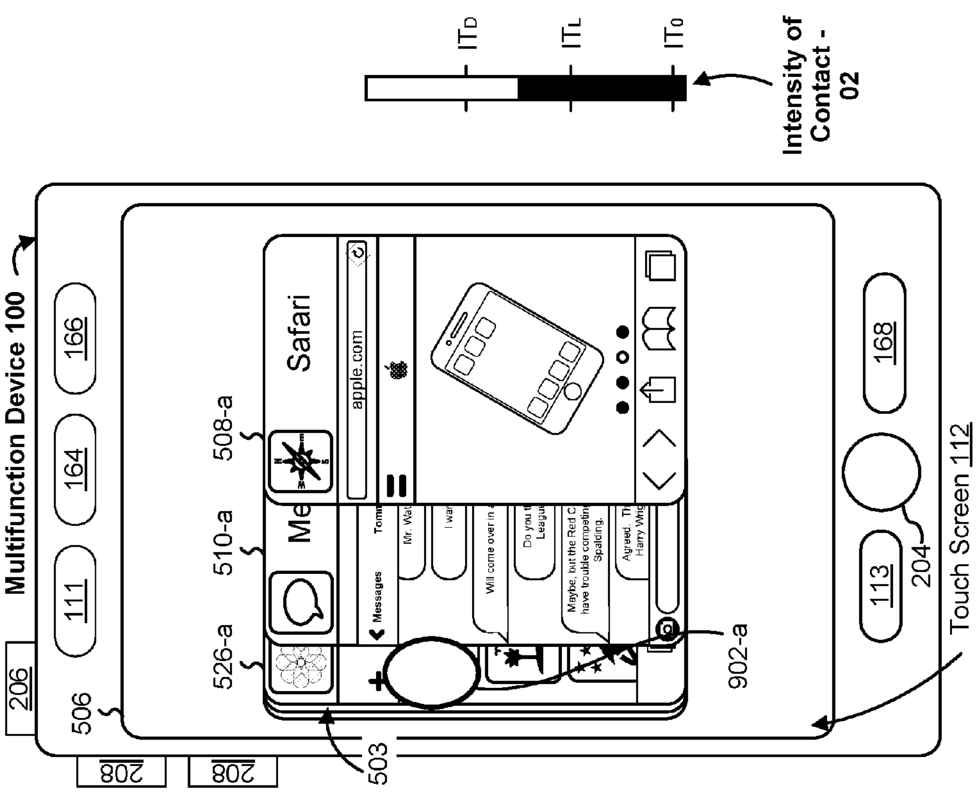

FIG. 9A illustrates display of user interface 506 for a user interface selection mode, including display of a stack of user interface representations (e.g., user interface representation cards 508, 510, and 526 for web browsing user interface 502, messaging user interface 507, and image management user interface 524). As described for FIGS. 5A-5HH, the user interface representation cards are spread out to the right from the base of the stack, and are ordered in Z-positions relative to one another (e.g., representation 508 is laterally offset to the right of representation 510 and is ordered above representation 510 along a Z-axis).

Device 100 detects a user input including contact 902 at a position on touch screen 112 that corresponds to display of user interface representation 526. Contact 902 has a characteristic intensity below a predefined intensity threshold (e.g., below deep press intensity threshold ($IT_D$)). In response to detecting contact 902 at a position corresponding with display of photo card 526, device 100 reveals more of photo card 526 by moving messaging card 510 and web browsing card 508 to the right (e.g., away from photo card 526) from locations 510-a and 508-a in FIG. 9A to locations 510-b and 508-b in FIG. 9B. Device 100 then detects movement of contact 902 from over photo card 526 to over messaging card 510 (e.g., from location 902-a in FIG. 9B to location 902-b in FIG. 9C).

Figure 9D:
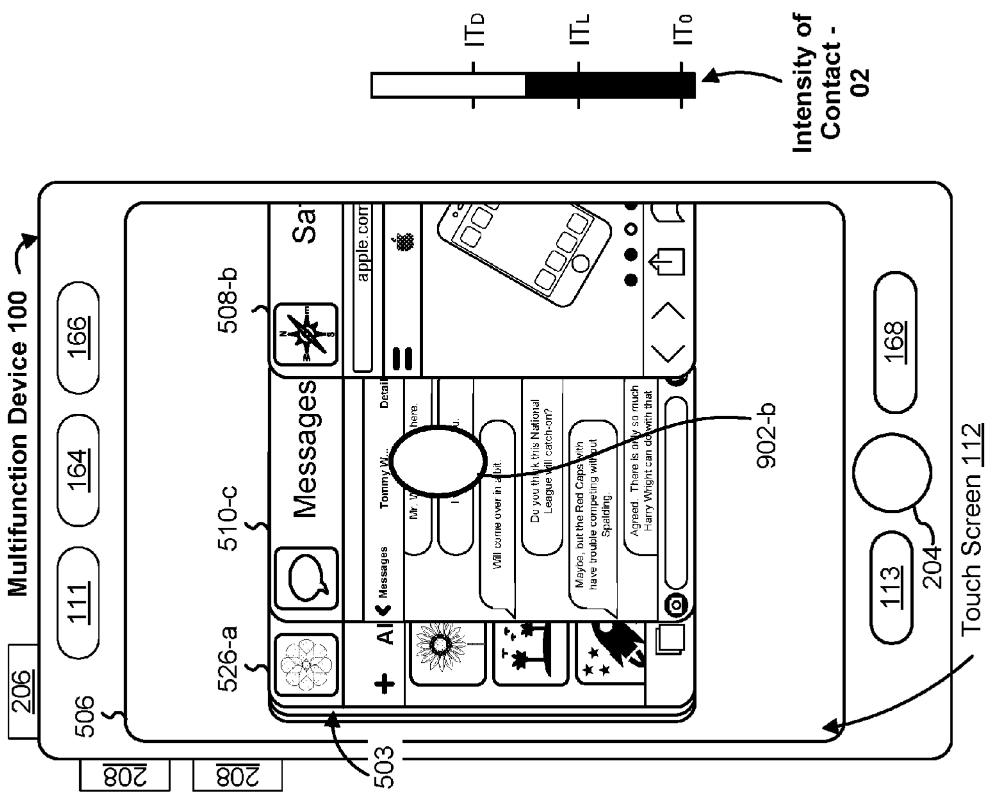
Figure 9C:
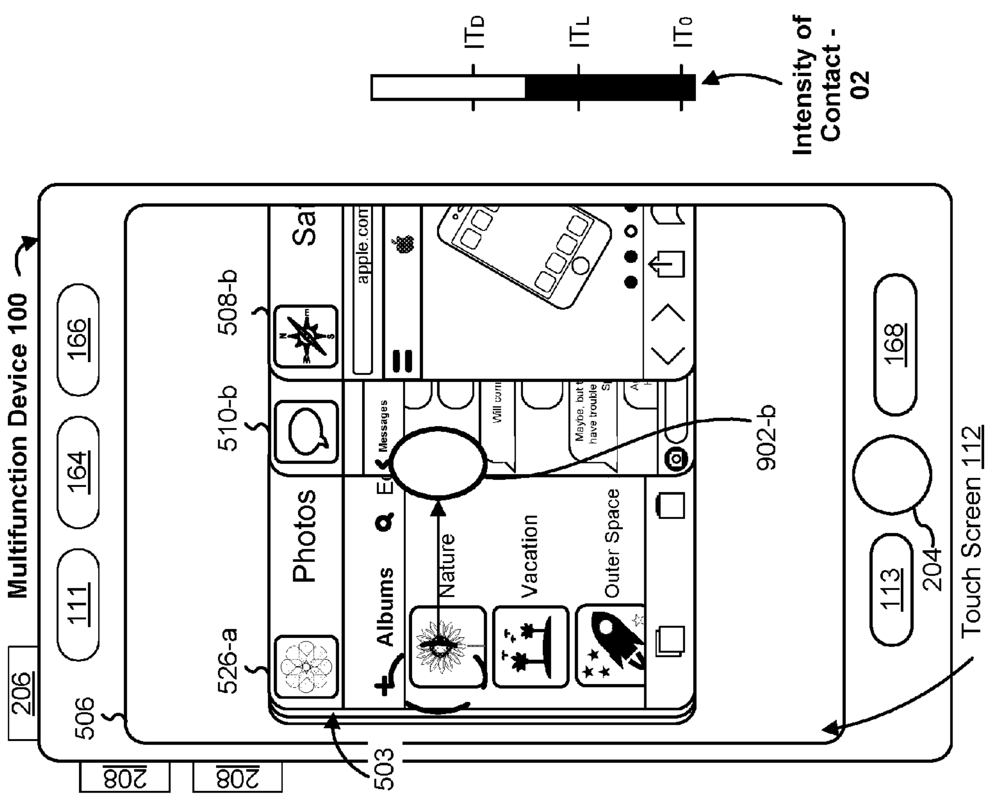

As illustrated in FIGS. 9C-9D, in response to contact 902 moving to a location corresponding to display of messaging card 510, device 100 reveals more of messaging card 510 by moving messaging card 510 out from under web browsing card 508 and back towards the stack (e.g., to the left on display 112) from location 510-b in FIG. 9C to location 510-c in FIG. 9D.

Figure 9F:
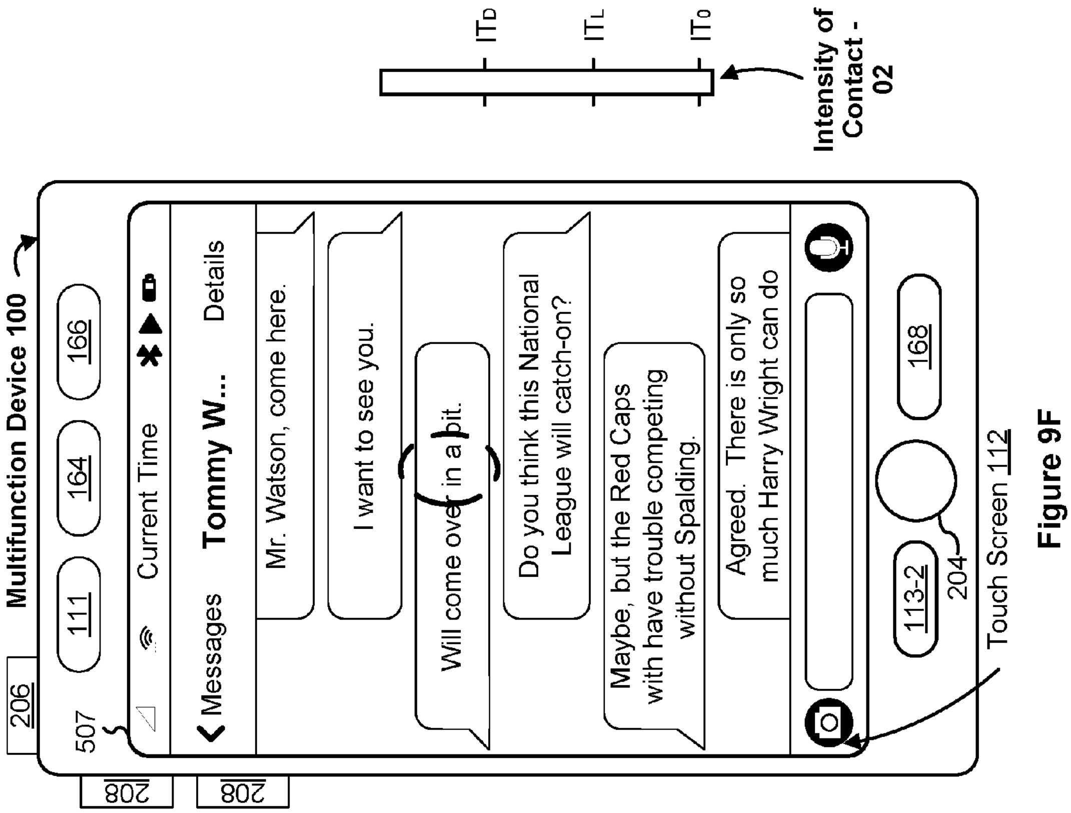
Figure 9E:
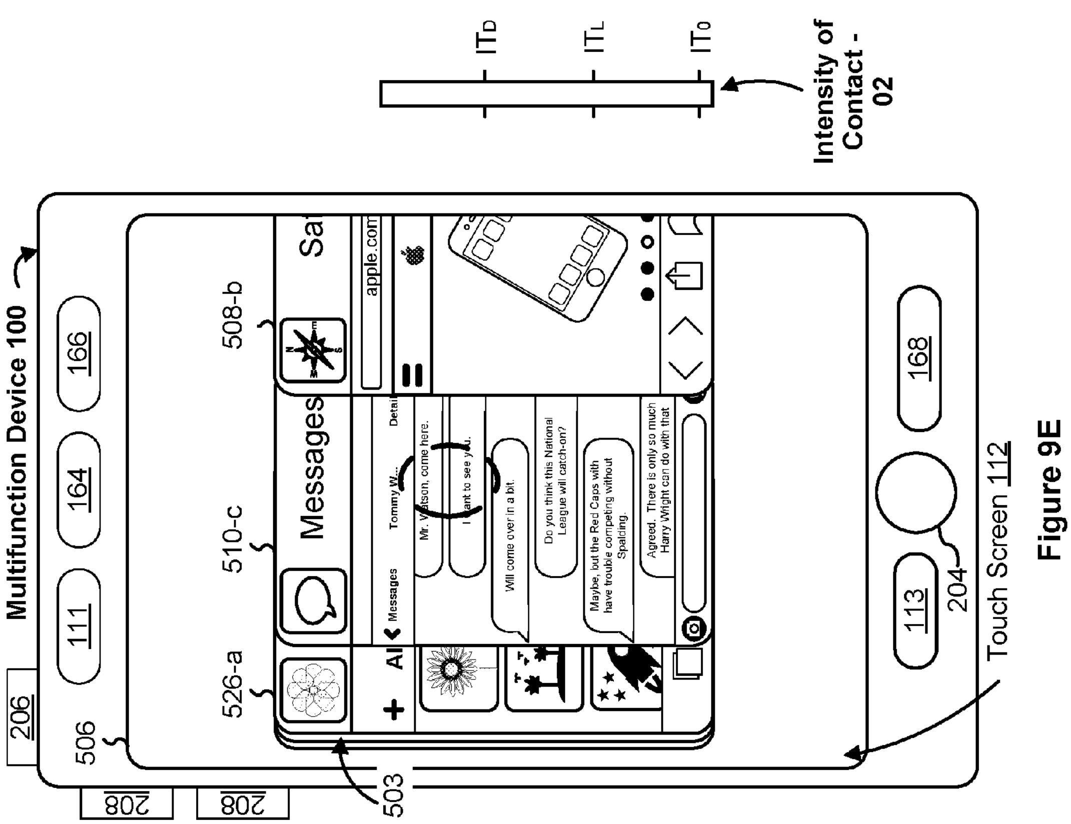

FIGS. 9E-9F illustrate an embodiment where an application is selected from the user interface selection mode by lifting off a contact displayed at a location over a user interface representation card associated with that application. Device 100 detects lift off of contact 902 when positioned over messaging card 510 (e.g., termination of the user input including contact 902 at a position corresponding to display of card 510 on touch screen 112), selecting the messaging application associated with messaging card 510. In response, device 100 replaces display of user interface 506 with display of user interface 507, corresponding to user interface representation card 510. E.g., device 100 opens the messaging application associated with user interface 507 because contact 902 was over the corresponding card when the user lifted off the contact.

Figure 9H:
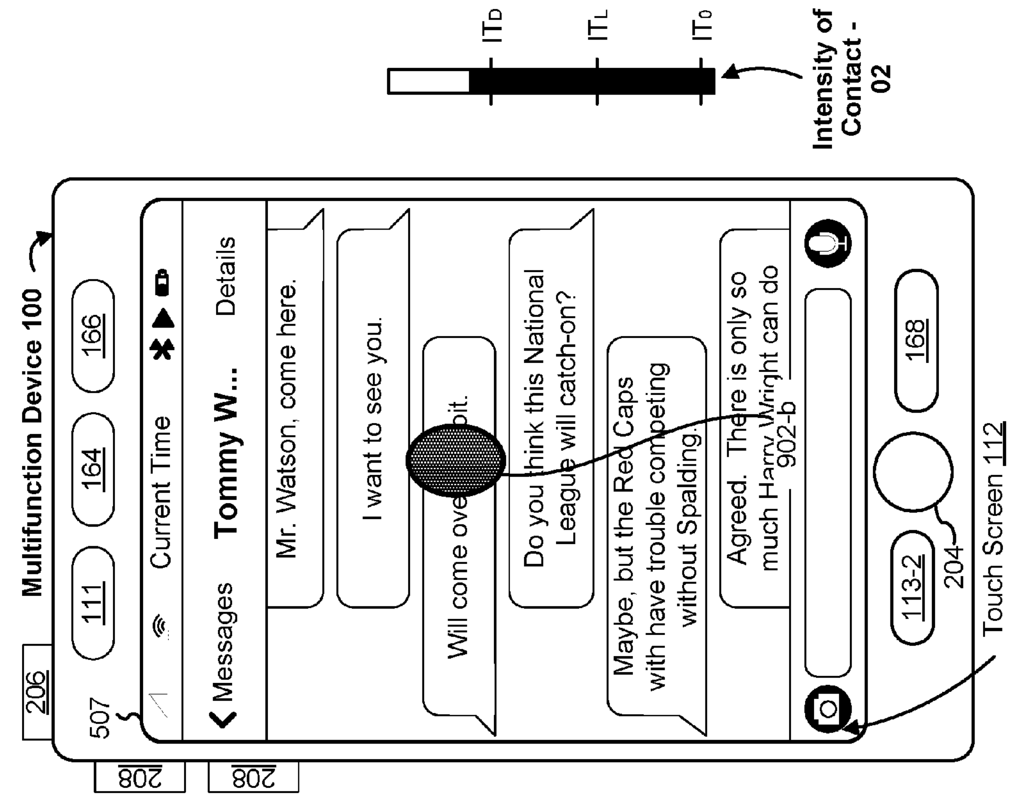
Figure 9G:
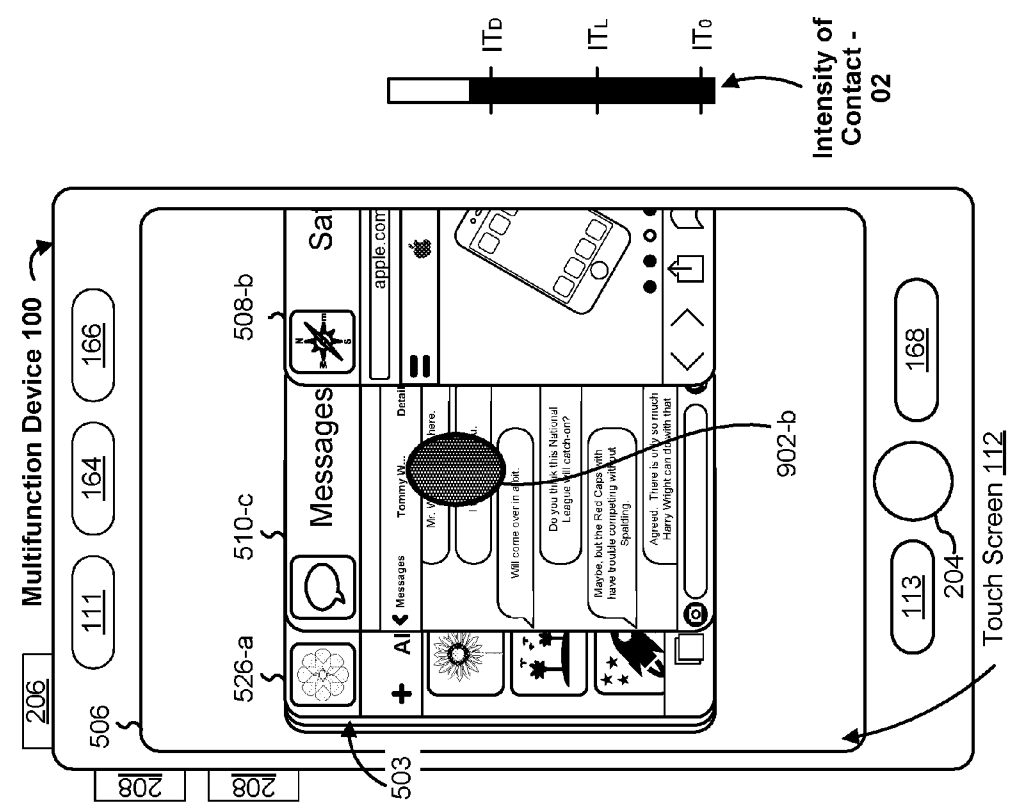

FIGS. 9G-9H illustrate an alternate embodiment where an application is selected from the user interface selection mode by "popping" it with a deep press gesture. Continuing from FIGS. 9A-9D, Device 100 detects an increase in the intensity of contact 902 in excess of a predefined intensity threshold (e.g., deep press intensity threshold ($IT_D$)) when contact 902 is positioned over messaging card 510. In response, device 100 replaces display of user interface 506 with display of user interface 507, corresponding to user interface representation card 510. E.g., device 100 opens the messaging application associated with user interface 507 because contact 902 was over the corresponding card when the deep press was detected.

Figure 22B:
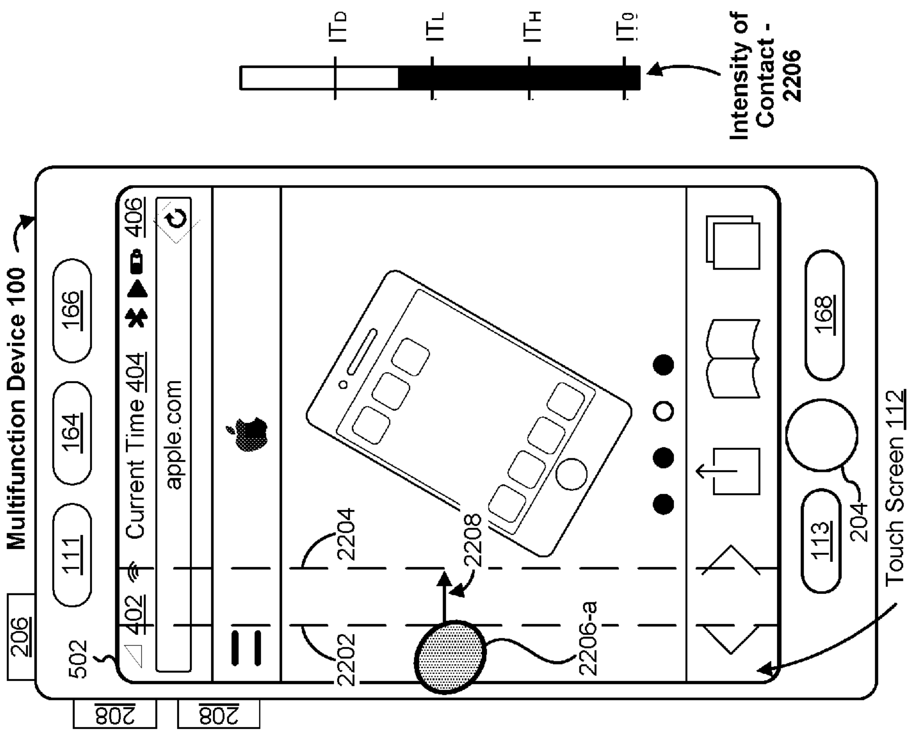
FIGS. 22A-22BA illustrate exemplary user interfaces for invoking a user interface selection mode and for navigating between user interfaces in an application in accordance with some embodiments.
Figure 22A:
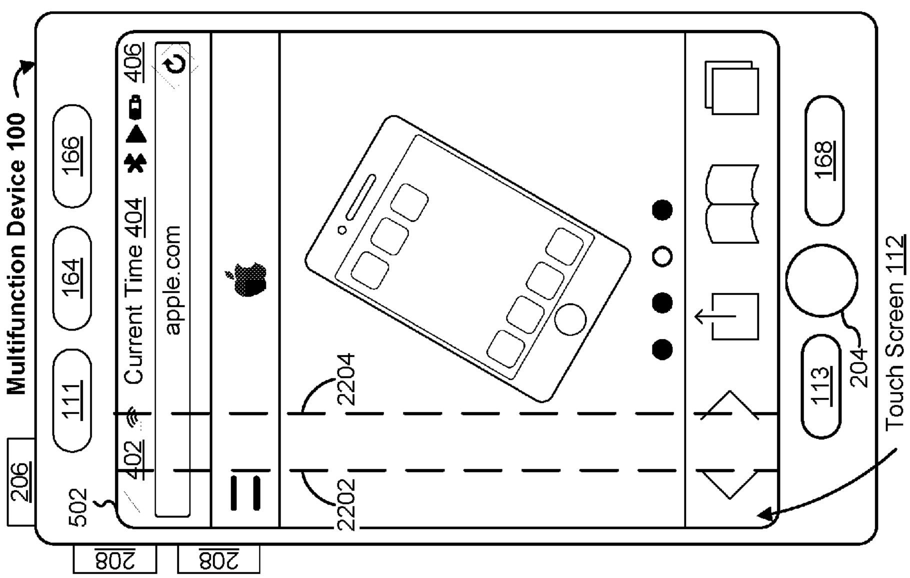

FIGS. 22A-22BA illustrate exemplary user interfaces for performing operations independent of an application (e.g., system-wide actions), such as navigating between user interfaces in accordance with some embodiments. In some embodiments, this is achieved by a user interface that distinguishes at least two types of inputs originating from the edge of the touch screen, and in response performs a system-wide operation when a first type of input is detected and an application-specific application when the second type of input is detected. In some embodiments, the two types of inputs are distinguished based on at least their proximity to the edge of the touch-sensitive surface and a characteristic intensity of a contact included in the input.

The user interfaces in these figures are used to illustrate the processes described below, including the processes in FIGS. 10A-10H, 11A-11E, 12A-12E, 13A-13D, 14A-14C, 15, 24A-24F, and 25A-25H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIGS. 22A-22D illustrate an embodiment where the device detects two inputs meeting system-gesture intensity criteria and determines whether to perform an application-specific action or a system-wide action based on the proximity of the input to the edge of the touch screen, in accordance with some embodiments. FIG. 22A illustrates a web browsing user interface 502 having two location boundaries, 2202 and 2204. Location boundary 2202 defines an area of touch screen 112 (e.g., which extends to the left off of the touch screen) left of the boundary in which a contact must be detected in order to activate a system-wide action (e.g., when the contact also meets an intensity criteria), such as entering a user interface selection mode. Location boundary 2204 defines a larger area of touch screen 112 (e.g., which extends to the left off of the touch screen) left of the boundary in which a contact must be detected in order to activate a system-specific action (e.g., when the contact also meets an intensity criteria), such as navigating to a previous user interface displayed within the active application.

In FIG. 22B, the device detects contact 2206 having a characteristic intensity above a threshold intensity required for performance of the system-wide action (e.g., intensity threshold $IT_L$). Contact 2206 also satisfies system-wide action positional criteria because it is detected to the left of boundary 2202. Thus, although the contact also satisfies application-specific action criteria, in response to detecting movement of the contact to the right, the device enters a user interface selection mode, as indicated by replacement of web browsing user interface 502 with multitasking user interface 506 in FIG. 22C.

Figure 22D:
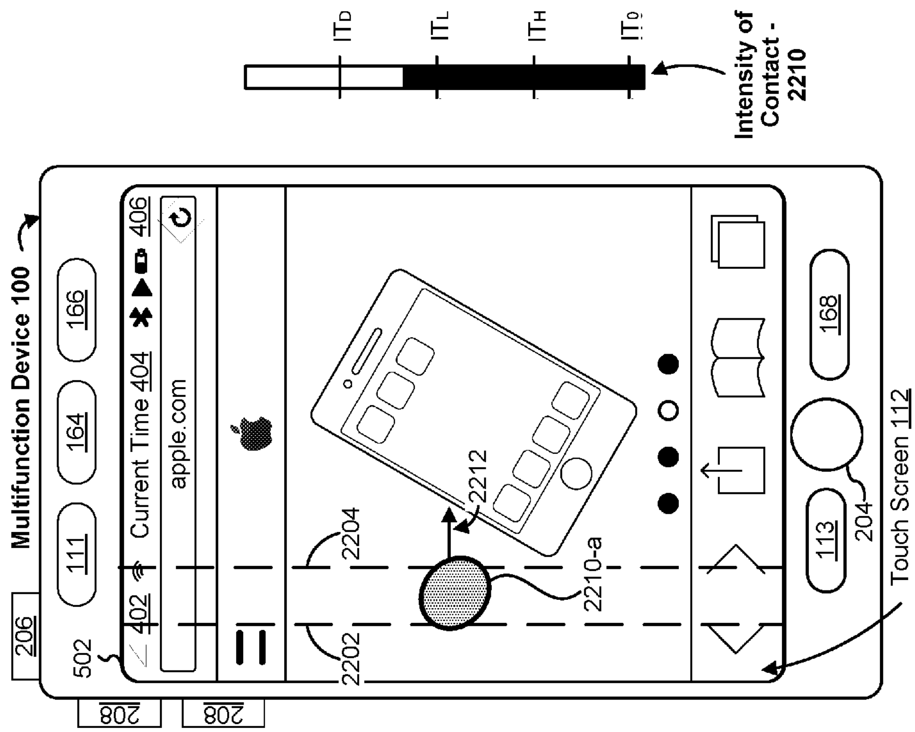
Figure 22C:
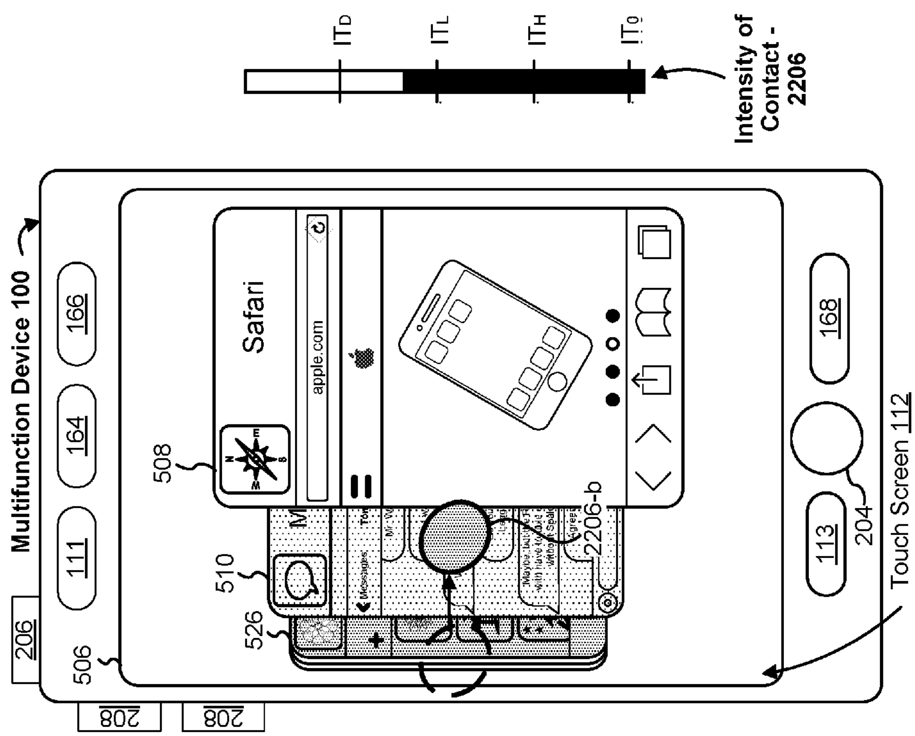

In FIG. 22D, the device detects contact 2212 having a characteristic intensity above a threshold intensity required for performance of the system-wide action (e.g., intensity threshold $IT_L$) and the application-specific action. However, contact 2212 does not satisfy system-wide action positional criteria because it is detected to the right of boundary 2202. Because contact 2212 does satisfy application-specific positional criteria, in response to detecting movement of the contact to the right, the device navigates to a previously viewed user interface within the web browsing application, as indicated by replacement of web browsing user interface 502 with web browsing user interface 616 in FIG. 22E.

Figure 22F:
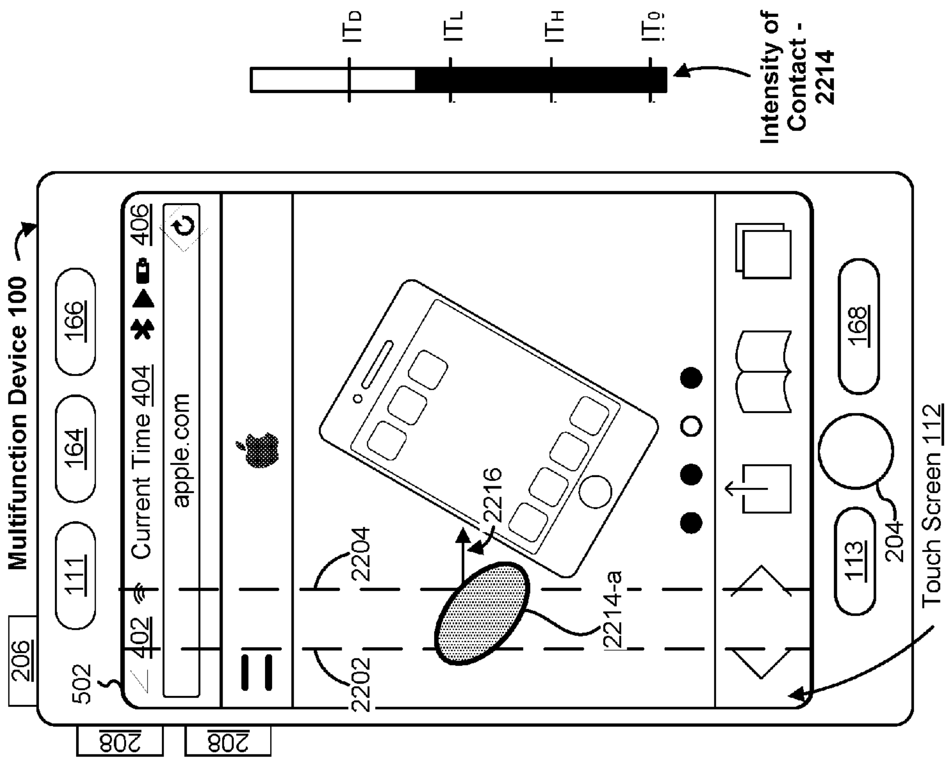
Figure 22E:
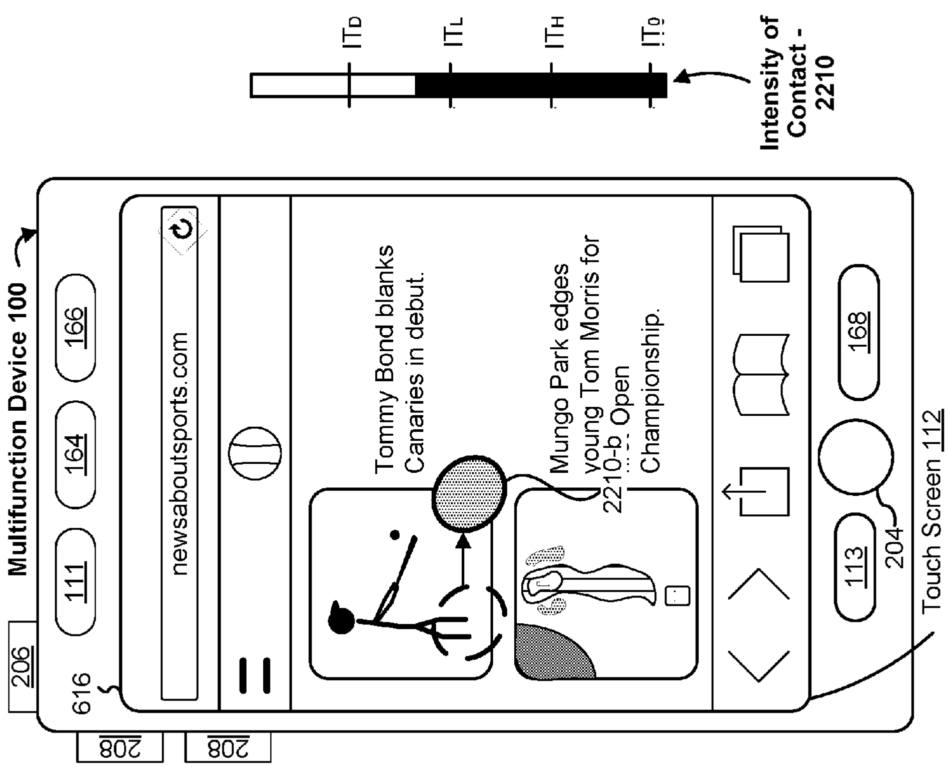
Figure 22H:
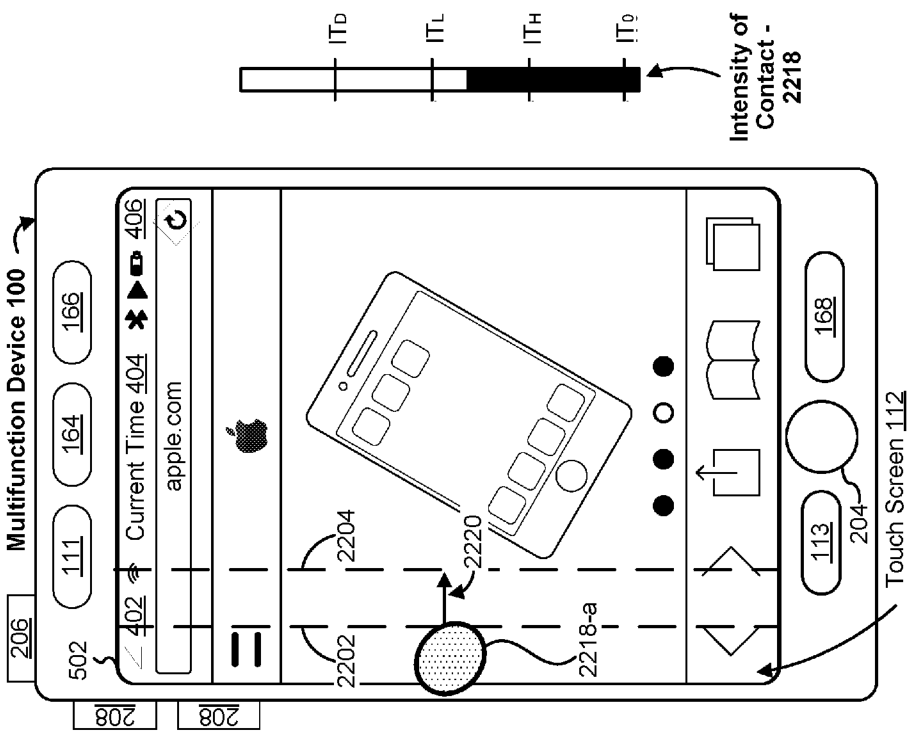
Figure 22G:
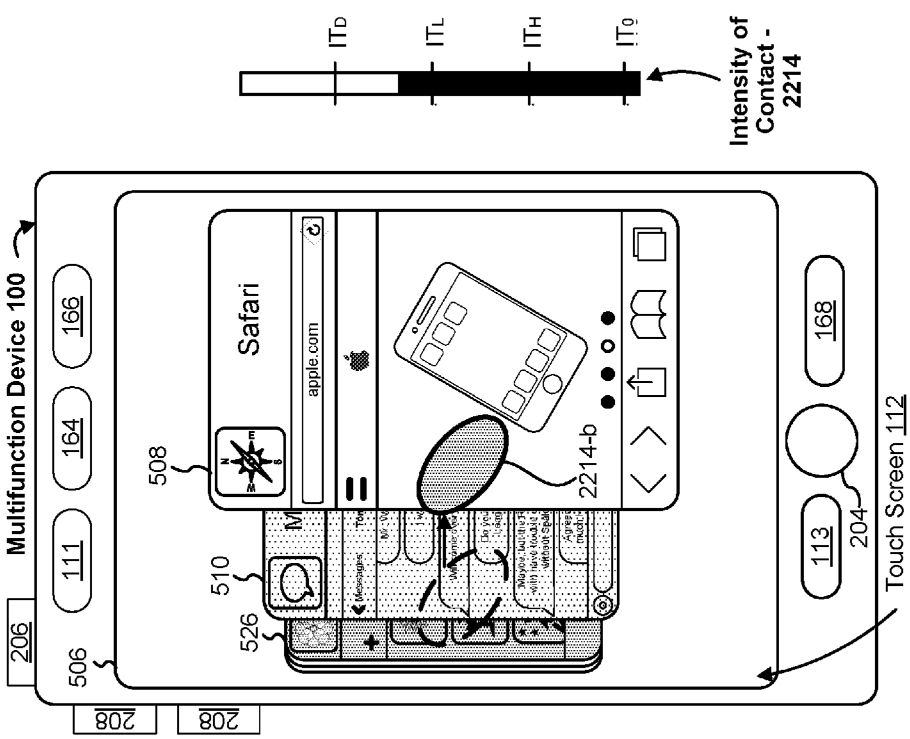

FIGS. 22F-22G illustrate an embodiment where the device adjusts the positional criteria required to perform a system-wide action in response to the shape of the contact detected. In FIG. 22F the device detects contact 2214 having a characteristic intensity above a threshold intensity required for performance of the system-wide action (e.g., intensity threshold $IT_L$). However, contact 2214 does not satisfy the default system-wide action positional criteria because it is detected to the right of boundary 2202. However, because the contact is wider and elongated (e.g., which indicative of the user stretching their thumb to reach the left side of the device), as compared to a typical finger-tip contact, the device adjusts the system-wide action positional criteria such that contacts detected left of boundary 2204 satisfy the positional criteria. Thus, in response to detecting movement of the contact to the right, the device enters a user interface selection mode, as indicated by replacement of web browsing user interface 502 with multitasking user interface 506 in FIG. 22G.

Figure 22J:
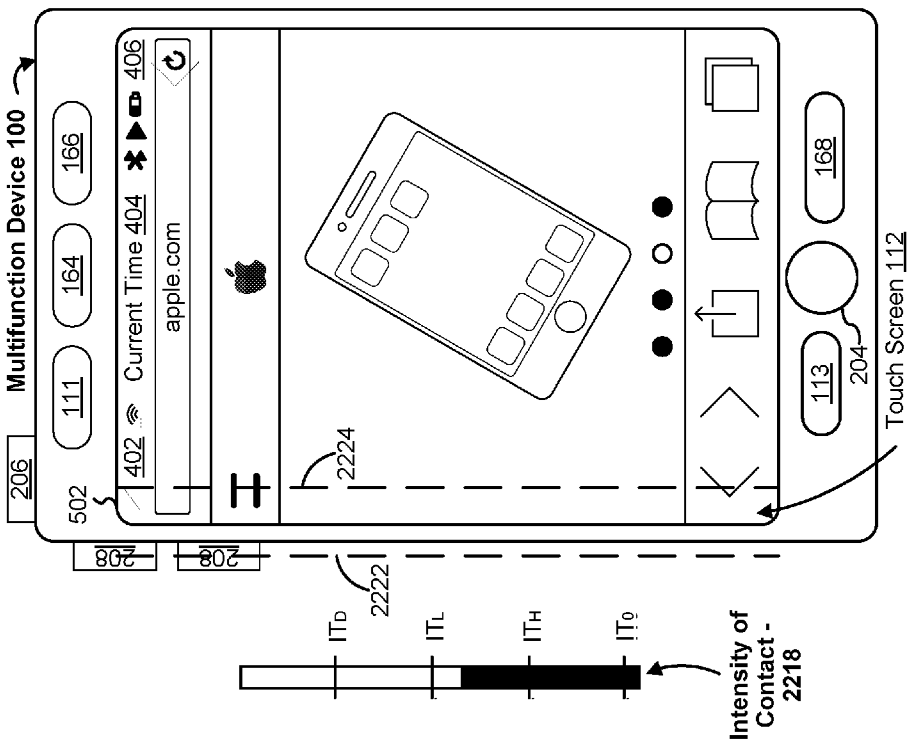
Figure 22I:
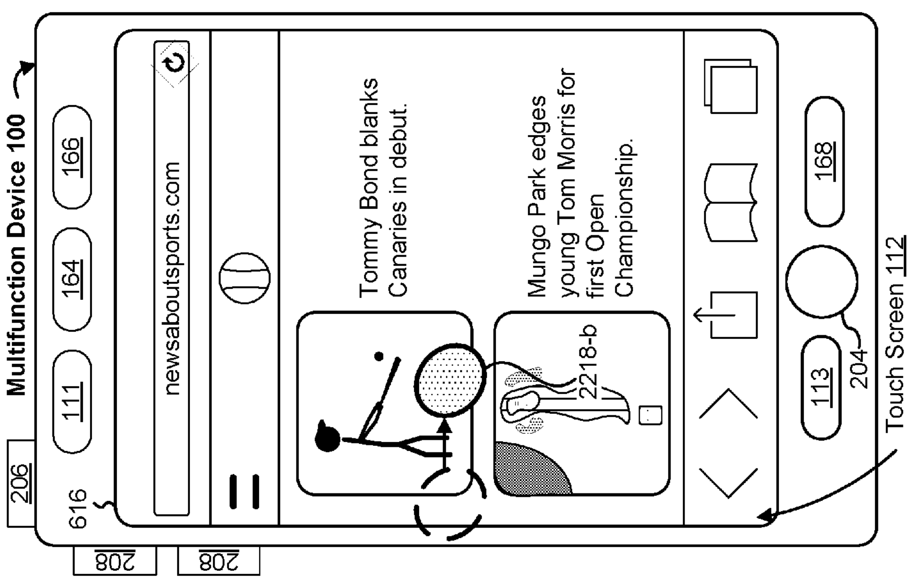
Figure 22L:
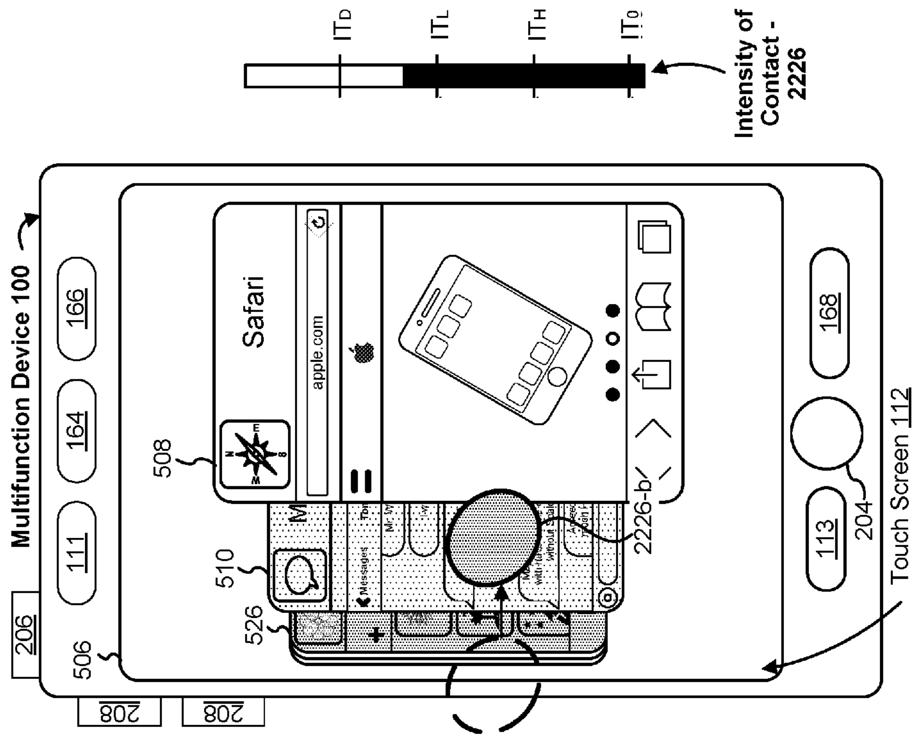

FIGS. 22H-22I illustrate an embodiment where the device detects a contact that meets system-wide action positional criteria, but not system-wide action intensity. In FIG. 22H the device detects contact 2218 satisfying the positional requirement for performance of the system-wide action (e.g., because it was detected to the left of boundary 2202. However, contact 2218 has a characteristic intensity below a threshold intensity required for performance of the system-wide action (e.g., intensity threshold $IT_L$) criteria. Because contact 2218 does satisfy application-specific intensity criteria, in response to detecting movement of the contact to the right, the device navigates to a previously viewed user interface within the web browsing application, as indicated by replacement of web browsing user interface 502 with web browsing user interface 616 in FIG. 22I.

FIGS. 22J-22N illustrate an embodiment where the boundary defining the system-wide action positional criteria is located off of the left edge of touch screen 112. FIG. 22J illustrates a web browsing user interface 502 having location boundaries, 2222 and 2224 defining the right edge of positional requirements for performance of system-wide and application-specific actions.

Figure 22K:
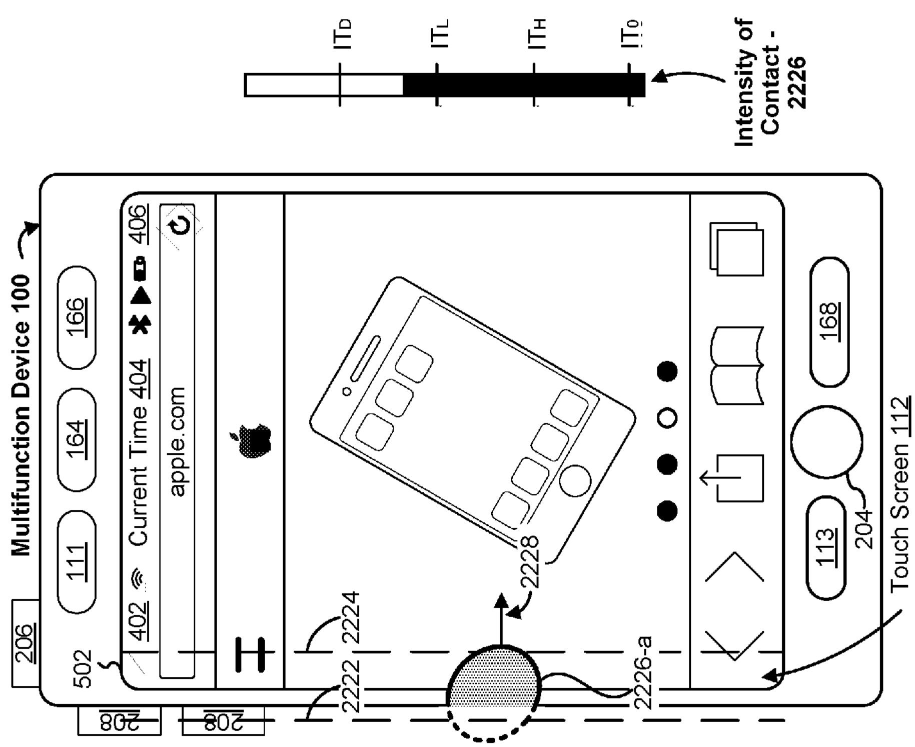
Figure 22N:
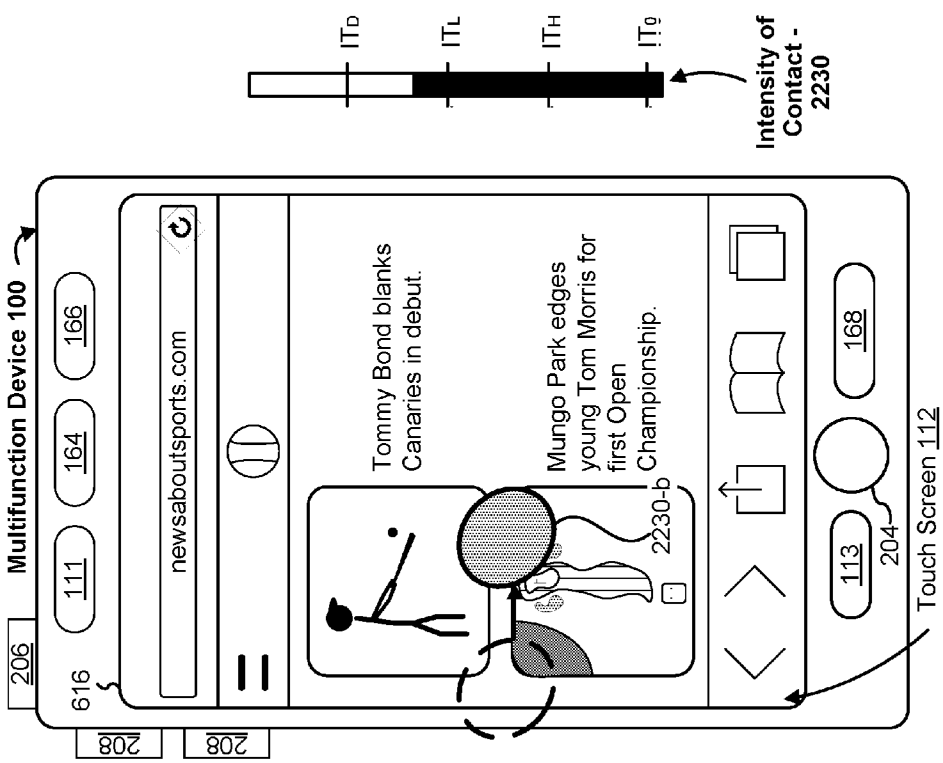

In FIG. 22K, the device detects contact 2226 having a characteristic intensity above a threshold intensity required for performance of the system-wide action (e.g., intensity threshold $IT_L$). Because the device determines that the user's digit used to make contact 2226 must extend to the left, off of touch screen 112 (e.g., based on the shape and size of the contact), the device projects (e.g., virtually) where the contact would extend to if the touch screen was wider, as indicated by the dashed lines in FIG. 22K. Because the farthest point in the projected contact is left of positional boundary 2222, contact 2226 also satisfies system-wide action positional criteria. Thus, in response to detecting movement of the contact to the right, the device enters a user interface selection mode, as indicated by replacement of web browsing user interface 502 with multitasking user interface 506 in FIG. 22L.

Figure 22M:
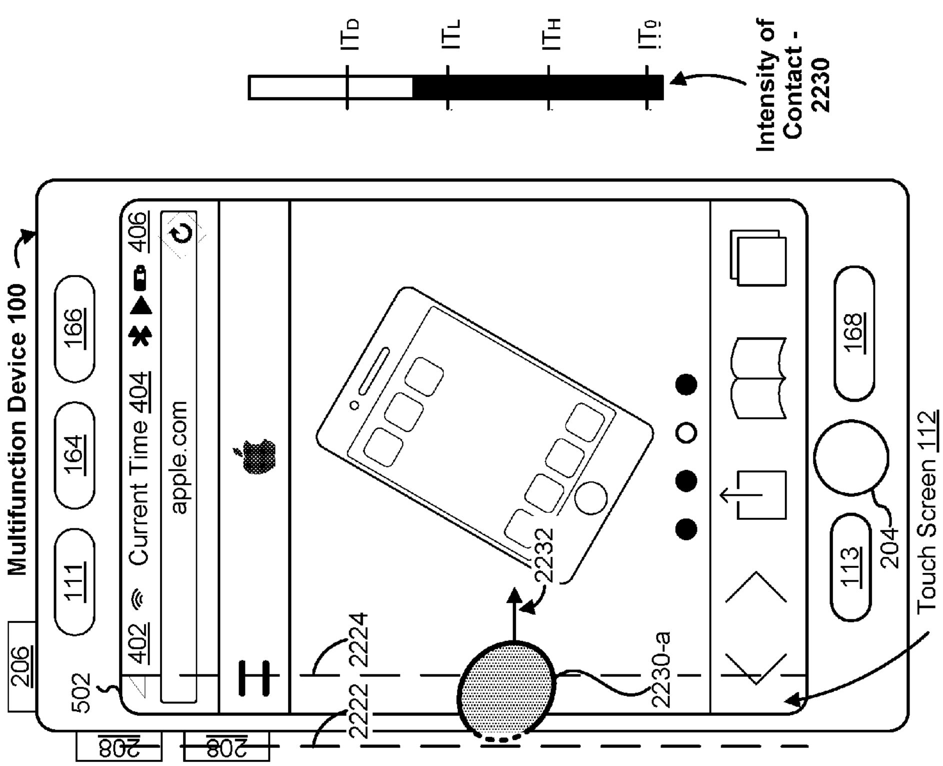
Figure 22P:
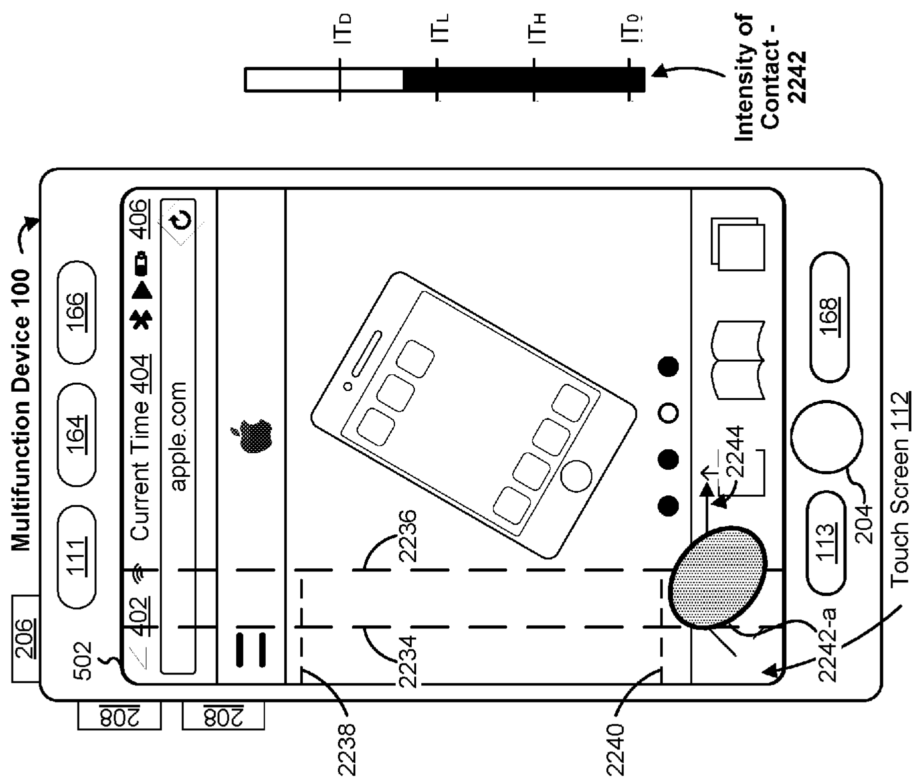
Figure 22O:
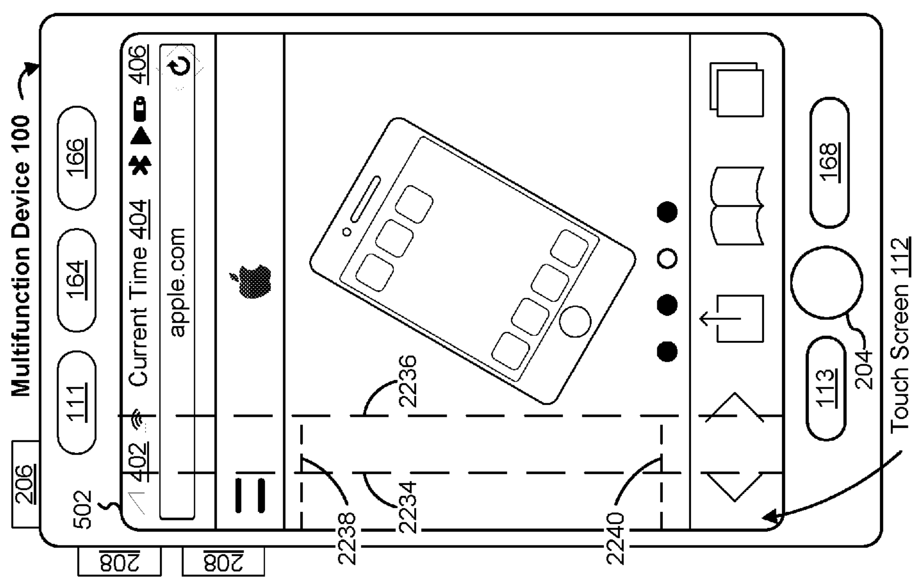

In FIG. 22M, the device detects contact 2230 having a characteristic intensity above a threshold intensity required for performance of the system-wide action (e.g., intensity threshold $IT_L$). The device then projects the left-most boundary of where contact 2230 would be located off of the edge of touch screen 112. Because the farthest point in the projected contact is right of positional boundary 2222, contact 2226 does not satisfy system-wide action positional criteria. Because contact 2230 does satisfy application-specific positional criteria, in response to detecting movement of the contact to the right, the device navigates to a previously viewed user interface within the web browsing application, as indicated by replacement of web browsing user interface 502 with web browsing user interface 616 in FIG. 22N.

Figure 22R:
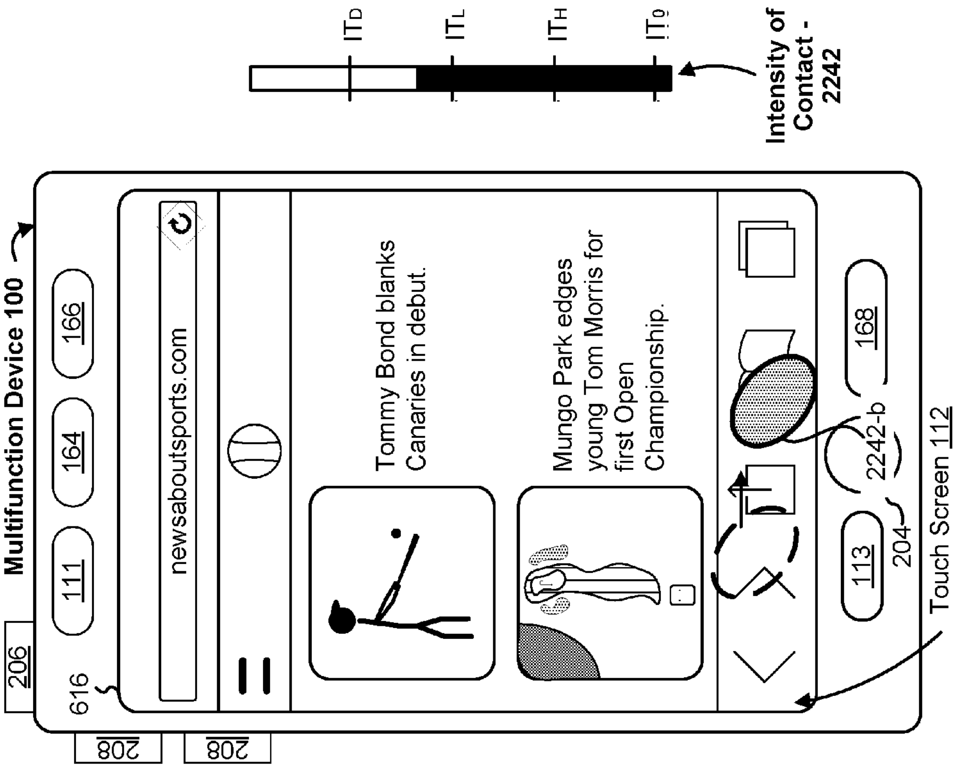
Figure 22Q:
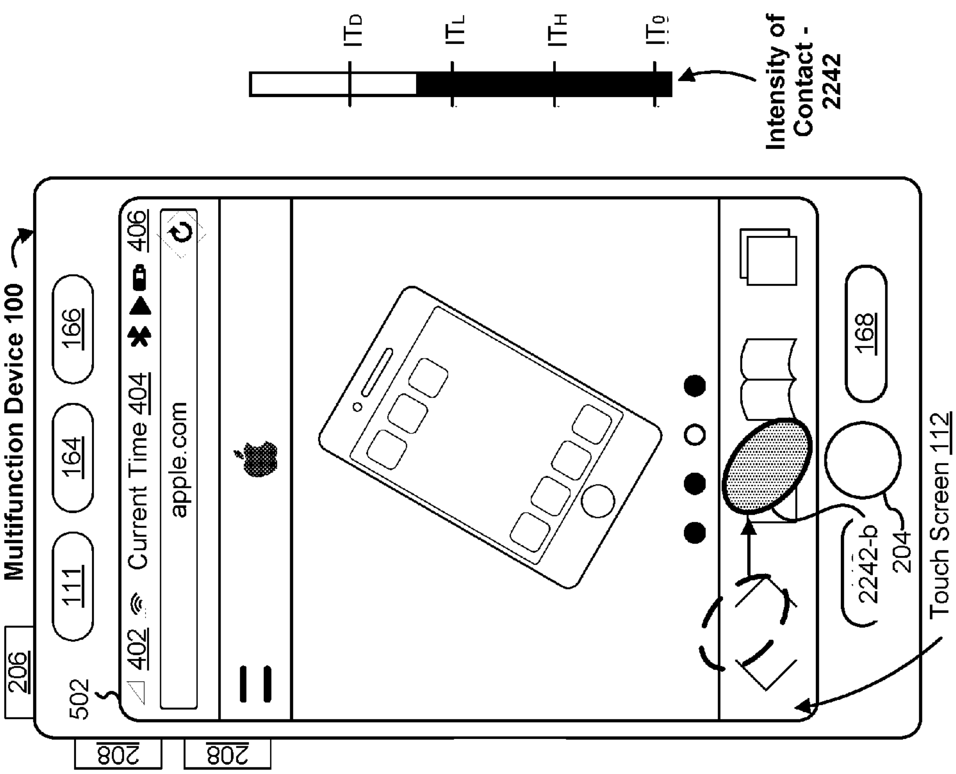

FIGS. 22O-22R illustrate an embodiment where the device does not extend the system-wide action positional boundary in response to detecting a larger contact, when the contact is detected in the upper or lower corners of touch screen 112. Thus, when the device detects a wider contact in FIG. 22P that would satisfy the modified positional criteria, the device performs the application-specific action, rather than the system-wide action, as illustrated in FIG. 22R.

Figure 22S:
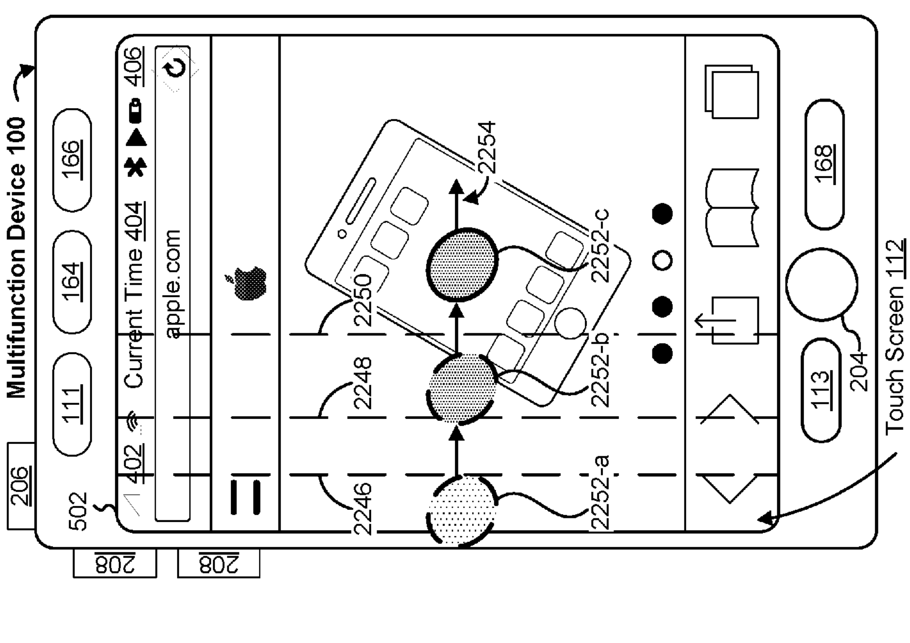
Figure 22T:
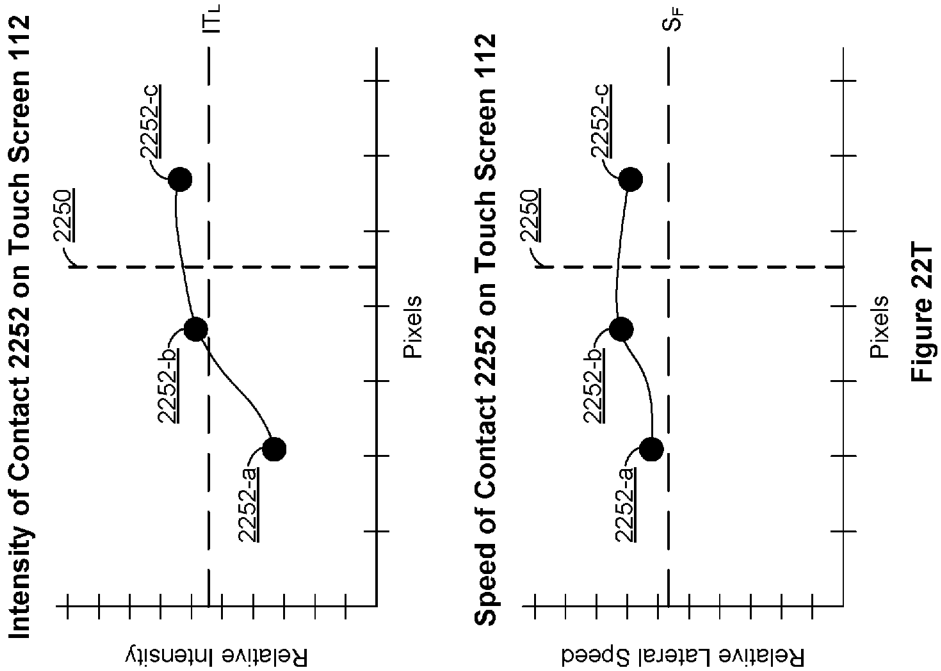
Figure 22U:
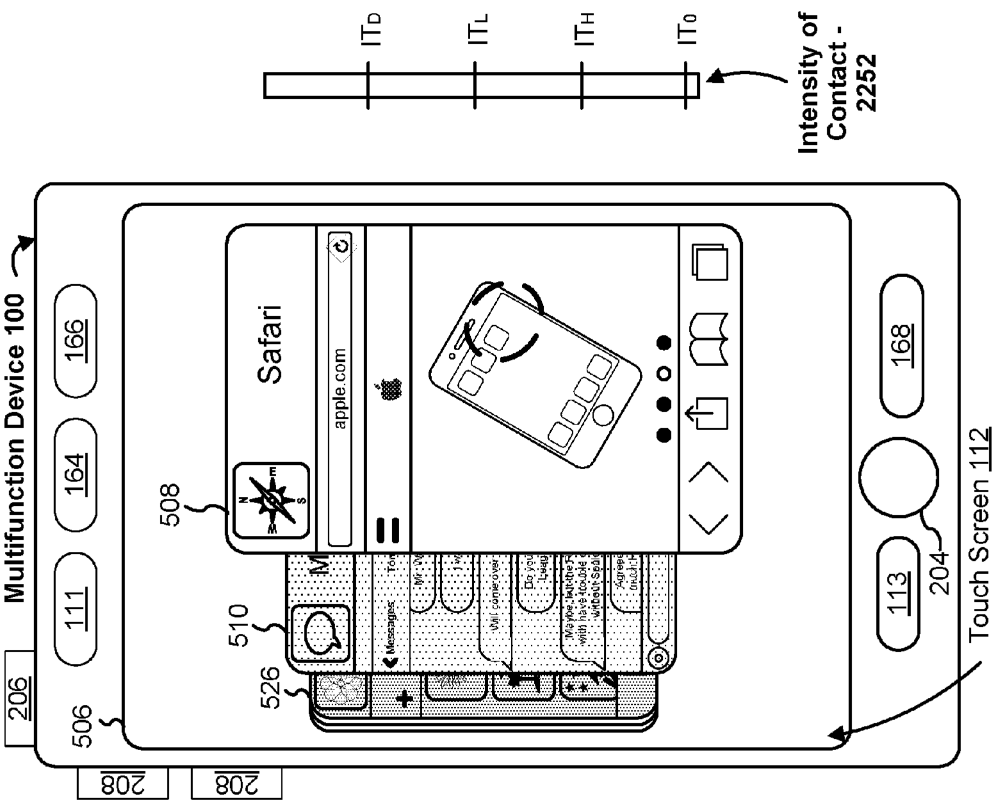
Figure 22W:
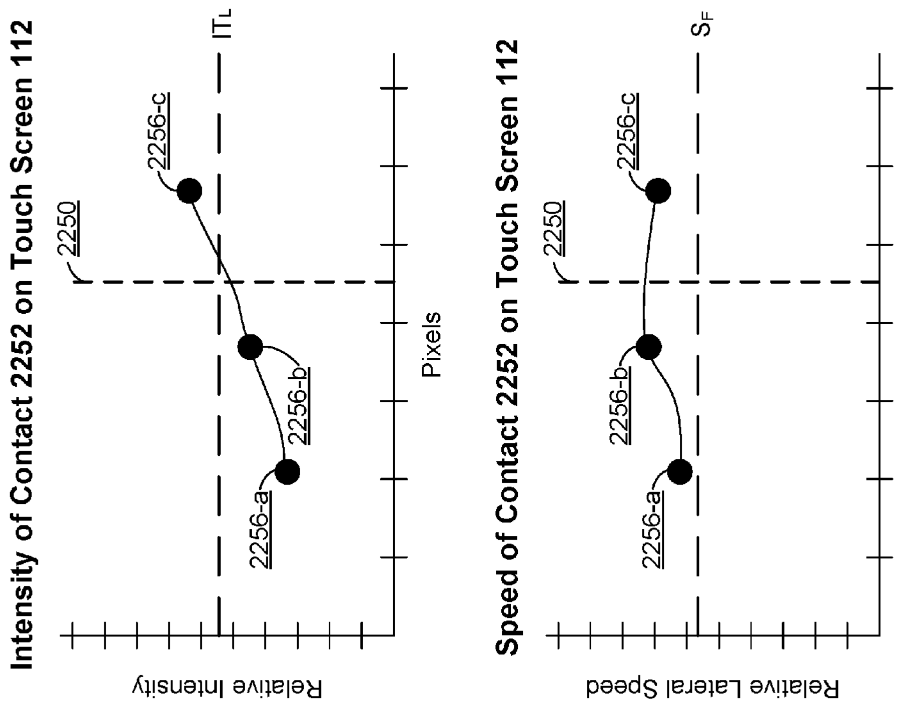
Figure 22V:
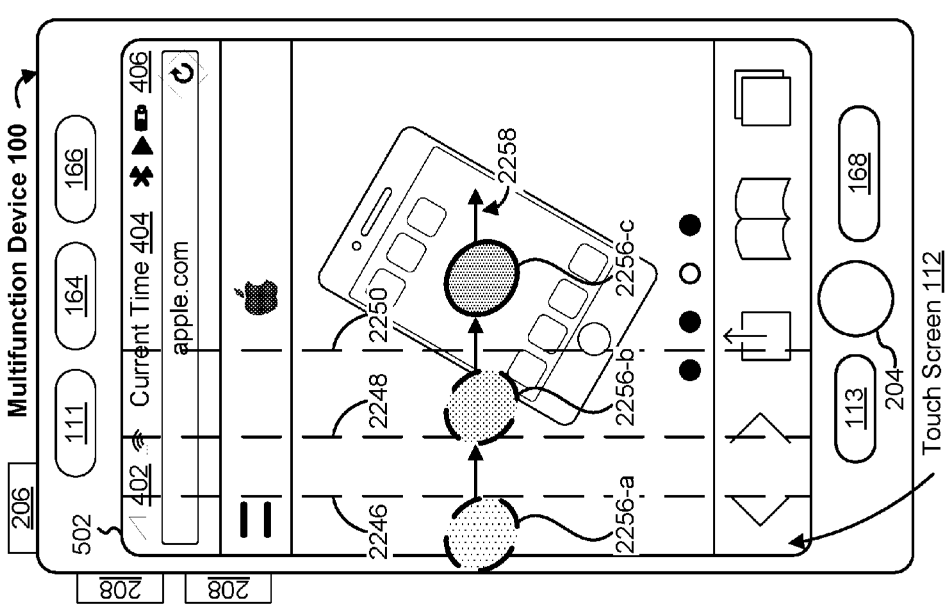
Figure 22X:
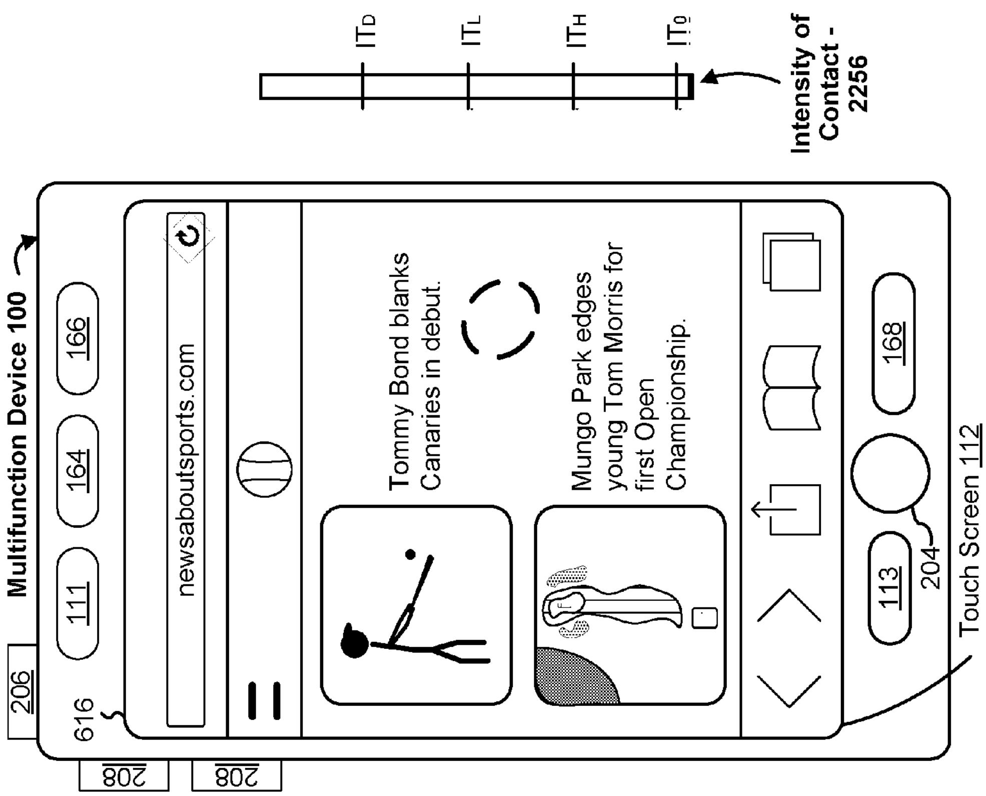
Figure 22Z:
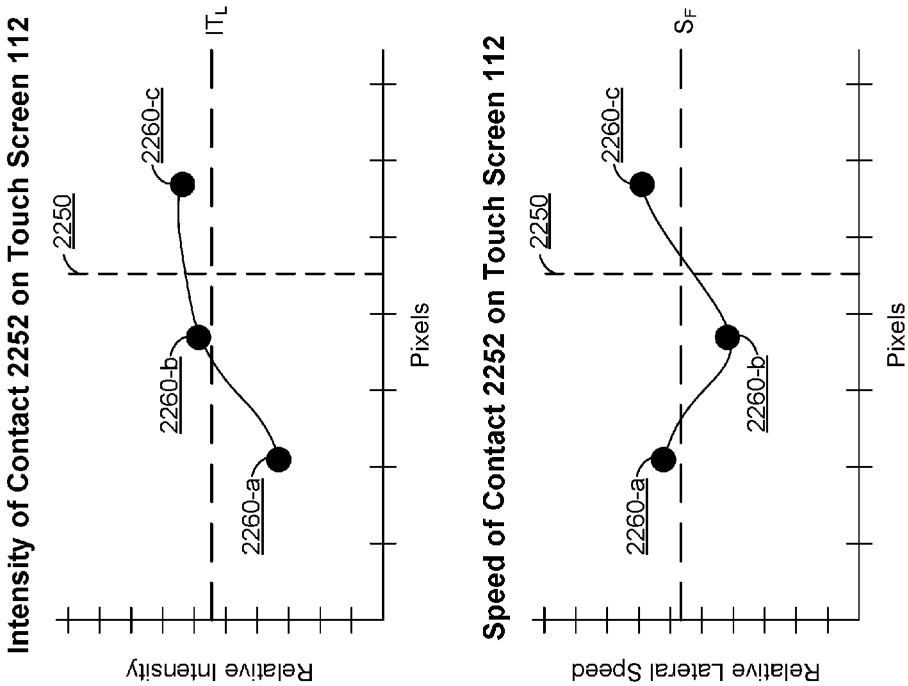
Figure 22Y:
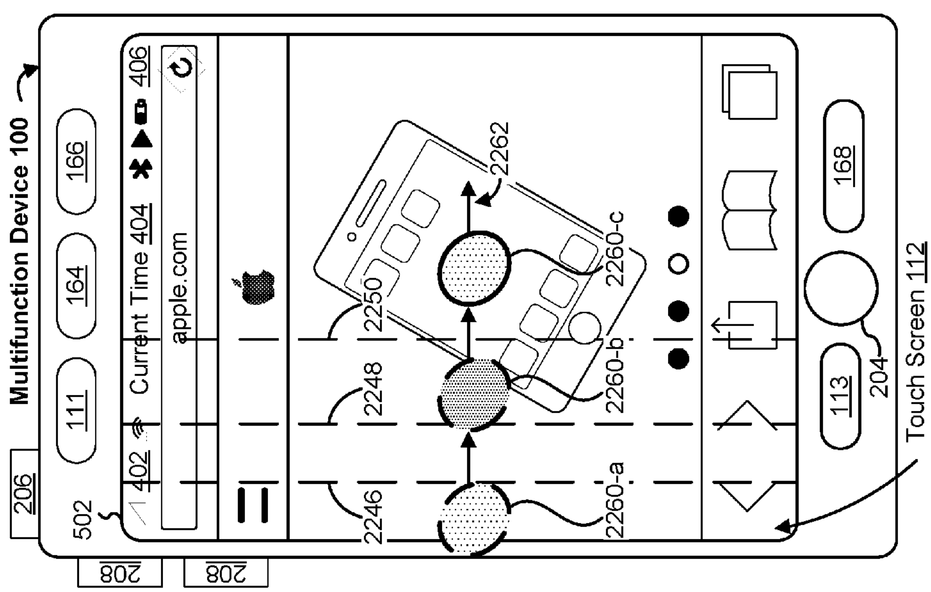
Figure 22A:
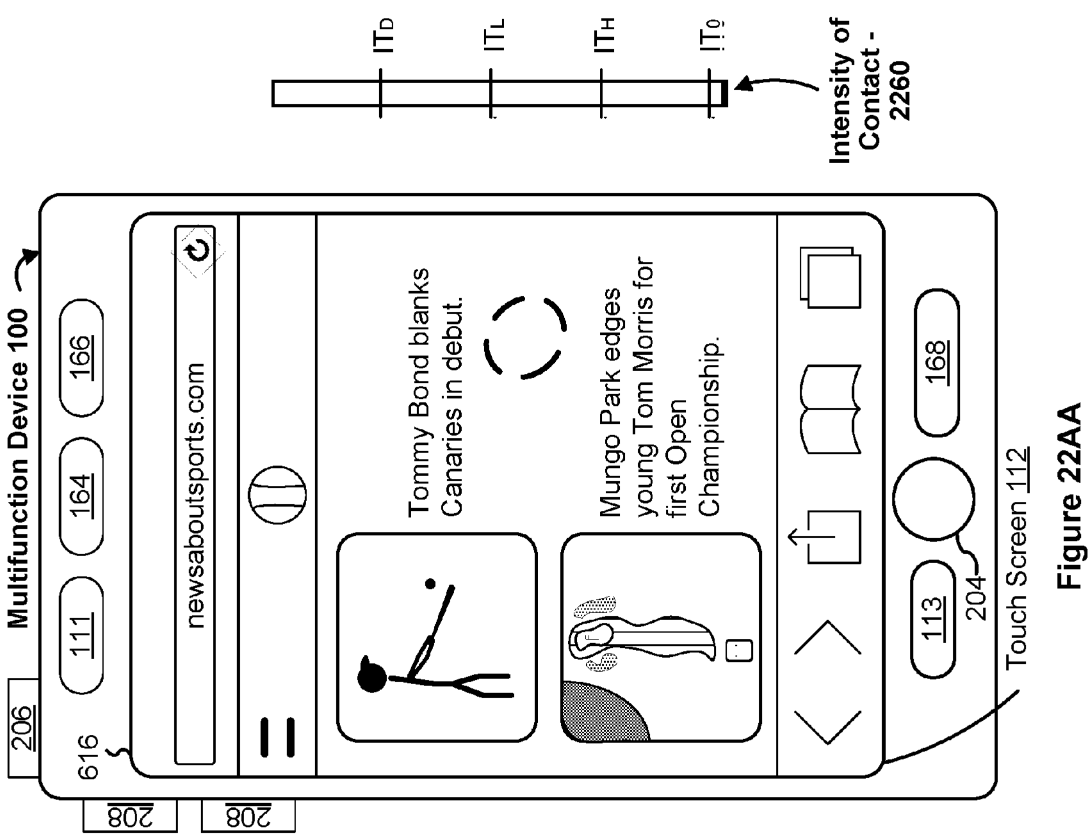
Figure 22A:
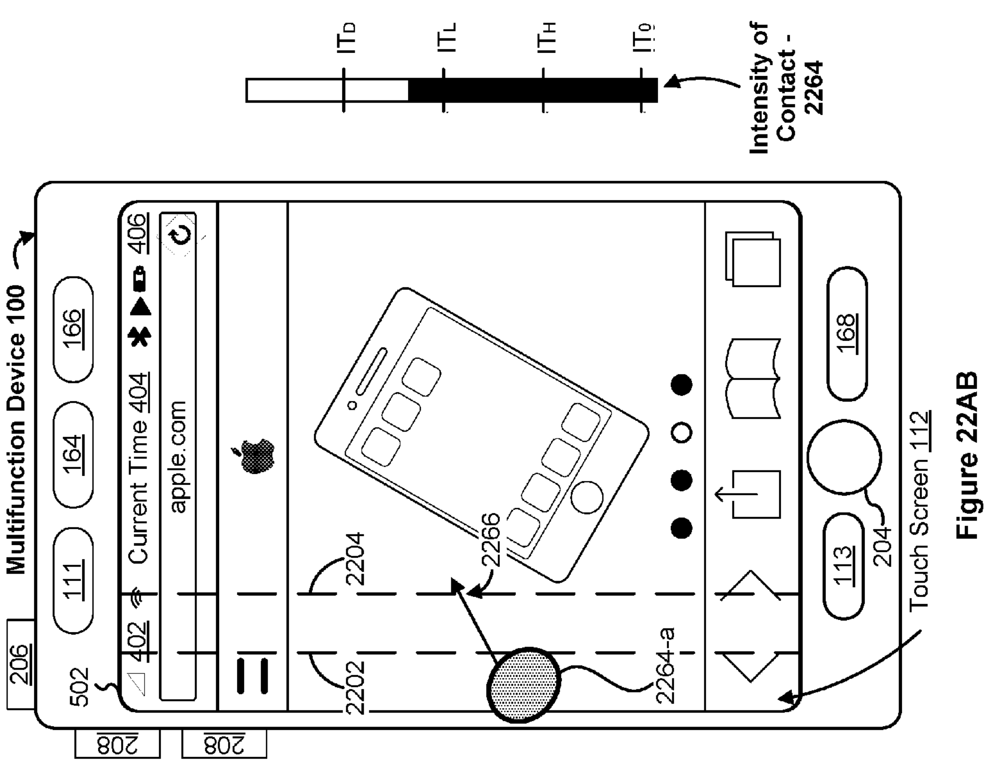
Figure 22A:
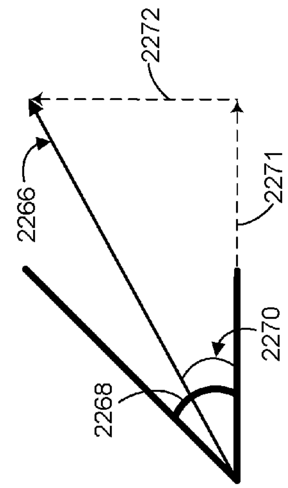
Figure 22A:
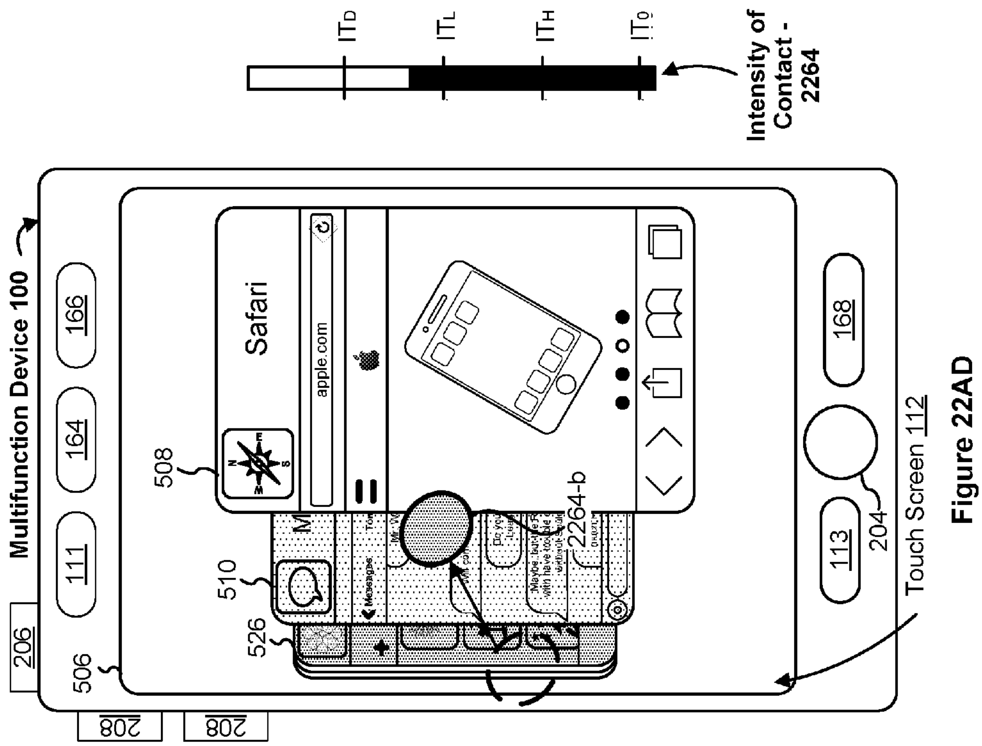
Figure 22A:
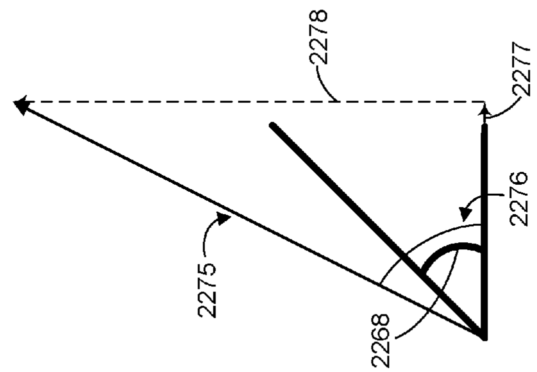
Figure 22A:
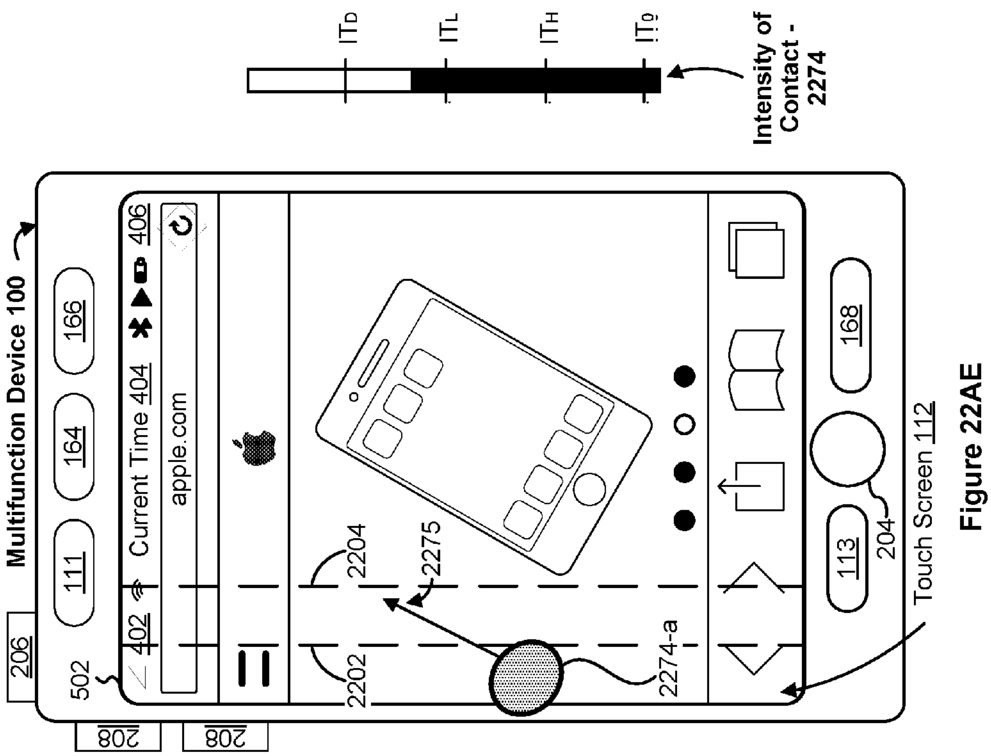
Figure 22A:
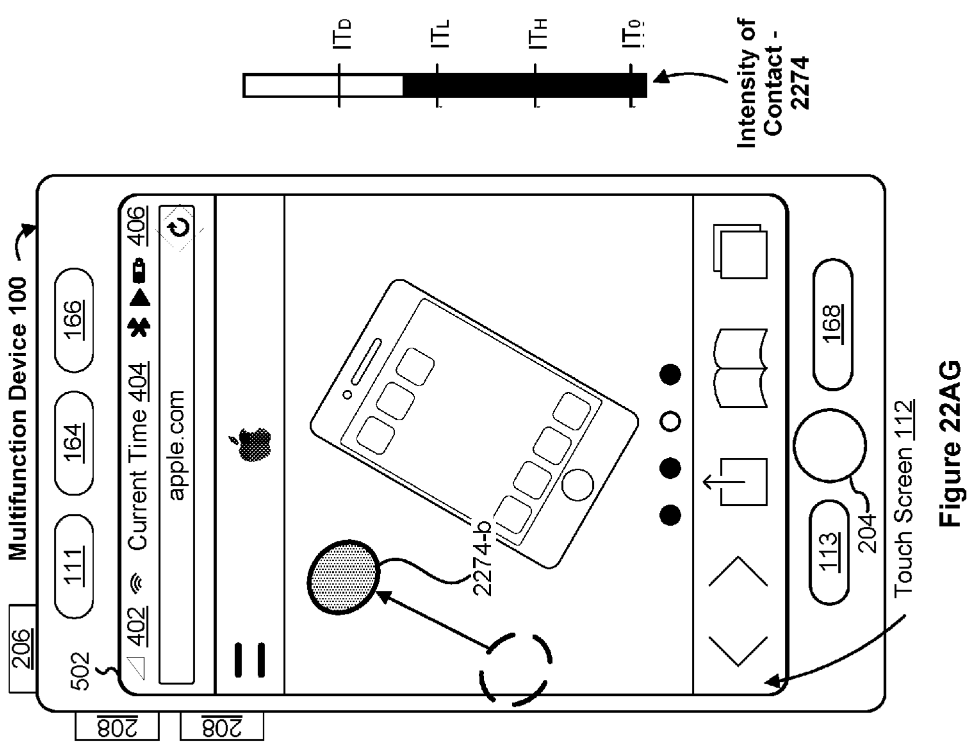
Figure 22A:
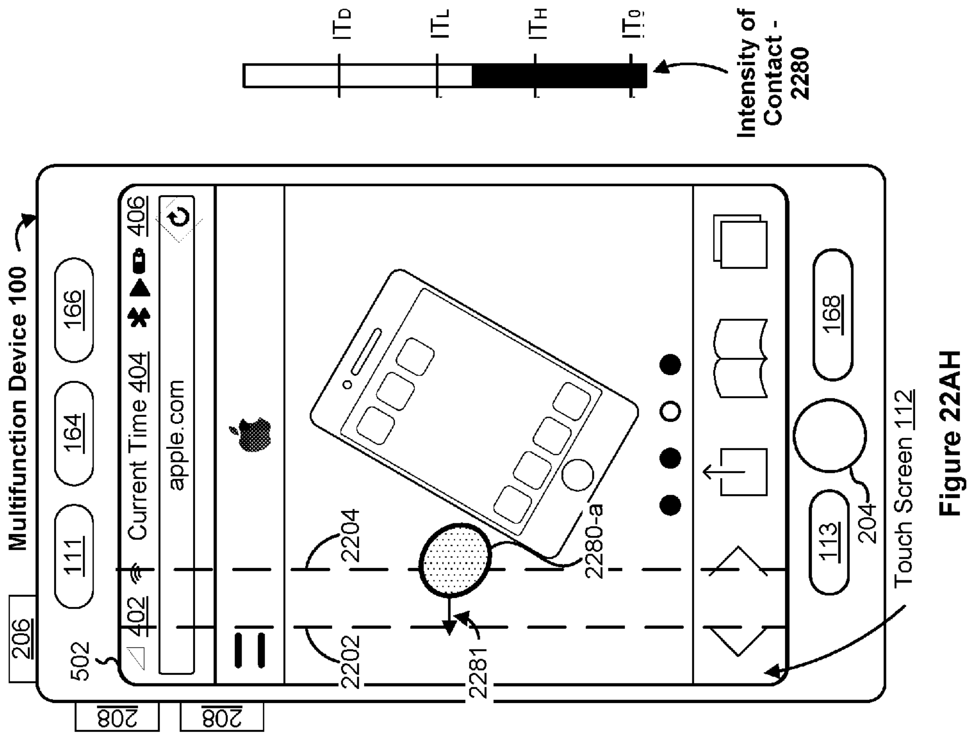
Figure 22A:
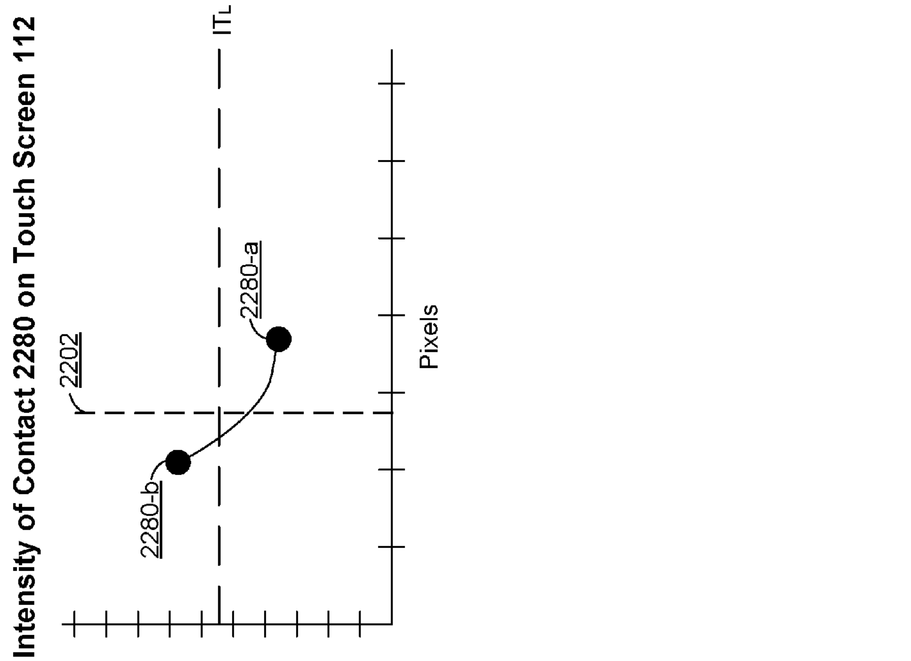
Figure 22A:
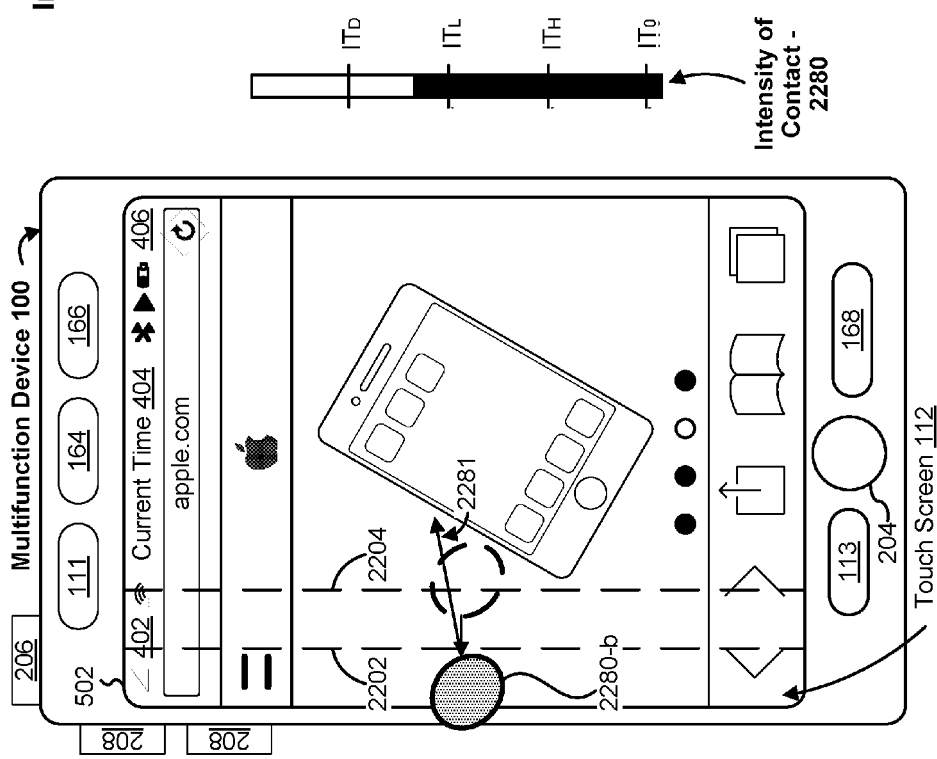
Figure 22A:
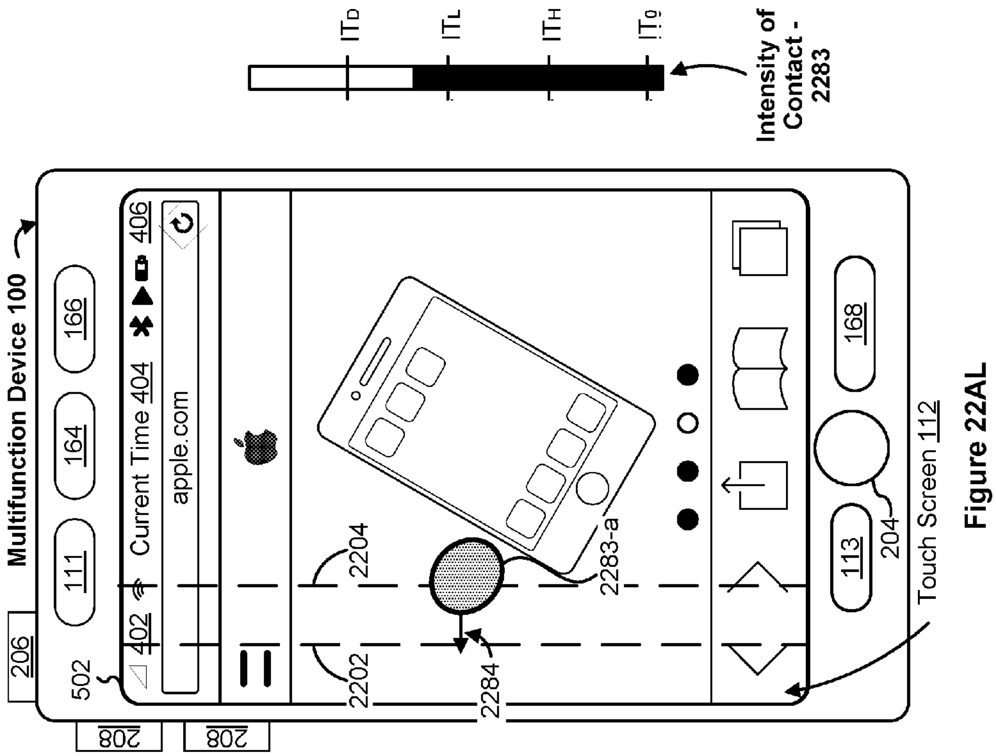
Figure 22A:
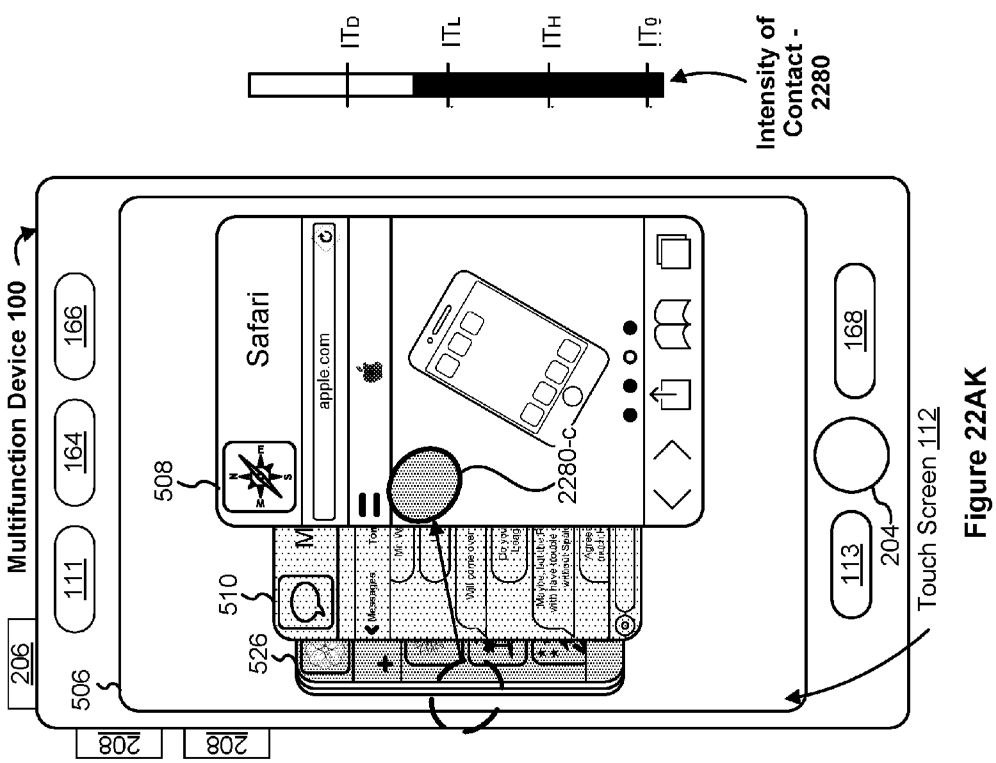
Figure 22A:
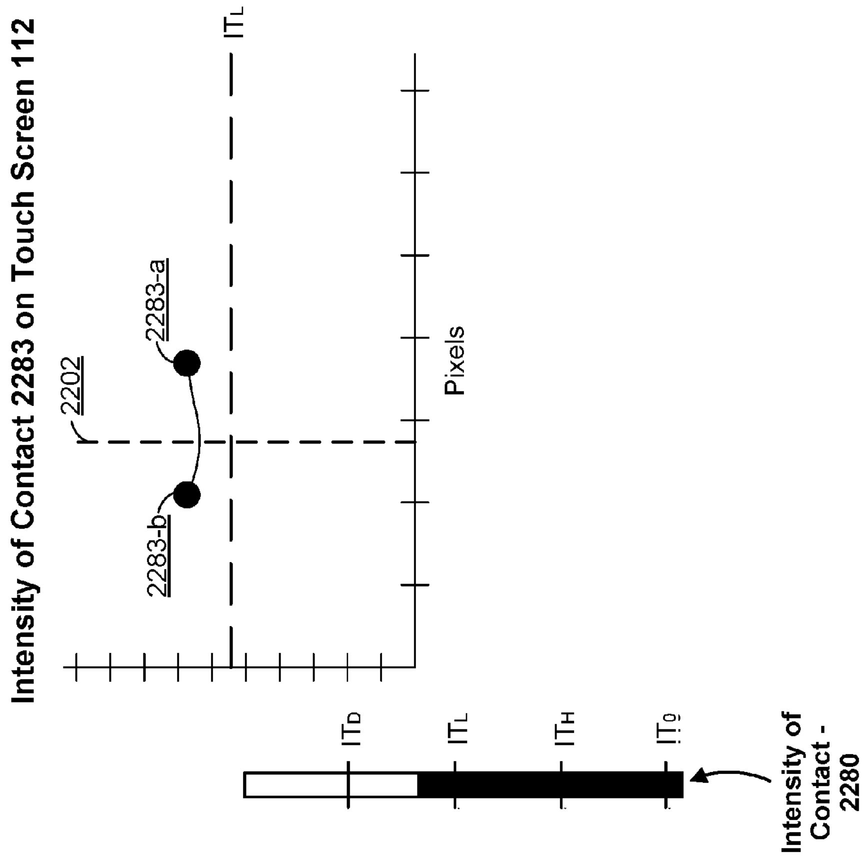
Figure 22A:
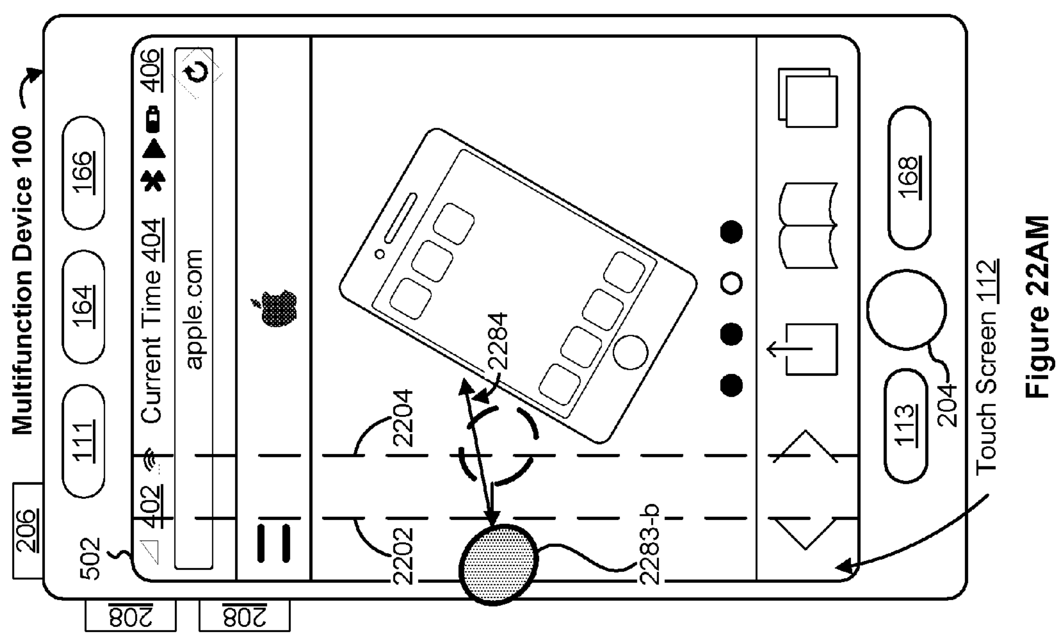
Figure 22A:
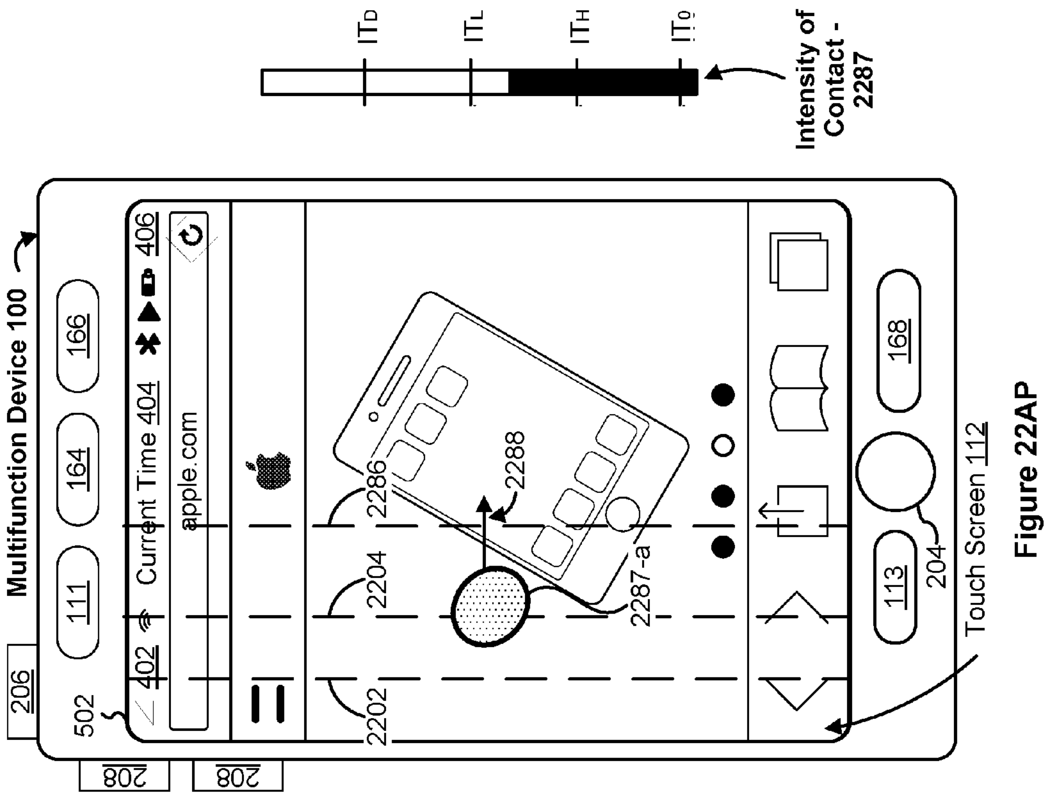
Figure 22A:
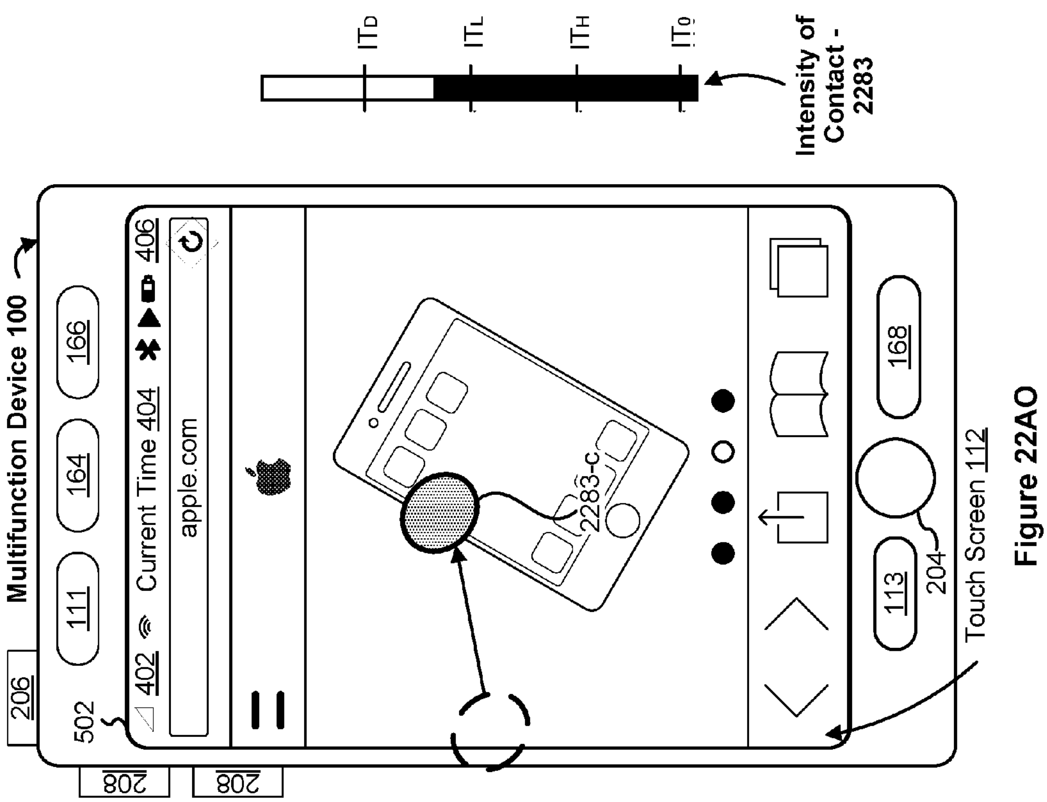
Figure 22A:
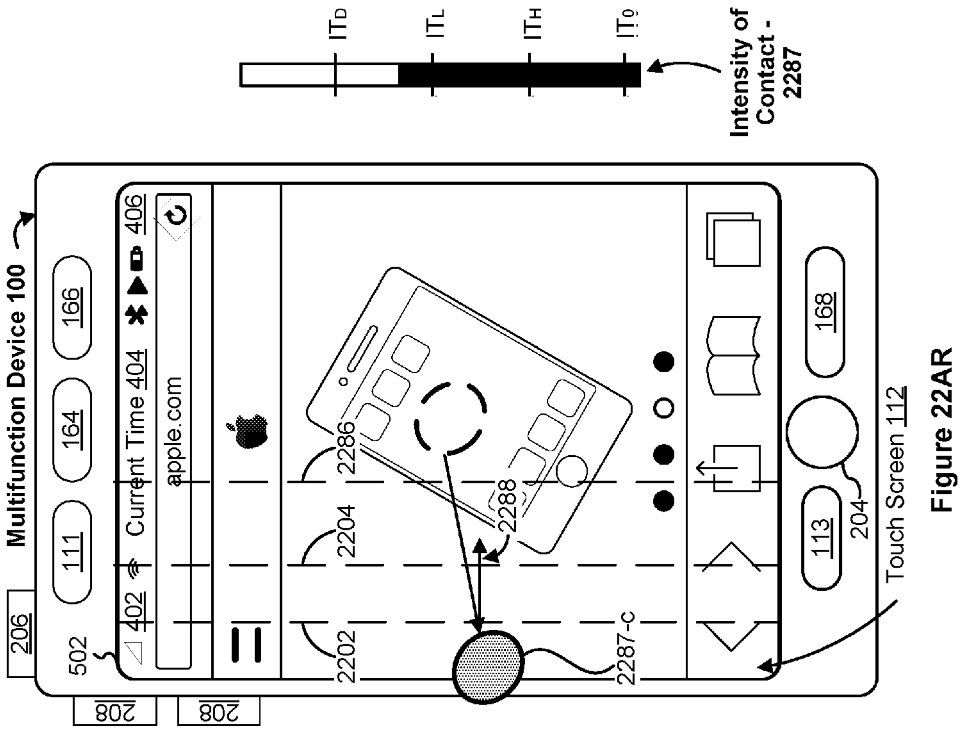
Figure 22A:
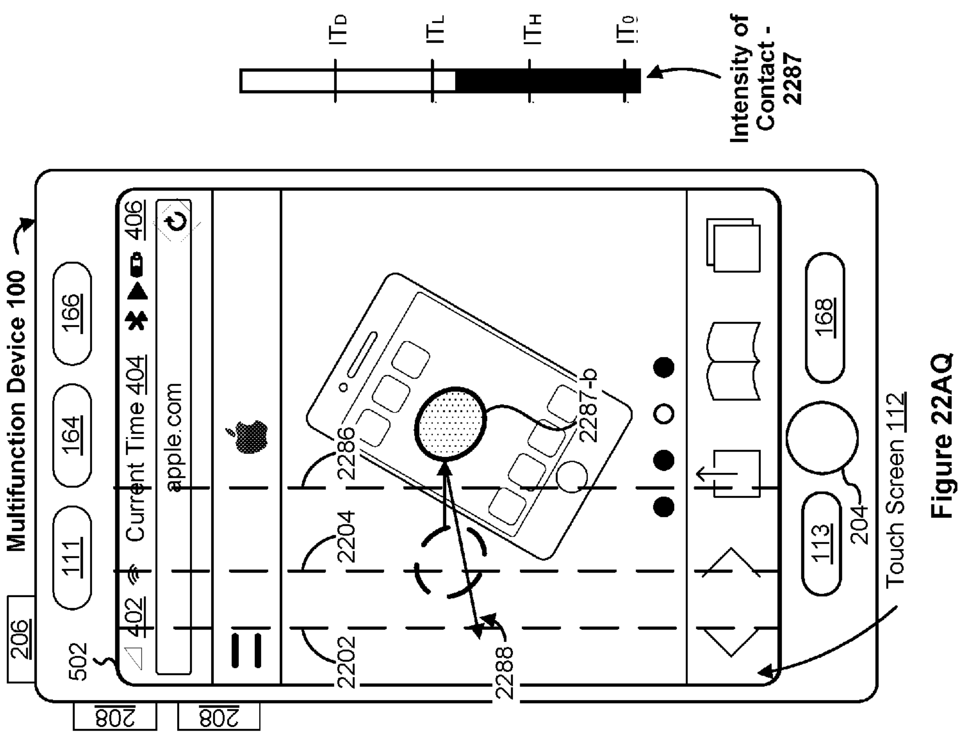
Figure 22A:
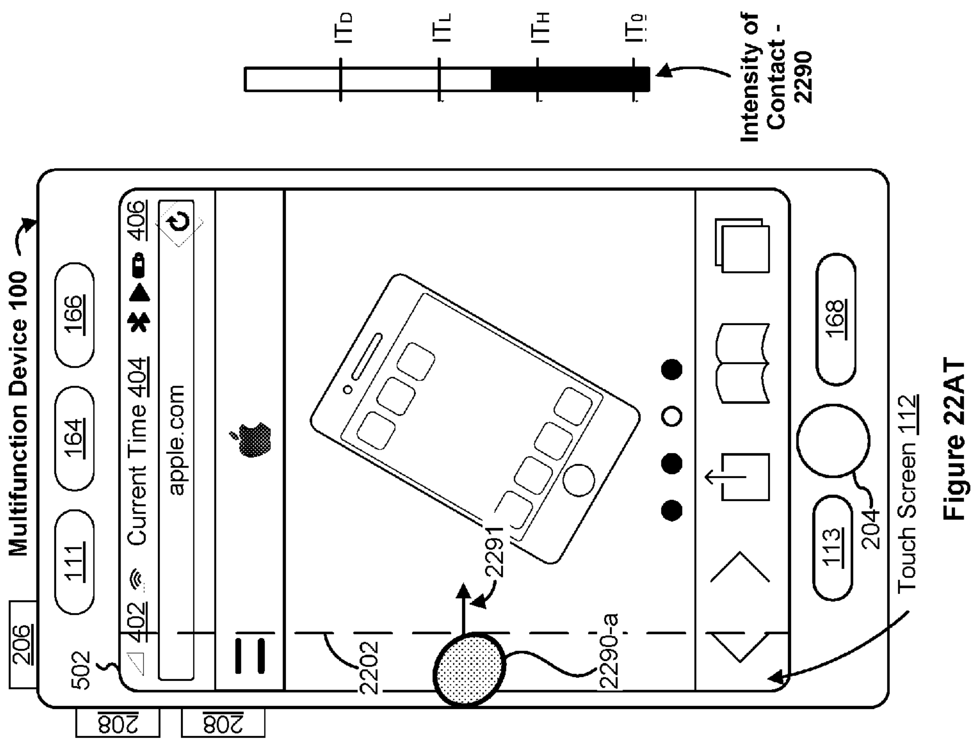
Figure 22A:
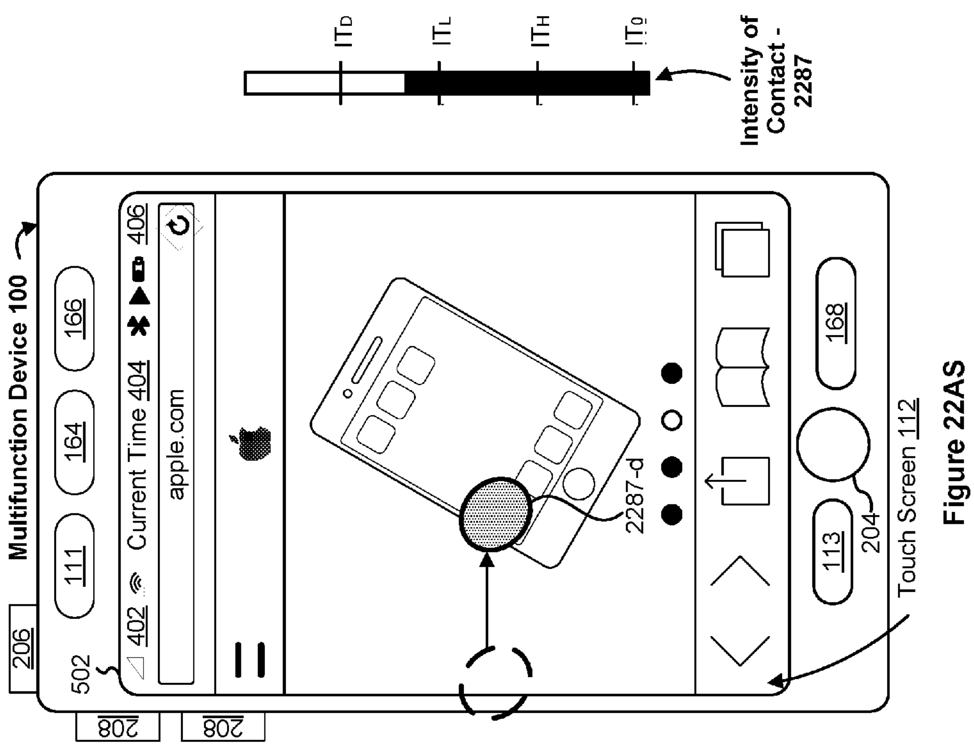
Figure 22A:
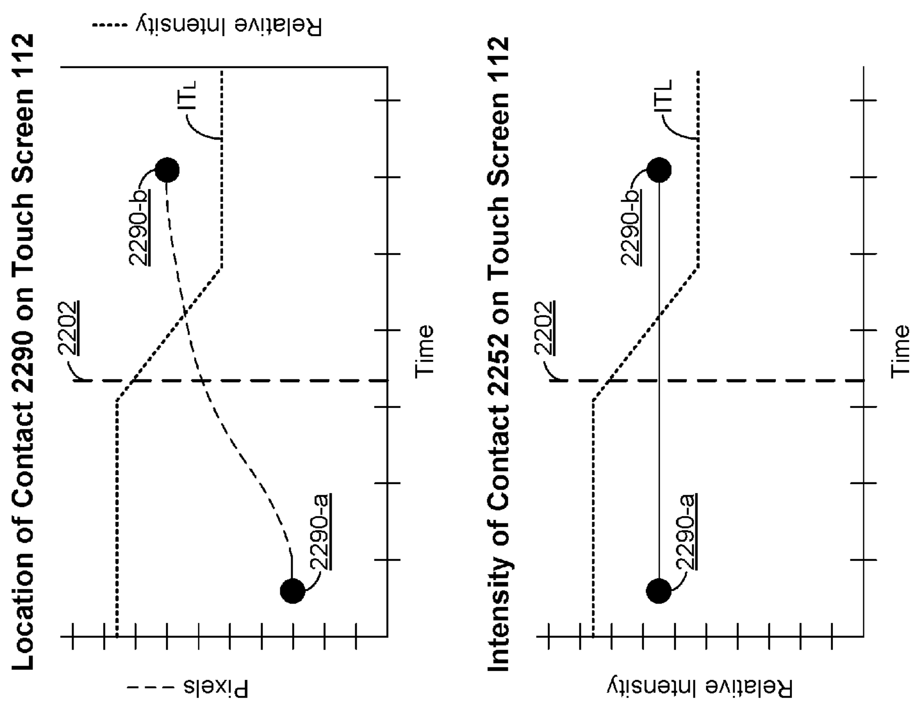
Figure 22A:
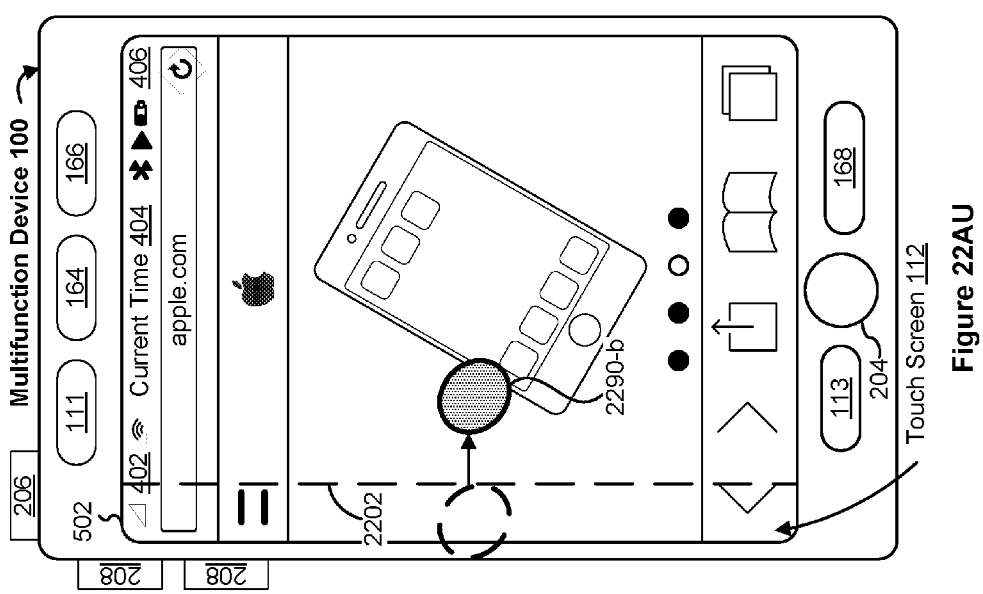
Figure 22A:
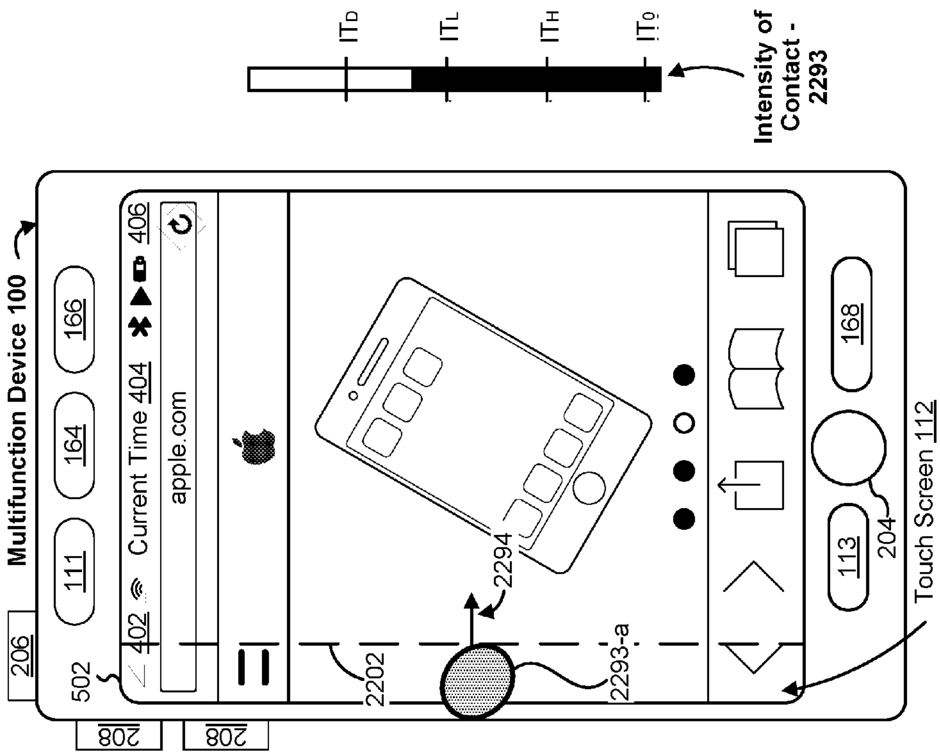
Figure 22A:
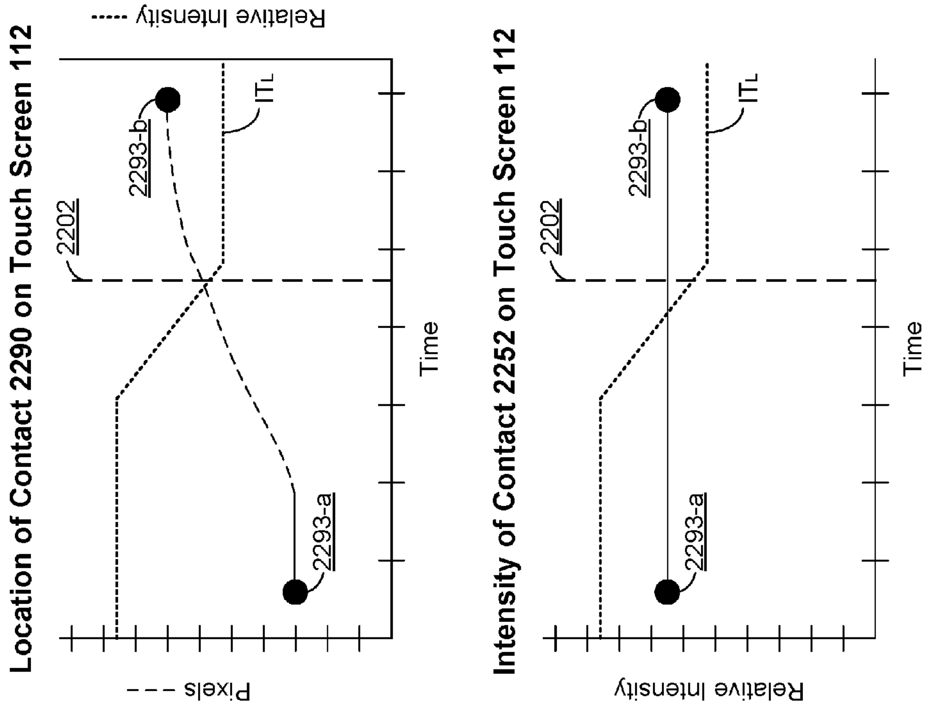
Figure 22A:
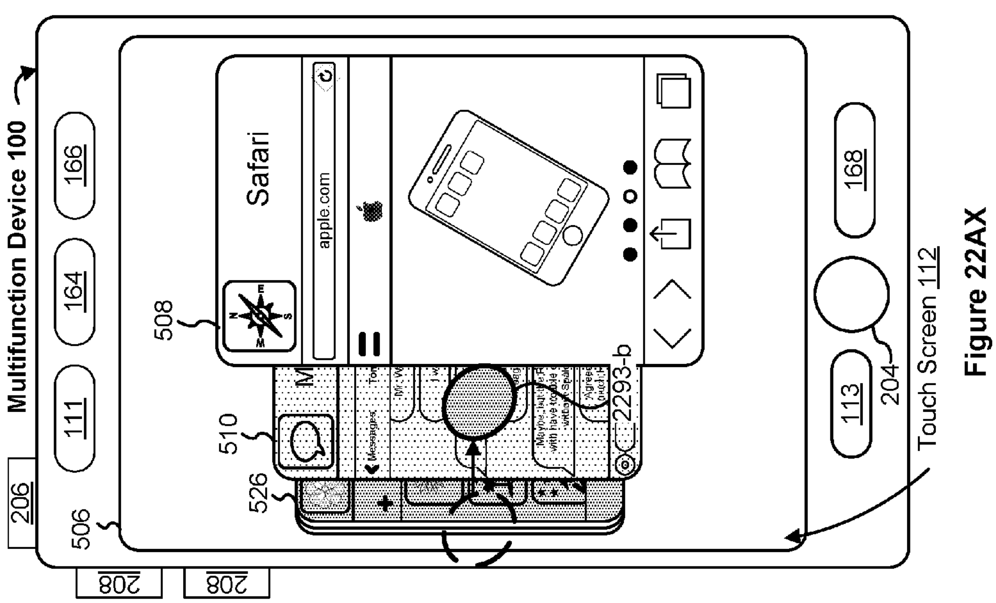
Figure 22B:
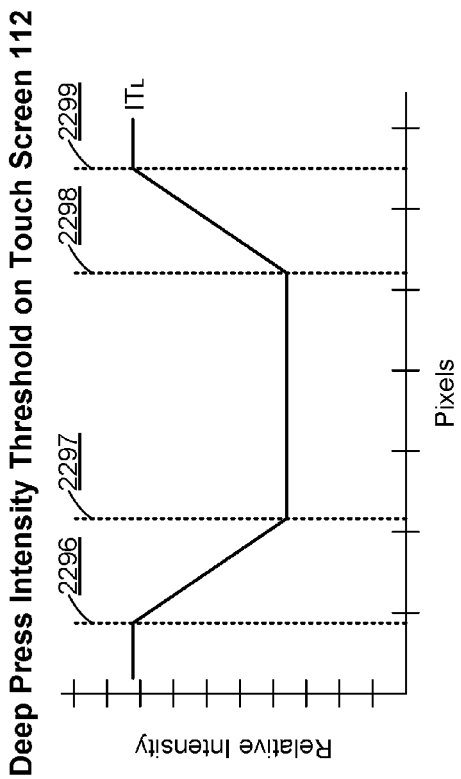
Figure 22A:
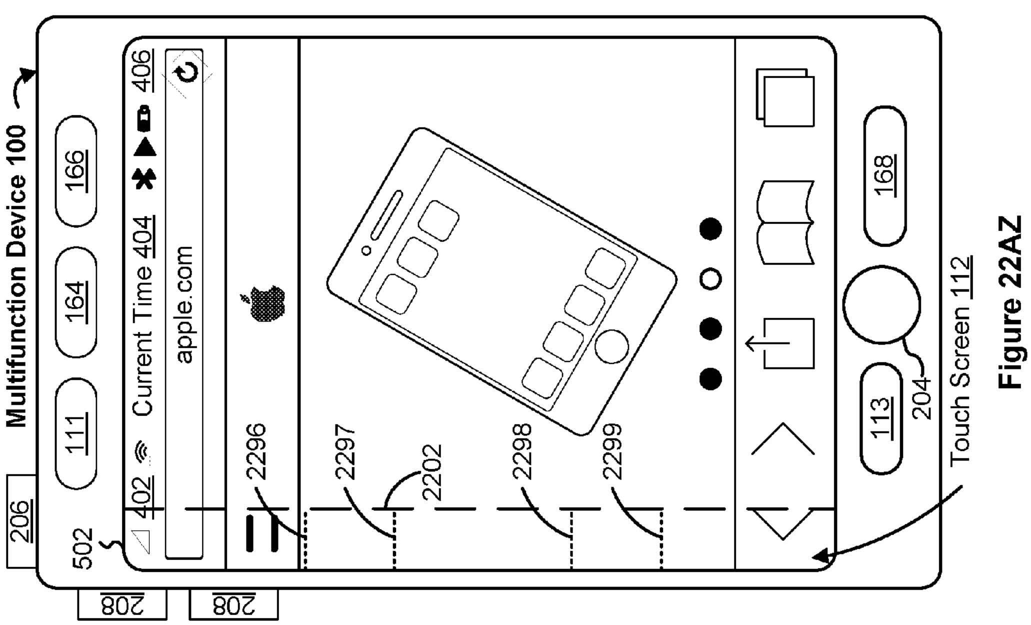

FIGS. 22S-22AA illustrate an embodiment where the device modifies the system-wide action positional boundaries when the contact is travelling faster on the touch screen, to allow a further buffer for user's who are rushing the gesture. When the gesture meets speed criteria and intensity criteria within buffer zone 250, the device still performs the system-wide action, as illustrated in FIGS. 22S-22U. Where the gesture does not meet all three criteria simultaneously, the device does not perform the system-wide action, as illustrated in FIGS. 22V-22X and 22Y-22AA.

FIGS. 22AB-22AG illustrate an embodiment where the gesture also includes a directional criteria. When the gesture meets the directional criteria, as illustrated in FIGS. 22AB-22AD, the device performs the system-wide action. When the gesture does not meet the direction criteria, as illustrated in FIGS. 22AE-22AG, the device does not perform the system-wide action.

FIGS. 22AH-22AO illustrate an embodiment where the system-wide action is still performed when the device first detects the input outside of the position boundary, but the contact is moved into the position boundary and then the intensity criteria is met, as illustrated in FIGS. 22AH-22AK, but not in FIGS. 22AL-22AO.

FIGS. 22AP-22AS illustrate an embodiment where the device locks out the system-wide action if the input is ever detected at a location outside of buffer zone 2286.

FIGS. 22AT-22AY illustrate an embodiment where the system-wide action intensity criteria is higher during a time period immediately following detection of the contact on the screen. Where the contact moves outside of the activation zone prior to achieving the higher intensity requirement, the device does not perform the system-wide action, as illustrated in FIGS. 22AT-22AU. Where the contact achieves the higher intensity requirement, or waits for the intensity threshold to drop, prior to moving outside of the activation zone, the device performs the system-wide action, as illustrated in FIGS. 22AW-22AY.

FIGS. 22AZ-22BA illustrate an embodiment where the system-wide action intensity criteria is higher near the top and bottom the of touch screen.

Figure 23A:
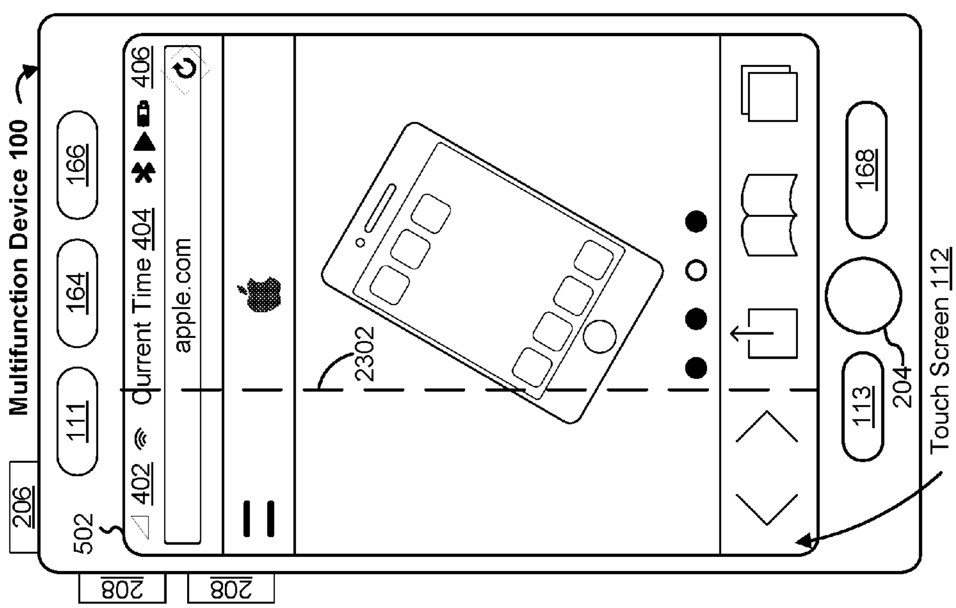
FIGS. 23A-23T illustrate exemplary user interfaces for invoking a user interface selection mode and for navigating between user interfaces in an application in accordance with some embodiments.

FIGS. 23A-23AT illustrate exemplary user interfaces for performing operations independent of an application (e.g., system-wide actions), such as navigating between user interfaces in accordance with some embodiments. In some embodiments, this is achieved by distinguishing how far a contact meeting activation criteria (e.g., as described with respect to method 2400 and FIGS. 22A-22BA above) travels across the touch screen.

The user interfaces in these figures are used to illustrate the processes described below, including the processes in FIGS. 10A-10H, 11A-11E, 12A-12E, 13A-13D, 14A-14C, 15, 24A-24F, and 25A-25H. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 23B:
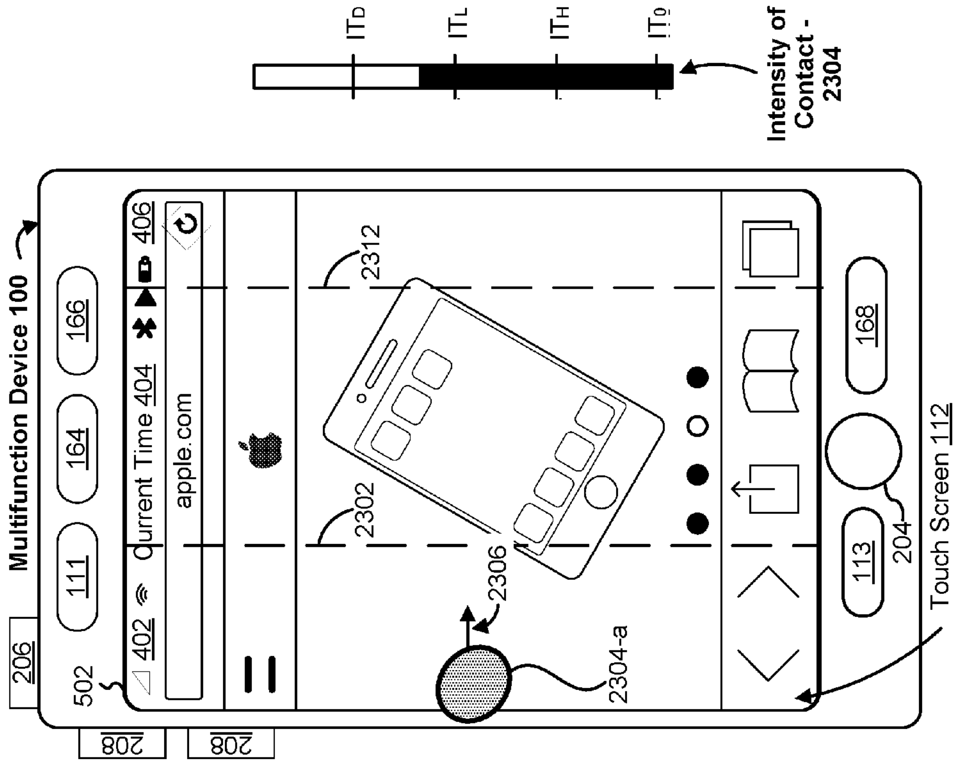
Figure 23C:
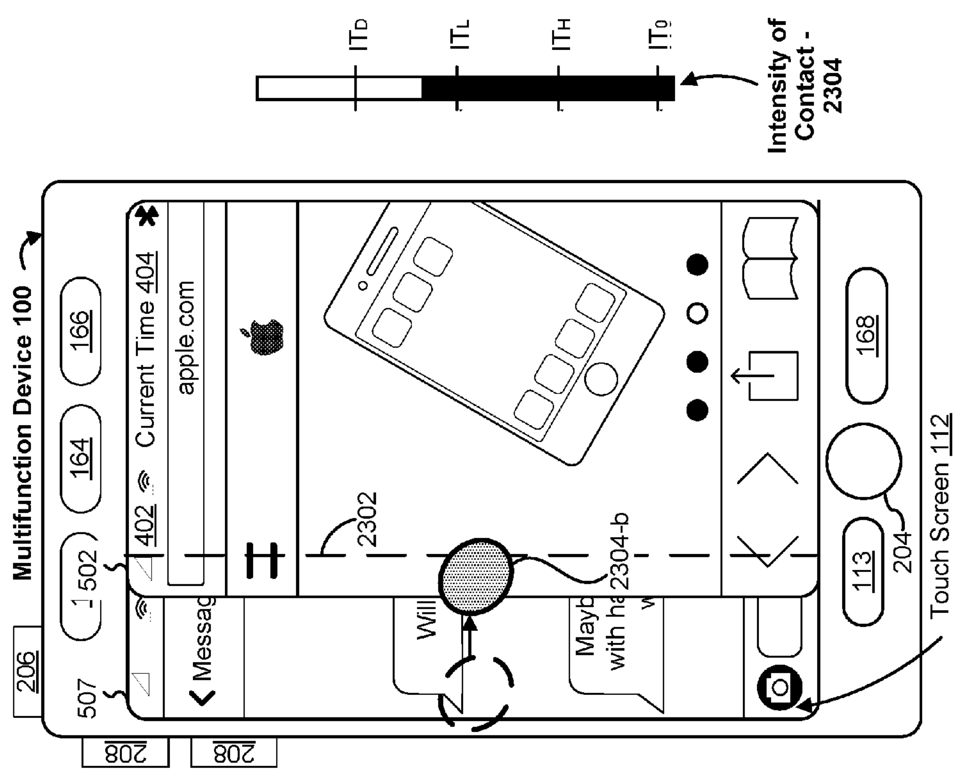
Figure 23D:
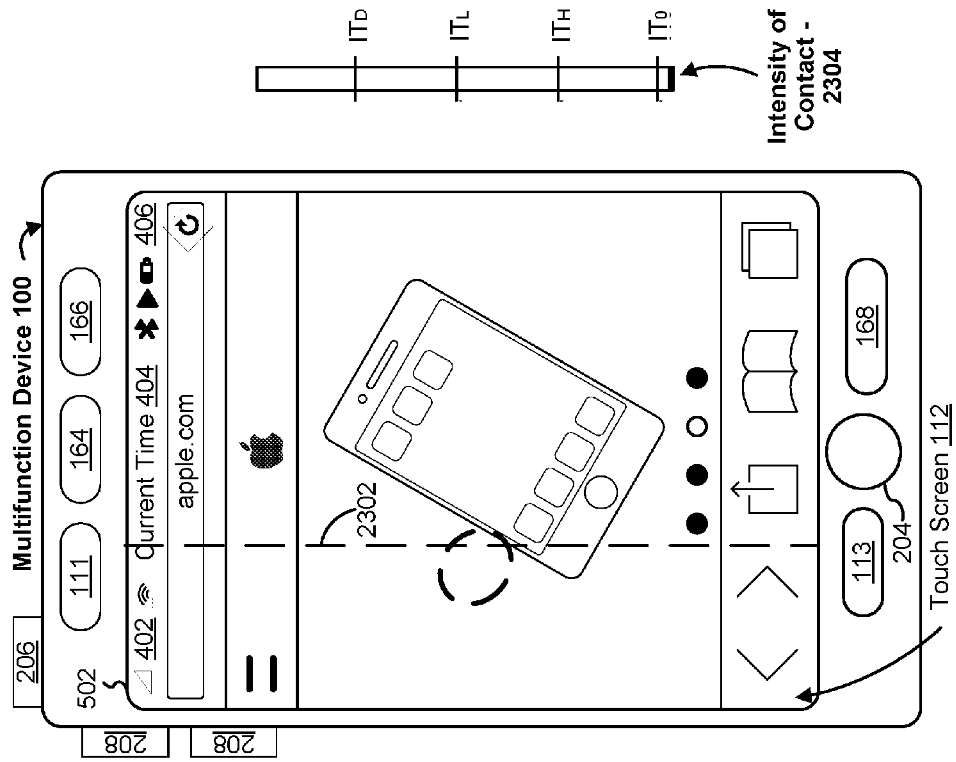
Figure 23E:
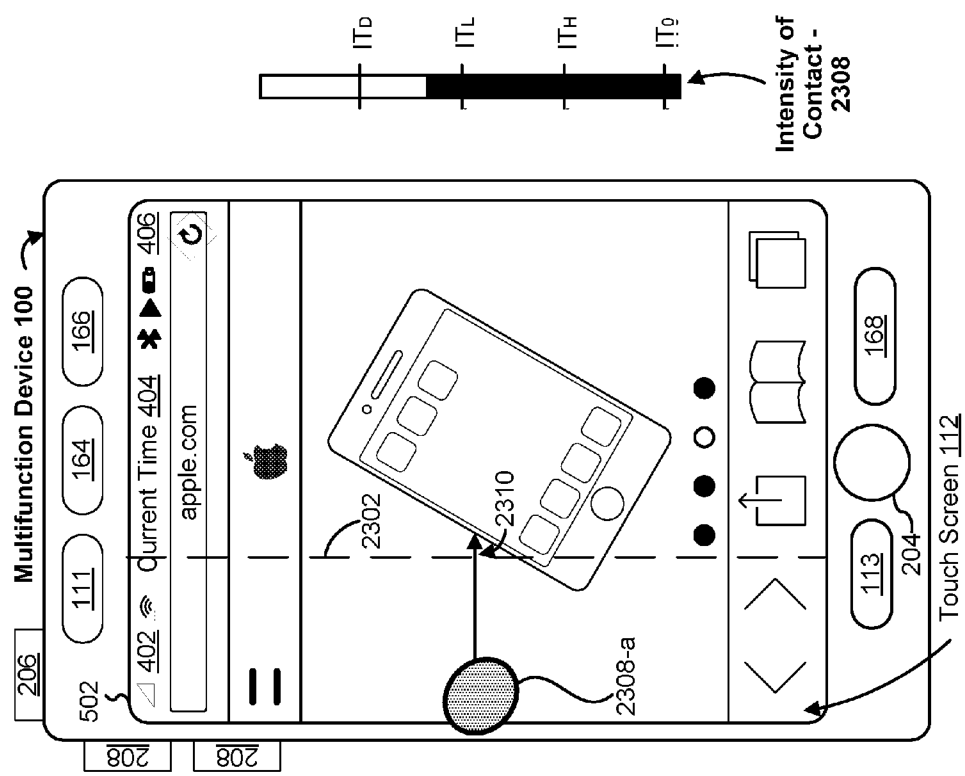
Figure 23F:
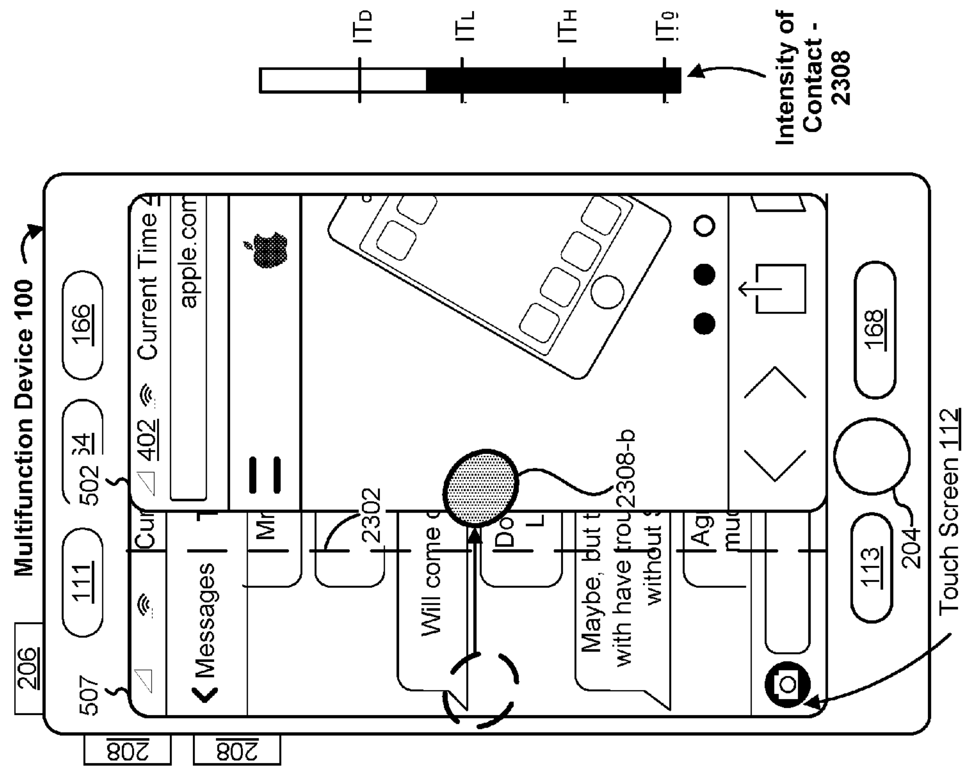
Figures 23G, 23H:
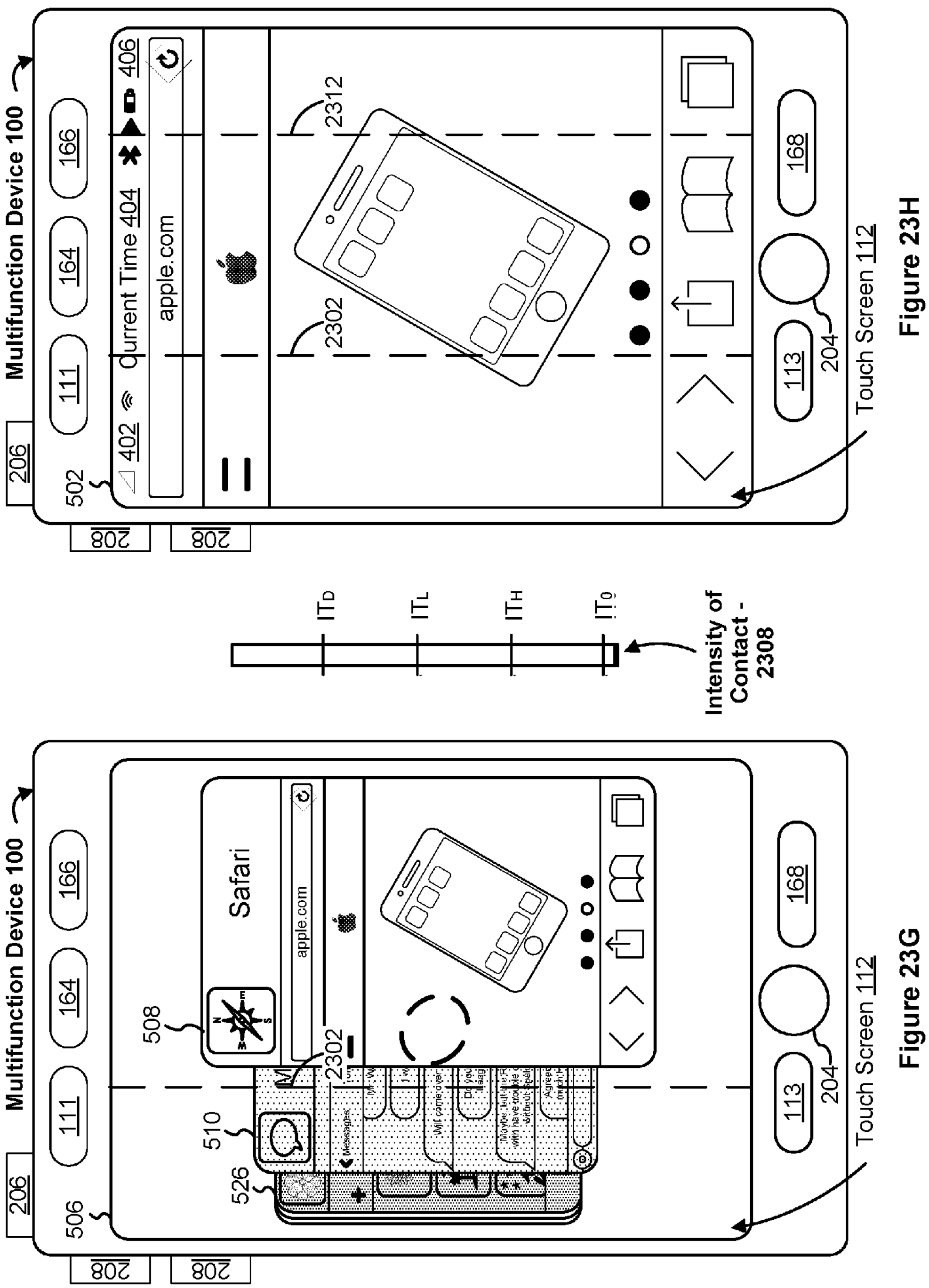
Figure 23J:
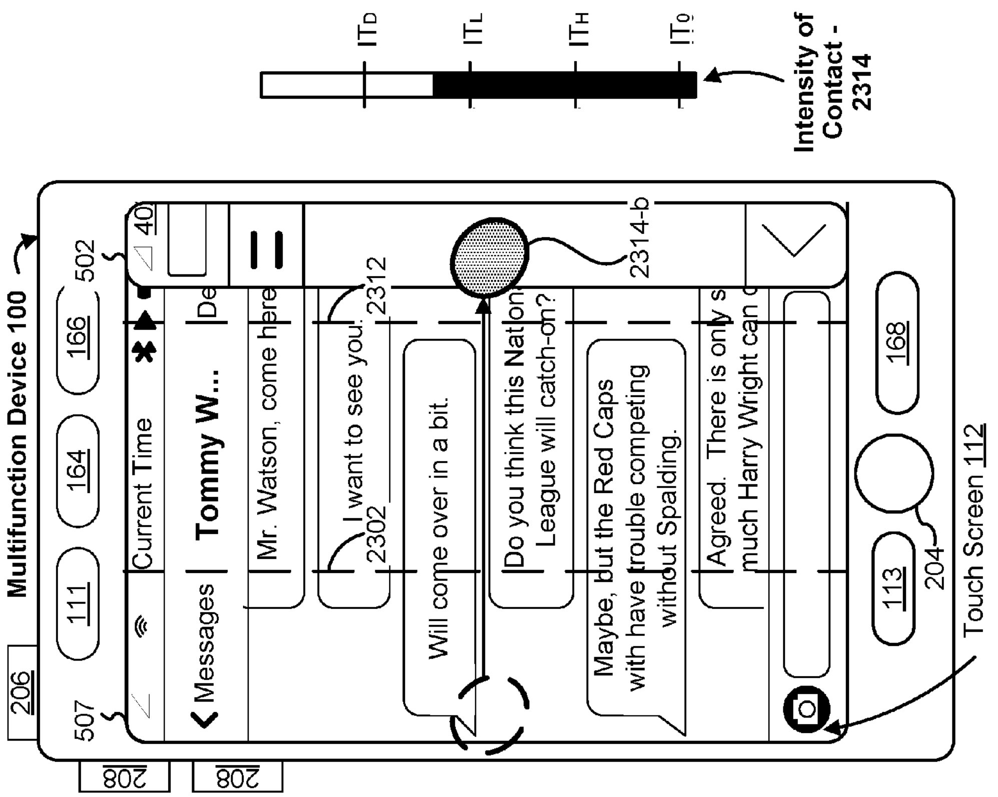
Figure 23I:
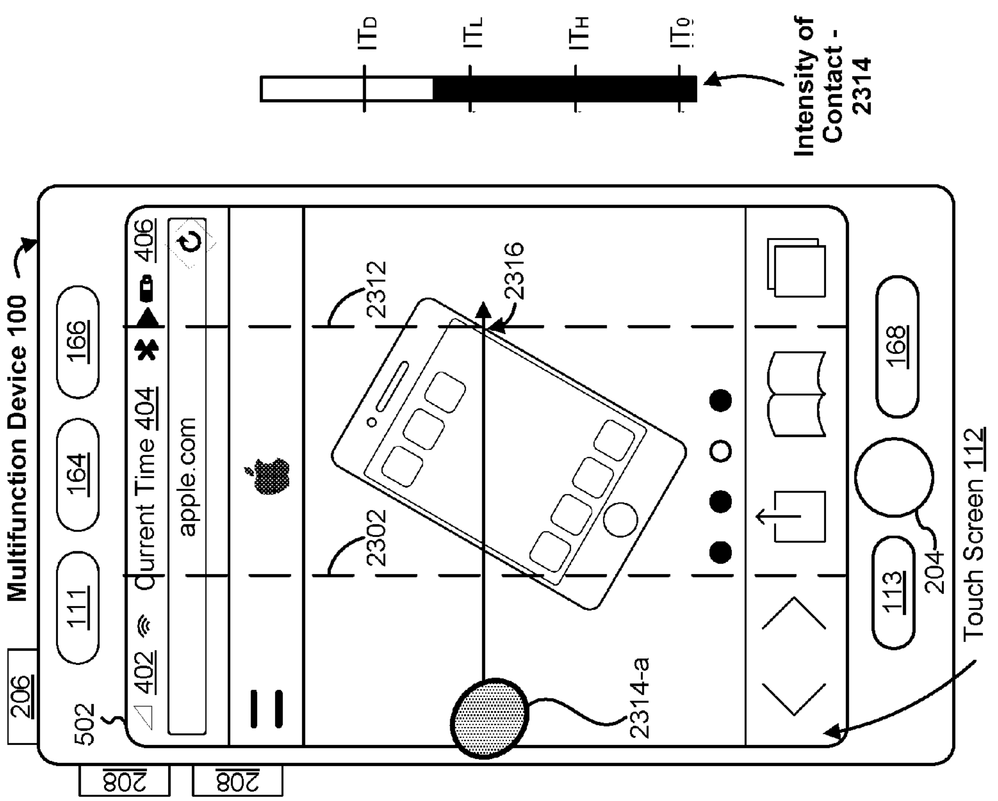
Figure 23L:
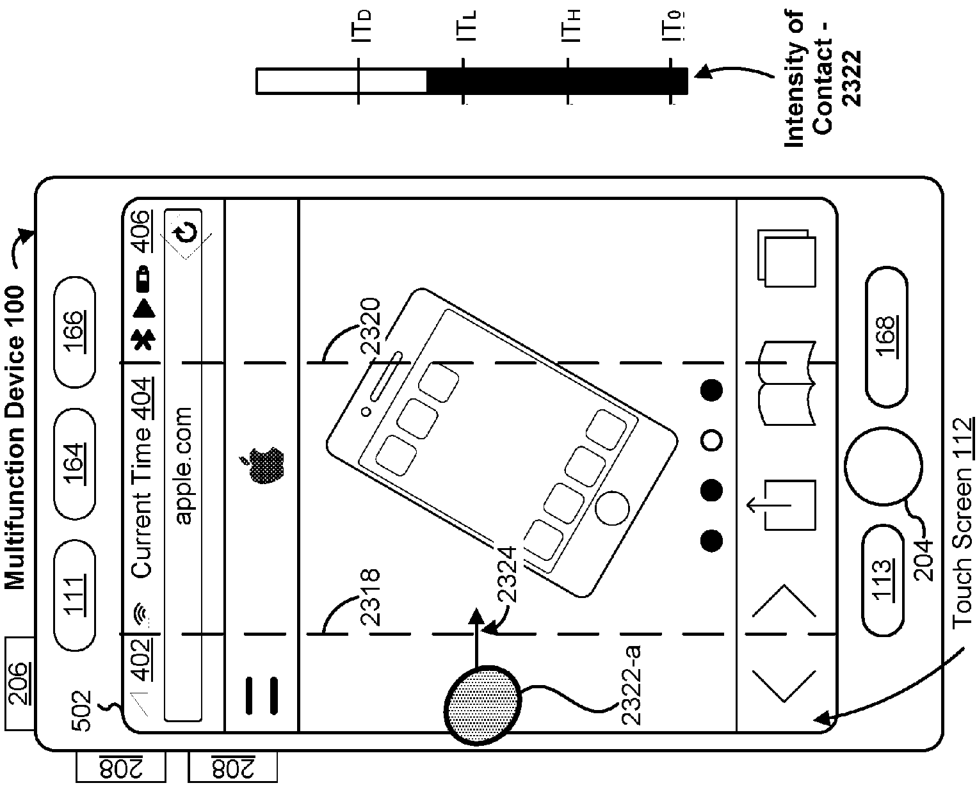
Figure 23K:
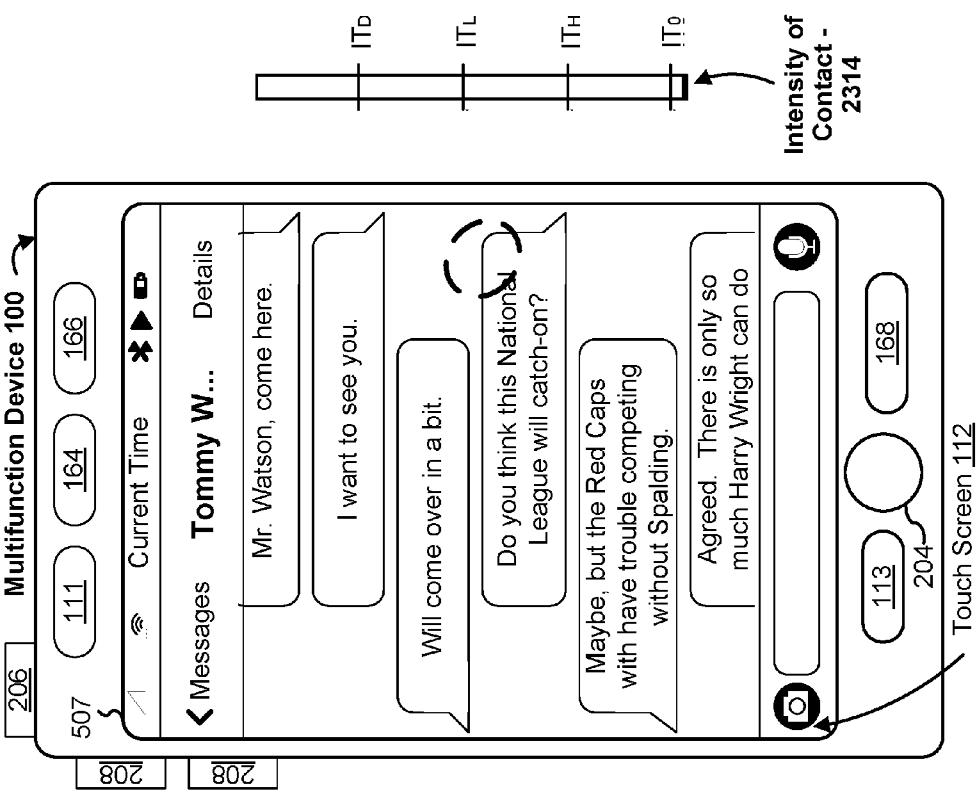
Figure 23N:
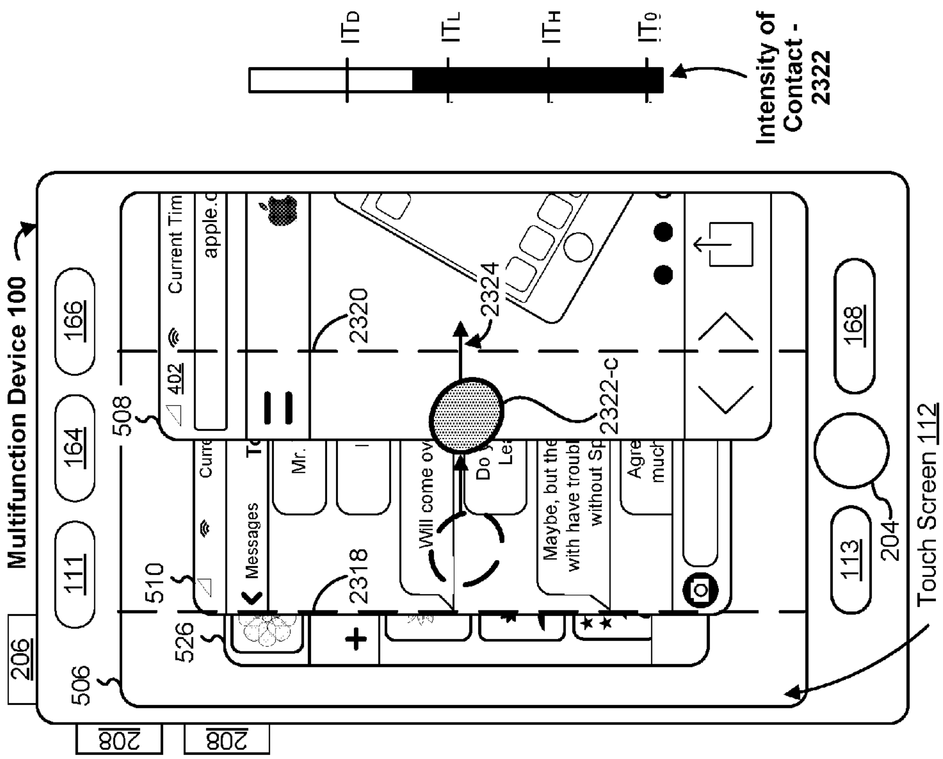
Figure 23M:
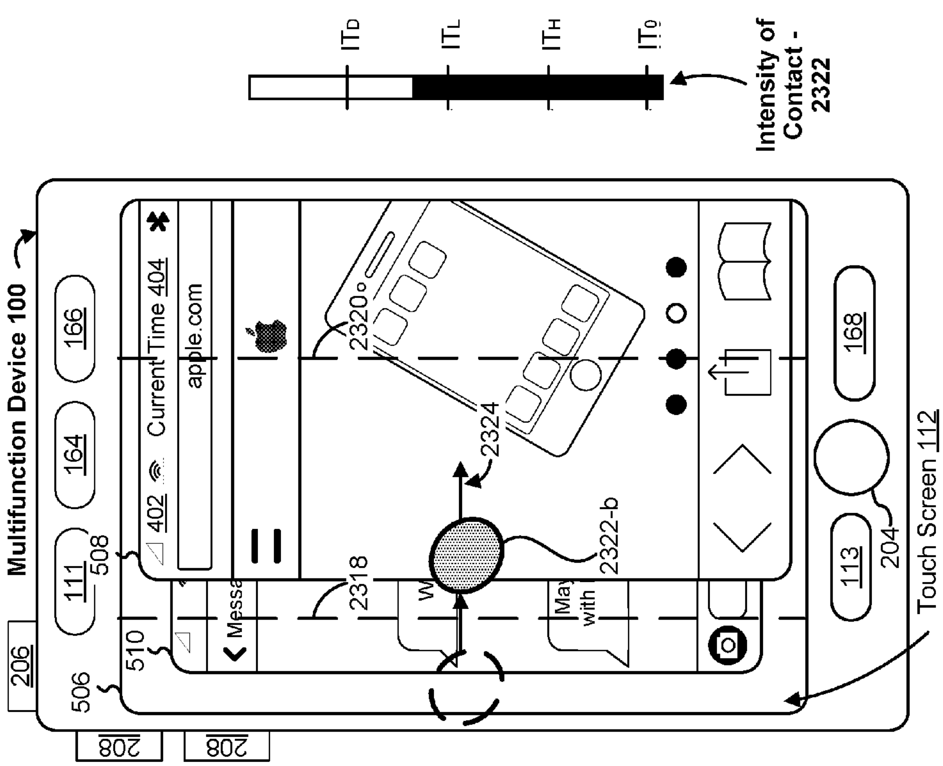
Figure 23P:
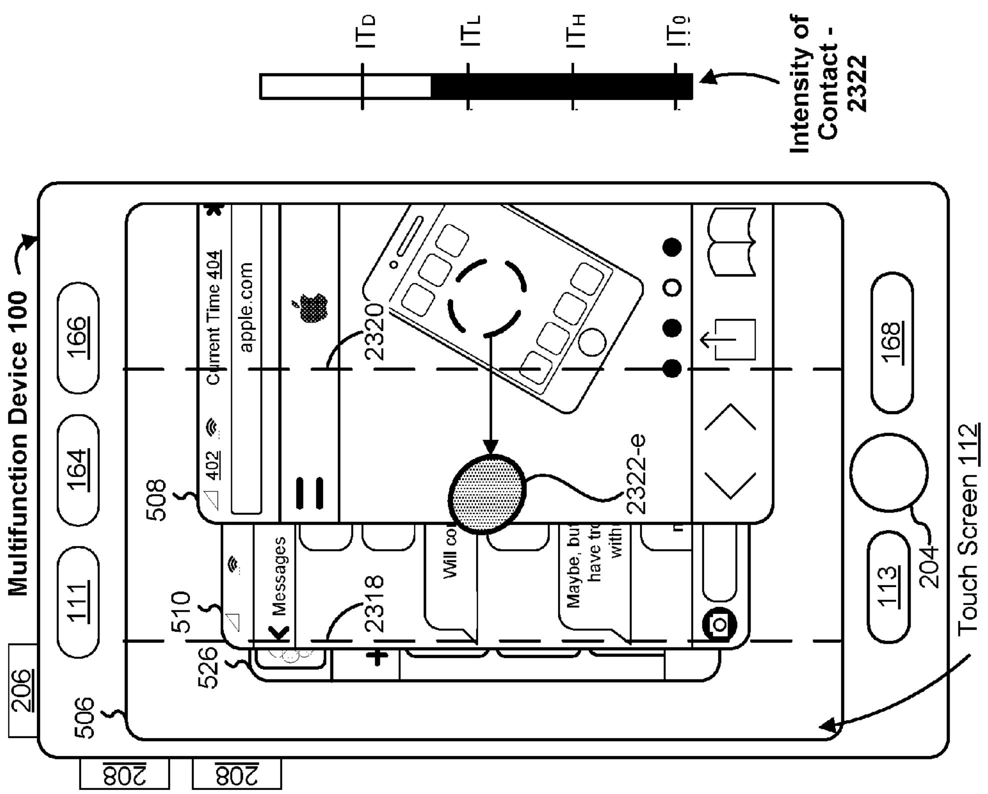
Figure 23O:
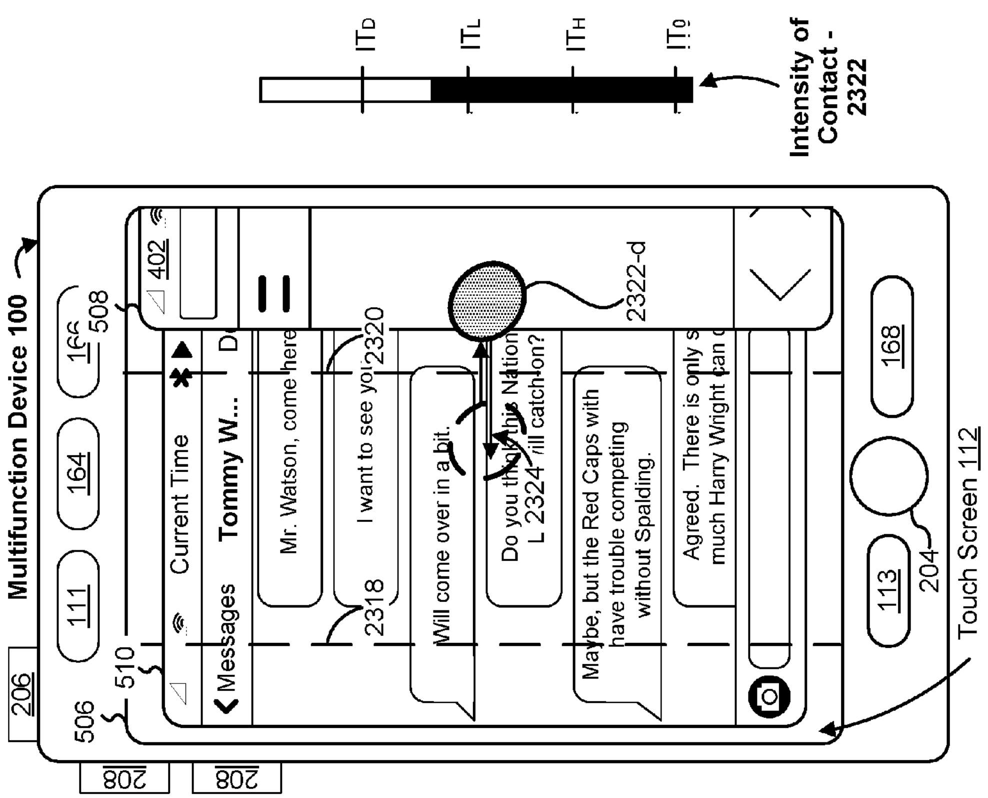
Figure 23R:
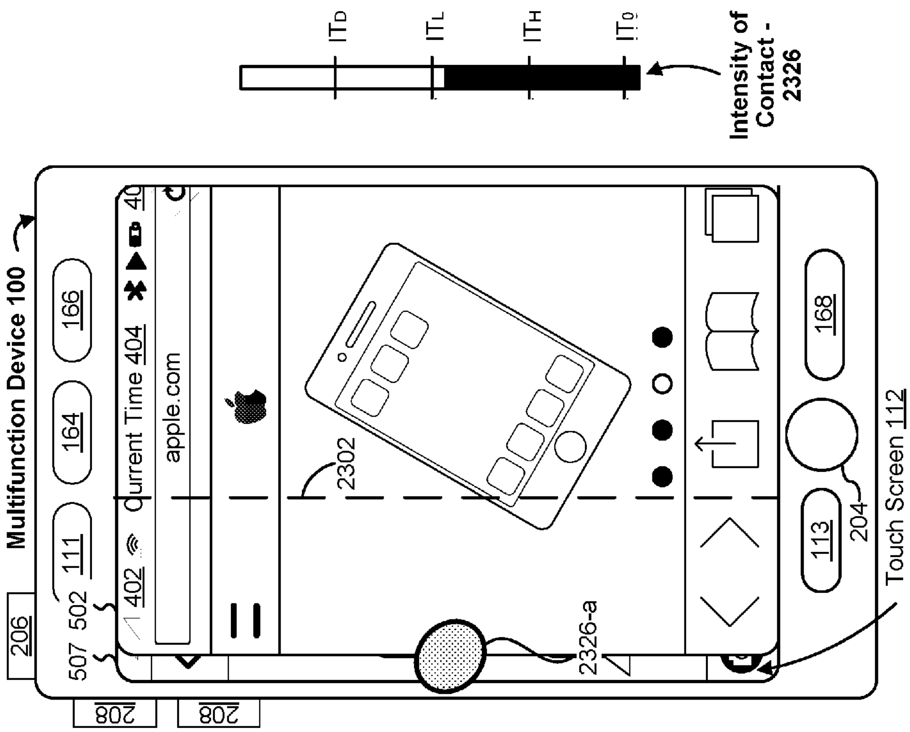
Figure 23Q:
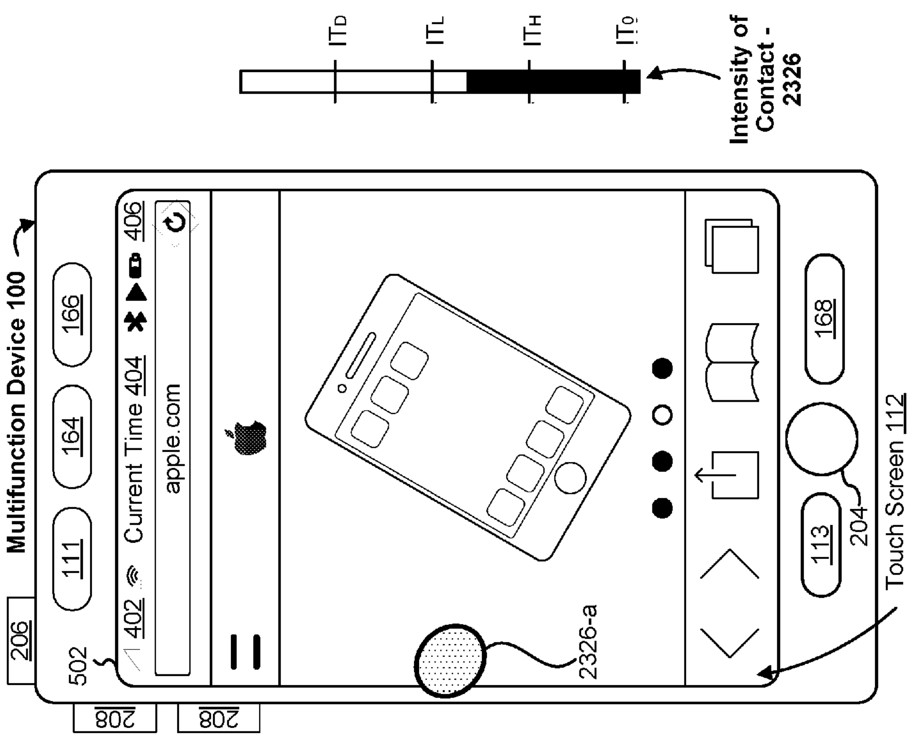
Figure 23T:
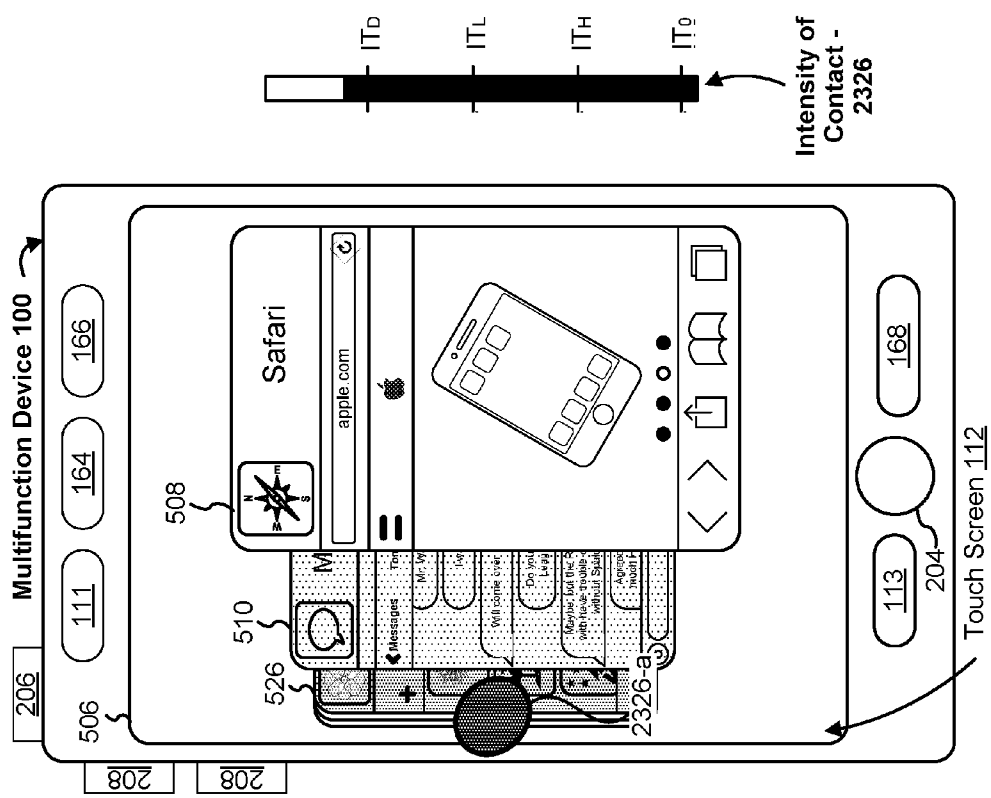
Figure 23S:
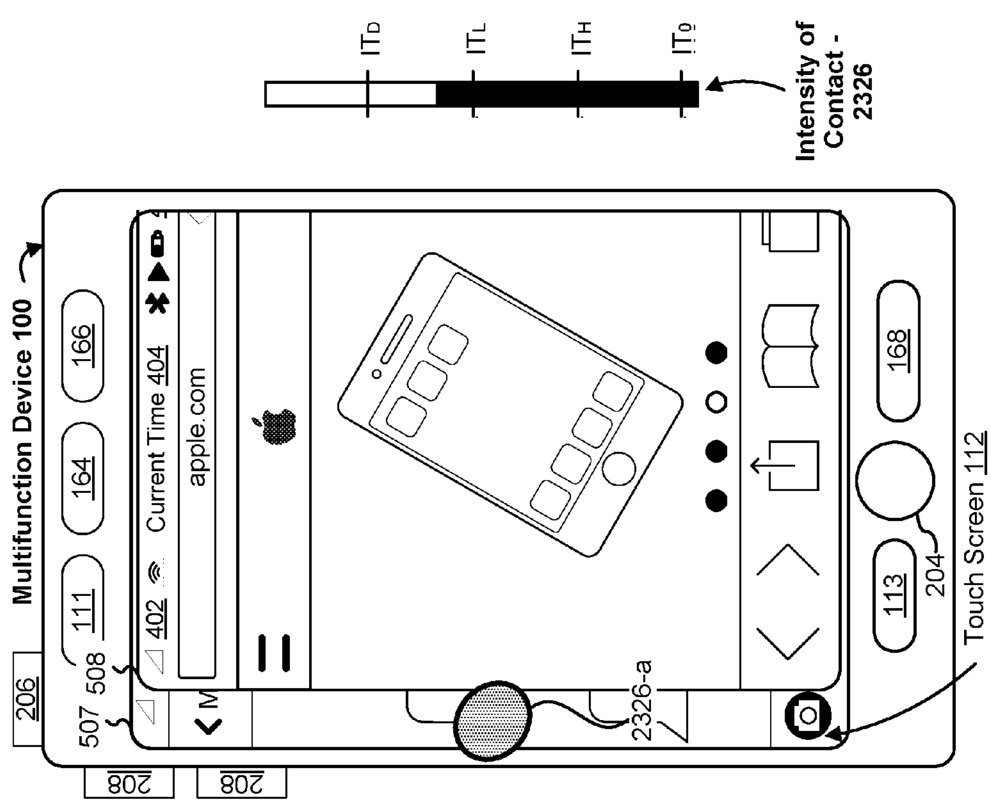
Figure 25A:
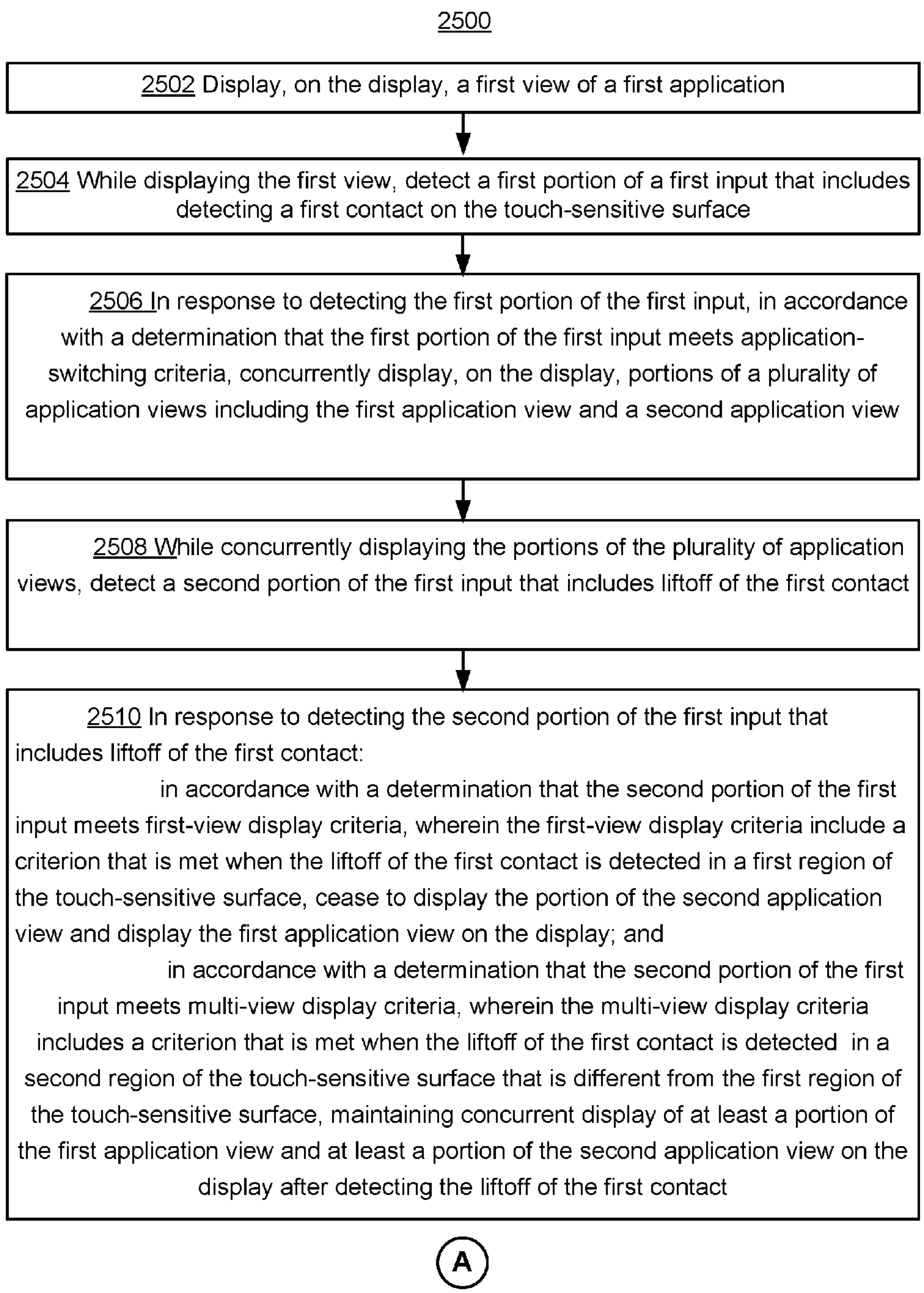

FIG. 23A illustrates a web browsing user interface 502 with positional boundaries 2302 and 2312. When a contact meeting system-wide action activation criteria does not cross boundary 2302, the device does not navigate to a new user interface upon termination of the input, as illustrated in FIGS. 23B-23D. When a contact meeting system-wide action activation criteria crosses boundary 2302, but not boundary 2312, the device navigates to a user interface selection mode, as illustrated in FIGS. 23E-23G. When a contact meeting system-wide action activation criteria crosses boundary 2302 and boundary 2312, the device navigates to the last user interface active on the device, as illustrated in FIGS. 23I-23K.

FIGS. 23L-23R illustrate an embodiment where the device provides visual feedback as the user approaches and crosses over positional boundaries 2302 and 2312. The feedback is dynamic and is reversed when the contact moves in the opposite direction on the touch screen.

FIGS. 23Q-23T illustrate an embodiment where the device provides a hint that the intensity of a contact is approaching the intensity threshold required to activate the system-wide action. For example, as the intensity of contact 2326 approaches intensity threshold $IT_L$, the device starts to slide active user interface 502 over to the right, revealing previously active user interface 507. In response to detecting further increase in the intensity of contact 2326 above intensity threshold 2326 in FIG. 23S, the device activates the system-wide action, allowing navigation between user interfaces (e.g., by sliding the contact into one of the three zones to the right. In response to detecting even further increase in the intensity of contact 2326 above deep press intensity threshold $IT_D$ in FIG. 23T, the device enters multitasking user interface selection mode, as indicated by replacement of web browsing user interface 502 with multitasking user interface 506 in FIG. 23Y.

FIGS. 10A-10H illustrate a flow diagram of a method 1000 of navigating between user interfaces in accordance with some embodiments. The method 1000 is performed at an electronic device (e.g., device 300, FIG. 3, or portable multifunction device 100, FIG. 1A) with a display and a touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 1000 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 1000 are, optionally, combined and/or the order of some operations is, optionally, changed.

As described below, the method 1000 provides an intuitive way to navigate between user interfaces. The method reduces the number, extent, and/or nature of the inputs from a user when navigating between user interfaces, thereby creating a more efficient human-machine interface. For battery-operated electronic devices, enabling a user to navigate between user interfaces faster and more efficiently conserves power and increases the time between battery charges.

In some embodiments, the device displays (1002) a first user interface on the display. For example, a user interface of an open application (e.g., user interface 502 for a web browsing application in FIGS. 5A-5B, 6A-6B, 6D, 6M, 6O, 6S-6T, 7A-7B, and 7O, user interface 616 for a web browsing application in FIG. 6P and 6U, user interface 507 for a messaging application in FIGS. 5CC, 6Q, 7F, 7J-7L, 8D, 8J, 9F, and 9H, or user interface 526 for image management application in FIG. 8R). The first user interface corresponds to a first user interface representation in a plurality of user interface representations. For example, as described further below, the user interface representations correspond to, in certain embodiments, user interfaces of open applications, current and previously viewed user interfaces of a single application (e.g., open user interfaces for a web browsing application, each displaying a same or different web site, or a history of previously viewed user interfaces for a web browsing application—e.g., corresponding to at least a partial browser history), messages in an e-mail chain, menu options in a menu hierarchy (e.g., a selection of files, such as audio and/or visual files for playback or streaming), etc.

While displaying the first user interface, the device detects (1004) a predetermined input. For example, a double-tap or double press on the "home" button on the device; or, for an electronic device that includes one or more sensors to detect intensity of contacts with a touch-sensitive display, a deep press on a predetermined area of the first user interface (e.g., an upper left corner); a deep press with the flat portion of a thumb anywhere on the first user interface; or a deep press on a predetermined area of the device, such as on the left edge of the touch-sensitive surface (e.g., a touch-sensitive display or touch-sensitive track pad separate from the display), in a predefined area adjacent to an edge (e.g., the left edge) of the touch-sensitive surface (e.g., touch-sensitive display). For example, a deep press on the bezel or a predetermined area of the bezel, such as the bezel adjacent to the left edge of the touch-sensitive surface (e.g., deep press 504 in FIG. 504, 608 in FIG. 6H, 612 in FIG. 6M, and 806 in FIG. 8K).

In response (1005) to detecting the predetermined input: the device enters (1006) a user interface selection mode, and displays (1008) a plurality of user interface representations in a stack with at least a portion of a first user interface representation visible and at least a portion of a second user interface representation visible. For example, in response to detecting deep press 504 in FIG. 5B, multifunction device 100 displays user interface representations 508 (corresponding to user interface 502 of a web browsing application, which was displayed on the screen when the initiating input was detected) and 510 (corresponding to user interface 507 of a messaging application) in FIGS. 5C and 5D.

In some embodiments, a representation of the user interface that was displayed on the screen immediately preceding entry into the user interface selection mode is displayed on the top of the stack, or as the first representation corresponding to an open application (e.g., when one or more representations of a home screen or transient application is also displayed upon entry of the user interface selection mode. For example, in FIG. 5C, user interface representation 508 (corresponding to user interface 502, which was displayed at the time deep press 504 was detected) is displayed above user interface representation 507 in the stack.

In some embodiments, a representation of the user interface that was displayed on the screen immediately preceding entry into the user interface selection mode is displayed below at least a second user interface representation (e.g., a representation for the user interface that was displayed immediately preceding display of the user interface that was displayed when the user interface selection mode was initiated). For example, in FIG. 5D, user interface representation 508 (corresponding to user interface 502, which was displayed at the time deep press 504 was detected) is displayed below user interface representation 507 in the stack.

In some embodiments, the device displays a second user interface on the display, where the second user interface corresponds to the second user interface representation of the plurality of user interface presentations (e.g., the representation of the user interface displayed when the user interface selection mode was initiated is displayed as the second representation in the stack, as illustrated in FIG. 5D). While displaying the second user interface, the device detects a predetermined input. In response to detecting the predetermined input: the device enters the user interface selection mode and displays the stack with at least a portion of the first user interface representation visible and at least a portion of the second user interface representation visible.

In some embodiments, in response to detecting the predetermined input for entering the user interface selection mode, at least a portion of a third user interface representation is visibly displayed. For example, in response to detecting deep press 504 in FIG. 5B, multifunction device 100 displays user interface representations 508, 510, and 526 (corresponding to user interface 524 of an image management application) in FIGS. 5E and 5F.

In some embodiments, the rest of the representations in the stack are either off-screen or are beneath the first, second, and optional third representations, which include visible information. For example, FIG. 5E illustrates indication 503 (e.g., an image of representation edges or actual edges of additional user interface representations) beneath third user interface representation 526 in FIGS. 5E and 5F.

In some embodiments, in response (1005) to detecting the predetermined input: the device ceases to display (1010) a status bar on the display. The status bar is displayed concurrently with a respective user interface prior to entering the user interface selection mode and displaying the stack. For example, status bar 503 is displayed on user interface 502 in FIG. 5A prior to the device entering the user interface selection mode. Upon detecting deep press 504 in FIG. 5B, the device enters the user interface selection mode (e.g., as indicated by display of the stack in FIG. 5E), which does not include display of status bar 503 in corresponding user interface 506, as illustrated in FIG. 5E. In some embodiments, as illustrated in FIG. 5C, the user interface for the user interface selection mode (e.g., user interface 506) includes display of a status bar (e.g., status bar 503).

In some embodiments, the status bar includes the current time, battery level, cellular signal strength indicator, WiFi signal strength indicator, etc. The status bar is usually displayed at all times with the user interface of an open application. In some embodiments, removal of the status bar provides an indication to a user that the stack in the user interface selection mode is not a regular user interface of an application, but a system user interface configured for navigation, selection, and management (e.g., closing) of the open applications on the device. In some embodiments, haptic feedback is provided when the user interface selection mode is entered.

Method 1000 includes that the device (e.g., multifunction device 100) displays (1012) a plurality of user interface representations in a stack on the display. In some embodiments, the plurality of user interface representations resemble a stack of cards (or other objects) in a z-layer order (e.g., positioned relative to each other along a z-axis substantially orthogonal to the plane of the display on the device to provide the effect that the cards are stacked one on top of another) that represent user interfaces of open applications, cards that represent current and previously viewed user interfaces of a single application, cards that represent messages in an e-mail chain, cards that represent different menu options in a menu hierarchy, etc. For example, FIGS. 5E and 5F illustrate a stack including representations 508, 510, and 526 of user interfaces of open applications. Representation 508 is displayed as the top card, representation 510 as the middle card, and representation 526 as the bottom card in a z-layer order. In some embodiments, the stack is displayed as a substantially two-dimensional representation (although still with a z-layer order of cards in some embodiments), for example, as illustrated in FIG. 5E. In some embodiments, the stack is displayed as a substantially three-dimensional representation, for example, as illustrated in FIG. 5F.

At least a first user interface representation (e.g., a card representing the application that was being displayed immediately prior to displaying the stack in a user interface selection mode, such as a mode for selecting among open applications, a mode for selecting among user interfaces in a single open application, or a mode for selecting from among menu items in a menu (e.g., a menu in a menu hierarchy for a set-top box, etc.)) and a second user interface representation (e.g., a card representing another open application, a transient application, or a home screen or application springboard) disposed above the first user interface representation in the stack are visible on the display. For example, first user interface representation 510 is displayed as below second user interface representation 508 in FIGS. 5E-5F.

The second user interface representation is offset from the first user interface representation in a first direction (e.g., laterally offset to the right on the display). For example, second user interface 508 is offset to the right of the center of first user interface representation 510 in FIG. 5E-5F.

The second user interface representation partially exposes the first user interface representation. In some embodiments, representations in the stack are partially spread out in one direction on the display (e.g., to the right, as shown in FIGS. 5E-5F). In some embodiments, at a given time, information (e.g., an icon, title, and content for the corresponding user interface) for a predetermined number of the representations (e.g., 2, 3, 4, or 5 representations) in the stack is visible, while the rest of the representations in the stack are either off-screen or are beneath the representations that include visible information. In some embodiments, the representations that are beneath the representations that include visible information are stacked together so closely that no information is displayed for these representations. In some embodiments, the representations that are beneath the representations that include visible information are stylistic representations, such as just generic edges 503 of these representations, as shown in FIGS. 5E-5F.

In some embodiments, a respective user interface representation has a corresponding position in the stack (1014). For example, user interface representation 508 has a corresponding first position in the stack, user interface representation 510 has a corresponding second position in the stack, and user interface representation 526 has a corresponding third position in the stack, as illustrated in FIG. 5P.

In some embodiments, for a respective user interface representation that is visible on the display: the device determines (1016) a respective relative z-position of the user interface representation as compared to one or more other user interface representations that are concurrently visible on the display; and applies (1018) a level of blurring to the user interface representation in accordance with the relative z-position (e.g., relative height in the z-dimension, or relative z-layer level in the stack) of the user interface representation as compared to the one or more other user interface representations that are concurrently visible on the display.

For example, in some embodiments, upon entering an application selection mode, the stack of user interface representations represent a stack of open applications, the lower lying user interface representations correspond to open applications that have not been viewed for longer periods of time, and more blurring is applied to the user interface representations for those applications than to the user interface representations of the more recently viewed open applications. In some embodiments, the user interface representation for the most recently viewed application is not blurred; the user interface representation for the next most recently viewed application is blurred by a first amount; user interface representations for still earlier open applications are blurred by a second amount that is greater than the first amount; and so on. For example, as illustrated in FIG. 5P, device 100 applies little or no blurring to user interface representation 508 because the card has a first relative z-position on top of the cards concurrently visible on touch screen 112. Device 100 applies moderate blurring to user interface representation 510 because the card has a second relative z-position in the middle of the cards concurrently visible on touch screen 112. Device 100 applies substantial blurring to user interface representation 526 because the card has a third relative z-position at the bottom of the cards concurrently visible on touch screen 112.

In some embodiments, a respective user interface representation has a corresponding simulated absolute z-position in the stack. For a user interface representation that is visible on the display, the device applies (1020) a level of blurring to the user interface representation in accordance with the corresponding simulated absolute z-position of the user interface representation in a z-dimension.

For example, in some embodiments, the z-dimension is the dimension that is perpendicular (e.g., substantially orthogonal) to the plane of the display, or the lateral directions of the space represented on the display. In some embodiments, the level of blurring applied to each of the user interface representations visible on the display is determined based on the simulated absolute z-position of the user interface representation. In some embodiments, the variation in the level of blurring applied to each user interface representation is gradual and directly correlated to the current simulated absolute z-position of the user interface representation. In some embodiments, the stack of user interface representations move on a concave down increasing x-z curve in the x-direction, and the gap between each pair of adjacent user interface representations in the z-direction is maintained at a constant value during the movement of the user interface representations along the x-z curve in the x-direction.

In some embodiments, a respective user interface representation is associated with a respective title area (e.g., a title bar, such as title bar 512 associated with user interface representation 508 in FIG. 5C and title bar 520 associated with user interface representation 510 in FIG. 5D) with respective title content (e.g., the title area includes an icon (e.g., icon 516 in FIG. 5C and icon 518 in FIG. 5D) and a name of the application (or web page, menu, etc., such as "Safari" 514 in FIG. 5C and "Messages" 520 in FIG. 5D) represented by the user interface representation). In some embodiments, for a user interface representation currently visible below an adjacent user interface representation on the display, the device applies (1022) a visual effect (e.g., blurring, fading, and/or clipping, as shown in FIG. 5DD) to at least a first portion (e.g., only the title text portion of the title content, e.g., fading of "Photo" 532 in FIG. 5DD, or both the title text and the icon in the title content, e.g., fading of both "Photo" 532 and icon 528 in FIG. 5DD) of the title content of the user interface representation as the adjacent user interface representation approaches (e.g., as user interface representation 510 slides over user interface representation 526 in FIG. 5DD).

In some embodiments, the device applies (1024) the visual effect to title text in the title content while maintaining an original appearance of an icon in the title content, as the title area of an adjacent user interface representation or the adjacent user interface representation moves within a threshold lateral distance on the display of the title content. For example, "Photo" 532 fades away in FIG. 5DD as user interface representation 510 moves to location 510-b, near "Photo" 532, prior to icon 526 fading away).

In some embodiments, the stack includes (1026) user interface representations for a home screen (e.g., representations of any of one or more user interfaces accessible immediately after the startup of the device, such as a notification center, a search UI, or a springboard or dashboard showing applications available on the device, such as representation 554 of user interface 552 of a home screen in FIG. 5Q), zero or more transient application user interface representations (e.g., representations of a user interface for an incoming or ongoing telephone or IP call session (e.g., user interface representation 554 of user interface 556 for an incoming telephone call in FIG. 5W), a user interface showing a handoff of one or more application sessions from a different device, a user interface for recommending an application, a user interface for a printing session, etc.), and one or more open application user interface representations (e.g., representations of the current application being viewed just before entering the user interface selection mode, the prior application before the current application, and other earlier open applications, (e.g., user interface representations 508, 510, and 526 in FIGS. 5E-5F).

As used in the specification and claims, the term "open application" refers to a software application with retained state information (e.g., as part of device/global internal state 157 and/or application internal state 192). An open application is any one of the following types of applications:

- an active application, which is currently displayed on display 112 (or a corresponding application view is currently displayed on the display);
- a background application (or background process), which is not currently displayed on display 112, but one or more application processes (e.g., instructions) for the corresponding application are being processed by one or more processors 120 (i.e., running);
- a suspended application, which is not currently running, and the application is stored in a volatile memory (e.g., DRAM, SRAM, DDR RAM, or other volatile random access solid state memory device of memory 102); and
- a hibernated application, which is not running, and the application is stored in a non-volatile memory (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application, which was an active application when displayed, may become a background application, suspended application, or hibernated application, but the first application remains an open application while its state information is retained by the device.

In some embodiments, in z-layer order, the user interface representations for a home screen are displayed above the transient application user interface representations, which in turn are displayed above the open application user interface representations. As used herein, a "z-layer order" is the front-to-back order of displayed objects (e.g., user interface representations). Thus, if two objects overlap, the object that is higher in the layer order (e.g., the object that is "on top of," "in front of," or "above") is displayed at any points where the two objects overlap, thereby partially obscuring the object that is lower in the layer order (e.g., the object that is "beneath," "behind," or "in back of" the other object). The "z-layer order" is sometimes also called the "layer order," "z order," or "front-to-back object order."

In some embodiments, the transient application user interface representations include (1028) a telephony interface representation for an active call or a missed call, a continuity interface representation for a suggested application, a continuity interface representation for a hand-off from another device, and a printer interface representation for an active print job.

Method 1000 also includes that the device detects (1030) a first drag gesture by a first contact at a location on the touch-sensitive surface that corresponds to a location of the first user interface representation on the display (e.g., device 100 detects a drag gesture including contact 530 and movement 532 on touch screen 112 at a location corresponding to display of user interface representation 510 in FIG. 5G), the first contact moving across the touch-sensitive surface in a direction that corresponds to the first direction on the display (e.g., movement 532 of contact 530 moves across touch screen 112 from left to right in FIGS. 5G-5I).

While the first contact is at a location on the touch-sensitive surface that corresponds to the location of the first user interface representation on the display and moving across the touch-sensitive surface in a direction that corresponds to the first direction on the display (1032): the device moves (1034) the first user interface representation (e.g., user interface representation 510 in FIGS. 5G and 5R) in the first direction on the display at a first speed in accordance with a speed of the first contact on the touch-sensitive surface. For example, on a touch-sensitive display (e.g., touch screen 112), the card or other representation under the finger contact moves with the same speed as the finger contact (e.g., user interface representation 510 moves with the same speed as contact 530 in FIGS. 5G-5I, and user interface representation 510 moves with the same speed as contact 556 in FIGS. 5R-5, as illustrated by the constant positional relationship between the display of the user interface representation and the contact on touch screen 112). On a display coupled to a track pad, the card or other representation at the location corresponding to the location of the contact moves at an onscreen speed that corresponds to (or is based on) the speed of the finger contact on the track pad. In some embodiments, a focus selector is shown on the display to indicate the onscreen location that corresponds to the location of the contact on the touch-sensitive surface. In some embodiments, the focus selector may be represented by a cursor, a movable icon, or visual differentiators that separates an onscreen object (e.g., a user interface representation) from its peers that do not have the focus.

While the first contact is at a location on the touch-sensitive surface that corresponds to the location of the first user interface representation on the display and moving across the touch-sensitive surface in a direction that corresponds to the first direction on the display (1032): the device also moves (1036) the second user interface representation (e.g., user interface representation 508 in FIGS. 5G and 5R), disposed above the first user interface representation, in the first direction at a second speed greater than the first speed.

In some embodiments, the first direction is rightward. In some embodiments, the first speed is the same speed as the current speed of the contact. In some embodiments, this movement of the first user interface representation creates a visual effect that the finger contact is grabbing and dragging the first user interface representation. At the same time, the second user interface representation is moving faster than the first user interface representation. This faster movement of the second user interface representation creates the visual effect that as the second user interface representation moves in the first direction towards the edge of the display, an increasingly larger portion of the first user interface representation is revealed from underneath the second user interface representation. For example, as second user interface representation 508 moves towards the right on the display with greater speed than does first user interface representation 510, more of user interface representation 510 is revealed when displayed at location 510-b than when displayed at location 510-a, prior to the movement to the right, as illustrated in FIGS. 5G-5H. In combination, these two concurrent movements enable a user to see more of the first user interface representation before deciding whether to select and display the corresponding first user interface.

In some embodiments, the stack includes at least a third user interface representation disposed below the first user interface representation (e.g., user interface representation 526 in FIGS. 5E-5F). The first user interface representation is offset from the third user interface representation in the first direction (e.g., user interface 510 is offset to the right of user interface representation 526 in FIGS. 5E-5F). The first user interface representation partially exposes the third user interface representation. While the first contact is at a location on the touch-sensitive interface that corresponds to the first user interface representation on the display and the first contact is moving across the touch-sensitive surface in a direction that corresponds to the first direction on the display: the device moves (1038) the third user interface representation, disposed below the first user interface representation, in the first direction at a third speed less than the first speed.

For example, the third user interface representation, below the first user interface representation (e.g., the card under the finger contact), moves at a slower speed than the first user interface representation, such that more of the third user interface representation is exposed as the finger contact moves across the touch-sensitive surface in a direction that corresponds to the first direction on the display. For example, FIG. 5O illustrates representative speeds of user interface representations 508 (e.g., second user interface representation), 510 (e.g., first user interface representation), and 526 (e.g., third user interface representation) relative to movement 532 of contact 530 in FIGS. 5G-5I.

In some embodiments, at the same time, one or more user interface representations below the third user interface representation are revealed as the third user interface representation moves in the first direction (e.g., to the right). For example, user interface representations 534 and 540 are revealed as third user interface representation 526 moves to the right in response to detection of a user input including contact 530 and movement 532, as shown in FIGS. 5H-5I).

In some embodiments, a difference between the second speed and the first speed maintains (1040) a first constant z-position difference between the second user interface representation and the first user interface representation. A difference between the first speed and the third speed maintains a second constant z-position difference between the first user interface representation and the third user interface representation. The first constant z-position difference is the same as the second z-position difference. In some embodiments, the cards travel on a concave down increasing x-z curve, where the z-spacing between adjacent cards is maintained as the cards move to along the x-direction. Because the slope of the curve decreases with increasing x positions, the cards move at higher and higher speeds in the x-direction as their current x-positions increase.

In some embodiments, a difference between the second speed and the first speed is equal to a difference between the first speed and the third speed (1042).

In some embodiments, a ratio between the second speed and the first speed is equal to a ratio between the first speed and the third speed (1044).

In some embodiments, while moving the third user interface representation disposed below the first user interface representation at the third speed (1046) in the first direction (e.g., moving user interface representation 526 to the right on touch screen 112 at a relative speed less than the speed user interface 510 is travelling to the right (e.g., as illustrated in FIG. 5O) in FIGS. 5G-5I): the device reveals (1048) an increasingly larger portion of a fourth user interface representation disposed below the third user interface representation in the stack on the display (e.g., user interface 534 is gradually revealed from behind user interface representation 526 in FIGS. 5G-5I).

In some embodiments, the device then moves (1050) the fourth user interface representation disposed below the third user interface representation at a fourth speed that is less than the third speed in the first direction. In some embodiments, one or more user interface representations disposed below the fourth user interface representation in the stack are revealed (e.g., user interface representation 540, as in FIGS. 5I and 5T) in this manner too, as the higher-up user interface representations move in the first direction.

In some embodiments, after detecting the first drag gesture (e.g., drag gesture including contact 530 and movement 532 in FIGS. 5G-5I), the device detects (1052) a second drag gesture by a second contact on the touch-sensitive surface at a location that corresponds to the first user interface representation on the display, the second contact moving across the touch-sensitive surface in a direction that corresponds to a second direction on the display (e.g., leftward) opposite to the first direction on the display (e.g., rightward). For example, device 100 detects drag gesture including contact 546 and movement 548 originating from a location on the display corresponding to user interface representation 510, and proceeding to the left, in FIGS. 5L-5N.

In some embodiments, the second contact is the same as the first contact and the second drag gesture follows the first drag gesture, without an intervening lift off of the first contact. In some embodiments, the first contact lifts off after the first drag gesture and second drag gesture is made with a second contact after the second contact touches down on the touch-sensitive surface, as illustrated in the series of FIGS. 5J; 5L-5N.

While the second contact is at a location on the touch-sensitive surface that corresponds the first user interface representation on the display and the second contact is moving (1054) across the touch-sensitive surface in a direction that corresponds to the second direction on the display opposite the first direction on the display: the device moves (1056) the first user interface representation (e.g., user interface representation 510 in FIGS. 5L-5N) in the second direction at a new first speed on the display in accordance with a speed of the second contact on the touch-sensitive surface (e.g., on a touch-sensitive display, the card or other representation under the finger contact moves with the same speed as the finger contact). The device also moves (1058) the second user interface representation (e.g., user interface representation 508 in FIGS. 5L-5N), disposed above the first user interface representation, in the second direction at a new second speed greater than the new first speed. The device also moves (560) the third user interface representation (e.g., user interface representation 526 in FIGS. 5L-5N), disposed below the first user interface representation, in the second direction at a new third speed less than the new first speed.

In some embodiments, while moving the second user interface representation in the second direction faster than moving the first user interface representation in the second direction, the device detects (1062) that the second user interface representation has moved in between the first user interface representation and a location on the display that corresponds to a location of the second contact on the touch-sensitive surface. For example, on a touch-sensitive display, detecting that a portion of the second contact or a representative point of the second contact (e.g., a centroid) is touching the second user interface representation, instead of touching the first user interface representation (e.g., the centroid of contact 546 is touching user interface representation 508, rather than user interface representation 510, at location 546-f in FIG. 5N).

In response to detecting that the second user interface representation has moved in between the first user interface and a location on the display that corresponds to the location of the second contact on the touch-sensitive surface (1064): the device moves (1068) the second user interface representation in the second direction at a modified second speed in accordance with a current speed of the second contact. E.g., on a touch-sensitive display, the second user interface representation (e.g., user interface representation 508 in FIG. 5N) has caught up with the finger movement, and starts to move at the same speed as the second finger contact, instead of having the first user interface representation move at the same speed as the second finger contact in the second drag gesture (e.g., as illustrated by the change of the speed of user interface representation 508, along speed curve 550, upon reaching location 508-f in FIG. 5O).

The device also moves (1070) the first user interface representation (e.g., user interface representation 510), disposed below the second user interface representation, in the second direction at a modified first speed less than the modified second speed. In some embodiments, on a touch-sensitive display, once the second user interface representation becomes the representation underneath the finger contact, the first user interface representation moves at a speed that is a slower than the speed of the second user interface representation (e.g., at a speed a fixed amount or a proportional amount below the speed of the second user interface representation, as illustrated on speed curve 550 in FIG. 5O).

In some embodiments, the device also moves (1072) the third user interface representation (e.g., user interface representation 526 in FIG. 5N), disposed below the first user interface representation, in the second direction at a modified third speed less than the modified first speed (e.g., as illustrated on speed curve 550 in FIG. 5O).

In some embodiments, a difference between the modified second speed and the modified first speed maintains (1074) a first constant z-position difference between the second user interface representation and the first user interface representation, while a difference between the modified first speed and the modified third speed maintains a second constant z-position difference between the first user interface representation and the third user interface representation, where the first constant z-position difference is the same as the second z-position difference.

In some embodiments, a difference between the modified second speed and the modified first speed is equal to a difference between the modified first speed and the modified third speed (1076).

In some embodiments, a ratio between the modified second speed and the modified first speed is equal to a ratio between the modified first speed and the modified third speed (1078).

In some embodiments, while displaying, in the stack, at least the first user interface representation and the second user interface representation above the first user interface representation, the device detects (1080) activation of a transient application at the device. For example, while displaying user interface representations 508, 510, 526, and 534, device 100 detects an incoming phone call, activating a telephony application, as illustrated in FIGS. 5U-5V.

In response to detecting activation of the transient application, the device inserts (1082) a user interface representation for the transient application in the stack between the first user interface representation and the second user interface representation. For example, user interface representation 554 of user interface 556 corresponding to a telephony application is inserted between user interface representations 510 and 526 in FIGS. 5U-5W. In some embodiments, to make room for the user interface representation of the transient application on the display, the second user interface representation is moved to the right, and the user interface representation of the transient application takes the former place of the second user interface representation (e.g., user interface representations 510 and 508 move to the right to make space for insertion of user representation 554 into the stack in FIGS. 5V-5W).

In some embodiments, while displaying, in the stack, at least the first user interface representation and the second user interface representation above the first user interface representation, the device detects (1084) a deletion input directed to the first user interface representation (e.g., an upward drag gesture at a location on the touch-sensitive surface that corresponds to a location on the first user interface representation). For example, device 100 detects the drag gesture including contact 560 and movement 562 at a location on touch screen 112 corresponding to display of user interface representation 510 in FIG. 5X.

In response to detecting the deletion input directed to the first user interface representation (1086): the device removes (1088) the first user interface representation from a first position in the stack (e.g., user interface 510 is removed from the stack in FIGS. 5X-5Z. The device also moves (1090) a respective user interface representation disposed immediately below the first user interface representation into the first position in the stack (e.g., user interface representation 526 is moved up in the stack to take the position vacated by user interface representation 510 in FIGS. 5Z-5AA). In some embodiments, the application corresponding to the first user interface representation is closed in response to detecting the deletion input directed to the first user interface representation.

In some embodiments, after detecting termination of the first drag gesture, the device displays (1091) at least two of the user interface representations in the stack on the display (e.g., user interface representations 508, 510, and 526 in FIG. 5BB). While displaying at least two of the plurality of user interface representations in the stack, the device detects (1092) a selection input (e.g., a tap gesture at a location on the touch-sensitive surface that corresponds to a location on a user interface representation) directed to one of the at least two user interface representations in the stack. For example, device 100 detects the tap gesture including contact 564 at a location on touch screen 112 corresponding to display of user interface representation 510 in FIG. 5BB.

In response to detecting the selection input (1093): the device ceases to display (1094) the stack, and displays (1095) a user interface that corresponds to the selected one of the at least two user interface representations. In some embodiments, the user interface that corresponds to the selected user interface representation is displayed without displaying any user interfaces that correspond to other user interface representations in the stack. In some embodiments, the display of the user interface that corresponds to the selected user interface representation replaces the display of the stack. For example, in response to detecting the tap gesture including contact 564 at a location on touch screen 112 corresponding to display of user interface representation 510 of user interface 507, device 100 exits the user interface selection mode and displays user interface 507 on touch screen 112.

In some embodiments, while at least the first user interface representation and the second user interface representation, disposed above the first user interface representation in the stack, are stationary on the display, the device detects (1096) a first flick gesture by a second contact at a location on the touch-sensitive surface that corresponds to one of the first user interface representation or the second user interface representation on the display. The flick gesture moves across the touch-sensitive surface in a direction that corresponds to the first direction on the display. For example, device 100 detects the flick gesture including contact 556 and movement 558 at a location on touch screen 112 that corresponds to display of user interface representation 510.

In response to detecting the first flick gesture by the second contact, the device moves the second user interface representation with a simulated inertia that is based on whether the second contact was detected at a location on the touch-sensitive surface that corresponds to the first user interface representation or to the second user interface representation on the display (e.g., user interface representation 510 travels farther than the length of movement 558). In some embodiments, when the flick gesture is directed to the second user interface representation, the second user interface representation moves with a smaller inertia than if the flick gesture is directed to the first user interface representation. In some embodiments, when the flick gesture is directed to the second user interface representation, the second user interface representation moves with a larger inertia than if the flick gesture is directed to the first user interface representation. In some embodiments, if the top card is flicked to the right, that top card flies off of the screen faster than it would have if a lower laying card were flicked to the right, which would push the top card to the right indirectly.

Figure 10A:
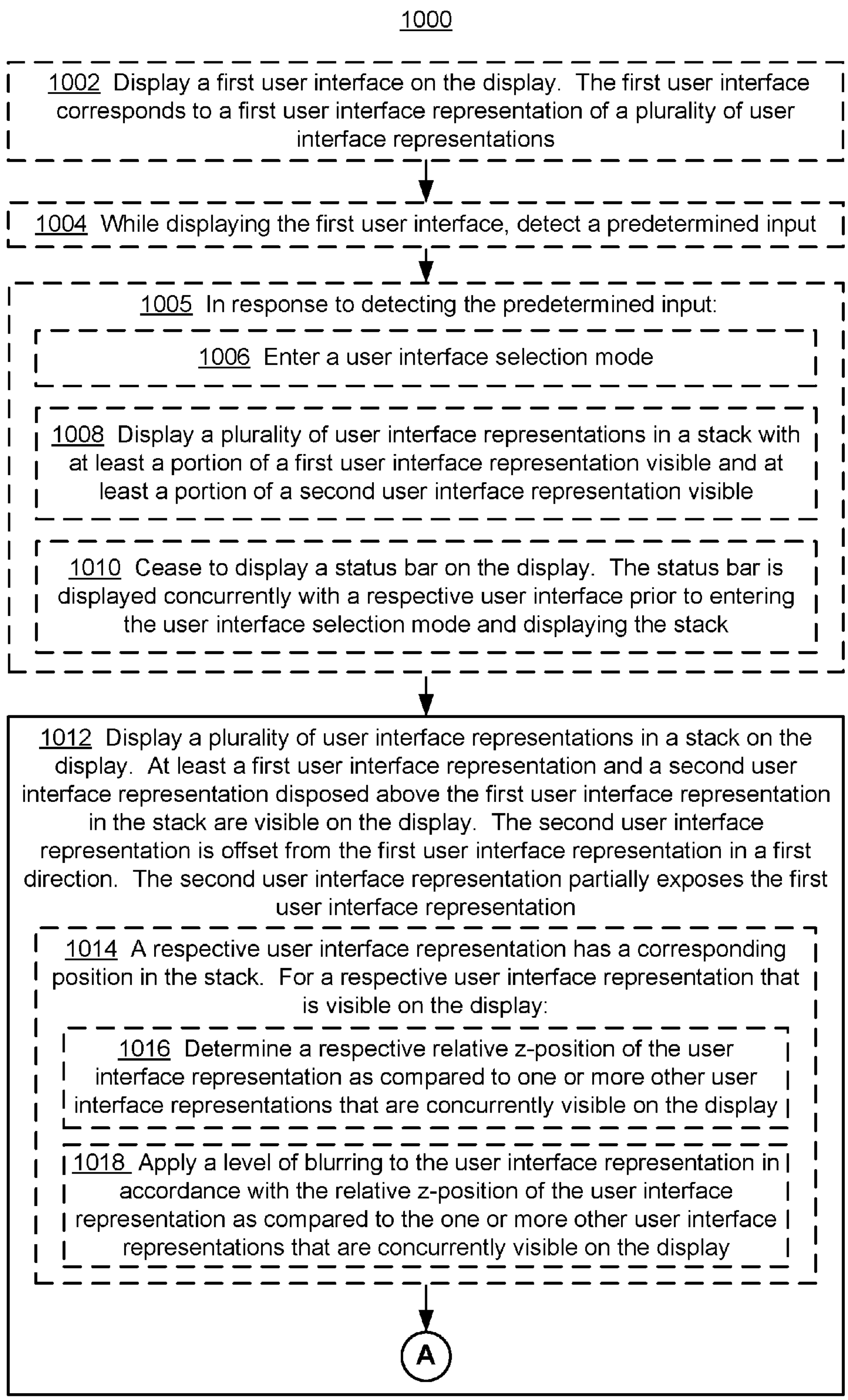
Figure 10B:
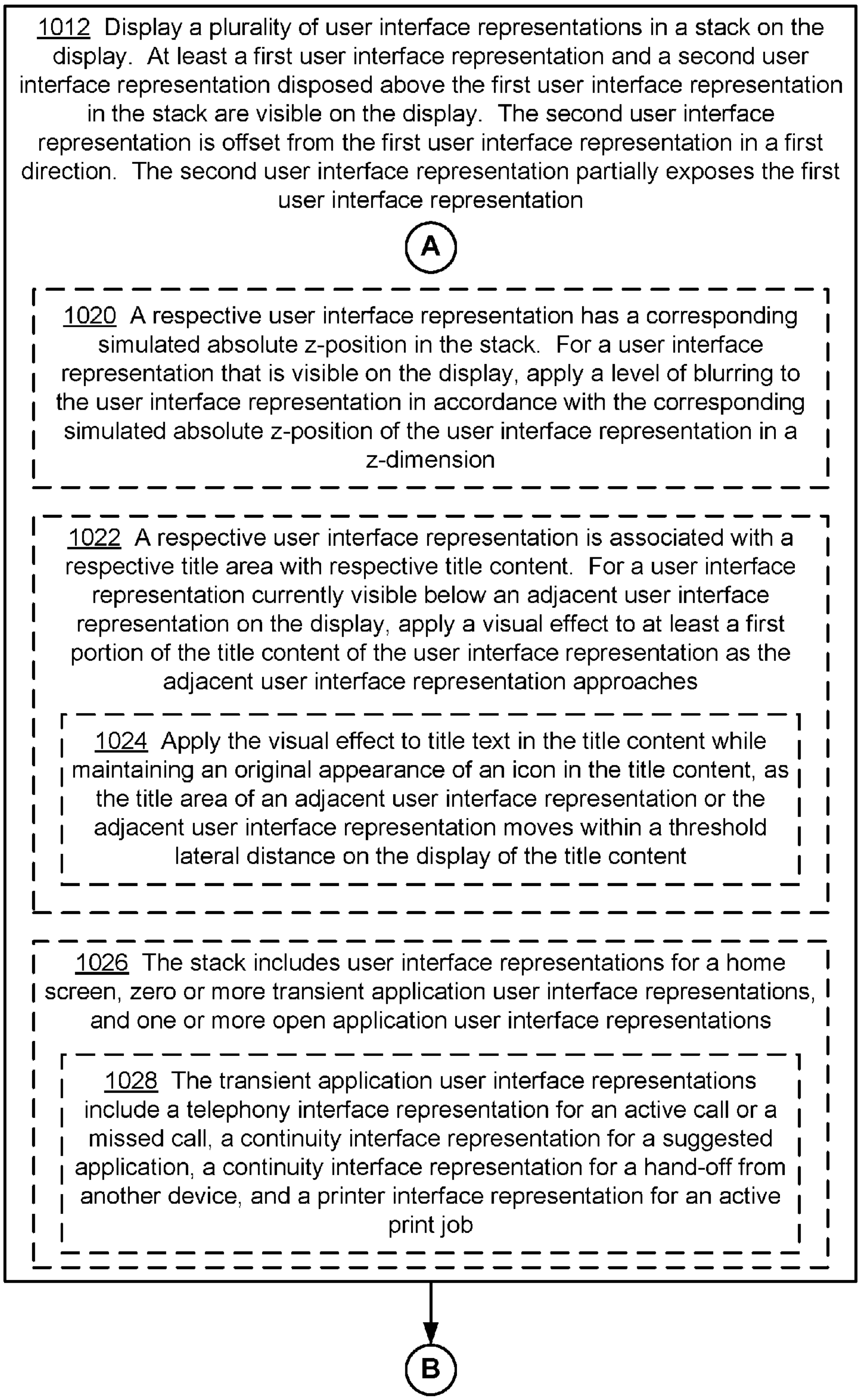
Figure 10D:
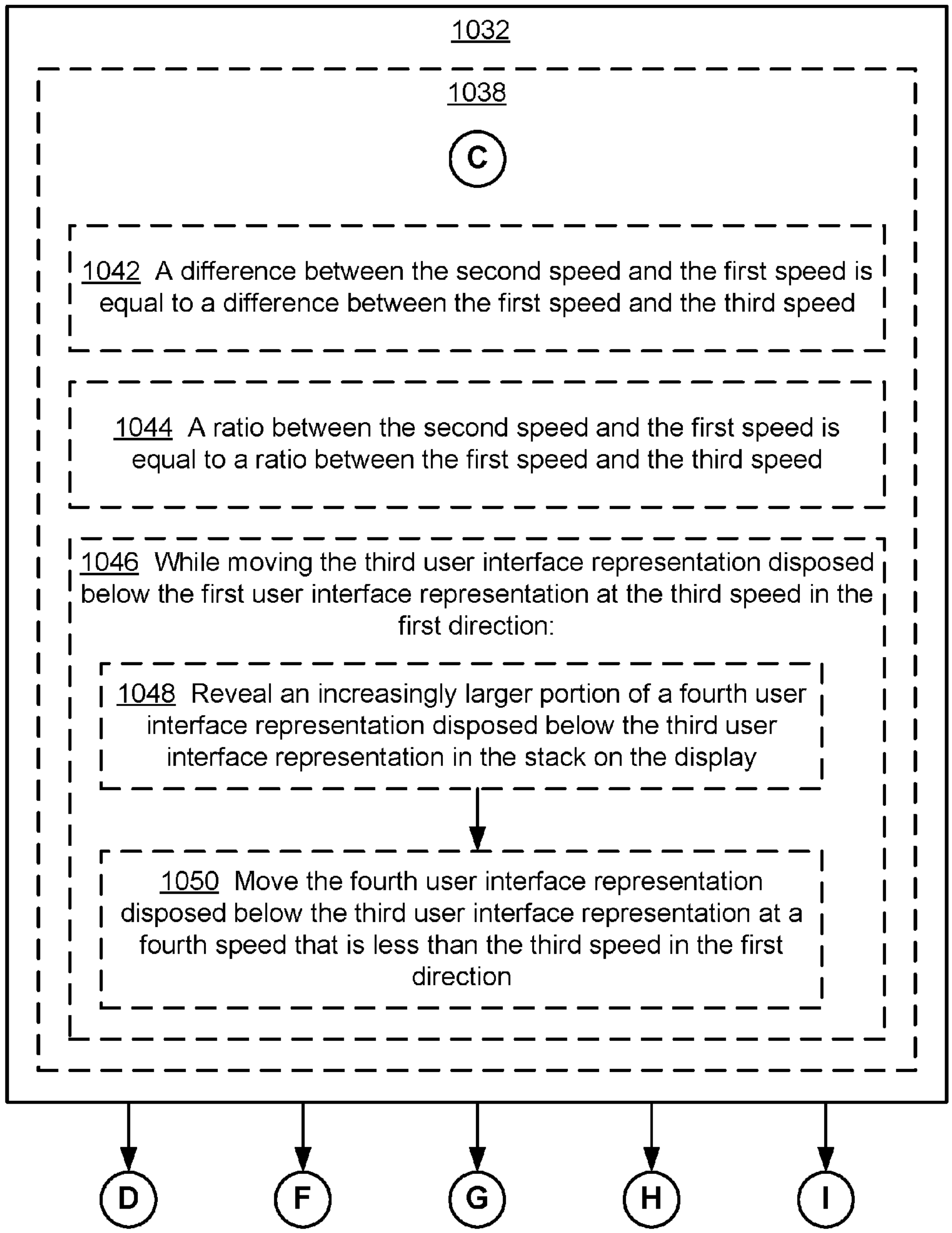
Figure 10E:
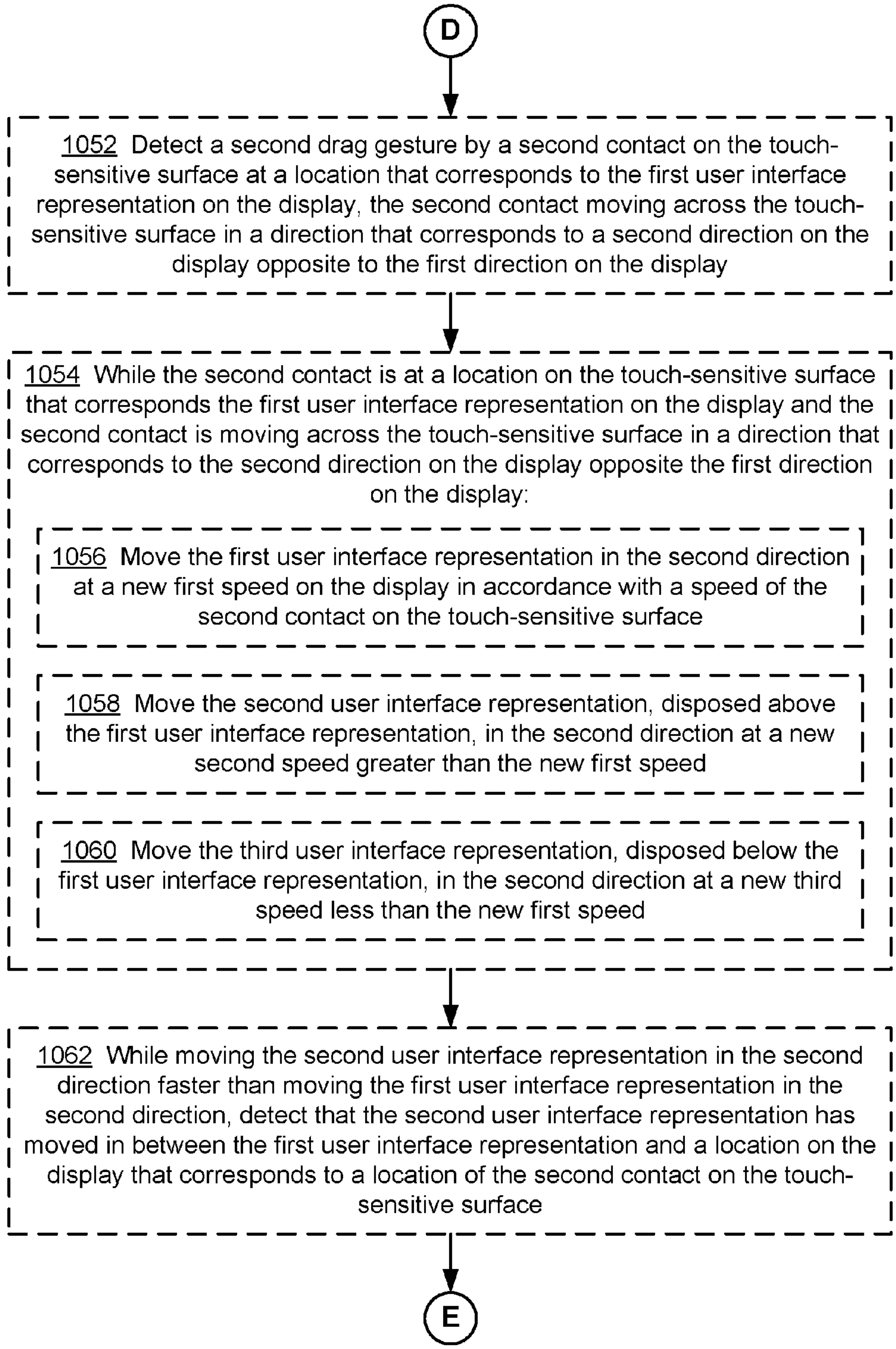
Figure 10G:
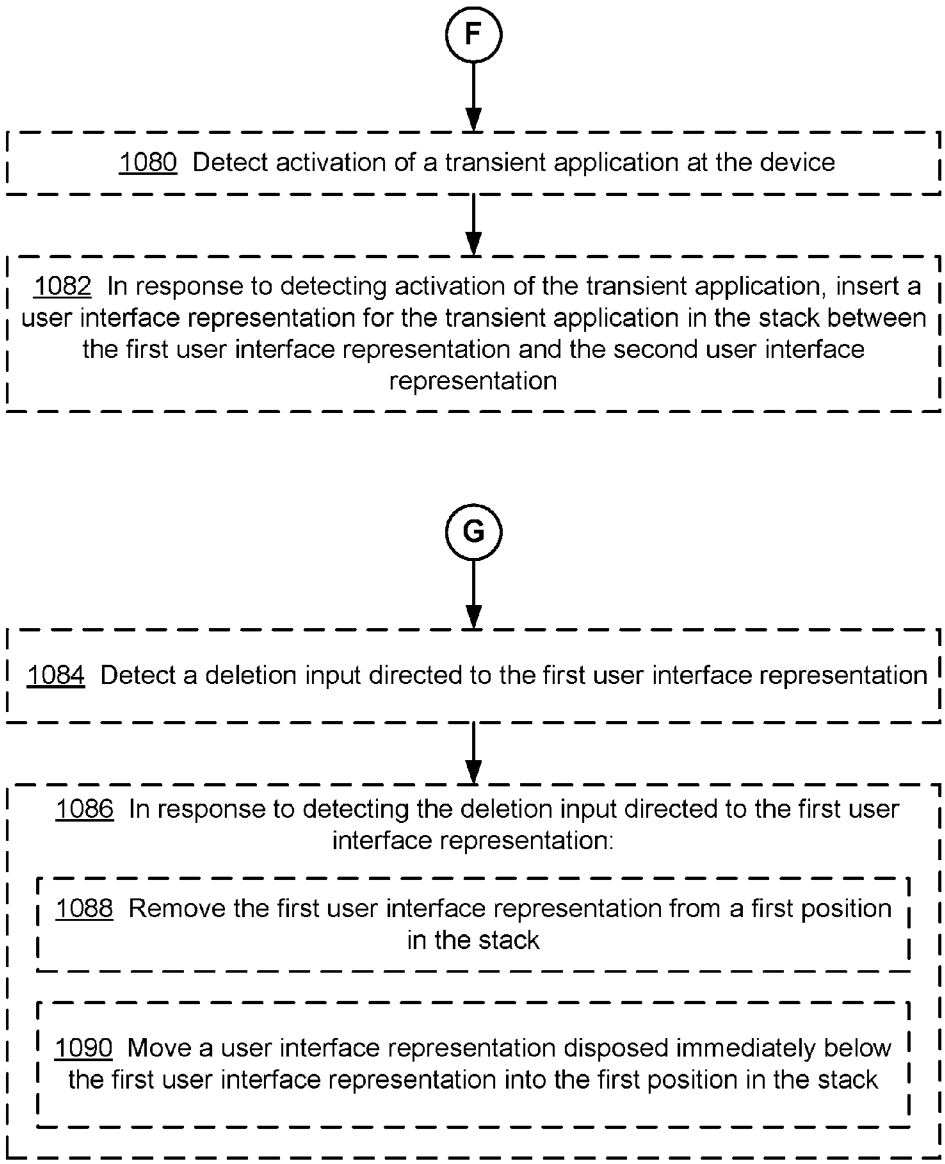
Figure 10H:
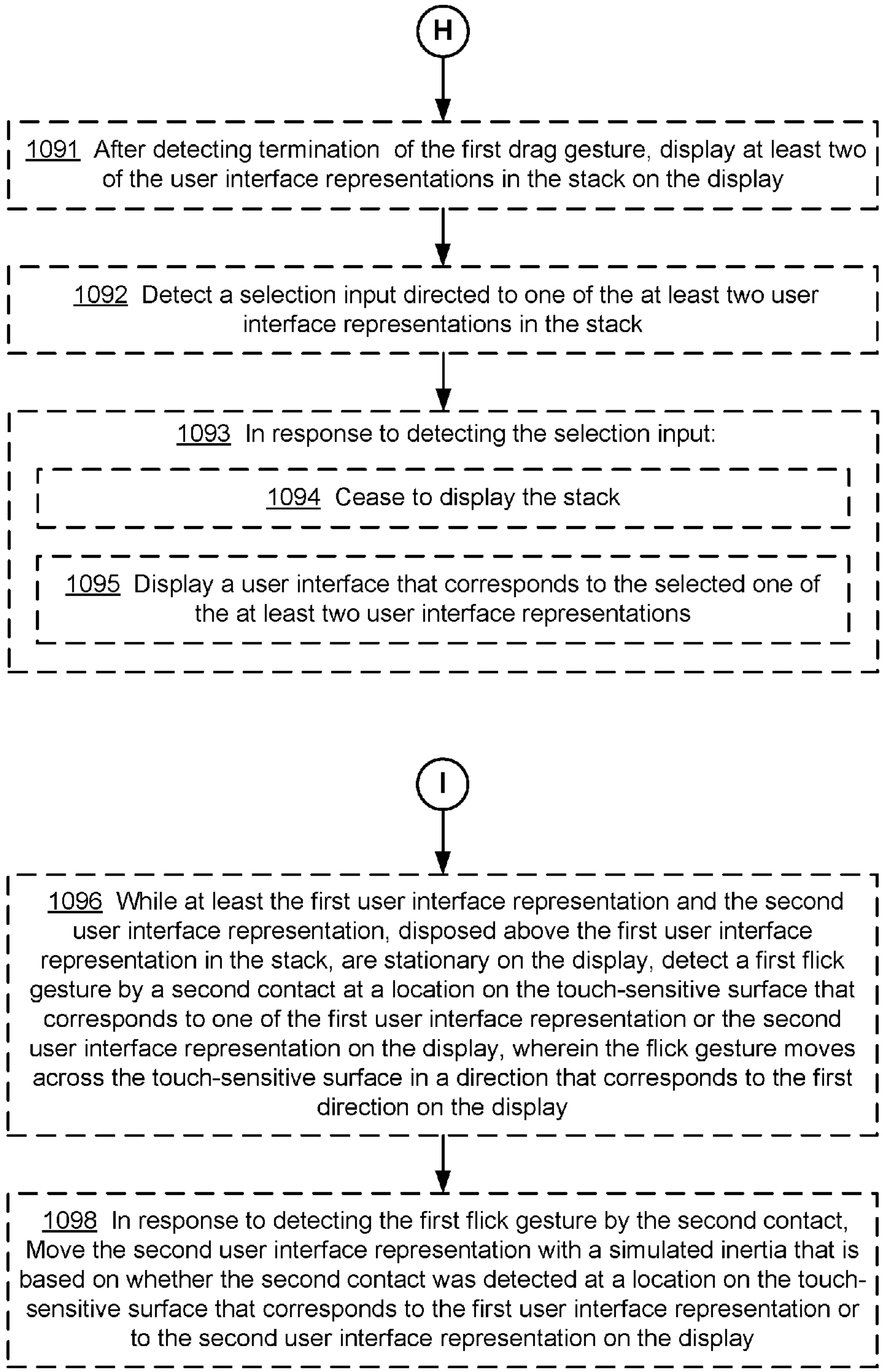
Figure 11B:
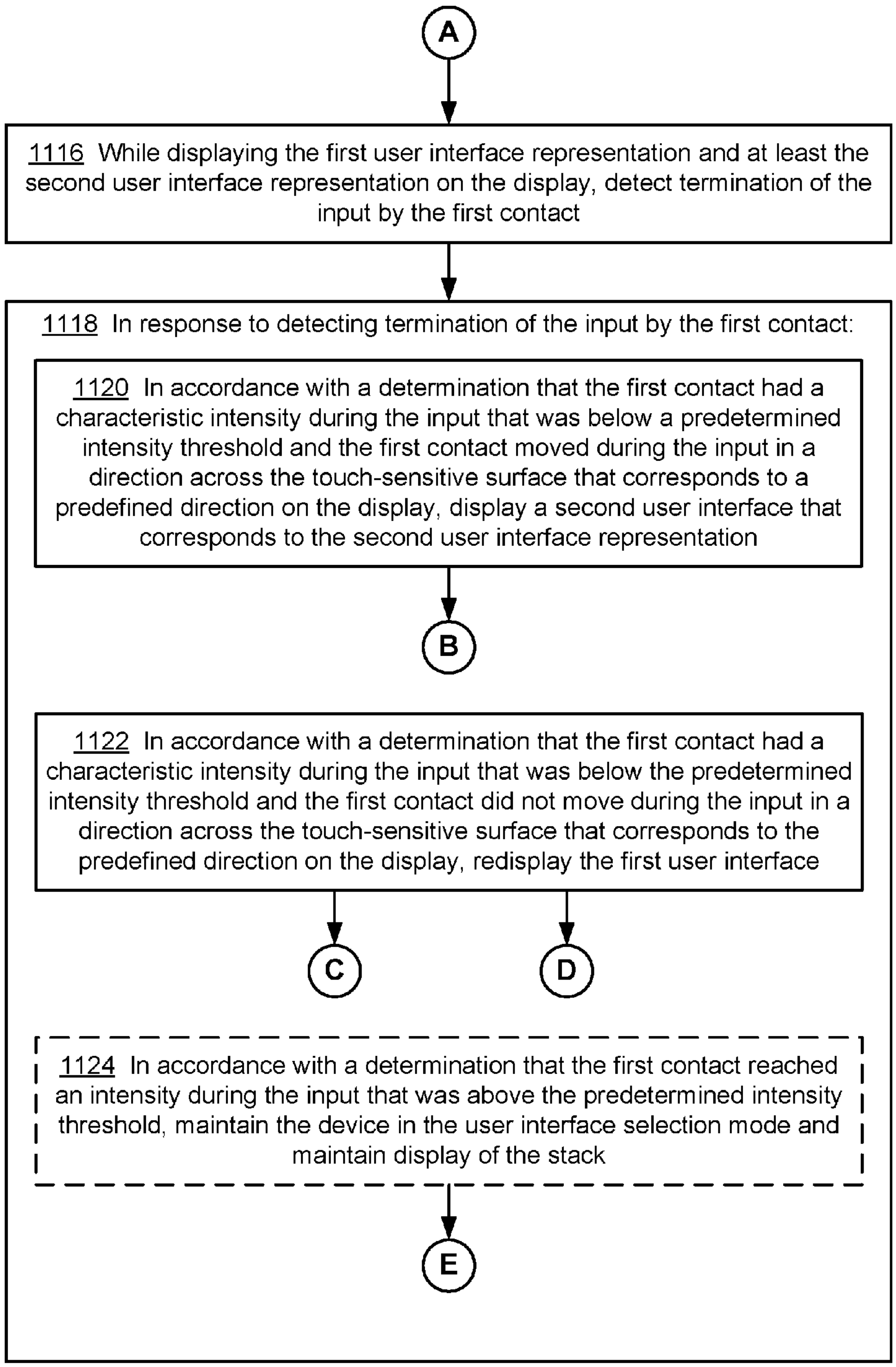
Figure 11C:
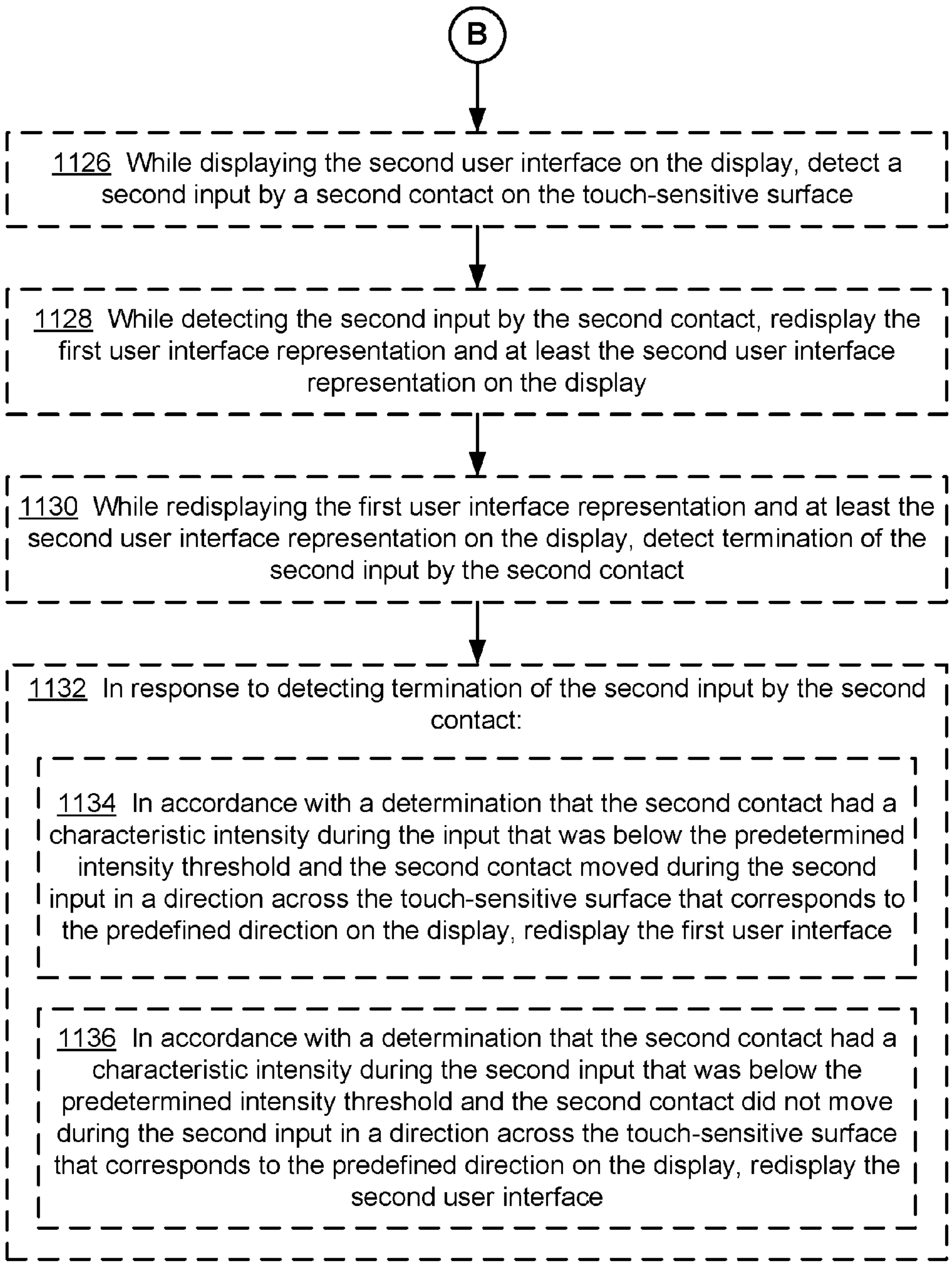
Figure 11D:
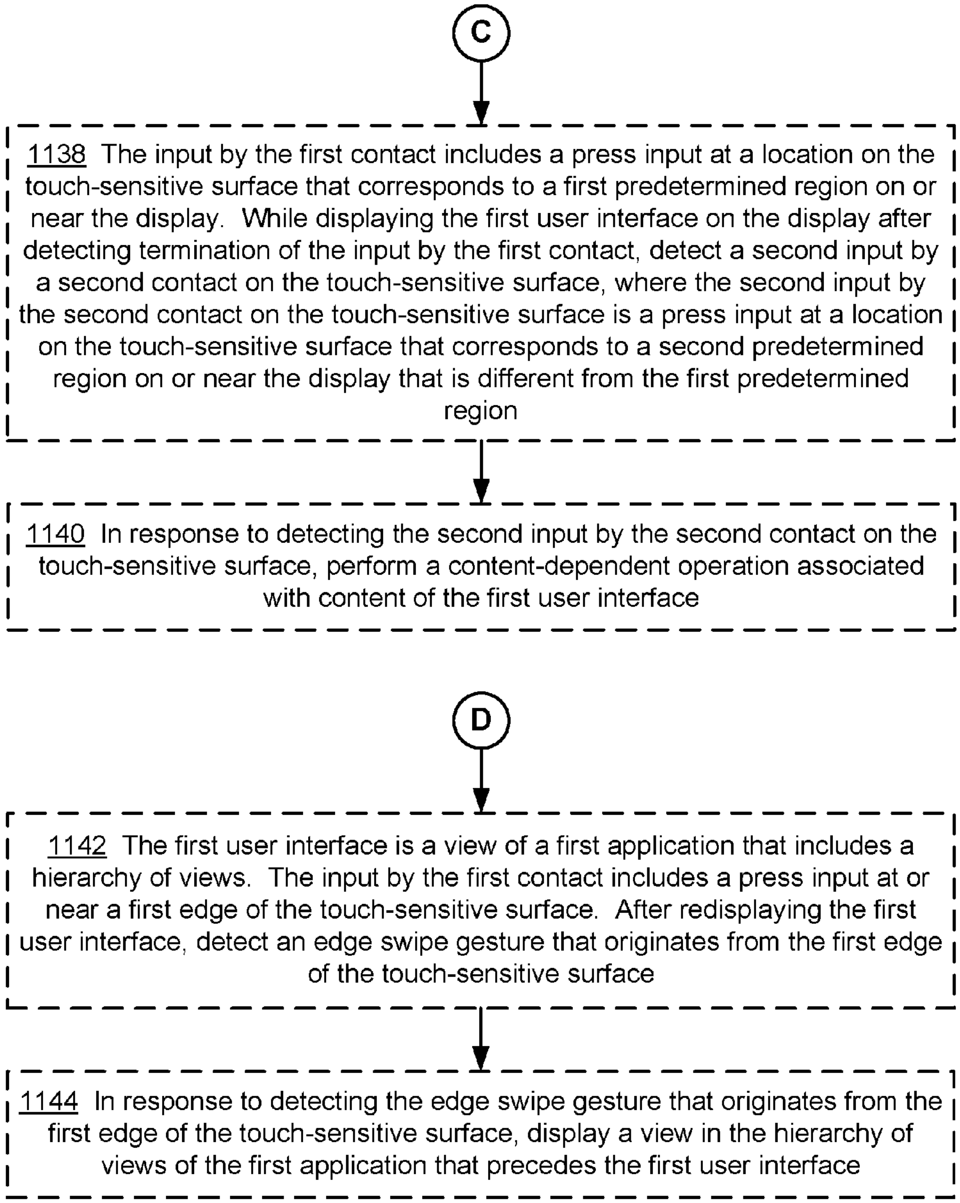
Figure 12A:
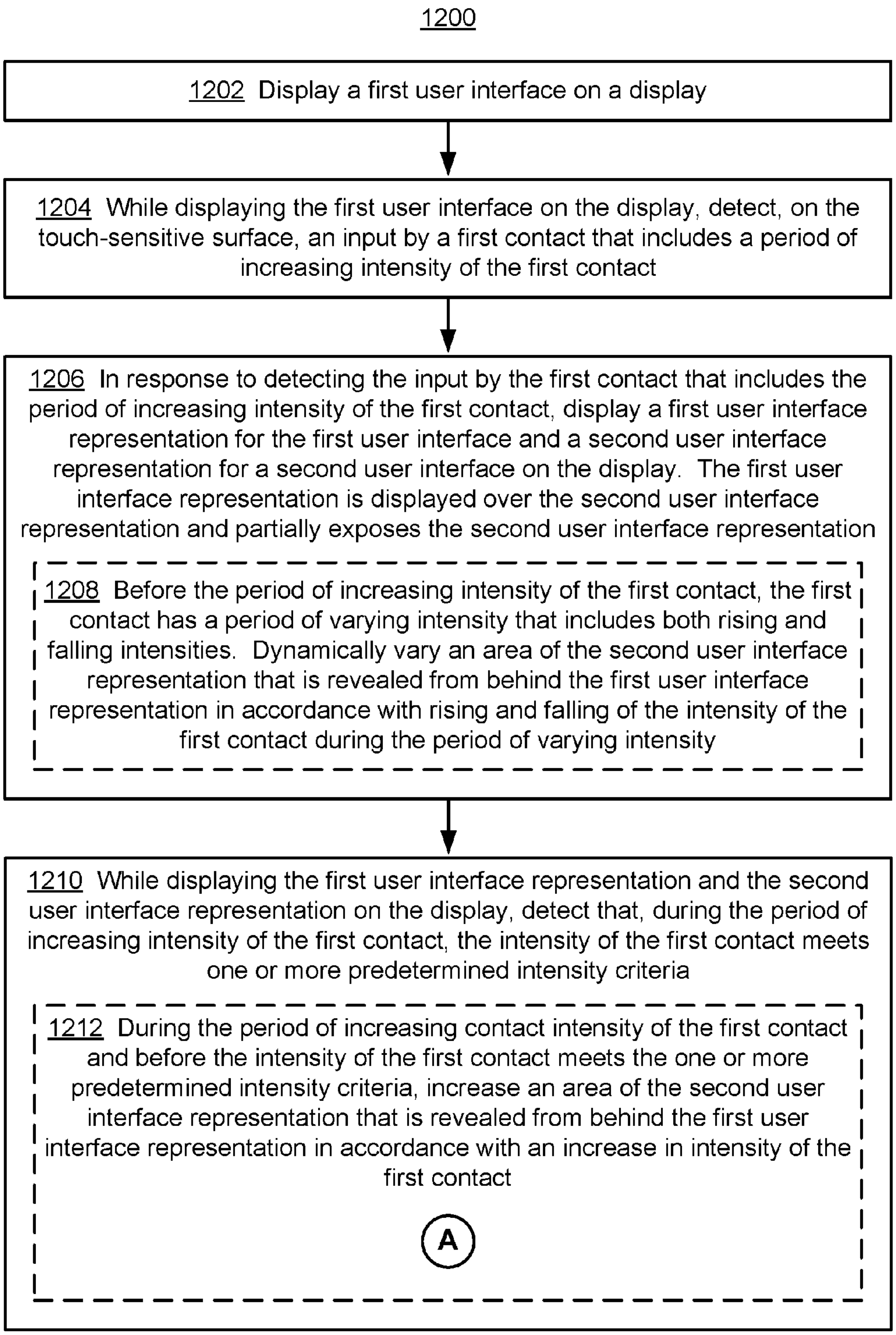
Figure 12C:
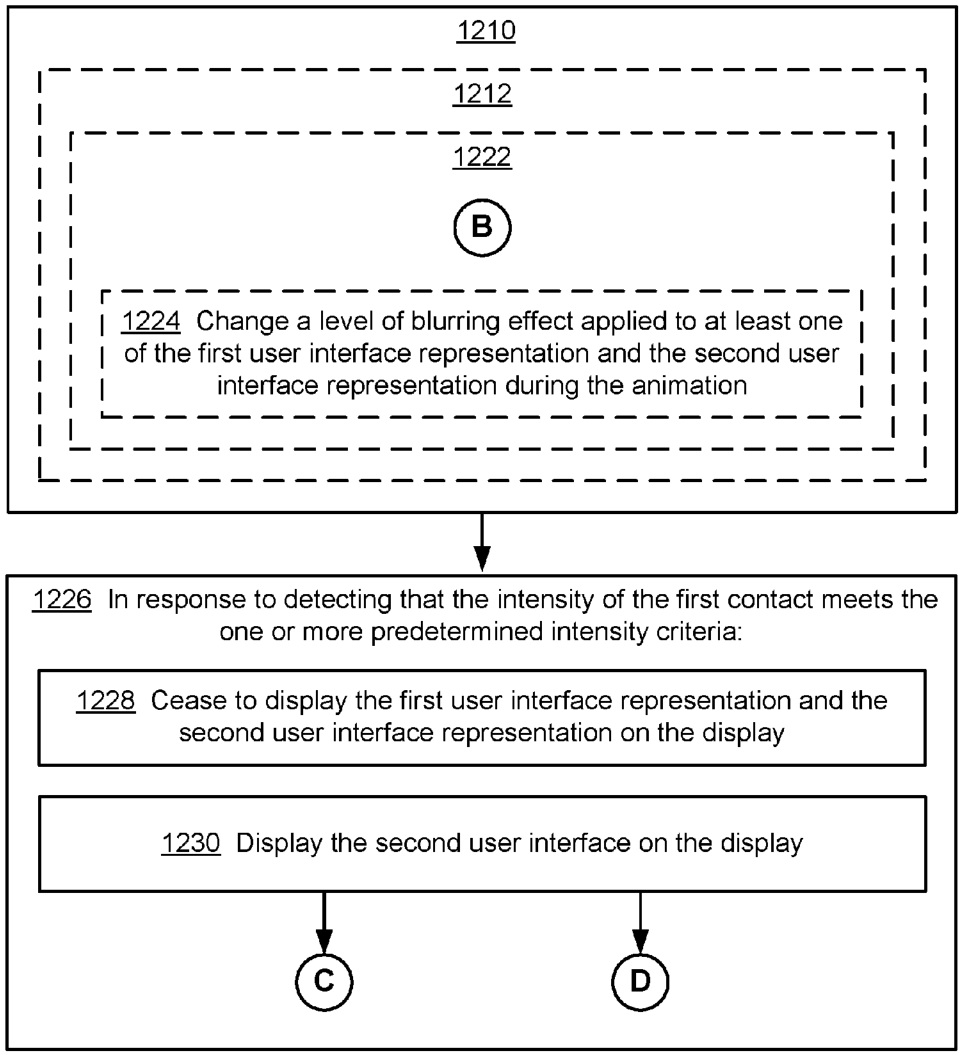
Figure 12D:
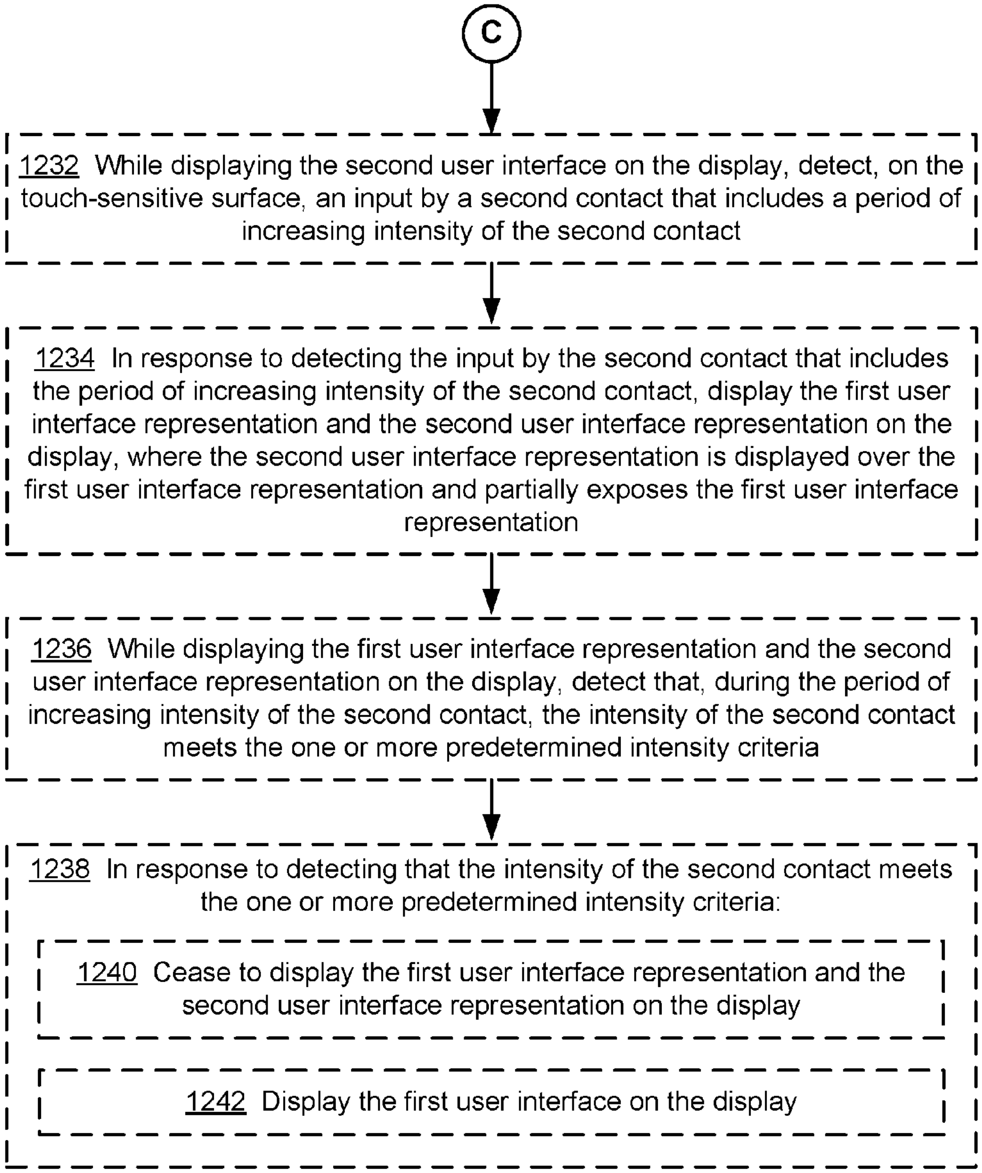
Figure 12E:
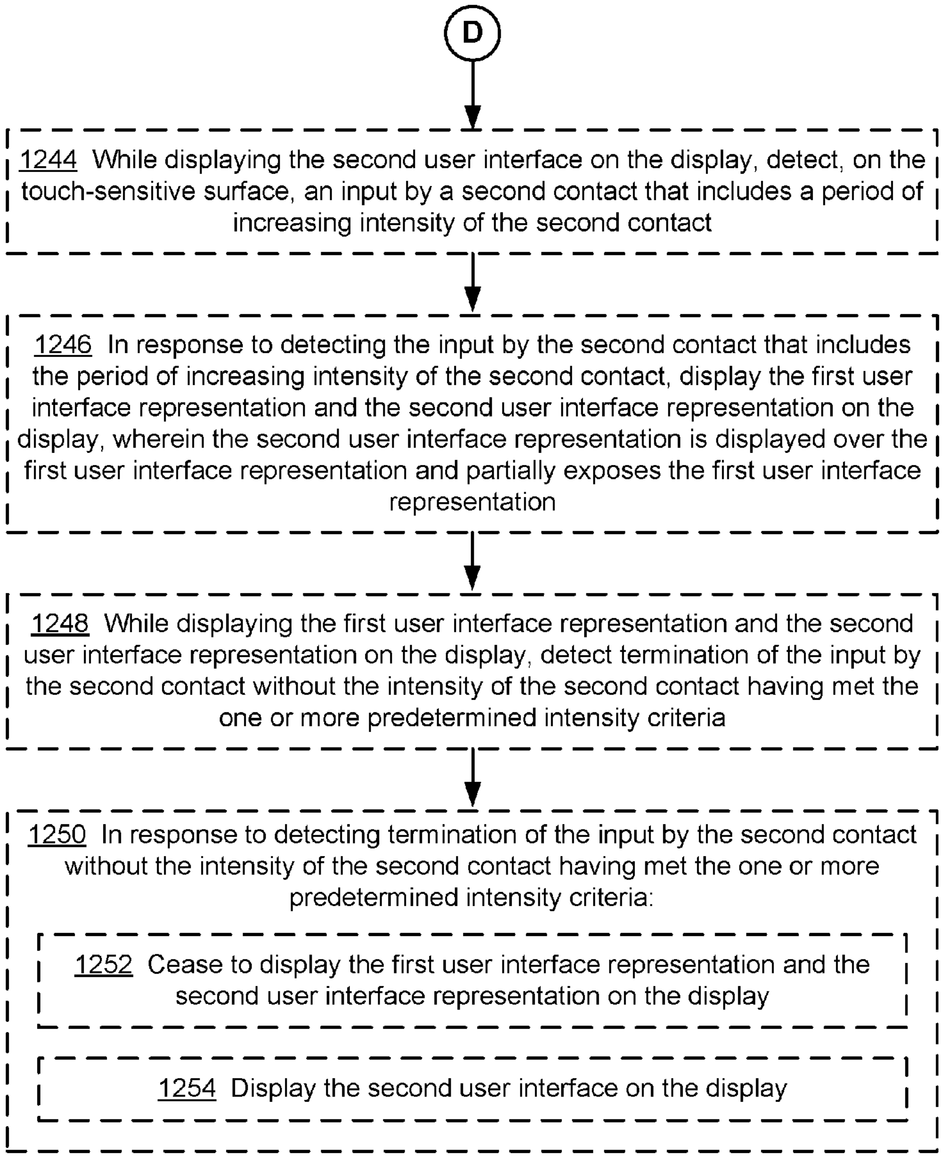
Figure 13A:
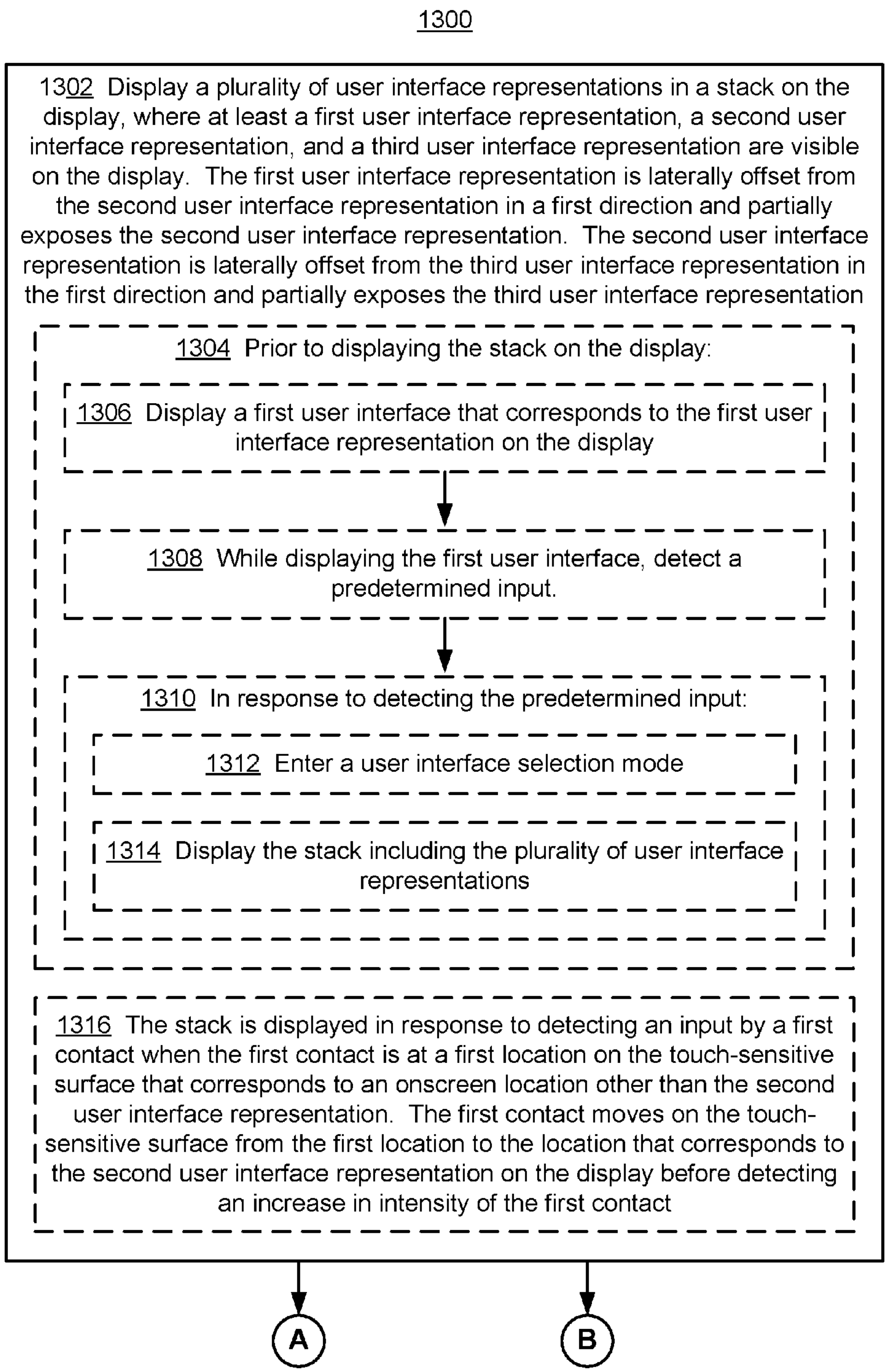
FIGS. 13A-13D are flow diagrams illustrating a method of navigating between user interface representations in a user interface selection mode in accordance with some embodiments.
Figure 13B:
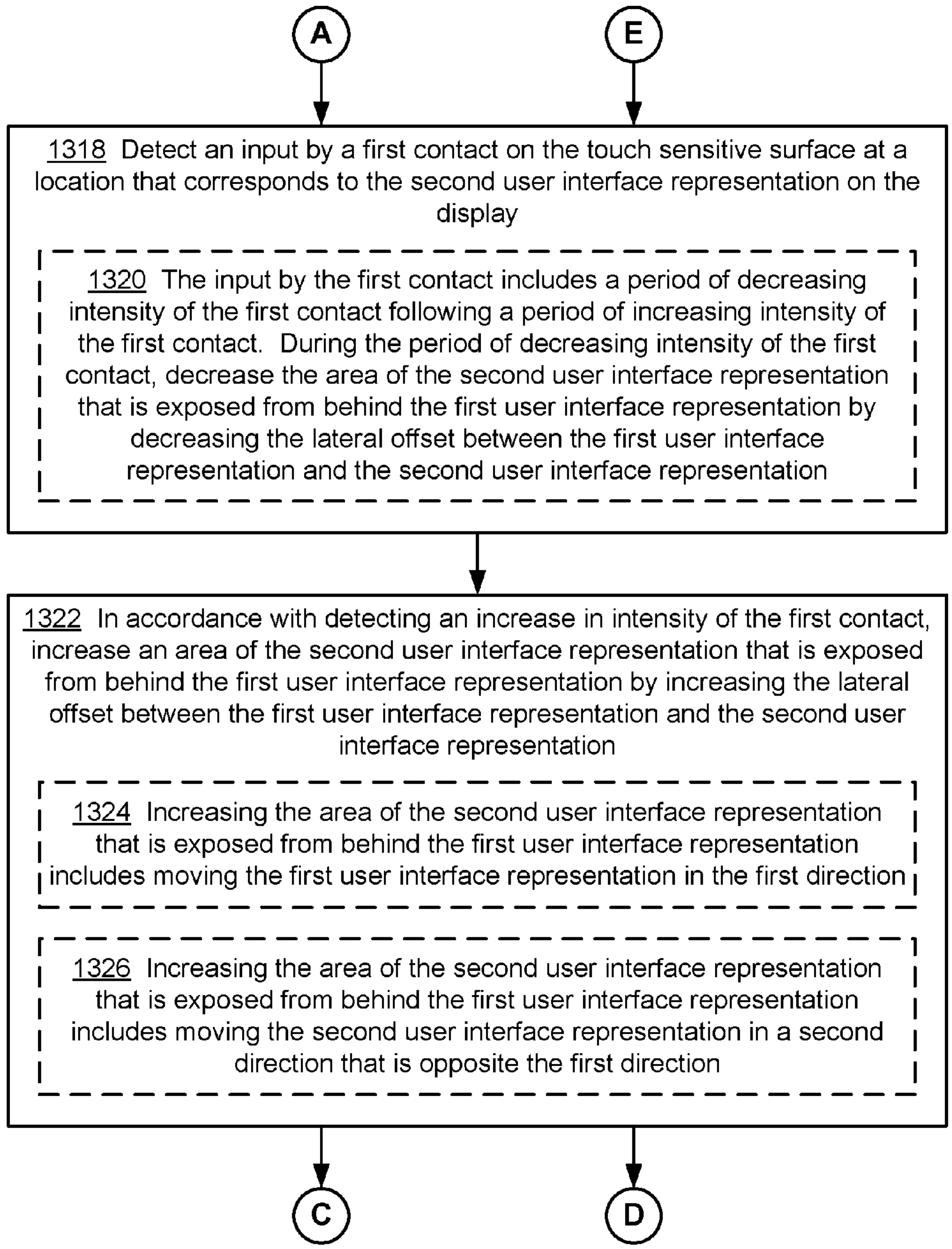
Figure 13C:
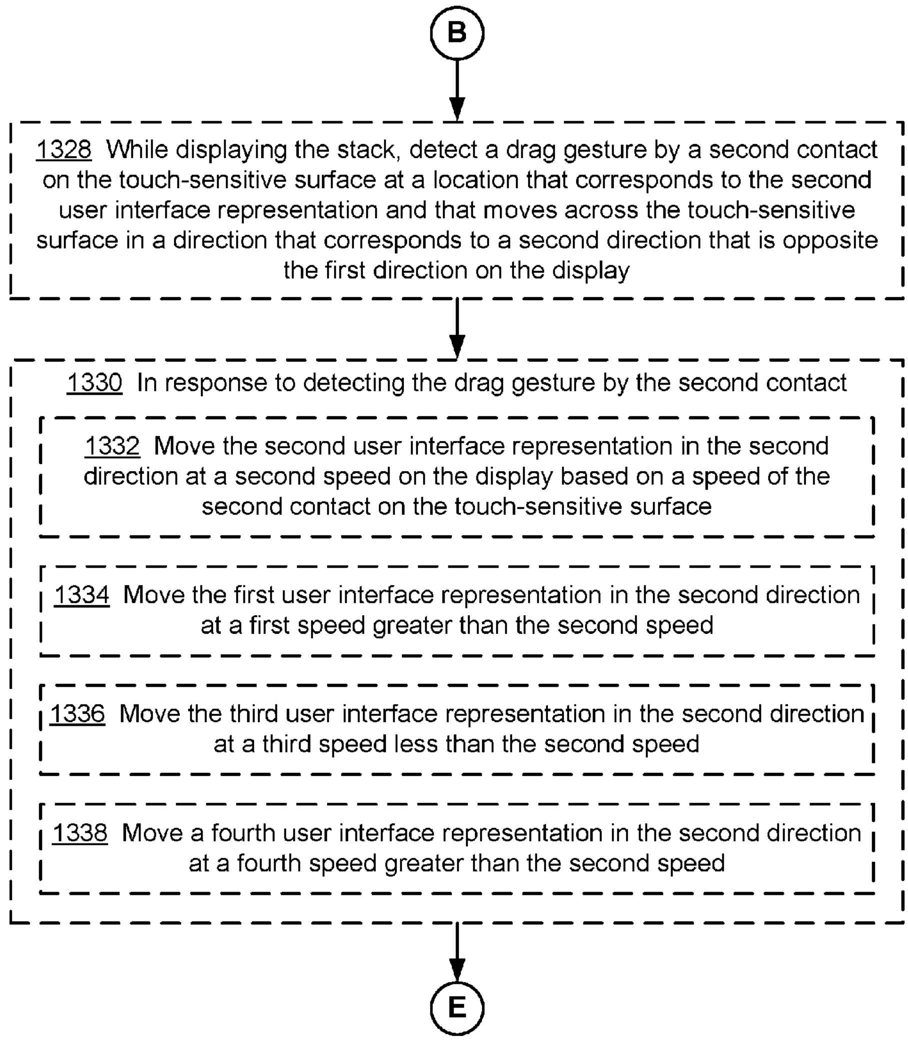
Figure 13D:
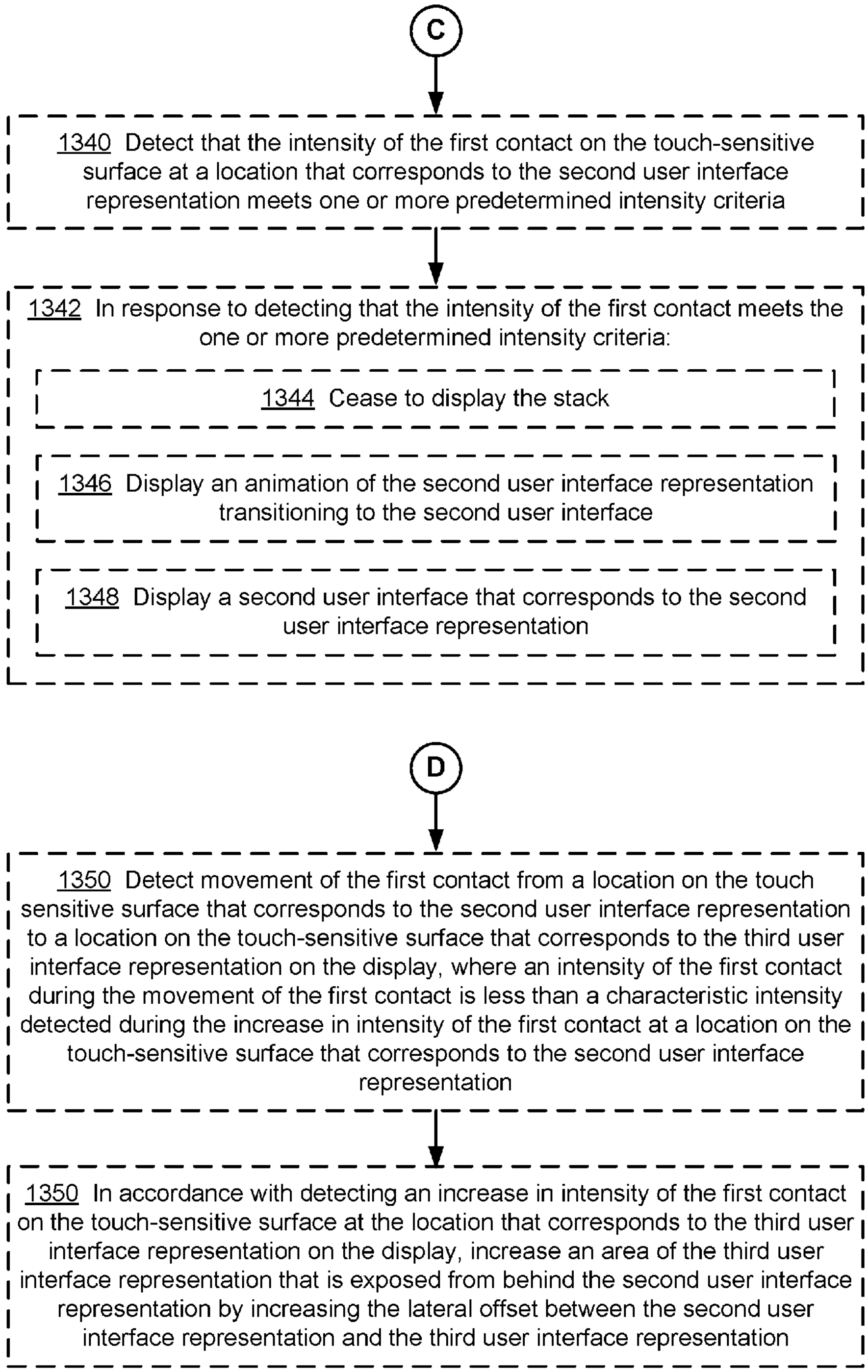

It should be understood that the particular order in which the operations in FIGS. 10AA-10H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1100, 1200, 1300, 1400, 1500, 2400, and 2500) are also applicable in an analogous manner to method 1000 described above with respect to FIGS. 10A-10H. For example, the contacts, gestures, user interface objects, focus selectors, and animations described above with reference to method 1000 optionally have one or more of the characteristics of the contacts, gestures, user interface objects, focus selectors, and animations described herein with reference to other methods described herein (e.g., methods 1100, 1200, 1300, 1400, 1500, 2400, and 2500). For brevity, these details are not repeated here.

FIGS. 11A-11E illustrate a flow diagram of a method 1100 of navigating between user interfaces in accordance with some embodiments. The method 1100 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 1000 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 1100 are, optionally, combined and/or the order of some operations is, optionally, changed.

As described below, the method 1100 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (1102) a first user interface on the display (e.g., user interface 502 in FIG. 6A). In some embodiments, the first user interface is the user interface of a currently open application. In some embodiments, the first user interface is the current user interface of an application, which is preceded by a sequence of previous user interfaces for the application that are accessible by a "back" button provided on the user interfaces for the application.

While displaying the first user interface on the display, the device detects (1104) an input by a first contact on the touch-sensitive surface (e.g., contact 602 in FIG. 6B). In some embodiments, the input by the first contact starts in a predefined location on a touch-sensitive display, such as on the left edge of the touch-sensitive display or in a predefined area adjacent to the left edge of the touch-sensitive display. In some embodiments, the input by the first contact starts at a location on the touch-sensitive surface that corresponds to a predefined location on a display, such as on the left edge of the display or in a predefined area adjacent to the left edge of the display. In some embodiments, the input includes a press input made with the flat portion of a thumb.

While detecting the input by the first contact, the device displays (1106) a first user interface representation and at least a second user interface representation on the display (e.g., user interface representations 508 and 510 in FIG. 6C).

In some embodiments, in accordance with a determination that the first contact has a characteristic intensity during the input that is below a predetermined intensity threshold, the device displays (1108) the first user interface representation for the first user interface and at least the second user interface representation for the second user interface on the display, where the first user interface representation is displayed over the second user interface representation and partially exposes the second user interface representation. For example, upon determining that the intensity of contact 602 does not reach a deep press intensity threshold ($IT_D$) in FIGS. 6B-6C, user interface representation 508 is displayed over user interface representation 510 in FIG. 6C. In some embodiments, the first user interface representation and the second user interface representation are displayed in a stack.

In some embodiments, in accordance with a determination that the first contact reaches an intensity during the input that is above the predetermined intensity threshold, the device enters (1110) a user interface selection mode and displays a plurality of user interface representations in a stack on the display, the stack including the first user interface representation displayed over and partially exposing the second user interface representation. For example, upon determining that the intensity of contact 608 reaches a deep press intensity threshold ($IT_D$) in FIG. 6H, the device enters a user interface selection mode, including display of user interface representations 508, 510, and 526.

In some embodiments, display of the stack replaces display of the first user interface on the display. For example, user interface 506 including the stack replaces display of user interface 507 in FIG. 6H.

In some embodiments, the stack of user interface representations is gradually spread out with the increasing contact intensity during the input. For example, as the intensity of contact 610 continues to increase in from FIG. 6J to FIG. 6K, and then to maximum intensity in FIG. 6L, user interface representations in the stack are spread out, as illustrated by movement of user interface representation 510 from location 510-a in FIG. 6J, through location 510-b in FIG. 6K, out to location 510-c in FIG. 6L, which is almost entirely off touch screen 112.

In some embodiments, before the intensity reaches the predetermined threshold intensity, the stack is revealed in a "peek" mode, and reducing the contact intensity during the "peek" mode causes the previously expanded stack to retract. In some embodiments, a quick deep press input with intensity passing the predetermined threshold intensity causes the immediate display of the stack, skipping the peek mode.

In some embodiments, the first user interface corresponds (1112) to a first open application, and, at a time when the input by the first contact is received, the second user interface is a user interface of a second open application that was viewed just prior to displaying the first open application. E.g., the first and second user interface representations correspond to the last two applications open on the device. For example, as illustrated in FIG. 6C, first user interface representation 508 is of first user interface 502, which was displayed on touch screen 112 immediately preceding display of the user interface representations and second user interface representation 510 is of second user interface 507, which was displayed on touch screen 112 immediately preceding display of first user interface 502.

In some embodiments, the first user interface corresponds (614) to a first open application, and, at a time when the input by the first contact is received, the second user interface is a user interface of the first open application that was viewed just prior to displaying the first user interface of the first open application. E.g., the first and second user interface representations correspond to the last two user interfaces of the application that was open prior to peeking.

The method also includes, while displaying the first user interface representation and at least the second user interface representation on the display, the device detects (1116) termination of the input by the first contact (e.g., detecting lift off of the first contact or detecting the intensity of the first contact fall below a minimum intensity detection threshold, for example, detection of lift off of contact 602 in FIGS. 6D and 6G).

In response to detecting termination of the input by the first contact (618): in accordance with a determination that the first contact had a characteristic intensity (e.g., a representative intensity such as a maximum intensity) during the input that was below a predetermined intensity threshold (e.g., a deep press intensity threshold ($IT_D$)) and the first contact moved during the input in a direction across the touch-sensitive surface that corresponds to a predefined direction on the display (e.g., rightward, in a drag or swipe gesture; or a movement of the contact to a location on the touch-sensitive surface that corresponds to a position over the second user interface representation in the stack on the display), the device displays (1120) a second user interface that corresponds to the second user interface representation. For example, in FIGS. 6A, 6E-6G, device 100 determines that the intensity of contact 604 did not reach a predetermined deep press intensity threshold ($IT_D$), and the input included movement of contact 604 to the right. Thus, when lift off of contact 604 is detected, device 100 displays user interface 507, corresponding to second user interface representation 510 during the peek gesture, as illustrated in FIG. 6G.

In some embodiments, the second user interface is displayed without displaying other user interfaces that correspond to the plurality of user interface representations in the stack. In some embodiments, display of the second user interface replaces display of the stack on the display. In some embodiments, a light press followed by a swipe gesture results in a "peek" that includes display of a representation of the prior user interface followed by display of the prior user interface. In some embodiments, repeating the light press followed by a swipe gesture enables a user to quickly toggle between a current view and an immediately prior view (e.g., after toggling from first user interface 502 to second interface 507 in FIG. 6G, the user performs the same light press input with movement in FIGS. 6Q-6S to toggle back to first user interface 502, as illustrated in FIG. 6S.

The method also includes, in accordance with a determination that the first contact had a characteristic intensity (e.g., a maximum intensity) during the input that was below the predetermined intensity threshold (e.g., deep press intensity threshold ($IT_D$)) and the first contact did not move during the input in a direction across the touch-sensitive surface that corresponds to the predefined direction on the display (e.g., the first contact was stationary during the input or moved less than a threshold amount during the input), the device redisplays (1122) the first user interface. For example, in FIGS. 6A-6D, device 100 determines that contact 602 did not reach a deep press intensity threshold ($IT_D$) and was stationary. Thus, when lift off of contact 602 is detected, device 100 redisplays first user interface 502, as illustrated in FIG. 6D.

In some embodiments, the first user interface is displayed without displaying other user interfaces that correspond to the plurality of user interface representations in the stack. In some embodiments, display of the first user interface replaces display of the stack on the display. In some embodiments, a stationary light press results in a "peek" that includes display of a representation of the prior user interface followed by redisplay of the current user interface. In some embodiments, complete release of the intensity during the "peek," without additional movement of the first contact, causes the display to return to showing the first user interface.

In some embodiments, in response to detecting termination of the input by the first contact, in accordance with a determination that the first contact reached an intensity during the input that was above the predetermined intensity threshold (e.g., deep press intensity threshold ($IT_D$)), the device maintains (1124) in the user interface selection mode and maintains display of the stack. For example, in FIGS. 6H-6I, device 100 determines that contact 608 reached a deep press intensity threshold ($IT_D$). Thus, when lift off of contact 608 is detected, device 100 maintains display of the stack, as illustrated in FIG. 6I.

In some embodiments, a deep press with intensity passing a predetermined threshold intensity results in display of the stack, which is maintained when the deep press input ends (e.g., as illustrated in FIGS. 6H-6I). In some embodiments, the stack includes at least user interface representations of all open applications and the user can navigate through the representations and select a desired application using subsequent inputs (e.g., drag gestures to the left or right in accordance with the operations described for method 1000).

In some embodiments, while displaying the second user interface on the display, the device detects (1126) a second input by a second contact on the touch-sensitive surface (e.g., contact 626 in FIG. 6Q). While detecting the second input by the second contact, the device redisplays (1128) the first user interface representation and at least the second user interface representation on the display (e.g., as illustrated in FIG. 6R, where user interface representation 510 is now displayed over user interface representation 508).

In some embodiments, while redisplaying the first user interface representation and at least the second user interface representation on the display, the device detects (1130) termination of the second input by the second contact (e.g., lift off of contact 626, as illustrated in FIG. 6S). In response to detecting termination of the second input by the second contact (1132): in accordance with a determination that the second contact had a characteristic intensity during the input that was below the predetermined intensity threshold (e.g., deep press intensity threshold ($IT_D$)) and the second contact moved during the second input in a direction across the touch-sensitive surface that corresponds to the predefined direction on the display, the device redisplays (1134) the first user interface (e.g., toggles back from the second user interface to the first user interface, as illustrated in FIG. 6S).

In response to detecting termination of the second input by the second contact (1132): in accordance with a determination that the second contact had a characteristic intensity during the second input that was below the predetermined intensity threshold (e.g., deep press intensity threshold ($IT_D$)) and the second contact did not move during the second input in a direction across the touch-sensitive surface that corresponds to the predefined direction on the display (e.g., the contact was stationary), the device redisplays (1136) the second user interface (e.g., the user has only peeked back at a representation of the first user interface, without toggling back.

In some embodiments, the input by the first contact includes a press input at a location on the touch-sensitive surface that corresponds to a first predetermined region on or near the display (e.g., the left edge of the display or bezel, for example, as illustrated in FIGS. 6A-6D). While displaying the first user interface on the display after detecting termination of the input by the first contact, the device detects (1138) a second input by a second contact on the touch-sensitive surface, where the second input by the second contact on the touch-sensitive surface is a press input at a location on the touch-sensitive surface that corresponds to a second predetermined region on or near the display (e.g., the right edge of the display or bezel, or somewhere within the first user interface) that is different from the first predetermined region.

In response to detecting the second input by the second contact on the touch-sensitive surface, the device performs (1140) a content-dependent operation associated with content of the first user interface (e.g., the content-dependent operation is selection or activation of an item in the first user interface, or any other content-specific operation associated with first user interface that is unrelated to the user interface selection mode).

In some embodiments, the first user interface is a view of a first application that includes a hierarchy of views (e.g., a webpage history or a navigation hierarchy). The input by the first contact includes a press input at or near a first edge of the touch-sensitive surface. After redisplaying the first user interface, the device detects (1142) an edge swipe gesture that originates from the first edge of the touch-sensitive surface. In response to detecting the edge swipe gesture that originates from the first edge of the touch-sensitive surface, the device displays (1144) a view in the hierarchy of views of the first application that precedes the first user interface (e.g., a previously viewed webpage).

In some embodiments, the first user interface is the user interface of a currently open application. In some embodiments, the first user interface is the current user interface of an application, which is preceded by a sequence of previous user interfaces for the application that are accessible by a "back" button provided on each of the user interfaces.

In some embodiments, while displaying the first user interface of the first application on the display, the device detects a drag gesture by a first contact on the touch-sensitive surface. In response to detecting the drag gesture by the first contact, in accordance with a determination that the drag gesture by the first contact occurs within an area of the touch-sensitive surface that corresponds to a first predefined area on or near the display, entering an application selection mode. In accordance with a determination that the drag gesture by the first contact occurs within an area of the touch-sensitive surface that corresponds to a second predefined area on or near the display that is distinct from the first predefined area, displaying a second user interface of the first application, on the display, that was displayed just prior to the display of the first user interface of the first application.

In some embodiments, the first predefined area is adjacent to the bottom edge of the display, and the second predefined area is at least a portion of the remainder of the display, e.g., an area above the first predefined area. In some embodiments, the drag gesture by the first contact, which occurs either within an area of the touch-sensitive surface that corresponds to the first predefined area or within an area of the touch-sensitive surface that corresponds to the second predefined area, is also required to start on an area of the touch-sensitive surface that corresponds to the left edge of the display or in an area of the touch-sensitive surface that corresponds to a predefined area adjacent to the left edge of the display (in order to either enter the application selection mode or display the second user interface.

In some embodiments, in accordance with the determination that the drag gesture by the first contact starts in an area of the touch-sensitive surface that corresponds to the first predefined area on the display, the device displays a plurality of user interface representations for a corresponding plurality of applications on the display, including a first user interface representation that corresponds to the first user interface of the first application and a second user interface representation that corresponds to a second user interface of a second application that is distinct from the first application. In some embodiments, display of the stack replaces display of the first user interface of the first application on the display. In some embodiments, the plurality of user interface representations are displayed in a stack. In some embodiments, the first user interface representation is displayed over and partially exposes the second user interface representation.

In some embodiments, after detecting termination of the input by the first contact, while displaying the stack in the user interface selection mode in accordance with the determination that the first contact reached an intensity during the input that was above the predetermined intensity threshold (e.g., as illustrated in FIGS. 6H-6I), the device detects (1146) a drag gesture by a second contact on the touch-sensitive surface at a location that corresponds to the second user interface representation on the display, where the drag gesture moves across the touch-sensitive surface in a direction that corresponds to a first direction on the display (e.g., as illustrated in FIGS. 5G-5I).

In response to detecting the drag gesture by the second contact on the touch-sensitive surface at a location corresponding to the second user interface representation on the display (1148), where the drag gesture moves across the touch-sensitive surface in a direction that corresponds to the first direction on the display, the device moves (1150) the second user interface representation in the first direction at a second speed based on a speed of the second contact (e.g., movement of user interface representation 510 from location 510-a in FIG. 5G to location 510-c in FIG. 5I); and the device moves (1152) the first user interface representation, disposed above the second user interface representation, in the first direction at a first speed greater than the second speed (e.g., movement of user interface representation 508 from location 508-a in FIG. 5G to location 508-b, and off the screen in FIG. 5I). In some embodiments, once the user interface selection mode is activated, it may be navigated according to the processes described above for method 1000.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1200, 1300, 1400, 1500, 2400, and 2500) are also applicable in an analogous manner to method 1000 described above with respect to FIGS. 11A-11E. For example, the contacts, gestures, user interface objects, intensity thresholds, focus selectors, and animations described above with reference to method 1100 optionally have one or more of the characteristics of the contacts, gestures, user interface objects, intensity thresholds, focus selectors, and animations described herein with reference to other methods described herein (e.g., methods 1000, 1200, 1300, 1400, 1500, 2400, and 2500). For brevity, these details are not repeated here.

FIGS. 12A-12E illustrate a flow diagram of a method 1200 of navigating between user interfaces in accordance with some embodiments. The method 1200 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 1000 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 1200 are, optionally, combined and/or the order of some operations is, optionally, changed.

As described below, the method 1200 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (1202) a first user interface on the display (e.g., user interface 502 in FIG. 7A). In some embodiments, the first user interface is the user interface of a currently open application. In some embodiments, the first user interface is the current user interface of an application, and display of the first user interface was preceded by display of a sequence of previous user interfaces of the application (e.g., previous web pages). In some embodiments, the previous user interfaces are accessible by activating a "back" button provided on the user interfaces of the application (e.g., back button 614 in FIG. 7A.

While displaying the first user interface on the display, the device detects (1204), on the touch-sensitive surface, an input by a first contact that includes a period of increasing intensity of the first contact (e.g., contact 702 having increasing intensity in FIGS. 7B-7E. In some embodiments, the input by the first contact is made with the flat portion of a thumb.

In response to detecting the input by the first contact that includes the period of increasing intensity of the first contact (e.g., contact 702), the device displays (1206) a first user interface representation for the first user interface and a second user interface representation for a second user interface (e.g., a user interface of a second application that was displayed just before the first user interface of the current application) on the display, wherein the first user interface representation is displayed over the second user interface representation and partially exposes the second user interface representation (e.g., user interface representations 508 and 510 in FIG. 7C.

In some embodiments, the first user interface representation and the second user interface representation are displayed in a stack. In some embodiments, display of the stack replaces display of the first user interface on the display.

In some embodiments, the user interface enters a "peek" mode in response to a light press, and as the contact intensity increases or decreases after activation of the "peek" mode, a varying amount of the user interface representation for the previously displayed application is revealed from beneath the representation of the user interface of the current application (e.g., as the intensity of contact 702 increases from FIG. 7C to FIG. 7D, more of user interface representation 510 is revealed from beneath user interface representation 508).

In some embodiments, before the period of increasing intensity of the first contact, the first contact has a period of varying intensity that includes both rising and falling intensities (e.g., the intensity of contact 704 rises from FIG. 7G to FIG. 7H, falls from FIG. 7H to FIG. 7I, and then increases again from FIG. 7I to FIG. 7J. The device dynamically changes (1208) an area of the second user interface representation that is revealed from behind the first user interface representation in accordance with rising and falling of the intensity of the first contact during the period of varying intensity (e.g., more of user interface representation 508 is revealed when the intensity of contact 704 rises from FIG. 7G to FIG. 7H; less of user interface representation 508 is revealed when the intensity of contact 704 falls from FIG. 7H to FIG. 7I, and then more of user interface representation 708 is revealed again when the intensity of contact 704 rises from FIG. 7I to FIG. 7J.

The method also includes that, while displaying the first user interface representation and the second user interface representation on the display, the device detects (1210) that, during the period of increasing intensity of the first contact, the intensity of the first contact meets one or more predetermined intensity criteria (e.g., the intensity of the first contact is at or above a predetermined threshold intensity, such as a deep press intensity threshold ($IT_D$), as illustrated in FIG. 7E).

In some embodiments, during the period of increasing contact intensity of the first contact and before the intensity of the first contact meets the one or more predetermined intensity criteria, the device increases (1212) an area of the second user interface representation that is revealed from behind the first user interface representation in accordance with an increase in intensity of the first contact. For example, as the intensity of contact 702 increases from FIG. 7C to FIG. 7D, more of user interface representation 510 is revealed from beneath user interface representation 508. In some embodiments, the second user interface is displayed larger (e.g., as if coming towards the user from behind the plane of the display) in response to increasing intensity of the contact.

In some embodiments, increasing the area of the second user interface representation that is revealed from behind the first user interface representation in accordance with the increase in intensity of the first contact includes displaying (1214) an animation that dynamically changes the amount of area of the second user interface representation that is revealed from behind the first user interface representation based on changes in the intensity of the first contact over time.

In some embodiments, dynamically changing the amount of area includes updating the amount of area of the second user interface multiple times a second (e.g., 10, 20, 30, or 60 times per second), optionally without regard to whether or not the contact meets the one or more predetermined intensity criteria. In some embodiments, the animation is a fluid animation that is updated as the intensity of the first contact changes, so as to provide feedback to the user as to the amount of intensity detected by the device (e.g., feedback as to the amount of force applied by the user). In some embodiments the animation is updated smoothly and quickly so as to create the appearance for the user that the user interface is responding in real-time to changes in force applied to the touch-sensitive surface (e.g., the animation is perceptually instantaneous for the user so as to provide immediate feedback to the user and enable the user to better modulate the force that they are applying to the touch-sensitive surface to interact efficiently with user interface objects that are responsive to contacts with different or changing intensity).

In some embodiments, increasing the area of the second user interface representation that is revealed from behind the first user interface representation in accordance with the increase in intensity of the first contact includes moving (1216) the first user interface representation in a first direction to increase a lateral position offset on the display between the first user interface representation and the second user interface representation. For example, as the intensity of contact 704 increases from FIG. 7G to FIG. 7H, user interface representation 510 slides to the right, from location 510-a in FIG. 7G to location 510-b in FIG. 7H, revealing more of user interface representation 508. In some embodiments, as a finger contact presses harder on the touch-sensitive surface at a location that corresponds to the left edge of the display or a predefined area adjacent to the left edge of the display, the first user interface representation moves to the left to reveal more of the second user interface representation.

In some embodiments, increasing the area of the second user interface representation that is revealed from behind the first user interface representation in accordance with the increase in intensity of the first contact includes, while moving the first user interface representation in the first direction to increase the lateral position offset on the display between the first user interface representation and the second user interface representation, moving (718) the first user interface representation and the second user interface representation towards each other in a second direction perpendicular to the first direction (e.g., as the intensity of contact 702 increases from FIG. 7C to FIG. 7D, first user interface representation 508 appears to move away from the surface of touch screen 112, and second user interface representation 510 appears to move towards the surface of the touch screen. In some embodiments, the second direction perpendicular to the first direction is the z-direction perpendicular to the surface of the display. In some embodiments, the first user interface representation and the second user interface representation move towards a same layer in a z-layer order.

In some embodiments, the device detects (1220) that the intensity of the first contact meets the one or more predetermined intensity criteria (e.g., deep press intensity threshold ($IT_D$), as illustrated in FIG. 7E). In response to detecting that the intensity of the first contact meets the one or more predetermined intensity criteria, the device displays (1222) an animation showing the first user interface representation receding behind the second user interface representation and the second user interface representation moving into the foreground and transitioning to the second user interface (e.g., user interface representation 510 pops out from behind user interface representation 508, as illustrated in FIG. 7E, and then an animation transitions the display into user interface 507 in FIG. 7F).

In some embodiments, the device changes (1224) a level of blurring effect applied to at least one of the first user interface representation and the second user interface representation during the animation. E.g., the first user interface representation becomes more blurred and/or the second user interface representation becomes less blurred during the animation, as illustrated in the series of FIGS. 7C-7E, where user interface representation 510 starts off blurry in FIG. 7C and comes into focus as it appears to move towards the surface of touch screen 112. In contrast, user interface 508 starts off in focus in FIG. 7C and becomes blurry as it appears to move away from the surface of touch screen 112.

The method also includes that, in response to detecting that the intensity of the first contact meets the one or more predetermined intensity criteria (1226): the device ceases to display (1228) the first user interface representation and the second user interface representation on the display; and the device displays (1230) the second user interface on the display (e.g., without displaying the first user interface). In some embodiments, the "peek" is followed by a "pop" that displays the second user interface, when the contact intensity reaches or exceeds a predetermined deep press threshold intensity. For example, when the intensity of contacts 702, 704, and 706 reach a deep press intensity threshold (ITD) in FIGS. 7F, 7J, and 70, respectively, the user second user interface representation "pops," and the device displays the corresponding user interface.

In some embodiments, while displaying the second user interface on the display, the device detects (1232), on the touch-sensitive surface, an input by a second contact that includes a period of increasing intensity of the second contact (e.g., contact 706 having increasing intensity in FIGS. 7L to 7O).

In response to detecting the input by the second contact that includes the period of increasing intensity of the second contact, the device displays (1234) the first user interface representation and the second user interface representation on the display, wherein the second user interface representation is displayed over the first user interface representation and partially exposes the first user interface representation (e.g., display of user interface representations 508 and 510 in FIG. 7M).

In some embodiments, the first user interface representation and the second user interface representation are displayed in a second stack. In some embodiments, display of the second stack replaces display of the second user interface on the display.

In some embodiments, the user interface enters a "peek" mode in response to a light press, and as the contact intensity increases or decreases after activation of the "peek" mode, a varying amount of the user interface representation for the previously displayed application is revealed from beneath the representation of the user interface of the current application. For example, more of user interface representation 508 is revealed from behind user interface representation 510 in response to detection of an increasing intensity of contact 706 in FIGS. 7M-7N.

In some embodiments, while displaying the first user interface representation and the second user interface representation on the display, the device detects (1236) that, during the period of increasing intensity of the second contact, the intensity of the second contact meets the one or more predetermined intensity criteria.

In response to detecting that the intensity of the second contact meets the one or more predetermined intensity criteria (1238), the device ceases to display (1240) the first user interface representation and the second user interface representation on the display; and the device displays (1242) the first user interface on the display (e.g., without displaying the second user interface). For example, device 100 detects that the intensity of contact 706 exceeds a deep press intensity threshold (ITD), and in response replaces display of user interface 506 with first user interface 508 in FIG. 7O. In some embodiments, the "peek" is followed by a "pop" that displays the first user interface, when the contact intensity reaches or exceeds a predetermined deep press threshold intensity.

In some embodiments, while displaying the second user interface on the display, the device detects (1244), on the touch-sensitive surface, an input by a second contact that includes a period of increasing intensity of the second contact. (e.g., contact 704 having increasing intensity in FIGS. 7G-7H)

In response to detecting the input by the second contact that includes the period of increasing intensity of the second contact, the device displays (1246) the first user interface representation and the second user interface representation on the display, wherein the second user interface representation is displayed over the first user interface representation and partially exposes the first user interface representation (e.g., display of user interface representations 508 and 510 in FIG. 7M).

In some embodiments, the first user interface representation and the second user interface representation are displayed in a second stack. In some embodiments, display of the second stack replaces display of the second user interface on the display.

In some embodiments, the user interface enters a "peek" mode in response to a light press, and as the contact intensity increases or decreases after activation of the "peek" mode, a varying amount of the user interface representation for the previously displayed application is revealed from beneath the representation of the user interface of the current application. For example, more of user interface representation 508 is revealed from behind user interface representation 510 in response to detection of an increasing intensity of contact 704 in FIGS. 7G-7H.

While displaying the first user interface representation and the second user interface representation on the display, the device detects (1248) termination of the input by the second contact (e.g., detecting lift off of the second contact (e.g., as in FIG. 7K) or detecting the intensity of the second contact fall below a minimum intensity detection threshold (e.g., as in FIG. 7J)) without the intensity of the second contact having met the one or more predetermined intensity criteria.

In response to detecting termination of the input by the second contact without the intensity of the second contact having met the one or more predetermined intensity criteria (1250): the device ceases to display (1252) the first user interface representation and the second user interface representation on the display; and the device displays (1254) the second user interface on the display (e.g., without displaying the first user interface). For example, device 100 detects that the intensity of contact 704 falls below a minimum intensity detection threshold (ITO, and in response replaces display of user interface 506 with second user interface 510 in FIG. 7J. In some embodiments, when the input terminates without the contact intensity reaching a predetermined deep press threshold intensity, the "peek" ceases and the second user interface is redisplayed.

It should be understood that the particular order in which the operations in FIGS. 12A-12E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1300, 1400, 1500, 2400, and 2500) are also applicable in an analogous manner to method 1200 described above with respect to FIGS. 10A-10H. For example, the contacts, gestures, user interface objects, intensity thresholds, focus selectors, and animations described above with reference to method 1200 optionally have one or more of the characteristics of the contacts, gestures, user interface objects, intensity thresholds, focus selectors, and animations described herein with reference to other methods described herein (e.g., methods 1000, 1100, 1300, 1400, 1500, 2400, and 2500). For brevity, these details are not repeated here.

FIGS. 13A-13D illustrate a flow diagram of a method 1300 of navigating between user interfaces in accordance with some embodiments. The method 1300 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 1000 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 1300 are, optionally, combined and/or the order of some operations is, optionally, changed.

As described below, the method 1300 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (1302) a plurality of user interface representations in a stack on the display, (e.g., in a user interface selection mode, displaying a stack of cards (or other objects) in a z-layer order representing user interfaces of open applications, cards representing current and previously viewed user interfaces of a single application, cards representing messages in an e-mail chain, etc.). At least a first user interface representation, a second user interface representation, and a third user interface representation are visible on the display. The first user interface representation (e.g., user interface representation 508 in FIG. 8A) is laterally offset from the second user interface representation in a first direction (e.g., laterally offset to the right on the display) and partially exposes the second user interface representation. The second user interface representation (e.g., user interface representation 510 in FIG. 8A) is laterally offset from the third user interface representation (e.g., user interface representation 526 in FIG. 8A) in the first direction (e.g., laterally offset to the right on the display) and partially exposes the third user interface representation. For example, in some embodiments, the stack is displayed when the display is in a user interface selection mode, as shown in FIG. 8A.

In some embodiments, prior to displaying the stack on the display (1304): the device displays (1306) a first user interface that corresponds to the first user interface representation on the display (e.g., user interface 502 of a web browsing application, as illustrated in FIG. 7A). While displaying the first user interface, the device detects (1308) a predetermined input. In some embodiments, the predetermined input is, for example, a double-tap or double press on the "home" button on the device; or, for an electronic device that includes one or more sensors to detect intensity of contacts with a touch-sensitive display; a deep press on a predetermined area of the first user interface (e.g., an upper left corner); a deep press with the flat portion of a thumb anywhere on the first user interface; or a deep press on a predetermined area of the device, such as on the left edge of the touch-sensitive display, in a predefined area adjacent to the left edge of the touch-sensitive display, on the bottom edge of the touch-sensitive display, or in a predefined area adjacent to the bottom edge of the touch-sensitive display.

In response to detecting the predetermined input (1310): The device enters (1313) a user interface selection mode; and the device displays (1312) the stack comprising the plurality of user interface representations (e.g., display of user interface 506 of a user interface selection mode including display of a stack in FIG. 9A).

In some embodiments, the stack is displayed (1316) in response to detecting an input by the first contact (e.g., a press input with an intensity above a predefined threshold) when the first contact is at a first location on the touch-sensitive surface that corresponds to an onscreen location other than the second user interface representation (e.g., contact 806 is detected at location 806-a, which does not correspond with display of user interface representation 510 on touch screen 112 in FIGS. 8J-8K). The first contact moves on the touch-sensitive surface from the first location to the location that corresponds to the second user interface representation on the display before the increase in intensity of the first contact is detected (e.g., contact 806-a moves from location 806-a to location 806-b in FIG. 8K-8L). For example, the first contact is continuously detected on the device from before the time that the second user interface representation is displayed until at least the time that the increased area of the second user interface representation that is exposed from behind the first user interface representation is displayed.

The method also includes that the device detects (1318) an input by a first contact on the touch sensitive surface at a location that corresponds to the second user interface representation on the display (e.g., contact 802 at a location corresponding to display of user interface representation 510 on touch screen 112 in FIG. 8A). In some embodiments, the device detects a press by a finger contact at a location on the touch-sensitive surface that corresponds to a user interface representation in the stack, and the device detects a varying intensity of the finger contact (e.g., the intensity of contact 802 increases from FIG. 8A to FIG. 8B, decreases from FIG. 8B to FIG. 8C, and then increases again from FIG. 8C to FIG. 8D).

In some embodiments, the input by the first contact includes a period of decreasing intensity of the first contact following a period of increasing intensity of the first contact. During the period of decreasing intensity of the first contact, the device decreases (1320) the area of the second user interface representation that is exposed from behind the first user interface representation by decreasing the lateral offset between the first user interface representation and the second user interface representation. For example, in response to the decreasing intensity of contact 802 from FIG. 8B to FIG. 8C, user interface representation 508 starts to slide back over user interface representation 510, moving from location 508-b in FIG. 8B to location 508-c in FIG. 8C.

In some embodiments, after revealing more of the second user interface representation in response to detecting an increase in the contact intensity, the device reveals less of the second user interface representation in response to detecting a decrease in the contact intensity (e.g., in response to increasing intensity of contact 802 from FIG. 8A to FIG. 8B, user interface representation 508 slides to the right of user interface representation 510, moving from location 508-a in FIG. 8A to location 508-b in FIG. 8B). In some embodiments, an animation is displayed to show movement of the first user interface representation and the second user interface representation in a manner that dynamically responds to small changes in the intensity of the first contact (e.g., movement of user interface representation 508 in FIGS. 8A-8C is directly manipulated by the user increasing or decreasing the intensity of contact 802.

The method also includes that, in accordance with detecting an increase in intensity of the first contact on the touch-sensitive surface at the location that corresponds to the second user interface representation on the display, the device increases (1322) an area of the second user interface representation that is exposed from behind the first user interface representation by increasing the lateral offset between the first user interface representation and the second user interface representation (e.g., in response to increasing intensity of contact 802 from FIG. 8A to FIG. 8B, user interface representation 508 slides to the right of user interface representation 510, moving from location 508-a in FIG. 8A to location 508-b in FIG. 8B and revealing more of user interface representation 810).

In some embodiments, the second user interface representation (e.g., user interface representation 510 in FIGS. 8A-8C) is positioned below the first user interface representation (e.g., user interface representation 508 in FIGS. 8A-8C) and above the third user interface representation (e.g., user interface representation 526 in FIGS. 8A-8C) in a z-layer order, and a press by the contact at a location on the touch-sensitive surface that corresponds to the exposed portion of the second user interface representation reveals more of the second user interface representation. In some embodiments, to reveal more of the second user interface representation, the first user interface representation moves to the right in response to detecting an increasing intensity of the contact at a location on the touch-sensitive surface that corresponds to the exposed portion of the second user interface representation, thereby "peeking" at more of the second user interface representation (e.g., movement of user interface 508 from location 508-a in FIG. 8A to location 508-b in FIG. 8B in response to increasing intensity of contact 802 reveals more of user interface representation 510).

In some embodiments, increasing the area of the second user interface representation that is exposed from behind the first user interface representation includes moving (1324) the first user interface representation in the first direction (e.g., moving the first user interface representation to the right to increase the lateral offset between the first user interface representation and the second user interface representation). For example, user interface representation 508 moves to the right to reveal more of user interface representation 510 in FIGS. 8A-8B.

In some embodiments, increasing the area of the second user interface representation that is exposed from behind the first user interface representation includes moving (1326) the second user interface representation in a second direction that is opposite the first direction (e.g., moving the second user interface representation to the left (with or without concurrent movement of the first user interface representation to the right), to increase the lateral offset between the first user interface representation and the second user interface representation on the display). For example, user interface representation 510 moves to the left to reveal more of the representation in FIGS. 8G-8H.

In some embodiments, while displaying the stack, the device detects (1328) a drag gesture by a second contact on the touch-sensitive surface at a location that corresponds to the second user interface representation and that moves across the touch-sensitive surface in a direction that corresponds to a second direction that is opposite the first direction on the display; and (e.g., detecting a leftward drag on the touch-sensitive surface at a location that corresponds to the second user interface representation).

In response to detecting the drag gesture by the second contact on the touch-sensitive surface at a location that corresponds to the second user interface representation in a direction on the touch-sensitive surface that corresponds to the second direction on the display (1330) the device: moves (1332) the second user interface representation in the second direction at a second speed on the display based on a speed of the second contact on the touch-sensitive surface; moves (1334) the first user interface representation in the second direction at a first speed greater than the second speed; moves (1336) the third user interface representation in the second direction at a third speed less than the second speed; and moves (1338) a fourth user interface representation in the second direction at a fourth speed greater than the second speed. In some embodiments, the fourth speed is greater than the first speed. In some embodiments, the fourth user interface representation is disposed on top of the first user interface representation in the stack.

In some embodiments, in response to a prior drag gesture to the right, the fourth user interface representation was moved off the display to the right. A subsequent drag gesture to the left causes the fourth user interface representation to come into view on the display from the right (e.g., a drag gesture including contact 546 and movement 548 from location 546-c in FIG. 5L, through location 546-e in FIG. 5M, to location 546-f in FIG. 5N causes user interface representation 508 to come back into view on the display from the right. In some embodiments, the speed of the fourth user interface representation is faster than any user interface representations below it in relative z-position.

In some embodiments, the device detects (1340) that the intensity of the first contact on the touch-sensitive surface at a location that corresponds to the second user interface representation meets one or more predetermined intensity criteria (e.g., the intensity of the first contact is at or above a predetermined threshold intensity, such as a deep press intensity threshold, as illustrated in FIG. 8D).

In response to detecting that the intensity of the first contact on the touch-sensitive surface at the location that corresponds to the second user interface representation meets the one or more predetermined intensity criteria (1342) the device: ceases to display (1342) the stack; and displays (1348) a second user interface that corresponds to the second user interface representation. For example, in response to detecting that the intensity of contact 802 exceeds a deep press intensity threshold (ITD) when at a location on touch screen 112 corresponding to display of user interface representation, device 100 replaces display of user interface 506 (corresponding to a user interface selection mode) with display of user interface 507 (corresponding to user interface representation 510) in FIGS. 8C-8D. In some embodiments, the second user interface is displayed without displaying any user interfaces that correspond to other user interface representations in the stack. In some embodiments, the display of the second user interface replaces the display of the stack.

In some embodiments, in response to detecting that the intensity of the first contact on the touch-sensitive surface at the location that corresponds to the second user interface representation meets the one or more predetermined intensity criteria, the device displays an animation of the second user interface representation transitioning to the second user interface. For example, in response to detecting that the intensity of contact 802 exceeds a deep press intensity threshold (ITD) when at a location on touch screen 112 corresponding to display of user interface representation, device 100 displays an animation where first user interface representation 508 completely slides off second user interface representation 510 to the right, second user interface 510 appears to be lifted from the stack (e.g., passing through location 510-b in FIG. 8E to location 510-c in FIG. 8F), and first user interface representation 508 is shuffled back into the stack below second user interface representation 510 as the device transitions into display of user interface 507, as illustrated in the series of FIGS. 8C, 8E, and 8F.

In some embodiments, the device detects (1350) movement of the first contact from a location on the touch sensitive surface that corresponds to the second user interface representation to a location on the touch-sensitive surface that corresponds to the third user interface representation on the display, where an intensity of the first contact during the movement of the first contact is less than a characteristic intensity detected during the increase in intensity of the first contact at a location on the touch-sensitive surface that corresponds to the second user interface representation (e.g., device 100 detects movement 808 of contact 806 from location 806-b in FIG. 8N, corresponding to display of user interface representation 510, to location 806-c in FIG. 8O, corresponding to display of user interface representation 526).

In accordance with detecting an increase in intensity of the first contact on the touch-sensitive surface at the location that corresponds to the third user interface representation on the display, the device increases (1352) an area of the third user interface representation that is exposed from behind the second user interface representation by increasing the lateral offset between the second user interface representation and the third user interface representation (e.g., device 100 detects an increase in the intensity of contact 806 from FIG. 8O to FIG. 8P, and in response moves user interface representations 510 and 508 to the right, from locations 510-a and 508-a in FIG. 8O to locations 510-h and 508-h in FIG. 8P, respectively, to reveal more of user interface 526). In some embodiments, only the user interface representation directly above the selected user interface representation (e.g., rather than all user interface representation above the selected user interface representation) is moved out of the way to reveal more of the selected user interface representation. For example, only user interface representation 510 would be moved in FIG. 8O, to reveal more of user interface representation 526 (e.g., by sliding further under user interface representation 508).

In some embodiments, as the user drags their finger over different representations in the stack, the stack spreads apart to reveal more of the representation under the user's finger. In some embodiments, the user can increase intensity of the contact to peek at one representation, reduce intensity (without lifting off), move to the next representation, increase intensity to peek at the next representation, reduce intensity (without lifting off), move to another representation, and so on.

It should be understood that the particular order in which the operations in FIGS. 13A-13D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1400, 1500, 2400, and 2500) are also applicable in an analogous manner to method 1300 described above with respect to FIGS. 13A-13D. For example, the contacts, gestures, user interface objects, intensity thresholds, focus selectors, and animations described above with reference to method 1300 optionally have one or more of the characteristics of the contacts, gestures, user interface objects, intensity thresholds, focus selectors, and animations described herein with reference to other methods described herein (e.g., methods 1000, 1100, 1200, 1400, 1500, 2400, and 2500). For brevity, these details are not repeated here.

Figure 14A:
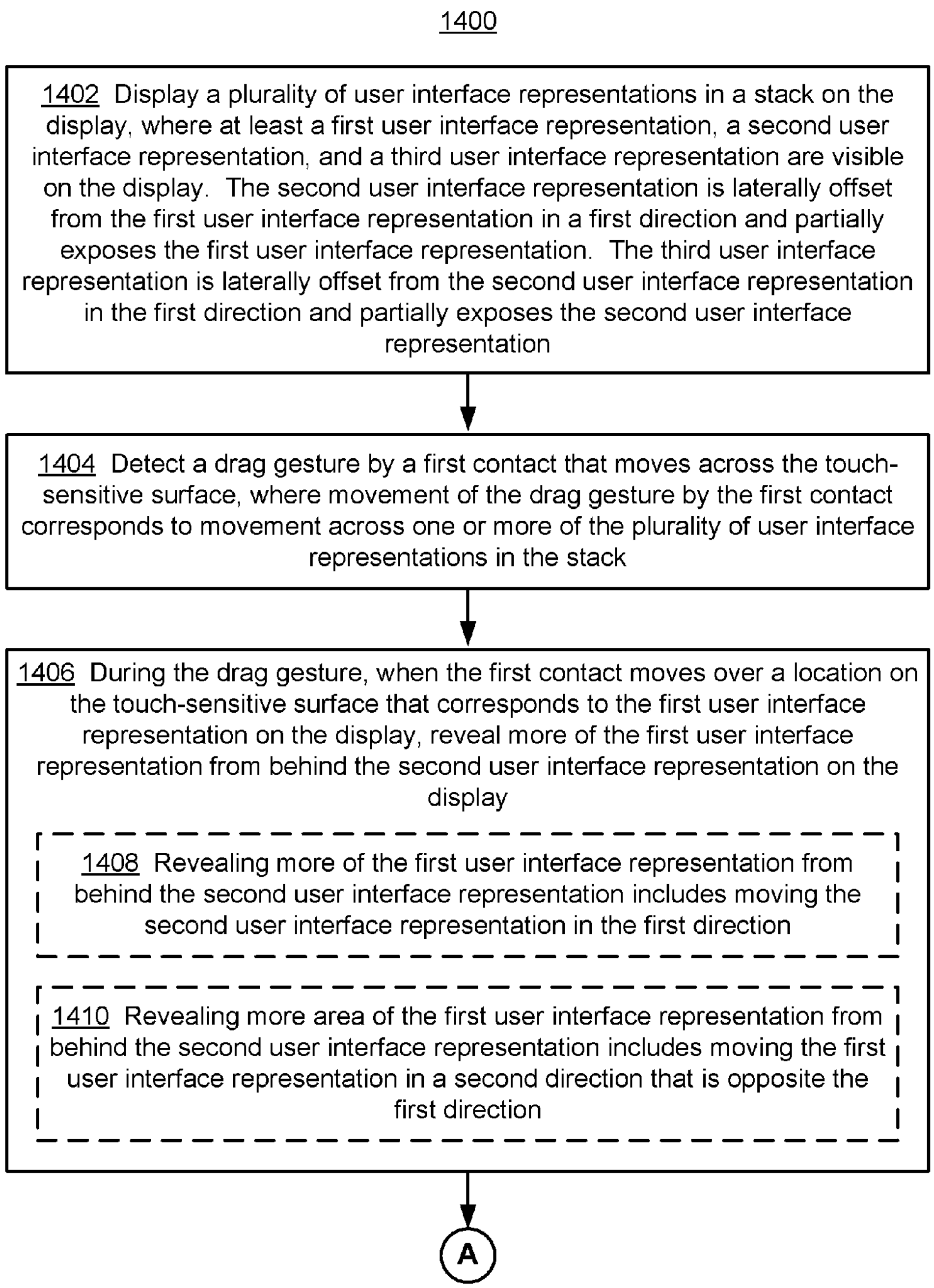
FIGS. 14A-14C are flow diagrams illustrating a method of navigating between user interface representations in a user interface selection mode in accordance with some embodiments.
Figure 14B:
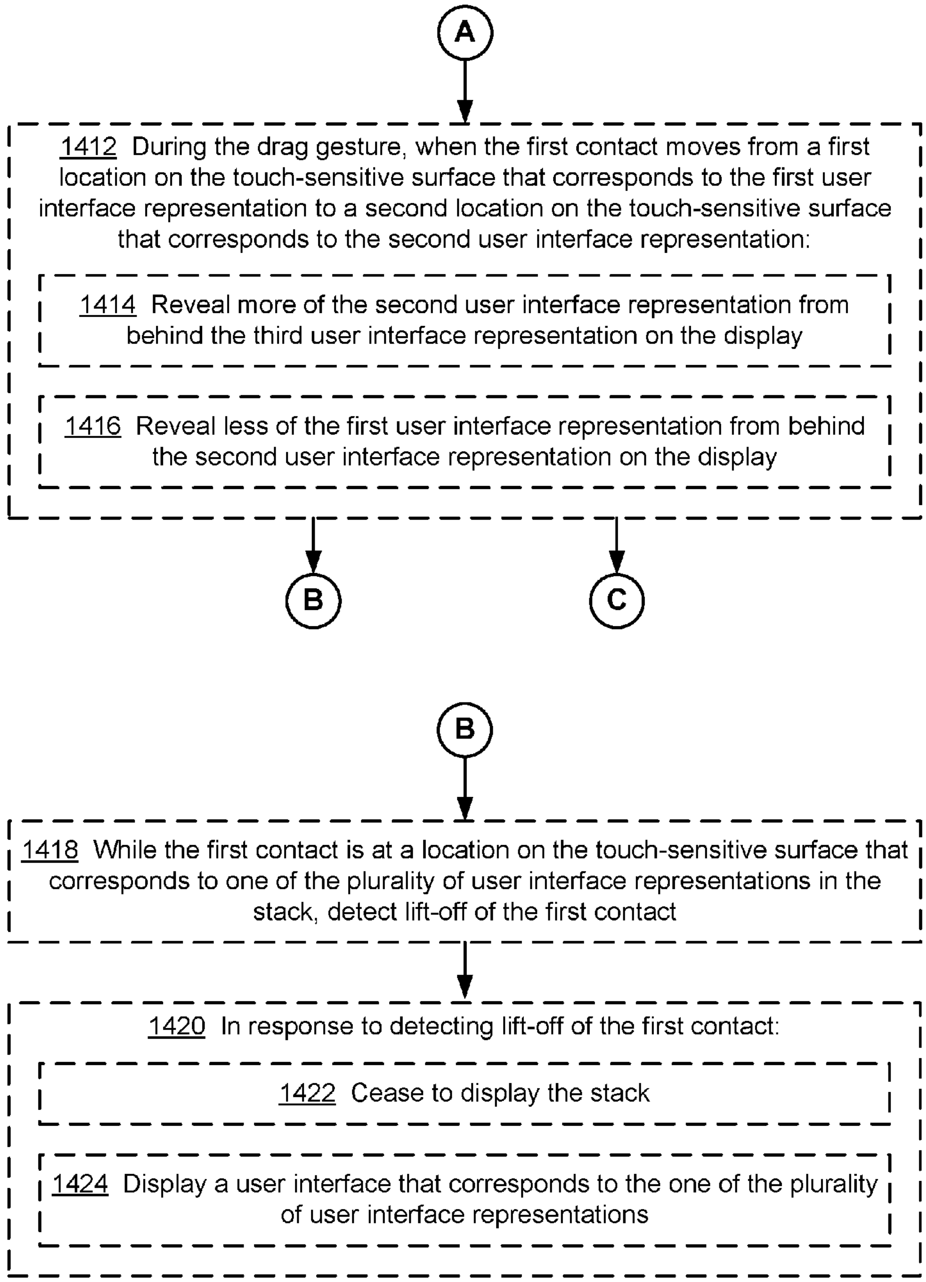
Figure 14C:
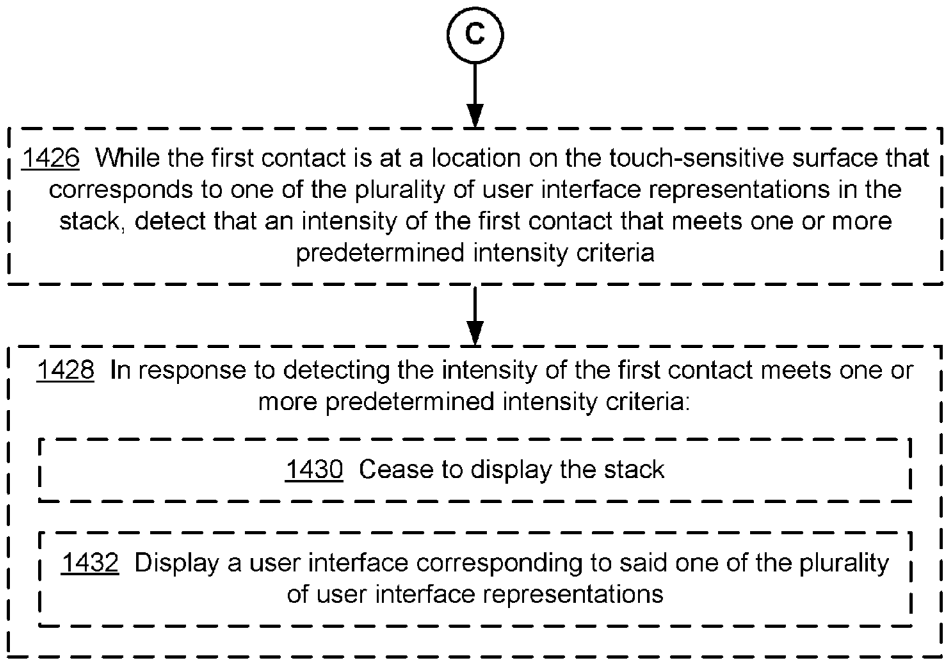
Figure 15:
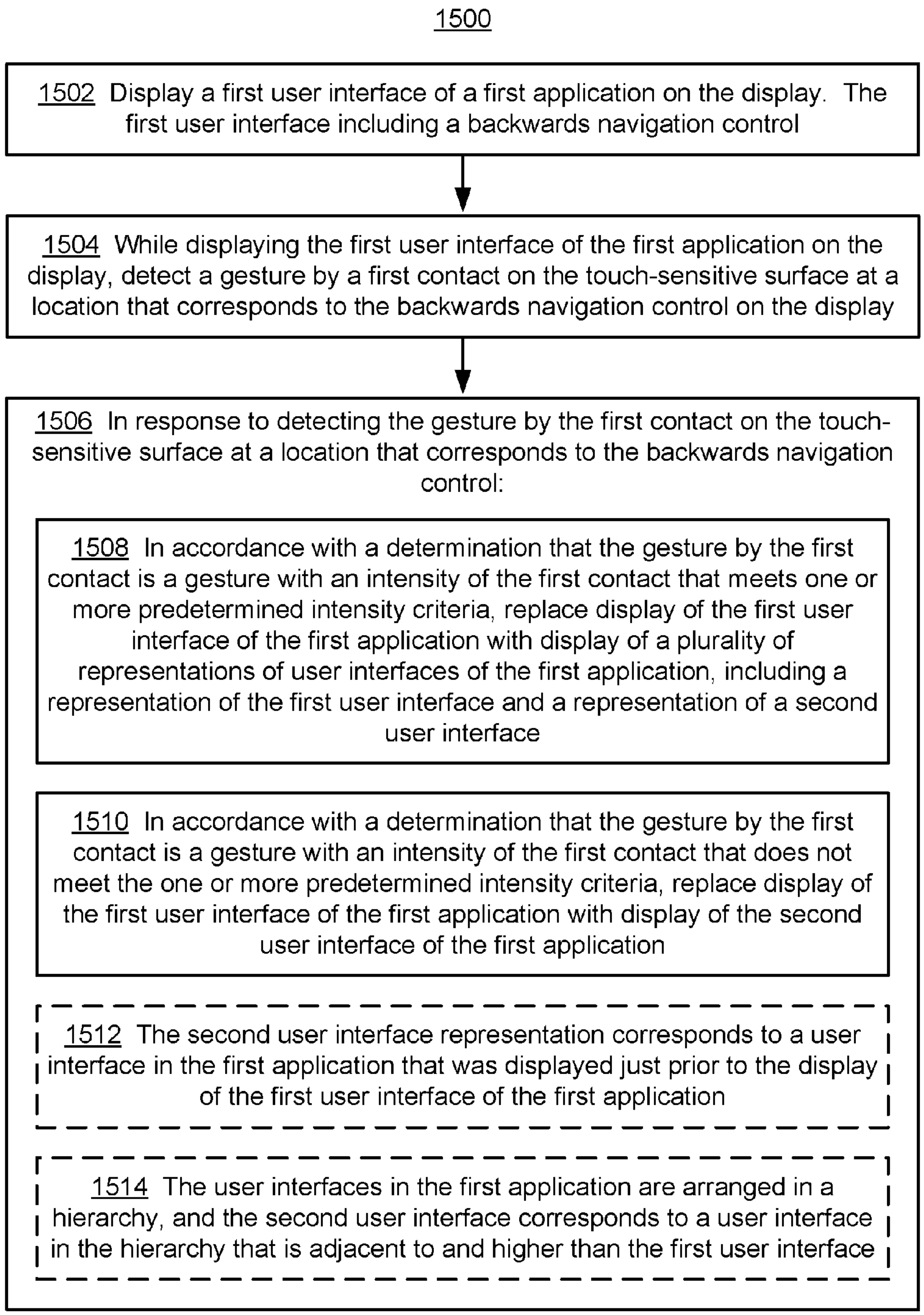
FIG. 15 is a flow diagram illustrating a method of navigating between user interfaces in a hierarchy of user interfaces for an application in accordance with some embodiments.

FIGS. 14A-14C illustrate a flow diagram of a method 1400 of navigating between user interfaces in accordance with some embodiments. The method 1400 is performed at an electronic device (e.g., device 300, FIG. 3, or portable multifunction device 100, FIG. 1A) with a display, a touch-sensitive surface, and optionally one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 1000 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 1400 are, optionally, combined and/or the order of some operations is, optionally, changed.

As described below, the method 1400 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (1402) a plurality of user interface representations in a stack on the display, (e.g., in a user interface selection mode, displaying a stack of cards (or other objects) in a z-layer order representing user interfaces of open applications, cards representing current and previously viewed user interfaces of a single application, cards representing messages in an e-mail chain, etc.). At least a first user interface representation, a second user interface representation, and a third user interface representation are visible on the display (e.g., a stack displaying user interface representations 508, 510, and 526, as illustrated in FIG. 9A). The second user interface representation (e.g., user interface representation 510 in FIG. 9A) is laterally offset from the first user interface representation in a first direction (e.g., laterally offset to the right on the display) and partially exposes the first user interface representation (e.g., user interface representation 526 in FIG. 9A). The third user interface representation (e.g., user interface representation 508 in FIG. 9A) is laterally offset from the second user interface representation in the first direction (e.g., laterally offset to the right on the display) and partially exposes the second user interface representation.

The device detects (1404) a drag gesture by a first contact that moves across the touch-sensitive surface, where movement of the drag gesture by the first contact corresponds to movement across one or more of the plurality of user interface representations in the stack. For example, a drag gesture including contact 902 and movement 904 in FIG. 9B.

During the drag gesture, when the first contact moves over a location on the touch-sensitive surface that corresponds to the first user interface representation on the display, the device reveals (1406) more of the first user interface representation from behind the second user interface representation on the display. For example, as contact 902 moves over user interface representation 526, user interface representations 510 and 508 move to the right to reveal more of user interface representation 526 in FIG. 9B.

In some embodiments, revealing more of the first user interface representation from behind the second user interface representation includes moving (1408) the second user interface representation in the first direction (e.g., moving the second user interface representation to the right to increase the lateral offset between the first user interface representation and the second user interface representation).

In some embodiments, revealing more area of the first user interface representation from behind the second user interface representation includes moving (1410) the first user interface representation in a second direction that is opposite the first direction (e.g., moving the first user interface representation to the left (with or without concurrent movement of the second user interface representation to the right), to increase the lateral offset between the first user interface representation and the second user interface representation on the display).

In some embodiments, during the drag gesture, when the first contact moves (1412) from a first location on the touch-sensitive surface that corresponds to the first user interface representation to a second location on the touch-sensitive surface that corresponds to the second user interface representation (e.g., movement of contact 902 from location 902-a, corresponding to display of user interface representation 526 in FIG. 9B to location 904 corresponding to display of user interface representation 510 in FIG. 9C): the device reveals (1414) more of the second user interface representation from behind the third user interface representation on the display, and reveals (1416) less of the first user interface representation from behind the second user interface representation on the display (e.g., user representation 510 moves to the left revealing more of its user interface representation and covering more of user interface representation 526 in FIG. 9D).

In some embodiments, while the first contact is at a location on the touch-sensitive surface that corresponds to one of the plurality of user interface representations in the stack, the device detects (1418) lift-off of the first contact (e.g., device 100 detects lift off of contact 902 in FIG. 9E). In response to detecting lift-off of the first contact (1420): the device ceases to display (1422) the stack; and the device displays (1424) a user interface that corresponds to said one of the plurality of user interface representations (e.g., device 100 replaces display of user interface 506 in FIG. 9E with display of user interface 507 in FIG. 9F).

For example, if the first contact in the drag gesture lifts off while over a location that corresponds to the first user interface representation, then the first user interface is displayed. If the first contact in the drag gesture lifts off while over a location that corresponds to the second user interface representation, then the second user interface is displayed. More generally, if the first contact in the drag gesture lifts off while over a location that corresponds to a respective user interface representation, then the corresponding user interface is displayed. In some embodiments, display of the user interface that corresponds to said one of the plurality of user interface representations replaces display of the stack.

In some embodiments, wherein the device has one or more sensors to detect intensity of contacts with the touch-sensitive surface, while the first contact is at a location on the touch-sensitive surface that corresponds to one of the plurality of user interface representations in the stack, the device detects (1426) that an intensity of the first contact meets one or more predetermined intensity criteria (e.g., the intensity of the first contact is at or above a predetermined threshold intensity, such as a deep press intensity threshold, as illustrated in FIG. 9G).

In response to detecting the intensity of the first contact meets one or more predetermined intensity criteria (1428): the device ceases to display (1430) the stack; and the device displays (1432) a user interface corresponding to said one of the plurality of user interface representations (e.g., device 100 replaces display of user interface 506 in FIG. 9G with display of user interface 507 in FIG. 9H).

For example, if the first contact in the drag gesture makes a deep press while over a location that corresponds to the first user interface representation, then the first user interface is displayed. If the first contact in the drag gesture makes a deep press while over a location that corresponds to the second user interface representation, then the second user interface is displayed. More generally, if the first contact in the drag gesture makes a deep press while over a location that corresponds to a respective user interface representation, then the corresponding user interface is displayed. In some embodiments, display of the user interface that corresponds to said one of the plurality of user interface representations replaces display of the stack.

It should be understood that the particular order in which the operations in FIG. 1400 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1300, 1500, 2400, and 2500) are also applicable in an analogous manner to method 1400 described above with respect to FIGS. 14A-14C. For example, the contacts, gestures, user interface objects, intensity thresholds, focus selectors, and animations described above with reference to method 1400 optionally have one or more of the characteristics of the contacts, gestures, user interface objects, intensity thresholds, focus selectors, and animations described herein with reference to other methods described herein (e.g., methods 1000, 1100, 1200, 1300, 1500, 2400, and 2500). For brevity, these details are not repeated here.

FIG. 15A illustrates a flow diagram of a method 1500 of navigating between user interfaces in accordance with some embodiments. The method 1500 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 1000 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 1500 are, optionally, combined and/or the order of some operations is, optionally, changed.

As described below, the method 1500 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (1502) a first user interface of a first application on the display. The first user interface including a backwards navigation control (e.g., user interface 6M including backwards navigation control icon 614). In some embodiments, the backwards navigation control is a back button or other icon that when activated (e.g., by a tap gesture) causes the device to replace display of the current user interface in an application with display of the prior user interface displayed in the application. In some embodiments, the first user interface is the current user interface of an application, whose display was preceded by the display of a sequence of previous user interfaces of the application. In some embodiments, the sequence of previous user interfaces of the application is navigated, in reverse chronological order, by activating a backwards navigation control provided on the user interfaces.

In some embodiments, the user interfaces for an application are arranged in a hierarchy and the backwards navigation control is a back button or other icon that when activated (e.g., by a tap gesture) causes the device to replace display of the current user interface in a first level of the hierarchy with display of a prior user interface at a second level in the hierarchy, where the second level is adjacent to and higher than the first level in the hierarchy. In some embodiments, the first user interface is the current user interface of an application, whose display was preceded by the display of a sequence of previous user interfaces in the hierarchy. In some embodiments, a hierarchical sequence of user interfaces for an application is navigated, in reverse hierarchical order, by activating a backwards navigation control. For example, a hierarchical sequence in an email application (including a multiple levels of mailboxes and inboxes) is navigated, in reverse hierarchical order, by activating a backwards navigation control that is provided on the user interfaces.

While displaying the first user interface of the first application on the display, the device detects (1504) a gesture by a first contact on the touch-sensitive surface at a location that corresponds to the backwards navigation control on the display (e.g., a tap gesture including contact 612 in FIG. 6M or a tap gesture including contact 624 in FIG. 6O).

In response to detecting the gesture by the first contact on the touch-sensitive surface at a location that corresponds to the backwards navigation control (1506): in accordance with a determination that the gesture by the first contact is a gesture (e.g., a stationary deep press gesture) with an intensity of the first contact that meets one or more predetermined intensity criteria (e.g., the intensity of the first contact during the gesture meets or exceeds a predetermined threshold intensity, such as a deep press intensity threshold), the device replaces (1508) display of the first user interface of the first application with display of a plurality of representations of user interfaces of the first application, including a representation of the first user interface and a representation of a second user interface. For example, device 100 determines that contact 612 includes an intensity satisfying a deep press intensity threshold, and in response, displays user interface representations 508, 618, and 622 of previous displayed web browsing user interfaces 502, 616, and 620, respectively, as illustrated in FIGS. 6M-6N.

In some embodiments, rather than requiring the deep press gesture to be on the backwards navigation control, the deep press gesture is made on an area of the touch-sensitive surface that corresponds to the left edge of the display or in an area of the touch-sensitive surface that corresponds to an area adjacent to the left edge of the display. In some embodiments, rather than requiring the deep press gesture to be on an area of the touch-sensitive surface that corresponds to the backwards navigation control, the deep press gesture is made anywhere on the touch-sensitive surface. In some embodiments, the gesture by the first contact is made with the flat portion of a thumb.

In response to detecting the gesture by the first contact on the touch-sensitive surface at a location that corresponds to the backwards navigation control (1506): in accordance with a determination that the gesture by the first contact is a gesture (e.g., a tap gesture) with an intensity of the first contact that does not meet the one or more predetermined intensity criteria (e.g., the intensity of the first contact during the gesture remains below the predetermined threshold intensity), the device replaces display (1510) of the first user interface of the first application with display of the second user interface of the first application (e.g., without displaying other user interfaces in the first application besides the second user interface). For example, device 100 determines that contact 624 does not include an intensity satisfying a deep press intensity threshold, and in response, displays user interface 616, corresponding to a web browsing user interface displayed prior to display of web browsing user interface 502, as illustrated in FIGS. 6O-6P.

In some embodiments, the second user interface representation corresponds (1512) to a user interface in the first application that was displayed just prior to the display of the first user interface of the first application.

In some embodiments, the user interfaces in the first application are arranged in a hierarchy, and the second user interface corresponds (1514) to a user interface in the hierarchy that is adjacent to and higher than the first user interface.

It should be understood that the particular order in which the operations in FIG. 15A have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1300, 1400, 2400, and 2500) are also applicable in an analogous manner to method 1500 described above with respect to FIG. 15A. For example, the contacts, gestures, user interface objects, intensity thresholds, focus selectors, animations described above with reference to method optionally have one or more of the characteristics of the contacts, gestures, user interface objects, intensity thresholds, focus selectors, animations described herein with reference to other methods described herein (e.g., methods 1000, 1100, 1200, 1300, 1400, 2400, and 2500). For brevity, these details are not repeated here.

FIGS. 24A-24F illustrate a flow diagram of a method 2400 of navigating between user interfaces in accordance with some embodiments. The method 2400 is performed at an electronic device (e.g., device 300, FIG. 3, or portable multifunction device 100, FIG. 1A) with a display and a touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 2400 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 2400 are, optionally, combined and/or the order of some operations is, optionally, changed.

As described below, the method 2400 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (2402), on the display, a user interface for an application. The device detects (2404) an edge input that includes detecting a change in a characteristic intensity of a contact proximate to an edge of the touch-sensitive surface. In response to detecting the edge input: in accordance with a determination that the edge input meets system-gesture criteria, the device performs (2406) an operation that is independent of the application (e.g., detection of the system-gesture criteria overrides detection of the application-gesture criteria; e.g., the operation that is independent of the application is performed even when the application-gesture criteria is met simultaneously). The system-gesture criteria include intensity criteria. In some embodiments, the intensity criteria are met when the characteristic intensity of the contact is above a first intensity threshold (e.g., a light press "$IT_L$" threshold). The system-gesture criteria include a location criterion that is met when the intensity criteria for the contact are met while (a predetermined portion of) the contact is within a first region relative to the touch-sensitive surface (e.g., a region that may or may not include a portion of the touch-sensitive surface). The first region relative to the touch-sensitive surface is determined based on one or more characteristics of the contact.

In some embodiments, the change in the characteristic intensity of the contact proximate to the edge of the touch-sensitive surface is (2408) detected at a location that corresponds to a respective operation in the application.

In some embodiments, in response to detecting the edge input: in accordance with a determination that the edge input meets application-gesture criteria and does not meet the system-gesture criteria, the device performs (2410) the respective operation in the application instead of performing the operation that is independent of the application. In some embodiments, in accordance with a determination that the edge input does not meet the system-gesture criteria and does not meet the application-gesture criteria, the device forgoes performing the operation that is independent of the application and the respective operation in the application.

In some embodiments, the intensity criteria is (2412) met when: the (detected) characteristic intensity of the contact proximate to the edge of the touch-sensitive surface is above a first intensity threshold; and the (detected) characteristic intensity of the contact proximate to the edge of the touch-sensitive surface is below a second intensity threshold. In some embodiments, detection of an increase in the characteristic intensity of the input above the second intensity threshold invokes the multitasking UI without requiring movement of the contact.

In some embodiments, the first region relative to the touch-sensitive surface has (2414) first boundaries (e.g., a first size and location) when the contact proximate to the edge of the touch-sensitive surface has first spatial properties (e.g., is a large, oblong contact characteristic of a flat finger input) and second boundaries, different from the first boundaries (e.g., a second size and/or location) when the contact proximate to the edge of the touch-sensitive surface has second spatial properties (e.g., is a small, round contact characteristic of a fingertip input). In some embodiments, the size and/or location of the region changes dynamically with the size of the contact. In some embodiments, the contact is categorized and one of a plurality of regions of different size and/or shape is selected based on the category of the contact.

In some embodiments, detecting the edge input includes (2416): detecting a first portion of the contact on the touch-sensitive surface proximate to the edge of the touch-sensitive surface; and extrapolating, based on the first portion of the contact, a second portion of the contact proximate to the edge of the touch-sensitive surface that extends beyond the edge of the touch sensitive surface, where the location of the contact, for the purposes of satisfying the location criteria, is determined based on at least in part on the extrapolated second portion of the contact (e.g., determining a location of the second portion of the contact proximate to the edge of the touch-sensitive surface with a maximum distance from the edge of the touch-sensitive surface based on a projection of the location of the second portion of the contact) (e.g., the contact is projected to the left and the location determination is based on a left most portion of the contact).

In some embodiments, in accordance with a determination that the contact proximate to the edge of the touch-sensitive surface has first spatial properties, the first region relative to the touch-sensitive surface is (2418) located entirely off of the touch-sensitive surface (e.g., located in a region that starts outside of the touch-sensitive surface and extends away from the edge of the touch-sensitive surface at which the first portion of the first contact was detected, such that the determination of whether or not the contact is within the first region is based on the extrapolated second portion of the contact that extends beyond an edge of the touch-sensitive surface); and in accordance with a determination that the contact proximate to the edge of the touch-sensitive surface has second spatial properties, the first region relative to the touch-sensitive surface includes a first portion located on the touch-sensitive surface, proximate to the edge of the touch-sensitive surface, and a second portion located off of the touch-sensitive surface, extending away from the edge of the touch sensitive surface (e.g., located in a region that starts within the touch-sensitive surface but extends off of the touch-sensitive surface away from the edge of the touch-sensitive surface at which the first portion of the first contact was detected, such that the determination of whether or not the contact is within the first region can be based on either the extrapolated second portion of the contact that extends beyond an edge of the touch-sensitive surface or on a portion of the contact that is detected on the touch-sensitive surface (e.g., if the contact is detected entirely on the touch-sensitive surface)).

In some embodiments, in accordance with a determination that the contact proximate to the edge of the touch-sensitive surface has first spatial properties, the first region relative to the touch-sensitive surface is (2420) located entirely off of the touch-sensitive surface, extending away from a first boundary located at a fixed distance from the edge of the touch-sensitive surface (e.g., located in a region that starts outside of the touch-sensitive surface and extends away from the edge of the touch-sensitive surface at which the first portion of the first contact was detected, such that the determination of whether or not the contact is within the first region is based on the extrapolated second portion of the contact that extends beyond an edge of the touch-sensitive surface); and in accordance with a determination that the contact proximate to the edge of the touch-sensitive surface has second spatial properties, the first region relative to the touch-sensitive surface is located entirely off of the touch-sensitive surface, extending away from a second boundary located at a second fixed distance from the edge of the touch-sensitive surface, where the second fixed distance is shorter than the first fixed distance (e.g., the boundary corresponding to a flat finger input is closer to the edge of the touch-sensitive surface than the boundary corresponding to a fingertip input).

In some embodiments, in accordance with a determination that a portion (e.g., the second portion) of the contact proximate to the edge of the touch-sensitive surface extends beyond the edge of the touch-sensitive surface, the location of the contact is (2422) a location of the (second) portion of the contact that extends beyond the edge of the touch-sensitive surface farthest from the edge of the touch-sensitive surface, based on a projection of the location of the (second) portion of the contact that extends beyond the edge of the touch-sensitive surface (e.g., when the contact extends beyond the touch-sensitive surface, the location of the contact is defined as the point farthest from the edge.); and in accordance with a determination that no portion of the contact proximate to the edge of the touch-sensitive surface extends beyond the edge of the touch-sensitive surface, the location of the contact is a location of the contact closest to the edge of the touch-sensitive surface (e.g., when the contact is entirely on the touch-sensitive surface, the location of the contact is defined as the point closest to the edge. In some embodiments, the location of the contact is defined as an average location of multiple points on the leading (e.g., left) edge of the contact.). In some embodiments, the location of the contact is defined as a centroid of the contact.

In some embodiments, the one or more characteristics, upon which the first region relative to the touch-sensitive surface is based, include (2424) a size of the contact proximate to the edge of the touch-sensitive surface (e.g., a contact shape characteristic of a fingertip input invokes a more stringent activation region than a contact shape characteristic of a flat finger input).

In some embodiments, the size of the contact proximate to the edge of the touch-sensitive surface is (2426) based on one or more of: a measure of the capacitance of the contact, a shape of the contact, and an area of the contact (e.g., a flat thumb is indicated by a larger signal total which is a normalized sum of the capacitance of the contact (e.g., how solidly is contact being made with the touch-sensitive surface), a larger geomean radius √((major axis)2+(minor axis) 2) (e.g., which indicates the area of the contact and is larger for more oblong contacts), and a larger minor radius (e.g., which indicates whether the finger is laying flat on the touch-sensitive surface or not)).

In some embodiments, a difference in the first boundaries of the first region and the second boundaries of the first region is (2428) greater near a central portion of the edge of the touch-sensitive surface and is smaller near a distal portion of the edge of the touch-sensitive surface (e.g., the distance between a boundary of the first region and a boundary of the second region decreases toward the corner of the touch-sensitive surface). In some embodiments, the first boundaries of the first region and the second boundaries of the first region coincide within a predetermined distance from the corner of the touch-sensitive surface. In some embodiments, when the contact proximate to the edge of the screen has second spatial properties: in accordance with a determination that the location of the contact is proximate to a corner of the touch-sensitive surface, the first region has a second size that is the same as the first size (e.g., the expanded activation region is not available at the corners of the touch-sensitive surface to avoid accidental activation by the user's palm when reaching across the device); and, in accordance with a determination that the location of the contact is not proximate to a corner of the touch-sensitive surface, the first region has a second size that is larger than the first size.

In some embodiments, the first region relative to the touch-sensitive surface has (2430) a first or second size (e.g., dependent upon the size of the contact) when the contact proximate to the edge of the touch-sensitive surface is moving at a speed above a first speed threshold (e.g., an input parameter detected above a given threshold includes input parameters that are detected at the given threshold (e.g., "above" means "at or above")) and a third size when the contact proximate to the edge of the touch-sensitive surface is moving at a speed below the first speed threshold. In some embodiments, the touch must start within a first region (e.g., 5 mm) and the increase in the characteristic intensity above the intensity threshold must be detected while the contact is moving above the speed threshold and within a second region (e.g., 20 mm). In some embodiments (e.g., where the application associates the location with an edge swipe operation), if the contact does not meet the system gesture criteria, the device performs an application-specific operation (e.g., navigation within the application).

In some embodiments, the system-gesture criteria further include (2432) direction criteria specifying a predetermined direction of motion on the touch-sensitive surface, where the direction criteria is met when the contact proximate to the edge of the touch-sensitive surface moves in the predetermined direction on the touch-sensitive surface (e.g., more vertical movement than horizontal movement).

In some embodiments, after initiating performance of the operation that is independent of the application: the device detects (2434) movement, on the touch-sensitive surface, of the contact proximate to the edge of the touch-sensitive surface. In response to detecting the movement of the contact: in accordance with a determination that the movement of the contact is in the predetermined direction, the device continues performance of the operation that is independent of the application; and in accordance with a determination that the movement of the contact is in a direction other than the predetermined direction, the device terminates performance of the operation that is independent of the application.

In some embodiments, the system-gesture criteria further include (2436) a failure condition that prevents the system-gesture criteria from being met when the contact proximate to the edge of the touch-sensitive surface moves outside of a second region (e.g., more than 20 mm away from the edge) relative to the touch-sensitive surface (e.g., on the touch-sensitive surface) before the system-gesture criteria are met (e.g., the system-gesture criteria cannot be met even if the contact moves back within the region). For example, prior to initiating performance of the operation that is independent of the application: the device detects movement, on the touch-sensitive surface, of the contact proximate to the edge of the touch-sensitive surface; and, in response to detecting the movement of the contact, in accordance with a determination that the contact moved outside a second region relative to the touch sensitive surface, the device prevents the system-gesture criteria from being met (e.g., the device prevents performance of the operation that is independent of the application). While preventing the system gesture criteria from being met, the device detects termination of the input (e.g., including liftoff of the contact proximate to the edge of the touch-sensitive surface); and, in response to detecting termination of the input, the device ceases to prevent the system gesture-gesture criteria from being met.

In some embodiments, the system-gesture criteria include (2438) a requirement (e.g., an additional requirement) that the characteristic intensity of the contact proximate to the edge of the touch-sensitive surface increases from an intensity below an intensity threshold to an intensity at or above the intensity threshold while the contact is within the first region relative to the touch-sensitive surface (e.g., the system-gesture criteria are not met when the characteristic intensity of the contact is increased above the intensity threshold while the contact is outside of the first region and the contact is then moved into the first region without decreasing the characteristic intensity of the contact below the intensity threshold).

In some embodiments, the intensity criteria vary (2440) based on time (e.g., relative to first detection of the contact proximate to the edge of the touch-sensitive surface or detection of the change in intensity of the contact; e.g., 150 g addition to the intensity threshold for first 100 ms after touchdown).

In some embodiments, the operation that is independent of the application (e.g., the system operation) is (2442) an operation for navigation between applications of the electronic device (e.g., a multitasking operation; e.g., switching to a different/prior application or entering a multitasking user interface).

In some embodiments, the respective operation in the application is (2444) a key press operation (e.g., a character insertion operation for a keyboard, or a keyboard switching operation, or a shift key activation option).

In some embodiments, the respective operation in the application is (2446) a page switching operation (e.g., next page, previous page, etc.).

In some embodiments, the respective operation in the application is (2448) for navigation within a hierarchy associated with the application (e.g., between levels of an application (e.g., song v. playlist) or history of an application (e.g., back and forward within a web browsing history)).

In some embodiments, the respective operation in the application is (2450) a preview operation (e.g., peek and pop for a link or row in a list).

In some embodiments, the respective operation in the application is (2452) a menu display operation (e.g., quick action or contact menu).

It should be understood that the particular order in which the operations in FIGS. 24A-24F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1300, 1400, 1500, and 2500) are also applicable in an analogous manner to method 2400 described above with respect to FIGS. 24A-24F. For example, the contacts, gestures, user interface objects, intensity thresholds, focus selectors, animations described above with reference to method optionally have one or more of the characteristics of the contacts, gestures, user interface objects, intensity thresholds, focus selectors, animations described herein with reference to other methods described herein (e.g., methods 1000, 1100, 1200, 1300, 1400, 1500, and 2500). For brevity, these details are not repeated here.

FIGS. 25A-25H illustrate a flow diagram of a method 2500 of navigating between user interfaces in accordance with some embodiments. The method 2500 is performed at an electronic device (e.g., device 300, FIG. 3, or portable multifunction device 100, FIG. 1A) with a display and a touch-sensitive surface. In some embodiments, the display is a touch-screen display and the touch-sensitive surface is on or integrated with the display. In some embodiments, the display is separate from the touch-sensitive surface. In some embodiments, the touch-sensitive surface is part of a track pad or a remote control device that is separate from the display. In some embodiments, the operations in method 2500 are performed by an electronic device configured for management, playback, and/or streaming (e.g., from an external server) of audio and/or visual files that is in communication with a remote control and a display (e.g., Apple TV from Apple Inc. of Cupertino, Calif.). Some operations in method 2500 are, optionally, combined and/or the order of some operations is, optionally, changed.

As described below, the method 2500 provides an intuitive way to navigate between user interfaces. The method reduces the cognitive burden on a user when navigating between user interfaces, thereby creating a more efficient human-machine interface. For battery-operated electronic devices, enabling a user to navigate between user interfaces faster and more efficiently conserves power and increases the time between battery charges.

The device displays (2502), on the display, a first view of a first application. While displaying the first view, the device detects (2504) a first portion of a first input that includes detecting a first contact on the touch-sensitive surface. In response to detecting the first portion of the first input, in accordance with a determination that the first portion of the first input meets application-switching criteria (e.g., including intensity criteria (e.g., "peek" intensity) and a location criterion (e.g., proximate to the edge of the touch sensitive surface) or an intensity-based edge swipe heuristic such as that described above with reference to method 2400), the device concurrently displays (2506), on the display, portions of a plurality of application views including the first application view and a second application view (and, optionally, ceasing to display another portion of the first application view (e.g., by sliding a portion of the first application view off of the display)). While concurrently displaying the portions of the plurality of application views, the device detects (2508) a second portion of the first input that includes liftoff of the first contact. In response to detecting the second portion of the first input that includes liftoff of the first contact: in accordance with a determination that the second portion of the first input meets first-view display criteria, where the first-view display criteria include a criterion that is met when the liftoff of the first contact is detected in a first region of the touch-sensitive surface (e.g., the portion proximate to the left edge of the touch sensitive surface), the device ceases (2510) to display the portion of the second application view and displays the (entire) first application view on the display; and in accordance with a determination that the second portion of the first input meets multi-view display criteria, where the multi-view display criteria includes a criterion that is met when the liftoff of the first contact is detected in a second region of the touch-sensitive surface that is different from the first region of the touch-sensitive surface (e.g., the middle portion of the touch sensitive surface), the device maintains concurrent display of at least a portion of the first application view and at least a portion of the second application view on the display after detecting the liftoff of the first contact.

In some embodiments, in response to detecting the second portion of the first input that includes liftoff of the first contact: in accordance with a determination that the second portion of the first input meets second-view display criteria, where the second-view display criteria includes a criterion that is met when the liftoff of the first contact is detected in a third region of the touch-sensitive surface that is different from the first region of the touch-sensitive surface and the second region of the touch-sensitive surface (e.g., the portion proximate to the right edge of the touch sensitive surface), the device ceases (2512) to display the first application view and displays the (entire) second application view on the display.

In some embodiments, after detecting the first portion of the first input that includes detecting the first contact on the touch-sensitive surface, and before detecting the second portion of the first input that includes liftoff of the first contact: the device detects (2514) movement of the first contact on the touch-sensitive surface. In response to detecting the movement of the first contact, in accordance with a determination that the first contact moves into the second region of the touch-sensitive surface, the device decreases respective sizes of the plurality of application views including the first application view and the second application view. In some embodiments, the sizes of the application views are decreased dynamically with continued movement of the contact across the second region of the touch-sensitive surface (e.g., there is a correlation between how far across the second region the contact has traveled and the size of the application views). In some embodiments, decreasing the size of the application views when the contact is in the second region of the touch-sensitive surface indicates to the user that lift-off of the contact in the second region will invoke the multitasking user interface. In some embodiments, the portion of the second application view contracts and moves in a direction of the movement of the contact in the second region (e.g., simulating dynamic contraction and sliding of the application "card" away from the "stack"). In some embodiments, a distance between two or more of the application views changes depending on movement of the first contact (e.g., application views other than the top application view move apart in addition to decreasing in size as the first contact moves across the display.

In some embodiments, while decreasing respective sizes of the plurality of application views including the first application view and the second application view: the device detects (2516) continued movement of the first contact on the touch-sensitive surface. In response to detecting the continued movement of the first contact, in accordance with a determination that the first contact moves into the third region of the touch-sensitive surface, the device increases respective sizes of the plurality of application views including the first application view and the second application view. In some embodiments, the sizes of the application views are increased dynamically with continued movement of the contact across the third region of the touch-sensitive surface (e.g., there is a correlation between how far across the third region the contact has traveled and the size of the application views). In some embodiments, increasing the size of the application views when the contact is in the third region of the touch-sensitive surface indicates to the user that lift-off of the contact in the third region will activate the application associated with the second application view (e.g., switch to the previous application). In some embodiments, the portion of the second application view expands and moves in a direction opposite movement of the contact in the third region (e.g., simulating dynamic expansion of the second application view into the user interface for the second application). In some embodiments, a distance between two or more of the application views changes depending on movement of the first contact (e.g., application views other than the top application view move together in addition to increasing in size as the first contact continues to move across the display.

In some embodiments, after detecting the first portion of the first input that includes detecting a first contact on the touch-sensitive surface, and before detecting the second portion of the first input that includes liftoff of the first contact: the device detects (2518) movement of the first contact on the touch-sensitive surface. In response to detecting the movement of the first contact, in accordance with a determination that the first contact crosses a boundary between two respective regions on the touch-sensitive surface, the device provides a tactile output. In some embodiments, the device provides haptic feedback when the contact moves into the third region of the touch-sensitive surface from the second region of the touch-sensitive region, but not when the contact moves back from the third region to the second region.

In some embodiments, display of respective portions of the plurality of application views are (2520) partially overlapping, including that the displayed portion of the first application view partially overlaps the displayed portion of the second application view.

In some embodiments, the first application view and the second application view are (2522) views of the same application (e.g., web page tabs).

In some embodiments, the first application view is (2524) a view of a first application and the second application view is a view of a second application that is different from the first application.

In some embodiments, in accordance with a determination that the second portion of the first input meets multi-view display criteria, where the multi-view display criteria include a criterion that is met when the liftoff of the first contact is detected in a second region of the touch-sensitive surface that is different from the first region of the touch-sensitive surface, maintaining concurrent display of at least a portion of the first application view and at least a portion of the second application view on the display includes (2526): entering a user interface selection mode; and displaying a plurality of user interface representations in a stack on the display, including the at least a portion of the first application view and at least a portion of the second application view, where: at least a first user interface representation, corresponding to the at least a portion of the second application view, and at least a second user interface representation, corresponding to the at least a portion of the first application view and disposed above the first user interface representation in the stack, are visible on the display, the second user interface representation is offset from the first user interface representation in a first direction (e.g., laterally offset to the right on the display), and the second user interface representation partially exposes the first user interface representation. In some embodiments, representations in the stack are partially spread out in one direction on the display (e.g., to the right, as shown in FIGS. 5P and 22C). In some embodiments, at a given time, information (e.g., an icon, title, and content for the corresponding user interface) for a predetermined number of the representations (e.g., 2, 3, 4, or 5 representations) in the stack is visible, while the rest of the representations in the stack are either off-screen or are beneath the representations that include visible information. In some embodiments, the representations that are beneath the representations that include visible information are stacked together so closely that no information is displayed for these representations. In some embodiments, the representations that are beneath the representations that include visible information are stylistic representations, such as just generic edges 503, as shown in FIG. 5P.

In some embodiments, while in the user interface selection mode: the device detects (2528) a second input including a drag gesture by a second contact at a location on the touch-sensitive surface that corresponds to a location of the first user interface representation on the display, the second contact moving across the touch-sensitive surface in a direction that corresponds to the first direction on the display; and, while the second contact is at a location on the touch-sensitive surface that corresponds to the location of the first user interface representation on the display and moving across the touch-sensitive surface in a direction that corresponds to the first direction on the display: the device moves the first user interface representation in the first direction on the display at a first speed in accordance with a speed of the second contact on the touch-sensitive surface; and the device moves the second user interface representation, disposed above the first user interface representation, in the first direction at a second speed greater than the first speed. For example, with respect to moving the first user interface representation, on a touch-sensitive display, the card or other representation under the finger contact moves with the same speed as the finger contact; and on a display coupled to a track pad, the card or other representation at the location corresponding to the location of the contact moves at an onscreen speed that corresponds to (or is based on) the speed of the finger contact on the track pad. In some embodiments, a focus selector is shown on the display to indicate the onscreen location that corresponds to the location of the contact on the touch-sensitive surface. In some embodiments, the focus selector may be represented by a cursor, a movable icon, or visual differentiators that separate an onscreen object (e.g., a user interface representation) from its peers that do not have the focus. In another example, with respect to moving the second user interface representation, in some embodiments, the first direction is rightward. In some embodiments, the first speed is the same speed as the current speed of the contact. In some embodiments, the movement of the first user interface representation creates a visual effect that the finger contact is grabbing and dragging the first user interface representation. At the same time, the second user interface representation is moving faster than the first user interface representation. This faster movement of the second user interface representation creates the visual effect that as the second user interface representation moves in the first direction towards the edge of the display, an increasingly larger portion of the first user interface representation is revealed from underneath the second user interface representation. In combination, these two concurrent movements enable a user to see more of the first user interface representation before deciding whether to select and display the corresponding first user interface.

In some embodiments, while in the user interface selection mode, including display of at least two of the plurality of user interface representations in the stack, the device detects (2530) a selection input (e.g., a tap gesture at a location on the touch-sensitive surface that corresponds to a location on a user interface representation) directed to one of the at least two user interface representations in the stack. In response to detecting the selection input: the device ceases to display the stack, and displays a user interface that corresponds to the selected one of the at least two user interface representations. In some embodiments, the user interface that corresponds to the selected user interface representation is displayed without displaying any user interfaces that correspond to other user interface representations in the stack. In some embodiments, the display of the user interface that corresponds to the selected user interface representation replaces the display of the stack.

In some embodiments, while displaying, in the stack, at least the first user interface representation and the second user interface representation above the first user interface representation: the device detects (2532) a deletion input directed to the first user interface representation (e.g., an upward drag gesture at a location on the touch-sensitive surface that corresponds to a location on the first user interface representation). In response to detecting the deletion input directed to the first user interface representation: the device removes the first user interface representation from a first position in the stack. In some embodiments, when swiping to close, the adjacent application views move together in z space (e.g., the application views behind the application view that is being manipulated moves toward the current application view). If movement is in the opposite direction, the adjacent application views move away from each other in z space (e.g., the application views behind the application view that is being manipulated moves away the current application view).

In some embodiments, entering a user interface selection mode includes (2534): animating a decrease in size of the first application view when transitioning into the second user interface representation; and animating a decrease in size of the second application view when transitioning into the first user interface representation. For example, in the "peek" stage, the UI cards are referred to as application views and in the "pop" stage (e.g., multitasking user interface), the UI cards are referred to as user interface representations. In some embodiments, the device indicates to the user that it has entered into the multitasking user interface by reducing the size of the application views (e.g., which become user interface representations).

In some embodiments, the application-switching criteria include (2536) intensity criteria. In some embodiments, the intensity criteria are met when the characteristic intensity of the contact is above a first intensity threshold. In some embodiments, the system-gesture criteria include a location criterion that is met when the intensity criteria for the contact are met while the contact is within a first region relative to the touch-sensitive surface (e.g., a region that may or may not include a portion of the touch-sensitive surface, such as those described above with reference to method 2400).

In some embodiments, the size of the first region relative to the touch-sensitive surface is (2538) determined based on one or more characteristics of the contact. In some embodiments, the first region relative to the touch-sensitive surface has a first size when the contact proximate to the edge of the touch-sensitive surface has first spatial properties (e.g., is a large, oblong contact characteristic of a flat finger input) and a second size when the contact proximate to the edge of the touch-sensitive surface has second spatial properties (e.g., is a small, round contact characteristic of a fingertip input). In some embodiments, the size of the region changes dynamically with the size of the contact. In some embodiments, the contact is categorized and one of a plurality of discretely sized regions is selected.

In some embodiments, the intensity criteria of the application-switching criteria are (2540) met when: the (detected) characteristic intensity of the first contact is above a first intensity threshold (e.g., a peek/preview intensity threshold); and the (detected) characteristic intensity of the first contact is below a second intensity threshold (e.g., a pop/commit intensity threshold).

In some embodiments, in response to detecting the first portion of the first input, in accordance with a determination that the first portion of the first input meets the application-switching criteria, the device provides (2542) tactile output.

In some embodiments, in response to detecting the first portion of the first input, in accordance with a determination that the first portion of the first input meets preview criteria: the device moves (2544) the first view of the first application partially off of the display (e.g., sliding the active user interface to the right with or without decreasing the size of the user interface) and displays a portion of the second application view at a location of the display from which the first view of the first application was displaced (e.g., the active user interface slides over, revealing the edge of the previously active user interface from under the currently active user interface).

In some embodiments, the preview criteria includes (2546): a location criterion that is met while the contact is within the first region relative to the touch-sensitive surface, and an intensity criteria that is met when the characteristic intensity of the contact is above a preview intensity threshold (e.g., "hint" intensity) and below an application-switching intensity threshold (e.g., "peek" intensity/first intensity threshold).

In some embodiments, the application-switching criteria include (2548) a criterion that is met when an intensity of the first contact increases above a first intensity threshold (e.g., a peek/preview intensity threshold); maintaining concurrent display of at least a portion of the first application view and at least a portion of the second application view on the display after detecting the liftoff of the first contact includes displaying a multitasking user interface; and in response to detecting the first portion of the first input, in accordance with a determination that the first portion of the first input meets multitasking criteria that include a criterion that is met when an intensity of the first contact increases above a second intensity threshold that is greater than the first intensity threshold, the device displays the multitasking user interface. For example, the multitasking user interface can either be displayed by meeting the application-switching criteria, which can be met with a contact having an intensity above the first intensity threshold and below the second intensity threshold and then moving the contact across the touch-sensitive surface to a location that corresponds to a middle portion of the display, or by meeting the multitasking criteria which can be met with a contact having an intensity above the second intensity threshold.

In some embodiments, in response to detecting the first portion of the first input, in accordance with a determination that the first portion of the first input meets multitasking criteria (e.g., including high intensity criteria (e.g., "pop" intensity) and optionally a location criterion (e.g., proximate to the edge of the touch sensitive surface, in the first region, or in the second region)): the device enters (2550) a user interface selection mode, and displays a plurality of user interface representation in a stack on the display, including the at least a portion of the first application view and at least a portion of the second application view. In some embodiments, at least a first user interface representation, corresponding to the at least a portion of the second application view, and at least a second user interface representation, corresponding to the at least a portion of the first application view and disposed above the first user interface representation in the stack, are visible on the display, the second user interface representation is offset from the first user interface representation in a first direction (e.g., laterally offset to the right on the display), and the second user interface representation partially exposes the first user interface representation. In some embodiments, representations in the stack are partially spread out in one direction on the display (e.g., to the right, as shown in FIGS. 5P and 23G). In some embodiments, at a given time, information (e.g., an icon, title, and content for the corresponding user interface) for a predetermined number of the representations (e.g., 2, 3, 4, or 5 representations) in the stack is visible, while the rest of the representations in the stack are either off-screen or are beneath the representations that include visible information. In some embodiments, the representations that are beneath the representations that include visible information are stacked together so closely that no information is displayed for these representations. In some embodiments, the representations that are beneath the representations that include visible information are stylistic representations, such as just generic edges 503, as shown in FIG. 5E.

In some embodiments, the multitasking criteria include (2552) intensity criteria that are met when the (detected) characteristic intensity of the first contact is above the second intensity threshold.

In some embodiments, the multitasking criteria include (2554) a location criterion that is met when the multitasking intensity criteria are met while the contact is within the first region of the touch-sensitive surface.

It should be understood that the particular order in which the operations in FIGS. 25A-25H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1300, 1400, 1500, and 2400) are also applicable in an analogous manner to method 2500 described above with respect to FIGS. 25A-25H. For example, the contacts, gestures, user interface objects, intensity thresholds, focus selectors, animations described above with reference to method optionally have one or more of the characteristics of the contacts, gestures, user interface objects, intensity thresholds, focus selectors, animations described herein with reference to other methods described herein (e.g., methods 1000, 1100, 1200, 1300, 1400, 1500, and 2400). For brevity, these details are not repeated here.

Figure 16:
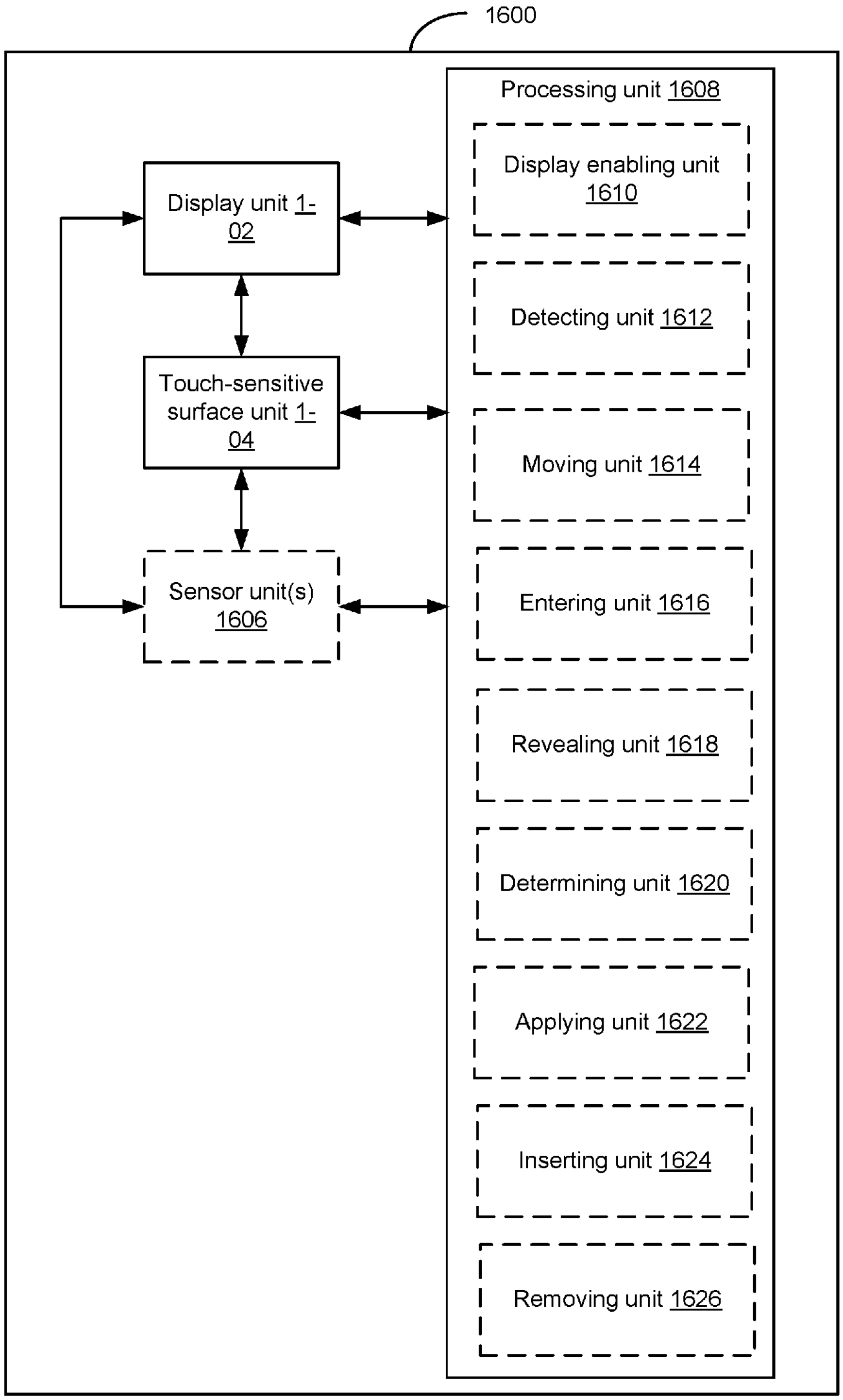
FIGS. 16-21 are functional block diagrams of electronic devices in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 includes a display unit 1602 configured to display a user interface, a touch-sensitive surface unit 1604 configured to receive contacts, optionally one or more sensor units 1606 configured to detect intensity of contacts with the touch-sensitive surface unit 1604; and a processing unit 1608 coupled with the display unit 1602, the touch-sensitive surface unit 1604 and the optional one or more sensor units 1606. In some embodiments, the processing unit 1608 includes: a display enabling unit 1610, a detecting unit 1612, a moving unit 1614, an entering unit 1616, a revealing unit 618, a determining unit, an applying unit 520, an inserting unit 1624, and a removing unit 1626.

The processing unit 1610 is configured to: enable display of a plurality of user interface representations in a stack on the display unit 1602 (e.g., with the display enabling unit 1610), wherein: at least a first user interface representation and a second user interface representation disposed above the first user interface representation in the stack, are visible on the display unit 1602, the second user interface representation is offset from the first user interface representation in a first direction, and the second user interface representation partially exposes the first user interface representation; detect a first drag gesture by a first contact at a location on the touch-sensitive surface unit 1604 that corresponds to a location of the first user interface representation on the display unit 1602 (e.g., with detecting unit 1612), the first contact moving across the touch-sensitive surface unit 1604 in a direction that corresponds to the first direction on the display unit 1602; and, while the first contact is at a location on the touch-sensitive surface unit 1604 that corresponds to the location of the first user interface representation on the display unit 1602 and moving across the touch-sensitive surface unit 1604 in a direction that corresponds to the first direction on the display unit: move the first user interface representation in the first direction on the display unit 1602 at a first speed in accordance with a speed of the first contact on the touch-sensitive surface unit 1604 (e.g., with the moving unit 1604); and move the second user interface representation, disposed above the first user interface representation, in the first direction at a second speed greater than the first speed (e.g., with the moving unit 1614).

Figure 17:
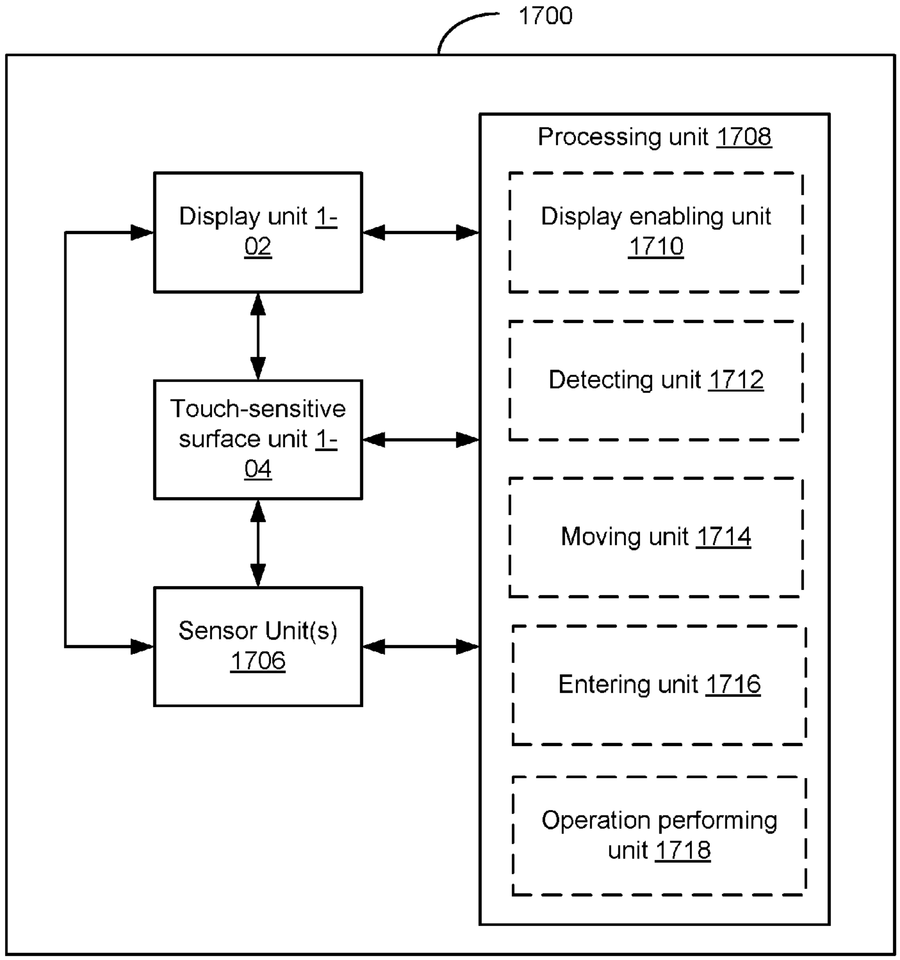

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 includes a display unit 1702 configured to display a user interface, a touch-sensitive surface unit 1704 configured to receive contacts, one or more sensor units 1706 configured to detect intensity of contacts with the touch-sensitive surface unit 1704; and a processing unit 1708 coupled with the display unit 1702, the touch-sensitive surface unit 1704 and the one or more sensor units 1706. In some embodiments, the processing unit 1708 includes: a display enabling unit 1710, a detecting unit 1712, a moving unit 1714, an entering unit 1716, and an operation performing unit 1718.

The processing unit 1710 is configured to: enable display a first user interface on the display unit 1702 (e.g., with display enabling unit 1710); while displaying the first user interface on the display unit 1702, detect an input by a first contact on the touch-sensitive surface unit 1704 (e.g., with detecting unit 1712); while detecting the input by the first contact, enable display of a first user interface representation and at least a second user interface representation on the display unit 1702 (e.g., with the display enabling unit 1710); while displaying the first user interface representation and at least the second user interface representation on the display unit 1702, detect termination of the input by the first contact (e.g., with the detecting unit 1712); and, in response to detecting termination of the input by the first contact: in accordance with a determination that the first contact had a characteristic intensity during the input that was below a predetermined intensity threshold and the first contact moved during the input in a direction across the touch-sensitive surface 1704 that corresponds to a predefined direction on the display 1702, enable display of a second user interface that corresponds to the second user interface representation (e.g., with the display enabling unit 1710); and in accordance with a determination that the first contact had a characteristic intensity during the input that was below the predetermined intensity threshold and the first contact did not move during the input in a direction across the touch-sensitive surface unit 1704 that corresponds to the predefined direction on the display unit 1702, enable redisplay of the first user interface (e.g., with display enabling unit 1710).

Figure 18:
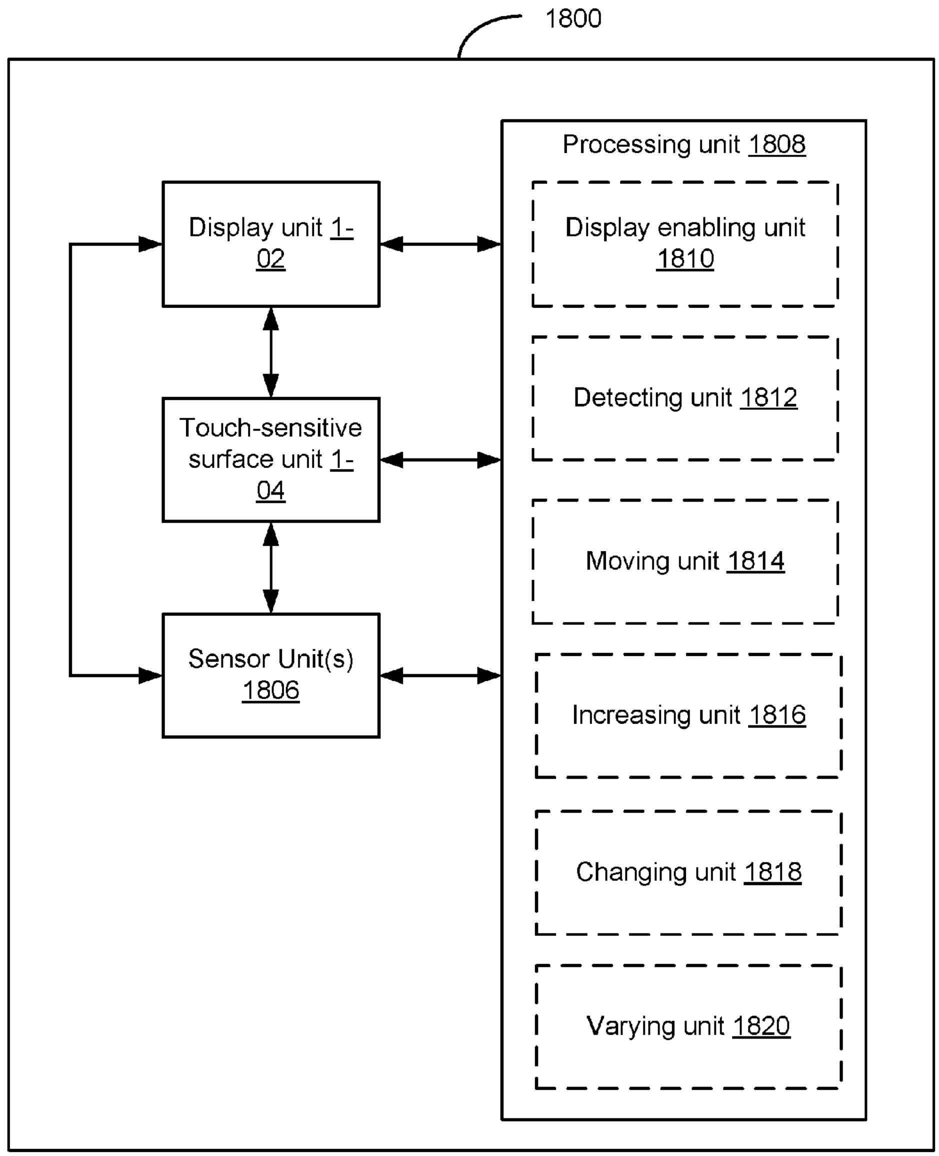

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 includes a display unit 1802 configured to display a user interface, a touch-sensitive surface unit 1804 configured to receive contacts, one or more sensor units 1806 configured to detect intensity of contacts with the touch-sensitive surface unit 1804; and a processing unit 1808 coupled with the display unit 1802, the touch-sensitive surface unit 1804 and the one or more sensor units 1806. In some embodiments, the processing unit 1808 includes: a display enabling unit 1810, a detecting unit 1812, a moving unit 1814, an increasing unit 1816, a changing unit 1818, and a varying unit 1820.

The processing unit 1808 is configured to: enable display of a first user interface on the display unit (e.g., with display enabling unit 1810; while enabling display of the first user interface on the display unit, detect, on the touch-sensitive surface unit 1804, an input by a first contact that includes a period of increasing intensity of the first contact (e.g., with the detecting unit 1812); in response to detecting the input by the first contact that includes the period of increasing intensity of the first contact: enable display of a first user interface representation for the first user interface and a second user interface representation for a second user interface on the display unit 1802 (e.g., with the display enabling unit 1810), wherein the first user interface representation is displayed over the second user interface representation and partially exposes the second user interface representation; while enabling display of the first user interface representation and the second user interface representation on the display unit 1802, detect that, during the period of increasing intensity of the first contact, the intensity of the first contact meets one or more predetermined intensity criteria (e.g., with the detecting unit 1812); in response to detecting that the intensity of the first contact meets the one or more predetermined intensity criteria: cease to enable display of the first user interface representation and the second user interface representation on the display unit 1802 (e.g., with the display enabling unit 1810); and enable display of the second user interface on the display unit 1802 (e.g., with display enabling unit 1810).

Figure 19:
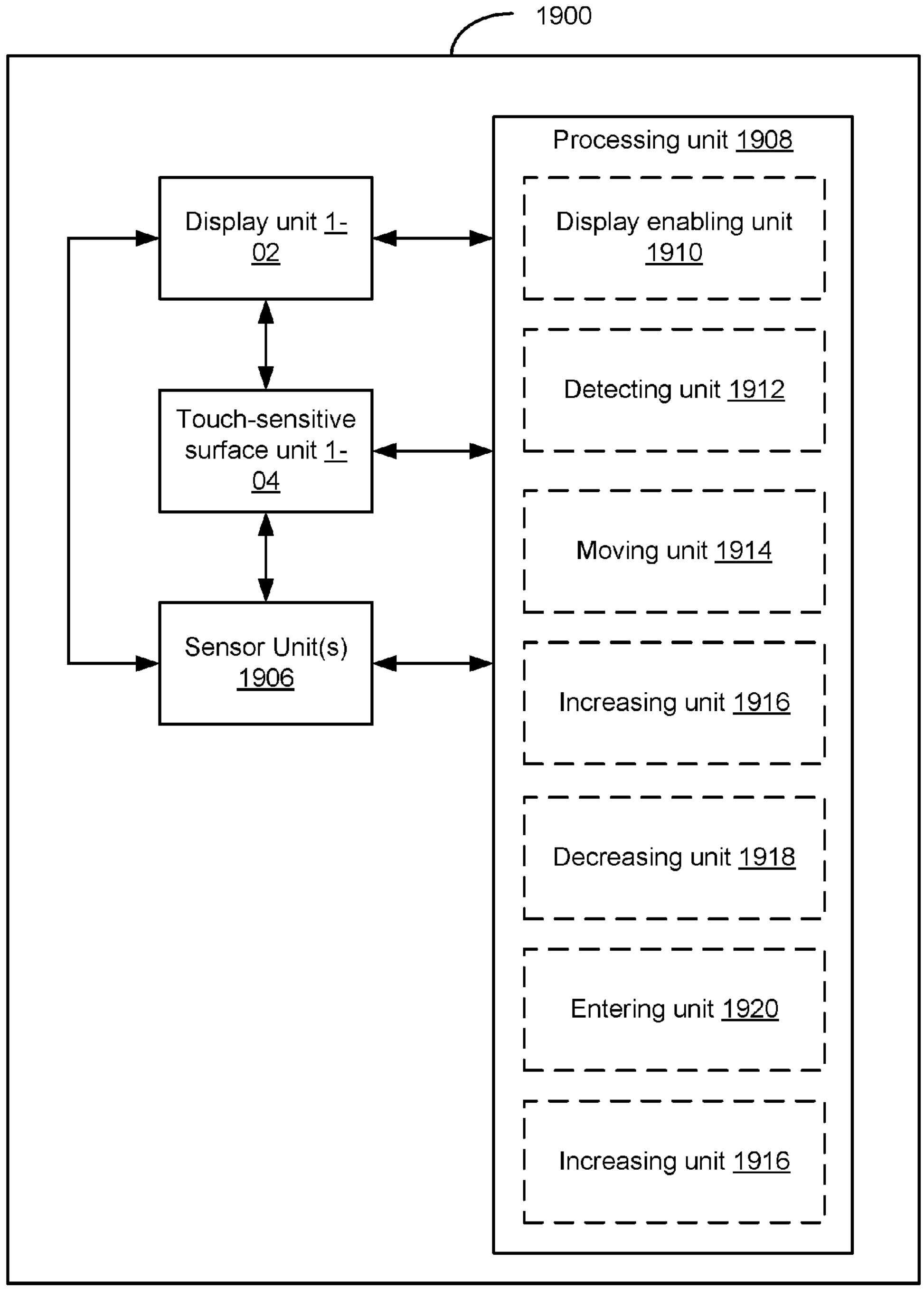

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 includes a display unit 1902 configured to display a user interface, a touch-sensitive surface unit 1904 configured to receive contacts, one or more sensor units 1906 configured to detect intensity of contacts with the touch-sensitive surface unit 1904; and a processing unit 1908 coupled with the display unit 1902, the touch-sensitive surface unit 1904 and the one or more sensor units 1906. In some embodiments, the processing unit 1908 includes: a display enabling unit 1910, a detecting unit 1912, a moving unit 1914, an increasing unit 1916, a decreasing unit 1918, and an entering unit 1920.

The processing unit 1910 is configured to: enable display of a plurality of user interface representations in a stack on the display unit 1902 (e.g., with the display enabling unit 1910), wherein: at least a first user interface representation, a second user interface representation, and a third user interface representation are visible on the display unit 1902, the first user interface representation is laterally offset from the second user interface representation in a first direction and partially exposes the second user interface representation, and the second user interface representation is laterally offset from the third user interface representation in the first direction and partially exposes the third user interface representation; detect an input by a first contact on the touch-sensitive surface unit 1904 at a location that corresponds to the second user interface representation on the display unit 1902 (e.g., with detecting unit 1922); and, in accordance with detecting an increase in intensity of the first contact on the touch-sensitive surface unit 1904 at the location that corresponds to the second user interface representation on the display unit 1902 (e.g., with the detecting unit 1912), increase an area of the second user interface representation that is exposed from behind the first user interface representation by increasing the lateral offset between the first user interface representation and the second user interface representation (e.g., with the increasing unit 1916).

Figure 20:
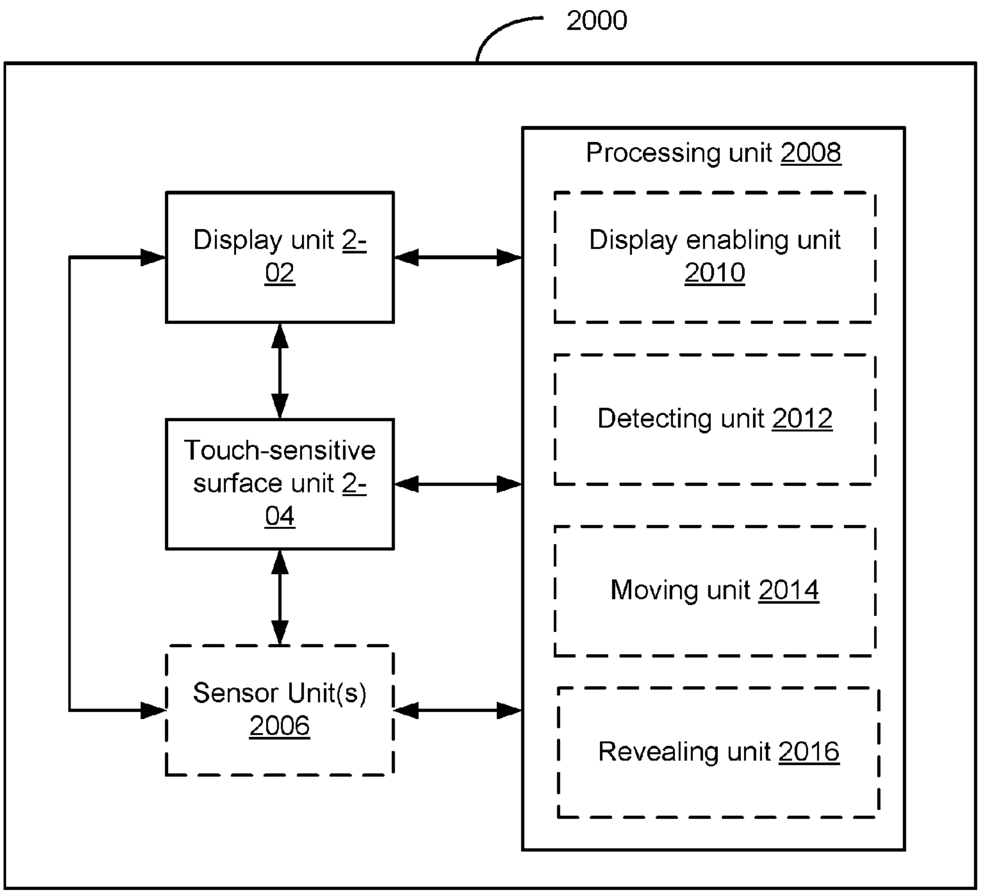

In accordance with some embodiments, FIG. 20 shows a functional block diagram of an electronic device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 includes a display unit 2002 configured to display a user interface, a touch-sensitive surface unit 2004 configured to receive contacts, optionally one or more sensor units 2006 configured to detect intensity of contacts with the touch-sensitive surface unit 2004; and a processing unit 2008 coupled with the display unit 2002, the touch-sensitive surface unit 2004 and the optional one or more sensor units 2006. In some embodiments, the processing unit 2008 includes: a display enabling unit 2010, a detecting unit 2012, a moving unit 2014, and a revealing unit 2016.

The processing unit 2010 is configured to: enable display of a plurality of user interface representations in a stack on the display unit 2002 (e.g., with the display enabling unit 2010), wherein: at least a first user interface representation, a second user interface representation, and a third user interface representation are visible on the display unit 2002, the second user interface representation is laterally offset from the first user interface representation in a first direction and partially exposes the first user interface representation, and the third user interface representation is laterally offset from the second user interface representation in the first direction and partially exposes the second user interface representation; detect a drag gesture by a first contact that moves across the touch-sensitive surface unit 2004 (e.g., with the detecting unit 2012), wherein movement of the drag gesture by the first contact corresponds to movement across one or more of the plurality of user interface representations in the stack; and, during the drag gesture, when the first contact moves over a location on the touch-sensitive surface unit 2004 that corresponds to the first user interface representation on the display unit 2002, reveal more of the first user interface representation from behind the second user interface representation on the display unit (e.g., with the revealing unit 2016).

Figure 21:
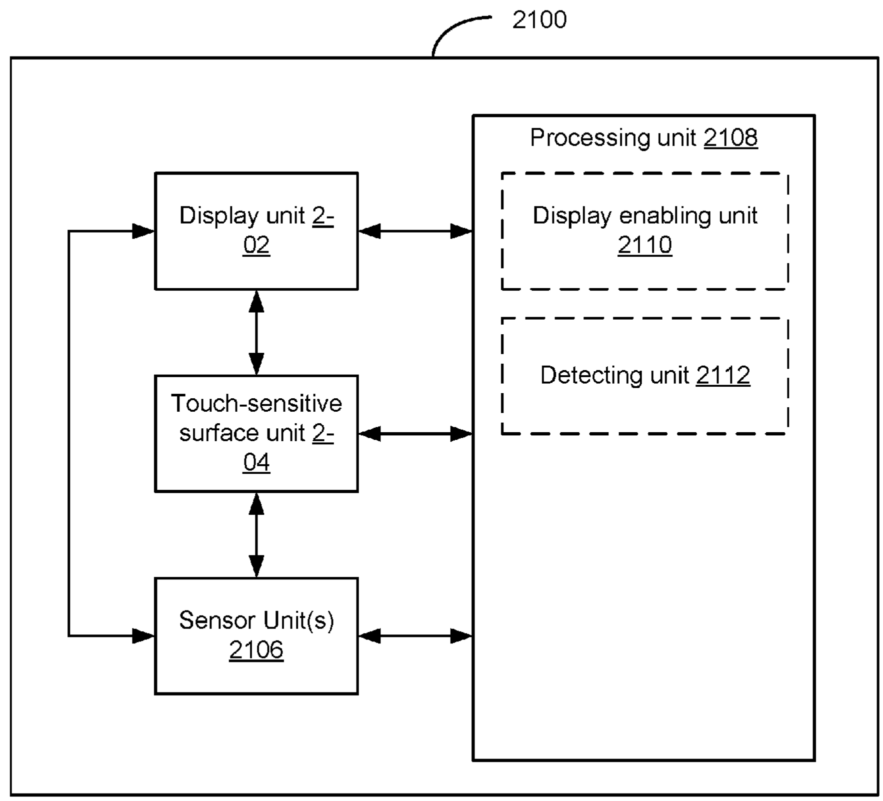

In accordance with some embodiments, FIG. 21 shows a functional block diagram of an electronic device 2100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 21 are, optionally, combined or separated into sub-blocks to implement the principles of the various described embodiments. Therefore, the description herein optionally supports any possible combination or separation or further definition of the functional blocks described herein.

As shown in FIG. 21, an electronic device 2100 includes a display unit 1602 configured to display a user interface, a touch-sensitive surface unit 2104 configured to receive contacts, one or more sensor units 2106 configured to detect intensity of contacts with the touch-sensitive surface unit 2104; and a processing unit 2108 coupled with the display unit 2102, the touch-sensitive surface unit 2104 and the one or more sensor units 2106. In some embodiments, the processing unit 2108 includes: a display enabling unit 2110 and a detecting unit 2112.

The processing unit 2110 is configured to: enable display of a first user interface of a first application on the display unit 2102 (e.g., with the display enabling unit 2110), the first user interface including a backwards navigation control; while displaying the first user interface of the first application on the display unit 2102, detect a gesture by a first contact on the touch-sensitive surface unit 2104 at a location that corresponds to the backwards navigation control on the display unit 2102 (e.g., with the detecting unit 2112; in response to detecting the gesture by the first contact on the touch-sensitive surface unit 2104 at a location that corresponds to the backwards navigation control: in accordance with a determination that the gesture by the first contact is a gesture with an intensity of the first contact that meets one or more predetermined intensity criteria, replace display of the first user interface of the first application with display of a plurality of representations of user interfaces of the first application (e.g., with the display enabling unit 2110), including a representation of the first user interface and a representation of a second user interface; and, in accordance with a determination that the gesture by the first contact is a gesture with an intensity of the first contact that does not meet the one or more predetermined intensity criteria, replace display of the first user interface of the first application with display of the second user interface of the first application (e.g., using display enabling unit 2110).

Figure 26:
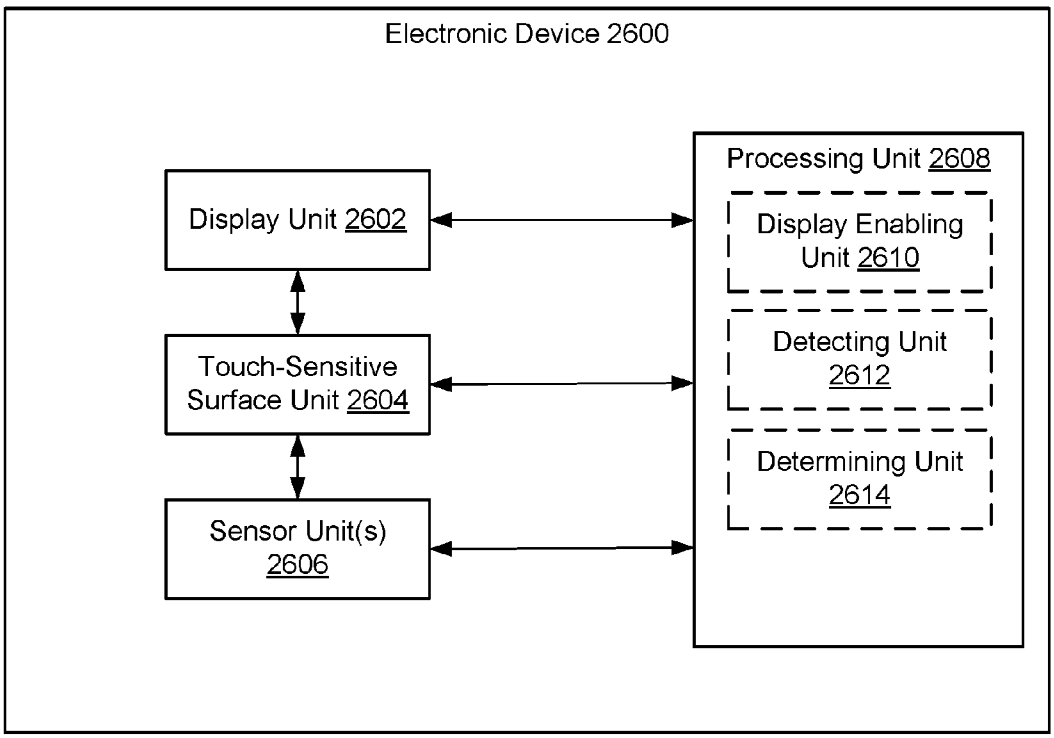
FIGS. 26-27 are functional block diagrams of electronic devices in accordance with some embodiments.

In accordance with some embodiments, FIG. 26 shows a functional block diagram of an electronic device 2600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device includes a display unit 2602 configured to display content items; a touch-sensitive surface unit 2604 configured to receive user inputs; one or more sensor units 2606 configured to detect intensity of contacts with the touch-sensitive surface unit 2604; and a processing unit 2608 coupled to the display unit 2602, the touch-sensitive surface unit 2604 and the one or more sensor units 2606. In some embodiments, the processing unit 2608 includes a display enabling unit 2610, a detecting unit 2612, and a determining unit 2614. In some embodiments, the processing unit 7$08 is configured to: enable display (e.g., with display enabling unit 2610), on the display unit (e.g., display unit 2602), of a user interface for an application; detect (e.g., with detecting unit 2612) an edge input that includes detecting a change in a characteristic intensity of a contact proximate to an edge of the touch-sensitive surface; and, in response to detecting the edge input: in accordance with a determination (e.g., with determining unit 2614) that the edge input meets system-gesture criteria, perform an operation that is independent of the application, where: the system-gesture criteria include intensity criteria; the system-gesture criteria include a location criterion that is met when the intensity criteria for the contact are met while the contact is within a first region relative to the touch-sensitive surface; and the first region relative to the touch-sensitive surface unit 2604 is determined based on one or more characteristics of the contact.

Figure 27:
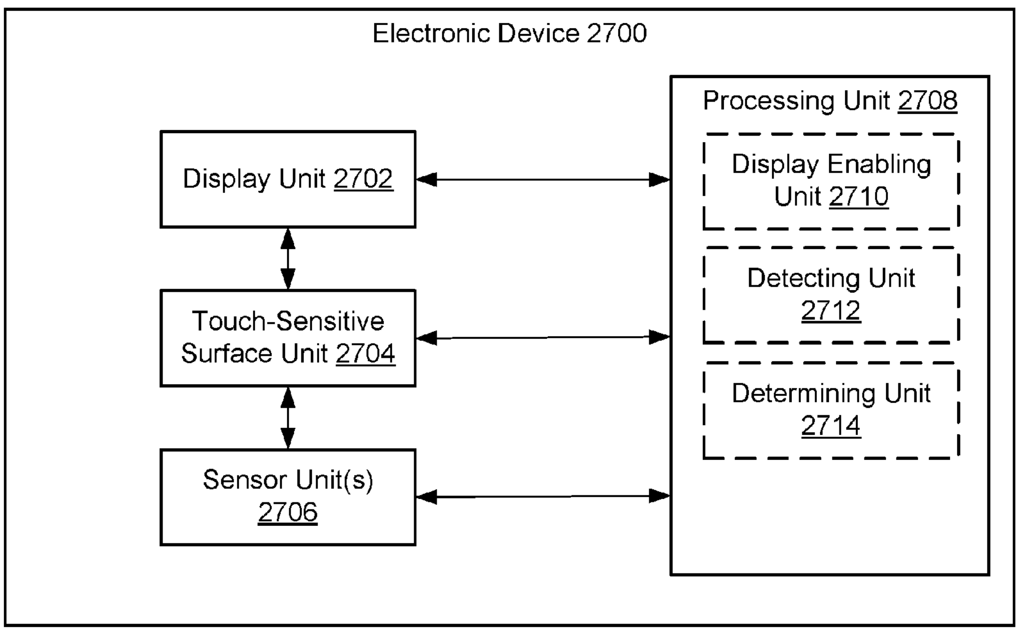

In accordance with some embodiments, FIG. 27 shows a functional block diagram of an electronic device 2700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device includes a display unit 2702 configured to display content items; a touch-sensitive surface unit 2704 configured to receive user inputs; one or more sensor units 2706 configured to detect intensity of contacts with the touch-sensitive surface unit 2704; and a processing unit 2708 coupled to the display unit 2702, the touch-sensitive surface unit 2704 and the one or more sensor units 2706. In some embodiments, the processing unit 2708 includes a display enabling unit 2710, a detecting unit 2712, and a determining unit 9$14. In some embodiments, the processing unit 2708 is configured to: enable display (e.g., with display enabling unit 2710), on the display unit (e.g., display unit 2702), of a first view of a first application; while enabling display of the first view, detect (e.g., with detecting unit 2712) a first portion of a first input that includes detecting a first contact on the touch-sensitive surface unit 2704; in response to detecting the first portion of the first input, in accordance with a determination (e.g., with determining unit 2714) that the first portion of the first input meets application-switching criteria, enable concurrent display (e.g., with display enabling unit 2710), on the display unit, of portions of a plurality of application views including the first application view and a second application view; while enabling concurrent display of the portions of the plurality of application views, detect (e.g., with detecting unit 2712) a second portion of the first input that includes liftoff of the first contact; and in response to detecting the second portion of the first input that includes liftoff of the first contact: in accordance with a determination (e.g., with determining unit 2714) that the second portion of the first input meets first-view display criteria, where the first-view display criteria include a criterion that is met when the liftoff of the first contact is detected in a first region of the touch-sensitive surface unit 2704, cease to enable display (e.g., with display enable unit 2710) of the portion of the second application view and enable display (e.g., with display enable unit 2710) of the first application view on the display unit; and in accordance with a determination (e.g., with determining unit 2714) that the second portion of the first input meets multi-view display criteria, where the multi-view display criteria includes a criterion that is met when the liftoff of the first contact is detected in a second region of the touch-sensitive surface unit 2704 that is different from the first region of the touch-sensitive surface unit 2704, maintain concurrent display (e.g., with display enable unit 2710) of at least a portion of the first application view and at least a portion of the second application view on the display after detecting the liftoff of the first contact.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10H, 11A-11E, 12A-12E, 13A-13D, 14A-14C, and 15 are, optionally, implemented by components depicted in FIGS. 1A-1B or FIGS. 16-21. For example, user interface entering operations 1006, 1110, and 1312, visual effect applying operations 1018, 1024, 1048, 1208, 1212, 1224, 1320, 1322, 1350, 1408, 1410, 1414, and 1416, detection operations 1030, 1052, 1062, 1080, 1084, 1091, 1092, 1096, 1104, 1116, 1126, 1130, 1138, 1142, 1146, 1204, 1210, 1220, 1232, 1236, 1244, 1248, 1308, 1318, 1328, 1340, 1346, 1350, 1404, 1418, 1426, and 1504, user interface representation insertion operation 1082, user interface representation removal operation 1088, user interface representation moving operations 1034, 1036, 1050, 1056, 1058, 1060, 1068, 1070, 1072, 1098, 1150, 1152, 1324, 1326, 1332, 1334, 1336, and 1338, and content-dependent execution operation 1140, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, the methods described herein are also applicable in an analogous manner to electronic devices configured for management, playback, and/or streaming (e.g., from an external server) of audio and/or visual content that are in communication with a remote control and a display (e.g., Apple TV from Apple Inc. of Cupertino, Calif.). For such devices, inputs are optionally received that correspond to gestures on a touch-sensitive surface of the remote control, voice inputs to the remote control, and/or activation of buttons on the remote control, rather than having the touch-sensitive surface, audio input device (e.g., a microphone), and/or buttons on the device itself. For such devices, data is optionally provided to the display rather than displayed by the device itself. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device with a touch-sensitive display, and one or more sensors that are configured to detect intensities of contacts with the touch-sensitive display:

displaying, on the touch-sensitive display, a user interface of an application;

while displaying the user interface of the application on the touch-sensitive display, detecting an input that includes detecting a contact at a first location on the touch-sensitive display, wherein the first location corresponds to a first operation within the application, wherein the contact remains stationary at the first location prior to lift-off of the first contact, and wherein the touch-sensitive display includes an open-application-selection region; and, in response to detecting the input on the touch-sensitive display:

in accordance with a determination that the input occurred inside of the open-application-selection region and that the input meets intensity criteria, including a criterion that is met when the input includes an increase in intensity of the contact above a first intensity threshold, performing a system function that is independent of the application without performing the first operation within the application, wherein performing the system function includes displaying an open-application-selection user interface that includes representations of a plurality of open applications, including one or more representations of open applications that were not displayed prior to detecting the input on the touch-sensitive display; and in accordance with a determination that the input occurred inside of the open-application-selection region and that the input does not meet the intensity criteria, performing the first operation within the application based on the input without performing the system function, wherein performing the first operation includes changing the user interface of the application without displaying the open-application-selection user interface.

2. The method of claim 1, including:

in accordance with a determination that the input occurred outside of the open-application-selection region, performing an operation within the application based on the input.

3. The method of claim 1, wherein the open-application-selection user interface includes snapshots of open applications displayed in an overlapping 3D arrangement.

4. The method of claim 1, wherein the open-application-selection user interface includes snapshots of open applications.

5. The method of claim 1, wherein the open-application-selection region is on a portion of the display that, prior to detecting the input, includes the user interface of the application.

6. The method of claim 1, including:

while displaying the open-application-selection user interface, detecting a swipe gesture;

in accordance with a determination that the swipe gesture is an upward swipe, closing a first application and removing a representation of the first application from the open-application-selection user interface; and, in accordance with a determination that the swipe gesture is a right to left swipe gesture, moving the representations of the plurality of open applications in accordance with the swipe gesture.

7. The method of claim 1, wherein performing a first operation within the application includes performing a page switching operation within the application.

8. The method of claim 1, wherein performing a first operation within the application includes navigating within a hierarchy associated with the application.

9. The method of claim 1, wherein performing a first operation within the application includes performing a preview operation within the application.

10. The method of claim 1, wherein performing a first operation within the application includes performing a menu-display operation within the application.

11. A non-transitory computer readable storage medium storing one or more programs, the one or more programs comprising instructions, which when executed by an electronic device with a touch-sensitive display and one or more sensors to detect intensities of contacts with the touch-sensitive display, cause the device to:

displaying, on the touch-sensitive display, a user interface of an application;

while displaying the user interface of the application on the touch-sensitive display, detecting an input that includes detecting a contact at a first location on the touch-sensitive display, wherein the first location corresponds to a first operation within the application, wherein the contact remains stationary at the first location prior to lift-off of the first contact, and wherein the touch-sensitive display includes an open-application-selection region; and, in response to detecting the input on the touch-sensitive display:

in accordance with a determination that the input occurred inside of the open-application-selection region and that the input meets intensity criteria, including a criterion that is met when the input includes an increase in intensity of the contact above a first intensity threshold, perform a system function that is independent of the application without performing the first operation within the application, wherein performing the system function includes displaying an open-application-selection user interface that includes representations of a plurality of open applications, including one or more representations of open applications that were not displayed prior to detecting the input on the touch-sensitive display; and in accordance with a determination that the input occurred inside of the open-application-selection region and that the input does not meet the intensity criteria, perform the first operation within the application based on the input without performing the system function, wherein performing the first operation includes changing the user interface of the application without displaying the open-application-selection user interface.

12. The non-transitory computer readable storage medium of claim 11, including instructions, which when executed by the electronic device with the touch-sensitive display and the one or more sensors, cause the electronic device to:

in accordance with a determination that the input occurred outside of the open-application-selection region, perform an operation within the application based on the input.

13. The non-transitory computer readable storage medium of claim 11, wherein the open-application-selection user interface includes snapshots of open applications displayed in an overlapping 3D arrangement.

14. The non-transitory computer readable storage medium of claim 11, wherein the open-application-selection user interface includes snapshots of open applications.

15. The non-transitory computer readable storage medium of claim 11, wherein the open-application-selection region is on a portion of the display that, prior to detecting the input, includes the user interface of the application.

16. The non-transitory computer readable storage medium of claim 11, including instructions, which when executed by the electronic device with the touch-sensitive display and the one or more sensors, cause the electronic device to:

while displaying the open-application-selection user interface, detect a swipe gesture;

in accordance with a determination that the swipe gesture is an upward swipe, close a first application and remove a representation of the first application from the open-application-selection user interface; and, in accordance with a determination that the swipe gesture is a right to left swipe gesture, move the representations of the plurality of open applications in accordance with the swipe gesture.

17. The non-transitory computer readable storage medium of claim 11, wherein performing a first operation within the application includes performing a page switching operation within the application.

18. The non-transitory computer readable storage medium of claim 11, wherein performing a first operation within the application includes navigating within a hierarchy associated with the application.

19. The non-transitory computer readable storage medium of claim 11, wherein performing a first operation within the application includes performing a preview operation within the application.

20. The non-transitory computer readable storage medium of claim 11, wherein performing a first operation within the application includes performing a menu-display operation within the application.

21. An electronic device, comprising:

a touch-sensitive display;

one or more sensors to detect intensities of contacts with the touch-sensitive display;

one or more processors;

memory; and one or more programs, wherein the one or more programs are stored in the memory and configured to be executed by the one or more processors, the one or more programs including instructions for:

displaying, on the touch-sensitive display, a user interface of an application;

while displaying the user interface of the application on the touch-sensitive display, detecting an input that includes detecting a contact at a first location on the touch-sensitive display, wherein the first location corresponds to a first operation within the application, wherein the contact remains stationary at the first location prior to lift-off of the first contact, and wherein the touch-sensitive display includes an open-application-selection region; and, in response to detecting the input on the touch-sensitive display:

in accordance with a determination that the input occurred inside of the open-application-selection region and that the input meets intensity criteria, including a criterion that is met when the input includes an increase in intensity of the contact above a first intensity threshold, performing a system function that is independent of the application without performing the first operation within the application, wherein performing the system function includes displaying an open-application-selection user interface that includes representations of a plurality of open applications, including one or more representations of open applications that were not displayed prior to detecting the input on the touch-sensitive display; and in accordance with a determination that the input occurred inside of the open-application-selection region and that the input does not meet the intensity criteria, performing the first operation within the application based on the input without performing the system function, wherein performing the first operation includes changing the user interface of the application without displaying the open-application-selection user interface.

22. The electronic device of claim 21, including instructions for:

in accordance with a determination that the input occurred outside of the open-application-selection region, performing an operation within the application based on the input.

23. The electronic device of claim 21, wherein the open-application-selection user interface includes snapshots of open applications displayed in an overlapping 3D arrangement.

24. The electronic device of claim 21, wherein the open-application-selection user interface includes snapshots of open applications.

25. The electronic device of claim 21, wherein the open-application-selection region is on a portion of the display that, prior to detecting the input, includes the user interface of the application.

26. The electronic device of claim 21, including instructions for:

while displaying the open-application-selection user interface, detecting a swipe gesture;

in accordance with a determination that the swipe gesture is an upward swipe, closing a first application and removing a representation of the first application from the open-application-selection user interface; and, in accordance with a determination that the swipe gesture is a right to left swipe gesture, moving the representations of the plurality of open applications in accordance with the swipe gesture.

27. The electronic device of claim 21, wherein performing a first operation within the application includes performing a page switching operation within the application.

28. The electronic device of claim 21, wherein performing a first operation within the application includes navigating within a hierarchy associated with the application.

29. The electronic device of claim 21, wherein performing a first operation within the application includes performing a preview operation within the application.

30. The electronic device of claim 21, wherein performing a first operation within the application includes performing a menu-display operation within the application.

* * * * *